United States Patent
Goel

(10) Patent No.: US 8,145,535 B2
(45) Date of Patent: Mar. 27, 2012

(54) COMPUTER IMPLEMENTED METHODS FOR PROVIDING OPTIONS ON PRODUCTS

(76) Inventor: Sachin Goel, Walpole, MA (US)

( * ) Notice: Subject to any disclaimer, the term of this patent is extended or adjusted under 35 U.S.C. 154(b) by 995 days.

(21) Appl. No.: 11/893,914

(22) Filed: Aug. 17, 2007

(65) Prior Publication Data

US 2008/0052185 A1    Feb. 28, 2008

Related U.S. Application Data

(63) Continuation-in-part of application No. 11/506,451, filed on Aug. 18, 2006, now Pat. No. 7,424,449, which is a continuation-in-part of application No. 11/474,115, filed on Jun. 23, 2006, now Pat. No. 7,472,080, which is a continuation-in-part of application No. 10/973,802, filed on Oct. 25, 2004, now Pat. No. 7,418,409, said application No. 11/893,914 is a continuation-in-part of application No. PCT/US2007/014654, filed on Jun. 23, 2007, and a continuation-in-part of application No. PCT/US2007/014653, filed on Jun. 23, 2007.

(60) Provisional application No. 60/514,248, filed on Oct. 24, 2003.

(51) Int. Cl.
*G06Q 30/00* (2006.01)
*G06F 17/30* (2006.01)
(52) U.S. Cl. ............... 705/26.1; 705/5; 705/6; 705/27.1
(58) Field of Classification Search .................. 705/5–6, 705/26–27.2
See application file for complete search history.

(56) References Cited

U.S. PATENT DOCUMENTS

| 4,775,936 | A | | 10/1988 | Jung |
| 4,931,932 | A | | 6/1990 | Dalnekoff et al. |
| 5,237,499 | A | | 8/1993 | Garback |
| 5,627,973 | A | | 5/1997 | Armstrong et al. |
| 5,765,142 | A | | 6/1998 | Allred et al. |
| 5,797,127 | A | | 8/1998 | Walker et al. |
| 5,890,133 | A | | 3/1999 | Ernst |
| 5,897,620 | A | * | 4/1999 | Walker et al. .............. 705/5 |

(Continued)

FOREIGN PATENT DOCUMENTS

GB    2366403 A    3/2002

(Continued)

OTHER PUBLICATIONS

"US Airways: US Airways and United Airlines take next step in code-share agreement; Reciprocal airport lounge access and interline e-ticketing". M2 Presswire. Coventry: Oct. 15, 2002. p. 1.*

(Continued)

*Primary Examiner* — Will Allen
(74) *Attorney, Agent, or Firm* — Wolf, Grenfield & Sacks, P.C.

(57) ABSTRACT

A computer-implemented system and method to provide options on products to enhance customers' experience. A computer-implemented system is operated that delivers to a customer an option to utilize up to n of m selected products, where n is less than or equal to m. Information is recorded in a data store, pertaining to said option. In addition, a system is operated to define each of the n chosen products, whereby after each of the n chosen products is defined, the customer can utilize said chosen product. The information pertaining to said defined products is recorded in a data store.

24 Claims, 110 Drawing Sheets

U.S. PATENT DOCUMENTS

| | | | |
|---|---|---|---|
| 5,962,829 | A | 10/1999 | Yoshinaga |
| 5,963,910 | A | 10/1999 | Ulwick |
| 6,014,647 | A | 1/2000 | Nizzari et al. |
| 6,041,308 | A | 3/2000 | Walker et al. |
| 6,107,932 | A | 8/2000 | Walker et al. |
| 6,115,691 | A | 9/2000 | Ulwick |
| 6,119,094 | A | 9/2000 | Lynch et al. |
| 6,119,933 | A | 9/2000 | Wong et al. |
| 6,161,051 | A | 12/2000 | Hafemann et al. |
| 6,236,977 | B1 | 5/2001 | Verba et al. |
| 6,263,315 | B1 | 7/2001 | Talluri |
| 6,295,521 | B1 | 9/2001 | DeMarcken et al. |
| 6,304,850 | B1 | 10/2001 | Keller et al. |
| 6,307,572 | B1 | 10/2001 | DeMarcken et al. |
| 6,314,361 | B1 | 11/2001 | Yu et al. |
| 6,377,932 | B1 | 4/2002 | DeMarcken |
| 6,442,537 | B1 | 8/2002 | Karch |
| 6,477,520 | B1 | 11/2002 | Malaviya et al. |
| 6,496,568 | B1 | 12/2002 | Nelson |
| 6,567,786 | B1 | 5/2003 | Bibelnieks et al. |
| 6,721,714 | B1 | 4/2004 | Baiada et al. |
| 6,757,689 | B2 | 6/2004 | Battas |
| 6,760,632 | B1 | 7/2004 | Heching et al. |
| 6,778,660 | B2 | 8/2004 | Fromm |
| 6,850,901 | B1 | 2/2005 | Hunter et al. |
| 6,895,381 | B1 | 5/2005 | Selby |
| 6,974,079 | B1 | 12/2005 | Strothmann et al. |
| 7,050,987 | B2 | 5/2006 | Lettovsky et al. |
| 7,069,309 | B1 | 6/2006 | Dodrill et al. |
| 7,080,021 | B1 * | 7/2006 | McCulloch ............... 705/5 |
| 7,249,062 | B2 | 7/2007 | Norins et al. |
| 7,340,403 | B1 | 3/2008 | DeMarcken |
| 7,418,409 | B1 * | 8/2008 | Goel ............... 705/26 |
| 7,424,449 | B2 * | 9/2008 | Goel ............... 705/26 |
| 7,472,080 | B2 * | 12/2008 | Goel ............... 705/26 |
| 2001/0034686 | A1 | 10/2001 | Eder |
| 2001/0037243 | A1 | 11/2001 | Rouston et al. |
| 2001/0051885 | A1 | 12/2001 | Nardulli et al. |
| 2002/0059283 | A1 | 5/2002 | Shapiro et al. |
| 2002/0065696 | A1 | 5/2002 | Hack et al. |
| 2002/0065699 | A1 | 5/2002 | Talluri |
| 2002/0095328 | A1 | 7/2002 | Swart et al. |
| 2002/0194117 | A1 | 12/2002 | Nabe et al. |
| 2002/0198747 | A1 * | 12/2002 | Boyer et al. ............... 705/5 |
| 2002/0198775 | A1 | 12/2002 | Ryan |
| 2003/0033155 | A1 | 2/2003 | Peerson et al. |
| 2003/0036928 | A1 * | 2/2003 | Kenigsberg et al. ............... 705/5 |
| 2003/0046130 | A1 | 3/2003 | Golightly et al. |
| 2003/0050846 | A1 | 3/2003 | Rodon |
| 2003/0055689 | A1 | 3/2003 | Block et al. |
| 2003/0065581 | A1 | 4/2003 | Takada |
| 2003/0069780 | A1 | 4/2003 | Hailwood et al. |
| 2003/0074239 | A1 | 4/2003 | Hoffman et al. |
| 2003/0074247 | A1 | 4/2003 | Dick et al. |
| 2003/0074249 | A1 | 4/2003 | Hoffman et al. |
| 2003/0074250 | A1 | 4/2003 | Burk |
| 2003/0074262 | A1 | 4/2003 | Hoffman et al. |
| 2003/0074263 | A1 | 4/2003 | Hoffman et al. |
| 2003/0074264 | A1 | 4/2003 | Hoffman |
| 2003/0074281 | A1 | 4/2003 | Hoffman et al. |
| 2003/0074285 | A1 | 4/2003 | Hoffman et al. |
| 2003/0074355 | A1 | 4/2003 | Menniger et al. |
| 2003/0074360 | A1 | 4/2003 | Chen et al. |
| 2003/0078787 | A1 | 4/2003 | Hoffman et al. |
| 2003/0078818 | A1 | 4/2003 | Hoffman et al. |
| 2003/0078827 | A1 | 4/2003 | Hoffman |
| 2003/0078845 | A1 | 4/2003 | Hoffman et al. |
| 2003/0078846 | A1 | 4/2003 | Burk et al. |
| 2003/0078860 | A1 | 4/2003 | Hoffman et al. |
| 2003/0078861 | A1 | 4/2003 | Hoffman et al. |
| 2003/0144867 | A1 | 7/2003 | Campbell et al. |
| 2003/0158771 | A1 | 8/2003 | Shen et al. |
| 2003/0187685 | A1 | 10/2003 | Bakker |
| 2004/0015386 | A1 | 1/2004 | Abe et al. |
| 2004/0039613 | A1 | 2/2004 | Maycotte et al. |
| 2004/0039614 | A1 | 2/2004 | Maycotte et al. |
| 2004/0073496 | A1 | 4/2004 | Cohen |
| 2004/0083113 | A1 | 4/2004 | Cao et al. |
| 2004/0158536 | A1 | 8/2004 | Kowal et al. |
| 2004/0172319 | A1 | 9/2004 | Eder |
| 2004/0230451 | A1 | 11/2004 | Figa |
| 2004/0267580 | A1 | 12/2004 | Becker |
| 2005/0033616 | A1 | 2/2005 | Vavul et al. |
| 2005/0071245 | A1 | 3/2005 | Norins et al. |
| 2005/0097000 | A1 | 5/2005 | Freishtat et al. |
| 2005/0216317 | A1 | 9/2005 | Medellin et al. |
| 2006/0106655 | A1 | 5/2006 | Lettovsky et al. |

FOREIGN PATENT DOCUMENTS

| | | | |
|---|---|---|---|
| WO | WO 0073930 | A2 | 12/2000 |
| WO | WO 0073957 | A2 | 12/2000 |
| WO | WO 0073958 | A2 | 12/2000 |
| WO | WO 01/18722 | A1 | 3/2001 |
| WO | WO 0133473 | A2 | 5/2001 |
| WO | WO 0157771 | A1 | 8/2001 |
| WO | WO 02079901 | A2 | 10/2002 |
| WO | WO 03019448 | A2 | 3/2003 |
| WO | WO 03/029914 | A2 | 4/2003 |
| WO | WO 03/054760 | A2 | 7/2003 |
| WO | WO 03102867 | A1 | 12/2003 |
| WO | WO 2004/036364 | A2 | 4/2004 |

OTHER PUBLICATIONS

Chatwin, "Multiperiod Airline Overbooking With a Single Fare Class," *Operations Research*, 46:6, 805-819p (1998).

Chatwin, "Optimal dynamic pricing of perishable products with stochastic demand and a finite set of prices," *Elsevir Science B.V.—European Journal of Operational Research*; 125, 149-174 (2000).

Compton, "Many Possibilities, One Price," *Customer Relationship Management*,8:8, 16-17 (2004).

Elmaghraby, "Dynamic Pricing in the Presence of Inventory Considerations: Research Overview, Current Practices and Future Directions," *Management Science*, 49:10, 1287-1309 (2003).

Grant, E., "A New Twist in Airline Travel: Surcharges Debut for Certain Ticket Types," *Travel Agent*, 293(11):135(1) Jan. 25, 1999 (recovered from Dialog on Dec. 6, 2008).

Ha et al., "Problem-Focused Incremental Elicitation of Multi-Attribute Utility Models," http://www.cs.uwm.edu/~vu/papers/uai97.pdf, 1-8.

Margulius, "Priced to sell . . . to you," Infoworld San Mataeo, 24:7, 47-48 http://www.infoworld.com/archives/emailPrint.jsp (2002).

Rios-Insua et al., Sensitivity Analysis in an Additive Multi-Attribute Utility Decision Support System, http://www.ciemat.es/convocatorias/eventos/samo2001/esp-riosinsua.pdf, 1-1.

Roth, et al., "Multi-Attribute Utility Analysis" http://msll.mit.edu/maua_paper.pdf, 1-16.

"Booked on the 6.40, the 7.00, the 7.45 . . . " Financial Times (FT) Mar. 8, 1999 p. 15 (recovered from Dialog on Dec. 6, 2008).

www.expedia.com May 19, 2001. Obtained on Sep. 26, 2007 from www.Archive.org.

PCT/IB07/03761, International Search Report and Written Opinion, Feb. 4, 2009.

\* cited by examiner

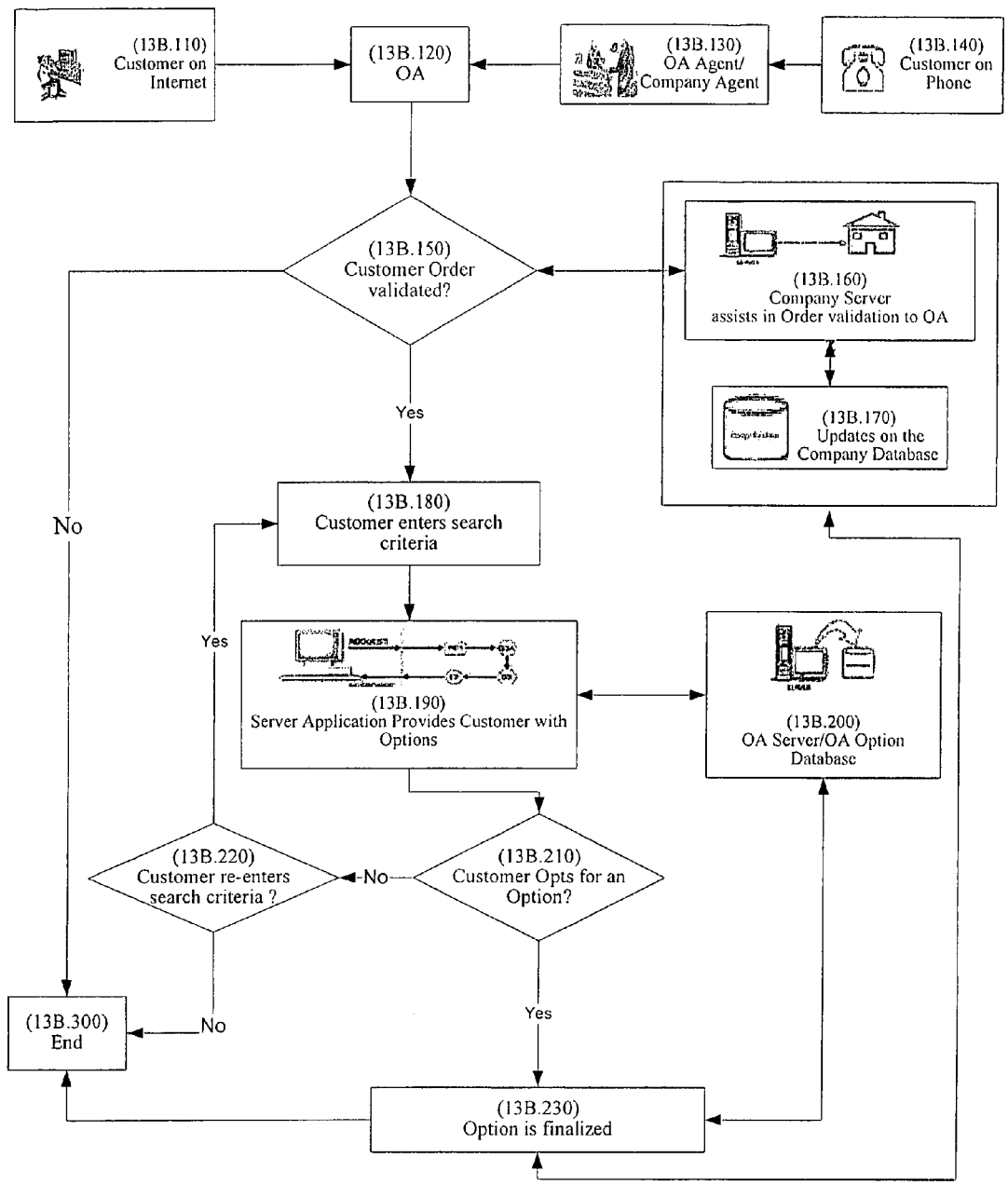

Fig. 15

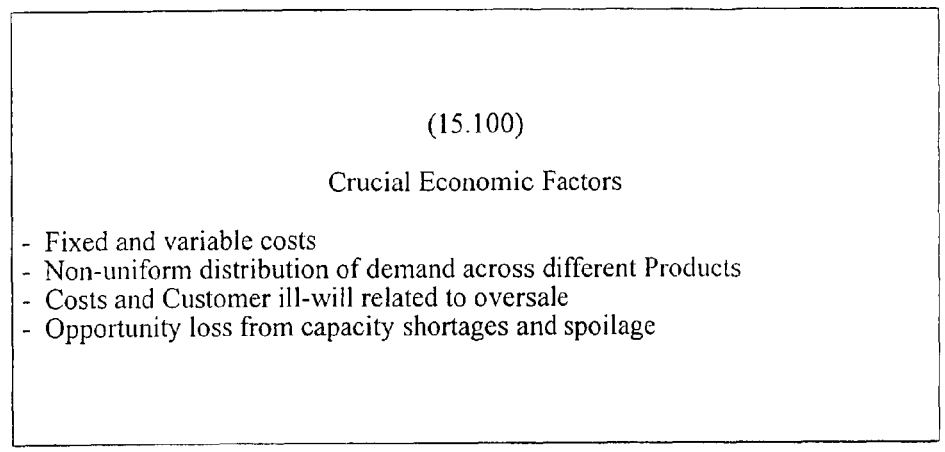

(15.100)

Crucial Economic Factors

- Fixed and variable costs
- Non-uniform distribution of demand across different Products
- Costs and Customer ill-will related to oversale
- Opportunity loss from capacity shortages and spoilage

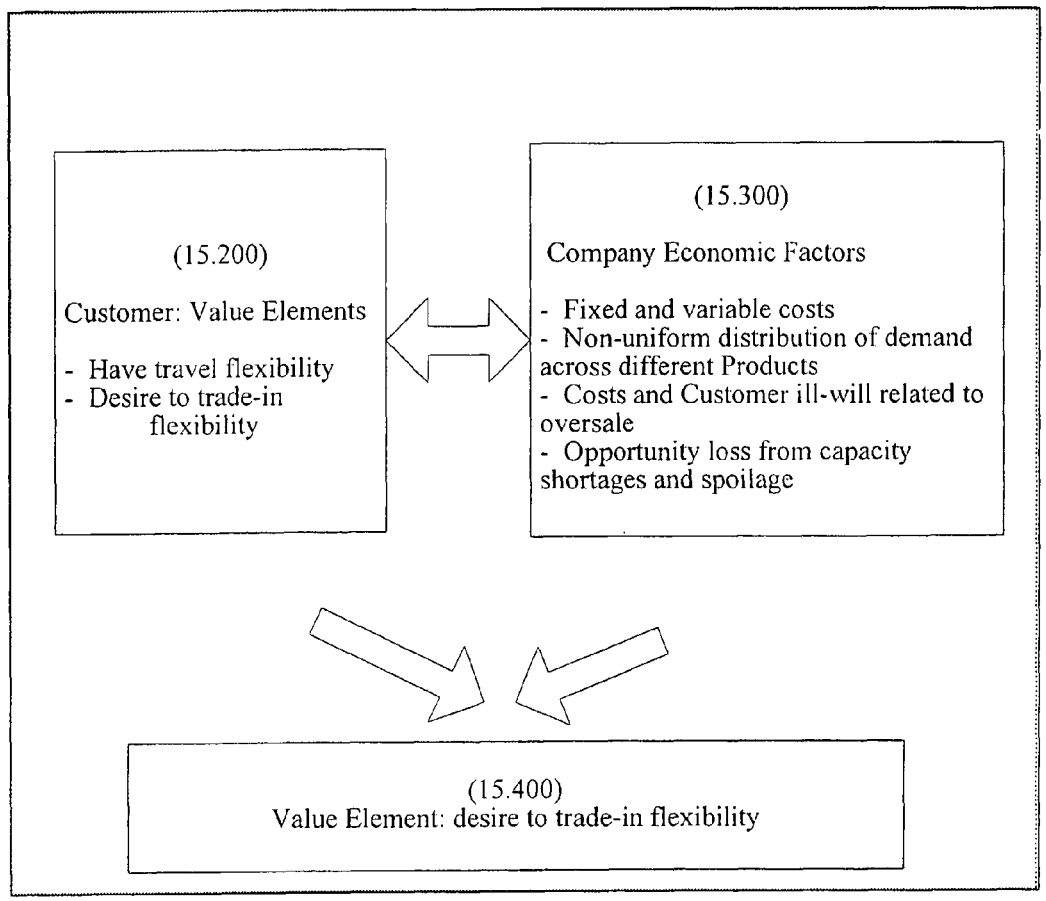

(15.200)

Customer: Value Elements

- Have travel flexibility
- Desire to trade-in flexibility (15.300)

Company Economic Factors

- Fixed and variable costs
- Non-uniform distribution of demand across different Products
- Costs and Customer ill-will related to oversale
- Opportunity loss from capacity shortages and spoilage (15.400)
Value Element: desire to trade-in flexibility

Fig. 17

(17.100)  Product  P1

XYZ Company
Product P1                              Utilization I  23rd May (17.200)  Product  P2

XYZ Company
Product P2                              Utilization I  24th May (17.300)  (1)                           (2)

| | | |
|---|---|---|
| (1) | Product Purchase Date Time | 14th April 5:24 pm |
| (2) | APO Purchase Date Time | 14th April 5:27 pm |
| (3) | Product Price Paid | $500 |
| (4) | Initial FRO Discount | $15 |

(17.400)
Default Product    P1

| | | (1) | (2) | (3) | (4) | (5) |
|---|---|---|---|---|---|---|
| (1) | Notify Deadline (DTU of P1) | | 30 | 7 | 3 | 1 |
| (2) | FRO Exercise discount as a function of Chosen Product | P1 | $5 | $10 | $15 | $20 |
| (3) | | P2 | $10 | $25 | $35 | $50 |

Crucial Economic Factors

- High fixed costs
- Varying and unbalanced demand across different flights
- Difficulty to accurately forecast demand
- Inability or difficulty to shift customers from overloaded flights to low-demand flights
- Costs and Customer ill-will related to over-sale
- Opportunity loss from capacity shortages and spoilage
- Spill-demand from customers who are denied seats
- Need to develop sustainable competitive advantages
- Customer attrition rate
- Commoditization of the airline industry (30.200)

Customer: Value Elements

- Have travel flexibility
- Desire to trade-in travel flexibility

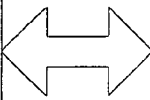

(30.300)

Airline Economic Factors

- High fixed costs
- Unbalanced demand across different flights
- Costs and Customer ill-will related to over-sale
- Opportunity loss from capacity shortages and spoilage

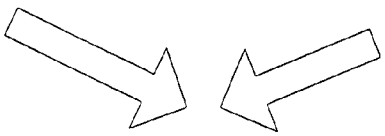

(30.400)
Value Element: desire to trade-in travel flexibility

Fig. 32

(32.100)  Flight  F1

| Departs | Arrives | Flight | Cabin |
|---|---|---|---|
| BOS | ATL | Alpha 661 | Coach |
| 23rd May | 23rd May | 0 Stops | |
| 2:00pm | 5:00pm | | |

(32.200)  Flight  F2

| Departs | Arrives | Flight | Cabin |
|---|---|---|---|
| BOS | ATL | Alpha 427 | Coach |
| 25th May | 25th May | 0 Stops | |
| 4:30pm | 7:30pm | | |

(32.300)

| | (1) | (2) |
|---|---|---|
| (1) | Ticket Purchase Date Time | 14th April 5:24 pm |
| (2) | FRO Initial Transaction Date Time | 14th April 5:27 pm |
| (3) | Ticket Price Paid | $500 |
| (4) | Initial FRO Discount | $15 |

(32.400)
Default Flight  F1

| | | | (1) | (2) | (3) | (4) | (5) |
|---|---|---|---|---|---|---|---|
| (1) | Notify Deadline (DTD of F1) | | 30 | 7 | 3 | 1 | |
| (2) | FRO Exercise discount as a function of Chosen Flight | F1 | | $5 | $10 | $15 | $20 |
| (3) | | F2 | | $10 | $25 | $35 | $50 |

Fig. 34

FRO Itinerary 1 (34.100)

Onward journey

| Flight | Departs | Arrives |
|---|---|---|
| Alpha993 Coach(U) | BOS  02 May 8:55am | ATL 02 May 11:57am |
| Alpha998 Coach(U) | ATL  02 May 1:00pm | LAX 02 May 3:07pm |

Return journey

| Flight | Departs | Arrives |
|---|---|---|
| Alpha893 Coach(U) | LAX 06 May 8:55am | BOS 06 May 12:15pm |

FRO Itinerary 2 (34.200)

Onward journey

| Flight | Departs | Arrives |
|---|---|---|
| Alpha963 Coach(U) | BOS 04 May 8:55am | ATL 04 May 11:57am |
| Alpha969 Coach(U) | ATL 04 May 2:00pm | LAX 04 May 4:07pm |

Return journey

| Flight | Departs | Arrives |
|---|---|---|
| Alpha793 Coach(U) | LAX 07 May 9:55am | BOS 07 May 1:15pm |

Fig. 35

Onward journey (35.100)

| (35.110)<br>Initial Flight<br>Segment | Flight | Departs | Arrives |
|---|---|---|---|
| | Alpha567<br>Coach(U) | BOS 02 May<br>8:55am | ATL 02 May<br>11:57am |
| | Alpha678<br>Coach(U) | ATL 02 May<br>1:00pm | LAX 02 May<br>3:07pm |

| (35.120)<br>Option Flight<br>Segment | Flight | Departs | Arrives |
|---|---|---|---|
| | Alpha123<br>Coach(U) | BOS 03 May<br>8:55am | LAX 03 May<br>12:07pm |

Return journey (20.200)

| (35.360)<br>Initial Flight<br>Segment | Flight | Departs | Arrives |
|---|---|---|---|
| | Alpha233<br>Coach(U) | LAX 06 May<br>8:55am | BOS 06 May<br>6:15pm |

Fig. 36

Onward journey (36.100)

Leg 1

| (36.110) Initial Flight Leg | Flight | Departs | Arrives |
|---|---|---|---|
| | Alpha493 Coach(U) | BOS 02 May 8:55am | ATL 02 May 11:57am |

Leg 2 (36.200)

| (36.210) Initial Flight Leg | Flight | Departs | Arrives |
|---|---|---|---|
| | Alpha398 Coach(U) | ATL 02 May 1:00pm | LAX 02 May 3:07pm |

| (36.220) Option Flight Leg | Flight | Departs | Arrives |
|---|---|---|---|
| | Alpha253 Coach(U) | ATL 02 May 6:00pm | LAX 02 May 8:07pm |

Return journey (36.300)

Leg1

| (36.310) Initial Flight Leg | Flight | Departs | Arrives |
|---|---|---|---|
| | Alpha343 Coach(U) | LAX 06 May 8:55am | BOS 06 May 6:15pm |

Fig. 37

FRO Reservations

Alternate Flight Option  
Know More...   Buy AFO

Upgrade Ticket Option  
Know More...   Buy UTO

Flixibility Reward Option  
Know More...   Get FRO

Your Itinerary

Onward Journey

| Flight | Departs | | Arrives | |
|---|---|---|---|---|
| Alpha 993  Coach (U) | BOS | 8:55 am May 2 | ORD | 11:57 am May 2 |
| Alpha 892  Coach (U) | ORD | 1:00 pm May 2 | ATL | 3:07 pm May 2 |

Return Journey

| Flight | Departs | | Arrives | |
|---|---|---|---|---|
| Alpha 964  Coach (U) | ATL | 9:55 am May 7 | ORD | 11:50 pm May 7 |
| Alpha 857  Coach (U) | ORD | 1:00 pm May 7 | BOS | 4:07 pm May 7 |

Fig. 38

FRO Reservations

Search　　Select　　Payment　　Confirm

Your Itinerary

Onward Journey

| | Flight | Departs | Arrives | Modify your FRO Search | | | |
|---|---|---|---|---|---|---|---|
| Original Flight | Alpha 993 Coach (U) | BOS 8:55 am May 2 | ORD 11:57 am May 2 | From | BOS | Departs On | May 1 |
| | Alpha 894 Coach (U) | ORD 1:00 pm May 2 | ATL 3:07 pm May 2 | To Stops | ATL Any | +/- days Depart Time | +/- 0 day Anytime |

Search FRO Flights

Return Journey

| | Flight | Departs | Arrives | |
|---|---|---|---|---|
| Original Flight | Alpha 964 Coach (U) | ATL 9:55 am May 7 | ORD 11:50 pm May 7 | Click here to GET FRO Flight for Return Journey |
| | Alpha 857 Coach (U) | ORD 1:00 pm May 7 | BOS 4:07 pm May 7 | |

Fig. 39

FRO Reservations ( Search ) ( Select ) ( Payment ) ( Confirm )

Your Itinerary

Onward Journey

| | Flight | | Departs | | Arrives | | Modify your FRO Search | | | |
|---|---|---|---|---|---|---|---|---|---|---|
| Original Flight | Alpha 993 Coach (U) | | BOS | 8:55 am May 2 | ORD | 11:57 am May 2 | From BOS To ATL Stops Any | | Departs On May 1 +/- days +/-0 day Depart Time Anytime | |
| | Alpha 894 Coach (U) | | ORD | 1:00 pm May 2 | ATL | 3:07 pm May 2 | | | | |

Search FRO Flights

Return Journey

| | Flight | | Departs | | Arrives | | |
|---|---|---|---|---|---|---|---|
| Original Flight | Alpha 964 Coach (U) | | ATL | 9:55 am May 7 | ORD | 11:50 pm May 7 | Click here to GET FRO Flight for Return Journey |
| | Alpha 857 Coach (U) | | ORD | 1:00 pm May 7 | BOS | 4:07 pm May 7 | |

Select another FRO Flight for Onward Journey  *Discount Per Person

| FRO Flight | Departs | Arrives | Instant FRO Discount | FRO Notify Deadline / FRO Exercise Discount | | | |
|---|---|---|---|---|---|---|---|
| Alpha 674/625 Stop 1 | 9:00 am May 1 BOS | 3:07 pm May 1 ATL | $10 | April 30 6:00 pm $10 Select | May 1 5:00 am $25 Select | May 1 9:00am FRO Flight Depart | May 2 8:55am Original Flight Depart |
| Alpha 443/125 Stop 1 | 10:00 am May 1 BOS | 1:00 pm May 1 ATL | $5 | April 28 6:00 pm $30 Select | May 1 5:00 am $35 Select | May 1 10:00am FRO Flight Depart | May 2 8:55am Original Flight Depart |
| Alpha 333/348 Stop 1 | 11:00am May 1 BOS | 7:05 pm May 1 ATL | $5 | April 30 6:00 pm $25 Select | May 1 5:00 am $50 Select | May 1 11:00am FRO Flight Depart | May 2 8:55am Original Flight Depart |

Fig. 40

FRO Reservations ( Search ) ( Select ) ( Payment ) ( Confirm )

Your Itinerary (Includes FRO Flights on Onward Journey)

Onward Journey

| | Flight | | Departs | | Arrives | | |
|---|---|---|---|---|---|---|---|
| Original Flight | Alpha 993 | Coach (U) | BOS | 8:55 am May 2 | ORD | 11:57 am May 2 | We may ask you to take FRO Flight by May 1, 5:00 am |
| | Alpha 892 | Coach (U) | ORD | 1:00 pm May 2 | ATL | 3:07 pm May 2 | If we do so, we would offer FRO Exercise Discount of $ 25 |
| FRO Flight | Alpha 674 | Coach (U) | BOS | 9:00 am May 1 | ORD | 11:57 am May 1 | [Edit FRO Deadline / Reward] |
| | Alpha 625 | | ORD | 1:00 pm May 1 | ATL | 3:07 pm May 1 | Remove FRO Flight    Change FRO Flight |

Return Journey

| | Flight | | Departs | | Arrives | | |
|---|---|---|---|---|---|---|---|
| Original Flight | Alpha 964 | Coach (U) | ATL | 9:55 am May 7 | ORD | 11:50 pm May 7 | Get FRO Flight for Onward Jonrney |
| | Alpha 857 | Coach (U) | ORD | 1:00 pm May 7 | BOS | 4:07 pm May 7 | |

Save and purchase

Fig. 52
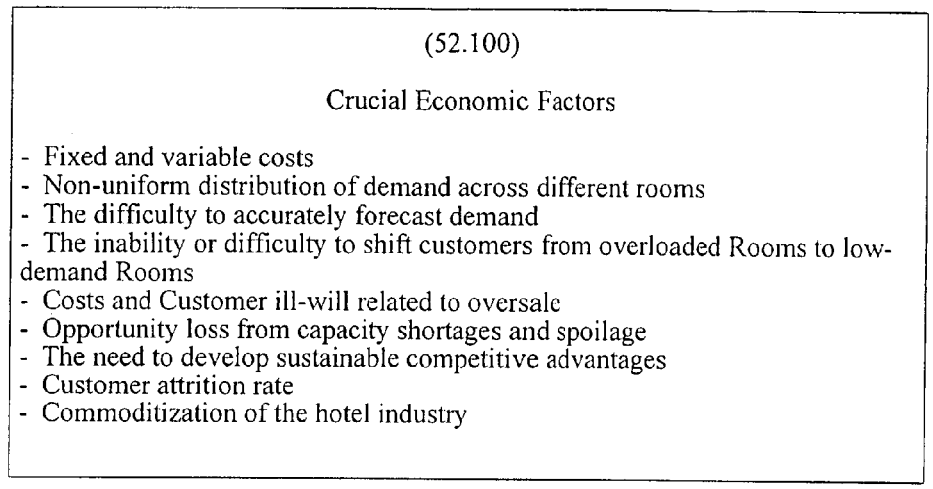
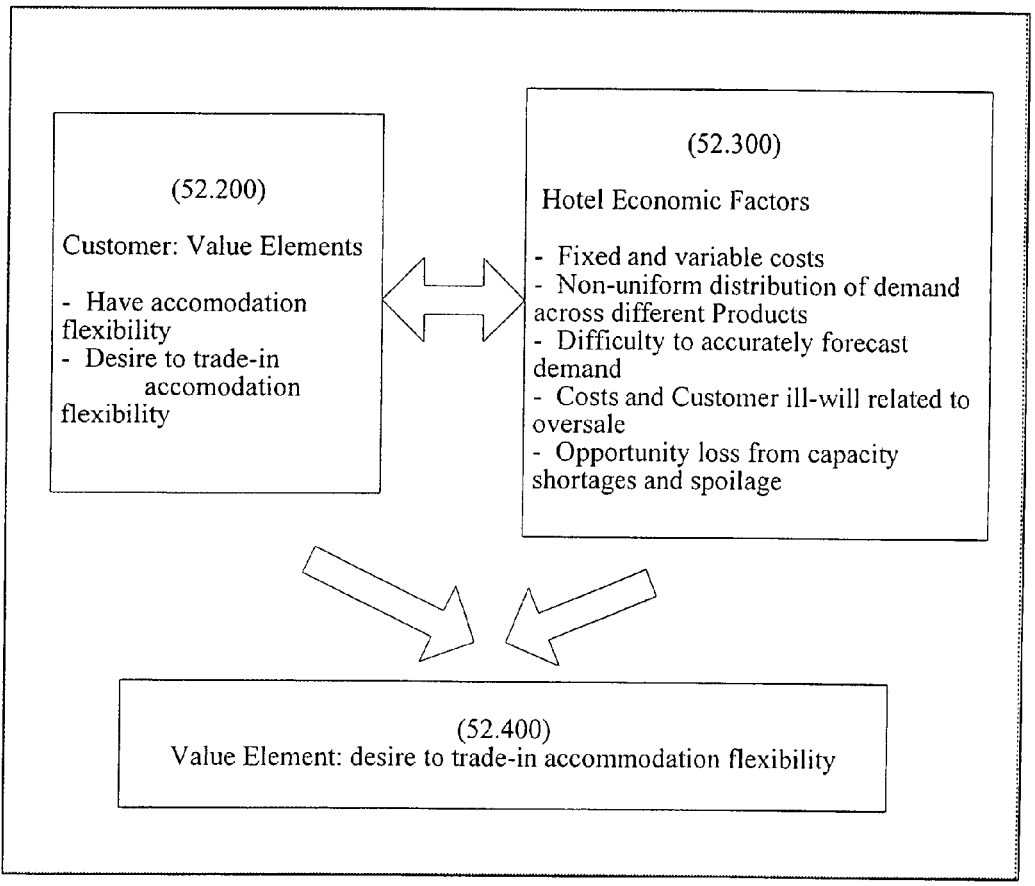

Fig. 54

(54.100)　　　　Room　　　R1

XYZ International
T Square　　　　　　　　　Check-in　　Nov 20
New York　　　　　　　　　Check-out　Nov 23
Room Type　　Guest Room (54.200)　　　　Room　　　R2

XYZ International
B Square　　　　　　　　　Check-in　　Nov 20
New York　　　　　　　　　Check-out　Nov 23
Room Type　　Guest Room (54.300)　　(1)　　　　　　　　　　(2)

| | (1) | (2) |
|---|---|---|
| (1) | Room Reservation Date Time | 7th Nov 5:24 pm |
| (2) | FRO Initial Transaction Date Time | 10th Nov 5:27 pm |
| (3) | Room Price Paid | $450 |
| (4) | Initial FRO Discount | $10 |

(54.400)
Default Room　　　　　　R1

| | | | (1) | (2) | (3) | (4) | (5) |
|---|---|---|---|---|---|---|---|
| (1) | Notify Deadline (DTC of R1) | | 5 | 3 | 2 | 1 | |
| (2) | FRO Exercise discount as a | R1 | $15 | $20 | $30 | $40 | |
| (3) | function of Chosen Room | R2 | $10 | $25 | $35 | $50 | |

Fig. 56

Room Product (56.100)

Original Room

| XYZ Resort | | |
|---|---|---|
| T square | | |
| New York City | | |
| | | Original |
| Check-in | Thu, Dec 7 | Special Preferences |
| Check-out | Sun, Dec 10 | Non-Smoking |
| Room Description | Guest Room | Saturday Night Show |

(56.200)

FRO Room

| XYZ Resort | | |
|---|---|---|
| T square | | |
| New York City | | |
| | | FRO |
| Check-in | Thu, Dec 7 | Special Preferences |
| Check-out | Sun, Dec 10 | Smoking |
| Room Description | Guest Room | Saturday Night Show |

Fig. 57

Room Set (57.100)

Original Room

| XYZ Resort | | |
|---|---|---|
| T square | | |
| New York City | | |
| | | Original |
| Check-in | Thu, Dec 7 | Special Preferences |
| Check-out | Sun, Dec 10 | Non-Smoking |
| Room Description | Guest Room | Meeting Room |

(57.200)

FRO Room

| XYZ Resort | | |
|---|---|---|
| B Square | | |
| New York City | | |
| | | FRO |
| Check-in | Thu, Dec 7 | Special Preferences |
| Check-out | Sun, Dec 10 | Smoking |
| Room Description | Guest Room | Meeting Room |

Fig. 58

FRO Reservations

| Alternate Room Option | Upgrade Room Option | Flexibility Reward Option |
| Know More...  Get ARO | Know More...  Get URO | Know More...  Get FRO |

Reservation Details

Original Reservation

XYZ International
abc downtown street
New York

| Check-in | Fri, Dec 8 | Special Preferences |
| Check-out | Mon, Dec 11 | Non-smoking |
| Room Description | Guest Room | Saturday Night Show |

Fig. 59

FRO Reservations

Your Reservation

Reservation Details

| Original Reservation | | | Enter Inputs to Search FRO Rooms | | |
|---|---|---|---|---|---|
| XYZ International | | | | Search by | Landmark |
| abc downtown street | | | | | |
| New York | | | City | New York | Landmark | T Square |
| | | | | | |
| Check -in | Fri, Dec 8 | Special Preferences | Check - in | 7 Dec | +/- days | +/- 0 day |
| Check -out | Mon, Dec 11 | Non-smoking | Check - out | 10 Dec | Room Type | Guest Room |
| Room Description | Guest Room | Saturday Night Show | | | | |

Search FRO Rooms

Fig. 60

FRO Reservations

Your Reservation

Reservation Details

Modify your FRO Search

XYZ International
abc downtown street
New York

| | | |
|---|---|---|
| Check -in | Fri, Dec 8 | Special Preferences |
| Check -out | Mon, Dec 11 | Non-smoking |
| Room Description | Guest Room | Saturday Night Show |

Search by: Landmark

| | | | | |
|---|---|---|---|---|
| City | New York | Landmark | T-Square | |
| Check - in | 7 Dec | +/- days | +/- 0 day | |
| Check - out | 10 Dec | Room Type | Guest Room | |

Search FRO Rooms

Select FRO Reservation

| FRO Rooms | | | FRO Instant Discount | FRO Notify Deadline / FRO Price | | | | |
|---|---|---|---|---|---|---|---|---|
| XYZ Royal Presidency<br>T Square<br>New York City<br><br>Check -In Date    Thu, Dec 7    Special Preferences<br>Check -out Date   Sun, Dec 10   Non-smoking<br>Room Description   Guest Room   Saturday Night Show | | | $ 3<br><br>Get It Now! | Dec 2<br>3:00 pm<br>$10<br>Select | Dec 5<br>4:00 pm<br>$15<br>Select | Dec 7<br>9:00 am<br>$25<br>Select | Dec 7<br>FRO<br>Room<br>Check-In | Dec 8<br>Original<br>Room<br>Check-In |
| XYZ Residence Inn<br>Near T Square<br>New York City<br><br>Check -In Date    Thu, Dec 7    Special Preferences<br>Check -out Date   Sun, Dec 10   Non-smoking<br>Room Description   Guest Room   Saturday Night Show | | | $ 5<br><br>Get It Now! | | | Dec 6<br>12:00 pm<br>$20<br>Select | Dec 7<br>FRO<br>Room<br>Check-In | Dec 8<br>Original<br>Room<br>Check-In |
| XYZ Luxury Villas<br>Opp. T Square<br>New York City<br><br>Check -In Date    Thu, Dec 7    Special Preferences<br>Check -out Date   Sun, Dec 10   Non-smoking<br>Room Description   Guest Room   Saturday Night Show | | | $ 6<br><br>Get It Now! | | Dec 3<br>4:00 pm<br>$10<br>Select | Dec 6<br>9:00 am<br>$15<br>Select | Dec 7<br>FRO<br>Room<br>Check-In | Dec 8<br>Original<br>Room<br>Check-In |

Fig. 61

FRO Reservations

FRO Reservation

Reservation Details

| | | | | |
|---|---|---|---|---|
| Original Reservation | XYZ International abc downtown street New York  Check -In Date  Thu, Dec 8  Special Preferences Check -out Date  Mon, Dec 11  Non-smoking Room Description  Guest Room  Saturday Night Show | | | |
| FRO Reservation | XYZ Royal Presidency T Square New York City  Check -In Date  Thu, Dec 7  Special Preferences Check -out Date  Sun, Dec 10  Non-smoking Room Description  Guest Room  Saturday Night Show | | | |

FRO Summary

Your FRO Instant Discount = $3

We may assign you any one of the two FRO Rooms. If we do so,
1) You will be notified before    4:00 Pm Tue, Dec 5
2) You will receive FRO Reward*   $15

( Add more FRO Rooms )

[ Edit FRO Discount / Deadline ]    ( Remove FRO Room )

Save and purchase

Fig. 73
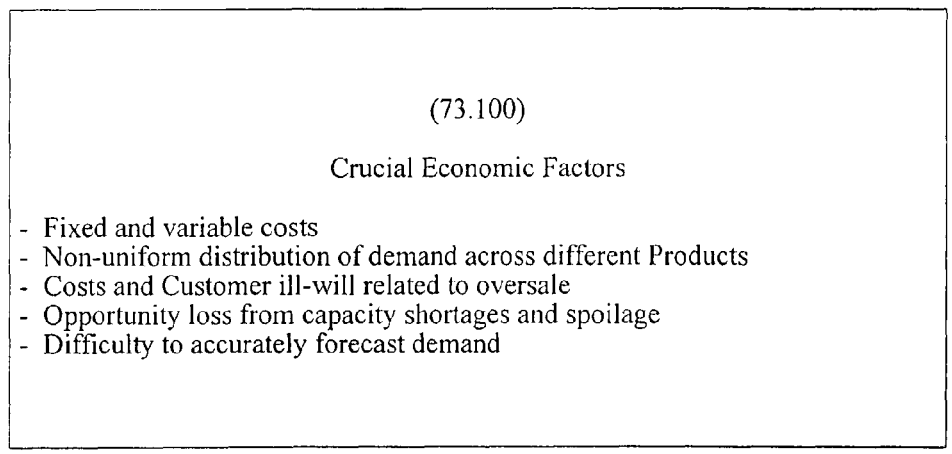
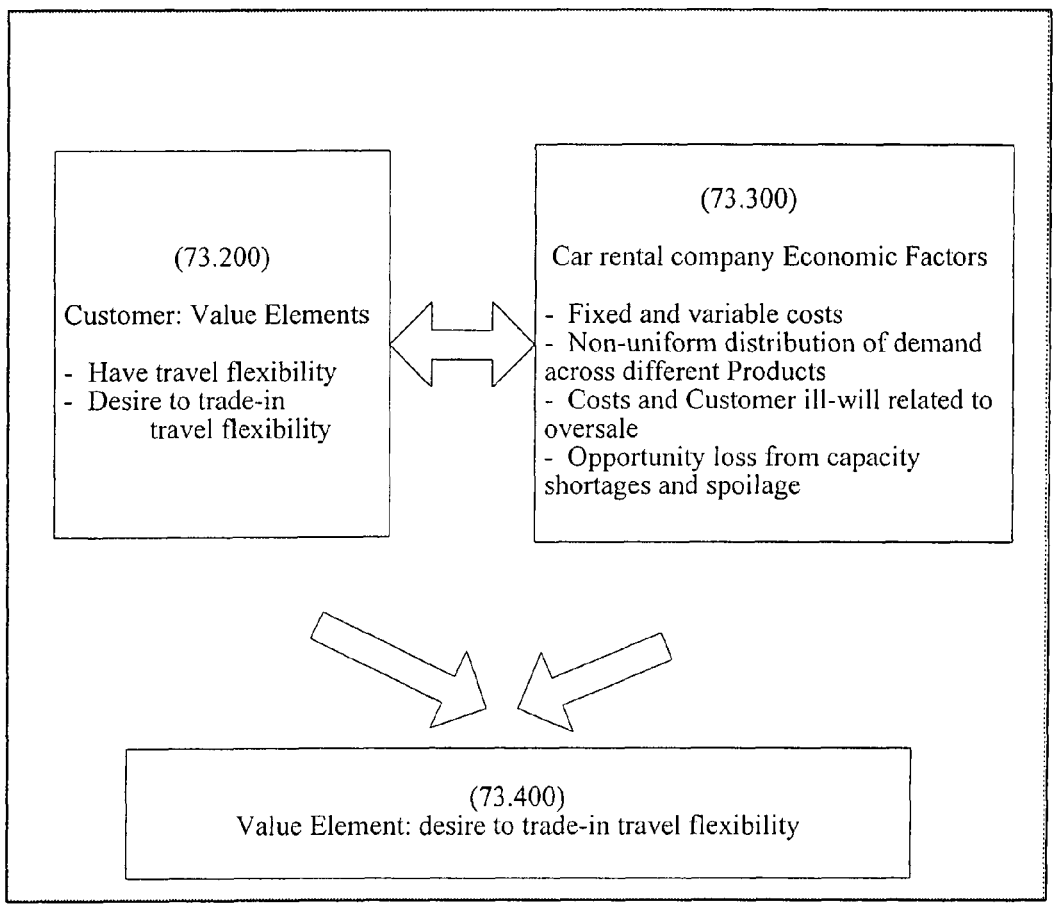

Fig. 75

(75.100)            Car        C1

| Car | Pick-up | Drop-off |
|---|---|---|
| XYZ Car Rental<br>Compact Car<br>Model: Alpha 123<br>Smoking<br>Child Seat | 6:00pm<br>Thu, Dec 7<br>T Square<br>New York | 6:00pm<br>Sun, Dec 10<br>T Square<br>New York |

(75.200)            Car        C2

| Car | Pick-up | Drop-off |
|---|---|---|
| XYZ Car Rental<br>Luxury Car<br>Model: Alpha123<br>Smoking<br>Child Seat | 8:00pm<br>Thu, Dec 7<br>T Square<br>New York | 8:00pm<br>Sun, Dec 10<br>T Square<br>New York |

(75.300)    (1)                    (2)

|     |                           |                    |
|-----|---------------------------|--------------------|
| (1) | Car Reservation Date Time | 17th Nov 5:24 pm  |
| (2) | FRO Purchase Date Time    | 17th Nov 5:27 pm  |
| (3) | Car Rental Price Paid     | $250               |
| (4) | Initial FRO Discount      | $5                 |

(75.400)
Default Car            C1

|     |                               |     | (2) | (3) | (4) | (5) |
|-----|-------------------------------|-----|-----|-----|-----|-----|
| (1) | Notify Deadline (DTP of C1)   |     | 15  | 7   | 3   | 1   |
| (2) | FRO Exercise discount as a    | C1  | $5  | $10 | $15 | $20 |
| (3) | function of Chosen Car        | C2  | $8  | $12 | $20 | $25 |

Fig. 77

Car Product (77.100)

Original Booking

| Car | Pick-up | Drop-off |
|---|---|---|
| XYZ Car Rental<br>Luxury Car<br>Model: Alpha123<br>Automatic Transmission<br>Child Seat<br>Smoking | 6:00pm<br>Thu, Dec 7<br>JFK Int'l Airport<br>New York | 6:00pm<br>Sun, Dec 10<br>JFK Int'l Airport<br>New York |

(77.200)

FRO Booking

| Car | Pick-up | Drop-off |
|---|---|---|
| XYZ Car Rental<br>Luxury Car<br>Model: Zeta 987<br>Automatic Transmission<br>Child Seat<br>Smoking | 6:00pm<br>Thu, Dec 7<br>JFK Int'l Airport<br>New York | 6:00pm<br>Sun, Dec 10<br>JFK Int'l Airport<br>New York |

Fig. 78

Car Set  (78.100)

Original Booking

| Car | Pick-up | Drop-off |
|---|---|---|
| XYZ Car Rental<br>Compact Car<br>Model: JB 007<br>Automatic Transmission<br>CD Player<br>No Smoking | 7:00pm<br>Thu, Dec 7<br>JFK Int'l Airport<br>New York | 6:00pm<br>Sun, Dec 10<br>JFK Int'l Airport<br>New York |

FRO Booking  (78.200)

| Car | Pick-up | Drop-off |
|---|---|---|
| XYZ Car Rental<br>Compact Car<br>Model: BJ 111<br>Manual Transmission<br>Cassette Player<br>No Smoking | 7:00pm<br>Thu, Dec 7<br>JFK Int'l Airport<br>New York | 6:00pm<br>Sun, Dec 10<br>JFK Int'l Airport<br>New York |

Fig. 90

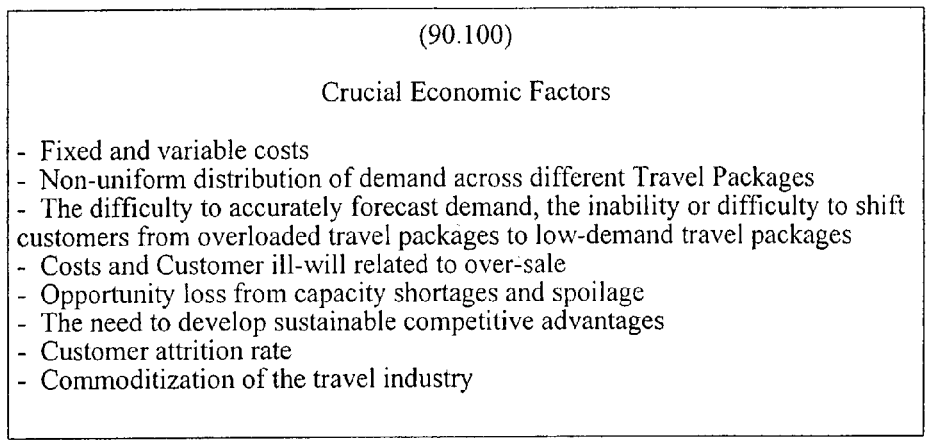

(90.100)

Crucial Economic Factors

- Fixed and variable costs
- Non-uniform distribution of demand across different Travel Packages
- The difficulty to accurately forecast demand, the inability or difficulty to shift customers from overloaded travel packages to low-demand travel packages
- Costs and Customer ill-will related to over-sale
- Opportunity loss from capacity shortages and spoilage
- The need to develop sustainable competitive advantages
- Customer attrition rate
- Commoditization of the travel industry

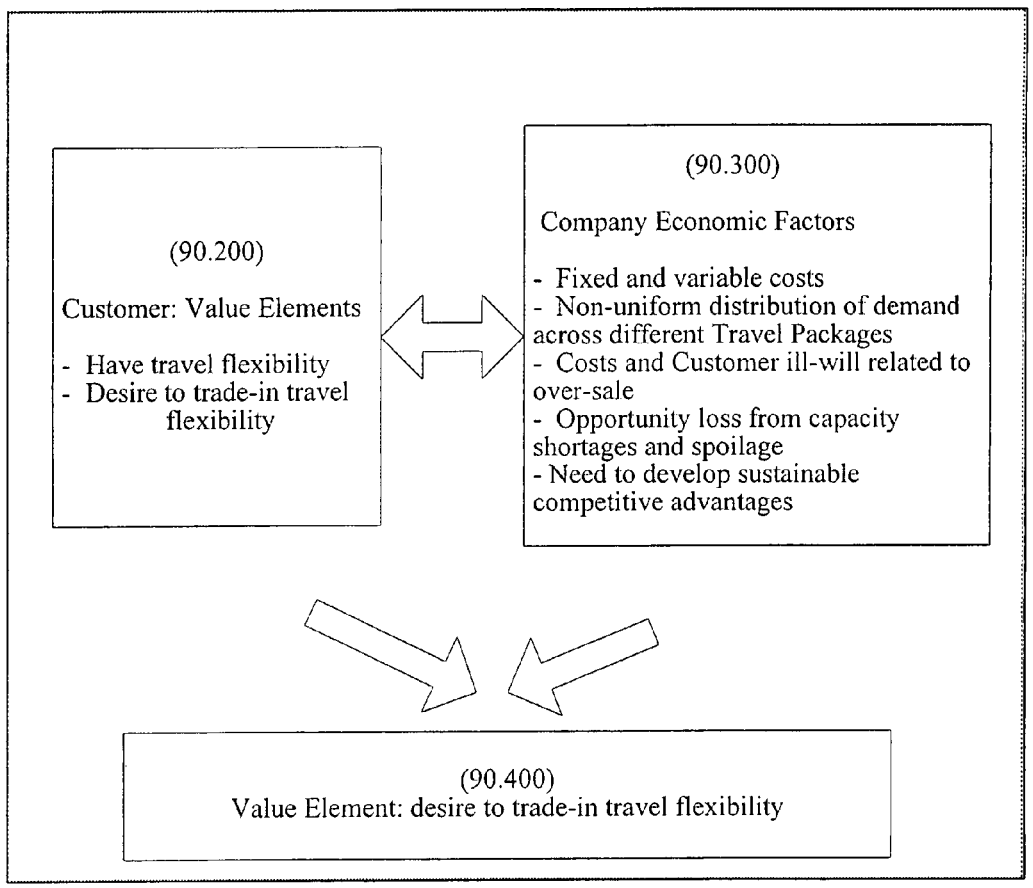

(90.200)

Customer: Value Elements

- Have travel flexibility
- Desire to trade-in travel flexibility (90.300)

Company Economic Factors

- Fixed and variable costs
- Non-uniform distribution of demand across different Travel Packages
- Costs and Customer ill-will related to over-sale
- Opportunity loss from capacity shortages and spoilage
- Need to develop sustainable competitive advantages (90.400)
Value Element: desire to trade-in travel flexibility

Fig. 92

(92.100)  Travel Package  T1

XYZ Tours
Amazing Australia!              Start Date   Jan 6
Experience the aboriginal culture   End Date     Jan 13
Cherish the reefs, fauna, rainforests   Tour Type:   Family
Savour the comsopolitan cities (92.200)  Travel Package  T2

XYZ Tours
Adventurous Australia!          Start Date   Jan 6
Bushwalking, Sea Kayaking       End Date     Jan 13
Mountain Biking, Caving         Tour Type:   Adventure
Night Safari, Parachuting (92.300)  (1)  (2)

| | (1) | (2) |
|---|---|---|
| (1) | Travel Package Purchase Date Time | 27th Nov 5:24 pm |
| (2) | FRO Initial Transaction Date Time | 27th Nov 5:27 pm |
| (3) | Travel Package Price Paid | $1,000 |
| (4) | Initial FRO Discount | $40 |

(92.400)
Default Travel Package  T1

| | | | (1) | (2) | (3) | (4) | (5) |
|---|---|---|---|---|---|---|---|
| (1) | Notify Deadline (DTS of T1) | | 30 | 7 | 3 | 1 | |
| (2) | FRO Exercise discount as a | T1 | $25 | $70 | $90 | $100 | |
| (3) | function of Chosen Travel | T2 | $40 | $65 | $100 | $125 | |

Fig. 94

Travel Package Product (94.100)

Original Travel Package

| | | |
|---|---|---|
| XYZ Tours | | |
| Amazing Australia! | | |
| Experience the aboriginal culture | Start Date | Jan 6 |
| Cherish the reefs, fauna, rainforests | End Date | Jan 13 |
| Savour the comsopolitan cities | Tour Type: | Family |

(94.200)

FRO Travel Package

| | | |
|---|---|---|
| XYZ Tours | | |
| Adventurous Australia! | | |
| Bushwalking, Sea Kayaking | Start Date | Jan 6 |
| Mountain Biking, Caving | End Date | Jan 13 |
| Night Safari, Parachuting | Tour Type: | Adventure |

Fig. 95

Travel Package Set (95.100)

Original Travel Package

| | | |
|---|---|---|
| XYZ Tours | | |
| Amazing Australia! | | |
| Experience the aboriginal culture | Start Date | Jan 6 |
| Cherish the reefs, fauna, rainforests | End Date | Jan 13 |
| Savour the comsopolitan cities | Tour Type: | Family |

(95.200)

FRO Travel Package

| | | |
|---|---|---|
| XYZ Tours | | |
| Adventurous Africa! | | |
| Rafting, Canoeing | Start Date | Jan 13 |
| Surfing, Sea Kayaking | End Date | Jan 27 |
| Caving, Rock Climbing | Tour Type: | Adventure |

COMPUTER IMPLEMENTED METHODS FOR PROVIDING OPTIONS ON PRODUCTS

CROSS-REFERENCE TO RELATED APPLICATIONS AND PRIORITY CLAIM

This application is a continuation-in-part, and claims the benefit under 35 USC 120, of U.S. patent application Ser. No. 11/506,451, filed Aug. 18, 2006, which is a continuation-in-part of Ser. No. 11/474,115, filed Jun. 23, 2006, which is a continuation-in-part of U.S. patent application Ser. No. 10/973,802, filed Oct. 25, 2004, all titled "System For Concurrent Optimization Of Business Economics And Customer Value Satisfaction," which are hereby incorporated by reference, and the latter of which, in turn, claims the benefit, under 35 USC 119(e) of prior provisional patent application Ser. No. 60/514,248, filed Oct. 24, 2003, titled "Real-Time Optimization Across Integrated Customer Preferences and Company Economics Through Formulation of Value Options That Maximize Value of Both Customer and Company" which is also incorporated by reference. This application is also a continuation-in-part and claims the benefit under 35 USC 120, of each of international applications PCT/US2007/014654 and PCT/US2007/014653, both filed Jun. 23, 2007 and incorporated by reference herein.

FIELD OF INVENTION

This invention relates to a system and method for matching customer preferences with vendor products and services, and then dynamically managing the on-demand and optimally customized delivery of such business services or products. More particularly, it relates to methods and systems for customizing and optimizing a company's products and services to individual customers in a way that concurrently enhances customer value and overall business performance.

BACKGROUND

Historically, "companies" (a term defined below) and their customers often have done business across a gap, so to speak. Product or service offerings by a company and the customers' desired product or service do not fully match. In part, this gap is a manifestation of the facts that (1) companies have an incomplete grasp of customer needs, their relative preferences and the pricing utilities customers attach to those preferences (which utilities, equating to the customer's willingness to pay, are dynamic) and (2) a company's costs, profits and inventory (which may control what it can offer on a timely basis) are also dynamic. However, it is also in major part a manifestation of the lack of information technology tools, which can close the gap. To collect dynamic customer and company data and then employ those dynamic data to close the gap is a complex technical problem.

Generally, the customer is treated as an individual and sales terms are customized only when the cost of negotiation is justified—for very large transactions. Many products and services, though, represent complex, multi-faceted offerings and customers weigh their preferences for product features differently at different times. A customer might care more about cost one day and more about availability or delivery time or warranty if queried a few days or weeks later, to use some basic trade-offs as examples. Generally, a company's product comprises many value elements, (explained later) all of which are bundled together to be sold as a single product. But, not every customer values all the aspects of a product equally or needs all. Every customer places a different value (which may be a function of time and situation) on each aspect of a product. With features bundled together in a product, companies end up either incurring costs to sell something to a customer that he does want or lose a customer because the extra undesired value elements forced the product price too high for the customer.

The underlying problem is both that customer demands are incompletely understood and that such demands can change quickly, whereas a company's productive capacity or service often does not have the same dynamic time frame and is supported by a relatively fixed (in the short term) capacity and supply chain.

A company typically uses demand forecasts to build product quantities to match demand. However, companies' forecasts often prove imperfect, leading to shortage or excess supply in one or more product types. If a product has been sold to a customer, the sold quantity of product, generally, cannot be resold to another potential customer. However, it is possible that is another potential customer who may offer a higher value for a product that has been sold. Such situations may lead to potential opportunity loss for the company, especially, if the potential customer spills over (i.e., leaves the company and goes elsewhere, such as to a competitor). In some situations, such spilled customers may be high paying customers, thus, leading to a "high value spill". The situation becomes worse when the former customer returns the purchased product. The company may, thus, be left with the unsold (returned) product and loses an opportunity to sell. To overcome such situations, companies in some industries like airlines, hotels, car rental and so forth, oversell their products (i.e., sell more than the supply).

Consider the airline industry, where overbooking (or overselling) is very commonly practiced by several airlines across the world. To hedge against last minute cancellations and no-shows (collectively referred to as CNS) and to save high revenue spill, airlines overbook their flights (i.e., sell more tickets than the flight capacity). A no-show customer is defined as a customer with a confirmed ticket who does not turn up for a flight. As described above, the term "High revenue spill" refers to potential revenue loss from potential high revenue paying customers who want to buy a ticket on a flight, but, may spill over to a competitor if the desired flight is not available. The airlines usually try to sell tickets (often, at high prices), even after reaching flight capacity, to not let go of any such potential high revenue paying customers. If the number of people who turn up for the flight is more than the flight capacity (i.e., a situation termed "oversale"), the airlines try to bump customers (i.e., shift customers out of their currently booked flight) voluntarily and/or involuntarily. Airlines use various incentives to bump customers, such as travel vouchers, upgrades, various coupons and likewise. Consider an example. A flight has capacity of 100 seats, however, an airline overbooked 110 customers on that flight, since they expected CNS to be 10. Since, it is difficult to estimate CNS accurately, often, airlines face an oversale situation, i.e., more (>100) customers turn up for the flight, or a "spoilage" situation (i.e., fewer than 100 customers turn up). An oversale situation results in costs and customer ill-will that may increase exponentially with the increase in the number of bumped customers. A spoilage situation may reflect on loss of potential revenue from spill.

On the other side of the screen, there is a significant portion of customers who are price sensitive, and might be willing to shift from their booked flights to other flights in return for desired incentives. For instance, in the airline industry, the customers usually buy tickets one to four weeks in advance (of the premeditated travel date) to get the low fares since the fares, normally increase as the departure date of the flight approaches. They can shift/move their choice of utilizing a product to a reasonable extent if they are rewarded. In this way, those customers may trade-in their flexibility in product utility.

From the above discussion, it is clear that flexibility of customers may be mapped or utilized to satisfy the fixed (or less flexible) demand of other customers. In the context of the airline industry, the flexibility from some customers may be mapped or utilized to satisfy fixed (or less flexible) demand of other customers. But so far, there is no existing system and method, which can allow a company to accomplish this optimally.

Today, airlines do not have any mechanism to allow such flexibility or changes in customer tickets at an individual level at conditions that would optimally satisfy both the parties. Instead, airlines try to deal with all such customers in a rather fixed way (or one bumping/overbooking policy) leading to customer ill-will, high oversale costs and opportunity costs from potential revenue spill (and unsatisfied customer demand). Besides the airline industry, there are several other industries (as mentioned above) that either do not allow flexibility or follow processes that involve high costs and/or demand significant efforts on the customer's end.

What is needed is a mechanism that allows a company to map varying product flexibility across different customers in way that concurrently optimizes value for the company and customers. Indeed, there is no system or method available that can be applied to all the above industries, and many more, and help companies to match the availability of their products to their customers' preferences, let alone while concurrently maximizing the benefits to both the company and its customers.

A technology platform (i.e., system) and methodology thus are needed for customizing, in an optimal way, a match between customers' desire to trade-in flexibility and the company value. In the context of airline industry example, a technology platform (i.e., system) and methodology thus are needed for customizing, in an optimal way, a match between customers' desires to trade-in their travel flexibility and airline's value.

More particularly, a system and methodology are needed which support optimal customization of service offerings in the airline and other industries. If such a match could be made, both company and customer would benefit. The customer would be more satisfied and the company (both in short term and long term) will be more profitable. A win-win scenario is created rather than a zero sum game.

SUMMARY

In response to recognition of this need, shown herein is a system and method that allows businesses to determine their customers' preferences (implicitly or explicitly, in advance or in quasi-real-time) and to dynamically integrate these preferences with internal company economics to concurrently maximize value for both customers (i.e., their purchase utilities) and the company (i.e., its profitability).

A framework of systems and methods are shown that allows businesses to determine their customers' preferences (implicitly or explicitly, in advance or in quasi-real-time) for flexibility in purchasing products and to dynamically integrate these preferences with internal company operations to concurrently maximize value for both customers (individually or as a group, their purchase utilities) and the company (i.e., its profitability).

In general, it is an aspect of the system and method that a business determines a customer's preferences (flexibilities and associated relative utilities) in great detail and in real-time or quasi-real-time from direct inquiries (explicitly) and/or past interaction (implicitly), before or while engaging in a sales transaction. When a sales transaction is formed, those preferences are then integrated with internal company operations and economics (costs, capacities, constraints, inventories, etc.). Values are then determined for product or service options to be offered to the customer based on integrated (i.e., aggregated) customer preferences and company economics. On one hand, these value options allow companies to reward or charge customers for their flexibilities with respect to preferences. On the other hand, these value options enable companies to maximize their revenues and/or profitability by unbundling their products and services, and best matching the offerings with a customer's expressed preference/cost tradeoffs. Since the customer gets something matching more closely his or her preferences than a "one size fits all" or small, fixed choice approach, customer purchase utility is increased and the customer is pleased to receive a product or service tailored to the customer's preferences. A company may charge for the purchase of some product options. So, customers pay for options made available to them and the company does not have to invest in offering everyone features that only a minority of customers want.

Accordingly, there is shown a system and method for collecting such customer preference information and pricing corresponding options and presenting options to the customer, receiving customer choices, and completing a sale. The collection steps may be implemented over the global Internet and its World Wide Web. However, other communication media may be used, as well, for all or part of the system or steps. For example, customer information may be taken over the phone or in person or via any other means. And a sale can similarly be completed by telephone or in person.

The system and method may also provide after-sale follow-up and implement execution of option terms purchased by the customer. An engine may be provided for this purpose. The engine may be a processor(s) that is programmed to execute a suitable event response algorithm. Each procedure for event response (related to a purchased option) may be custom programmed to implement the desired operations of the company or there may be provided a library of procedures generally applicable to an industry. The library procedures may be used by the company with or without customization. The detection of the contingency triggering the procedure may in some instances be made automatic, as by interconnection with the company's information management systems, or it may be externally or manually supplied.

The FRO VOF can concurrently create benefits for at least two of the company, the customers and any other entity involved or any combination thereof. One aspect of the invention comprises a computer-implemented system and method for a company to provide options on products where in a computer-implemented service is operated that provides a data store containing data representing, with respect to at least one product, at least one option offered by a company and operating a computer-implemented system that delivers to a customer an option to utilize up to n of m selected products, where n is less than m. Information pertaining to said option is recorded in a data store. In addition, a system, and method performed, is operated to define each of the n Chosen Products, whereby after each of the n Chosen Products is defined, the customer can utilize said Chosen Product. The information pertaining to said defined products is recorded in a data store. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of invention relates to a system and method for implementation of FRO VOF in conjunction with other VOFs. The grouping may enhance customers' experience, and may comprise of operating a system that delivers a first option to at least a "first customer" to utilize up to n of m selected products for said first customer, where n is less than or equal to m; operating a system that delivers a second option to at least a "second customer" to utilize up to k of p selected products, where k is less than or equal to p; recording the information pertaining to said options in a data store; operating a system to define each of the k Chosen Products, whereby after each of the k Chosen Products is defined, said "second customer" can utilize said Chosen Product; operating a system wherein a company defines t Chosen Product(s) for said "first customer" after each of said k Chosen Products is defined, wherein after each of said t products is defined, said first customer can utilize said defined product, where t is less than or equal to n and recording the information pertaining to said defined products in a data store. The system may contain one or more data processors and these data processors may or may not be the same. In one implementation of the invention said company may include more than one entity. It is another aspect of the invention that the company may not be the seller of any of said products. In another implementation, the company may not be the seller of any of said options. In yet another implementation, the company may offer at least one of said options. In above invention, the company may operate at least one of said systems. However, it is possible that at least one entity other than said company operates at least one of said systems. The systems for first and second options may operate independently. The systems for first and second options may also operate in conjunction with each other. The above mentioned acts may be performed for a multiplicity of at least one of said first or second customers and further includes combining together at least one of each of said first and second customers to formulate at least one group with at least one complementary set of options. After delivery of any of said first or second options, at least one of said m or p products may be available for use by the company. At least one of said m or p products may also be available for use by an entity other than said company. The company or an entity other than said company may define, at one or more times, at least one of said k Chosen Products. The second customer may also define, at one or more times, at least one of said k Chosen Products. The company or an entity other than said company may select, at one or more times, at least one of said m or p products. However, the first customer may select, one or more times, at least one of said m products and/or the second customer may select, one or more times, at least one of said p products. At least one of the company or an entity other than said company delivers to at least one of said first or second customers, at one or more times, one or more terms and conditions associated with the first or second options, respectively. It is also possible that the company may receive from at least one of the first or second customers, at one or more times, an indication of one or more terms and conditions associated with said first or second options, respectively. In another implementation, said first or second customers may be same. In yet another implementation, none of the options may include a notification deadline condition. However, in another implementation, at least one of said options may include at least one notification deadline condition. The notification deadline condition may be different for said first and second options. The company may allocate at least one product to at least one entity other than said company, and said entity delivers at least one of said first or second options on at least one of said allocated products. It is another aspect of the invention that at least one of said n or k Chosen Products may include at least one product other than said m or p products, respectively. No payment transaction may be executed between the company and any of said first or second customer in connection with the option and the selected products. In another implementation of the invention, however, at least one payment transaction may be executed between the company and at least one of said first or second customer and said payment transaction may include a soft value. In some implementations of the invention, at least one of said m or k products may be released for reuse by the company. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method for a company to define customer preferences whereby a data store is provided including relevant information regarding products; operating a computer-implemented system that defines customer preferences regarding at least utilizing up to n of m selected products, where n is less than m and recording the information pertaining to said preferences in a data store. The system may contain one or more data processors and these data processors may or may not be the same. A computer-implemented system is operated that enables use of said preferences to concurrently optimize value for customers and a company. The preferences may be utilized in delivering at least one option to a customer to utilize up to n of m selected products, where n is less than m and operating a system to define each of said n Chosen Products, whereby after each of said n Chosen Products is defined by the company, the customer can utilize said Chosen Product and recording the information pertaining to at least one of said option or said defined products in a data store. The preferences may be defined implicitly. The preferences may be also be defined explicitly by either of the customer or the company or both. The preferences may be taken at any time during the purchase of the product, prior to and/or after the product has been purchased. The optimization of value may be for at least one customer other than the customers whose preferences are received. The concurrent optimization may include optimization of value for at least two of the customers, a company providing said options and at least one entity other than the company providing said options. Said preferences may include one or more preferences. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In yet another aspect of the invention, a computer-implemented system and method for a company to provide options on products wherein a computer-implemented service allows a customer to receive an option to utilize each of the m selected products including at least one practically constrained product, where m is greater than or equal to 2, said m products are selected in the course of related transaction(s); it will not be possible for the customer to utilize all said m products due to said practical constraints and recording the information pertaining to said option in a data store, is dealt with. The practical constraints may include the timing constraints and/or the location constraints. The system may contain one or more data processors and these data processors may or may not be the same. The related transaction may be at least one transaction. Said related transaction may also include a monetary value. The customer may not be able to utilize at least one product due to practical constraints. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises of a computer-implemented system and method for a company to provide options on products wherein a computer-implemented service allows a customer to receive an option to utilize up to n of m selected products, where is greater than or equal to 2 and n is less than m and recording the information pertaining to said option in a data store; operating a system, whereby the company may allow the customer to utilize all the m products provided specified conditions are satisfied, said conditions including that the products are received in the course of related transaction(s) and there is at least one payment transaction between the company and the customer related to said products wherein such payment is made after said option has been granted. The information is recorded pertaining to said m products in a data store. The system may contain one or more data processors and these data processors may or may not be the same. The customer may select said m products together. The customer may also select the products prior to utilizing the penultimate product. The company may reserve the right to limit the customer to n products on a stated notification date. The customer may select said m products together. The payment transaction may comprise one or more transactions apart from the initial interaction if said customer utilizes all the awarded products. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

One more aspect of the invention comprises a computer-implemented system and method for a company to provide options on products wherein a computer-implemented service allows a customer to receive an option to utilize up to n of m selected products, provided specified conditions are satisfied, said conditions including that the company may notify the customer, on a stated notification date, that the customer is limited to utilize n out of said m products, wherein n is less than m and recording the information pertaining to said option in a data store; operating a system to define each of said n products, whereby after each of said n products is defined, the customer has the right to utilize said defined product. The information is recorded pertaining to said defined products in a data store. The system may contain one or more data processors and these data processors may or may not be the same. The company may allow the customer to define said n products on or before a stated date. The company may also reserve the right to take back any m minus n products after the stated date. The company may also limit the customer to n products once the customer expresses his/her preference for said n products. Said on a stated notification date includes on and before the stated notification date. However, said on a stated notification date may also include on and after the stated notification date. The company may or may not limit the customer to said n products on the notification date. In case the company limits the customer, said limitation is on at least one product. However, in some other implementations, the company and/or an entity other than the company may not limit the customer to said n products on the notification date. There may be at least one notification date and the customer and/or the company may determine said notification date. The company may notify the customer on or before a notification date. However, the company may also notify the customer after a notification date. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises of a computer-implemented system and method for a company to provide options on products where in providing a data structure in a data store wherein are stored for a customer who may be shifted to one or more products, data including a value that may be realized if the customer is shifted; a data processor may be receives and processes said data to determine from among all or substantially all possible combinations of customers, a set of customers which may be shifted; operating a system to shift at least one set of customers and information pertaining to said shifting of customers may be recorded in a data store. The system may contain one or more data processors and these data processors may or may not be the same. In one of implementations, at least one of the set of customers which is shifted is from the combination of customers determined by said system. However, in different implementations, at least one of the set of customers which is shifted is other than the combination of customers determined by said system. On detecting the occurrence of at least one event, executing at least one event response algorithm which may determine a set of customers possessing options making them eligible to be shifted to one or more products and may shift at least one of said set of customers to create product availability. Said event may be an increase in the demand of at least one product. Said event may also be an increase in the forecasted demand of at least one product. Said set of customers may include at least one customer. Said shifting of at least one customer may involve shifting of more than one customer. However, in different implementations, it may include more than one customer. Said shifting may involve shifting at least a first customer to at least one of the first products after at least a second customer from at least one of the first products is shifted to at least one of the second product and such cascading process may continue until the last customer in the set is shifted. At least two customers may be involved in said cascading process. Shifting the customers may involve one or more interactions between the company providing said options and said group of customers. The shifting may also involve one or more interactions between an entity other than the company providing said options and said group of customers. The shifting may be done at the instance of at least the company providing said options. However, in different implementations, the shifting may be done at the instance of at least an entity other than the company providing said options. The customers may be shifted to one or more products belonging to the company providing said options. However, in different implementations of the FRO VOF, the customers may be shifted to one or more products belonging to an entity other than the company providing said options. The shifting may include notifying the customer about shifting within the specified notification period. The value may include cost savings for the company providing said options and/or for an entity other than the company providing said options or any combination thereof. The value may also include a soft value. The decision to shift one or more set of customers may be taken to optimize value for at least one of the customer, the company providing said options and/or an entity other than the company providing said options. Said value may be a cost to the company providing said options. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In the above mentioned different aspects of the invention and in other aspects of the invention not mentioned above, company may be a seller of at least said product. In another implementation of the FRO VOF, the company may not be a seller of said product. The system may contain one or more data processors and these data processors may or may not be the same. Delivering said option may occur in relation to a customer purchasing at least one product. In another aspect of the invention, the product purchase may be for a product other than a product for which an option is delivered. Said delivery of option may be an electronic delivery of option. Delivering a said option may occur in relation to a customer purchasing at least one product other than the product for which an option is delivered. After delivery of said option, at least one of said m products may be available for use by the company. At least one of said m products may be available for use by an entity other than said company. Said m products may be selected in at least one transaction. The company may include more than one entity. The company may select at least one of said m products for the customer. In another aspect of the invention, at least one of said m products may be from more than one company. The n products (mentioned above) may be defined in at least one transaction and said n products may be defined after the option is delivered to the customer. The n Chosen Products may include at least one product other than said m products. Said m and/or n products may be redefined by the company, the customer, an entity other than the company and/or any combination thereof. Similarly, value of m and/or n may be redefined by the company, the customer, an entity other than the company and/or any combination thereof. In another implementation of the invention, at least one of said m products is released for reuse by the company. The Released Product may be utilized to generate revenue or other value without reusing said Released Product.

It is another aspect of the invention that in the system and method of this invention, at least one of the company or an entity other than said company may deliver to the customer, at one or more times, one or more terms and conditions associated with the option. Another aspect of the invention may include that the company may receive from the customer, at one or more times, an indication of one or more terms and conditions associated with the option. The company may define, at one or more times, one or more of the n Chosen Products. The customer may also define, at one or more times, one or more of the n Chosen Products. The company may identify to the customer at least one eligible product for the option and allows the customer to select at least one of said m products from the eligible products.

In some implementations, there may be no payment transaction executed between the company and the customer in connection with the option and the selected products. However, in another implementation, at least one payment transaction may be executed between the company and the customer and said payment transaction may include a soft value. In some other implementations, the option may not include a notification deadline condition. However, in some other implementations of the FRO VOF, the option may include at least one notification deadline condition. If the customer, company, an entity other than the company and/or any combination thereof fails to satisfy a stated notification deadline condition, at least one of said m products may be defined as the Chosen Product. The customer may receive the option included in the Product Price that does not separately identify a price for the inclusion of said option within the total Product Price.

It is another aspect of the invention that in the system and method of this invention, the company may allocate at least one product to at least one entity other than said company, and said entity delivers said option on at least one of said allocated products. In another case, the company may have allocated one or more products to another entity apart from said company, said entity may sell back at least one allocated product to said company or to at least one entity other than the company or both. The entity other than said company may deliver the option on at least one of said allocated products. The allocation of products may include at least one condition requiring return of one or more products.

In one or more implementations of the FRO VOF, the above said systems may be same and at least one company may operate at least one of said systems. The customer may interact with the service via at least one web site and/or the customer may interact with the system assisted by at least one operator. The customer may also interact with another entity operating the system other than the company. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

FRO VOF may be implemented in any industry, for example, let us consider the airline industry. One of the implementations of the invention in the airline industry comprises a computer-implemented system and method for an airline to provide options on flights where in a computer-implemented service is operated that provides a data store containing data representing, with respect to at least one flight, at least one option offered by an airline and operating a computer-implemented system that delivers to a customer an option to utilize up to n of m selected flights, where n is less than m. Information is recorded in a data store, pertaining to said option. In addition, a system is operated to define each of the n Chosen Flights, whereby after each of the n Chosen Flights is defined, the customer can utilize said Chosen Flight. The information pertaining to said defined flights is recorded in a data store. The system may contain one or more data processors and these data processors may or may not be the same. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying put a method which also constitutes a corresponding aspect of the invention.

Another example of implementation of FRO VOF in the airline industry, this system and method may comprise of operating a system that delivers a first option to at least a "first customer" to utilize up to n of m selected flights for said first customer, where n is less than or equal to m; operating a system that delivers a second option to at least a "second customer" to utilize up to k of p selected flights, where k is less than or equal to p; recording the information pertaining to said options in a data store; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can utilize said defined flight, where t is less than or equal to n and recording the information pertaining to said defined flights in a data store. The system may contain one or more data processors and these data processors may or may not be the same. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In all the cases and aspects of the invention mentioned herein, the company may be, for example, an airline, a hotel, a car rental company, travel company and the product may, for example, correspond to a flight, a room, a Car and a Travel Package, respectively. The FRO VOF may be implemented in any industry including, but not limited to, the airline, hotel, car rental, travel, media entertainment, cruise, real estate, financial services, automobile sales, computer and other retail sales. Another aspect of the invention is that one or more aspects or elements or examples mentioned herein of the invention may be combined in one or more ways to utilize the invention.

Also shown are a number of novel systems generated by the disclosed methodology, and related algorithms which may be implemented on the disclosed platform or any other suitable platform, thus constituting new methods and systems. Only a few value option frameworks (VOFs) and their associated methods and systems for delivery of these VOFs are presented in detail, as those skilled in the art will readily appreciate how to implement other VOFs from these teachings. Other features and advantages of the invention will be apparent from the following description and the appended claims, and those skilled in the art will appreciate that the various elements and limitations shown herein may be combined in ways other than those shown in the specifically illustrated examples, which are not intended to be limiting. The disclosure is intended to convey that the inventors contemplate and intend to protect these various combinations and permutations of the elements which are shown, as though each of the arrangements of elements were specifically depicted.

BRIEF DESCRIPTION OF THE DRAWING

FIG. 13B is a diagrammatic illustration of one of ways of interaction between the customer and the OA and/or the company;

FIG. 15 is a diagrammatic illustration of company economic factors and mapping between customer dynamics and company economic factors in relation to FRO VOF;

FIG. 17 is a diagrammatic representation of FRO Flights and Initial Transaction associated with an example of FRO (2, 1) instance;

FIG. 30 is a diagrammatic illustration of airline economic factors and mapping between customer dynamics and airline economic factors in relation to FRO VOF;

FIG. 32 is a diagrammatic representation of FRO Flights and Initial Transaction associated with an example of FRO (2, 1) instance in an airline industry;

FIG. 34 is a diagrammatic representation of FRO implementation in an airline industry at the Itinerary Level;

FIG. 35 is a diagrammatic representation of FRO implementation in an airline industry at the Segment Level;

FIG. 36 is a diagrammatic representation of FRO implementation in an airline industry at the Leg level;

FIGS. 37, 38, 39 and 40 are simulated screen shots of web screens illustrating how the Initial Transaction for FRO may take place between an airline and a customer;

FIG. 52 is a diagrammatic illustration of hotel economic factors and mapping between customer dynamics and hotel economic factors in relation to FRO VOF;

FIG. 54 is a diagrammatic representation of FRO Rooms and Initial Transaction associated with an example of FRO (2, 1) instance in the hotel industry;

FIG. 56 is a diagrammatic representation of FRO implementation in the hotel industry at the Room Product Level;

FIG. 57 is a diagrammatic representation of FRO implementation in the hotel industry at the Room Set level;

FIGS. 58, 59, 60 and 61 are simulated screen shots of web screens illustrating how the Initial Transaction for FRO may take place between a hotel and a customer;

FIG. 73 is a diagrammatic illustration of car rental company economic factors and mapping between customer dynamics and car rental company economic factors in relation to FRO VOF;

FIG. 75 is a diagrammatic representation of FRO Cars and Initial Transaction associated with an example of FRO (2, 1) instance in the car rental industry;

FIG. 77 is a diagrammatic representation of FRO implementation in the car rental industry at the Car Product Level;

FIG. 78 is a diagrammatic representation of FRO implementation in the car rental industry at the Car Set Level;

FIG. 90 is a diagrammatic illustration of travel company economic factors and mapping between customer dynamics and travel company economic factors in relation to FRO VOF;

FIG. 92 is a diagrammatic representation of FRO Travel Packages and Initial Transaction associated with an example of FRO (2, 1) instance in the travel industry;

FIG. 94 is a diagrammatic representation of FRO implementation in a travel industry at the Travel Package Product Level;

FIG. 95 is a diagrammatic representation of FRO implementation in a travel industry at the Travel Package Set Level;

DETAILED DESCRIPTION

Figure 1:
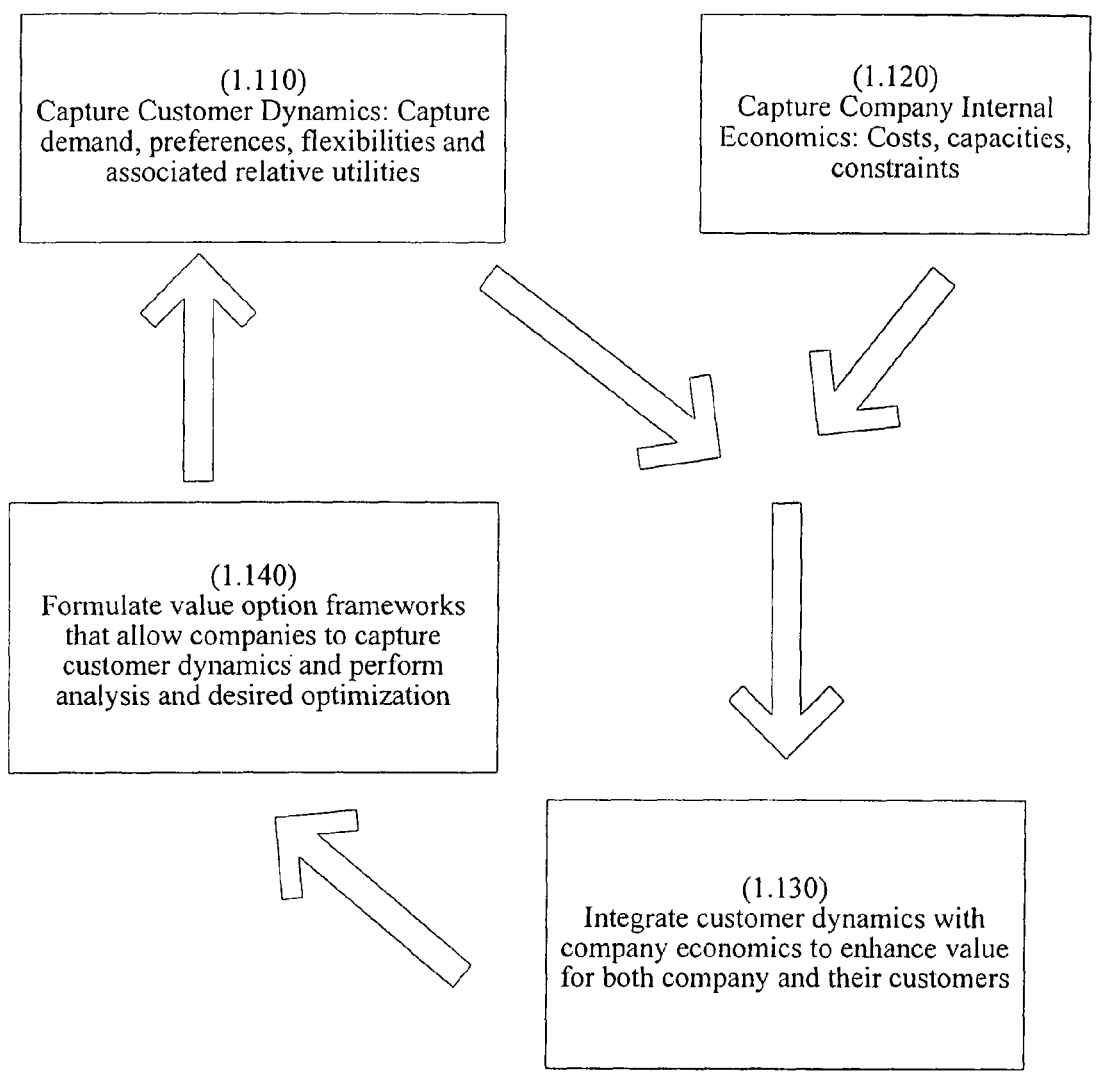
FIG. 1 is a diagrammatic illustration, in a high-level flow chart, of a method of achieving the optionally customized sale of goods or services as taught herein.

Selected illustrative embodiments according to the invention will now be described in detail, as the inventive concepts are further amplified and explicated. These embodiments are presented by way of example only. In the following description, numerous specific details are set forth in order to provide enough context to convey a thorough understanding of the invention and of these embodiments. It will be apparent, however, to one skilled in the art, that the invention may be practiced without some or all of these specific details. In other instances, well-known features and/or process steps have not been described in detail in order to not unnecessarily obscure the invention. One should not confuse the invention with the examples used to illustrate and explain the invention. The features and advantages of the invention may be better understood with reference to the drawings and discussions that follow.

The terms and definitions given below are needed to understand the following sections. Some of the key terms used in the description have been put in italics to enhance the readability.

The method and system taught herein connect customers directly to a manufacturer or service provider and the rest of the supply chain, herein referred to as "channel partners." The term "manufacturer" is intended to include vendors of services as well as vendor of goods. Hereafter, the manufacturer and channel partners will be collectively referred to as a "company" or "companies" and all of those terms will be appreciated to include sole proprietorships, partnerships, corporations, option aggregators or any other legal entity or combination thereof. The term "entity" includes the singular and plural and will include individual(s), group of individuals, company, companies, sole proprietorships, partnerships, corporations or any other legal entity or combination or consortium thereof.

The term "Option Aggregator" or "Option Aggregators" or "OA" may include, but is not limited to, a company, a group and/or consortium of companies, more than one entity, any entity formed by company(s) (whether or not solely for this purpose), any other entity or any combination thereof that offers options on its own products and/or other company products.

The term "airline" or "airlines" includes, but is not limited to, an airline, an airline's business partner, an entity which deals with an airline or an airline's business partner, a travel agent, an Option Aggregator and any entity forming a part of the chain of commerce related to airline and/or travel industry, or any combination of any two or more of the above.

The term "hotel" or "hotels" includes, but is not limited to, hotel, apartment hotel, bed and breakfast, capsule hotel, caravanserai, casa particular, flophouse, choultry, garden hotels, condo-hotel, holiday cottage, hostel, ice hotel, trailer home, roadhouse, ryokan, turbaza, boarding house, bungalow, condominium, dharamshalas, dormitory, inn, resorts, a group or chain of hotels, a hotel's business partner, an entity which deals with a hotel or a hotel's business partner, a travel agent, an Option Aggregator, any entity forming a part of the chain of commerce related to hotel and/or travel industry, or any combination of any two or more of the above. A hotel may be referred to as an entity that provides space for hire.

The term "car rental company" or "car rental companies" includes, but is not limited to, a car rental company, a group of car rental companies, a car rental company's business partner, an entity which deals with a car rental company or a car rental company's business partner, a travel agent, an Option Aggregator, any entity forming a part of the chain of commerce related to car rental industry and/or travel industry, or any combination of any two or more of the above.

The term "travel company" or "travel companies" includes, but is not limited to, any entity forming a part of the chain of commerce related to the travel industry, a company, a group of companies, a travel company's business partner, an entity which deals with a travel company or a travel company's business partner, a travel agent, an Option Aggregator, or any combination of any two or more of the above.

The term "Product" refers to a product or service provided by a manufacturer or an entity. The term "Products" or "Product" may also refer to "Product Set" or "Product Sets" or "Product Order" or "Product Orders" or any combination thereof, as and when the context requires and are used interchangeably. The term "customer" here implies an entity buying or entering into a contract to buy a company's product or service. The term "optimize" is not intended to require achievement of a mathematical minimum or maximum, but to refer to improvement and/or enhancement.

The term "flight" refers to a single flight, a group of flights, flights with zero or more stops or any combination of the above. The term "Flights" or "Flight" may also sometime refer to one or more seats on said flight(s), when the context requires. The terms "flight" and "seat" are interchangeable as the context requires. The term "Flight" or "Flights" may also refer to a Flight Leg, a Flight Segment, an Itinerary, any combination of two or more flights or any combination of the above, when the context requires.

The term "Room" or "Rooms" in context of the hotel industry refers to a single room, a room with zero or more facilities and/or services, only facilities or services offered by the hotel. A room may be referred to as a given space for a given duration of time and for a given set of one or more associated services or characteristics or any combination thereof. In the context of the hotel industry, the term "Room" and "seat" are interchangeable, as and when the context requires. For example, one may refer to a reserved seat for a show in a hotel as a reserved room.

The term "Car" or "Cars" refers to any means of transportation including, but not limited to, cars, vans, mini-vans, buses, trucks, trailers, pick-up trucks, scooters, motor cycles, bikes, trains, trams, boats, ships, steamers, jets, helicopters and so on, any variation or model of said means of transportation and/or services, equipments associated with it or any combination(s) thereof, for a given time unit.

The term "Travel Package" or "Travel Packages" or "Package" or "Packages" refers to combination of one or more services related to travel including, but not limited to, transportation, accommodation, various facilities and so forth. Transportation may include, but is not limited to, travel by flight, train, bus, car, cruise, boat, steamer and so forth. "Accommodation" may include, but is not limited to, stay in hotel or any location and services associated with it. Said "various facilities" may include, but are not limited to, sight seeing, city tours, river-rafting, mountaineering, para-gliding, food and so forth.

The term "Itinerary" refers to a list of flights included in a single travel trip of a customer. An Itinerary may comprise one or more "Segments" (defined below). An Itinerary can be a one-way trip (one Segment), a round-trip (two Segments) or a multi-city trip (two or more Segments). A round-trip Itinerary has two Segments back and forth between two places (e.g., a trip from A to B and then back from B to A). A One-Way Itinerary has only one Segment (such as travel from A to B). A Multi-City Itinerary refers to an Itinerary with two or more Segments across two or more places (e.g., a trip from A to B and then from B to C).

The term "Flight Segment" (or "Segment", in short) refers to a part of an Itinerary between a customer's intended origin and destination. A Segment may comprise one or more "Flight Legs". The term "Flight Leg" (or "Leg", in short) is the most fundamental unit of an Itinerary and is defined by a single takeoff and landing of a flight. In a round-trip Itinerary (A to B and B to A), there may be 2 Flight Legs from A to B (customer flies from A to C and then C to B, two connecting flights), and similarly two Flight Legs from B to A (customer flies from B to D and then D to A, two connecting flights). When a customer flies from A to B and the plane takes a stop in between at C, it is still considered to be two Flight Legs (A-to-C and C-to-B) even though the customer may/may not change planes between A and B and/or an airline may or may not use the same flight number to refer to the entire Segment from A to B.

The term "Product Price" of a Product (in reference to one or more VOFs) refers to the price a company would charge for a Product in the absence of implementation of said VOFs on said product. In the context of the airline industry, the term "Ticket Price" (in reference to one or more VOFs) refers to the price that an airline would charge in the absence of implementation of said VOFs on said flight. In the context of the hotel industry, the term "Room Price" of a room (in reference to one or more VOFs) refers to the price that a hotel would charge for a room in the absence of implementation of said VOFs on said room. In the context of the car rental industry, the term "Car Rental Price" of a car (in reference to one or more VOFs) refers to the price that a car rental company would charge for a car in the absence of implementation of said VOFs on said car. In the context of the travel industry, the term "Travel Package Price" of a travel package (in reference to one or more VOFs) refers to the price that a travel company would charge for a travel package in the absence of implementation of said VOFs on said travel package.

The term "transaction" here implies to do, to carry or to conduct an agreement or exchange. The exchange may or may not involve a price in terms of monetary or non-monetary value from customer side. The parties participating in the transaction may have obligation(s) from various terms and conditions. In other words, transaction may also imply an action or activity involving two or more parties that reciprocally affect or influence each other.

In the context of an airline industry, the term "schedule" refers to the characteristics of a flight including, but not limited to, airline related parameters, departure/arrival parameters, service and other miscellaneous parameters. The airline related parameters may include, but are not limited to, operating carrier entity (i.e., the airline that operates the flight), marketing carrier (an airline that sells the flight), any other carrier or intra/inter-carrier flight groups associated with the flight or any combination of the above. The departure/arrival parameters may include, but are not limited to, an airport and its location (city, state, country), date and time, seasonality, weather and other operational conditions, number of stops/ connections, and so forth. The service and other miscellaneous parameters may include, but are not limited to, type of aircraft, flight duration, in-flight or other services such as number of cabins, types of seats, meal selection, check-in and luggage options, airport lounges and other facilities, and so forth.

The term "schedule", in the context of car rental industry, refers to the characteristics of a car including, but not limited to, car rental company related parameters, pick-up/drop-off times, service and other miscellaneous parameters. The car rental company related parameters may include, but are not limited to, operating car rental company entity (i.e. the car rental company that operates the car), owner of the car, marketing car rental company (a car rental company that rents out the car), any other car rental company or intra/inter-car rental company groups associated with the car rental or any combination of the above. The pick-up/drop-off parameters may include, but are not limited to, a pick-up/drop-off location (area or street, landmark, city, state, country), date and time, seasonality and other operational conditions, and so forth. The service and other miscellaneous parameters may include, but are not limited to, type of car, car rental duration, or other services, car rental company services such as insurance, additional driver, child seats, and other equipments, and so forth.

The term "schedule", in context of a travel package refers to the characteristics of a travel package including, but not limited to, travel company related parameters, start/end date time, service and other miscellaneous parameters including travel company related parameters. The travel company related parameters may include, but are not limited to, operating travel company (i.e. the travel company that operates the package), marketing travel company (a travel company that sells the travel package), any other travel company or intra/inter-travel company groups associated with the package or any combination of the above. The start/end parameters may include, but are not limited to, a destination location (area or street, landmark, city, state, country), date and time, seasonality, weather and other operational conditions, and so forth. The service and other miscellaneous parameters may include, but are not limited to, type of flight, car, room, cruise, travel duration, or other services, travel company services such as insurance, flight services, car special equipments, hotel services, cruise services, other facilities, and so forth.

The term "related transactions" here refers to one or more transactions that are related to each other. In a Value Option Framework, the successful interaction between the participants may happen through a number of transactions in sequence, where each of the transactions in the sequence may (or may not) depend upon the outcome of the previous transaction, and this may create a chain of "related transactions". However, at least one transaction in a set of related transactions must be related to all the other transactions. The connection or reference between the transactions may be direct or indirect and/or implicit or explicit. The related transactions may be contingent to each other or rely or require the aid of the other to support. The transactions may be fully and/or partly related to each other to be construed as related transactions. For example, the price of a transaction may be modified if the customer has already bought a product in a previous transaction, which makes the two transaction related to each other. In another example, the customer is given availability in a flight since he or she has already purchased a ticket in another flight; which makes both the transactions related to each other. For the transactions to be called as related transactions, some dependency and/or nexus between the transactions has to be established. The transactions may become related transaction in one or more transactions. Related transaction may include, but is not limited to, a transaction with monetary value, a transaction without monetary value and so forth.

The term "default" here implies a situation or condition that turns up in the absence of active intervention from the users in a contract. In such situation, a particular setting or value (termed "Default Settings" or "Default Value") for one/ more exchange variables is/are assigned automatically. These Default Settings/Default Values remain in effect unless intervened.

The term "payment" here implies the act of paying or the state of being paid. The term "payment" here implies an amount of money or any other consideration paid at a given time or which has been received in the past but for which the benefit of the same is realized now, may be in part or in totality. "Payment" may also refer to a transfer of something of value to compensate for products or services that have been, or will be, received. Payment may be made in cash, on credit or any other consideration. The payment may have monetary or non-monetary (soft) value. The payment can be from company and/or any other entity to customer or from customer to company and/or any other entity or both.

The term "significant period of time" here implies a time period that is large enough with respect to the total utility time for the customer that it may affect the behavior of a transaction.

The term "anytime" or "any other time" here refers to any point of time that lies between a time period starting from the initial interaction of a customer with an airline (for any ticket purchase or any other event) for a particular journey and ending when said customer completes said journey and/or any other journey related to said journey.

The term "selected" or "select" or "selects" refers to, without limitation, selecting, selecting and purchasing, purchasing, defining, choosing, expressing a preference or any combination thereof. The term "receiving" or "receives" here refers to, without limitation, purchasing, utilizing, receiving for free, receiving without requirement of a physical delivery or any combination thereof. In some situations, said terms (related to "select") may also refer to, without limitation, receiving, purchasing or any combination thereof (including any grammatical forms of these terms such as noun, adjective, verb etc.). Said terms (related to "select") are used interchangeably as and when the context requires.

The phrase "selecting a Product" for option purposes includes selecting one or more products within the same or a different product level (or a section or compartment) within the same product category. In context of the hotel industry, the phrase "selecting a Room" for option purposes includes, but not limited to, selecting one or more rooms within the same or a different hotel or any combination thereof. In the context of a car rental company, the phrase "selecting a Car" or "renting a Car" or "purchasing a Car" for option purposes includes, but not limited to, selecting one or more cars or car types or equipments associated with the car from the same or a different car rental company or any combination thereof. In context of travel industry, the phrase "selecting a Travel Package" for option purposes includes, but not limited to, selecting one or more travel packages within the same or a different travel company or any combination thereof.

The terms "Set" and "Product Set" refers to a collection of Products and are used interchangeably. A Set may have one or more Products. In the airline industry context, a Flight Segment is equivalent to a Set and each Leg within a Segment is equivalent to a Product. A Segment may comprise one or more Flight Legs (Products). In the hotel industry context, a Room Set is equivalent to a Set and each Room Product within a Room Set is equivalent to a Product. A Room Set may comprise one or more Room Products. In context of car rental industry, a Car Set is equivalent to a Set and each Car Product within a Car Set is equivalent to a Car Product. A Car Set may comprise one or more Car Products. In context of travel industry, a Travel Package Set is equivalent to a Set and each Travel Package Product within a Travel Package Set is equivalent to a Product. A Travel Package Set may comprise one or more Travel Package Products. A company may (or may not) impose a restriction that all the Products of a Set must be used together unless a change is made to the Order (described later).

The term "Order" may comprise one or more Sets, where each Set may comprise one or more Products. In the context of the airline industry, an Itinerary is equivalent to an Order. In context of hotel industry, a Room Order is equivalent to an Order. In context of car rental industry, a Car Order is equivalent to an Order. In context of travel industry, a Travel Package Order is equivalent to an Order.

The term "Initial Product Set" (or IPS, in short) refers to a Set purchased by a customer. For example, in the airline industry context, the term Initial Flight Segment (defined below) is equivalent to IPS. The term "Initial Flight Segment" (or IFS, in short) refers to a flight Segment purchased by a customer. For example, consider an itinerary with two Segments, A to B and B to A. Each of the two segments is referred to as IFS. In context of hotel industry, "Initial Room Set" is equivalent to IPS. The term "Initial Room Set" (or IRS, in short) refers to a Room Set purchased by a customer. In context of car rental industry, "Initial Car Set" is equivalent to IPS. The term "Initial Car Set" (or ICS, in short) refers to a Car Set purchased by a customer. In context of travel industry, "Initial Travel Package Set" is equivalent to IPS. The term "Initial Travel Package Set" (or ITS, in short) refers to a Travel Package Set purchased by a customer.

The term "Option Product Set" (or OPS, in short) refers to a Set received by the customer as part of a FRO. In the airline industry context, OFS is equivalent to OPS. The term "Option Flight Segment" (or OFS, in short) refers to a flight Segment selected as part of a FRO option on a given IFS in the context of the airline industry. There can be one or more OFS for a specific IFS. The term "Option Room Set" (or ORS, in short) refers to a Room Set selected as part of a FRO option on a given IRS in the context of the hotel industry. There can be one or more ORS for a specific IRS. The term "Option Car Set" (or OCS, in short) refers to a Car Set selected as part of a FRO option on a given ICS in the context of the car rental industry. There can be one or more OCS for a specific ICS. The term "Option Travel Package Set" (or OTS, in short) refers to a Travel Package Set selected as part of a FRO option on a given ITS in the context of the travel industry. There can be one or more OTS for a specific ITS.

The term "Y" refers to a type of customer who has received a FRO. In the context of FRO VOF, the term "N" refers to the type of customer who has not received a FRO. N also refers to those Y customers for whom FRO has been exercised completely. The term "Y Status" refers to the status of a Y customer in a given IPS or OPSs. Y status are of two types: Accounted (Ya) and Awaiting (Yw).

When a Y customer is counted as holding (or using or blocking) a unit of capacity of a Product in a Set (IPS or OPS), his/her status is called Accounted with respect to each of the Products in that Set. The corresponding Set is termed 'Accounted_Set' for the Y customer, who is having a status of Ya with respect to that Accounted_Set and Products included in this Set.

When a Y customer is not counted as holding (or using or blocking) a unit of capacity of the Products in a Set (IPS or OPS), his/her status is called Awaiting with respect to that Set and each of the Products in the set. The corresponding Set is termed Awaiting_Set for the Y customer and the customer is Yw with respect to that Awaiting_Set and Products included in this Set. At any given time, a customer may (or may not) be accounted to only one Set and is awaiting in the rest of the related Sets.

The term "AC" refers the available capacity of a Product and is defined as: AC=C−N, where N is defined as the sum of N type of customers.

The term "EAC" refers to the effective available capacity of a Product and is defined as: EAC=AC−YA, where YA is the number of customers who are of Ya status in that Product.

The term "shifting", with respect to shifting of a customer from a product A to a product B, refers to reassignment of at least one customer from at least a product A to at least a product B or reassignment of at least a product B to a customer in place of at least a product A. Shifting may imply transfer and/or movement of one or more customers from one or more products to another. It may also refer to, without limitation, substitution of one or more products in lieu of other products. Let's consider an example in the airline industry. A customer may be booked on Flight F1 and may receive FRO to be shifted to Flight F2. So, now shifting may imply reassignment or substitution of Flight F2 in place of Flight F1 for said customer. Let's now consider an example in the hotel industry. A customer may have booked Room R1 and may receive FRO to be shifted to Room R2. So, now shifting may imply reassignment or substitution of Room R2 in place of Room R1 for said customer. Now, consider an example in the car rental industry. A customer may have rented Car C1 and may receive FRO to be shifted to Car C2. So, now shifting may imply reassignment or substitution of Car C2 in place of Car C1 for said customer. An example in the travel industry is now considered. A customer may be booked on Travel Package T1 and may receive FRO to be shifted to Travel Package T2. So, now shifting may imply reassignment or substitution of Travel Package T2 in place of Travel Package T1 for said customer.

The term "Remove_Y" refers to a recursive algorithm for which the necessary parameters are defined as follows: input parameters: Collection of ParentY (or COPY, in short), Collection of Parent Product (or COPP, in short), Caller_Y, Initiator_Product, Initiator_Y, Benefit; and output parameters: a Y_Series collection. Definition of all the parameters are given below.

The term "Collection of ParentY" (or COPY, in short) refers to a collection of Ya customers for which the Remove_Y algorithm has already been called within a cascade of Remove_Y calls. The corresponding customer is referred to as ParentY.

The term "Collection of Parent Product" (or COPP, in short) refers to a collection of Products for which the Remove_Y algorithm has already been called within a cascade of Remove_Y calls to generate Capacity. The corresponding Product is called Parent Product.

The term "Caller_Y" refers to the Ya customer, which is to be shifted from its Accounted_Set to Awaiting_Set by calling the Remove_Y algorithm.

The term "Initiator_Product" refers to the Product from which Caller_Y is to be shifted by using the Remove_Y algorithm to generate capacity.

The term "Initiator_Y" refers to a customer whose wants to capture a unit of capacity of the Initiator_Product, and thus, derives the need to create its capacity by using the Remove_Y algorithm to shift the Caller_Y from the Initiator_Product.

The term "Benefit" refers to a benefit that the company may realize by creating capacity in Initiator_Product.

The term "ChildY" refers to a Y customer who was shifted in the cascading route of Remove_Y calls. A ChildY element comprises the following entities: Collection of Initiator, Initial_Accounted_Set, Final_Accounted_Set and Cost of ChildY.

The term "Collection of Initiator" (or COI, in short) refers to a collection of one or more members, where each member in the collection comprises the following: Initiator_Product and Initiator_Y, where said Initiator_Y derives a need to create capacity in said Initiator_Product.

The term "Initial_Accounted_Set" refers to the Set where the ChildY is accounted before he or she is shifted in the Remove_Y process.

The term "Final_Accounted_Set" refers to the Set where the ChildY is accounted after being shifted by the Remove_Y algorithm from the Initial_Accounted_Set.

The term "Cost of ChildY" (or CCY, in short) refers to the cost to shift the current ChildY from its Initial_Accounted_Set to the Final_Accounted_Set.

The term "Series_Element" refers to a feasible route generated when Remove_Y is called to shift a Caller_Y from its Accounted_Set to its Awaiting_Set. A Series_Element comprises the following entities: Collection of ChildY (COCY), Collection of End_Product (COEP); and Cost of the Series_Element (CSE).

The term "Collection of ChildY" (or COCY, in short) refers to a collection of all the ChildY, which have been shifted by the Remove_Y algorithm within a Series_Element.

The term "End_Product" refers to a Product with enough units of EAC to accommodate a Caller_Y. The cascading route of Remove_Y reaches one end when it approaches an End_Product. An End_Product comprises AC and Collection of Ya (or COYA, in short). COYA includes all the Ya that are accounted in the End_Product (includes existing Ya and ChildY that are shifted to End_Product).

The term "Collection of End_Product" (or COEP, in short) refers to a collection of all the End_Products involved within a Series_Element The term "Cost of the Series_Element" (or CSE, in short) refers to the total of CCY of all the ChildY associated with a Series_Element.

The term "Series" refers to a collection of the Series_Elements. The term "Y_Series" refers to a collection of the Series_Elements, which is returned as output by the Remove_Y algorithm. The term "P_Series" refers to a collection of the Series_Elements at the Product level. A P_Series collection is obtained from the Y_Series collections of all Ya in the Product. The term "S_Series" refers to a collection of the Series_Elements at the Set level.

As used herein, the term "processor" includes, without limitation, any one or more devices for processing information. Specifically, a processor may include a distributed processing mechanism. Without limitation, a processor may include hardware, software, or combinations thereof; general purpose digital computing elements and special purpose digital computing elements and likewise included. A single processor may perform numerous functions and may be considered a separate processor when implementing each function. The terms "database" and "data store" may have been used interchangeably as and when the context requires and both may refer to any form of storing the data, including but not limited to, storing the data in a structured form, storing the data in an unstructured form and so forth.

General Method Description: Kernel

Referring now to FIG. 1, there is shown a high-level flowchart style diagram of a method to achieve the optimally customized sale of products or services to "close the gap." It involves the following steps or acts: In Act 1.110, certain inputs are captured, including customer dynamics and important value segments, their demand, preferences, flexibilities and associated relative utilities. Company economics and important economic factors such as, for example, costs, capacities and constraints are captured in Act 1.120. The customer information from Act 1.110 and the company economics from Act 1.120 are then in Act 1.130, "integrated" in a way that will permit optimization of value for both the company (e.g., its profitability) and customers (e.g., their individual and collective purchase utilities). In Act 1.140, value options are formulated that permit the capturing of individual customer preferences in way that can be used in the optimal customization of the sale process illustrated. These same steps can be used in one or more permutations or combinations or iteratively.

At a high level, the system is operated and the method of FIG. 1 is executed to (1) to dynamically interact with the customers to determine detailed customer demand for the product and options, (2) receive a real-time assessment of company economics, i.e., capacities, constraints, and costs, (3) optimize across demands and preferences of all customers, and company economics, and (4) formulate value options for customers.

To take advantage of this system, a company has to obtain information about customer demand and preferences before (and/or during) a purchase, in a structured manner that can be easily understood and translated into satisfaction for customers and also can be used to optimize internal operations for companies. This data can then be integrated with the company's internal resources and capacities to enhance and improve its operations. A company can "optimally customize" its products and processes to enhance the value for customers, while simultaneously maximizing its business profitability. Customers also benefit from the fact that they spend less time researching products, can be assured that their priorities are known in case of change or contingency events occurring, can enhance their purchased products/services and get more perceived value for their purchase price.

Figure 2:
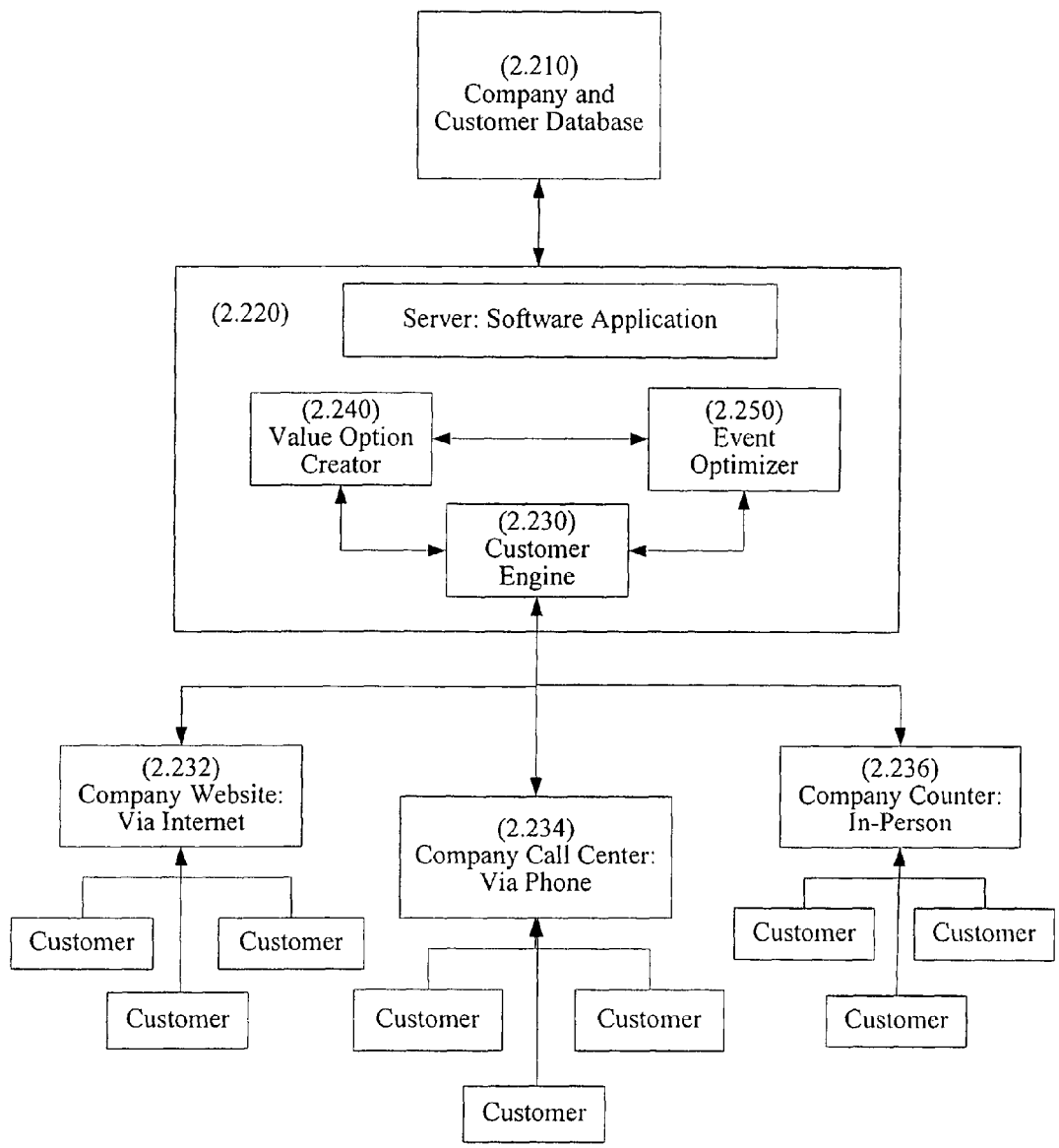
FIG. 2 is a block diagram of a system as taught herein for practicing the discussed method.

At a high level, a block diagram of a typical system for implementing this methodology is shown in FIG. 2. The data for driving the system, from both the customer side and the company side, is stored in a data store (or database) shown in Box 2.210 (or multiple data stores or databases), which may be of any suitable database design and may be a commercially available database product configured for this application. The "heart" of the system is a platform, typically one or more servers, shown in Box 2.220, which provides the processing capability to implement three modules, shown in Boxes 2.230, 2.240 and 2.250. The Customer Engine module (shown in Box 2.230) controls the interfacing with the customer via whatever media are selected by the company. For example, the company may use one or more of a web site (shown in Box 2.232), a call center (shown in Box 2.234) and/or live customer service "counter" personnel (shown in Box 2.236) (e.g., at a point-of-sale location). The Value Option Creator module (shown in Box 2.240) is a software program(s) that performs the functions of allowing a company to design, create and configure different value option frameworks and corresponding value options that can be offered to customer to capture their needs and preferences in detail and in a way that can be used to optimize across company operations. The Event Optimizer module (shown in Box 2.250) comprises a program or programs that (a) monitor company business performance and provide information about business data (such as available capacities, costs, sales, inventory and so forth) as well as other relevant factors that may vary from installation to installation; and (b) monitor for the occurrence of events related to the value options which customers have bought, and which then execute pre-designed protocols when a related event occurs (e.g., a re-booking algorithm is activated when a flight cancellation event occurs).

Process to Use the New System and Method in an Industry

The following sections describe in detail how this system and method may be used in any particular industry. Industries and companies best suited to use and benefit from the invention are those with large number of customers and wherein those customers would have varied utilities for aspects of a product offering, especially if those aspects were unbundled and some made optional.

To get maximum benefit from the herein disclosed system and method requires the use of human judgment. It should be emphasized, therefore, that there is shown a "platform" technology and a variety of non-exhaustive ways of using the platform. Those who make use of this platform in their companies will make decisions and exercise their judgment so that each instantiation or practice is likely to be unique, at least to a degree. In addition to disclosing the platform, via the given examples we also disclose certain instantiations of the system and method which themselves are believed to have value but the system and method are not intended to be limited to these instantiations except as they may be expressly claimed.

Using the discussed system and method in any industry involves a two-staged approach. The selection of an industry is assumed. The industry provides a context. Starting in FIG. 3, in the first stage of the method, a set of value option frameworks (to be associated with a company's offerings) is created. It is immaterial, for the current discussion, how one obtains the information used to construct a value option framework. Implicitly or explicitly, a value option framework reflects some sort of analysis of customer dynamics and company economics. Thus, to construct a value option framework for a particular type of transaction, one needs to arrive (however one chooses) at a list of components the customer may select when buying a product, and their prices. For example, in a simple case there may be delivery options and warranty options and maybe training options. Each option is assigned a price, whether statically, quasi-statically, or dynamically. Static pricing is assigned at very infrequent intervals. Dynamic pricing (determined by an algorithm invoked by the Event Optimizer is assigned either on an on-demand basis for a particular transaction or at frequent intervals so as to yield pricing based on near (i.e., quasi) real time company performance data. Quasi-static pricing would be somewhere between the former two situations, such as pricing done quarterly or monthly based on then-current information about the company. Pricing may involve running financial analysis based on known data to optimally set the conditions and pricing in the value option framework associated with the company offerings.

Figure 11:
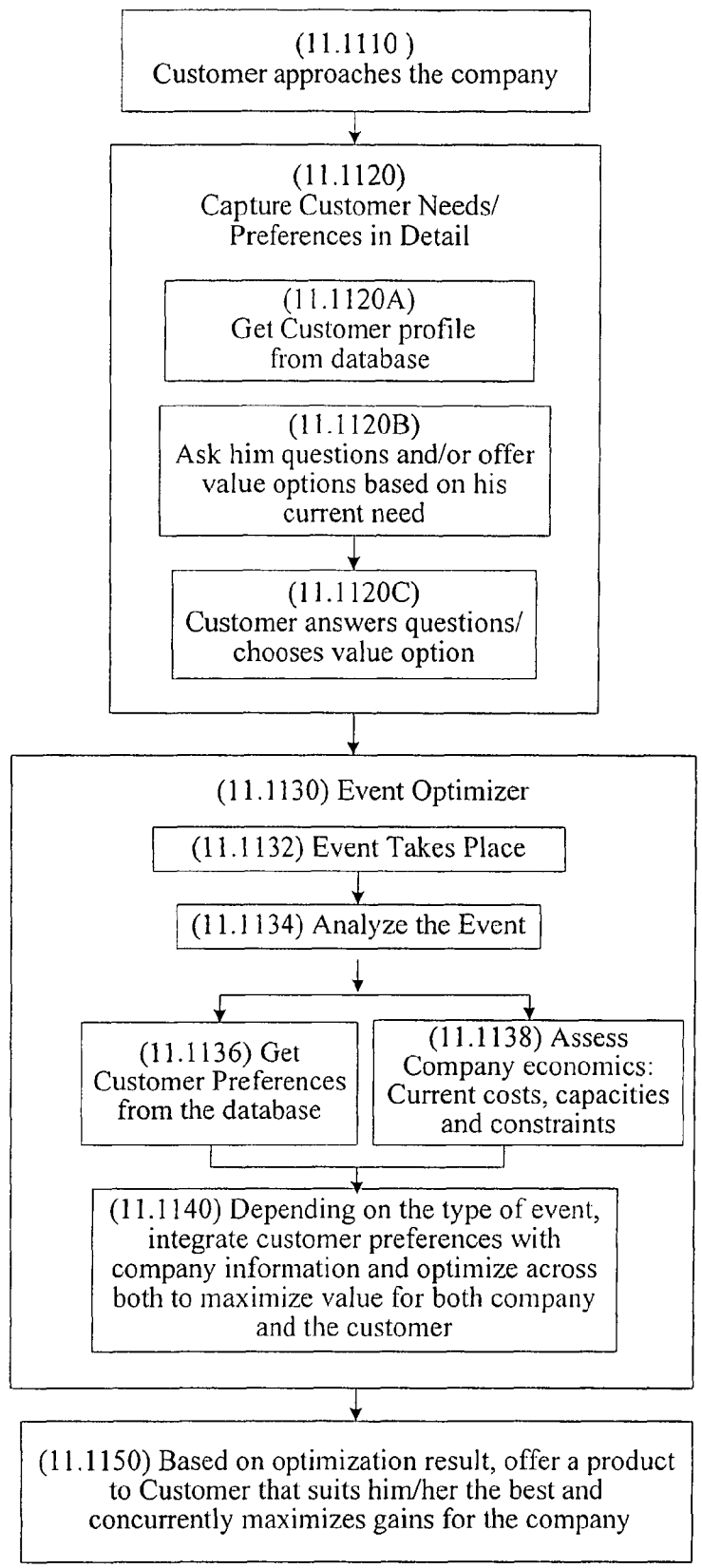
FIG. 11 is a flow chart of a process to implement value option framework.

The second stage, as depicted in FIG. 11, involves a detailed interaction with the customer who has approached the company (Act 11.1110). Approaching the company may involve accessing a web site or calling a call center or any other way of commencing a transaction. The interaction (Act 11.1120) occurs in a structured format to capture the customer's expressed needs, preferences, flexibilities and relative utilities. As a preliminary matter, it is possible the customer may previously have registered a profile containing default selections of needs, preferences, etc. So, the data store or database 2.210 is interrogated to determine whether a profile exists and, if so, to retrieve it (Act 11.1120A). The customer is presented with questions and/or value options (Act 11.1120B) and in response he/she supplies answers and select options that suit him/her (Act 11.1120C).

The second Act in the second stage is executed by the Event Optimizer module 2.250. A summary of the algorithmic flow of the Event Optimizer presented in Box 11.1130. The Event Optimizer is alerted to, or detects, the occurrence of an event (shown in Box 11.1132 and 11.1134) for which an event-response procedure (program) has been pre-stored. Each event-response procedure is designed by the company to effect selected action(s) in response to detection of its corresponding event. Depending on the nature of the event, an event-response procedure may invoke an optimization algorithm (shown in Box 11.1140), assess the company operations (possibly in real time) and analyze, across company operations (shown in Box 11.1138) and customer information (shown in Box 11.1136), potential results to determine results that concurrently maximize the benefits for the company and the customer. The optimization may or may not modify the company product offerings to better suit the customer while simultaneously maximizing the company operations (shown in Box 11.1150). Both of the stages and the steps involved will now be discussed in detail.

First Stage Formulation of Value Option Framework

Figure 3:
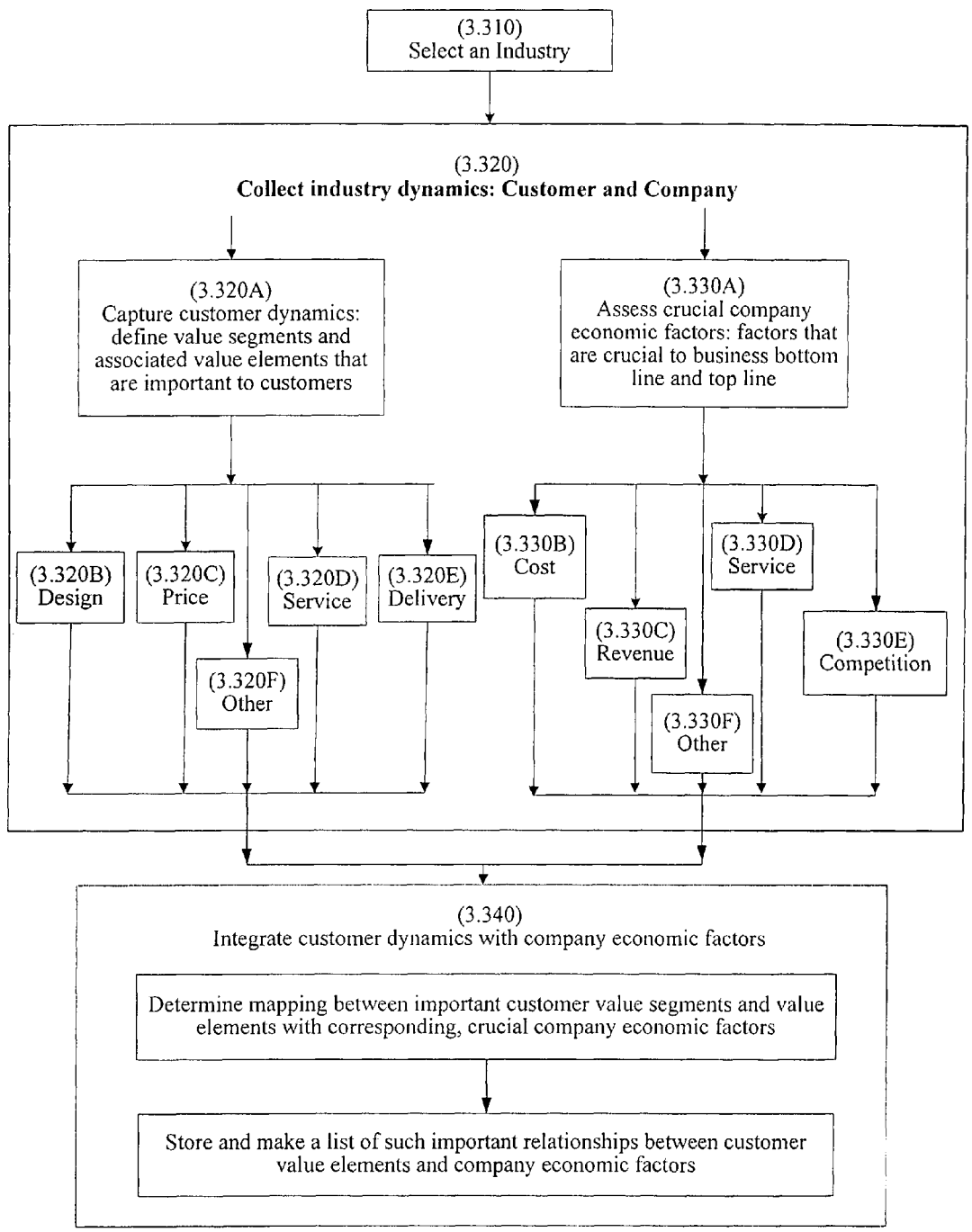
FIG. 3 is a flow chart of a method to create a value option framework showing collection of industry and customer dynamics.

Turning to FIG. 3, it will be assumed that the inventive method and system are to be adapted to a particular industry or company. One may develop a generic instance for an industry or particularize it to an individual company. Some considerations will inherently be generic to an industry. Thus, to formulate a value option framework, one begins by selecting the industry. Act 3.310. Next, the customer and company dynamics are captured. Act 3.320. To capture customer dynamics, one needs to understand the value segments and value elements that are important for the customer. To assess company dynamics, one needs to assess the economic factors that are crucial to the company's profitability and performance.

(1) Capturing Customer Dynamics—Act 3.320A

Figure 4:
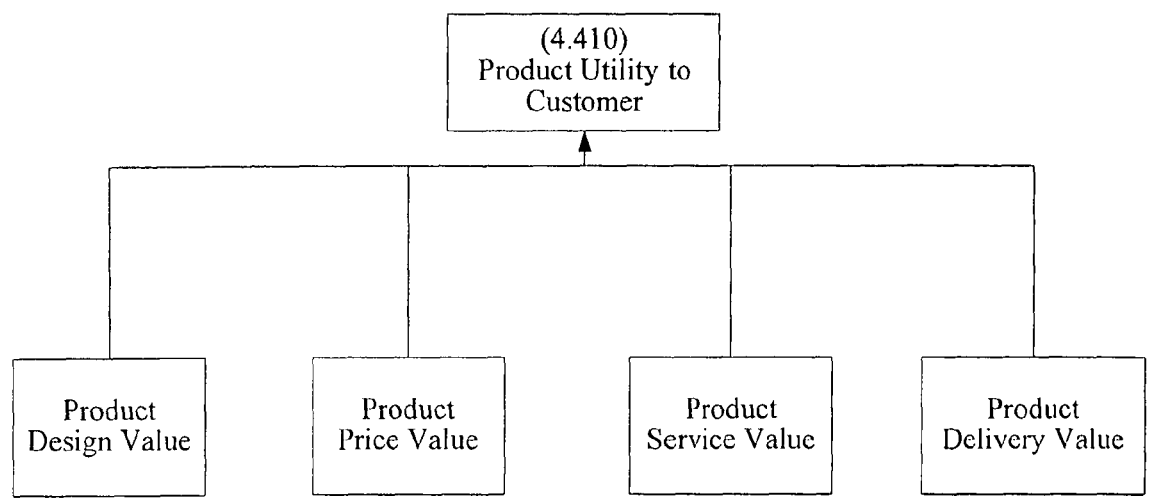
FIGS. 4 and 5 are diagrammatic illustrations of the relationship between overall product utility and contributions as perceived by a customer.
Figure 5:
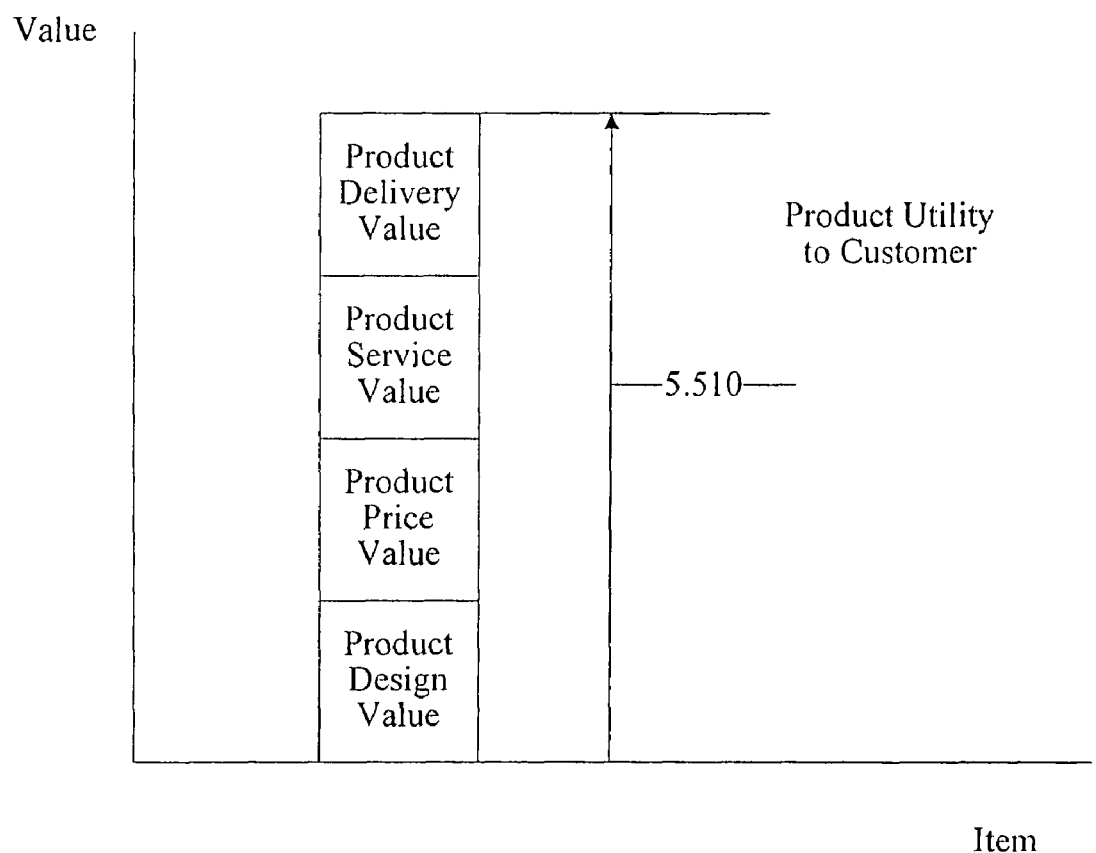

A customer derives certain utility by purchasing a particular product. The purchase utility value, typically, can be separated into many value segments. Customers value these segments (which include core qualities of the offering as well as options and contingent options i.e., options dependent on options) from the perspective of what is important to the customer through the whole buying and usage experience, starting from, searching for a product, placing a particular order and using the product throughout its lifecycle. To go further, it will be helpful to define two terms: value segment and value element. A "value element" is a distinct aspect/characteristic of a product's buying and usage experience that may affect the utility of the product to the customer. A "value segment" is a particular category of such value elements. While value segments may vary from industry to industry and will have to be selected by the individual or team that implements a particular instance of this system and method, for many industries, the four most important value segments are (a) product design value, (b) product delivery value, (c) product price value, and (d) service value. See boxes 3.320B to 3.320E. These value elements are shown in FIGS. 4 and 5, which are simply alternative views of the same information and will be discussed below. It should be noted, however, that these value segments are just provided for illustration purposes. Industries that can benefit from the system and method of the invention may have more or fewer than the listed value segments and/or a different list of value segments. Each value segment may have one or more value elements. Further, the actual number of value elements in each value segment may vary with the industry, the level of detail in the business model, and even the customers. The system implementer can choose the number of value elements in each value segment.

Total Value for Customers

A customer derives unique value from each value segment; the total utility value of the product to a customer (shown in FIGS. 4 and 5) is the combination of values derived from each of the value segments. A customer would benefit the most if the total expected value of his/her utility were maximized. Another important aspect to note is that every customer also has an acceptable range (e.g., equals, exceeds, or disappoints, minimum or maximum) for each individual parameter value. Even if a particular product has high overall value, a customer may not desire the product if it scores below the minimum level (i.e., low enough to reject the product) for any one or more of the value segments or value element. A company may use any method for calculating utility.

Concept of Tiered Value Perception

Figure 6:
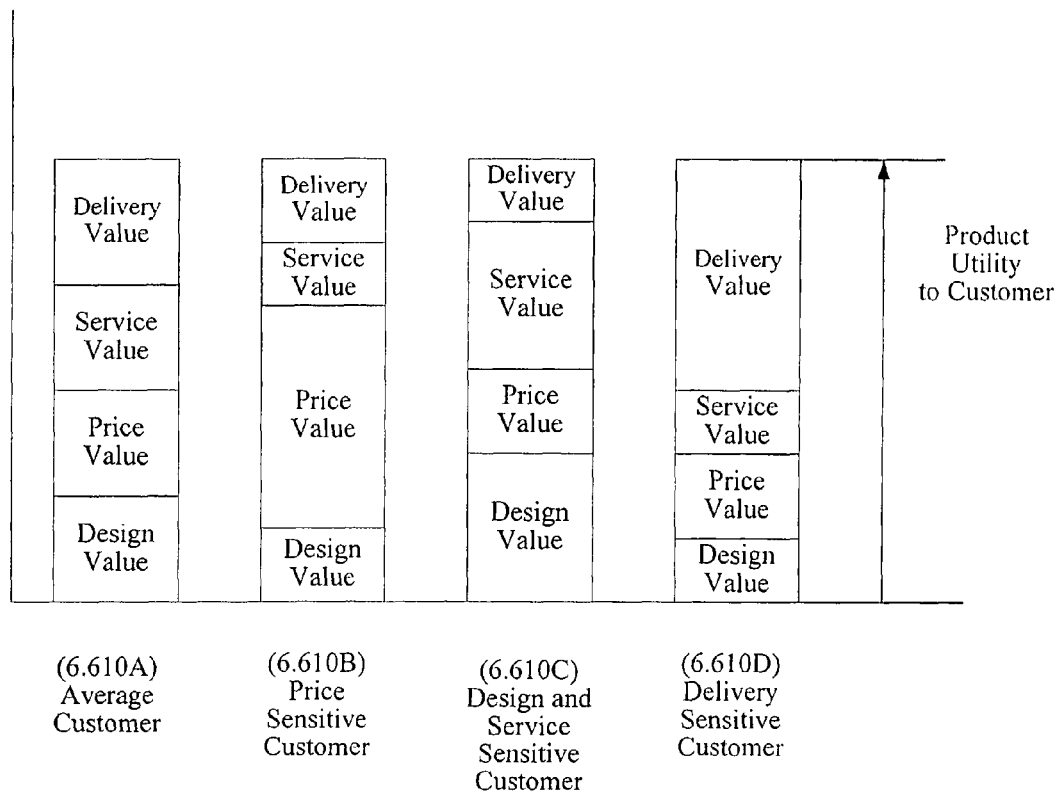
FIG. 6 is a diagrammatic illustration of the perceived utilities of a product by four customers.

Different customers may derive different utility from different aspects of the same product. As shown in FIG. 6, four different customers 610A-610D may compute to the same (total) overall utility even though they assign different utility values to each of the value segments. For example, a human resource manager, who has scheduled interviews with candidates, would value the timely ticket to his destination much more than a vacationer, who may be flexible. Consequently, the company needs, in some way, to define and learn about these value parameters for individual customers, along with relative preferences and utilities associated with each parameter. This will be illustrated below using the previously listed value segments. A web-based questionnaire is one excellent way to collect this information. The collected information is then stored in a customer profile or Itinerary in a data store or database, such as database 2.210.

(a) Product Design Value

The "product design" segment refers to the value elements relating to the design features and characteristics of a product that the customer actually buys. Each customer places his or her own values on these different design value elements.

(b) Product Delivery Value

The "product delivery" segment refers to the value elements relating delivery or time-frame related aspects like, for example, lead-time and delivery schedule from the time the customer places an order. Again, each customer may place his or her own values on each of these value elements. The company collects detailed information on the product delivery needs of the customers.

(c) Product Price Value

The "product price" segment refers to the groups of value elements related to the price a customer pays to buy/use a product. Value elements in this segment may include total product price, delivery costs, warranty or after-sales service costs, and any other relevant costs incurred by the customer in buying and using the product. Some times, addition of all these price elements is also termed total cost of ownership (TCO). A customer derives maximum price value by paying the most desired price for a product. Any price paid either lower or higher than the desired price may change the value the customer gets from the price of the product. The company collects information on the product price needs of the customers.

(d) Service Value

The "service value" segment refers to a group of value elements related to the service a customer receives from pre-sales and post-sales services offered by the company to facilitate the use of the products sold. Pre-sales services include services provided by a company to help its customers decide and choose products based on their requirements. Post-sales or after-sales service refers to the warranty, product support, maintenance support and other relevant activities that may help a customer to use the product effectively. A customer will derive maximum service value from a product if the services provided by the company completely match or exceed those desired by the customer. The company utilizing the invention collects information not only on the service needs of its customers, but also on customer preferences on different possible events that might occur during or after the purchase.

Summary of Capturing Customer Dynamics

Based on the method described above, the first Act for a company is to establish the value segments and value elements it will present to the customer for the customer's decision. It may establish these value segments and value elements in any way it chooses. A company may want to use market research or other mechanisms to analyze the value segments and value elements that are important to customers. An industry expert may choose to avoid such research and, instead to rely on experience.

(2) Assessment of Company Economics

The next Act in the first stage, as shown in FIG. 3, is to assess the crucial economic factors that affect the bottom-line and top-line of the company, Act 3.330A. For example, these factors may include but are not limited to revenues, fixed costs, inventory, available and scheduled capacity, constraints on product availability and total and marginal values for current direct and indirect product (and/or services) costs. For illustration purposes only, FIG. 3 shows the grouping of such factors into five major categories 3.330B-F, including costs, revenue, service, competition and other.

It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors

A third Act, shown in Box 340 of FIG. 3, is to take the information collected from the previous two steps, analyze this data and find important value segments and elements that directly affect the crucial economic factors for the company. This operation involves creating a mapping between company factors and customer value segments, to establish direct and indirect relationships between the two.

(4) Formation of Value Option Framework

Figure 8:
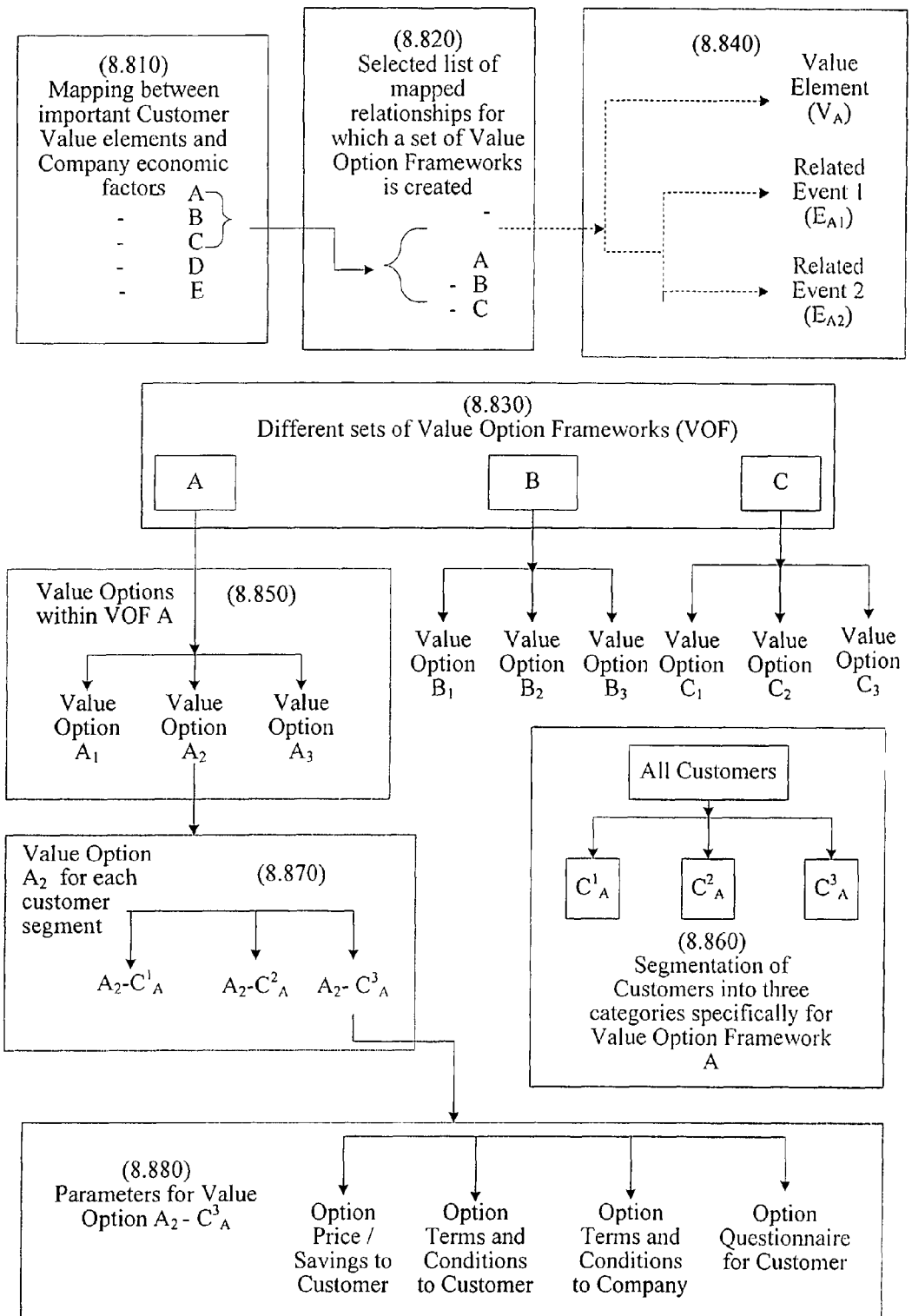
FIG. 8 is a partially-diagrammatic, partially-flow diagram representing the steps of a process for creating a value option framework.

The formation of a value option framework involves certain steps illustrated in FIG. 8. The value option framework is formed around important mapped value elements, allowing capture of detailed individual, customer-level data expressing needs, preferences, flexibilities and relative utilities so as to positively impact the company operations, while simultaneously enhancing the overall product utility for the customer. A value option framework (VOF) must allow the company to capture a customer's demand, preferences, flexibilities and relative utilities at an individual level in a format that can allow that information to be used to produce a cost savings or revenue enhancement for company operations while concurrently enhancing customer utility. The structure of a value option framework is defined in detail later.

The process to create a value option framework is shown in greater detail in FIG. 8. In Act 8.810, the process starts from that list. From this list, the company may select a list of mapped value elements which fulfill the criteria listed above, Act 8.820, and a value option framework is built around those value elements. One could build a value option framework around almost every mapped relationship, so the decision criteria to choose or reject any such relationship is simply pragmatics. It is probably to be desired to limit the number of relationships to keep the value option framework manageable, computationally and otherwise. In FIG. 8, there are three VOFs shown at 8.830, namely A, B and C. The number of value option frameworks shown is for illustration purposes only and could be fewer or more, depending on factors such as the industry selected and user discretion. As explained in detail later, each value option framework is related to a corresponding value element and one or more related event(s). For illustration purpose, in the Box 8.840, value option framework A is related to a value element $V_A$ and two related events, $E_{A1}$ and $E_{A2}$. In most situations, after the initial interaction between the customer and company related to a particular value element, one or more related events (or a series of events) would take place. The structure of a value option framework is defined below in detail.

Structure of a Value Option Framework

Figure 9:
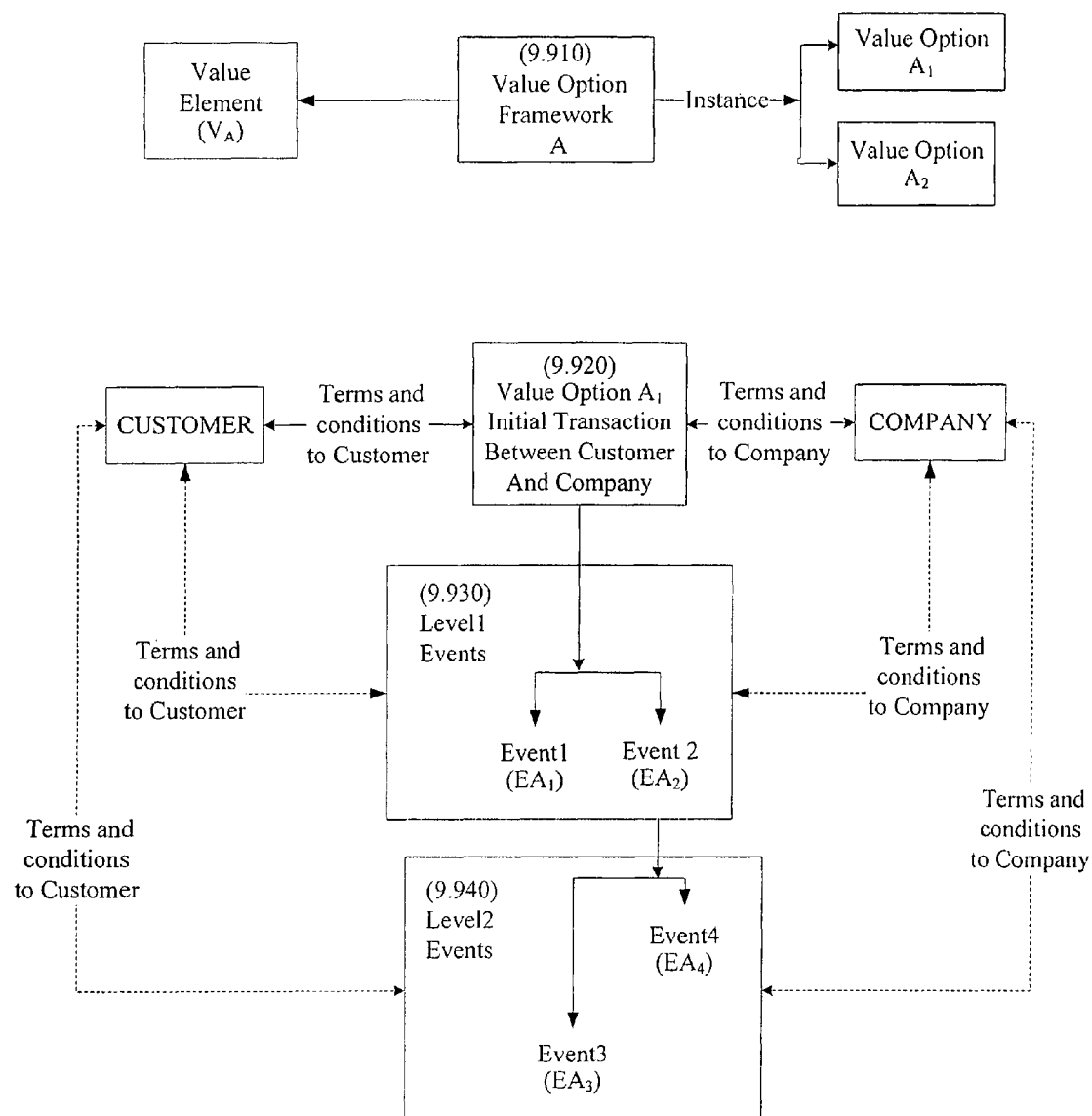
FIG. 9 is a diagrammatic representation of the generic structure of a value option framework.

FIG. 9 defines the structure of a Value Option Framework. The Box 9.910 shows a value option framework A. Every value option framework may be related to one or more value elements. As shown in the Box 9.910, value option framework A is related to value element $V_A$. One can create one or more instances of a value option framework as shown by the two value options ($A_1$ and $A_2$). The Box 9.920 shows the initial interaction between the customer and company where the company offers the value option $A_1$ to the customer. Every value option has an initial costs/savings and other benefits and conditions to the customer; and revenue/costs and other benefits and conditions to the company. The Initial Transaction is successful if the customer selects the given value option. Every successful transaction may be succeeded by one or more related events (or a series of events as shown by the Boxes 9.930 (Level 1 events) and 9.940 (Level 2 events). Just like the Initial Transaction, each event may also have costs/savings and benefits and conditions to the customer, and revenue/costs and benefits and conditions to the company, as shown by the linked arrows from Event $E_{A3}$ to both the customer and company.

The Initial Transaction may comprise one or more acts. One or more products may be selected, at one or more times, before, after, during the Initial Transaction, or any combination thereof. The Initial Transaction or any of the following events may have terms and conditions applicable to the customer, the company, another entity or any combination thereof. These terms and conditions may be set, preferably, to concurrently benefit both parties.

Consider, again, the process of formulating a value option framework. For each value option framework, the company-user also preferably categorizes its population of customers into one or more segments based on one or more criteria. Customer segmentation is based on customer behavior and needs. Individual customers are not necessarily segmented or grouped; a particular customer may fall within different customer segments at different times. It is the customer behaviors and needs that are segmented. To provide an example, in the Box 860 in FIG. 8, all of the company customers are categorized into three customer segments, namely, $C^1_A, C^2_A, C^3_A$ for the value option framework A. The number of customer segments could vary depending on the industry and value option framework, and this method does not put a limit on the number of customer segments. The number of customer segments shown is for illustration purposes only and could be fewer than or more depending on industry selected, value option framework and user discretion. Further, a company may segment its customers differently for different value option frameworks or they may use the same customer segmentation for a few or all value option frameworks. The customer segmentation is done because the customer behavior can be subdivided into different groups and customer showing similar behavior could be dealt in a similar fashion.

After formulating one or more sets of value option framework(s) around the selected value elements, the user creates one or more value options for each set of value option frameworks. In FIG. 8, the value options $A_1, A_2$ and $A_3$ are created in Box 8.850 for the value option framework A. The number of value options shown is for illustration purposes only and could be fewer or more depending on industry selected, value option framework and user discretion.

For each value option created, the user defines parameters for option pricing, benefits and conditions to the customer, as well as revenue, costs and option conditions to the company, under which the option would be used. If necessary, a user may also need to create a separate questionnaire to be completed by customers, pertaining to each value option.

There may or may not be any payment transaction related to the Initial Transaction and/or other event related to the Initial Transaction and/or Value Option Framework. A price may include, but is not limited to, a set of one or more Product Prices, a set of one or more option prices, any other price or any combination of the above. The price may comprise a monetary value or a soft value (e.g., benefits, coupons or exchange of another service) or other consideration. The price may be fixed or variable, with or without bounds. The company may set permissible range(s) or boundary limit(s) within which the price can vary, or it may offer the customer a set of prices to choose from. Since price conditions may depend upon various factors, which may or may not be variable, the same may be decided at anytime. The price conditions may be determined by the customer, the company, a third entity, or any combination thereof, at one or more times.

As shown in FIG. 8, the user creates value options for each particular customer segment (Act 8.870). In FIG. 8, the structure for value option conditions for Value Option $A_2$ tailored to customer segment $C^3_A$ is shown in the Box 8.880. Similarly, the user creates conditions and parameter values for each value option for each customer segment.

For one type of value option, one or more parameters for different customer segments may be the same. Across multiple value options (within the same value option framework), one or more parameter values may be the same for one or more different customer segments. It is possible that one or more value options may not be valid for a particular customer segment or a sub-segment within a customer segment.

Figure 10:
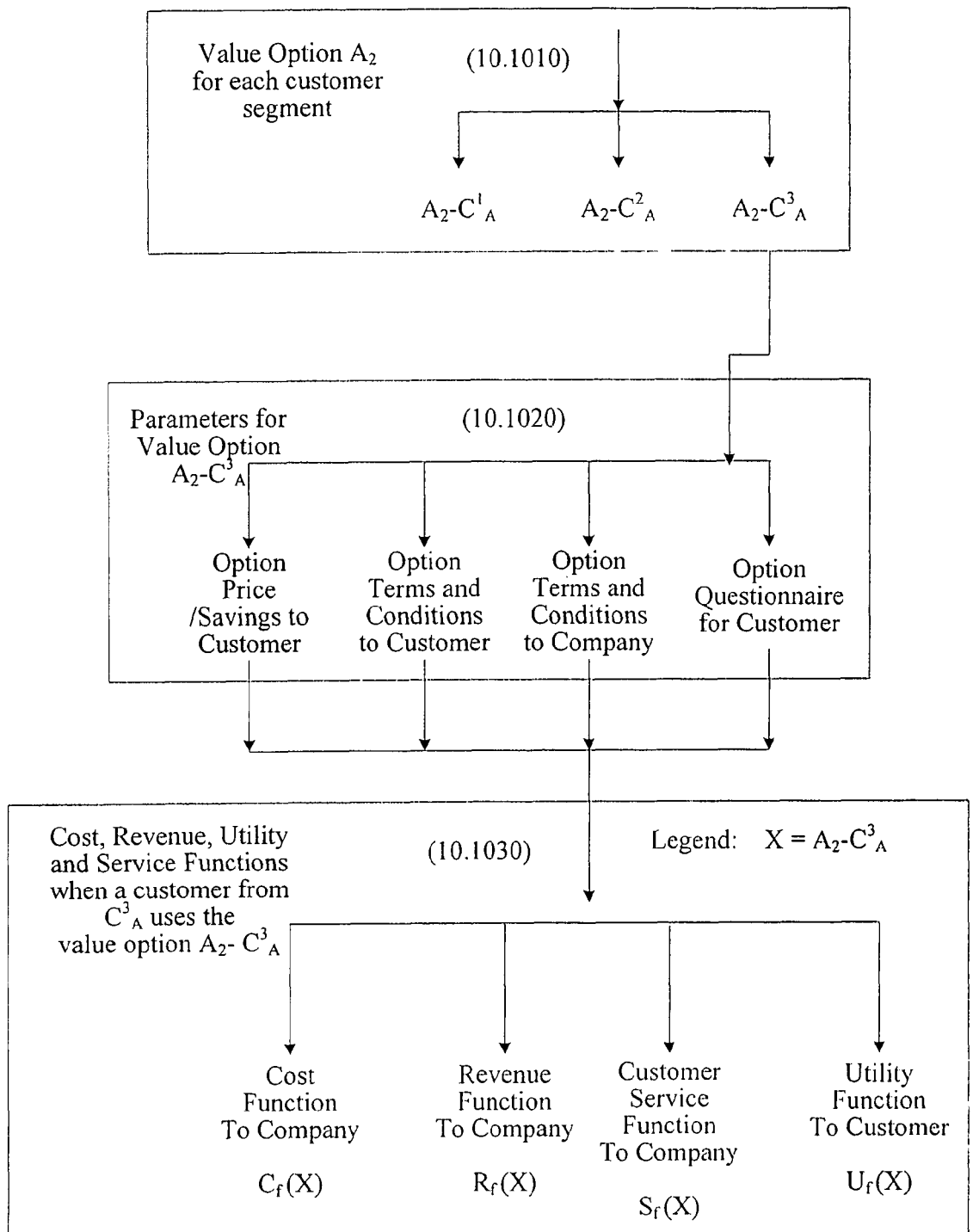
FIG. 10 is a diagrammatic illustration showing creation of a value option framework indicating how cost, revenue, utility and service functions.

Turning to FIG. 10, for each value option created for a specific customer segment, the user creates the following functions as shown in the Box 10.1030. (The number and type of functions shown is for illustration purposes only and could be fewer than or more depending on the industry selected, value option framework and user discretion.) First, there is a Cost Function to the company, $C_f(X)$. This function expresses the cost elements to the company related to usage of a specific value option. For illustration purposes, FIG. 10 displays the cost function $[C_f(A_2-C^3_A)]$ to the company when a customer (within customer segment $C^3_A$) selects the value option $A_2$. This function expresses the costs to the company initially when the user selects the value option A2, and also for each of the related events if and when those related events take place. Next, there is a Revenue Function to the company, $R_f(X)$. This function expresses the revenue elements to the company related to usage of a specific value option. For illustration purposes, FIG. 10 displays the revenue function $[R_f(A_2-C^3_A)]$ to the company when a customer (within customer segment $C^3_A$) uses the value option $A_2$. This function expresses the revenue to the company initially when the user selects the value option A2, and also for each of the related events if and when those related events take place. Then there is a Customer Service Function to the company. This function expresses the customer service function to the company related to usage of a specific value option. For illustration purposes, FIG. 10 displays the customer service function $[S_f(A_2-C^3_A)]$ to the company when a customer (within customer segment $C^3_A$) uses the value option $A_2$. This function expresses the customer service level a company provides initially when the user selects the value option $A_2$, and also for each of the related events, if and when those related event take place. Finally, there is a Utility function to the customer. This function expresses the utility to the customer from use of a specific value option. For illustration purposes, FIG. 10 displays the utility function $[U_f(A_2-C^3_A)]$ to a customer (within customer segment $C^3_A$) when he or she uses the value option $A_2$. This function expresses the utility to a customer initially when he/she selects the value option $A_2$, and also for each of the related events if and when those related events take place.

To obtain the overall costs, revenue and service benefit for a particular value option framework, all the individual functions for each value option-customer segment combination are combined to determine the total overall costs and revenue benefits to the company and the service and utility benefits to customers. Benefits from all the value option frameworks can be simply added together to calculate total overall benefit values to the company.

(5) Optimization of Value Options

Figure 7:
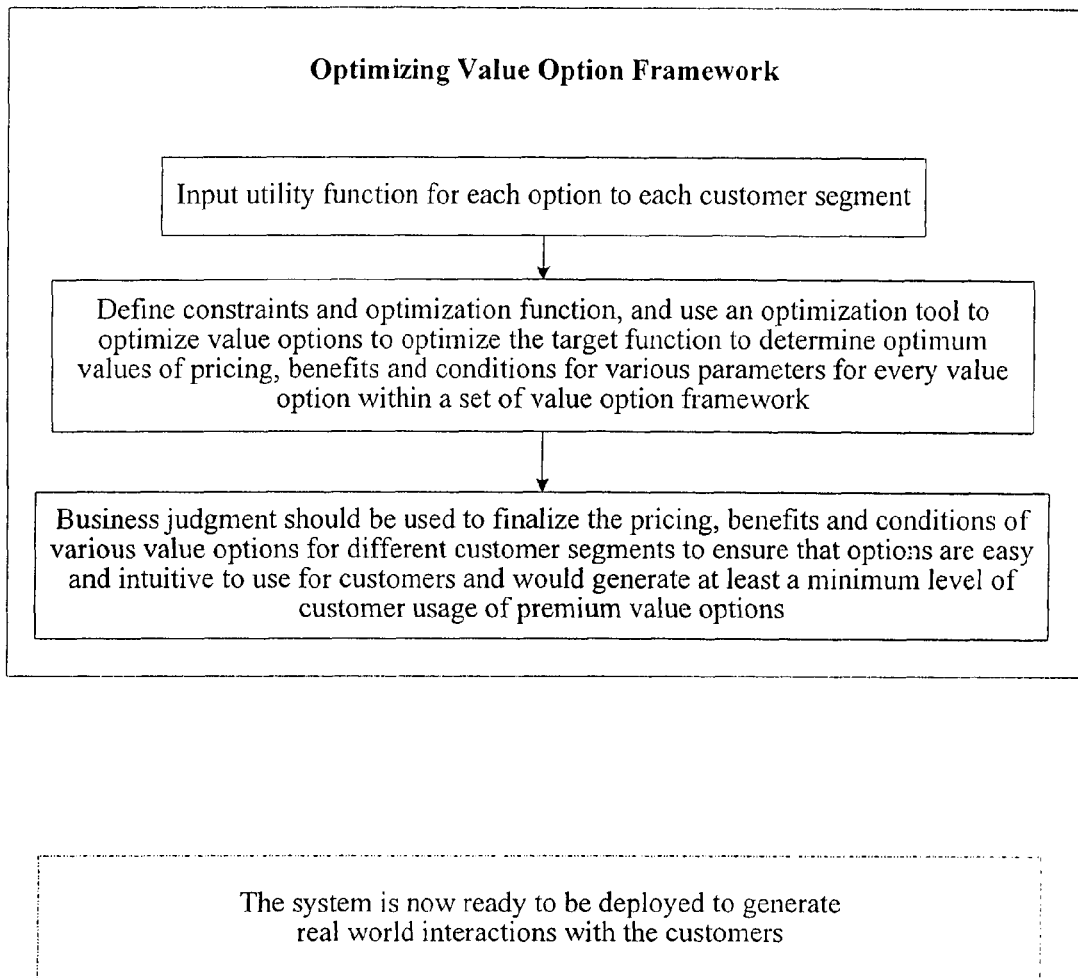
FIG. 7 is a flow chart illustrating optimization of a value option framework.

As an optional last Act in the first stage, as shown in FIG. 7, a financial analysis may be performed on the value option framework using the existing company and customer data to determine optimum pricing values and conditions of the value options. In other words, a company using the system and method can build utility functions based on cost and benefit equations of various options, and then can optimize across any one or combination of such functions. Any standard non-linear constrained optimization software tool can be used to run iterations to determine optimized pricing and benefit values for different value options. Using standard sensitivity and scenario analysis techniques, a user can run what-if scenarios to determine the robustness of the value option framework. It is not necessary to perform this optimization to generate benefit from the new method and system taught above. However, performing optimization at this level may tend to increase the benefit derived.

Second Stage Using Value Option Framework

After completing the first stage of the method, the user has been able to create important value option frameworks and specific value options within those frameworks. The user has also segmented customers to be associated with each specific value option that may be applicable to each customer segment. The company is fully prepared now to use a structured format comprising value options and questionnaire to interact with its customers in real time to generate benefits for both customer and company.

The second stage of the new system and method, as depicted in FIG. 11, involves using the value option framework to interact with the customer to capture his or her requirements in detail. Once the customer selects a particular option, the system moves to the Event Optimizer stage, 11.1130, where the system reacts based on the event that may take place. The Event Optimizer, depending on the event, invokes an optimization algorithm, assesses the company operations in real time and optimizes across company operations and customer information to produce results that concurrently maximize the benefits for the company and the customer. The optimization may or may not modify the company product offerings to better suit the customer while simultaneously maximizing the company operations. Both of these steps will now be discussed in detail.

1. Dynamic Interaction to Determine Customer Demand in Detail (Act 11.1120)

In this Act, the company interacts with its customers in a structured format asking questions and/or offering value options. Preferably, this interaction occurs using a web-based data collection system. As stated above while an Internet based interaction is probably the most cost-effective approach to data collection, other methods may be employed, if preferred, or a combination of methods may be used.

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 2.210 based on the value option framework created in the first stage to deal with different customer segments.

2. Event Optimizer

Figure 12:
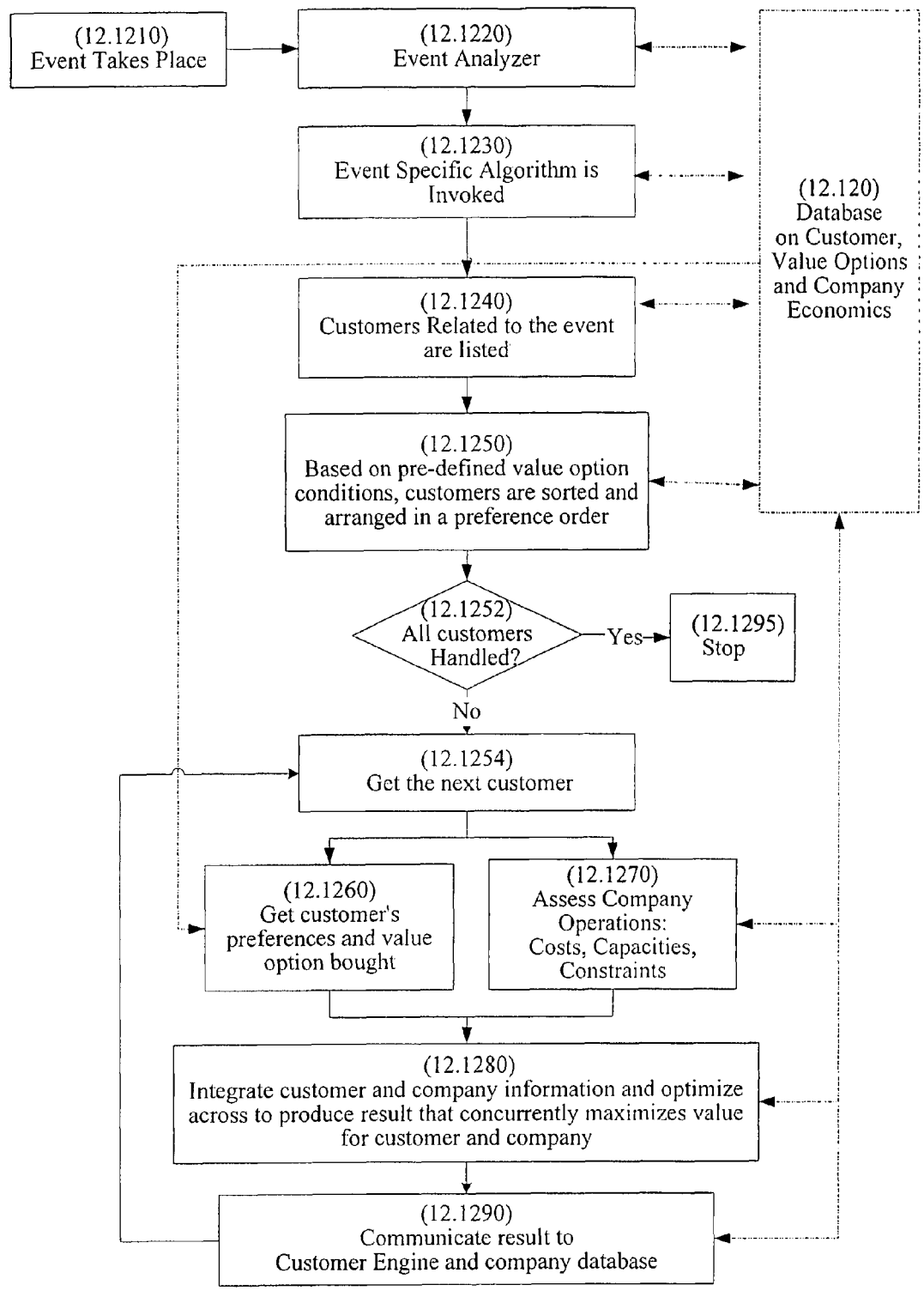
FIG. 12 is a diagrammatic illustration showing generally how an event is processed by the system and method shown, to fulfill a company's obligations to its customers as shown herein, delivering optimized results to the company and the customers.

Once the customer selects a value option, the system goes to the Event Optimizer phase where different steps are executed depending on the event that may occur. The event(s) is(are) related to the value option selected in the first Act. Turning to FIG. 12, the typical Event Optimizer architecture is shown. An Event Analyzer 12.1220 is a module that receives notifications of events and notes when a monitored event occurs. Event Optimizer analyzes 12.1210 the event and invokes an optimization algorithm specific to the event that is detected. Using that algorithm, the Event Optimizer collects the information on related customers and assesses the company operations in real time. A third Act takes the information collected from the previous two steps and uses predetermined criteria to optimize company operations along with customer demand. In this Act, the various scenarios are generated which optimize the total product value for the customer and profits and gains for the company. More details on the Event Optimizer are provided in the System Architecture section.

A user may create a value option framework, which includes a series of events. In this case, the Event Optimizer, after optimizing the result for the first event, may offer the results to the customer. The customer may or may not accept the results. If the customer does not accept the result, the Event Optimizer may move on to handle other subsequent related events, and may again come back to the customer with more results. This process could be repeated several times depending on industry selected, the configuration and type of value option framework, and customer behavior.

Summary of Second Stage

In the second stage of the new method and system, the company interacts with the customer in a structured format to capture customer needs, preferences, flexibilities and relative utilities in detail. The next stage involves an Event Optimizer as explained above. The customers associated with the event are enlisted and sorted by pre-defined criteria. The Event Optimizer collects customer information from the data store and also assesses company operations in real time before integrating this information to produce one or more optimized results that concurrently maximize the benefits for the customer and company.

System Architecture: To Use and Implement an Instance of the Method

The system architecture as shown in FIG. 2 may be used to implement the new system and method taught above. The Value Option Creator (Box 2.240) allows the user to create and configure different value options that can be offered to the customers to capture their needs and preferences in detail and in a way that can be used to optimize across company operations. The Event Optimizer (Box 2.250) allows the company to optimize across company operations and customer needs when an event is triggered to provide a product offering that maximizes both customer utility and company profitability. A company would use the Customer Engine (Box 2.230) to interact with its customers via different channels. Each of these three sections is defined below in detail.

Customer Engine

The Customer Engine provides different interfaces that a company maintains at different channels, which are utilized to interact with the customers. These channels may include, but are not limited to, the company's website via the Internet, the company's call center via phone, and the company's retail outlet via in-person. The Customer Engine enables the company to ask questions and/or offer value options to customers in a pre-configured structured format. The Customer Engine generates its interfaces based on the data stored in the data store and populated by the Value Option Creator. The customers provide their responses and select value options that suit them. The Customer Engine then communicates back and stores customer responses and selections in the data store. The Customer Engine also may communicate the optimized results to the customer as and when generated by the Event Optimizer.

Value Option Creator (VOC)

The Value Option Creator allows a company to design, create and configure different value option frameworks and corresponding value options that can be offered to a customer to capture his or her needs and preferences in detail and in a way that can be used to achieve optimization across company operations. A company would use the Value Option Creator module to perform some or all of the following:

Develop various value option frameworks based on selected value elements and corresponding company economic factors.

Segment customers by one or more criteria. A customer segment may include one or more customers.

Develop costs, revenue and service functions based on a company's operations prior to using the herein-described system and method. The company may prefer to express cost elements in a real-time (i.e., up to date) dynamic fashion in order to be able to fully assess the profitability or contribution of each product sale opportunity.

Develop various value options within each value option framework.

Configure each value option differently (or keep it the same) for different customer segments. This involves choosing pricing, benefit conditions and the proper questionnaire for each value option for different customers.

Develop costs, revenue and service functions after the user (company) has designed and configured various value option frameworks.

To measure in real time or in quasi-real time the value benefit created for the passenger and/or company by implementing the new system and method in part or in full.

Optimize each value option framework and associated value options to determine optimized pricing and benefit schemes for the value options, in order to maximize the benefit for both the company and customers. What-if scenarios may be run to test the robustness of the value option frameworks' models.

The Value Option Creator (VOC) intakes the cost functions (marginal and total), revenue functions, utility functions, customer segments, capacity (scheduled and available) functions and other economic factor functions of the company. The VOC can be configured to store various customer value segments on which a user may want to build value option framework and associated value options. A user can also enter the constraints and ranges to perform pricing optimization to determine optimum pricing and the benefits of various options.

Ideally, a user may be able to create a Value Option Creator that is industry and company-independent and can be used in several industries. Due to time and resource constraints, however, it is perfectly satisfactory for a user to build a less scalable and flexible industry-specific Value Option Creator.

Event Optimizer

The Event Optimizer allows the company to optimize its "bottom line" across company operations and customer needs, when an event is triggered. This is achieved by providing a product offering that maximizes both customer utility and company profitability. A suitable system architecture (i.e., overall flow) for the Event Optimizer in shown in FIG. 12. The following describes each Act in detail:

The Event Optimizer may start its functioning when a particular event is triggered (i.e., occurs and is detected at the time of purchase or later), Act 12.1210. The Event Analyzer (12.1220) analyzes the type and category of the triggered event by matching it with the list of events listed in data store 12.210. Once the event type is determined, the Event Analyzer searches the data store for an optimization algorithm that is associated with the triggered event, and executes that algorithm. (Such algorithms, naturally, have been developed and stored in the data store at an earlier time.) The algorithm collects from the data store a list of the customers that are associated with the triggered event, Act 12.1240, and sorts them based on pre-defined criteria listed in the value option framework associated with the event, Act 12.1250. The first customer is taken from the sorted list and his or her preferences and value option selection are retrieved from the data store. Act 12.1260. The algorithm then makes a real-time assessment of the company operations to get up-to-date costs, capacities and constraints. Act 12.1270. The information collected in the above two steps is then integrated (Act 12.1280) and, based on a pre-defined criteria, the algorithm optimizes across the company information and customer preferences to produce one or more results that concurrently maximize the benefit for both the company and the customer. The results are preferably communicated to the Customer Engine and to data store 12.210, Act 12.1290. These steps are repeated until all the customers have been taken care of Steps 12.1252, 12.1254 and 12.1295.

Figure 13:
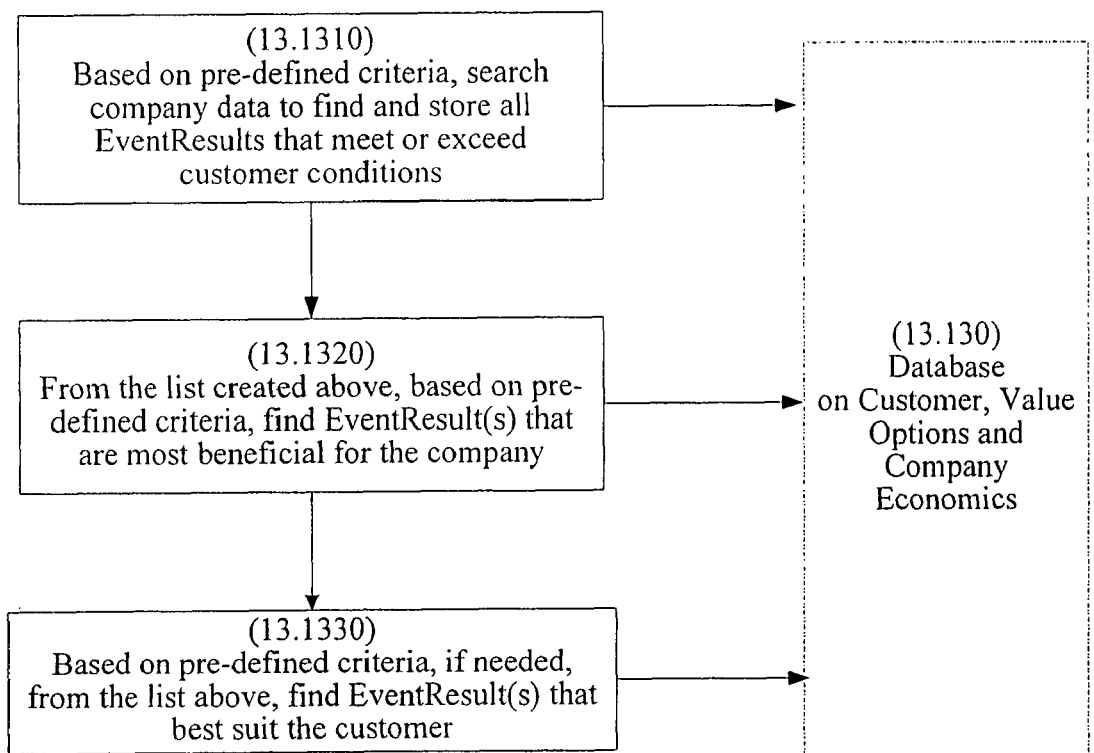
FIG. 13 is a flow chart expanding Act 1280 of FIG. 12.

FIG. 13 expands the Act 12.1280 to show the detailed sub-steps. The first Act (Act 13.1310) is to search the company data, based on pre-defined criteria, to determine and store all EventResults that meet or exceed the customer conditions (based on the value option selected and other preferences). An EventResult is a potential resultant output of an event to the customer and the company. The next Act 13.1320 is to determine from the stored list, those EventResults that are most beneficial to the company. If needed, another Act (13.1330) is performed to determine from the selected EventResults from the Act 13.1320, those results that best suit the customer.

Depending on the event type and related value option framework, the event-specific algorithm may communicate optimized results to the customer one or more times, depending on the algorithm and customer behavior.

Business Model to Implement Value Option Frameworks Related to the Invention

Different business models may be used to implement a value option framework as described in the current invention. The business models mentioned below, without limitation, may be used to implement any value option framework in any industry. As an example, a company may choose to implement a FRO VOF (explained later) individually or in conjunction with one or more partners and/or other companies.

The OA and the company may engage in a business agreement to implement one or more value option frameworks. The business agreement may divide the total benefit generated by said value option framework between the two parties using any mechanism or criteria as desired. The total benefit may be shared between the two parties. The company may allocate one or more products to the OA. One or more companies may allocate only a part of or their entire product inventory to the OA to offer those products to the customers by way of regular and/or as options. In return, the OA may offer some revenue or fee to the company for all or a portion of the products allocated. This fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date. There may be one or more conditions associated with the return of unused options and/or regular products, including, but not limited to, returning the same product, returning a higher value product and so on. The company may allot OA at least one product and said OA may deliver option on at least one of said allocated products. The OA may or may not enter into an agreement with the company to provide such option on its products. The OA may sell back at least one allocated product to said company or to at least one entity other than the company or both.

An OA may formulate an agreement with one or more companies on one or more VOFs to offer a combination of VOFs to customers. Said VOF may include different terms and conditions. For example, a customer may receive option price only from the company even if he/she is receiving products and/or options from the OA. Similarly, the customer may receive option price only from the OA even if he or she selected the products and/or received the options from the companies. The condition may also be set for a customer to make one or more payments to the company for the products and receive one or more payments from the company for the options received from that company, and to make one or more payments to the OA for the products and receive one or more payments from the OA for the options received from that OA. The condition may allow the customer to receive partial payments from the company and the rest from the OA or vice versa, the basis of which distribution may depend upon various factors, including, but are not limited to, the factors of company's choosing, the arrangement between the OA and the company and so on. In another example, the customer may receive the option price from the third party or may receive the option price from any of the combination of the entities mentioned above.

A company may allocate some inventory of one or more products to another entity such as an OA or Option Aggregator. The term "allocation of product inventory" "allocation of product(s)" implies, without limitation, assigning one or more units of one or more products to an entity for any purpose or use by the entity either exclusively or non-exclusively. The allocation of product may be conditional. For example, one of the conditions may require a return of at least one allocated product within a specified time period and/or other consideration(s).

Figure 13A:
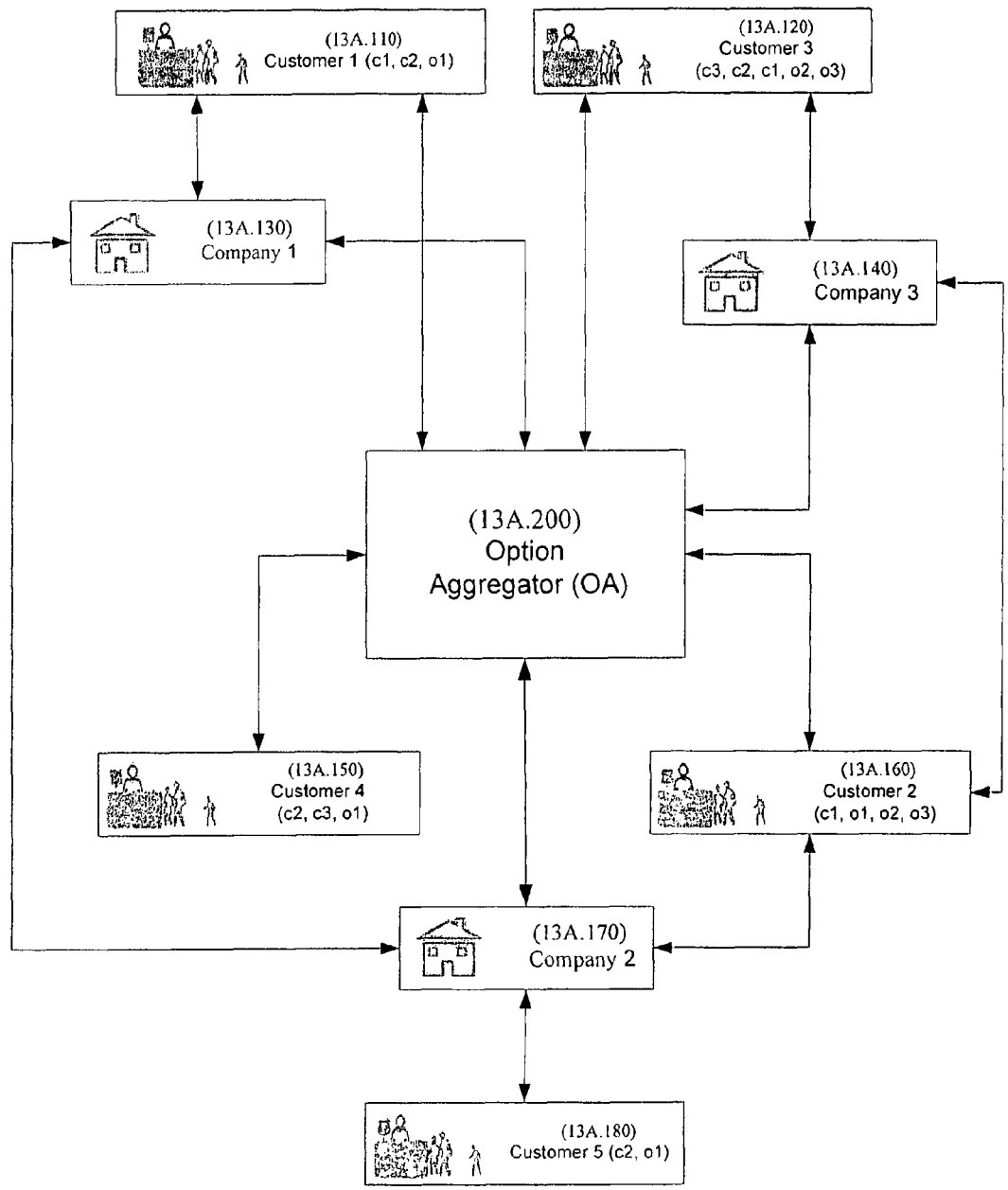
FIG. 13A is a diagrammatic illustration of various business models.

The customer may receive products and/or options from one or more of the company or OA or any combination thereof. For example, the FIG. 13A displays one example where three different companies choose to allocate one or more products to another entity (i.e., OA in this example). The OA may use the allocated products to operate a service to satisfy different needs of the customers. In FIG. 13A, the companies and their products are designated as Company 1/Product c1, Company 2/Product c2 and Company 3/Product c3 as shown by the Boxes 13A.130, 13A.170, 13A.140, respectively. In another arrangement, Company 1 and Company 2 may act together to implement the value option framework and may allocate one or more products to the OA which may on its own or together with either one or both the companies and may operate the service to offer said value option framework to the customers. Box 13A.110 represents Customer 1 receiving product c1 and c2 from Company 1 and an option o1 from the OA. The Box 13A.120 represents Customer 3 receiving product c3 from Company 3 and products c1 and c2 from the OA and options o2 and o3 from Company 3. In Box 13A.160, Customer 2 receives product c1 from the OA and options o1, o2 and o3 from OA, Company 2 and Company 3 respectively. In Box 13A.150, Customer 4 receives products c2 and c3 and also option o1 from the OA. In Box 13A.180, customer receives both product c2 and option o1 from Company 2.

There may be more combinations and arrangements among one or more companies, the OA and/or the customers. The companies and the OA may, without limitation, work together as partners, joint ventures, all together separate entities, partnerships etc., to offer and implement the value option frameworks related to the novel invention. The business model may be used with all the value option frameworks of the current invention which may involve some customization for the specific value option framework.

The customers may approach OA in many different ways and the same may depend on one or more factors including, but not limited to, way of implementation, type of implementation, one or more factors of choice of the company, OA, third entity and/or any combination thereof. In one of the ways customer may approach OA through phone as shown in Box 13B.140 and Box 13B.130 of FIG. 13B to avail services from the OA. In another instance as shown in Box 13B.110, the customer may approach OA through Internet. The customer may use other ways of approaching the OA, which may include, but not limited to, fax, telex, mail and personal contact. In one of the implementations of the OA Business model, the OA may validate the Order with which a customer wishes to avail an option and it may be validated in coordination with the company from whom the customer has received said Order as shown in Boxes 13B.150 and 13B.160. Order validation process runs to validate the Order from the company server and the data store may be updated accordingly as shown in the Boxes 13B.150, 13B.160 and 13B.170. The validation process may involve back and forth interaction between the data store and/or servers of the OA and/or the company and/or any third party. There may be updates in the data store even if the Order is not validated. The company server may also provide OA with the information of its inventory.

If the Order is validated, the process may request the customer to enter the search criteria. Search is made corresponding to the search criteria entered by the customer (Box 13B.180). The server application may be used to provide a given set of Options corresponding to the search criteria (Box 13B.190). To provide the set of options, the server application may interact back and forth with OA server and/or OA option data store.

Next, if the customer opts for one or more options (Box 13B.210) and finalizes the same (Box 13B.230), various databases relating to the company, OA and/or any third party may be updated and the relevant transaction along with other information may be stored and/or updated as per Boxes 13B.170 and 13B.200. Once the databases are updated on finalization of the option, the control goes to Box 13B.300, where the process ends.

If the customer does not opt for the options presented, another test is performed to determine whether the customer wants to re-enter, modify and/or repeat the search criteria (Box 13B.220). If so, the process loops back to Box 13B.180, where the customer may be required to re-enter, modify and/or repeat the search criteria.

If the order is not validated or if the customer wishes not to re-enter/modify and/or repeat the search criteria, the control goes to Box 13B.300, where the process ends.

In one of the implementations of this business model and system, the servers and/or the data stores may belong only to the company, OA, third entity and/or any combination thereof.

Information Technology System for the Value Option Framework

A client-server architecture may be used to implement the value option framework. However, a company may use a computer hardware and software infrastructure of its choosing to implement a particular value option framework for achieving concurrent optimization.

One or more servers may be used for the system and one or more medium of communications may be used between the customer and the company and/or the OA and vice versa including, but not limited to, a highly secured VPN and Internet. There may be a cluster of servers to implement the system. One or more of such servers may be located at the premises of the company, OA, third entity and/or any combination thereof. Such premises may also be an offshore location which may or may not be accessible remotely. One or more databases may be involved and may be updated on a real time basis.

Figure 13C:
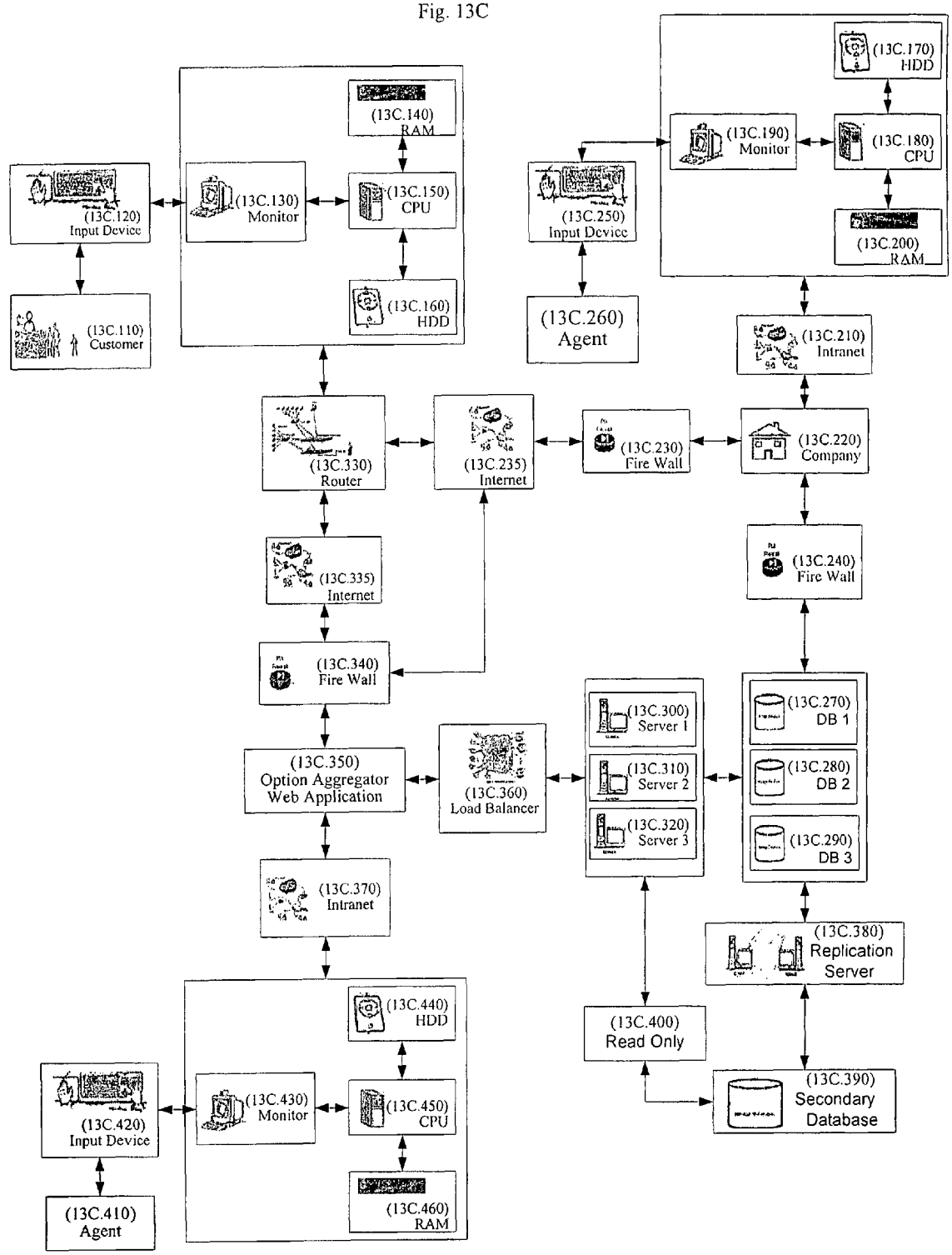
FIG. 13C is a diagrammatic illustration of one of the network system to implement the system.

The FIG. 13C shows one of the ways by which the different entities involved and participating in the value option framework, interact and may participate in the value option framework. There may be other ways for implementing the value option framework which may depend upon including, but not limited to, the scale of the implementation, business requirements and number of entities involved. The entities may interact through a series of hardware products and services with the OA/company server(s). The OA may or may not be different than the company and the OA server may be the same as that of the company server. One of the entities shown in FIG. 13C is customer (Box 13C.110), who uses input device (Box 13C.120) to enter the requirements. The customer inputs are processed through the CPU (Box 13C.150) and one or more Hard Disk Drives (Box 13C.160). RAM (configuration of which may depend upon different factors) is used as memory device (Box 13C.140) while processing the customer input. The customer may approach the OA and/or the company through one or more series of Routers, Internet, Firewall and other hardware (Boxes 13C.330, 13C.335, 13C.340 respectively). The interactions between the company and/or the OA and the customer may pass through one or more load balancers (Box 13C.360) that distributes load across one or more servers as shown in Boxes 13C.300, 13C.310 and 13C.320. OA servers may update one or more primary database as shown in Boxes 13C.270, 13C.280, 13C.290. There may be one or more secondary databases (Box 13C.390) that may only be in the "Read Only" form (Box 13C.400) and may be updated through one or more replication servers (Box 13C.380). Alternatively, the company may have one or more separate temporary database structure wherein the entries are updated and stored until the final update is made in one or more main databases. One the final update is done, the entries in these temporary databases may be removed.

OA may interact with the application through Internet (Box 13C.350). OA application servers may also distribute load between one or more servers of OA and/or the company through one or more load balancers. Agent (Box 13C.260) may interact through input device as shown in the Box 13C.250. Input information may be processed by the CPU as shown in the Box 13C.180 with the use of one or more RAM, Hard Disk Drives (HDD) as shown in the Box 13C.200 and 13C.170 respectively. It may interact with the company through the Intranet (Boxes 13C.210 and 13C.220). The company and the OA may interact through a series of routers, firewalls and Internet (Boxes 13C.330, 13C.335 and 13C.340).

There may be another agent on behalf of the OA (Box 13C.410) which may input through one or more input devices (Box 13C.420). The information may be processed through the monitor, one or more hard disk drives, RAM and CPU as shown in Boxes 13C.430, 13C.440, 13C.460 and 13C.450 respectively). One of the ways in which said agent may interact with OA is through highly secured Intranet as shown in Box 13C.370.

The entire process may run at the premises of OA, company and/or any third entity or any combination thereof. It may also be possible to run a part of the system at one place and rest at one or more other places. The system may also be implemented even if one or more servers may be kept offshore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

Figure 13D:
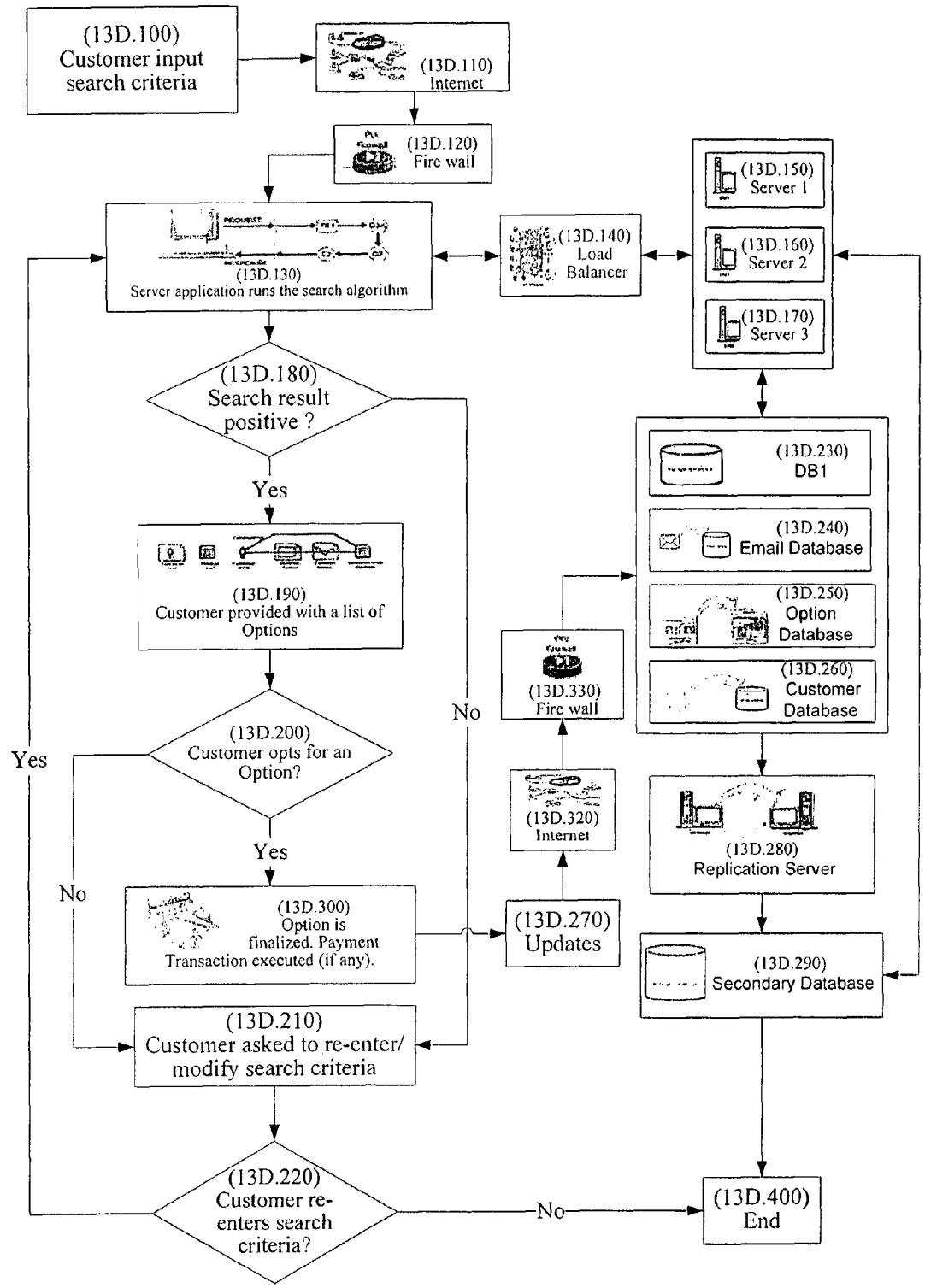
FIG. 13D is a diagrammatic illustration of implementation of one of the stages of a value option framework as a system.

Information technology is a part and parcel of the novel invention. The value option framework as a system may require integration with various hardware and/or network services. This is illustrated in FIG. 13D where a detailed implementation of one of the stages of value option framework is described duly integrated with the hardware products and services.

The customer inputs search criteria as shown in the Box 13D.100. The web page and/or the application may be hosted on the company's server, OA's server, any third entity's server and/or any combination thereof. Such a server may be located at the premises of the company, OA, any third entity location and/or any combination thereof and such a location may include an offshore location. The customer may approach the web (server) application of the company through Internet and one or more Firewall etc. as shown in the Boxes 13D.110 and 13D.120. The medium by which a customer reaches (approaches) the company web (server) application may vary depending on different conditions which may include, but not limited to, the best available communication medium at a particular time, scale and type of implementation of the value option framework and factors of company's choice.

Server application runs the search algorithms (Box 13D.130) corresponding to the customer requirements in association with one or more servers of the company as shown in the Boxes 13D.150, 13D.160, 13D.170 respectively. The servers may include, but are not limited to, web servers, application servers, database servers and networking servers. Said application may be hosted internally on one or more servers and databases either by the company and/or the OA or may be hosted on any third party's server. The servers may also be the servers of the OA or the servers may be run jointly by the company, OA and/or a third entity. Load balancer (Box 13D.140) may be utilized to distribute load across one or more company servers. The search algorithm may interact back and forth with one or more database including, but not limited to, email database, option database, inventory database, customer database, company database as shown in Boxes 13D.230, 13D.240, 13D.250 and 13D.260.

A test is performed to determine whether the outcome of the search algorithm is positive as shown in the Box 13D.180. If the outcome is negative, customer may be asked to re-enter/modify the search criteria (Box 13D.210). If the outcome of the search algorithm is positive, the customer is provided with a list of options as shown in the Box 13D.190. Once the customer is provided with a list of options to choose from, another test is performed to determine whether the customer has opted for one or more options (Box 13D.200). If customer has not opted for an option, then customer may be asked to re-enter/modify the search criteria (Box 13D.210). If the customer re-enters the search criteria, the control loops back to Box 13D.130 wherein the server application runs the search algorithm on the basis of the inputs received from the customer.

If the customer opts for an option and the option is finalized, at least one payment transaction is executed (if any) (Box 13D.300) and one or more databases may be updated (Box 13D.270) through internet, firewall as shown in Box 13D.320 and 13D.330. Said updates may also be done through one or more routers, highly secured VPN Network etc. Said primary databases including, but not limited to, email database, customer database, inventory database, option database may be updated correspondingly as shown by the Boxes 13D.230, 13D.240, 13D.250 and 13D.260. There may be corresponding updates in the secondary databases also (which are in "Read Only" format) as shown in Box 13D.290 through one or more replication servers (Box 13D.280). Alternatively, the company may have one or more separate temporary database structure wherein the entries are updated and stored until the final update is made in one or more main databases. One the final update is done, the entries in these temporary databases may be removed/deleted/discarded.

The algorithm ends after the needed updates are made in one or more databases and/or one or more severs or if the customer desires not to re-enter/modify the search criteria (Box 13D.400).

Figure 13E:
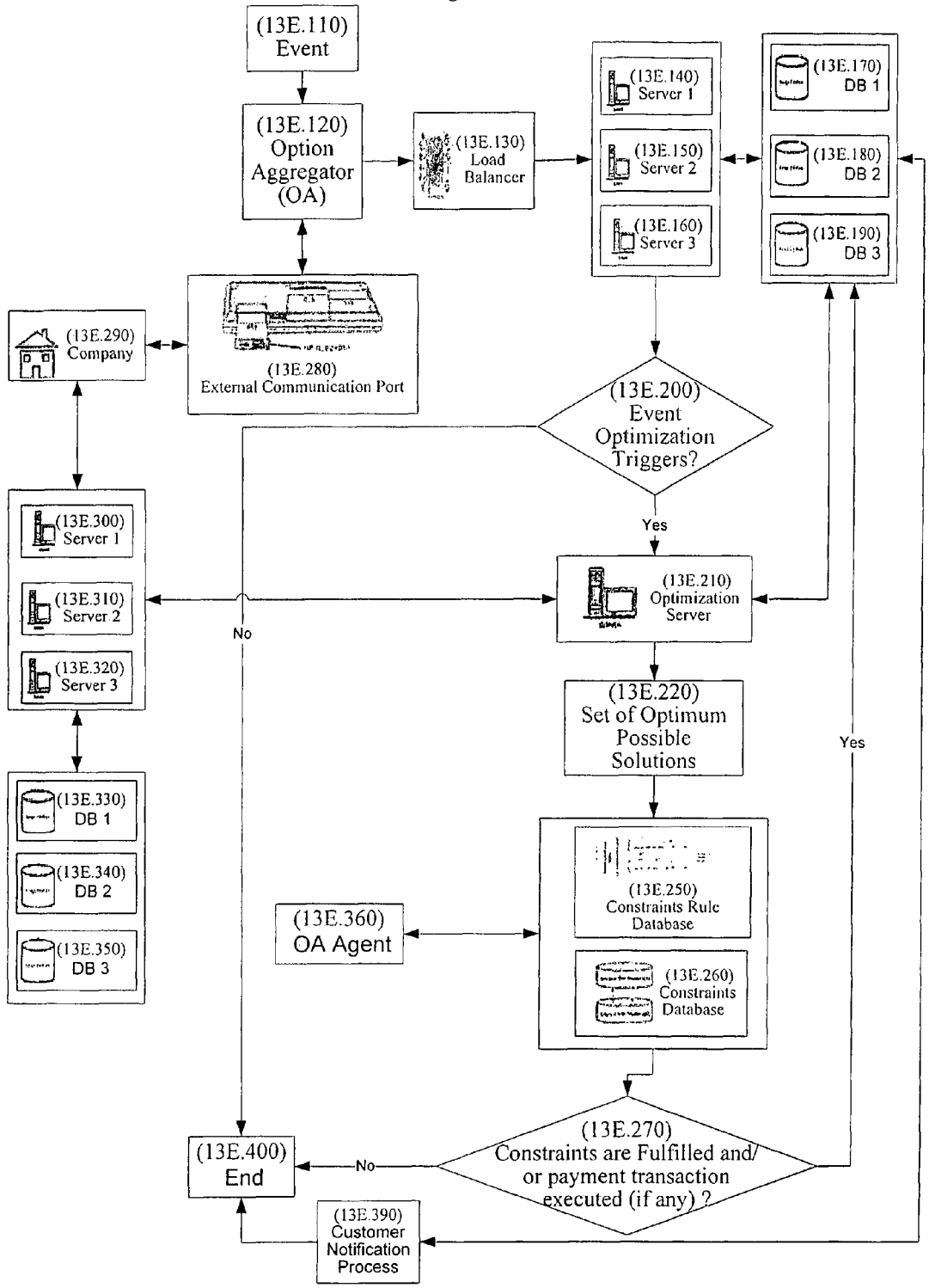
FIG. 13E is a diagrammatic illustration of implementation of event optimizer stage of a value option framework as a system.

Second stage in the value option framework is achieving concurrent optimization for at least two of the company, customer, OA, third entity or any combination thereof on occurrence of an event. FIG. 13E describes one of the ways of using the information network system in which interaction between OA, company and event (which may be triggered by the company, OA, customer, any third entity or any combination thereof) takes place.

FIG. 13E presents a diagrammatic representation of a chain of actions that takes place corresponding to occurrence of an event. There may be one or more different ways in which said action may take place and may depend upon the factors including, but not limited to, the arrangement between the OA and the company, factors of OA and/or company's choosing and one or more mediums of technology utilized in the system.

If an event is reported to an OA (Box 13E.110 and Box 13E.120), one or more load balancers (Box 13E.130) may be used to distribute the load across one or more servers (Boxes 13E.140, 13E.150 and 13E.160). One or more different databases (of OA, third entity, the company and/or any combination thereof) may also be updated as per the requirement and the nature of the event. Information is processed through the servers using one or more RAM, Hard Disk Drives and other hardware products and corresponding to the occurrence of the event, updates are made in one or more databases as shown by the Boxes 13E.170, 13E.180 and 13E.190. One or more company servers and databases (shown by Boxes 13E.300, 13E.310 and 13E.320 and Boxes 13E.330, 13E.340 and 13E.350 respectively) may also be updated using external communication medium/port (Box 13E.280). The servers may include, but not limited to web servers, application servers, database servers and networking servers. One or more said databases include, but are not limited to, email database, option database, customer database.

Next, a test is performed to determine whether the Event Optimization process has been triggered by the occurrence of the event as shown in the Box 13E.200. If the Event Optimization process has been triggered, the process goes to the Optimization server (Box 13E.210). If the Event Optimization process has not been triggered, the process ends at Box 13E.400.

The Optimization server interacts with one or more databases including, but not limited to, the optimization rule database and customer rule database as shown in the Boxes 13E.170, 13E.180 and 13E.190. One or more optimization algorithm may be run within the optimization server using one or more RAM, Hard Disk Drives. As a result of optimization algorithm, the Optimization server may give one or more possible optimum solutions depending on the factors and rules determined by the company, OA and/or any third entity or any combination thereof, as shown in the Box 13E.220. A set of possible optimum solutions, then, passes through one or more databases including, but not limited to, constraints rule database and constraints (or validation) database as shown by the Boxes 13E.250 and 13E.260 respectively. While interacting with said database, the OA agent may also be approached as shown in Box 13E.260.

Next, a test is performed to determine whether the constraints are fulfilled and/or payment transaction is executed (if any) (Box 13E.270). If the constraints are fulfilled and the payment transaction is also executed (if required), a series of database updates as shown by the Boxes 13E.170, 13E.180 and 13E.190 may be done. Once one or more database are updated, the Customer Notification Process (Box 13E.390) takes place, in which the customer is notified, and the algorithm then ends in Box 13E.400. If the constraints are not fulfilled and/or payment transaction (if needed) is not executed, the process ends at Box 13E.400.

One or more such kind of information technology system may be implemented for the specific value option framework. The system may be customized as per the specific requirements of the company, value option framework, OA, any third entity, customers and/or any combination thereof.

Benefit of Using the System and Method

Through this method, a new efficient approach is introduced for managing customer relationships, sales cycles, marketing, customer service, market research and customer feedback. It eliminates manual, time-consuming processes and replaces those with an efficient, automatic process.

By maximizing total value for its customers, a company can greatly improve its overall business prospects. The company can look to build very high customer retention rates and also increase the number of new customers gained per unit time. It can help to increase the overall sales and thus help increase the overall business value. The company may distribute a portion of additional value gained back to its customers to further strengthen its relationships with them, if it wishes.

A company may encourage customers to "opt in" to this system and provide the customer's preferences by giving rewards to customers to provide these preferences and commit early. The value options may be created and priced to motivate customers to make choices that both satisfy their needs and simultaneously allow the company to improve its operations.

This method further adds new dimensions to business parameters like inventory. Previously, for a company, inventory was either "Committed" or "Available." This method adds a new dimension of "flexibility". With the customer preferences and needs taken beforehand, we add the dimension of flexibility to the inventory. For example, a booked flight seat would conventionally be called committed inventory. But now within the new methodology, if the ticket-holding customer is flexible, his ticket may fall into a pool of flexible inventory availability, which may be sold to other customers, if necessary.

Another advantage is that the method creates a new type of inventory, called customer inventory. Once the method had been used for some period of time, a company, by using its powerful value option framework, would be able to capture its customers' and potential customers' future needs in advance. In other words, within the realm of company product offerings, the company would collect information on which customers want to purchase what products, when and with what specifications or parameters. Combining this individual customer data across thousands of customers would generate a customer needs and preference database with appropriate classification and parameters. The needs (and/or preferences) of this database could be classified as customer inventory wherein the items in inventory are the needs of several groups of customer with similar needs. Once the company has built such a database, they can use the customer inventory as and when needed in optimizing their internal operations to maximize value for both the company and the customers.

The method allows a company to move from a knowledge-based system to an expert system, which optimizes the decisions based on customer preferences and company economics. The method allows the companies to market a whole new paradigm of services and products surrounded around their original product offerings. This is achieved partly by unbundling formally bundled components of existing products, into components offered to the customer and partly by building new products and services. This allows the customers to choose product features they wish to purchase and saves the company from making investments and incurring costs in providing product components to those who don't want or desire those components.

In summary, it can be said this method accomplishes the following: (1) makes a business more attractive to customers by enabling customers to express their preferences; (2) makes a business more efficient and reduces costs; (3) allows a company to handle problems and disruptions in a quick, efficient manner to generate high customer satisfaction and keep their costs low; (4) helps a company to increase and strengthen its customer base, improve sales per customer, and customer retention, and (5) helps to increase the value customers gain from the purchased products.

The above method may be applied to several industries including, without limitation, airlines, hotels, automobiles, media, entertainment (television, radio, internet, etc.), furniture, insurance, computer hardware, travel (e.g., vacations, car rentals, cruises), events (such as theatre, movies, sports games etc.). There may be several other industries that may benefit by using the new system and method.

Some value option frameworks related to the invention were described in full detail in incorporated-by-reference patent application Ser. Nos. 11/506,451, 11/474,115 and 10/973,802 and in each of international applications PCT/US2007/014654 and PCT/US2007/014653. Discussions of these VOFs may be omitted or abridged herein; however such aspects are nonetheless intended to be part of this application and reference to these other applications may prove helpful for a fuller appreciation of the invention. A few value option frameworks will now be described in detail.

Flexibility Reward Option (FRO) Value Option Framework

The creation and utilization (in two stages or acts) of another value option framework will now be discussed. This is the Flexibility Reward Option (FRO) VOF. A company may implement the FRO VOF in any industry. The customer desire to trade-in flexibility (defined below) is used as the targeted value element. A detailed demonstration of the FRO VOF is presented followed by a few examples of applying the FRO VOF within other industries.

The first stage in the FRO VOF involves steps (or acts) of: capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. The specific detailed steps with respect to the FRO VOF will now be discussed.

Figure 14:
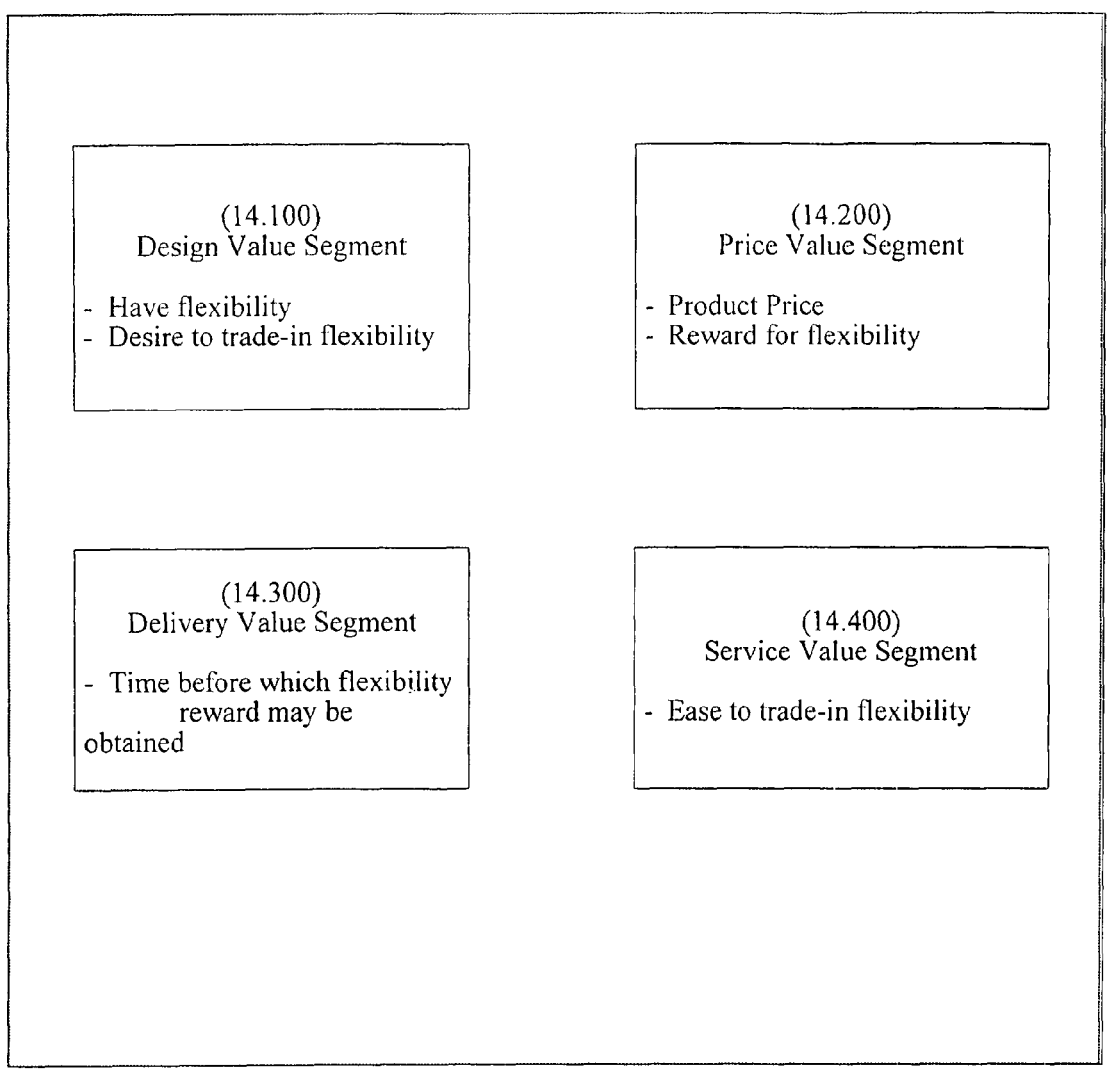
FIG. 14 is a diagrammatic illustration of an exemplary set of value segments and their value elements related to the FRO VOF.

First Stage Formulation of FRO Value Option Framework (1) Capturing Customer Dynamics FIG. 14 shows an analysis of the value elements that are believed to matter to customers in relation to a FRO. In the design value segment, shown in Box 14.100, important value elements may include, but are not limited to, the customers' flexibility in purchasing products and their desire to trade-in their flexibility. In the price value segment, shown in Box 14.200, important value elements may include, but are not limited to, Product Price and desired monetary/non-monetary reward to trade-in flexibility. In the delivery value segment, shown in Box 14.300, important value elements may include, but are not limited to, time before which a customer may be able to trade-in his or her flexibility to obtain the desired reward. In the service value segment, the important value elements may include, but are not limited to, the ease to trade-in flexibility, as shown in Box 14.400. It may be important to estimate the relative preferences and utilities of these value elements to different types of customers.

The customers' desire to trade-in their flexibility is subjective in terms of the length of the "flexibility trade-in period" and the "range of flexibility". The term "flexibility trade-in period" refers to the time period during which a customer is willing to trade-in his or her flexibility. The term "range of flexibility" refers to a range of product features and/or components across which a customer is flexible. The flexibility trade-in period, range of flexibility and reward (as desired by customers in lieu of flexibility) are subjective and may differ from customer to customer, or even for the same customer, may differ from one situation to another.

(2) Assessment of Company Economics

An assessment of the crucial economic factors of a company, as indicated in Box 15.100, may reveal the factors to include, but not be limited to, fixed and variable costs, non-uniform distribution of demand across different Products under the same category (or products from various categories), the difficulty to accurately forecast demand, costs and customer dissatisfaction and ill-will from oversale, opportunity loss from capacity shortages and spoilage and so forth.

An assessment of the crucial economic factors of a company may be performed, to determine the factors that affect the profitability, growth and goals of the company. It might be beneficial if a company utilizing the inventive system and method were able to express cost elements in a real-time or quasi-real-time (i.e., up to date) dynamic fashion so that such information may then be used to assess the profitability or contribution of each product sale opportunity, and to facilitate the operation of the Event Optimizer (so that offers and actions may be based on real-time or near-real-time information).

(3) Integration of Customer Dynamics with Company Economic Factors

FIG. 15 also illustrates an example of how a mapping may be done, between the customer and company profiles, for the FRO VOF in any industry. On one side, there are customers who have flexibility and desire to trade-in their flexibility in lieu of rewards or benefits. However, customers are also concerned about any hassles, delays, frustration that one may go through if they participate in such an exchange. On the other side, a company faces an unbalanced demand that is difficult to forecast accurately. It would be certainly very helpful for a company to know the relative flexibilities of customers to receive different products.

The FRO VOF is created based on the value element "desire to trade-in flexibility". More specifically, as shown in the interaction between the Box 15.200 and Box 15.300, a mapping is performed between important customer value elements and the company economic factors. The value element "desire to trade-in flexibility" is extracted, as shown in Box 15.400 and a FRO value option framework is created.

(4) Formulating the "FRO" Value Option Framework

Structure of FRO Value Option Framework in Any Industry

Figure 16:
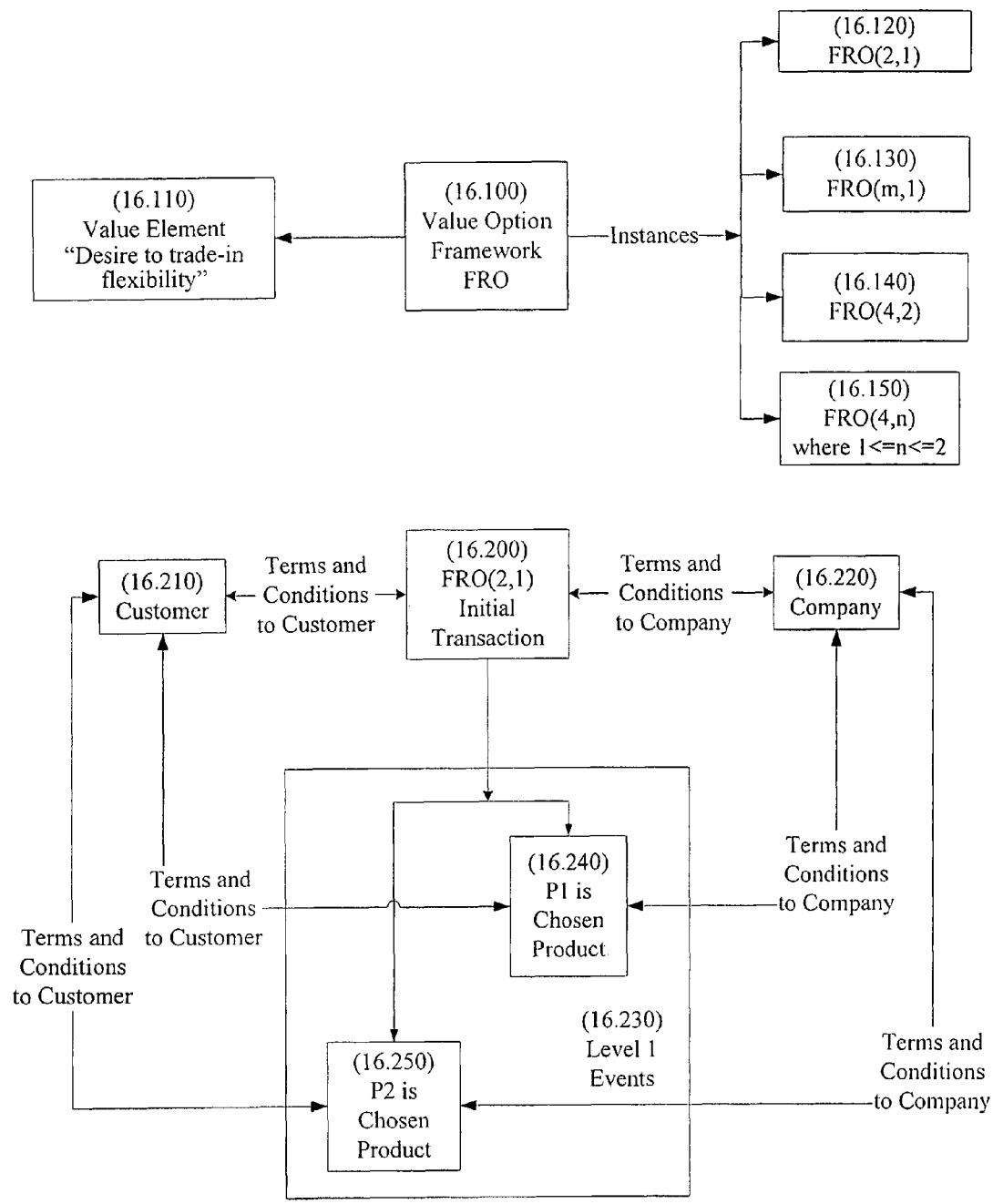
FIG. 16 is a partially-diagrammatic, partially-flow diagram representing the structure for creating a FRO Value Option Framework.

FIG. 16 displays the structure of a FRO value option framework (shown in Box 16.100) in any industry. The FRO value option framework is related to the value element "desire to trade-in flexibility", as shown in Box 16.110.

In the "Initial Transaction" for FRO, shown by Box 16.200, a customer (shown by Box 16.210) and a company (shown by Box 16.220) transact on the FRO value option. There may be one or more Events (shown by Box 16.230) that follow the Initial Transaction.

In a successful Initial Transaction for a FRO, the customer receives an option to utilize up to 'n' out of 'm' selected products (said 'm' products termed "FRO Products"). The 'n' products that are finally selected are termed "Chosen Products". After each of the 'n' Chosen Products is defined (or selected or chosen or received), the customer has the right to utilize (or can utilize) said Chosen Product. Apart from the 'n' Chosen Products, the remaining 'm−n' products are termed "Released Products". The Released Products (if any, that were probably held or blocked for said customer) may be sold to other customers as normal products or FRO Products or used for other purposes. The Released Products in relation to said option may be reused by the company before, after, at or any combination thereof, the time the Released Products and/or Chosen Products are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' products may be defined in one or more transactions. The value of 'm' and/or 'n' may be defined (and/or re-defined), at one or more times, by the company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Products may include one or more products other than said 'm' products.

The FRO Products may be selected by the company, the customer, another entity or any combination thereof. The FRO VOF may enable a company to obtain flexibility from FRO customers (i.e., those who select FRO) and use said flexibility to satisfy the product needs of other customers (i.e., who have relatively fixed or strong preferences). Therefore, the company would usually have the right to select (or define) the Chosen Products. However, in different implementations of FRO VOF, the company, the customer, another entity or any combination thereof may select one or more of the Chosen Products related to a FRO. The FRO Products and the Chosen Products may be selected by the same entity, different entities or any combination thereof. For example, the customer may select the FRO Products and the company may select the Chosen Products out of the FRO Products. The company may incorporate the customer information and the data related to the FRO into the sales, production, inventory, other database or information system or any combination of the above.

The time when an Initial Transaction is completed (i.e., the customer receives the FRO option on said m Products) is referred to as the Initial Transaction Time (or ITT, in short). One or more of said m Products may be selected, at one or more times, before, after, during, or any combination thereof, the Initial Transaction and/or the time said option is delivered to the customer (or the customer receives said option) or any combination thereof. All the FRO Products may be selected concurrently (i.e., all together in one transaction) or sequentially (i.e., in multiple transactions).

The delivery of an option may include, but not limited to, electronic delivery of the option, physical delivery of the option, any other mode of delivery or any combination thereof. Once said option is delivered, one or more of m products may be available for use by the company, an entity other than the company and/or any combination thereof. The value of 'n' may be defined before, after or any time, the option being delivered to the customer. The delivery of option may occur in relation to the customer purchasing at least one product. The delivery of option may also occur in relation to the customer purchasing a product other than the product on which the option may be delivered. The customer may purchase a product other than the product on which the option is delivered to the customer.

In the sequential case, a customer may select one or more Products in one or more transactions before the Initial Transaction. Said selected Product(s) (let's say X number of them), thus, may be considered as part of said m FRO Products of the FRO (m,n) transaction, and the customer may select only the remaining (m−X) number of FRO Products during the Initial Transaction. All the transactions used to select (or receive) all the m FRO Products of a FRO (m,n) instance are related to each other, and hence, are considered as "related transactions" (as defined earlier).

In a FRO VOF, the sequential process may comprise a number of "related transactions" when all the FRO Products are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In the related transactions, 'n' may be equal to 'm' when there may be at least one payment transaction between the company and the customer related to the products wherein such payment is made after the option has been granted. Said payment transaction may be one more transaction apart from the initial interaction and/or Initial Transaction in the event said customer utilizes all the 'm' products. The customer may select products prior to utilizing the penultimate product. The company, an entity other than said company and/or any combination thereof may reserve the right to limit the customer to 'n' products on, before, on or before, after, on or after or any combination thereof, a stated notification deadline date.

A company may choose to create one or more instances of the FRO VOF based on factors including, but not limited to, number of FRO Products, Chosen Products or Released Products, pre-determination of a number of Chosen Products or Released Products, flexibility trade-in period, other factors or any combination thereof. For example, a FRO based on a combination of the number of FRO Products (or m) and Chosen Products (or n) would be FRO (m,n). Some FRO instances are shown in Boxes 16.120, 16.130, 16.140 and 16.150. For example, when the number of Chosen Products is pre-determined, the FRO (4,2) instance may imply that the customer receives 4 FRO Products, on the condition that the company may select any 2 out of 4 Products as Chosen Products. When the number of Chosen Products is not pre-determined, the FRO (4,2) instance may imply that the customer receives 4 FRO Products, on the condition that the company may select none, one or 2 Chosen Products out of FRO Products. There may also be a minimum limit on n. For example, the FRO (4,n) (where 1<=n<=2) instance limits the company to select either 1 or 2 Chosen Products out of the 4 FRO Products.

The FRO (2,1) instance, two FRO Products and one Chosen Product, is used here as an example to demonstrate the details of the structure of a FRO VOF. Box 16.200 refers to the Initial Transaction between the customer and the company, in which they transact on a FRO (2,1) value option. In a successful Initial Transaction for FRO (2,1), the customer selects two FRO Products and the company may select any 'one' of those two Products as the Chosen Product.

The Initial Transaction may have terms and conditions applicable to the customer or the company or both. These terms and conditions may be set, preferably, to concurrently benefit both parties. The connections between Box 16.200 and 16.220, and Box 16.200 and 16.210 refer to the terms and conditions to the company and the customer, respectively.

The FRO VOF may or may not include any constraints on the FRO Products. For example, a company may restrict FRO applicability and availability on Products that satisfy specific criteria. The two FRO Products may or may not include practically constrained Products. Practical constraints may include one or more constraints that will prevent a customer to utilize one or more given Products or prevent the customer from utilizing all the FRO Products. Such constraints may include, but are not limited to, time constraints, location constraints and so forth. In other words, it may or may not be practically possible for a customer to utilize both the selected Products due to at least one practical constraint.

A customer may select (or receive) FRO Products in several ways; through mutual agreement (e.g., during a direct interaction such as a Product purchase), or the company may grant the FRO Products to the customer without soliciting their interest or permission. For example, to enhance customer satisfaction or for any other purpose, a company may grant FRO Products to customers based on the past customer behavior, interaction and so on.

The Initial Transaction may impose one or more conditions on the company. A company may be required to explicitly notify the customer prior to or no later than a given date and time (referred to as the Notify Deadline) regarding the Chosen Product. For simplicity, it is assumed that whenever the term Notify Deadline is used in the following sections, the condition requires notification prior to the Notify Deadline. If there is no such explicit notification condition, the Chosen Product may be decided as per the terms and conditions of the option contract. In either case, (explicit or implicit notification), the date and time when the selection of the Chosen Product is notified to the customer is referred to as the Customer Notification Time (or CNT, in short). In the current discussion, the explicit notification condition is assumed unless specifically mentioned otherwise.

A company may determine one or more Notify Deadlines for a product at one or more times (e.g., before, during, after the Initial Transaction or any combination thereof) using factors including, but not limited to, customer needs, expected value of the product, company profitability goals, any other factors or any combination of the above. Customer factors should also be considered in determining the Notify Deadlines, such as the flexibility trade-in periods desired by customers, or any other factor that may affect the behavior of a customer. The FRO VOF may or may not have a notification deadline condition.

In the context of the FRO VOF, the terms "price" or "reward" or "discount" normally refer to the price which the company may offer to the customer in relation to the FRO. However, in some of the implementations of FRO VOF, the customer may also offer a price to the company in relation to the FRO. The terms "price" and "reward" are used interchangeably as and when the context requires.

The FRO VOF may impose additional terms and conditions on the customer. The company and/or an entity other than the company may receive from customer, at one or more times, an indication of one or more terms and conditions associated with said option in the FRO VOF. Similarly, at least one of said company and/or an entity other than said company may deliver to said customer, at one or more times, one or more terms and conditions associated with said option in the FRO VOF. A customer may receive one or more rewards (or prices) in relation to the FRO. There may or may not be any payment transaction related to the Initial Transaction and/or other event related to the FRO. There may be one or more prices related to the FRO. A price may include, but is not limited to, a set of one or more Product Prices, a set of one or more FRO Prices (or Rewards or Discounts) or any combination of the above. A company may choose to implement FRO Prices in many ways. For example, a customer may pay a Product Price to receive a group of products, and then, may choose to get FRO on said products and thus, receive FRO reward. A company may use the method of its choosing to decide on all the Product Prices.

The customer may receive one or more prices during the Initial Transaction (which is referred to as an Initial Price), at the CNT (which is referred to as an Exercise Price) and/or at any other time, which may or may not be pre-determined between the customer and the company. The price may be a function of number of FRO Products and/or Chosen Products, specific products to be granted for FRO Products and/or Chosen Products, Notify Deadline, one or more Product Prices, any other factors of company's choosing or any combination of the above.

The price may comprise a monetary value or a soft/non-monetary value (e.g., benefits, coupons or exchange of another service) or other consideration. The FRO Price may be fixed or variable, with or without bounds. The company may set permissible range(s) or boundary limit(s) within which the FRO Price may vary, or it may offer the customer a set of prices to choose from. Since price conditions may depend upon various factors, which may or may not be variable, the same may be decided at anytime. The price conditions may be determined by the customer, the company, another entity, or any combination thereof at one or more times. One or more prices (FRO Initial or FRO Exercise or any other price) may be a negative value, which reflects that instead of the company rewarding the customer, the customer shall pay a price to the company to get the desired Product as the Chosen Product.

Different price strategies may be implemented in the FRO (2,1) instance. For example, a single Initial Price could make it attractive and easy for the customer to participate in the FRO program. One or more of the FRO prices (rewards) may be embedded with the Product Price by using a special Product Price. A customer may be presumed to accept the FRO offer while displaying the Product Price (that has the FRO Price embedded in it). These presumptions may or may not include soliciting prior interest of the customer regarding the FRO offer. In case, the FRO price is merged with the Product Price, and where such price may or may not be separately identifiable, the customer may or may not receive a separate price for FRO.

The Notify Deadline may be pre-determined or may be determined later (i.e., after FRO grant) by the company, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the FRO VOF may not allow the company to notify the customer after the last Notify Deadline (i.e., the latest among the Notify Deadlines). As an operational measure, a rule may be set that if the company and/or an entity other than the company fails to notify the customer before the last Notify Deadline, the customer may select either of the FRO Products as the Chosen Product. Similarly, in one of the implementations of the FRO VOF, a rule may also be set that if the customer fails to notify the company and/or an entity other than the company before the last Notify Deadline, the company and/or an entity other than the company may select either of the FRO Products as the Chosen Product for the customer. Another approach may be (e.g., for customer/company) to designate one of the two products as a Default Product (during or after receiving the FRO) that will be selected as the Chosen Product if the company fails to notify the customer of the Product selection before the last Notify Deadline. Any entity (e.g., the company or the customer) may (or may not) be allowed to change the Default Product once it is selected. The FRO Exercise Price (if any) in the default case may or may not be equal to the FRO Exercise Price for the Default Product for the last Notify Deadline. In the current discussion, a single Notify Deadline is assumed.

The FRO Exercise Price may be a function of Notify Deadline, FRO Products and/or Chosen Product, one or more Product Prices, any other factors of company's choosing or any combination thereof. In such situations, the company may pay a price to the customer based on the selection of the Chosen Product at a given time.

The FRO VOF may also include conditions imposed on the customer. A customer may be under a mandatory condition to accept the Chosen Product once it is selected (for e.g., by the company).

A company may determine customer preferences, either explicitly or implicitly, regarding utilization of up to n of m selected Products. The preferences may also include, but not limited to, customer preferences for various products and services, needs, associated relative utilities, flexibilities, preferences regarding choice of Products, quality of Products, acceptable delays (relative) to receive different Products and so forth. A company may seek customer preferences on flexibility to utilize various products, desire to trade-in their product flexibility, any other parameters or any combination thereof. The company, one or more entities other than the company or any combination thereof may seek customer preferences.

A company may also offer FRO options to one or more customers on the basis of customer preferences, so obtained or collected. The company may offer said FRO options based on the dynamics of the company including, but not limited to, inventory, operational data, revenue management data, cost data, financial data, accounting data, any other internal data, any combination thereof and so on.

A company may seek such preferences from the customers prior, during or after the customer has purchased the Product or any combination thereof. These customer preferences may help the company to perform concurrent optimization of value for the company, the customers, one or more entities other than the company or any combination of two or more of the above. The customers may also include the customers whose preferences have not been determined or collected to perform concurrent optimization. The data pertaining to the company, customers, one or more entities other than the company, any combination thereof, may be integrated to concurrently optimize the value for at least any two of said entities. There may or may not be any payment transaction between the company, one or more other entities and/or the customers regarding seeking such customer preferences, delivering FRO options, customer participation in FRO and so on.

The company may operate one or more systems and/or services to monitor the company dynamics. Monitoring may include, but is not limited to, monitoring of capacity, days to utilization, return and/or potential return of Products, flexible inventory that may be created in relation to said obtained preferences, analyzing various cost, revenue, operational or any other internal data and so on. The company may have one or more systems and/or services to analyze such data on a real-time or quasi real-time basis and draw conclusions on the basis of such analysis. Any of the systems and/or services may be operated by the company, one or more entities other than the company or any combination thereof.

A company may operate a system that defines customer preferences regarding at least utilizing up to n of m selected products, where n is less than m, operate a system that enables use of said preferences to optimize value for at least one of customers, said company and an entity other than said company. Said system may be used to enhance product selling capacity (or helps to increase the overselling limits of products). The company may use such preferences to offer FRO. A company may concurrently optimize value for at least two of customers, said company and at least one entity other than said company.

The company may utilize such preferences to meet its capacity shortages. These customer preferences may enable the company to increase the capacity limits for its products. The company may start entertaining more requests from the customers and hence may increase the oversale limits for their Products. The company may be able to sell the Products at higher prices to the potential customers due to increase in capacity and oversale limits and thereby enhance its revenues. Such preferences may help the company to allay fears of customer ill-will and dissatisfaction in case of an oversale situation. The company may utilize these preferences to deal with the oversale situation more effectively, efficiently and in timely manner. Thus, it may eventually allow the company to capture demand that may otherwise, have been spilled or turned down and thereby enhancing its revenues without having any negative impact due to increase in capacity limits.

A company may offer FRO to all customers or any selected customers, such selection may be based on any criterion including, but not limited to, such as those who have expressed their relative preferences, those who have not expressed any preferences. By integrating the company dynamics and collected customer preferences, a company may offer appropriate incentives and terms and conditions for FRO to generate desired participation. A company may exercise its right (from FRO) to define the Chosen Products for one or more FRO customers depending on company's internal need to regenerate product capacity for products with low availability or shortages. A company may be in a better position to offer appropriate FRO offers at a later stage due to many factors including, but not limited to, the company having better knowledge of internal and external dynamics, a relatively better estimate on how many customers required to avoid oversale situation in the end and so on. A company may choose to handle any shortfalls in capacity using FRO or by any other method of its choosing.

Once the Initial Transaction is successful, there may be at least two possible related events, as shown by Box 16.230. The two events are (1) that P1 is the Chosen Product (as shown by Box 16.240) and (2) that P2 is the Chosen Product (as shown by Box 16.250). Each of these two events may be associated with various terms and conditions on the customer and/or the company. As explained above, the events may take place in two ways: either the company selects the Chosen Product to satisfy its business needs, or the Chosen Product is selected based on pre-determined rules. The company may have to pay an additional exercise price at the CNT depending on the terms and conditions of the option contract. Once the Chosen Product is selected, the company and/or the customer may not change the Chosen Product except within the bounds of the terms and conditions in the option contract. The company or the customer may (or may not) have the right to enforce the Chosen Product on the other party as per the terms and conditions of the option contract.

The company may offer incentives to the customers to motivate them to choose one or more products as Chosen Products among the FRO Products that may be more optimal for the company. A company may formulate one or more such offer (may referred to as Chosen Product Incentive Offers) and may send them to customers who have purchased FRO but not yet selected their Chosen Product via email, phone, mail or any other communication channel as per the terms and conditions of the option contract. Thus, such customers may be persuaded to select said optimal product in lieu of incentives if the terms and conditions of option contract provide so.

A customer who receives a FRO is termed "Y". In one implementation of FRO, a company may want to hold capacity for the customer in only one of the FRO Products, in which the status of said Y customer is termed "Ya" (i.e., Accounted) and in the other FRO Product(s), the status is termed "Yw" (i.e., Awaiting) (both Ya and Yw have been defined above). A "Y" customer converts to an N customer after the CNT. Thus, at any given time, a company may have N, Ya and Yw type of customers for its products.

The FRO VOF may help a company in one or more ways. For example, it may help to accommodate product requests from potential customers. Any new potential customer who requests to obtain a product is assumed to be an N customer. If the available quantity for the desired product (desired by N customer) is insufficient to satisfy the request, then the company may use the quantity (if any, of desired product) that has been assigned to Ya customers, and reassign the same to said N customer. Consequently, the company may then assign the Awaiting products (i.e., the products where said Ya customers have Awaiting status) to said Ya customers. By implementing such shifting or removing of Ya customers from their Accounted products to Awaiting products, a company may better serve incoming demand for products. An event where such request comes to the company for a product is termed "Buy_N". The act to remove (or shift) a Ya customer from its Accounted product to its Awaiting product is termed "Remove_Y". Detailed algorithms are presented below that may be used to manage a system comprising N, Ya and Yw type of customers.

The above terms and conditions of the FRO VOF may be set in a way to concurrently benefit the customer, the company, any other entity apart from said company involved and/or any combination thereof. The company gets to seek a way to create a flexible inventory of Products. The customer benefits from trading their flexibility for the desired rewards. The company benefits from enhanced customer satisfaction (loyalty and repeat business), incremental revenue from the high price paying customers, incurring lower costs on capacity shortages and selling (reusing) the Released Products, generating revenues from Released Products without actually reusing the Released Products and other operational benefits.

A FRO VOF may include a right for the customer to utilize each of the m FRO Products, and a right for the company to limit the Products (to fewer than m) the customer may utilize, if the company notifies the customer on a stated Notify Deadline. Said on a stated Notify Deadline may include, but not limited to, on and/or before the stated Notify Deadline, on and/or after the stated Notify Deadline, any combination thereof. The right may include the condition that the company may notify the customer before, at or after the stated Notify Deadline or any combination thereof. To provide some flexibility to the customers, the company may offer (or allow) the customers to express their preferences regarding the Chosen Product(s) before the stated Notify Deadline. The company may or may not exercise their right to limit the customer to utilize fewer than said m products. The right may include a condition that the company may limit the customer after the customer expresses his/her preference for the Chosen Products. The company and/or an entity other than the company may have said limitation on at least one product. There may be a condition imposed on the customer to make at least one payment to the company when the customer expresses his or her preferences for the Chosen Products. The company and/or an entity other than the company may allow the customers to define said 'n' products on or before a stated date. The company and/or an entity other than the company may reserve the right to take back any 'm' minus 'n' products after the stated date. The customer, the company, an entity other than the company and/or any combination thereof may determine the notification date.

A company may choose to define all the Chosen Products at one or more times. All Notify Deadlines may or may not be associated with each of the related FRO Products. For example, a Notify Deadline may be after the time when the Product would have been utilized or the company may choose not to offer a Notify Deadline on a specific Product due to one or more reasons including, without limitation, high FRO Price, customer utility reasons and expected load factor. A company may select any of the selected FRO Products as the Chosen Products prior to a Notify Deadline. The company may also choose not to select any Chosen Products at one or more of the specified Notify Deadlines.

The costs, revenues, benefits, terms and conditions shown here are for illustration purposes only and actual values could be different depending upon specific values selected by the company for value options, customer behavior, company characteristics, Notify Deadline(s) and other relevant factors.

The FRO VOF structure may be implemented in several ways depending upon the terms and conditions associated with the FRO contract. The FRO VOF structure presented above for the FRO (2,1) instance can be extended to implement any other FRO instance.

The FRO concurrently optimizes value for both the company and its customers. The customers receive rewards for trading their flexibility in utilizing a product while the company gets the flexibility to optimally allocate products (including sold products) across various customers. The company gets to know the relative preferences and utilities of a customer for various products as some customers take this option and others don't. The presumption here is that customers make a logical decision to take part in the FRO value option framework if they desire to trade-in their flexibilities. The company may benefit from higher customer loyalty, as customers may receive higher satisfaction from using the company services, and may optimize its profitability by reusing/reselling the Released Products at typically higher than average prices.

Example of FRO VOF Structure FRO (2,1)

FIG. 17 demonstrates an illustrative practical example of using the FRO (2,1) instance in any industry. Consider a customer who interacts with a company to get FRO. Per Act 16.200, an Initial Transaction takes place between the company and the customer. FIG. 17 displays some of the details of the Initial Transaction. The customer selects/receives two FRO Products, P1 (shown in Box 17.100) and P2 (shown in Box 17.200), and the company can select either of the Products as the Chosen Product. The customer is under the condition to accept the Chosen Product as selected by the company.

The customer receives a reward of $15 as the Initial FRO Price from the company while the customer pays $500 as the Product Price to the company as part of the Initial Transaction. Hence, the customer pays a net amount of $485 to the company at Initial Transaction. The Initial Transaction takes place on the $14^{th}$ day of April (i.e., the ITT, shown in the second row of the Box 17.300). There is an explicit notification condition wherein the company has to select and notify the customer regarding the Chosen Product before the Notify Deadline. An example of terms and conditions included with FRO are presented. A scenario is considered with different Notify Deadlines (shown in Box 17.400) and the Notify Deadline is expressed in terms of the number of days to utilization (DTU) of P1, the earlier of the two Products.

Box 17.400 displays a set of FRO Exercise Prices that are a function of both the Notify Deadline and the Chosen Product. There are four Notify Deadlines associated with the FRO. The FRO Exercise Price increases from $5 (for the first Notify Deadline of 30 DTU) to $20 (for the last Notify Deadline of 1 DTU) if the Chosen Product is P1 and from $10 to $50 if the Chosen Product is P2. If the CNT is before 30 DTU, then the customer receives $5 as the FRO Exercise Price from the company if the Chosen Product is P1, and receives $10 as the FRO Exercise Price if the Chosen Product is P2, as shown in the second column of the second and third rows in the Box 17.400, respectively. If the CNT is after 30 DTU and before 7 DTU, then the customer receives a FRO Exercise Price of $10 or $25 if the Chosen Product is P1 or P2, respectively, as shown in the third column of the second and the third rows, respectively in the Box 17.400. Similarly, the customer receives a FRO Exercise Price of $15 for P1 or $35 for P2, if the CNT is after 7 DTU and before 3 DTU, and $20 for P1 or $50 for P2, if the CNT is after 3 DTU and before 1 DTU, as shown in the fourth and fifth columns of the second and the third rows in the Box 17.400, respectively.

5) Optimization of FRO VOF

As mentioned earlier (shown in FIG. 7), in the form of an optional last step in the first stage, a financial analysis may be performed using the existing company and customer data to determine the optimal terms and conditions of the FRO VOF. 'What-if' scenarios may be executed to determine an optimal pricing strategy. The company may want to divide customers using one or more criteria and design separate FRO VOF for each customer segment.

Second Stage Using the FRO Value Option Framework

After completing the first stage of the method, the company has created a FRO VOF and specific options within that framework. The company may have segmented customers and designed options accordingly. The company is fully prepared to use a structured format comprising one or more FRO value options to interact with its customers in real time to generate benefits for both the company and its customers. The second stage of the FRO VOF is now presented.

Figure 18:
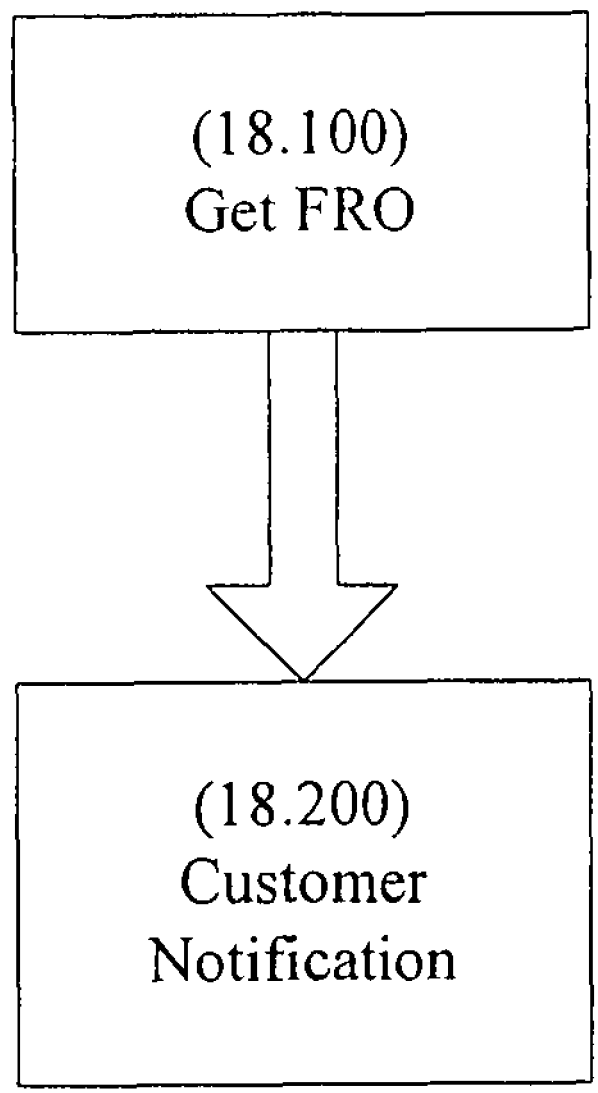
FIG. 18 is a diagrammatic illustration, in a high level flowchart, of a process for FRO VOF implementation.

The implementation of the FRO VOF between the company and its customer takes place through two high level acts, as shown in FIG. 18. In Act 18.100, the 'Get FRO' process, an interactive event between the customer and the company's web server, runs to carry out the Initial Transaction of the FRO VOF. In this Act, a number of algorithms, may be executed (e.g., availability, FRO Price, Product Price and Notify Deadline) on the company's server to optimally calculate the terms and conditions of the FRO VOF to concurrently benefit both the company and the customer. In Act 18.200, the Customer Notification process (explained later) is executed. In this process, the Chosen Product is notified to the customer. The process may also comprise one or more event optimizer algorithms that may help to optimally select the Chosen Product and/or to optimally use (or reuse) the Released Product.

Figure 19:
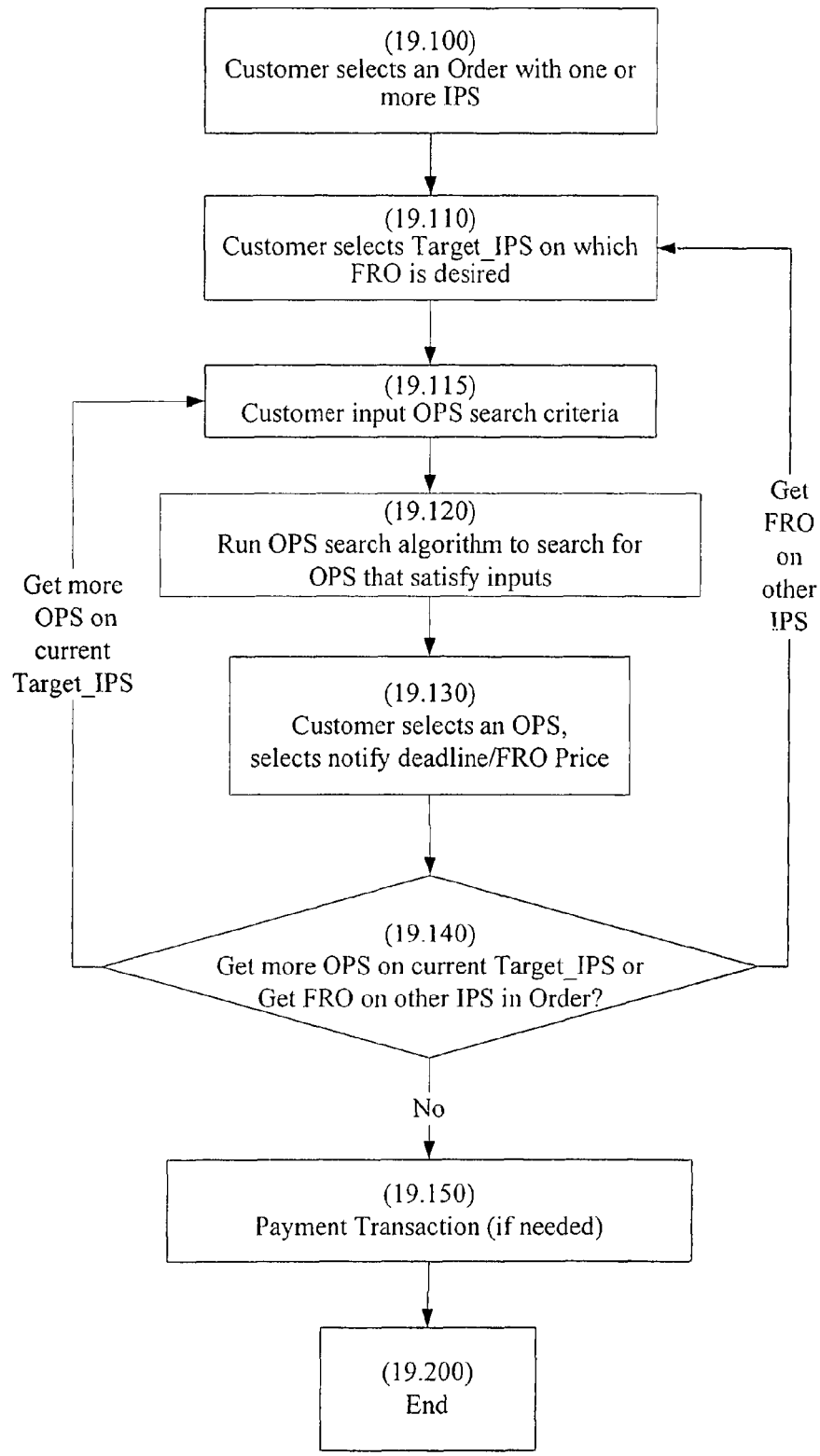
FIG. 19 is a flowchart that expands Act 100 of FIG. 18, illustrating a high level algorithm for the "Sequential Get FRO" process.
Figure 21:
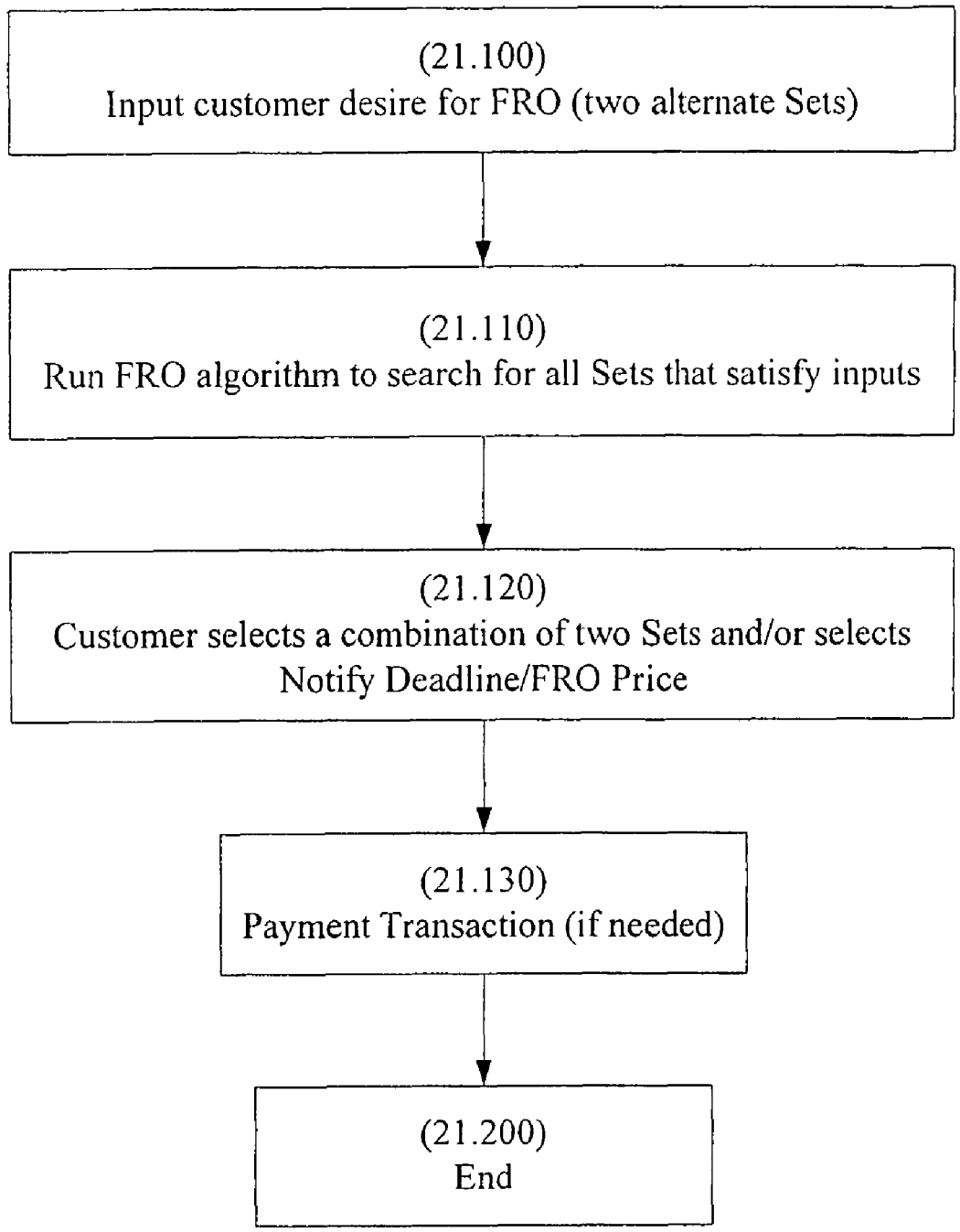
FIG. 21 is a flowchart of an algorithm for the "Concurrent Get FRO" process, an alternative process to FIG. 19.

As explained above, the Get FRO process may be implemented via the Sequential (shown in FIG. 19) or the Concurrent (shown in FIG. 21) process. There are many ways to do the Sequential process. As an example of the Sequential process, a customer may select (or purchase) a Product/Set/Order before the Initial Transaction begins. In such situations, said Product/Set/Order may be referred to as Initial Product/Initial Set/Initial Order or IP/IS/IO, in short, respectively. The Initial Set is also referred to as Initial Product Set (or IPS, in short). A customer may get a FRO, i.e., get one or more FRO Products/Sets/Orders on an IP/IPS/IO, respectively. A FRO Product/Set/Order is also referred to as Option Product/Option Set/Option Order, or OP/OS/OO, in short, respectively. An Option Set is also referred to as Option Product Set (or OPS, in short). The two events (one for the Initial Product and the other for the Initial Transaction) may be executed with a minimal (one just after another) or a significant time gap (e.g., few minutes, hours, days and so forth) in between them.

The FRO VOF may be implemented at different levels including, but not limited to, Product, Set and Order. A company may choose to implement the FRO at any level(s). In a specific FRO interaction between a customer and the company, the implementation level should be the same for all the FRO Products, Chosen Products and Released Products. For example, if FRO is implemented at the Order level, then all the FRO Products and Chosen Products would refer to FRO Orders and Chosen Orders, respectively.

1. 'Get FRO'—Dynamic Interaction to Capture Customer Demand

In the Get FRO process, a customer interacts with the company's server to receive a FRO. The interaction may take place (for example) via phone, in-person or on a website. The Sequential Get FRO Process is presented first along with its detailed algorithms, followed by a short summary of the Concurrent Get FRO Process.

Sequential Get FRO Process

There are several ways to implement the Sequential process. The following presents an example of the Sequential Get FRO Process when a FRO is implemented at the Set level. It is also assumed here that the customer first purchases an Initial Order with one or more IPS, and then opts to receive a FRO on any of the included IPS.

The following presents an algorithmic illustration of the Sequential Get FRO process. Consider FIG. 19. In Act 19.100, the customer selects (and/or purchases) an Order (with one or more IPS). Next, in Act 19.110, the customer reaches an interactive interface of the company's web server to Get FRO page, where the customer selects the IPS (referred to as Target_IPS) on which a FRO is desired. Next, the customer inputs the OPS search criteria for the current Target_IPS in Act 19.115.

Next, on clicking the "Search FRO Products" button, control goes to Act 19.120, where the OPS search algorithm is executed to search for an OPS. The OPS search algorithm returns a list of valid OPSs, along with a list of Comb_NDs (defined elsewhere) and associated FRO Prices (or discounts). The details of the OPS search algorithm are presented later. Next, the search results are displayed for the customer, who then selects the desired OPS and one or more associated Comb_ND(s)/FRO Price(s), as shown in Act 19.130.

Next, in Act 19.140, a test is performed to determine whether the customer wants to get more OPSs on the current Target_IPS or on another IPS. If the customer wants to get an OPS on another IPS, control loops back to Act 19.110, where the customer selects another IPS as the Target_IPS, and then the process is repeated again for the new Target_IPS. If the customer wants to get more OPSs on the current Target_IPS, control loops back to Act 19.115, where the customer enters the OPS search criteria, and then the process is repeated for the new OPS search criteria. If the customer does not want to get any more OPSs, control goes to Act 19.150, where a payment transaction (if needed) may be executed. For example, a customer may need to pay a price for the Product after taking into consideration the Initial FRO Price (discount, if any) using a credit card, direct bank account debit or any other payment transaction mechanism. Next, the algorithm ends in Box 19.200. The computation may be performed using a processor that may calculate results in optimal time.

OPS Search

Figure 20:
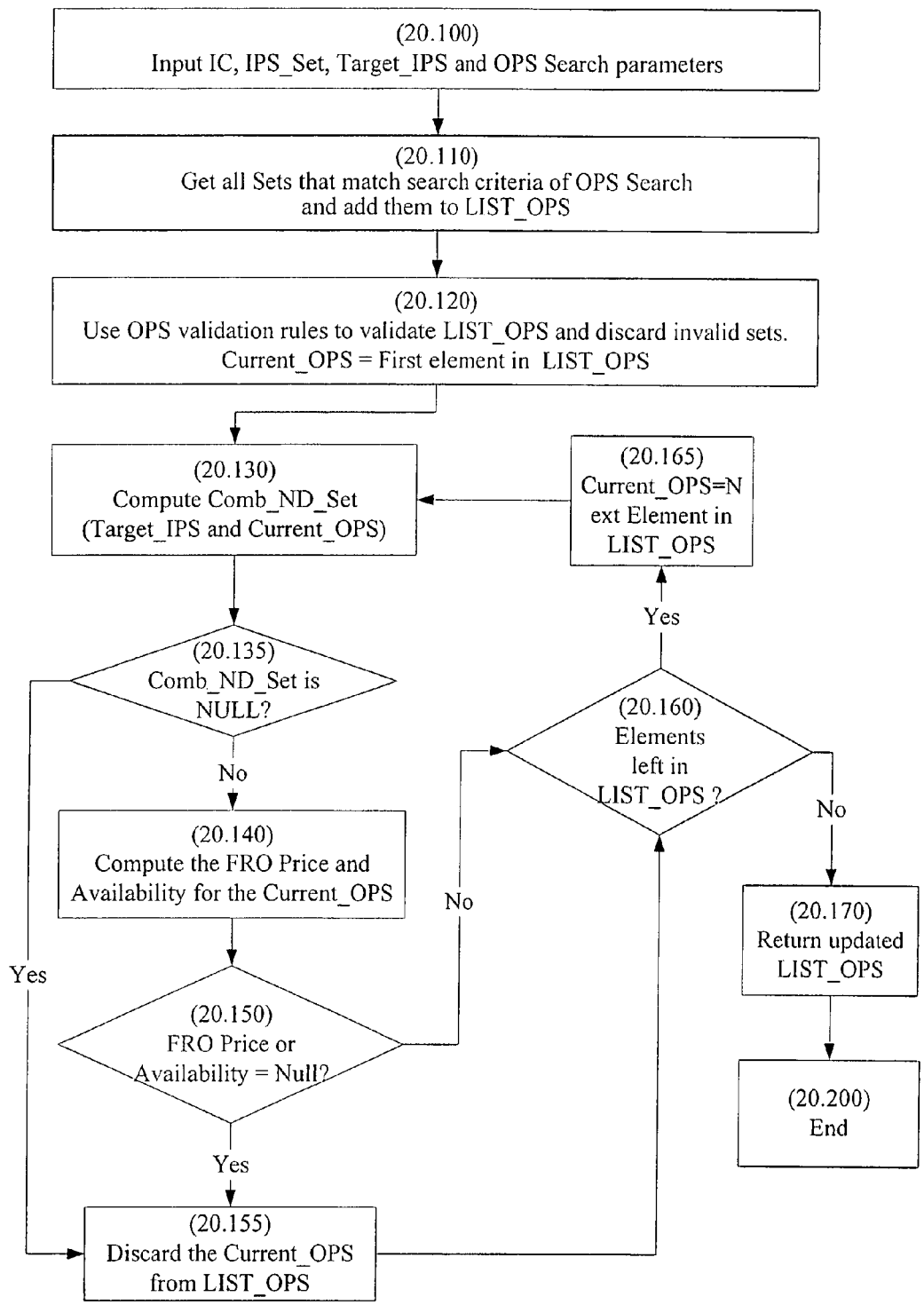
FIG. 20 is a flowchart that expands Act 120 of FIG. 19, illustrating an algorithm to search for FRO Product Sets.

The following algorithm (shown in FIG. 20) determines and validates an OPS for a given set of conditions including, but not limited to, availability, Notify Deadline and FRO Price. One of the ways of implementation of the OPS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 20.100, the number of customers (IC), IPS_Set (containing all IPS in the Initial Order, and all the OPSs, (if any) already selected/received along with Comb_ND_Set(s) and Comb_OP_Set(s), for each IPS), Target_IPS and the OPS Search parameters are input to the system. The definitions and details of Comb_ND_Set and Comb_OP_Set are provided later. The OPS search parameters may include, but are not limited to, date, time and location, number of Products per Set, Notify Deadline, FRO Price (Initial and Exercise) and so forth as appropriate for a given product in a given industry. A customer may be allowed to input Notify Deadline and/or FRO Price on the basis of which valid OPSs (that satisfy the given criteria of Notify Deadline and/or FRO Price) may be searched for and displayed for the customer. For example, a customer may be asked to input one or more parameters, and then a set of Notify Deadlines and FRO Prices may be computed for the Products that match the given criteria. In another example, a customer may input both one or more parameters and Notify Deadline and/or FRO Price as inputs and then a search may be performed for valid OPSs.

Next, control goes to Act 20.110, where an OPS Search is performed for the given criteria. The search may be best performed using a processor that may calculate results in optimal time. The order in which search parameters are executed may be optimized to reduce the search time, however, it may or may not affect the final outcome. A company may select any order of its choosing.

In Act 20.110, Product Sets are determined that match the search criteria and the resulting Sets are added to a list termed LIST_OPS. Next, in Act 20.120, a list of OPS validation rules is obtained from the company's FRO VOF database and the rules are used to validate all the Sets in the LIST_OPS list. Sets that do not satisfy the rules are discarded. Validation rules may include, but are not limited to, a Maximum Number of Products per Set Rule, a Maximum Product Price Rule and so forth. For example, a Maximum Number of Products per Set Rule discards the Sets that have more Products than specified. A company may implement any validation rule of its choosing to further qualify the Sets in the LIST_OPS list. As a last Act in Act 20.120, the first element in the updated LIST_OPS list is designated as the Current_OPS.

Next, control goes to Act 20.130, where a group of Comb_NDs is computed for the combination of the Target_IPS, all the existing OPS of the Target_IPS and the Current_OPS, and added to a set called Comb_ND_Set. Next, in Act 20.135, a test is performed to determine whether the Comb_ND_Set obtained in the previous Act is Null. If so, control goes to Act 20.155. If not, control goes to Act 20.140, where the FRO availability and FRO Price for the Comb_ND_ Set are determined. Next, in Act 20.150, another test is performed to determine whether the FRO Availability or the FRO Price is Null. If so, control goes to Act 20.155. If not, control goes to Act 20.160.

In Act 20.155, the Current_OPS is discarded from the LIST_OPS list, and control goes to Act 20.160, where a test is performed to determine if more elements are left in the LIST_OPS list. If so, control goes to Act 20.165. If not, control goes to Act 20.170.

In Act 20.165, the next element in the LIST_OPS list is designated as the Current_OPS and control loops back to Act 20.130 to repeat the process for the new Current_OPS. In Act 20.170, the updated LIST_OPS list is returned as the search result, and the algorithm ends in Box 20.200.

Computation of Notify Deadlines

A company may set one or more Notify Deadlines of its choosing for its Products. Once the Notify Deadlines have been set for each Product, the next Act is to create a framework to compute the Notify Deadlines for a group of Products (such as a Set, an Order or any other group). The following sections present an example of a framework that may be used to obtain a set of Notify Deadlines applicable to a group of Products. A company may use any framework and algorithm of its choosing to obtain the same.

A set of Notify Deadlines associated with a Product, a Set and a combination of two or more Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Sets. A Set_ND_Set may be computed by combining the Product_ ND_Sets of all the Products under that Set. The Notify Deadlines may be computed based on various parameters and factors of the company choosing. One example to compute a Comb_ND_Set is as follows. First compute Set_ND_Set for all Sets. A Set_ND_Set is computed by first selecting earliest of the Notify Deadlines of each Product within the concerned Set, and then picking the latest of those Deadlines, and noting that as the Target_Deadline. Next step is to pick all those Notify Deadlines that fall after the Target_Deadline. Notify Deadlines thus obtained may be validated using various validation rules based on company factors such as customer utility, product parameters and so forth. Similarly, the Comb_ND_Set may thus be computed by repeating the above process for Set_ND_Sets, thus obtained for each Set.

Available Capacity Check

The FRO capacity for an OPS may depend on one or more factors including, but not limited to, Notify Deadline, FRO Prices, expected Product value and so forth. A company may use any method of its choosing to determine FRO capacity of a product. For example, a company may choose to have a fixed FRO capacity for one or more of its products.

An instance to compute FRO capacity is discussed below. Consider the case, when FRO Capacity is dependent on Notify Deadline. In such situation, the objective is to determine those Comb_NDs within the Comb_ND_Set on which FRO is available for the given OPS. The FRO Capacity and the Used FRO Capacity (the total number of Products on which FRO has been sold but not exercised) may be calculated for each Comb_ND within the Comb_ND_Set. Available Capacity (AC) would then be the difference of FRO Capacity and Used FRO Capacity for the given Product. If the AC is greater than or equal to the number of incoming customers desiring a FRO, then the FRO capacity is available at a given Comb_ND for the given OPS. The process may be repeated for all Notify Deadlines within Comb_ND_Sets. FRO may be made available on a given OPS for a given Comb_ND, if FRO is available on all the Products of OPS for the given Comb_ND.

Price Calculation

A company may set FRO Prices for a Product using any method of company's choosing. Once the FRO Prices have been set for each Product, the next Act is to create a framework to compute FRO Price for a group of Products (such as a Set, an Order or any other group) by using FRO Prices for each Product in the group.

The parameter Product_OP refer to FRO Price (and may or may not be corresponding to a Notify Deadline) associated with a Product. Similarly, Set_OP and Comb_OP refer to FRO Price (may or may not be corresponding to a Notify Deadline) associated with a Set and a combination of two or more Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the IPS and all the OPSs (existing and new). A Set_OP_Set is computed by combining the Product_OP_Sets of all the Products under that Set. One or more Set_OP_Rules may be read from the company's database and applied to calculate Set_OP_Set for each input Segment (IPS and all OPSs) using the Product_OP_Sets of all the Products of said Set. A company may use any Set_OP_Set Rule of its choosing. Set_OP_Rules may be defined to calculate Set_OP as the sum, average, highest, lowest or any other function of Product_OPs of all the Products at a given Comb_ND. Similarly, a Comb_OP_Set comprises one or more Comb_OPs, and is calculated using one of the pre-determined rules, termed Comb_OP_Rules, to combine the Set_OPs of all the Sets in the combination. A company may use a Comb_OP_Rule of its choosing. Comb_OP_Rules may be defined similar to the Set_OP_Rules.

Concurrent Get FRO Process

As explained above, in the Concurrent Get FRO process, a customer receives all FRO Products concurrently in one transaction. An algorithmic illustration of an example of the Concurrent Get FRO process is displayed in FIG. 21. The FRO (2,1) instance is assumed here as an example. Consider a customer who desires to trade-in his/her flexibility in lieu of a price (reward) offered by the company. In Act 21.100, the customer desires for FRO are input, including, but not limited to, a search criteria for two Sets according to customer's utility (may be similar to the search criteria defined above for the Sequential Get FRO process).

Next, in Act 21.110, the FRO algorithm is run to determine the combinations of two Sets that satisfy inputs. A list of such search results is displayed for the customer along with the associated terms and conditions including, but not limited to, Notify Deadlines, Initial FRO Price, FRO Exercise Price and Product Price for each such combination. The FRO algorithm for the Sequential Get FRO process (defined above) may also be used for the Concurrent Get FRO process.

Next, in Act 21.120, the customer selects a desired combination of two Sets and the associated conditions such as FRO Exercise Price/Notify Deadline. Next, in Act 21.130, a payment transaction is executed, if needed. For example, the customer may pay the Product Price after taking into consideration the Initial FRO Price using a credit card, direct bank account debit or any other payment transaction mechanism. Next, the algorithm ends in Box 21.200. The computation may be performed using a processor that may calculate results in optimal time.

2. Event Optimizer

After the completion of the Get FRO process, the next stage is the Event Optimizer. In this stage, the Customer Notification (or CN, in short) process as shown in Act 18.200 is executed. In this process, one or more decisions on the selection of Chosen Product(s) is notified to the customer. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

The FRO VOF helps to create a flexible customer inventory. In other words, by using the FRO VOF, a company may obtain rights to allocate any of the selected FRO Product to a FRO customer, and thus, said FRO customer acts like a flexible customer inventory that the company may manage at known cost and conditions. A company may design one or more uses of such flexible customer inventory, where each such use may include one or more events that follow the Initial Transaction. An example (the Buy_N process) was explained earlier. In the Buy_N process, a company may use the FRO VOF to accommodate requests from potential customers for products. As an example, the Buy_N process may especially be used to satisfy requests for products that have already been sold or have low (or no) availability. The details for the Buy_N process are presented below.

Another example to use the FRO VOF would be to use the FRO VOF in conjunction with one or more other VOFs, for example, the APO (the Alternate Product Option) VOF (details are provided later). A company may form a group of one or more APO customers and one or more FRO customers, where the options (APO and FRO) obtained by the group members are complementary in nature. As an example, consider a customer (A) who bought an APO to choose either of P1 and P2 as Chosen Product, and consider a customer (B) who received a FRO and is flexible to take any of P1 and P2 as Chosen Product. Thus, if A decides to choose P1 as the Chosen Product, the company may assign P2 as the Chosen Product for B, and vice versa. The customers A and B have taken complementary options and may form a group. The company may need to hold only one unit of inventory in P1 and P2 to satisfy the needs of both A and B (assuming each A and B only need one unit of product). Such a combination of complementary options or VOFs may improve efficiency and concurrently enhance value for all the parties involved (in the given example, for A, B and the company). More details on combining VOFs are provided later.

The FRO VOF may also be used to reduce operational costs, constraints or other goals that are impacted by the allocation of products among different customers. For example, the FRO VOF may be used to shave off production costs by reducing production capacity for one or more products that are low in demand.

A company may use the FRO VOF for any other purpose of its choosing. In all such uses, the company may use a system defined below that can help to optimally allocate product capacity among customers. The following system presents an example of a system (along with its methods and algorithms) that may be used to shift FRO customers within their selected FRO Products. However, a company may use any other process of its choosing to shift FRO customers within their selected FRO Products. The Buy_N process is used as an example to demonstrate the system and its set of methods and algorithms.

The process of shifting Y customers (i.e., FRO customers) within their selected FRO Products is termed "Remove_Y" process. The Remove_Y process may allow the company to remove FRO customers from their Accounted Products and optimally shift them to one of their Awaiting Products to satisfy a pre-defined goal.

The company, an entity other than the company and/or any combination thereof may store the data in a data store which may include, but is not limited to, the value that may be realized if the customer is shifted, Awaiting Products to which the customer may be shifted and so forth. The company, an entity other than the company and/or any combination thereof may receive and process data to determine from among all or substantially all possible combinations of customers, a set of customers which may be shifted. The company, an entity other than the company and/or any combination thereof may shift one or more set of customers that may be determined by processing the data. The company may also shift one or more set of customers other than the combination of customers that may be determined by processing said data. Set of customers which may be shifted or the decision to initiate shifting may depend upon number of factors including, but not limited to, the need and urgency to shift the customers, factors of company's choosing, creation of number of units of product availability, optimizing revenues which may for at least one of the customer, company and/or an entity other than said company, cost savings and so forth.

The company may, on detection of occurrence of one or more events, execute one or more event response algorithm which may determine one or more set of customers possessing options making them eligible to be shifted to one or more products and may shift one or more of said set of customers to create product availability. Said event may be an increase in the demand of one or more products or increase in forecasted demand of one or more products or any combination thereof or any other event. The shifting may be done at the instance of the company, an entity other than said company or any combination thereof. The set of customers, here, may include one or more customers. The shifting may involve shifting of one or more customers. The shifting of one or more customers, as explained below in Remove_Y, may involve one or more interactions between the company, an entity other than the company, the customers and/or any combination thereof. The shifting may involve shifting one or more first customers to one or more first products after one or more second customers from one or more first products are shifted to one or more second products and so forth. Such a cascading process may continue until the last customer which may have to be shifted in the set is shifted and it may lead to shifting of more customers than the creation of number of units of product availability. This process may involve two or more customers. This process has been explained in detail below in the Remove_Y process. The company and/or an entity other than the company may or may not notify the customer regarding said shifting within the specified Notification Deadline. The company and/or an entity other than the company may shift one or more customers to one or more products belonging to said company, to one or more products belonging to an entity other than said company and/or any combination thereof. Shifting may create a lot of value to company and may lead to enhanced revenues and/or cost savings. However, it may also be possible that shifting may sometimes be a cost to the company and a company may still apply shifting (Remove_Y) for fulfillment of other goals and/or objectives of the company.

Buy_N Process

Figure 22:
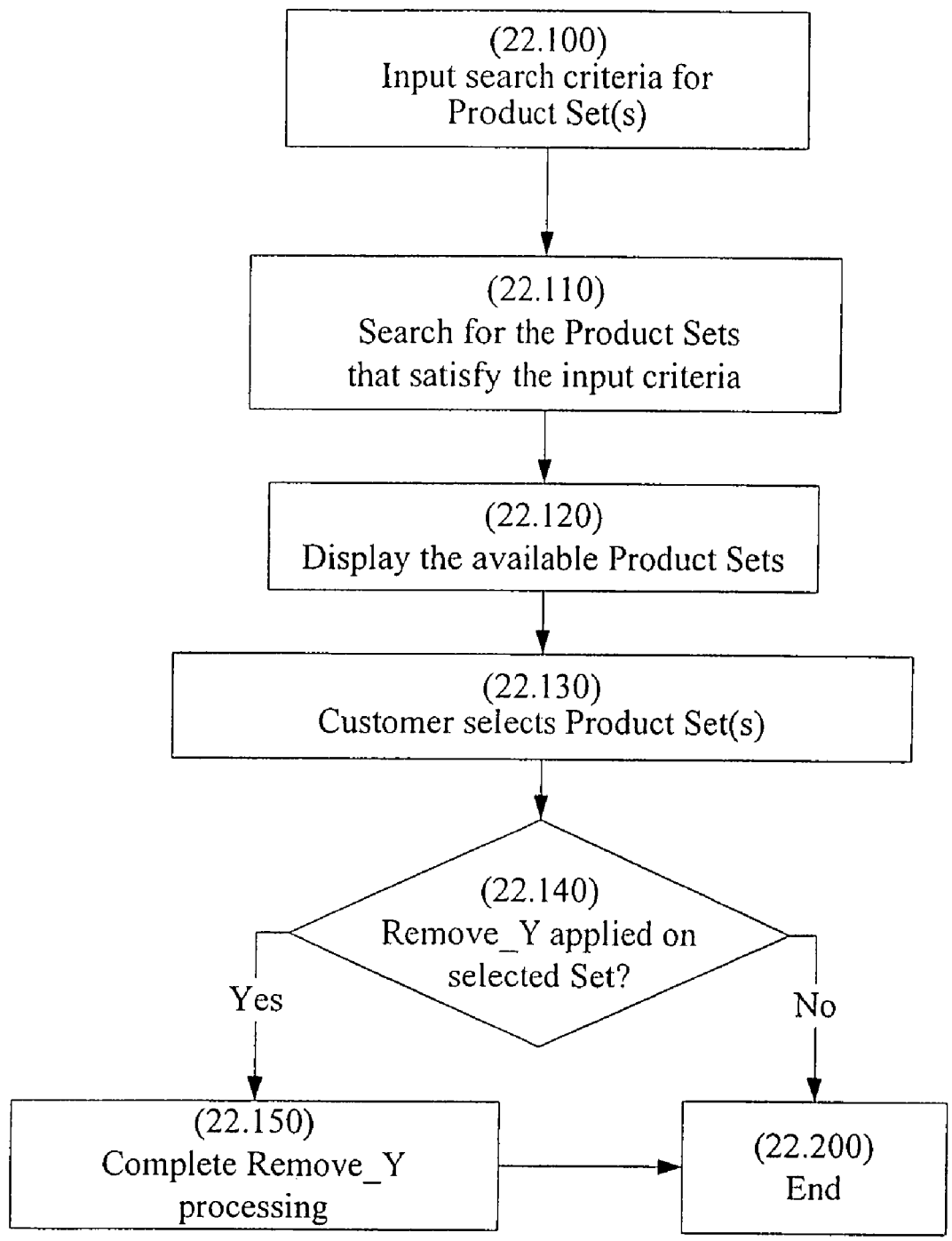
FIG. 22 is a flowchart illustrating the Buy_N process for a Product Set of a company that has implemented the FRO VOF.

FIG. 22 displays a flow chart of an example of a Buy_N algorithm, which is executed during a dynamic interaction between the customer and the company. As an example, an interaction may include a situation when a customer interacts with a company to obtain (or purchase) products, or when a company presents offerings to a customer (with or without a solicitation by the customer). A few parameters have been assumed to add context and enhance understanding. It is assumed that a customer is interacting with a company to purchase products, and that FRO VOF is implemented at the Set level. In Act 22.100, the search criteria are input. Various search parameters for a desired Product Set (as desired by the customer) are taken as the input to the system.

Next, in Act 22.110, a search process is executed to search for all Product Sets that satisfy inputs. The details of the search process are described later. Next, in Act 22.120, all the search results are displayed before the customer in an interface (such as in a web browser, a telephone operator stating the search results over the phone etc.). Control then goes to Act 22.130, where the customer selects a Set (or Product Set). The selection of the Set may be followed by a payment and/or purchase of the selected Set.

In Act 22.140, a test is performed to determine whether Remove_Y process has been applied on the selected Set. If so, control goes to Act 22.150, where the Remove_Y process is completed for the selected Set, and control then goes to Box 22.200. If not, control goes to Box 22.200, where the algorithm exits. The completion of the Remove_Y process may include one or more Acts that may be executed to incorporate the fact that said Set was selected by the customer. For example, one of such acts may be to record the selection of said Set to a database and/or to change the Accounted Status for one or more FRO customers (who were affected in the Remove_Y process).

Figure 23:
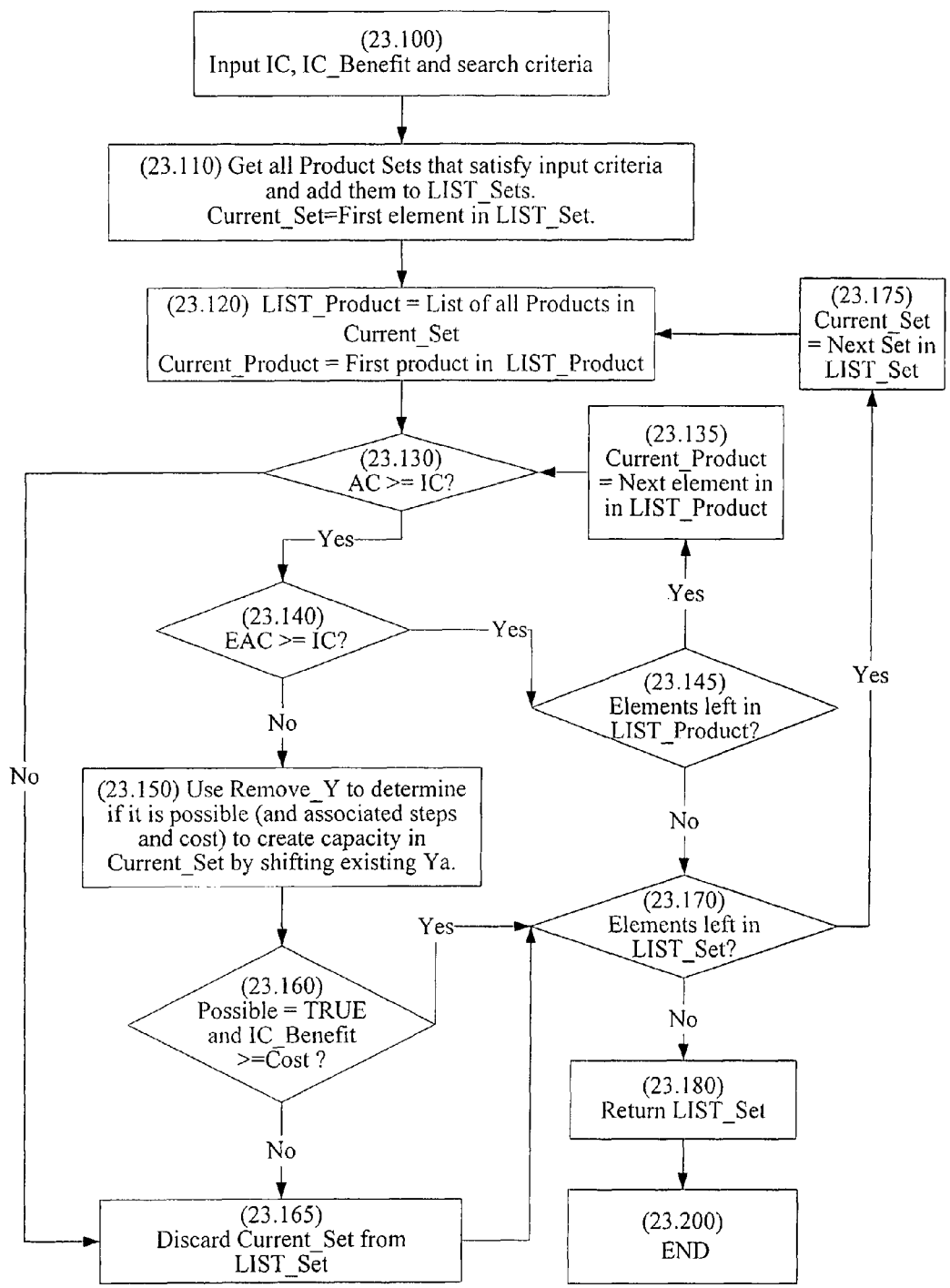
FIG. 23 is a flowchart that expands Act 110 of FIG. 22, illustrating an algorithm for the Buy_N search process.

FIG. 23 expands Act 110 of FIG. 22 and demonstrates an example of a search algorithm that may be used to determine Product Sets that satisfy the inputs. In Act 23.100, IC (number of incoming customers), IC_Benefit (i.e., the benefit that a company may receive if the incoming customers select and/or purchase one or more Sets) and the input search criteria are taken as the input parameters to the system. The term "Incoming Customers" refers to the customers who interact with the company in the current transaction (Buy_N). It is assumed that each customer desire one unit of capacity and thus, total units of capacity desired is equal to the total number of incoming customers. In some situations, IC_Benefit and/or IC may not be available as an input, and may be calculated during the search process. Next, in Act 23.110, all the Sets that satisfy the 'search criteria' are searched from the company database. The Sets, thus obtained, are added to a list termed LIST_Set. The first element in the LIST_Set list is designated as Current_Set.

Next, in Act 23.120, all the Products in the Current_Set are added to a list termed LIST_Product. The first element in the LIST_Product list is designated as Current_Product. Next, in Act 23.130, a test is performed to determine whether the Available Capacity (AC) of the Current_Product is greater than or equal to IC. If so, control goes to Act 23.140. If not, control goes to Act 23.165.

In Act 23.140, another test is performed to determine whether EAC (Effective Available capacity) of the Current_Product is greater than or equal to IC. If so, control goes to Act 23.145. If not, control goes to Act 23.150, where the Remove_Y algorithm is executed to determine the possibility (and associated process steps and costs) to create capacity in the Current_Set.

Next, in Act 23.160, a test is performed to determine whether it is possible (by using Remove_Y) to create capacity in the Current_Set and the IC_Benefit is greater than or equal to the cost to create that capacity as determined in the Act 23.150. If both conditions are true, control goes to Act 23.170. If either condition is false, control goes to Act 23.165. In Act 23.165, the Current_Set is discarded from the LIST_Set list, and control then goes to Act 23.170.

In Act 23.145, a test is performed to determine whether more elements are left in the LIST_Product list. If so, control goes to Act 23.135, where the next element in the LIST_Product list is designated as the Current_Product and control loops back to Act 23.130, to repeat the process for the new Current_Product. If not, control goes to Act 23.170.

In Act 23.170, another test is performed to determine whether more elements are left in the LIST_Set list. If so, control goes to Act 23.175, where the next element in the LIST_Set list is designated as the Current_Set and control loops back to Act 23.120, where the process for the new Current_Set is performed. If not, control goes to Act 23.180, where the LIST_Set list (the most recently updated version after discarding the invalid Sets, if any) is returned. Next, the algorithm ends at Box 23.200.

Figure 24:
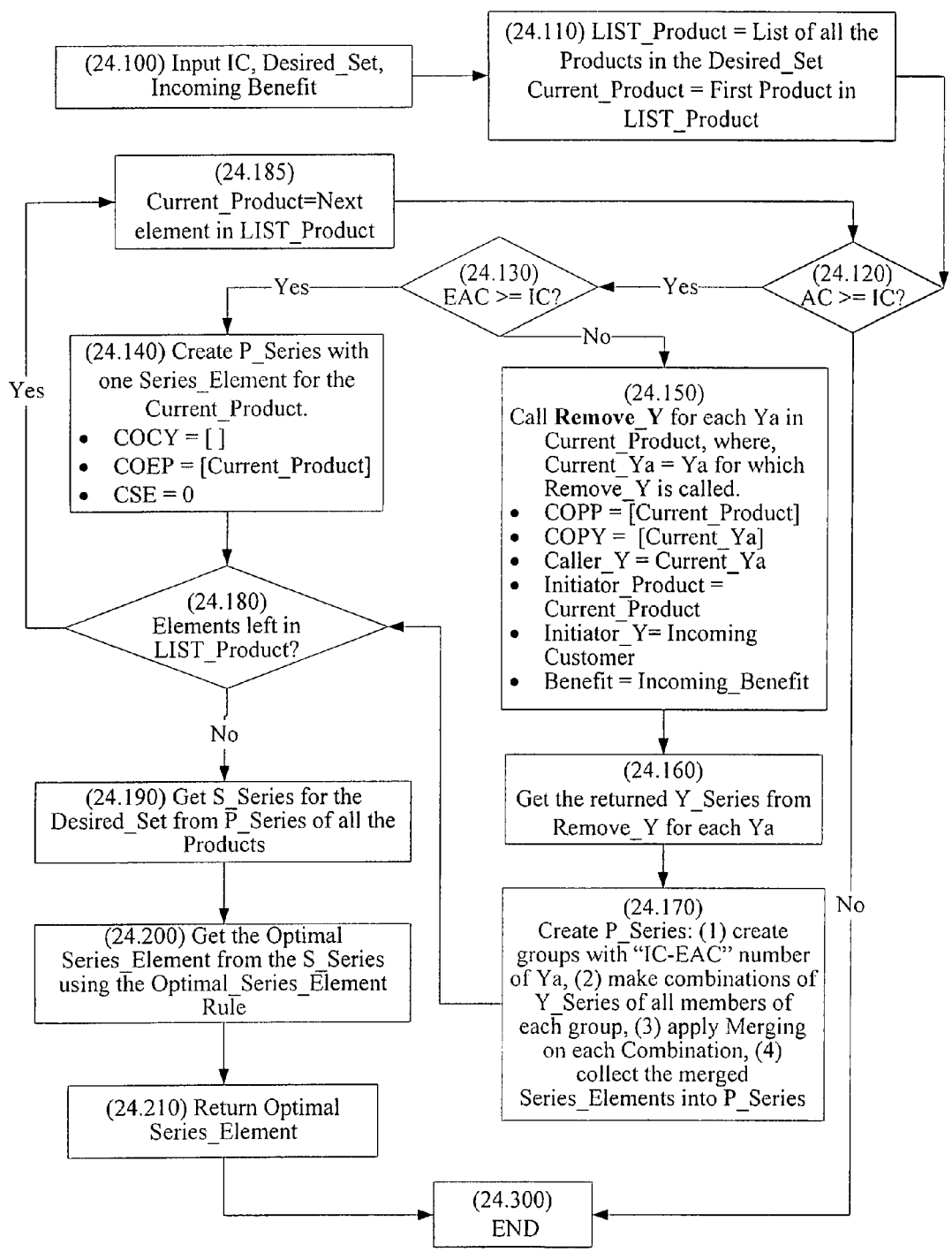
FIG. 24 is a flowchart that expands Act 150 of FIG. 23, illustrating an algorithm to create capacity using the Remove_Y algorithm.

FIG. 24 expands Act 150 of FIG. 23 and demonstrates an example of an algorithm to apply the Remove_Y algorithm to create one or more than one unit of capacity in one or more Product(s) within a Desired_Set (the Set in which capacity needs to be created). In Act 24.100, various input parameters are taken in the system. Input parameters include IC, Desired_Set and Incoming_Benefit (i.e., benefit a company may realize if capacity is created in the Desired_Set)

Next, control goes to Act 24.110, in which all the Products in the Desired_Set are listed in the LIST_Product list. The first Product in the LIST_Product list is designated as Current_Product. Next, in Act 24.120, a test is performed to determine whether the Available Capacity (AC) of the Current_Product is greater than or equal to IC. If so, control goes to Act 24.130. If not, control goes to Box 24.300, where the algorithm ends. In Act 24.130, another test is performed to determine whether EAC (Effective Available capacity) of the Current_Product is greater than or equal to IC. If so, then control goes to Act 24.140. If not, control goes to Act 24.150.

In Act 24.140, a P_Series is created for the Current_Product. Since the Current_Product is an End_Product, there will be only one Series_Element in the P_Series collection. The Series_Element will comprise COEP with the Current_Product as the only element, COCY with no elements and CSE with zero value (since no Ya needs to be removed from Current_Product, and hence, no cost to create capacity). Next, control goes to Act 24.180.

In Act 24.150, the Remove_Y algorithm is called for each Ya in the Current_Product and the algorithm follows a recursive loop. Each of the Ya becomes Current_Ya for the corresponding Remove_Y call. The necessary input parameters for each of the Remove_Y includes the Current_Product as 'COPP', Current_Ya as 'COPY', Current_Ya as 'Caller_Y', Current_Product as 'Initiator_Product', one of the incoming customers as 'Initiator_Y' and Incoming_Benefit as 'Benefit'. The Remove_Y call returns a Y_Series collection for each Ya in the Current_Product. The details of the Remove_Y algorithm are discussed in the next section.

Next, control goes to Act 24.160, where all the Y_Series collections are obtained as returned from the Act 24.150. Next, in Act 24.170, a P_Series collection for the Current_Product is calculated through the following operations: (1) create groups of Ya from all Ya of the Current_Product for which Remove_Y was called, where the number of Ya in each group is equal to "IC-EAC" (EAC of the Current_Product), (2) make combinations of the Y_Series collection of all members of each group (combine each Series_Element of each Y_Series of each member with that of each of the rest of the members of that group), (3) merge all members within each combination to formulate a merged Series_Element, (4) collect all such merged Series_Elements, thus obtained, into P_Series collection of the Current_Product. Details on making combinations and merging are provided later.

Next, in Act 24.180, a test is performed to determine whether more elements are left in the LIST_Product list. If so, control goes to Act 24.185, where the next element in the LIST_Product list is designated as the Current_Product and control loops back to Act 24.120 to repeat the process for the new Current_Product. If not, control goes to Act 24.190.

In Act 24.190, a S_Series collection for the Desired_Set is calculated from the P_Series collections of all the Products using the combination and merging process (details provided later). Next, in Act 24.200, an optimal Series_Element from the S_Series collection is determined using Optimal_Series_Element Rule (which is read from a database). Next, control goes to Act 24.210, where the optimal Series_Element is returned and the algorithm exits at Box 24.300.

'Remove_Y' Algorithm

Figure 25:
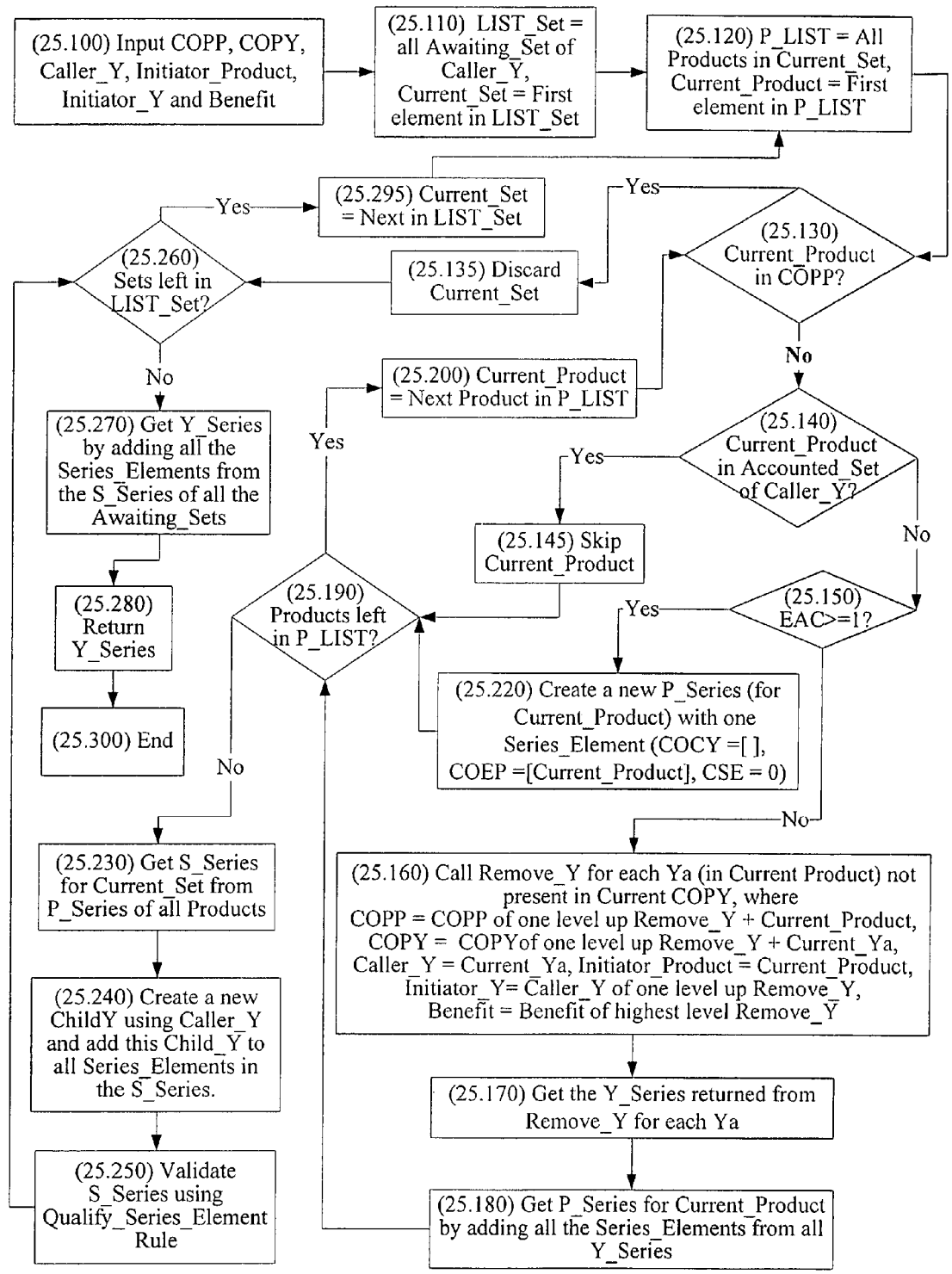
FIG. 25 is a flowchart that expands Act 150 of FIG. 24, provides an algorithmic illustration for the Remove_Y algorithm.

The following algorithm presents an example of an algorithm that may be used to create one unit of capacity of a Product by shifting a Ya Accounted in a Product to its Awaiting_Set. FIG. 25 represents an algorithmic illustration for Remove_Y. The Remove_Y is a recursive algorithm, which returns a collection of Series_Element termed "Y_Series" collection for the Ya for which the algorithm has been called.

In Act 25.100, a set of parameters including COPY, COPP, Caller_Y, Initiator_Product, Initiator_Y and Benefit are input to the system. Next, in Act 25.110, all the Awaiting_Sets of the Caller_Y are added to a list termed LIST_Set. The first element in the LIST_Set list is designated as Current_Set. Next, in Act 25.120, all the Products that belong to the Current_Set are added to another list termed P_LIST. The first element in the P_LIST list is designated as Current_Product.

Next, in Act 25.130, a test is performed to determine whether the Current_Product is present in the COPP. If so, the Current_Set is discarded in Act 25.135, and control goes to Act 25.260. If not, control goes to Act 25.140.

In Act 25.140, another test is performed to determine whether the Current_Product is present in the Accounted_Set of the Caller_Y. If so, the Current_Product is skipped in Act 25.145, and control then goes to Act 25.190. If not, control goes to Act 25.150, where another test is performed to determine if the EAC of the Current_Product is greater than or equal to 1. If so, control goes to Act 25.220. If not, control goes to Act 25.160.

In Act 25.220, a new P_Series collection is created with only one Series_Element, since the Current_Product is an End_Product. The Series_Element will comprise COEP with the Current_Product as the only element, COCY with no elements and CSE with zero value. Next, control goes to Act 25.190.

In Act 25.160, the algorithm enters into a recursive loop where the Remove_Y algorithm is called for each of the Ya in the Current_Product that is not present in the COPY. Each of the Ya becomes Current_Ya for the corresponding Remove_Y call. The necessary input parameters for each of the Remove_Y includes 'COPP' (includes the COPP of one level up Remove_Y and the Current_Product), 'COPY' (includes the COPY of one level up Remove_Y and the Current_Ya), the Current_Ya as 'Caller_Y', the Current_Product as 'Initiator_Product', Caller_Y of one level up Remove_Y as 'Initiator_Y' and benefit of the highest level Remove_Y as 'Benefit'. Each of the Remove_Y call returns a Y_Series collection for every Ya for which Remove_Y was called.

Next, in Act 25.170, the algorithm receives the returned Y_Series collection from all the Remove_Y algorithm calls in Act 25.160. Control then goes to Act 25.180, where a P_Series collection for the Current_Product is calculated by adding all the Series_Elements from all the returned Y_Series collection obtained in Act 25.170. Control then goes to Act 25.190.

In Act 25.190, a test is performed to determine whether more Products are left in the P_LIST list. If so, control branches out to Act 25.200, where the next Product in the P_LIST list is designated as the Current_Product, and control then goes to Act 25.130 where the process is repeated for the new Current_Product. If not, control goes to Act 25.230.

In Act 25.230, the S_Series collection is calculated for the Current_Set by combining and merging all the P_Series collection of all the Products (not taking the skipped Product(s) into consideration, if any). Next, in Act 25.240, a new ChildY is created using the Caller_Y. The ChildY comprises COI (where the current Initiator_Product is designated as Initiator_Product and the current Initiator_Y is designated as Initiator_Y), Accounted_Set of the Caller_Y designated as the Initial_Accounted_Set, current Awaiting_Set designated as the Final_Accounted_Set, and the cost to shift current Caller_Y from the Initial_Accounted_Set to the Final_Accounted_Set designated as the CCY. The ChildY, thus created, is added to every Series_Element in the S_Series collection and the CCY of the same ChildY is added to the CSE (Cost of Series_Element) of every Series_Element. Control then goes to Act 25.250.

In Act 25.250, a Qualify_Series_Element rule is read from the company's database and is applied to validate all the Series_Elements in the S_Series collection. The invalid Series_Elements are discarded from the S_Series collection. A company may select any rule of its choosing. For example, a Qualify_Series_Element rule may only qualify those Series_Elements for which the CSE is less than or equal to the 'Benefit'. Next, control goes to Act 25.260.

In Act 25.260, a test is performed to determine whether more Sets are left in the LIST_Set list. If so, control branches out to Act 25.295, where the next element in the LIST_Set list is designated as the Current_Set, and then control loops back to Act 25.120, where the process is repeated for the new Current_Set. If not, control goes to Act 25.270, where the Y_Series collection is obtained by adding all the Series_Elements of all the S_Series collections for all the Awaiting_Sets of the Caller_Y. Next, the Y_Series collection is returned in Act 25.280, and the algorithm ends in Box 25.300.

Combinations of P_Series in order to formulate S_Series are calculated by cross multiplication of Series_Elements (of each P_Series). A company may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, $C1=\{S_1[1], S_2[1], S_3[1], \ldots S_n[1]\}$, where, $S_p[1]$ denotes the first Series_Element of $p^{th}$ Series; $C2=\{S_1[2], S_2[1], S_3[1], \ldots S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of Y_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various products involved. A given unit of product capacity at any given point must only be accounted for one customer, otherwise, it may lead to a shortage situation, where one product is allocated to more than one customer leading to dissatisfaction for customers. A company may choose any method of its choosing to perform merging of Series_Elements, and specifically to perform merging of two Series_Elements. The method of merging chosen may affect the total value realized. One example of such a method is given. In one approach, a company may choose to discard all merged Series_Elements that have either one or more common ChildY or common End_Product. A common ChildY in two Series_Elements suggest that in both Series_Elements shifting of one specific Ya is needed. If each Series_Element requires shifting of Ya to two different Sets, it may present a contradictory situation. Similarly, a common End_Product in two or more Series_Elements (that are to be merged together) may require to shift more than one Ya customer to a specific Product, which may or may not be feasible depending on the AC (and EAC) of that product. Thus, a common End_Product may also represent one or more contradictory or invalid situations.

A company may use any set of rules to validate or invalidate one or more constituents of any of the merged components. For example, a merged Series_Element, M, obtained from merging of two Series_Elements S1 and S2, may comprise the COEP (addition of COEP of S1 and S2), COCY (addition of COCY of S1 and S2) and CSE (addition of CSE of S1 and S2).

Remove_Y and Buy_N processes may generate value for the company, an entity other than the company, customers and/or any combination thereof. The value may include, but is not limited to cost savings for the company, an entity other than said company, any combination thereof. The value generated may also include, but is not limited to, soft value, value attributable to customer goodwill, satisfaction and loyalty. The value so generated may optimize revenue of at least one entity other than said company.

Customer Notification Process

In the customer notification (CN) process, a decision for the Chosen Product is notified to the customer. As mentioned earlier, the Chosen Product may be defined by the company, the customer, another entity or any combination thereof. However, the company may want to keep the right to select (or define) the Chosen Product in the FRO VOF. A company may use any method of its choosing to define the Chosen Product. A company may use a software application built on the method defined above to optimally define the Chosen Product to FRO customer.

Figure 26:
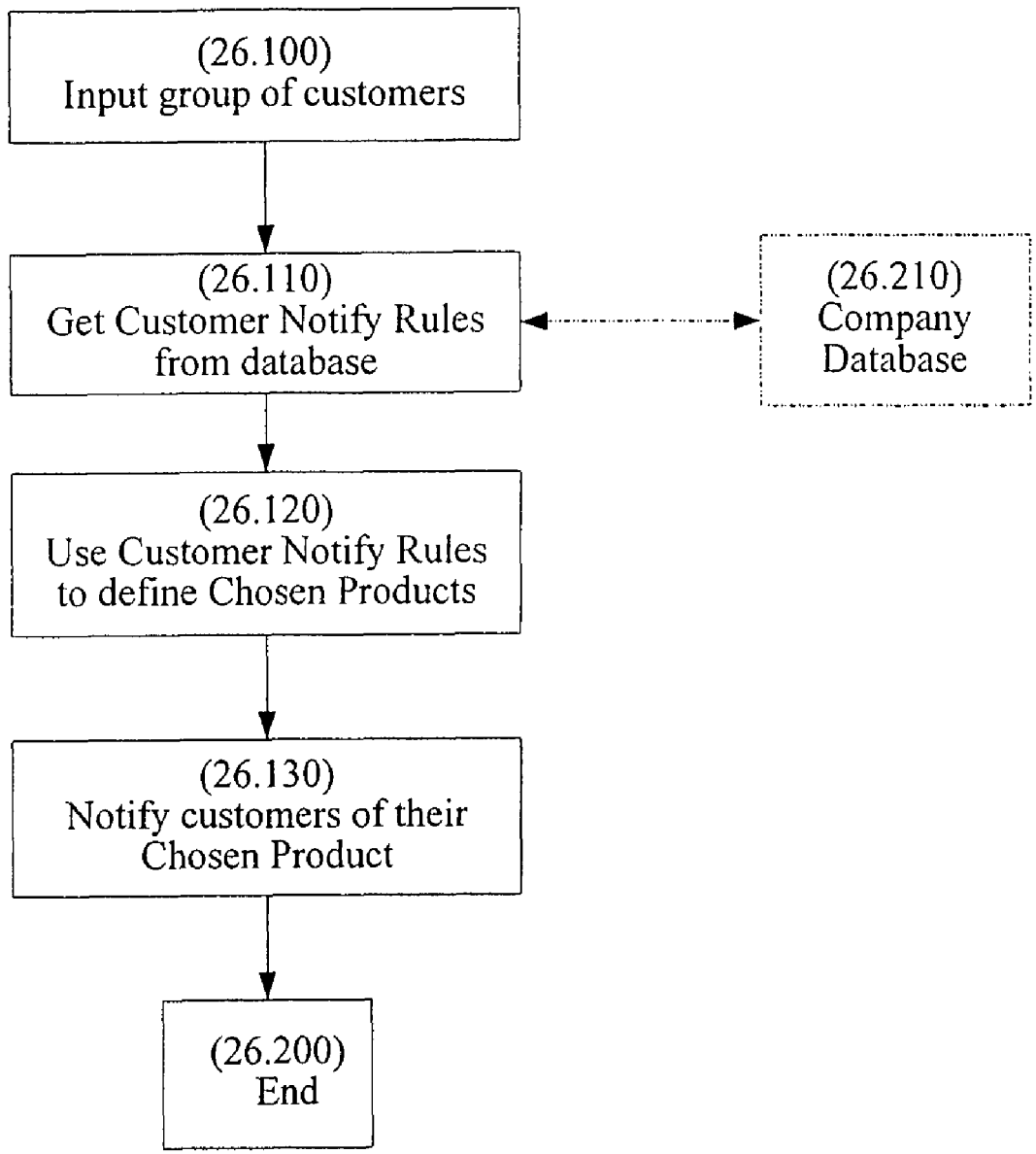
FIG. 26 is a flow chart illustrating an example of an algorithm of Customer Notification process.

FIG. 26 displays an example of an algorithm that may be used to execute the Customer Notification process. In Act 26.100, a group of (one or more) customers is taken as input. Next, in Act 26.110, a set of one or more Customer Notify Rules may be used to define the Chosen Product. A company may choose any Customer Notify Rule of its choosing. The Customer Notify Rules may depend upon expected value of the Product, expected sales volume and so forth. For example, a company may choose a Customer Notify Rule which selects the Product with the higher value as the Chosen Product. Alternatively, a rule may be chosen which selects the Product with the lower value as the Chosen Product. While defining the Chosen Product, a company may also want to use the Remove_Y algorithm (as used in the Buy_N process given above) to determine the optimal Chosen Product that satisfies a pre-determined goal. Thus, during the CN process, one or more Ya may be shifted in the process of selecting the optimal Chosen Product. A Customer Notify Rule may also select the Product with the higher sales volume as the Chosen Product. A Customer Notify Rule may specify that if FRO VOF is used in conjunction with any other VOF (such as APO VOF and so on), then the Grouping Rules (defined later) may govern the selection of the Chosen Product.

Next, in Act 26.120, the Customer Notify Rules, thus obtained from the company's database, are used to define Chosen Product(s). Next, in Act 26.130, the customers are notified about their Chosen Product(s), and the algorithm then ends in Box 26.200.

Implementation of FRO VOF in Conjunction with Other VOFs

FRO VOF may be used in conjunction with one or more other VOFs, for example, the APO (the Alternate Product Option) VOF. A customer who receives an APO is termed "A" type of customer. A company may form a group of one or more APO customers and one or more FRO customers, where the options (APO and FRO) obtained by the group members are complimentary in nature. As an example, consider an A customer who bought an APO to choose either of P1 and P2 as the Chosen Product, and consider a Y customer who received a FRO and is flexible to take any of P1 and P2 as the Chosen Product. Thus, if A decides to choose P1 as the Chosen Product, the company may assign P2 as the Chosen Product for Y, and vice versa. The customers A and Y have taken complimentary options and may form a group. The company may need to hold only one unit of inventory in P1 and P2 to satisfy the needs of both A and Y (assuming each A and Y only need one unit of product). Such a combination of complimentary options or VOFs may improve efficiency and concurrently enhance value for all the parties involved (in the context of the current example, enhance value for A, Y and the company).

The implementation of the grouping of A type and Y type of customers may be done in one or more ways. One way to implement such grouping is to first have one or more Y type of customers and based on such customer(s), the company may offer complimentary APOs to customers to make groups. In another implementation, the company may first offer APO and based on such APO customer(s), company offers complimentary FRO to the customers to make groups. In yet another implementation, the company may offer APO and FRO separately and then define a process to make complimentary groups of A and Y customers (such groups termed "AY_Groups").

A company may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an APO to choose either of P1 and P3 as the Chosen Product, a Y1 customer who received a FRO and is flexible to take any of P1 and P2 as the Chosen Product and a Y2 customer who has also received a FRO and is flexible to take any of P2 and P3 as the Chosen Product. A notation A-Y1-Y2 represents this example. Thus, if A decides to choose P1 as the Chosen Product, the company may assign P2 as the Chosen Product for Y1 and P3 as the Chosen Product for Y2. Alternatively, if A decides to choose P3 as the Chosen Product, the company may assign P1 and P2 as the Chosen Products for Y1 and Y2, respectively.

It is assumed that a "unit" represents one unit of product (or product capacity) and each customer needs only one unit of a product. Continuing with the above example, if the company were to not consider the complimentary nature of options obtained by A, Y1 and Y2 customers, the company may need to hold (or block) a total of 4 units of capacity to ensure complete satisfaction of needs of A, Y1 and Y2, i.e., 2 units for A (1 unit each of P1 and P3 as A could choose any product), 1 unit for Y1 (of either P1 or P2) and 1 unit for Y2 (of either P2 or P3). This implies, to satisfy a total need of 3 units of products, the company may need to hold (or block) 4 units of product capacity, creating a redundant capacity of 1 unit that the company may not be able to use otherwise. By creating a complimentary group of A-Y1-Y2, the company needs to only hold (or block) 3 units of capacity (1 unit each in P1, P2 and P3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A company may choose to implement grouping at various product levels such as Product, Set and Order. A company may also change terms and conditions of one or more option contracts of one or more FRO and/or APO customers (for e.g., price, notify deadline and so on) to solicit customer participation in FRO/APO to create more AY_Groups. The company may also offer incentives to customers to choose complimentary FRO/APO offerings to enable the company to create more AY_Groups. The implementation methods mentioned above for grouping are for illustration purposes only and a company may choose to implement grouping in one or more other ways or by combining above said methods or by combining one or more other ways along with one or more above said methods.

Figure 27:
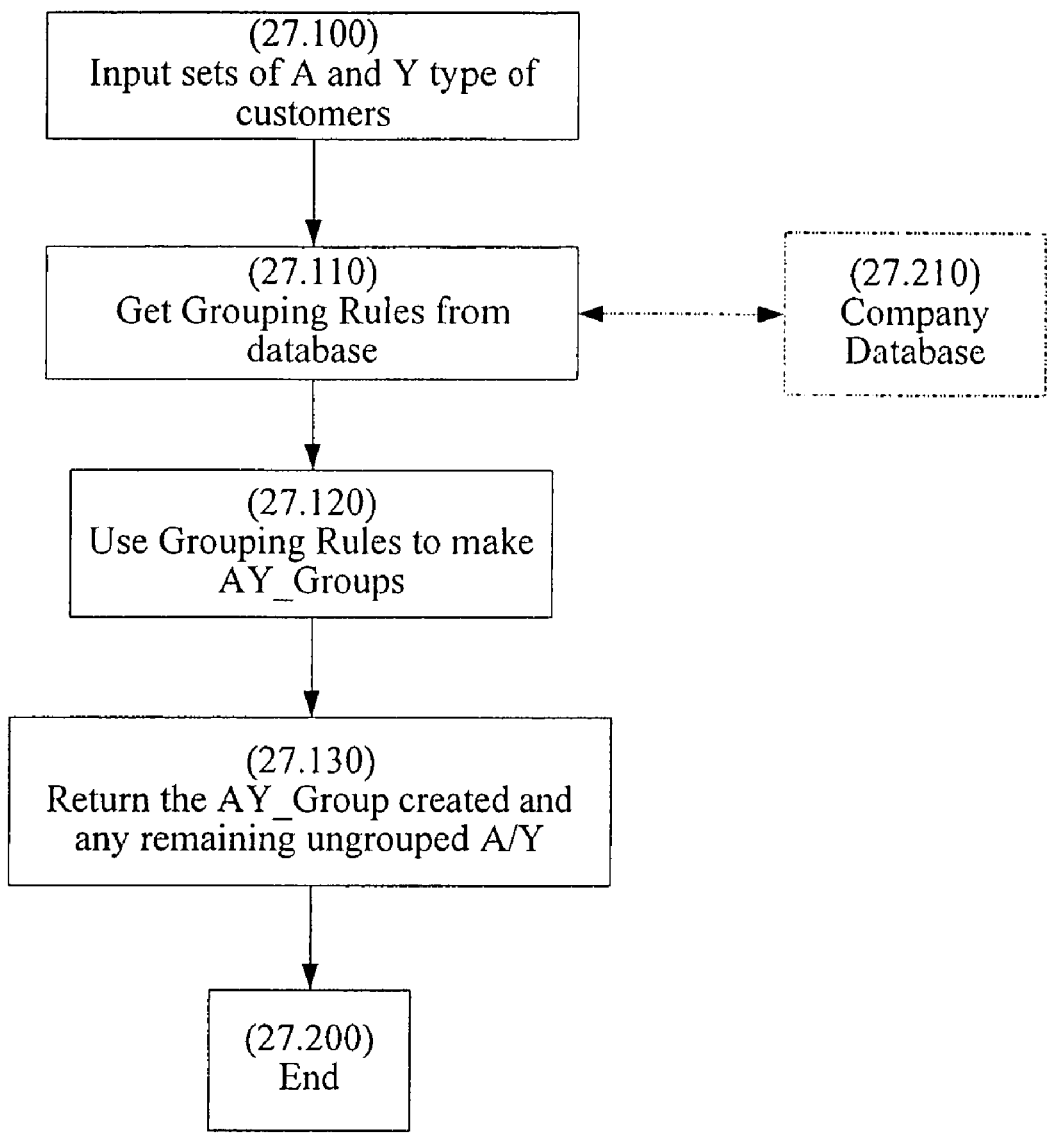
FIG. 27 is a flowchart illustrating an example of an algorithm to implement grouping of A and Y type of customers.

FIG. 27 displays a flow chart that illustrates one way of implementing grouping of A and Y type of customers. In Act 27.100, sets of A and Y customers are taken as input. Next, in Act 27.110, a set of one or more Grouping Rules is read from the company's database (27.210). A grouping rule may depend upon the number of A and/or Y type of customers, desired capacity redundancy in the system, the permissible time factor to create AY_Groups, any other rule of company choosing, any combination thereof and so on. For example, a company may choose a Grouping Rule whereby new groups are created by first ungrouping one or more of the AY_Groups (created earlier but unexercised, for example, groups for which the customer has not been notified, or if notified, the customer has not utilized the Product and the terms of option contract allows for a change in the Chosen Product). A Grouping Rule may create groups of only those A and Y type of customers who have yet to be grouped and discarding all A/Y customers which have already been grouped. A company may implement any Grouping Rule to formulate AY_Groups. The choice to Grouping rules may enhance the overall value for the company (for example, reduce the total capacity required to satisfy product needs for all A and Y customers). Theoretically, the number of units of the Product required (or blocked) should be equal to the number of customers buying the Product (assuming each customer wants one unit of product). Thus, by implementing the grouping and with the help of appropriate Grouping Rules, the company may attempt to achieve such theoretical minima.

Next, in Act 27.120, the Grouping Rules, so obtained from the company's database, are used to make AY_Groups. Next, in Act 27.130, the AY_Groups so created are returned along with ungrouped A/Y, if any, and the process then ends in Box 27.200.

The grouping may enhance customers' experience, and may comprise operating a system that delivers a FRO to at least a "first customer" to utilize up to n of m selected products for said first customer, where n is less than or equal to m; operating a system that delivers an APO to at least a "second customer" to utilize up to k of p selected products, where k is less than or equal to p; operating a system to define each of the k chosen products, whereby after each of the k chosen products is defined, said second customer can utilize said chosen product; operating a system wherein a company defines t chosen product(s) for said first customer after each of said k chosen products is defined, wherein after each of said t products is defined, said first customer can utilize said defined product, where t is less than or equal to n. Said t products may be a subset of n products, m products or both. Said t products or n products or both may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company, an entity other than said company and/or any combination thereof to utilize at least one of said m or p products at least after delivery of any of said first or second options. The company and/or an entity other than said company may implement FRO VOF where in the first and/or second customer in said grouping may be same. The notification conditions may be different, same or any combination thereof for the first and second option.

Said first and/or second option may or may not include any notification deadline condition. The company, the second customer, an entity other than said company and/or any combination thereof may define, at one or more times, at least one of said k chosen products. The company, the first customer, an entity other than said company and/or any combination thereof may define, at one or more times, at least one of said p chosen products. The first customer may select, at one or more times, at least one of said m products. The second customer may select, at one or more times, at least one of said p products. The company and/or an entity other than the company may receive from at least one of said first or second customer, at one or more times, an indication of one or more terms and conditions associated with said first or second options, respectively. Similarly, at least one of said company and/or an entity other than said company may deliver to at least one of said first or second customers, at one or more times, one or more terms and conditions associated with said first or second option, respectively. There may or may not be any payment transaction between the company, an entity other than the company, and at least one of said first and/or second customer.

The FRO VOF may also be used in conjunction with one or more other VOFs, for example, the UPO VOF. A customer who received a UPO is termed "U" type of customer. A company may form a group of one or more UPO customers and one or more FRO customers, where the options (UPO and FRO) obtained by the group members are complimentary in nature.

The implementation of the grouping of Y type and U type of customers may be done in one or more ways. One way to implement such grouping is to first offer and secure one or more Y type of customers and based on such customer(s), the company may offer complimentary UPOs to other customers to make groups. In another implementation, the company may first offer and secure UPO and based on such FRO customer(s), company offers complimentary FRO to other customers to make groups. In yet another implementation, the company may offer UPO and FRO separately and then define a process to make complimentary groups of U and Y customers (such groups termed "UY_Groups").

A company may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(P1, P3), U1[up(P2), base(P3)] and U2[up(P1), base(P2)]. The notation Y(P1, P3) implies a customer Y who has received a FRO and is flexible to have either P1 or P2 as the Chosen Product. The notation U1 [up(P2), base(P3)] implies a customer U1 who received a UPO and wishes to get an upgrade from P3 (i.e., the base product) to P2 (i.e., the up product), and U2[up(P1), base (P2)] implies a customer U2 who received a UPO and wishes to get an upgrade from P2 (i.e., the base product) to P1 (i.e., the up product). A notation Y-U1-U2 represents this example. Thus, there are three products P1, P2, and P3 and they are occupied by Y, U2, and U1 respectively. The three customers have different value needs. The customer Y is flexible on either P1 or P3 if he/she receives a desired reward for trading-in his/her flexibility. The customer U1 has a base product P3 and wishes to get P2 as the Up Product. If a company is able to upgrade U1 to P2 from P3, it may generate incremental value for both the customer and the company. But in the existing framework (i.e., without using conjunction of more than one VOFs), the company may not be able to achieve this without an available capacity on product P2. Similarly, U2 has a base product P2 and wishes to get P1 as the Up Product. A company may customize the desired values for the three customers by leveraging on Y's flexibility and upgrading U1 and U2. The company may assign P3 as Chosen Product to Y, upgrade U2 from P2 to P1, and upgrade U1 from P3 to P2. The company may be able to generate customer surpluses in the process of U1 and U2 upgrades, which would not have been possible normally. Thus, a company may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the company).

It is assumed that a "unit" represents one product (or product capacity) and each customer needs only one product. Continuing with the above example, if the company were to not consider the complimentary nature of options obtained by Y, U1 and U2 customers, the company may need to hold (or block) more than 3 units of capacity to ensure complete satisfaction of needs of Y, U1 and U2. This implies, to satisfy a total need of 3 products, the company may need to hold (or block) more than 3 products, creating a redundant capacity of at least one product that the company may not be able to use otherwise. By creating a complimentary group of Y-U1-U2, the company does not need to hold any capacity, thus freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

A company may choose to implement grouping at various levels. A company may also change terms and conditions of one or more option contracts of one or more UPO and/or FRO customers (for e.g., price, notify deadline and so on) to solicit customer participation in UPO/FRO to create more UY_Groups. The company may also offer incentives to customers to choose complimentary UPO/FRO offerings to enable the company to create more UY_Groups. The implementation methods mentioned above for grouping are for illustration purposes only and a company may choose to implement grouping in one or more other ways or by combining above said methods or by combining one or more other ways along with one or more above said methods.

Figure 28:
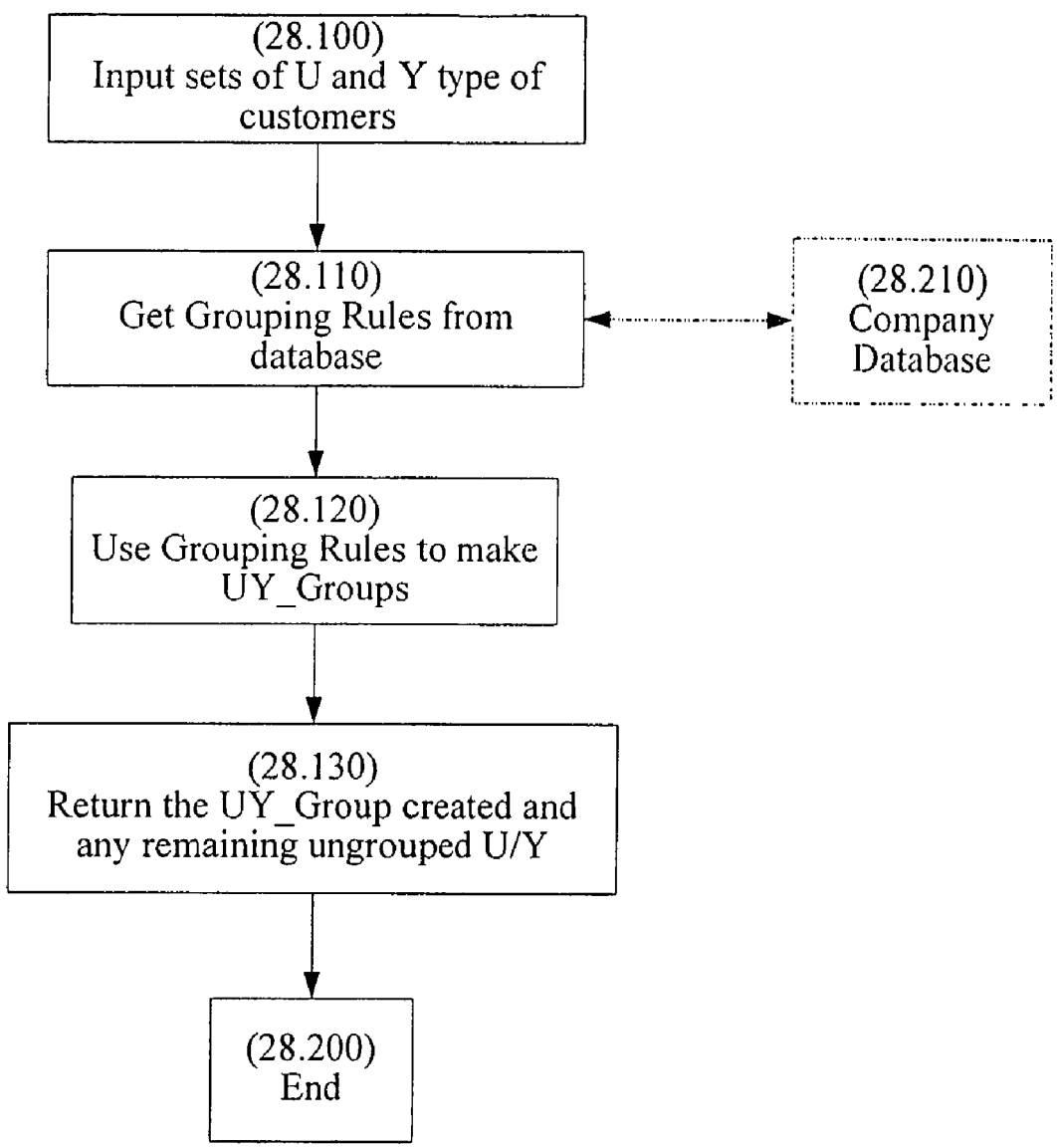
FIG. 28 is a flowchart illustrating an example of an algorithm to implement grouping of U and Y type of customers.

FIG. 28 displays a flow chart that illustrates one way of implementing grouping of U and Y type of customers. In Act 28.100, sets of U and Y customers are taken as input. Next, in Act 28.110, a set of one or more Grouping Rules is read from the company's database (28.210). A grouping rule may depend upon the number of U and/or Y type of customers, desired capacity redundancy in the system, the permissible time factor to create UY_Groups, any other rule of company choosing, any combination thereof and so on. For example, a company may choose a Grouping Rule whereby new groups are created by first ungrouping one or more of the UY_Groups (created earlier but unexercised, for example, groups for which the customer has not been notified, or if notified, the customer has not utilized the product and the terms of option contract allows a change in the Chosen Product). In another example, a Grouping Rule may create groups of only those U and Y type of customers who are yet to be grouped and discarding all U/Y customers, which have already been grouped. A company may implement any Grouping Rule to formulate UY_Groups. The choice to Grouping rules may enhance the overall value for the company (for example, reduce the total capacity required to satisfy product needs for all U and Y customers). Theoretically, the number of units of the product required (or blocked) should be equal to the number of units the customers shall be eventually utilizing. Thus, by implementing the grouping and with the help of appropriate Grouping Rules, the company may attempt to achieve such theoretical minima.

Next, in Act 28.120, the Grouping Rules, so obtained from the company's database, are used to make UY_Groups. Next, in Act 28.130, the UY_Groups so created are returned along with ungrouped U/Y, if any, and the process then ends in Box 28.200.

The grouping may enhance customers' experience, and may comprise operating a system that delivers a UPO to at least a "first customer" to utilize up to n of m selected products for said first customer, and n is less than or equal to m; operating a system that delivers a FRO to at least a "second customer" to utilize up to k of p selected products, and k is less than or equal to p; operating a system to define each of the k Chosen Products, whereby after each of the k Chosen Products is defined, said "second customer" can utilize said Chosen Product; operating a system wherein a company defines t Chosen Product(s) for said "first customer" after each of said k Chosen Products is defined, wherein after each of said t products is defined, said first customer can utilize said defined product, where t is less than or equal to n. Said t products may be a subset of n products, m products or both. Said t products or n products or both may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company, an entity other than said company and/or any combination thereof to utilize at least one of said m or p products at least after delivery of any of said first or second options. The company and/or an entity other than said company may implement FRO VOF where in the first and/or second customer in said grouping may be same. The notification conditions may be different, same or any combination thereof for the first and second option.

Said first and/or second option may or may not include any notification deadline condition. The company, the second customer, an entity other than said company and/or any combination thereof may define, at one or more times, at least one of said k chosen products. The company, the first customer, an entity other than said company and/or any combination thereof may define, at one or more times, at least one of said p chosen products. The first customer may select, at one or more times, at least one of said m products. The second customer may select, at one or more times, at least one of said p products. The company and/or an entity other than the company may receive from at least one of said first or second customer, at one or more times, an indication of one or more terms and conditions associated with said first or second options, respectively. Similarly, at least one of said company and/or an entity other than said company may deliver to at least one of said first or second customers, at one or more times, one or more terms and conditions associated with said first or second option, respectively. There may or may not be any payment transaction between the company, an entity other than the company, and at least one of said first and/or second customer.

Business Model to Implement FRO

Different business models may be used to implement a FRO VOF. The business models mentioned below, without limitation, may be used to implement the FRO VOF in any industry. As an example, a company may choose to implement a FRO VOF individually or in conjunction with one or more partners and/or other companies.

As mentioned in the above sections, for example, an entity may use the allocated products to offer FRO to customers and/or to sell the products as regular products. The allocation of product may be conditional. For example, one of the conditions may require a return of at least one allocated product within a specified time period and/or other consideration(s).

The customer may select or purchase one or more products from the company and/or said entity and then interact with said entity to receive one or more FRO Products in relation to said (already purchased) products. Said entity may also receive product allocation from more than one company, and thus, offer products from multiple companies to a single customer during the Initial Transaction for FRO.

The OA may use those products and operate a service to offer FRO to the customers. As explained above in FIG. 13A, a customer may select one or more products from the OA, and then receive FRO on those selected products from the OA. Another approach would be for a customer to select one or more products from the company and then receive FRO on those selected products from the OA. In another example, a customer may select one or more products from both the company and the OA, and then receive the FRO option on those selected products from the OA. It is also possible that the customer receives FRO from the company or both from the company and the OA on a given set of selected products.

The OA and the company may simultaneously offer FRO to the customers, i.e., a customer may either approach the company or the OA to receive FRO on desired products. In another model, the OA may operate as the sole provider of FRO to all the customers of a company. In yet another model, the OA and the company may choose to work together and jointly offer FRO to the customers. The OA or the company may offer FRO to customers using either or both of the Sequential or the Concurrent Get FRO processes.

As explained in FIG. 13A above, an OA may be able to offer FRO on products from one or multiple companies. An OA may receive allocation of products from two or more companies. A customer may purchase one or more products from one or more companies and/or from the OA, and then receive FRO on those selected products from the OA. Even if the OA may not be entitled to or does not receive product allocation from a company, it may still be able to formulate an agreement with one or more companies to offer FRO on the products of said companies. Thus, a customer may be able to receive FRO on products from multiple companies, giving the customer more value to trade-in their flexibility and variety to choose from. For example, a customer may receive FRO on two products from two different companies, and the OA and/or any one or all of the companies will then notify the customer about the Chosen Product within the terms and conditions of the option contract. This may provide a lot of value to the customers for trading their flexibility, especially when the desired product(s) is provided by a few companies. An OA may be able to thus create a multi-company FRO VOF Framework, which may tremendously enhance the value to the customers. All the participating companies that allocate products to and/or partner with the OA to offer FRO may also gain from the FRO network (benefits include reduced revenue spill, higher revenues from selling the FRO Products at higher prices, and/or to sell FRO on those products, enhanced overall customer satisfaction and/or other operational benefits). Either or both of the OA and the company may process the Chosen Products associated with FRO received by the customer. A customer may receive products from the OA or the company for the products related to the FRO grant. Any entity (the OA and the company) may process products offered only by that entity or by either of the two entities.

The OA and the company may engage in a business agreement to implement the FRO program. The business agreement may divide the total benefit generated by the FRO program between the two parties using any mechanism or criteria as desired. The total FRO Revenue Benefit may be shared between the two parties. The company may allocate products to the OA. One or more companies may allocate only part of or their entire product inventory to the OA to offer those products to the customers by way of regular and/or FRO Products. In return, the OA may offer some revenue or fee to the company for all or a portion of the products allocated. This fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date. There may be one or more conditions associated with the return of unused FRO products and/or products from the Released Products, including, but not limited to, returning the same product, returning a higher value product and so on. The company may allot OA at least one product and said OA may deliver FRO on at least one of said allocated products. The OA may or may not enter into an agreement with the company to provide such option on its products. The OA may sell back at least one allocated product to said company or to at least one entity other than the company or both.

An OA may offer a company flexible customer inventory (generated from FRO) at one or more terms and conditions. The company may be able to use this flexibility to generate benefit from one or more ways, such as the Buy_N process, reducing operational costs and so forth. Some of these examples have been explained earlier.

An OA may formulate an agreement with one or more companies on one or more VOFs, such as on both APO and FRO VOFs, to offer a combination of VOFs to customers.

The FRO VOF may include different conditions regarding the payment of prices related to the FRO. For example, a customer may receive FRO Price only from the company even if he/she is receiving products and/or options from the OA. Similarly, the customer may receive FRO Price only from the OA even if he or she selected the products and/or received the options from the companies. The condition may also be set for a customer to make one or more payments to the company for the products and receive one or more payments from the company for the options received from that company, and to make one or more payments to the OA for the products and receive one or more payments from the OA for the options received from that OA. The condition may allow the customer to receive partial payments from the company and the rest from the OA or vice versa, the basis of which distribution may depend upon various factors, including, but are not limited to, the factors of company's choosing, the arrangement between the OA and the company and so on. In another example, the customer may receive the FRO Price from the third party or may receive FRO Price from any of the combination of the entities mentioned above.

Information Technology System for FRO

A client-server architecture may be used to implement the FRO VOF. However, a company may use a computer hardware and software infrastructure of its choosing to implement a FRO VOF.

The FRO VOF may be best implemented using one or more computer-implemented methods to operate a computer-implemented service to offer FRO to the customers, that includes, but not limited to, recording the information pertaining to the offered and/or used FRO in a database. It may also include operating a computer-implemented service (and/or system) or other service (and/or system) to define the Chosen Products, and recording said Chosen Products (or defined Products) and all the Products related to a FRO in a database.

For the stage one (i.e., to formulate the FRO VOF), an application server may be used along with a database (e.g., a relational database) that stores all the information relevant to the company and the customer. The database may include all the relevant information sufficient to identify Products the company chooses to make eligible for FRO. One or more users (e.g., a business analyst or manager) may have full access to this server through Intranet or highly secured VPN environment to design an optimal value option framework. The database shall also store all the information pertaining to all the acts (in stage one) used by the company while formulating the FRO VOF.

A similar or a different application server and/or a cluster of application servers (functioning concurrently) along with one or more web servers and a set of one or more database servers may be used for the Get FRO as explained in FIG. 13D above and CN (Customer Notification) processes in the stage two of the FRO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get FRO process and the Event Optimizer processes may be computer-implemented as explained and discussed above in FIGS. 13D and 13E. All the customer interactions and the related information such as customer needs, inputs, payment transactions etc. are stored in this database, including information pertaining to the interactions with those customers who may not receive FRO. The systems for stage two and stage one should be maintained in a synchronized environment so that each system has access to the most current information and can communicate with each other.

As discussed above, there may be other ways for implementing the FRO VOF which may depend upon including, but not limited to, the scale of the implementation, business requirements and number of entities involved. The entities may interact through a series of hardware products and services with the OA/company server(s). The OA may or may not be different than the company and the OA server may be the same as that of the company server. The information technology and network system to implement FRO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the company may have one or more separate temporary database structure wherein the entries are updated and stored until the final update is made in one or more main databases. One the final update is done, the entries in these temporary databases may be removed.

The entire system may run at the premises of OA, company and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

A customer may interact with either one or more of the Get FRO, Buy_N, the CN processes either directly or indirectly using a local or a remote terminal (e.g., a computer with a browser and an access to the Internet) that is able to access the web server(s) that host the Get FRO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the company, an OA, a third party service provider or any combination of the above. In the model, where the OA receives Product allocation from the company and offers FRO to the customers directly, the web server, application server and database for both stage one and stage two shall be managed by the OA. The OA may also have partial (or complete) access to the company database and systems through a highly secured environment (for example, a virtual private network). In the model, when an OA and a company tie-up together to offer FRO, all the computer hardware and software infrastructure for both stage one and stage two may be hosted by and/or property of either or both (mutually) of the sides depending upon the business agreement between them.

The above system and architecture may be explained and used for any industry. Each company using the system and method taught herein can make its own choices as to how extensively to deploy the method. For example, a company can implement as few or as many of the foregoing options as it desires; or it may perceive and implement one or more other options.

Flexibility Reward Option (FRO) Value Option Framework in the Airline Industry

As explained above, FRO VOF can be implemented in any industry. The implementation of FRO in airline industry is discussed herein. Within the airline industry, the customer desire to trade-in travel flexibility (defined below) is used as the targeted value element. A detailed demonstration of applying the FRO VOF within the airline industry is presented.

The first stage in the FRO VOF involves steps (or acts) of: capturing customer dynamics, assessing airline operations and economic factors, integrating customer dynamics with airline economic factors, formulating the VOF and optimizing the VOF. The second stage involves carrying out a dynamic interaction with the customer and then executing an Event Optimizer process. The specific detailed steps with respect to the FRO VOF within the airline industry will now be discussed.

Figure 29:
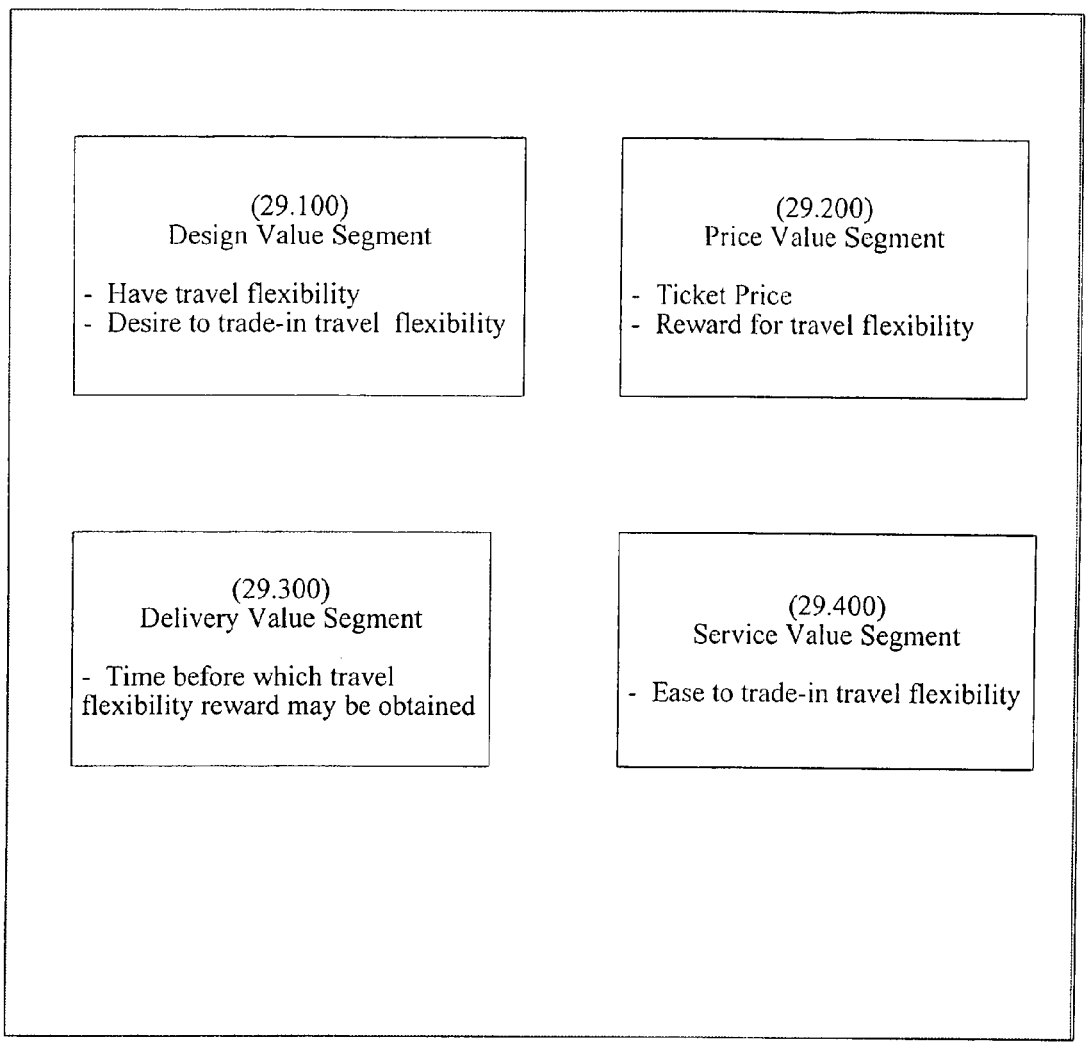
FIG. 29 is a diagrammatic illustration of an exemplary set of value segments and their value elements related to the FRO VOF in context of an airline industry.

First Stage Formulation of FRO Value Option Framework
(1) Capturing Customer Dynamics FIG. 29 shows an analysis of the value elements that are believed to matter to customers in relation to a FRO. In the design value segment, shown in Box 29.100, important value elements may include, but are not limited to, the customers' flexibility in purchasing tickets and their desire to trade-in their travel flexibility. In the price value segment, shown in Box 29.200, important value elements may include, but are not limited to, Ticket Price and desired monetary/non-monetary reward to trade-in travel flexibility. In the delivery value segment, shown in Box 29.300, important value elements may include, but are not limited to, time before which a customer may be able to trade-in his or her travel flexibility to obtain the desired reward. In the service value segment, the important value elements may include, but are not limited to, the ease to trade-in travel flexibility, as shown in Box 29.400. It may be important to estimate the relative preferences and utilities of these value elements to different types of customers.

The customers' desire to trade-in their travel flexibility is subjective in terms of the length of the "travel flexibility trade-in period" and the "range of travel flexibility". The term "travel flexibility trade-in period" refers to the time period during which a customer is willing to trade-in his or her travel flexibility. The term "range of travel flexibility" refers to a range of travel features and/or components across which a customer is flexible. For example, the range of travel flexibility may be expressed in terms of the periods for departure, arrival and stay, range of depart and/or arrival cities, flight services/amenities needed during travel and so forth. The travel flexibility trade-in period, range of travel flexibility and reward (as desired by customers in lieu of travel flexibility) are subjective and may differ from customer to customer, or even for the same customer, may differ from one situation to another.

(2) Assessment of Airline Economics

An assessment of the crucial economic factors of an airline, as indicated in Box 30.100, may reveal the factors to include, but not be limited to, high fixed costs, the varying and unbalanced demand across different flights, the difficulty to accurately forecast demand, the inability or difficulty to shift customers from overloaded flights to low-demand flights, spill-demand from customers who are denied seats, opportunity loss from capacity shortages or spoilage, regulatory requirements from government or other regulatory bodies regarding overbooking and overbooking compensation, an exponential increase in over-sale costs and customer ill-will due to increase in the overbooking limit, the pressure to process customers in an organized manner under time-constrained conditions at the airport, increased competition from the low cost carriers, the need to develop sustainable competitive advantages, customer attrition rate, and the commoditization of the airline industry.

An assessment of the crucial economic factors of an airline may be performed, to determine the factors that affect the profitability, growth and goals of the airline. It might be beneficial if an airline utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information).

(3) Integration of Customer Dynamics with Airline Economic Factors

FIG. 30 also illustrates an example of how a mapping may be done, between the customer and airline profiles, for the FRO VOF in the airline industry. On one side, there are customers who have flexibility and desire to trade-in their travel flexibility in lieu of rewards or benefits. However, customers are also concerned about any hassles, delays, frustration that one may go through if they participate in such an exchange. On the other side, an airline faces an unbalanced demand that is difficult to forecast accurately. It would certainly be very helpful for an airline to know the relative travel flexibilities of customers to receive different flights. For example, an airline may benefit from knowing the relative flexibility of a customer to fly on a flight within a given set of flights.

Airlines usually have a higher aggregate capacity than aggregate demand. However, the demand is non-uniform and often leads to over-sale, revenue spill or spoilage or any combination thereof, in flights. The issue of last minute cancellations and no-shows (CNS) further complicates the issue. To deal with the revenue spills and spoilages, and to concurrently hedge against the CNS, the airlines overbook flights. Overbooking is a risky proposition due to associated costs, customer ill will and/or regulatory or government rules. If a flight takes off with one or more empty seats, that condition probably represents the loss of potential revenue for that airline. The airline may have turned down potential customers due to the risk of high cost of overbooking in the concerned flight or other flights (of the same or different airline). The overbooking factor in flights other than said flight represent potential revenue loss because there may be one or more customers on such other flights who could have been willing to be shifted to the flight with empty seats in lieu of reward, and thus, releasing capacity for new potential customers (who may be willing to pay a lot higher) in said other flights. However, today there is no framework that allows companies to do so in an optimal fashion such that both airline and the customer benefit at the same time. An opportunity, thus, exists to concurrently generate an incremental revenue benefit for the airline, and to maximize the purchase utilities for the customers (includes those who want to trade-in flexibility and those who want to obtain specific flights even at higher prices).

The FRO VOF is created based on the value element "desire to trade-in travel flexibility". More specifically, as shown in the interaction between the Box 30.200 and Box 30.300, a mapping is performed between important customer value elements and the airline economic factors. The value element "desire to trade-in travel flexibility" is extracted, as shown in Box 30.400 and a FRO value option framework is created.

(4) Formulating the "FRO" Value Option Framework

Structure of FRO Value Option Framework in an Airline Industry

Figure 31:
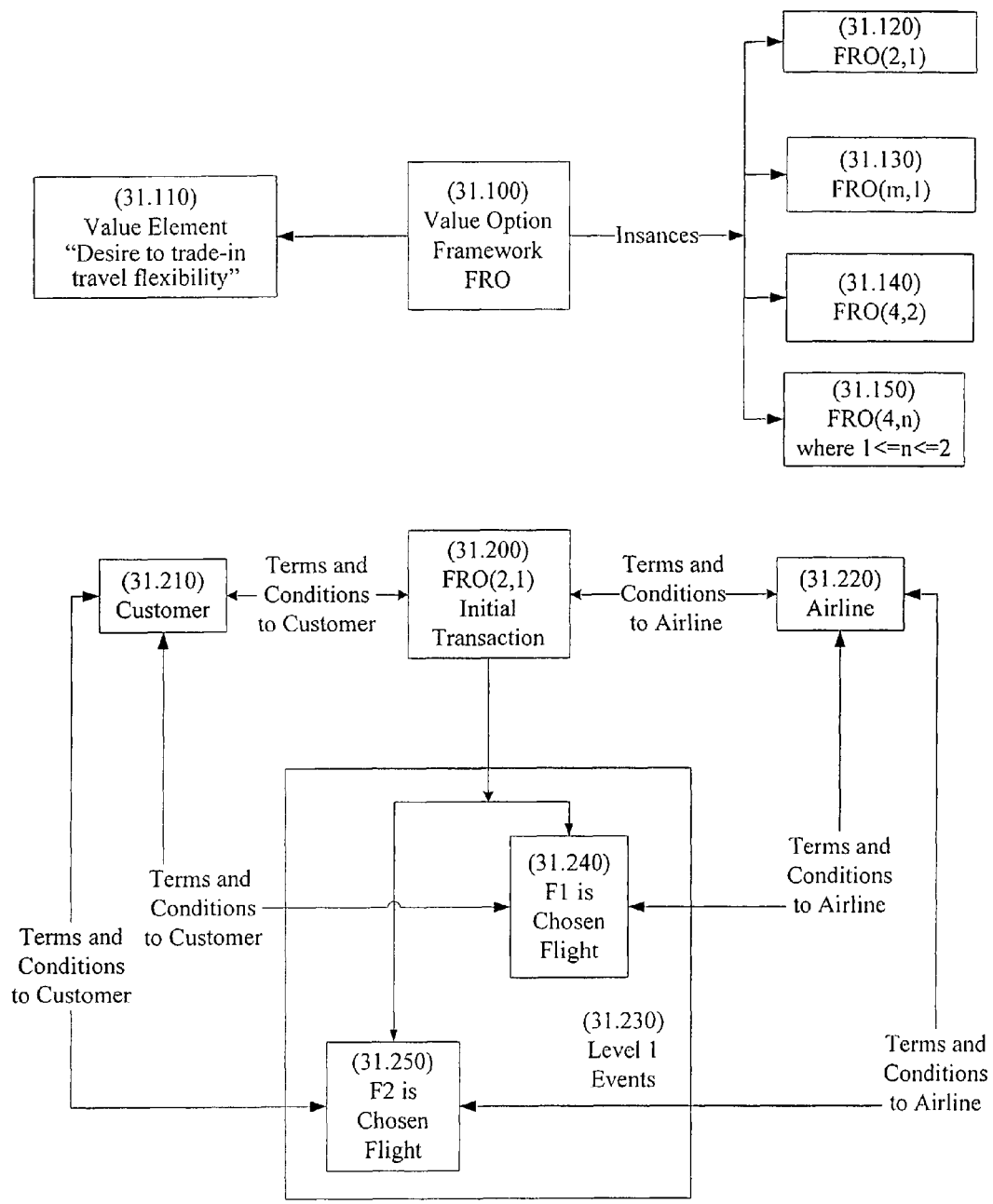
FIG. 31 is a partially-diagrammatic, partially-flow diagram representing the structure for creating a FRO Value Option Framework in context of an airline industry.

FIG. 31 displays the structure of a FRO value option framework (shown in Box 31.100) in the airline industry. The FRO value option framework is related to the value element "desire to trade-in travel flexibility", as shown in Box 31.110.

In the "Initial Transaction" for FRO, shown by Box 31.200, a customer (shown by Box 31.210) and an airline (shown by Box 31.220) transact on the FRO value option. There may be one or more Events (shown by Box 31.230) that follow the Initial Transaction.

In a successful Initial Transaction for a FRO, the customer receives an option to utilize up to 'n' out of 'm' selected flights (said 'm' flights termed "FRO Flights"). The 'n' flights that are finally selected are termed "Chosen Flights". After each of the 'n' Chosen Flights is defined (or selected or chosen or received), the customer has the right to utilize (or can utilize) said Chosen Flight. Apart from the 'n' Chosen Flights, the remaining 'm-n' flights are termed "Released Flights". The Released Flights (if any, that were probably held or blocked for said customer) may be sold to other customers as normal flights or FRO Flights or used for other purposes. The Released Flights in relation to said option may be reused by the airline before, after, at or any combination thereof, the time the Released Flights and/or Chosen Flights are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' F lights may be defined in one or more transactions. The value of 'm' and/or 'n' may be defined and/or re-defined, at one or more times, by the airline, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Flights may include one or more flights other than said 'm' flights.

The FRO Flights may be selected by the airline, the customer, another entity or any combination thereof. The FRO VOF may enable an airline to obtain travel flexibility from FRO customers (i.e., those who select FRO) and use said travel flexibility to satisfy the travel needs of other customers (i.e., who have relatively fixed or strong preferences). Therefore, the airline would usually have the right to select (or define) the Chosen Flights. However, in different implementations of FRO VOF, the airline, the customer, another entity or any combination thereof may select one or more of the Chosen Flights related to a FRO. The FRO Flights and the Chosen Flights may be selected by the same entity, different entities or any combination thereof. For example, the customer may select the FRO Flights and the airline may select the Chosen Flights out of the FRO Flights. The airline may incorporate the customer information and the data related to the FRO into the sales, production, inventory, other database or information system or any combination of the above.

The time when an Initial Transaction is completed (i.e., the customer receives the FRO option on said m Flights) is referred to as the Initial Transaction Time (or ITT, in short). One or more of said m Flights may be selected, at one or more times, before, after, during, or any combination thereof, the Initial Transaction and/or the time said option is delivered to the customer (or the customer receives said option) or any combination thereof. All the FRO Flights may be selected concurrently (i.e., all together in one transaction) or sequentially (i.e., in multiple transactions).

The delivery of an option may include, but not limited to, electronic delivery of the option, physical delivery of the option, any other mode of delivery or any combination thereof. Once said option is delivered, one or more of m flights may be available for use by the airline, an entity other than the airline and/or any combination thereof. The value of 'n' may be defined before, after or any time, the option being delivered to the customer. The delivery of option may occur in relation to the customer purchasing at least one ticket for a flight. The delivery of option may also occur in relation to the customer purchasing a ticket for a flight other than the flight on which the option may be delivered. The customer may purchase a ticket for a flight other than the flight on which the option is delivered to the customer.

In the sequential case, a customer may select one or more Flights in one or more transactions before the Initial Transaction. Said selected Flight(s) (let's say X number of them), thus, may be considered as part of said m FRO Flights of the FRO (m, n) transaction, and the customer may select only the remaining (m−X) number of FRO Flights during the Initial Transaction. All the transactions used to select (or receive) all the m FRO Flights of a FRO (m, n) instance are related to each other, and hence, are considered as "related transactions" (as defined earlier).

In a FRO VOF, the sequential process may comprise a number of "related transactions" when all the FRO Flights are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In the related transactions, 'n' may be equal to 'm' when there may be at least one payment transaction between the airline and the customer related to the flights wherein such payment is made after the option has been granted. Said payment transaction may be one more transaction apart from the initial interaction and/or Initial Transaction in the event said customer utilizes all the 'm' F lights. The customer may select flights prior to utilizing the penultimate flight. The airline, an entity other than said airline and/or any combination thereof may reserve the right to limit the customer to 'n' flights on, before, on or before, after, on or after or any combination thereof, a stated notification deadline date.

An airline may choose to create one or more instances of the FRO VOF based on factors including, but not limited to, number of FRO Flights, Chosen Flights or Released Flights, pre-determination of a number of Chosen Flights or Released Flights, travel flexibility trade-in period, other factors or any combination thereof. For example, a FRO based on a combination of the number of FRO Flights (or m) and Chosen Flights (or n) would be FRO (m, n). Some FRO instances are shown in Boxes 31.120, 31.130, 31.140 and 31.150. For example, when the number of Chosen Flights is pre-determined, the FRO (4, 2) instance may imply that the customer receives 4 FRO Flights, on the condition that the airline may select any 2 out of 4 Flights as Chosen Flights. When the number of Chosen Flights is not pre-determined, the FRO (4, 2) instance may imply that the customer receives 4 FRO Flights, on the condition that the airline may select none, one or 2 Chosen Flights out of FRO Flights. There may also be a minimum limit on n. For example, the FRO (4, n) (where 1<=n<=2) instance limits the airline to select either 1 or 2 Chosen Flights out of the 4 FRO Flights.

The FRO (2, 1) instance, two FRO Flights and one Chosen Flight, is used here as an example to demonstrate the details of the structure of a FRO VOF. Box 31.200 refers to the Initial Transaction between the customer and the airline, in which they transact on a FRO (2, 1) value option. In a successful Initial Transaction for FRO (2, 1), the customer selects two FRO Flights and the airline may select any 'one' of those two Flights as the Chosen Flight. For example, a customer may get FRO for different departure dates. A customer gets FRO to depart either on $5^{th}$ or $7^{th}$ of the month. The airline gets the right to notify the customer, about his Final Flight before $4^{th}$ of the month about the Chosen Flight.

The Initial Transaction may have terms and conditions applicable to the customer, or the airline or both. These terms and conditions may be set, preferably, to concurrently benefit both parties. The connections between Box 31.200 and 31.220, and Box 31.200 and 31.210 refer to the terms and conditions to the airline and the customer, respectively.

The FRO VOF may or may not include any constraints on the FRO Flights. For example, an airline may restrict FRO applicability and availability on Flights that satisfy specific criteria. The two FRO Flights may or may not include practically constrained Flights. Practical constraints may include one or more constraints that will prevent a customer to fly on one or more given Flights or prevent the customer from flying on all the FRO Flights. Such constraints may include, but are not limited to, time constraints, location constraints and so forth. In other words, it may or may not be practically possible for a customer to fly on both the selected Flights due to at least one practical constraint. For example, one flight may be scheduled to be airborne when the other flight is scheduled to depart, thus not allowing any customer on the former flight to take the latter flight, or the distance between the departure airports of the two flights may prevent customers from flying on both flights (that depart within hours of each other).

A customer may select (or receive) FRO Flights in several ways; through mutual agreement (e.g., during a direct interaction such as a Flight purchase), or the airline may grant the FRO Flights to the customer without soliciting their interest or permission. For example, to enhance customer satisfaction or for any other purpose, an airline may grant FRO Flights to customers based on the past customer behavior, interaction and so on.

The Initial Transaction may impose one or more conditions on the airline. An airline may be required to explicitly notify the customer prior to or no later than a given date and time (referred to as the Notify Deadline) regarding the Chosen Flight. For simplicity, it is assumed that whenever the term Notify Deadline is used in the following sections, the condition requires notification prior to the Notify Deadline. If there is no such explicit notification condition, the Chosen Flight may be decided as per the terms and conditions of the option contract. In either case (explicit or implicit notification), the date and time when the selection of the Chosen Flight is notified to the customer is referred to as the Customer Notification Time (or PNT, in short). In the current discussion, the explicit notification condition is assumed unless specifically mentioned otherwise.

An airline may determine one or more Notify Deadlines for a flight at one or more times (e.g., before, during, after the Initial Transaction or any combination thereof) using factors including, but not limited to, customer needs, expected value of the seat in a flight, airline profitability goals, any other factors or any combination of the above. Customer factors should also be considered in determining the Notify Deadlines, such as the travel flexibility trade-in periods desired by customers, or any other factor that may affect the behavior of a customer. The FRO VOF may or may not have a notification deadline condition.

An airline may provide an option of booking 'm' F lights with condition of canceling at least one of them. In such case, the airline may have authority to decide booking of which Flights is to be cancelled. The airline may reward the customer for his/her travel flexibility. Consider an example. A customer may book two Flights at $200 each for two different dates $2^{nd}$ May and $5^{th}$ May. Three cases may follow this event—a) high demand for Flight on $2^{nd}$ May, the airline may cancel the booking of the Flight for $2^{nd}$ May and the customer may be refunded $205 (Ticket Price+Flexibility Reward); b) high demand for Flight on $5^{th}$ May, the airline may cancel the booking of the Flight for $5^{th}$ May and the customer may be refunded $205 (Ticket Price+Flexibility Reward); c) regular demand (i.e. no high demand) for the Flights on both the dates, the airline may cancel the booking of any of the Flights as per its choosing or as per the terms of the option contract and the customer may be refunded $203 (Ticket Price+Flexibility Reward which may be lower in this case).

In the context of the FRO VOF in the airline industry, the terms "price" or "reward" or "discount" normally refer to the price which the airline may offer to the customer in relation to the FRO. However, in one of the implementations of FRO VOF, the customer may also offer a price to the airline in relation to the FRO. The terms "price" and "reward" are used interchangeably as and when the context requires.

The FRO VOF may impose additional terms and conditions on the customer. The airline and/or an entity other than the airline may receive from customer, at one or more times, an indication of one or more terms and conditions associated with said option in the FRO VOF. Similarly, at least one of said airline and/or an entity other than said airline may deliver to said customer, at one or more times, one or more terms and conditions associated with said option in the FRO VOF. A customer may receive one or more rewards (or prices) in relation to the FRO. There may or may not be any payment transaction related to the Initial Transaction and/or other event related to the FRO. There may be one or more prices related to the FRO. A price may include, but is not limited to, a set of one or more Ticket Prices, a set of one or more FRO Prices (or Rewards or Discounts) or any combination of the above. An airline may choose to implement FRO Prices in many ways. For example, a customer may pay a Ticket Price to receive a group of flights, and then, may choose to get FRO on said flights and thus, receive FRO reward. An airline may use the method of its choosing to decide on all the Ticket Prices.

The customer may receive one or more prices during the Initial Transaction (which is referred to as an Initial Price), at the CNT (which is referred to as an Exercise Price) and/or at any other time, which may or may not be pre-determined. The price may be a function of number of FRO Flights and/or Chosen Flights, specific flights to be granted for FRO Flights and/or Chosen Flights, Notify Deadline, one or more Ticket Prices, any other factors of airline's choosing or any combination of the above.

The price may comprise a monetary value or a soft/non-monetary value (e.g., benefits, coupons or exchange of another service) or other consideration. The FRO Price may be fixed or variable, with or without bounds. The airline may set permissible range(s) or boundary limit(s) within which the FRO Price can vary, or it may offer the customer a set of prices to choose from. Since price conditions may depend upon various factors, which may or may not be variable, the same may be decided at anytime. The price conditions may be determined by the customer, the airline, another entity, or any combination thereof at one or more times. One or more prices (FRO Initial or FRO Exercise or any other price) may be a negative value, which reflects that instead of the airline rewarding the customer, the customer shall pay a price to the airline to get the desired Flight as the Chosen Flight.

Different price strategies may be implemented in the FRO (2,1) instance. For example, a single Initial Price could make it attractive and easy for the customer to participate in the FRO program. One or more of the FRO prices (rewards) may be embedded with the Ticket Price by using a special Ticket Price. A customer may be presumed to accept the FRO offer while displaying the Ticket Price (that has the FRO Price embedded in it). These presumptions may or may not include soliciting prior interest of the customer regarding the FRO offer. In case, the FRO price is merged with the Ticket Price, and where such price may or may not be separately identifiable, the customer may or may not receive a separate price for FRO.

The Notify Deadline may be pre-determined or may be determined later (i.e., after FRO grant) by the airline, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the FRO VOF may not allow the airline to notify the customer after the last Notify Deadline (i.e., the latest among the Notify Deadlines). As an operational measure, a rule may be set that if the airline and/or an entity other than the airline fails to notify the customer before the last Notify Deadline, the customer may select either of the FRO Flights as the Chosen Flight. Similarly, in one of the implementations of the FRO VOF, a rule may also be set that if the customer fails to notify the airline and/or an entity other than the airline before the last Notify Deadline, the airline and/or an entity other than the airline may select either of the FRO Flights as the Chosen Flight for the customer. Another approach may be (e.g., for customer/airline) to designate one of the two flights as a Default Flight (during or after receiving the FRO) that will be selected as the Chosen Flight if the airline fails to notify the customer of the Flight selection before the last Notify Deadline. Any entity (e.g., the airline or the customer) may (or may not) be allowed to change the Default Flight once it is selected. The FRO Exercise Price (if any) in the default case may or may not be equal to the FRO Exercise Price for the Default Flight for the last Notify Deadline. In the current discussion, a single Notify Deadline is assumed.

The FRO Exercise Price may be a function of Notify Deadline, FRO Flights and/or Chosen Flight, one or more Ticket Prices, any other factors of airline's choosing or any combination thereof. In such situations, the airline may pay a price to the customer based on the selection of the Chosen Flight at a given time.

The FRO VOF may also include conditions imposed on the customer. A customer may be under a mandatory condition to accept the Chosen Flight once it is selected (for e.g., by the airline).

An airline may determine customer preferences, either explicitly or implicitly, regarding utilization of up to n of m selected flights. The preferences may also include, but not limited to, customer preferences for various flights and services, needs, associated relative utilities, travel flexibilities, preferences regarding choice of flights, quality of flights, acceptable delays (relative) to receive different flights and so forth. An airline may seek customer preferences on flexibility to utilize various flights, desire to trade-in their travel flexibility, any other parameters or any combination thereof. The airline, one or more entities other than the airline or any combination thereof may seek customer preferences.

An airline may also offer FRO options to one or more customers on the basis of customer preferences, so obtained or collected. The airline may offer said FRO options based on the dynamics of the airline including, but not limited to, inventory, operational data, revenue management data, cost data, financial data, accounting data, any other internal data, any combination thereof and so on.

An airline may seek such preferences from the customers prior, during or after the customer has purchased the flights or any combination thereof. These customer preferences may help the airline to perform concurrent optimization of value for the airline, the customers, and one or more entities other than the airline or any combination of two or more of the above. The customers may also include the customers whose preferences have not been determined or collected to perform concurrent optimization. The data pertaining to the airline, customers, one or more entities other than the airline, any combination thereof, may be integrated to concurrently optimize the value for at least any two of said entities. There may or may not be any payment transaction between the airline, one or more other entities and/or the customers regarding seeking such customer preferences, delivering FRO options, customer participation in FRO and so on.

The airline may operate one or more systems and/or services to monitor the airline dynamics. Monitoring may include, but is not limited to, monitoring of capacity, days to utilization, return and/or potential return of flights, flexible inventory that may be created in relation to said obtained preferences, analyzing various cost, revenue, operational or any other internal data and so on. The airline may have one or more systems and/or services to analyze such data on a real-time or quasi real-time basis and draw conclusions on the basis of such analysis. Any of the systems and/or services may be operated by the airline, one or more entities other than the airline or any combination thereof.

An airline may operate a system that defines customer preferences regarding at least utilizing up to n of m selected flights, where n is less than m, operate a system that enables use of said preferences to optimize value for at least one of customers, said airline and an entity other than said airline. Said system may be used to enhance flight selling capacity (or helps to increase the overselling limits of flights). The airline may use such preferences to offer FRO. An airline may concurrently optimize value for at least two of customers, said airline and at least one entity other than said airline.

The airline may utilize such preferences to meet its capacity shortages. These customer preferences may enable the airline to increase the capacity limits for its flights. The airline may start entertaining more requests from the customers and hence may increase the oversale limits for their flights. The airline may be able to sell the flights at higher prices to the potential customers due to increase in capacity and oversale limits and thereby enhance its revenues. Such preferences may help the airline to allay fears of customer ill-will and dissatisfaction in case of an oversale situation. The airline may utilize these preferences to deal with the oversale situation more effectively, efficiently and in timely manner. Thus, it may eventually allow the airline to capture demand that may otherwise, have been spilled or turned down and thereby enhancing its revenues without having any negative impact due to increase in capacity limits.

An airline may offer FRO to all customers or any selected customers, such selection may be based on any criterion including, but not limited to, such as those who have expressed their relative preferences, those who have not expressed any preferences. By integrating the airline dynamics and collected customer preferences, an airline may offer appropriate incentives and terms and conditions for FRO to generate desired participation. An airline may exercise its right (from FRO) to define the Chosen Flights for one or more FRO customers depending on airline's internal need to regenerate flight capacity for flights with low availability or shortages. An airline may be in a better position to offer appropriate FRO offers at a later stage due to many factors including, but not limited to, the airline having better knowledge of internal and external dynamics, a relatively better estimate on how many customers required to avoid oversale situation in the end and so on. An airline may choose to handle any shortfalls in capacity using FRO or by any other method of its choosing.

Once the Initial Transaction is successful, there may be at least two possible related events, as shown by Box 31.230. The two events are (1) that F1 is the Chosen Flight (as shown by Box 31.240) and (2) that F2 is the Chosen Flight (as shown by Box 31.250). Each of these two events may be associated with various terms and conditions on the customer and/or the airline. As explained above, the events may take place in two ways: either the airline selects the Chosen Flight to satisfy its business needs, or the Chosen Flight is selected based on pre-determined rules. The airline may have to pay an additional exercise price at the CNT depending on the terms and conditions of the option contract. Once the Chosen Flight is selected, the airline and/or the customer may not change the Chosen Flight except within the bounds of the terms and conditions in the option contract. The airline or the customer may (or may not) have the right to enforce the Chosen Flight on the other party as per the terms and conditions of the option contract.

The airline may offer incentives to the customers to motivate them to choose one or more flights as Chosen Flights among the FRO Flights that may be more optimal for the airline. An airline may formulate one or more such offer (may referred to as Chosen Flight Incentive Offers) and may send them to customers who have purchased FRO but not yet selected their Chosen Flight via email, phone, mail or any other communication channel as per the terms and conditions of the option contract. Thus, such customers may be persuaded to select said optimal flight in lieu of incentives if the terms and conditions of option contract provide so.

In one implementation of FRO, an airline may want to hold capacity for the customer in only one of the FRO Flights, in which the status of said Y customer is termed "Ya" (i.e., Accounted) and in the other FRO Flight(s), the status is termed "Yw" (i.e., Awaiting) (both Ya and Yw have been defined above). A "Y" customer converts to an N customer after the CNT. Thus, at any given time, an airline may have N, Ya and Yw type of customers for its flights.

The FRO VOF may help an airline in one or more ways. For example, it may help to accommodate flight requests from potential customers. Any new potential customer who requests to obtain a flight is assumed to be an N customer. If the available seat in the desired flight (desired by N customer) is insufficient to satisfy the request, then the airline may use the seat (if any, of desired flight) that has been assigned to Ya customers, and reassign the same to said N customer. Consequently, the airline may then assign the Awaiting flights (i.e., the flights where said Ya customers have Awaiting status) to said Ya customers. By implementing such shifting or removing of Ya customers from their Accounted flights to Awaiting flights, an airline may better serve incoming demand for flights. An event where such request comes to the airline for a flight is termed "Buy_N". The act to remove (or shift) a Ya customer from its Accounted flight to its Awaiting flight is termed "Remove_Y". Detailed algorithms are presented below that may be used to manage a system comprising N, Ya and Yw type of customers.

The above terms and conditions of the FRO VOF may be set in a way to concurrently benefit at least two of the customer, the airline, any other entity apart from said airline involved and/or any combination thereof. The airline gets to seek a way to create a flexible inventory of seats in the flights. The customer benefits from trading their travel flexibility for the desired rewards. The airline benefits from enhanced customer satisfaction (loyalty and repeat business), incremental revenue from the high price paying customers, incurring lower costs on capacity shortages and selling (reusing) the Released Flights, generating revenues from Released Flights without actually reusing the Released Flights and other operational benefits.

A FRO VOF may include a right for the customer to utilize each of the m FRO Flights, and a right for the airline to limit the Flights (to fewer than m) the customer can utilize, if the airline notifies the customer on a stated Notify Deadline. Said on a stated Notify Deadline may include, but not limited to, on and/or before the stated Notify Deadline, on and/or after the stated Notify Deadline, any combination thereof. The right may include the condition that the airline may notify the customer before, at or after the stated Notify Deadline or any combination thereof. To provide some flexibility to the customers, the airline may offer (or allow) the customer to express their preferences regarding the Chosen Flight(s) before the stated Notify Deadline. The airline may or may not exercise their right to limit the customer to utilize fewer than said m flights. The right may include a condition that the airline may limit the customer after the customer expresses his/her preference for the Chosen Flights. The airline and/or an entity other than the airline may have said limitation on at least one product. There may be a condition imposed on the customer to make at least one payment to the airline when the customer expresses his or her preferences for the Chosen Flights. The airline and/or an entity other than the airline may allow the customers to define said 'n' F lights on or before a stated date. The airline and/or an entity other than the airline may reserve the right to take back any 'm' minus 'n' Flights after the stated date. The customer, the airline, an entity other than the airline and/or any combination thereof may determine the notification date.

An airline may choose to define all the Chosen Flights at one or more times. All Notify Deadlines may or may not be associated with each of the related FRO Flights. For example, a Notify Deadline may be after the time when the Flight would have been utilized or the airline may choose not to offer a Notify Deadline on a specific Flight due to one or more reasons including, without limitation, high FRO Price, customer utility reasons and expected load factor. An airline may select any of the selected FRO Flights as the Chosen Flights prior to a Notify Deadline. The airline may also choose not to select any Chosen Flights at one or more of the specified Notify Deadlines.

The costs, revenues, benefits, terms and conditions shown here are for illustration purposes only and actual values could be different depending upon specific values selected by the airline for value options, customer behavior, airline characteristics, Notify Deadline(s) and other relevant factors.

The FRO VOF structure may be implemented in several ways depending upon the terms and conditions associated with the FRO contract. The FRO VOF structure presented above for the FRO (2,1) instance can be extended to implement any other FRO instance.

The FRO concurrently optimizes value for both the airline and its customers. The customers receive rewards for trading their flexibility in utilizing a flight while the airline gets the flexibility to optimally allocate flights (including sold flights) across various customers. The airline gets to know the relative preferences and utilities of a customer for various flights as some customers take this option and others don't. The presumption here is that customers make a logical decision to take part in the FRO value option framework if they desire to trade-in their travel flexibilities. The airline may benefit from higher customer loyalty, as customer may receive higher satisfaction from using the airline services, and may optimize its profitability by reusing/reselling the Released Flights at typically higher than average prices.

Example of FRO VOF Structure FRO (2,1)

FIG. 32 demonstrates an illustrative practical example of using the FRO (2,1) instance in the airline industry. Consider a customer who interacts with an airline to get FRO. Per Act 31.200, an Initial Transaction takes place between the airline and the customer. FIG. 32 displays some of the details of the Initial Transaction. The customer selects/receives two FRO Flights, F1 (shown in Box 32.100) and F2 (shown in Box 32.200), and the airline can select either of the flights as the Chosen Flight. The customer is under the condition to accept the Chosen Flight as selected by the airline.

The customer receives a reward of $15 as the Initial FRO Price from the airline while the customer pays $500 as the Ticket Price to the airline as part of the Initial Transaction. Hence, the customer pays a net amount of $485 to the airline at Initial Transaction. The Initial Transaction takes place on the $14^{th}$ day of April (i.e., the ITT, shown in the second row of the Box 32.300). There is an explicit notification condition wherein the airline has to select and notify the customer regarding the Chosen Flight before the Notify Deadline. An example of terms and conditions included with FRO are presented. A scenario is considered with different Notify Deadlines (shown in Box 32.400) and the Notify Deadline is expressed in terms of the number of days to departure (DTD) of F1, the earlier of the two flights.

Box 32.400 displays a set of FRO Exercise Prices that are a function of both the Notify Deadline and the Chosen Flight. There are four Notify Deadlines associated with the FRO. The FRO Exercise Price increases from $5 (for the First Notify Deadline of 30 DTD) to $20 (for the Last Notify Deadline of 1 DTD) if the Chosen Flight is F1 and from $10 to $50 if the Chosen Flight is F2. If the CNT is before 30 DTD, then the customer receives $5 as the FRO Exercise Price from the airline if the Chosen Flight is F1, and receives $10 as the FRO Exercise Price if the Chosen Flight is F2, as shown in the second column of the second and third rows in the Box 32.400, respectively. If the CNT is after 30 DTD and before 7 DTD, then the customer receives a FRO Exercise Price of $10 or $25 if the Chosen Flight is F1 or F2, respectively, as shown in the third column of the second and the third rows, respectively in the Box 32.400. Similarly, the customer receives a FRO Exercise Price of $15 for F1 or $35 for F2, if the CNT is after 7 DTD and before 3 DTD, and $20 for F1 or $50 for F2, if the CNT is after 3 DTD and before 1 DTD, as shown in the fourth and fifth columns of the second and the third rows in the Box 32.400, respectively.

5) Optimization of FRO VOF

As mentioned earlier (shown in FIG. 7), in the form of an optional last step in the first stage, a financial analysis may be performed using the existing airline and customer data to determine the optimal terms and conditions of the FRO VOF. 'What-if' scenarios may be executed to determine an optimal pricing strategy. The airline may want to divide customers using one or more criteria and design separate FRO VOF for each customer segment.

Second Stage Using the FRO Value Option Framework

After completing the first stage of the method, the airline has created a FRO VOF and specific options within that framework. The airline may have segmented customers and designed options accordingly. The airline is fully prepared to use a structured format comprising one or more FRO value options to interact with its customers in real time to generate benefits for both the airline and its customers. The second stage of the FRO VOF is now presented.

Figure 33:
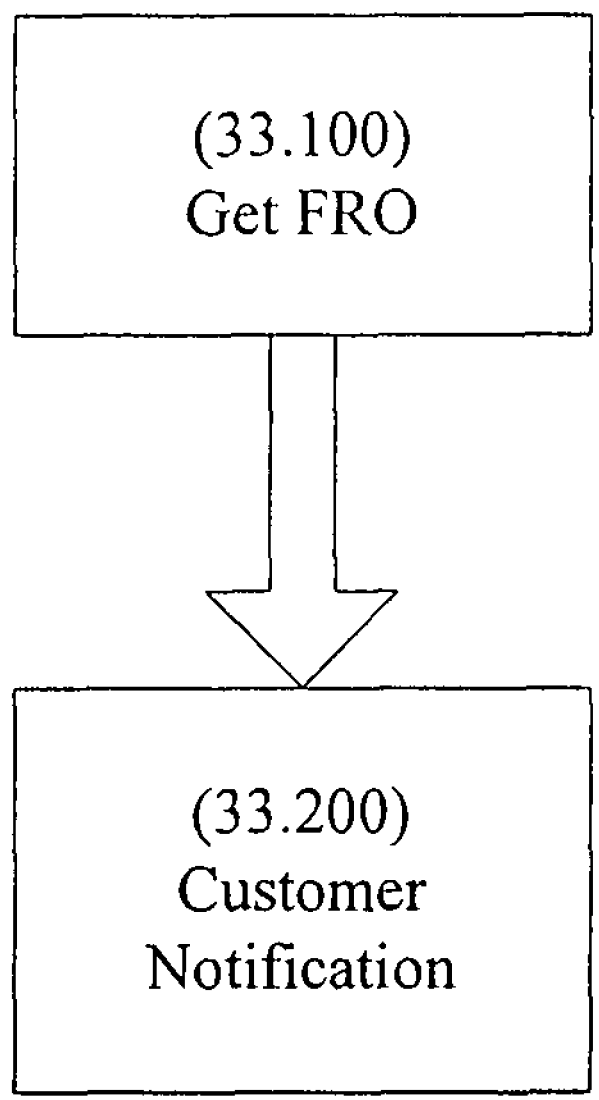
FIG. 33 is a diagrammatic illustration, in a high level flowchart, of a process for FRO VOF implementation in an airline industry.

The implementation of the FRO VOF between the airline and its customer takes place through two high level acts, as shown in FIG. 33. In Act 33.100, the 'Get FRO' process, an interactive event between the customer and the airline's web server, runs to carry out the Initial Transaction of the FRO VOF. In this Act, a number of algorithms may be executed (e.g., availability, FRO Price, Ticket Price and Notify Deadline) on the airline's server to optimally calculate the terms and conditions of the FRO VOF to concurrently benefit both the airline and the customer. In Act 33.200, the Customer Notification process (explained later) is executed. In this process, the Chosen Flight is notified to the customer. The process may also comprise one or more event optimizer algorithms that may help to optimally select the Chosen Flight and/or to optimally use (or reuse) the Released Flight.

Figure 41:
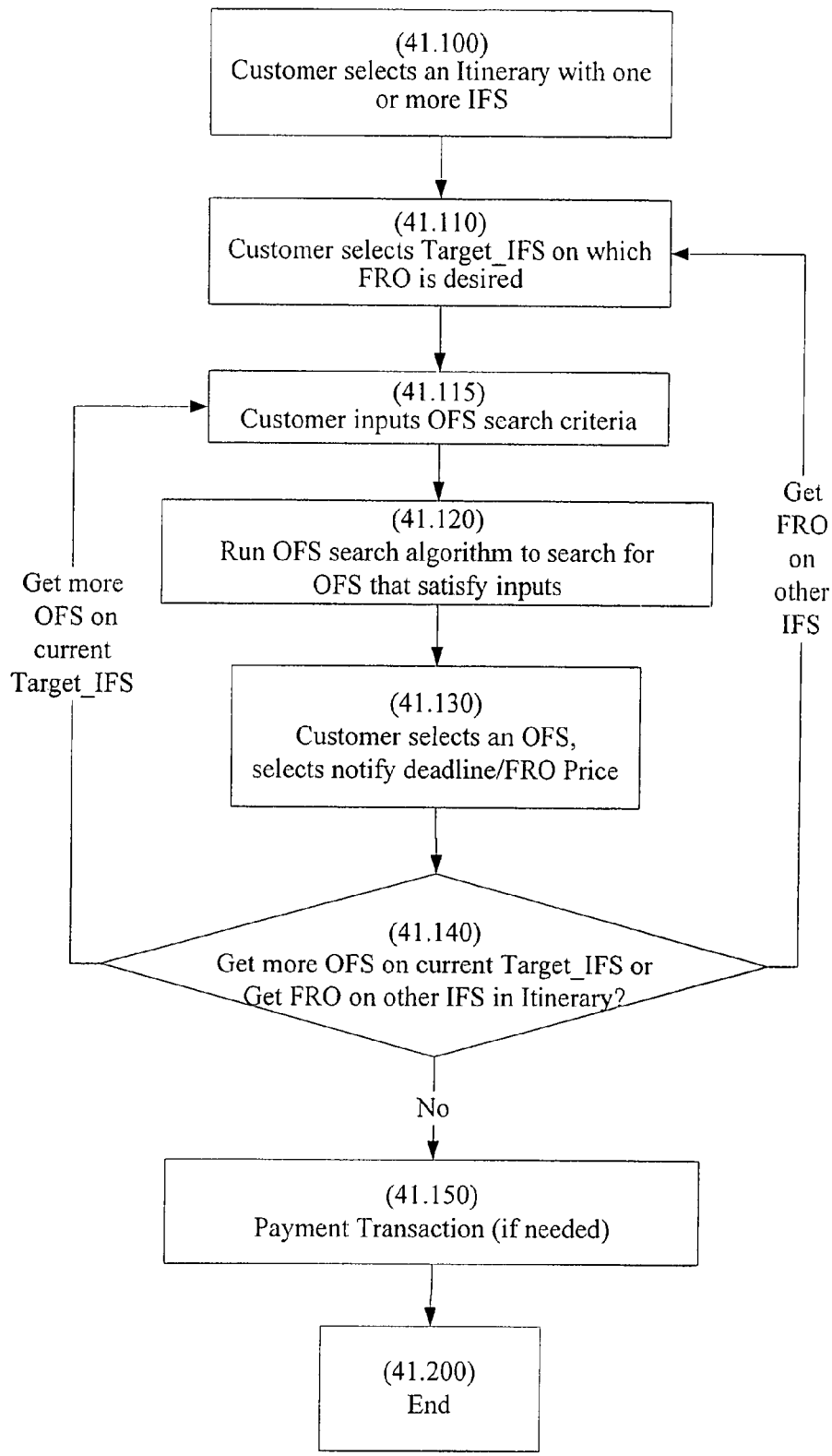
FIG. 41 is a flowchart that expands Act 100 of FIG. 33, illustrating a high level algorithm for the "Sequential Get FRO" process.
Figure 43:
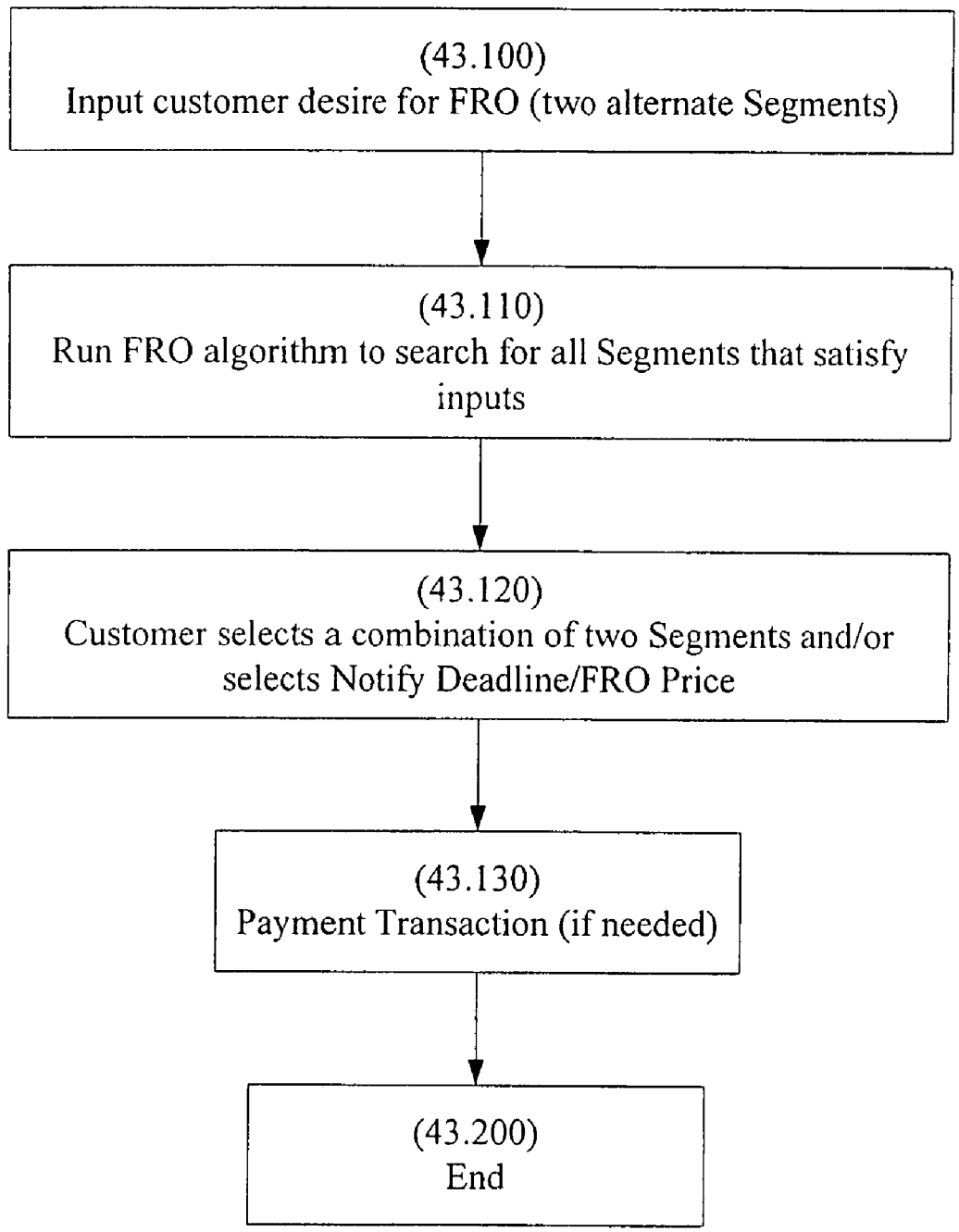
FIG. 43 is a flowchart of an algorithm for the "Concurrent Get FRO" process, an alternative process to FIG. 41.

As explained above, the Get FRO process may be implemented via the Sequential (shown in FIG. 41) or the Concurrent (shown in FIG. 43) process. There are many ways to do the Sequential process. In the airline industry, the terms, Leg, Segment and Itinerary correspond to the terms, Product, Set and Order, respectively. As an example of the Sequential process, a customer may select (or purchase) a Leg/Segment/Itinerary before the Initial Transaction begins. In such situations, said Leg/Segment/Itinerary may be referred to as Initial Leg/Initial Segment/Initial Itinerary or IL/IS/II, in short, respectively. The Initial Segment is also referred to as Initial Flight Segment (or IFS, in short). A customer may get a FRO, i.e., get one or more FRO Legs/Segments/Itineraries on an IL/IS/II, respectively. A FRO Leg/Segment/Itinerary is also referred to as Option Leg/Option Segment/Option Itinerary, or OL/OS/OI, in short, respectively. An Option Segment is also referred to as Option Flight Segment (or OFS, in short). The two events (one for the Initial Flight and the other for the Initial Transaction) may be executed with a minimal (one just after another) or a significant time gap (e.g., few minutes, hours, days and so forth) in between them.

The FRO VOF may be implemented at different levels including, but not limited to, Leg, Segment and Itinerary. Illustration of these three levels, through an example, is shown in FIGS. 34, 35 and 36, respectively.

FIG. 34 displays a practical example of implementing a FRO (2,1) at the Itinerary (Order) level. The customer selects two separate itineraries, FRO Itinerary 1 and FRO Itinerary 2 (shown in Boxes 34.100 and 34.200), and the airline may select either of them as the Chosen Itinerary.

FIG. 35 displays a practical example of implementing a FRO (2,1) at the Segment (Set) level. A customer selects a round-trip Itinerary with two IFS as shown in Boxes 35.100 and 35.200. The customer then takes FRO on the Onward Journey, i.e., the first IFS, as shown in Box 35.120 and the airline may select either this IFS or the related OFS (Option Flight Segment) as the Chosen Flight Segment for the onward journey.

FIG. 36 displays a practical example of FRO implementation at the Leg (Product) level. A customer obtains FRO on Leg 2 (i.e., Initial Flight Leg or IFL, in short) in the onward journey, and receives one Option Flight Leg (or OFL, in short) on the Leg2, as shown in Box 36.200. The airline may select either the IFL or the associated OFL as the Chosen Flight Leg (or CFL, in short) for Leg2 in the onward journey.

An airline may choose to implement the FRO at any level(s). In a specific FRO interaction between a customer and the airline, the implementation level should be the same for all the FRO Flights, Chosen Flights and Released Flights. For example, if FRO is implemented at the Itinerary level, then all the FRO Flights and Chosen Flights would refer to FRO Itineraries and Chosen Itineraries, respectively.

1. 'Get FRO'—Dynamic Interaction to Capture Customer Demand

In the Get FRO process, a customer interacts with the airline's server to receive FRO. The interaction may take place (for example) via phone, in-person or on a website. The Sequential Get FRO Process is presented first along with its detailed algorithms, followed by a short summary of the Concurrent Get FRO Process.

Sequential Get FRO Process

There are several ways to implement the Sequential process. The following presents an example of the Sequential Get FRO Process when FRO is implemented at the Segment level. It is also assumed here that the customer first purchases an Initial Itinerary with one or more IFS, and then opts to receive a FRO on any of the included IFS.

As an instance of the Sequential Get FRO process in the airline industry, a customer has purchased an Itinerary and then gets a FRO through the interactive interface of the web pages as shown in FIGS. 37, 38, 39 and 40. FIG. 37 displays the summary of the purchased Itinerary, which is made of two Segments: BOS to ATL (onward journey) and ATL to BOS (return journey). Clicking on the marketing banner representing "Get FRO", the customer is linked to the Web page shown in FIG. 38 and a Get FRO interaction begins.

The series of web pages in FIGS. 38, 39 and 40 may (for example) be displayed in a customer's browser by an airline's web server, to facilitate the interaction between the customer and the airline when the customer comes to participate in Get FRO (during or after the Initial Itinerary is purchased). The Initial Itinerary is displayed in FIG. 38. The customer may choose to Get FRO on any IFS by clicking the "Click here to Get FRO Flights" link corresponding to that IFS. Once the link is clicked, the "Search FRO Flights" section appears (shown in FIG. 38), where the customer may enter the search criteria for OFS and then click on the "Search FRO Flights" button. After the click, the Get FRO algorithm running "behind the scenes" on a server of the airline qualifies the availability, applicability and price (i.e., the discount for customer) conditions on all the available OFSs (Option Flight Segments) and displays them in the screen as shown in FIG. 39. For each of the OFSs, Instant FRO Discount (Price), a set of one or more Notify Deadlines and the corresponding FRO Exercise Discounts (Prices) are shown in the form of "Select" buttons (shown in the "FRO Notify Deadline/FRO Exercise Discount (Price)" section in FIG. 39). The customer may select any desired OFS (along with the Notify Deadline and FRO Exercise Discount (Price)) by clicking on a "Select" button associated with any of the Notify Deadlines displayed in the corresponding row. Once the customer clicks the "Select" button, he/she is hyperlinked to the web page as shown in FIG. 40, where the summary of the IFS and the selected OFS is shown.

Next, the customer may choose to get more OFS on the same IFS, or to get FRO on another IFS in the Initial Itinerary. To receive another OFS on an IFS, the customer may repeat the OFS search process for that IFS. Once all the desired OFSs have been selected, the customer clicks the "Continue" button (shown in FIG. 40). The customer receives the Instant FRO Discount (Price), and then a payment transaction is executed to complete the purchase.

The following presents an algorithmic illustration of the Sequential Get FRO process. Consider FIG. 41. In Act 41.100, the customer selects (and/or purchases) an Itinerary (with one or more IFS). Next, in Act 41.110, the customer reaches an interactive interface of the airline's web server to Get FRO page, where the customer selects the IFS (referred to as Target_IFS) on which a FRO is desired. Next, the customer inputs the OFS search criteria for the current Target_IFS in Act 41.115.

Next, on clicking the "Search FRO Flights" button, control goes to Act 41.120, where the OFS search algorithm is executed to search for OFS. The OFS search algorithm returns a list of valid OFSs, along with a list of Comb_NDs (defined elsewhere) and associated FRO Prices (or discounts). The details of the OFS search algorithm are presented later. Next, the search results are displayed for the customer, who then selects the desired OFS and one or more associated Comb_ND(s)/FRO Price(s), as shown in Act 41.130.

Next, in Act 41.140, a test is performed to determine whether the customer wants to get more OFSs on the current Target_IFS or on another IFS. If the customer wants to get an OFS on another IFS, control loops back to Act 41.110, where the customer selects another IFS as the Target_IFS, and then the process is repeated again for the new Target_IFS. If the customer wants to get more OFSs on the current Target_IFS, control loops back to Act 41.115, where the customer enters the OFS search criteria, and then the process is repeated for the new OFS search criteria. If the customer does not want to get any more OFSs, control goes to Act 41.150, where a payment transaction (if needed) may be executed. For example, a customer may need to pay a price for the Flight after taking into consideration the Initial FRO Price (discount, if any) using a credit card, direct bank account debit or any other payment transaction mechanism. Next, the algorithm ends in Box 41.200. The computation may be performed using a processor that may calculate results in optimal time.

OFS Search

Figure 42:
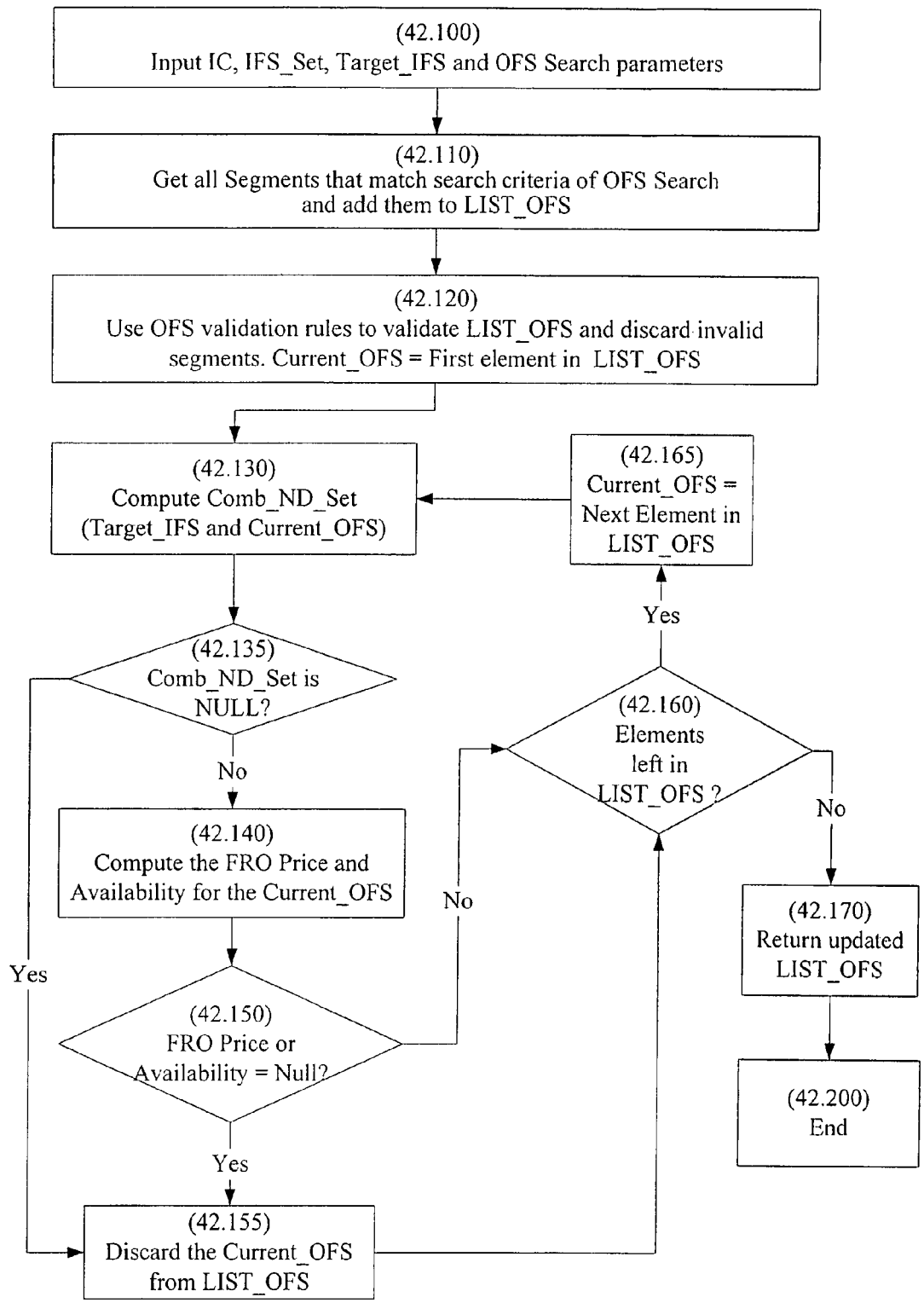
FIG. 42 is a flowchart that expands Act 120 of FIG. 41, illustrating an algorithm to search for FRO Flight Sets.

The following algorithm (shown in FIG. 42) determines and validates an OFS for a given set of conditions including, but not limited to, availability, Notify Deadline and FRO Price. One of the ways of the implementation of OFS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 42.100, the number of incoming customers (IC), IFS_Set (containing all IFS in the Initial Itinerary, and all the OFSs, (if any) already selected/received along with Comb_ND_Set(s) and Comb_OP_Set(s), for each IFS), Target_IFS and the OFS Search parameters are input to the system. The definitions and details of Comb_ND_Set and Comb_OP_Set are provided later. The OFS search parameters may include, but are not limited to, departure date and time, origin, destination, number of Legs per Segment, Notify Deadline, FRO Price (Initial and Exercise) and so forth. A customer may be allowed to input Notify Deadline and/or FRO Price on the basis of which valid OFSs (that satisfy the given criteria of Notify Deadline and/or FRO Price) may be searched for and displayed for the customer. For example, a customer may be asked to input the origin and destination related parameters, and then a set of Notify Deadlines and FRO Prices may be computed for the flights that match the given criteria. In another example, a customer may input both the origin and destination and Notify Deadline and/or FRO Price as inputs and then a search may be performed for valid OFSs. In yet another example, a customer may input to the system, one or more flights, and/or inputs to search for one or more additional flights (e.g., origin and destination, price etc.) to search for OFS that may be combined with one or more input flights (by the customer) to constitute the total set of flights for a FRO. In such situations, an airline may also validate the flights input by the customer to determine if said flights are eligible to be the FRO Flights.

Next, control goes to Act 42.110, where an OFS Search is performed for the given criteria. The search may be best performed using a processor that may calculate results in optimal time. The order in which search parameters are executed may be optimized to reduce the search time, however, it may or may not affect the final outcome. An airline may select any order of its choosing.

In Act 42.110, Flight Segments are determined that match the search criteria and the resulting Segments are added to a list termed LIST_OFS. Next, in Act 42.120, a list of OFS validation rules is obtained from the airline's FRO VOF database and the rules are used to validate all the Segments in the LIST_OFS list. Segments that do not satisfy the rules are discarded. Validation rules may include, but are not limited to, a Maximum Number of Legs per Segment Rule, a Maximum Ticket Price Rule and so forth. For example, a Maximum Number of Legs per Segment Rule discards the Segments that have more Legs than specified. An airline may implement any validation rule of its choosing to further qualify the Segments in the LIST_OFS list. As a last Act in Act 42.120, the first element in the updated LIST_OFS list is designated as the Current_OFS.

Next, control goes to Act 42.130, where a group of Comb_NDs is computed for the combination of the Target_IFS, all the existing OFS of the Target_IFS and the Current_OFS, and added to a set called Comb_ND_Set. Next, in Act 42.135, a test is performed to determine whether the Comb_ND_Set obtained in the previous Act is Null. If so, control goes to Act 42.155. If not, control goes to Act 42.140, where the FRO availability and FRO Price for the Comb_ND_ Set are determined. Next, in Act 42.150, another test is performed to determine whether the FRO Availability or the FRO Price is Null. If so, control goes to Act 42.155. If not, control goes to Act 42.160.

In Act 42.155, the Current_OFS is discarded from the LIST_OFS list, and control goes to Act 42.160, where a test is performed to determine if more elements are left in the LIST_OFS list. If so, control goes to Act 42.165. If not, control goes to Act 42.170.

In Act 42.165, the next element in the LIST_OFS list is designated as the Current_OFS and control loops back to Act 42.130 to repeat the process for the new Current_OFS. In Act 42.170, the updated LIST_OFS list is returned as the search result, and the algorithm ends in Box 42.200.

Computation of Notify Deadlines

An airline may set one or more Notify Deadlines of its choosing for its Flights. Once the Notify Deadlines have been set for each Flight, the next Act is to create a framework to compute the Notify Deadlines for a group of Flights (such as a Segment, an Itinerary or any other group). The following sections present an example of a framework that may be used to obtain a set of Notify Deadlines applicable to a group of Flights. An airline may use any framework and algorithm of its choosing to obtain the same.

A set of Notify Deadlines associated with a Leg, a Segment and a combination of two or more Segments is called Leg_ND_Set, Seg_ND_Set and Comb_ND_Set, respectively. Each element in the Leg_ND_Set, Seg_ND_Set and Comb_ND_Set is termed Leg_ND, Seg_ND and Comb_ND, respectively. The Comb_ND_Set may be computed by combining the Seg_ND_Sets of all the given Segments. A Seg_ND_Set may be computed by combining the Leg_ND_Sets of all the Legs under that Segment. The Notify Deadlines may be computed based on various parameters and factors of the airline's choosing. One example to compute a Comb_ND_Set is as follows. First compute Seg_ND_Set for all Segments. A Seg_ND_Set is computed by first selecting earliest of the Notify Deadlines of each Leg within the concerned Segment, and then picking the latest of those Deadlines, and noting that as the Target_Deadline. Next step is to pick all those Notify Deadlines that fall after the Target_Deadline. Notify Deadlines thus obtained may be validated using various validation rules based on airline factors such as customer utility, flight parameters and so forth. Similarly, the Comb_ND_Set may thus be computed by repeating the above process for Seg_ND_Sets, thus obtained for each Segment.

Available Capacity Check

The FRO capacity for an OFS may depend on one or more factors including, but not limited to, Notify Deadline, FRO Prices, expected Seat value in a flight and so forth. An airline may use any method of its choosing to determine FRO capacity of a flight. For example, an airline may choose to have a fixed FRO capacity for one or more of its flights.

An instance to compute FRO capacity is discussed below. Consider the case, when FRO Capacity is dependent on Notify Deadline. In such situation, the objective is to determine those Comb_NDs within the Comb_ND_Set on which FRO is available for the given OFS. The FRO Capacity and the Used FRO Capacity (the total number of Flights on which FRO has been sold but not exercised) may be calculated for each Comb_ND within the Comb_ND_Set. Available Capacity (AC) would then be the difference of FRO Capacity and Used FRO Capacity for the given Flight. If the AC is greater than or equal to the number of incoming customers desiring a FRO, then the FRO capacity is available at a given Comb_ND for the given OFS. The process may be repeated for all Notify Deadlines within Comb_ND_Sets. FRO may be made available on a given OFS for a given Comb_ND, if FRO is available on all the Flights of OFS for the given Comb_ND.

Price Calculation

An airline may set FRO Prices for a Flight Leg using any method of airline's choosing. Once the FRO Prices have been set for each Flight Leg, the next Act is to create a framework to compute FRO Price for a group of Flight Legs (such as a Segment, an Itinerary or any other group) by using FRO Prices for each Flight Leg in the group.

The parameter Leg_OP refer to FRO Price (and may or may not be corresponding to a Notify Deadline) associated with a Flight Leg. Similarly, Seg_OP and Comb_OP refer to FRO Price (may or may not be corresponding to a Notify Deadline) associated with a Segment and a combination of two or more Segments, respectively. A set of Leg_OPs, Seg_OPs and Comb_OPs is termed Leg_OP_Set, Seg_OP_Set and Comb_OP_Set, respectively. The Comb_OP_Set is computed by combining the Seg_OP_Sets of the IFS and all the OFSs (existing and new). A Seg_OP_Set is computed by combining the Leg_OP_Sets of all the Flight Legs under that Segment. One or more Seg_OP_Rules may be read from the airline's database and applied to calculate Seg_OP_Set for each input Segment (IFS and all OFSs) using the Leg_OP_Sets of all the Flight Legs of said Segment. An airline may use any Seg_OP_Set Rule of its choosing. Seg_OP_Rules may be defined to calculate Seg_OP as the sum, average, highest, lowest or any other function of Leg_OPs of all the Flight Legs at a given Comb_ND. Similarly, a Comb_OP_Set comprises one or more Comb_OPs, and is calculated using one of the pre-determined rules, termed Comb_OP_Rules, to combine the Seg_OPs of all the Segments in the combination. An airline may use a Comb_OP_Rule of its choosing. Comb_OP_Rules may be defined similar to the Seg_OP_Rules.

Concurrent Get FRO Process

As explained above, in the Concurrent Get FRO process, a customer receives all FRO Products concurrently in one transaction. An algorithmic illustration of an example of the Concurrent Get FRO process is displayed in FIG. 43. The FRO (2,1) instance is assumed here as an example. Consider a customer who desires to trade-in his/her travel flexibility in lieu of a price (reward) offered by the airline. In Act 43.100, the customer desires for FRO are input, including, but not limited to, a search criteria for two Segments according to customer's utility (may be similar to the search criteria defined above for the Sequential Get FRO process).

Next, in Act 43.110, the FRO algorithm is run to determine the combinations of two Segments that satisfy inputs. A list of such search results is displayed for the customer along with the associated terms and conditions including, but not limited to, Notify Deadlines, Initial FRO Price, FRO Exercise Price and Ticket Price for each such combination. The FRO algorithm for the Sequential Get FRO process (defined above) may also be used for the Concurrent Get FRO process.

Next, in Act 43.120, the customer selects a desired combination of two Segments and the associated conditions such as FRO Exercise Price/Notify Deadline. Next, in Act 43.130, a payment transaction is executed, if needed. For example, the customer may pay the Ticket Price after taking into consideration the Initial FRO Price using a credit card, direct bank account debit or any other payment transaction mechanism. Next, the algorithm ends in Box 43.200. The computation may be performed using a processor that may calculate results in optimal time.

2. Event Optimizer

After the completion of the Get FRO process, the next stage is the Event Optimizer. In this stage, the Customer Notification (or CN, in short) process as shown in Act 33.200 is executed. In this process, one or more decisions on the selection of Chosen Flight(s) are notified to the customer. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

The FRO VOF helps to create a flexible customer inventory. In other words, by using the FRO VOF, an airline may obtain rights to allocate any of the selected FRO Flights to a FRO customer, and thus, said FRO customer acts like a flexible customer inventory that the airline may manage at known cost and conditions. An airline may design one or more uses of such flexible customer inventory, where each such use may include one or more events that follow the Initial Transaction. An example (the Buy_N process) was explained earlier. In the Buy_N process, an airline may use the FRO VOF to accommodate requests from potential customers for flights. As an example, the Buy_N process may especially be used to satisfy requests for seats that have already been sold or have low (or no) availability. The details for the Buy_N process are presented below.

Another example to use the FRO VOF would be to use the FRO VOF in conjunction with one or more other VOFs, for example, the AFO (the Alternate Flight Option) VOF (details are provided later). An airline may form a group of one or more AFO customers and one or more FRO customers, where the options (AFO and FRO) obtained by the group members are complementary in nature. As an example, consider a customer (A) who bought an AFO to choose either of Flight F1 or Flight F2 as Chosen Flight, and consider a customer (B) who received a FRO and is flexible to take any of F1 and F2 as Chosen Flight. Thus, if A decides to choose F1 as the Chosen Flight, the airline may assign F2 as the Chosen Flight for B, and vice versa. The customers A and B have taken complementary options and may form a group. The airline may need to hold only one unit of inventory (or one unit of seat) in F1 and F2 to satisfy the needs of both A and B (assuming each A and B only need one unit of product, i.e., seat). Such a combination of complementary options or VOFs may improve efficiency and concurrently enhance value for all the parties involved (in the given example, for A, B and the airline). More details on combining VOFs are provided later.

The FRO VOF may also be used to reduce operational costs, constraints or other goals that are impacted by the allocation of flights among different customers. The FRO VOF may be used to shave off production costs by reducing production capacity for one or more products that are low in demand. For example, if an airline experiences a flight with very low ticket sales, it could offer FRO to customers on that flight and thus, be able to economically and efficiently shift them to different flights and thereby be able to cancel said flight to save its flying costs (such as crew costs, staffing costs like gate agents, ground mechanics, maintenance costs and so forth). If an airline wants to do the same on a low demand flight today (after booking few customers on it) without using FRO, it may be more difficult, tedious and costly affair to contact all the booked customers on that flight and/or to convince them to shift to other flights.

The FRO VOF structure in the airline industry may enable an airline to optimize operational levels such as flight loads (or load factors), airport congestion, flight scheduling, airport staff and crew scheduling and so forth. The FRO VOF may also enable an airline to identify the optimal aircraft sizes/structures and flight schedules on specific routes. There may be many other instances of optimization an airline can achieve by using FRO, thus, generating additional revenue, greater customer satisfaction and loyalty or any combination of these.

An airline may use the FRO VOF for any other purpose of its choosing. In all such uses, the airline may use a system defined below that can help to optimally allocate product capacity among customers. The following system presents an example of a system (along with its methods and algorithms) that may be used to shift FRO customers within their selected FRO Flights. However, an airline may use any other process of its choosing to shift FRO customers within their selected FRO Flights. The Buy_N process is used as an example to demonstrate the system and its set of methods and algorithms.

The process of shifting Y customers (i.e., FRO customers) within their selected FRO Flights is termed "Remove_Y" process. The Remove_Y process may allow the airline to remove FRO customers from their Accounted Flights and optimally shift them to one of their Awaiting Flights to satisfy a pre-defined goal.

An airline, an entity other than the airline and/or any combination thereof may store the data in a data store which may include, but is not limited to, the value that may be realized if the customer is shifted, Awaiting Flights to which the customer may be shifted and so forth. The airline, an entity other than the airline and/or any combination thereof may receive and process data to determine from among all or substantially all possible combinations of customers, a set of customers which may be shifted. The airline, an entity other than the airline and/or any combination thereof may shift one or more set of customers that may be determined by processing the data. The airline may also shift one or more set of customers other than the combination of customers that may be determined by processing said data. Set of customers which may be shifted or the decision to initiate shifting may depend upon number of factors including, but not limited to, the need and urgency to shift the customers, factors of airline's choosing, creation of number of seat availability, optimizing revenues which may for at least one of the customer, airline and/or an entity other than said airline, cost savings and so forth.

The airline may, on detection of occurrence of one or more events, execute one or more event response algorithm which may determine one or more set of customers possessing options making them eligible to be shifted to one or more flights and may shift one or more of said set of customers to create seat availability. Said event may be an increase in the demand of one or more seats in said flight and/or other flights or increase in forecasted demand of one or more seats in said flight and/or other flights or any combination thereof or any other event. The shifting may be done at the instance of the airline, an entity other than said airline or any combination thereof. The set of customers, here, may include one or more customers. The shifting may involve shifting of one or more customers. The shifting of one or more customers, as explained below in Remove_Y, may involve one or more interactions between the airline, an entity other than the airline, the customers and/or any combination thereof. The shifting may involve shifting one or more first customers to one or more first flights after one or more second customers from one or more first flights are shifted to one or more second flights and so forth. Such a cascading process may continue until the last customer which may have to be shifted in the set is shifted and it may lead to shifting of more customers than the creation of number of seats availability. This process may involve two or more customers. This process has been explained in detail below in the Remove_Y process. The airline and/or an entity other than the airline may or may not notify the customer regarding said shifting within the specified Notification Deadline. The airline and/or an entity other than the airline may shift one or more customers to one or more flights belonging to said airline, to one or more flights belonging to an entity other than said airline and/or any combination thereof. Shifting may create a lot of value to the airline and may lead to enhanced revenues and/or cost savings. However, it may also be possible that shifting may sometimes be a cost to the airline and an airline may still apply shifting (Remove_Y) for fulfillment of other goals and/or objectives of the airline.

Buy_N Process

Figure 44:
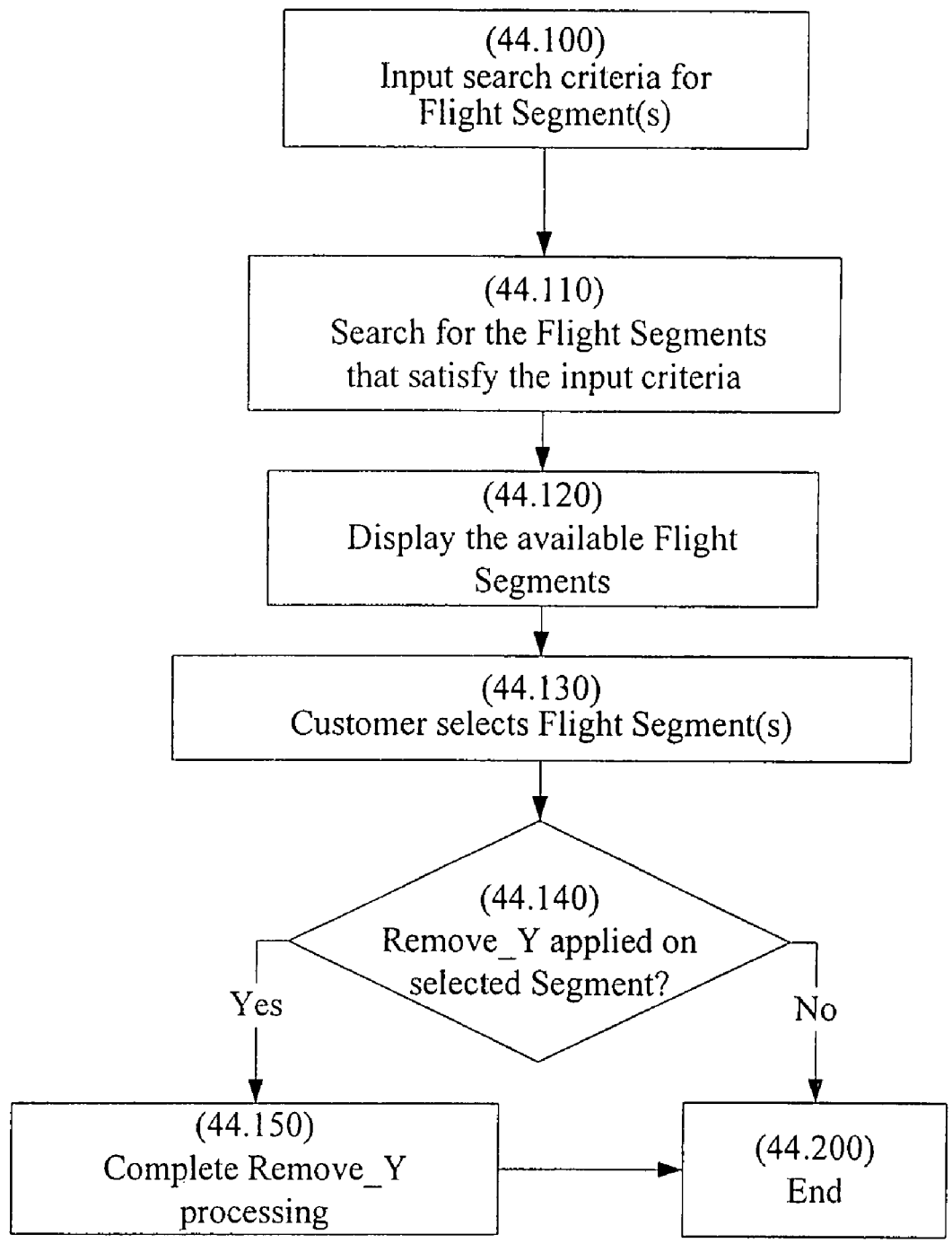
FIG. 44 is a flowchart illustrating the Buy_N process for a Flight Segment of an airline that has implemented the FRO VOF.

FIG. 44 displays a flow chart of an example of a Buy_N algorithm, which is executed during a dynamic interaction between the customer and the airline. As an example, an interaction may include a situation when a customer interacts with an airline to obtain (or purchase) tickets, or when an airline presents offerings to a customer (with or without a solicitation by the customer). It is assumed that a customer is interacting with an airline to purchase tickets, and that FRO VOF is implemented at the Segment level. In Act 44.100, the search criteria are input. Various search parameters for a desired Flight Segment (as desired by the customer) are taken as the input to the system.

Next, in Act 44.110, a search process is executed to search for all Flight Segments that satisfy inputs. The details of the search process are described later. Next, in Act 44.120, all the search results are displayed before the customer in an interface (such as in a web browser, a telephone operator stating the search results over the phone etc.). Control then goes to Act 44.130, where the customer selects a Segment (or Flight Segment). The selection of the Segment may be followed by a payment and/or purchase of the selected Segment.

In Act 44.140, a test is performed to determine whether Remove_Y process has been applied on the selected Segment. If so, control goes to Act 44.150, where the Remove_Y process is completed for the selected Segment, and control then goes to Box 44.200. If not, control goes to Box 44.200, where the algorithm exits. The completion of the Remove_Y process may include one or more Acts that may be executed to incorporate the fact that said Segment was selected by the customer. For example, one of such acts may be to record the selection of said Segment to a database and/or to change the Accounted Status for one or more FRO customers (who were affected in the Remove_Y process).

Figure 45:
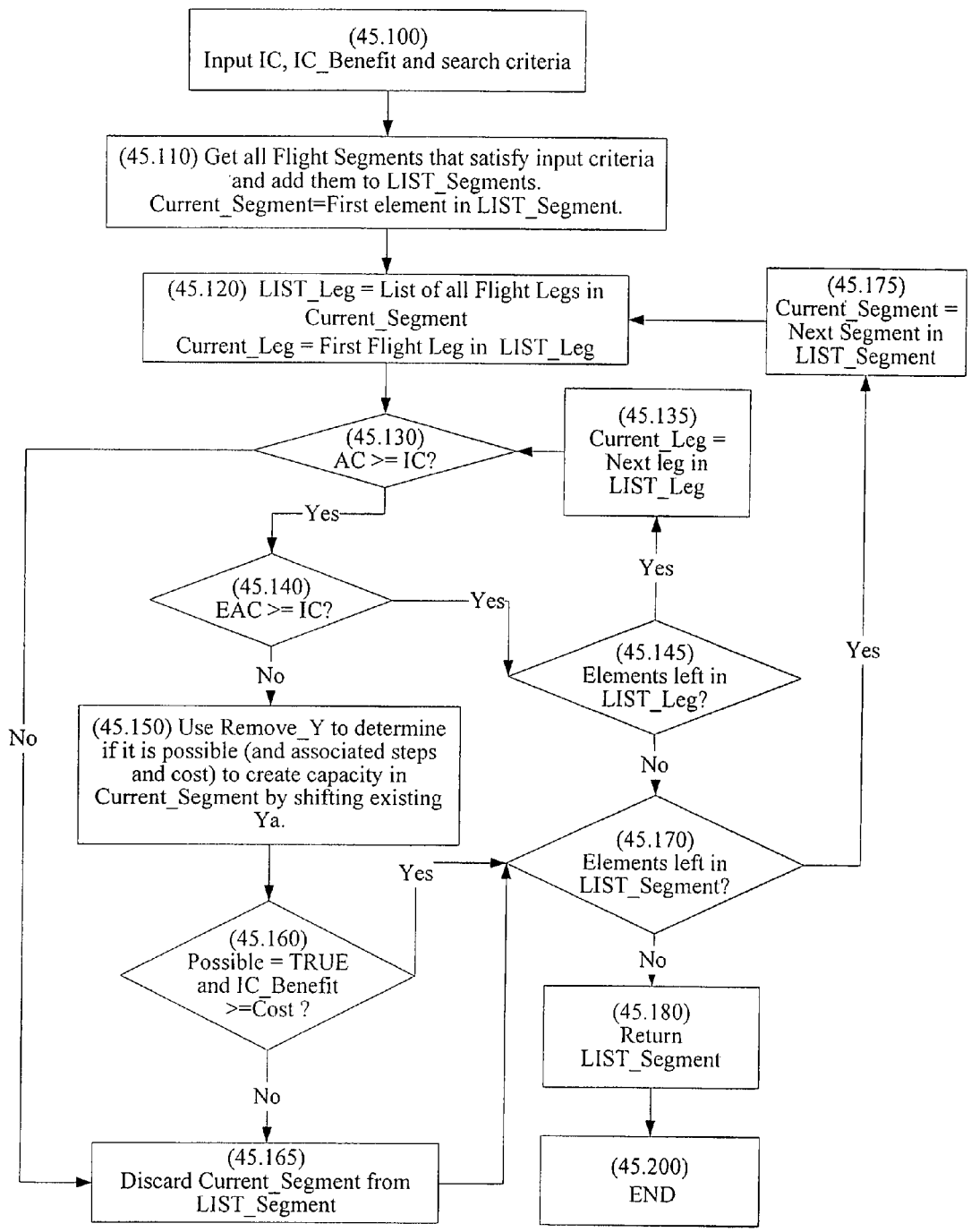
FIG. 45 is a flowchart that expands Act 110 of FIG. 44, illustrating an algorithm for the Buy_N search process.

FIG. 45 expands Act 110 of FIG. 44 and demonstrates an example of a search algorithm that may be used to determine Flight Segments that satisfy the inputs. In Act 45.100, IC (number of incoming customers), IC_Benefit (i.e., the benefit that an airline may receive if the incoming customers select and/or purchase one or more Segments) and the input search criteria are taken as the input parameters to the system. The term "Incoming Customers" refers to the customers who interact with the airline in the current transaction (Buy_N). It is assumed that each customer desires one unit of capacity (seat) and thus, total units of capacity (seats) desired is equal to the total number of incoming customers. In some situations, IC_Benefit and/or IC may not be available as an input, and may be calculated during the search process. Next, in Act 45.110, all the Segments that satisfy the 'search criteria' are searched from the airline database. The Segments, thus obtained, are added to a list termed LIST_Segment. The first element in the LIST_Segment list is designated as Current_Segment.

Next, in Act 45.120, all the Legs in the Current_Segment are added to a list termed LIST_Leg. The first element in the LIST_Leg list is designated as Current_Leg. Next, in Act 45.130, a test is performed to determine whether the Available Capacity (AC) of the Current_Leg is greater than or equal to IC. If so, control goes to Act 45.140. If not, control goes to Act 45.165.

In Act 45.140, another test is performed to determine whether EAC (Effective Available capacity) of the Current_Leg is greater than or equal to IC. If so, control goes to Act 45.145. If not, control goes to Act 45.150, where the Remove_Y algorithm is executed to determine the possibility (and associated process steps and costs) to create capacity in the Current_Segment.

Next, in Act 45.160, a test is performed to determine whether it is possible (by using Remove_Y) to create capacity in the Current_Segment and the IC_Benefit is greater than or equal to the cost to create that capacity as determined in the Act 45.150. If both conditions are true, control goes to Act 45.170. If either condition is false, control goes to Act 45.165.

In Act 45.165, the Current_Segment is discarded from the LIST_Segment list, and control then goes to Act 45.170.

In Act 45.145, a test is performed to determine whether more elements are left in the LIST_Leg list. If so, control goes to Act 45.135, where the next element in the LIST_Leg list is designated as the Current_Leg and control loops back to Act 45.130, to repeat the process for the new Current_Leg. If not, control goes to Act 45.170.

In Act 45.170, another test is performed to determine whether more elements are left in the LIST_Segment list. If so, control goes to Act 45.175, where the next element in the LIST_Segment list is designated as the Current_Segment and control loops back to Act 45.120, where the process for the new Current_Segment is performed. If not, control goes to Act 45.180, where the LIST_Segment list (the most recently updated version after discarding the invalid Segments, if any) is returned. Next, the algorithm ends at Box 45.200.

Figure 46:
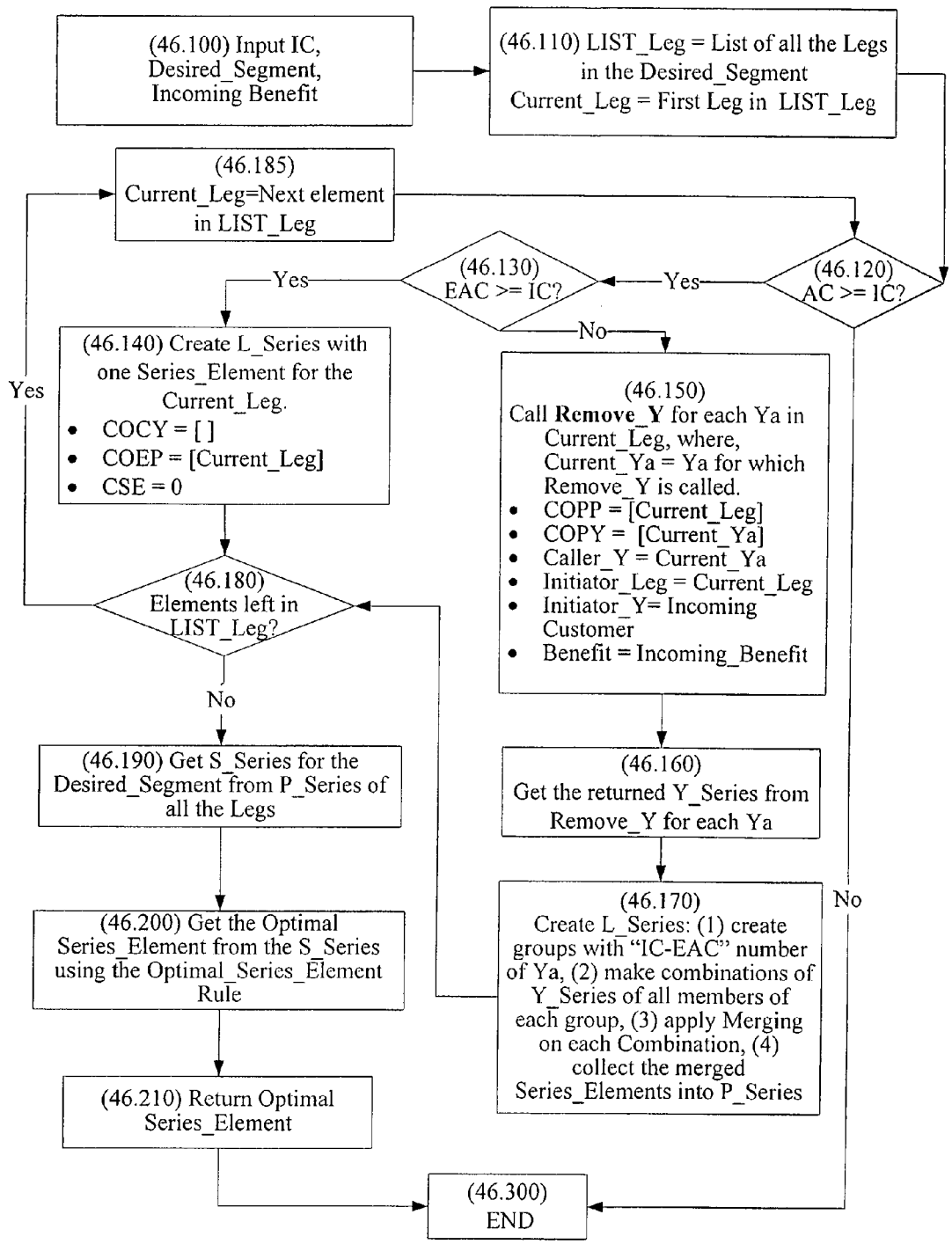
FIG. 46 is a flowchart that expands Act 150 of FIG. 45, illustrating an algorithm to create capacity using the Remove_Y algorithm.

FIG. 46 expands Act 150 of FIG. 45 and demonstrates an example of an algorithm to apply the Remove_Y algorithm to create one or more than one unit of capacity (Seat) in one or more Leg(s) within a Desired_Segment (the Segment in which capacity needs to be created). In Act 46.100, various input parameters are taken in the system. Input parameters include IC, Desired_Segment and Incoming_Benefit (i.e., benefit an airline may realize if capacity is created in the Desired_Segment)

Next, control goes to Act 46.110, in which all the Legs in the Desired_Segment are listed in the LIST_Leg list. The first Leg in the LIST_Leg list is designated as Current_Leg. Next, in Act 46.120, a test is performed to determine whether the Available Capacity (AC) of the Current_Leg is greater than or equal to IC. If so, control goes to Act 46.130. If not, control goes to Box 46.300, where the algorithm ends. In Act 46.130, another test is performed to determine whether EAC (Effective Available capacity) of the Current_Leg is greater than or equal to IC. If so, then control goes to Act 46.140. If not, control goes to Act 46.150.

In Act 46.140, a P_Series is created for the Current_Leg. Since the Current_Leg is an End_Leg, there will be only one Series_Element in the P_Series collection. The Series_Element will comprise COEP with the Current_Leg as the only element, COCY with no elements and CSE with zero value (since no Ya needs to be removed from Current_Leg, and hence, no cost to create capacity). Next, control goes to Act 46.180.

In Act 46.150, the Remove_Y algorithm is called for each Ya in the Current_Leg and the algorithm follows a recursive loop. Each of the Ya becomes Current_Ya for the corresponding Remove_Y call. The necessary input parameters for each of the Remove_Y includes the Current_Leg as 'COPP', Current_Ya as 'COPY', Current_Ya as 'Caller_Y', Current_Leg as 'Initiator_Leg', one of the incoming customers as 'Initiator_Y' and Incoming_Benefit as 'Benefit'. The Remove_Y call returns Y_Series collection for each Ya in the Current_Leg. The details of the Remove_Y algorithm are discussed in the next section.

Next, control goes to Act 46.160, where all the Y_Series collections are obtained as returned from the Act 46.150. Next, in Act 46.170, a P_Series collection for the Current_Leg is calculated through the following operations: (1) create groups of Ya from all Ya of the Current_Leg for which Remove_Y was called, where the number of Ya in each group is equal to "IC-EAC" (EAC of the Current_Leg), (2) make combinations of the Y_Series collection of all members of each group (combine each Series_Element of each Y_Series of each member with that of each of the rest of the members of that group), (3) merge all members within each combination to formulate a merged Series_Element, (4) collect all such merged Series_Elements, thus obtained, into P_Series collection of the Current_Leg. Details on making combinations and merging are provided later.

Next, in Act 46.180, a test is performed to determine whether more elements are left in the LIST_Leg list. If so, control goes to Act 46.185, where the next element in the LIST_Leg list is designated as the Current_Leg and control loops back to Act 46.120 to repeat the process for the new Current_Leg. If not, control goes to Act 46.190.

In Act 46.190, a S_Series collection for the Desired_Segment is calculated from the P_Series collections of all the Legs using the combination and merging process (details provided later). Next, in Act 46.200, an optimal Series_Element from the S_Series collection is determined using Optimal_Series_Element Rule (which is read from a database). Next, control goes to Act 46.210, where the optimal Series_Element is returned and the algorithm exits at Box 46.300.

'Remove_Y' Algorithm

Figure 47:
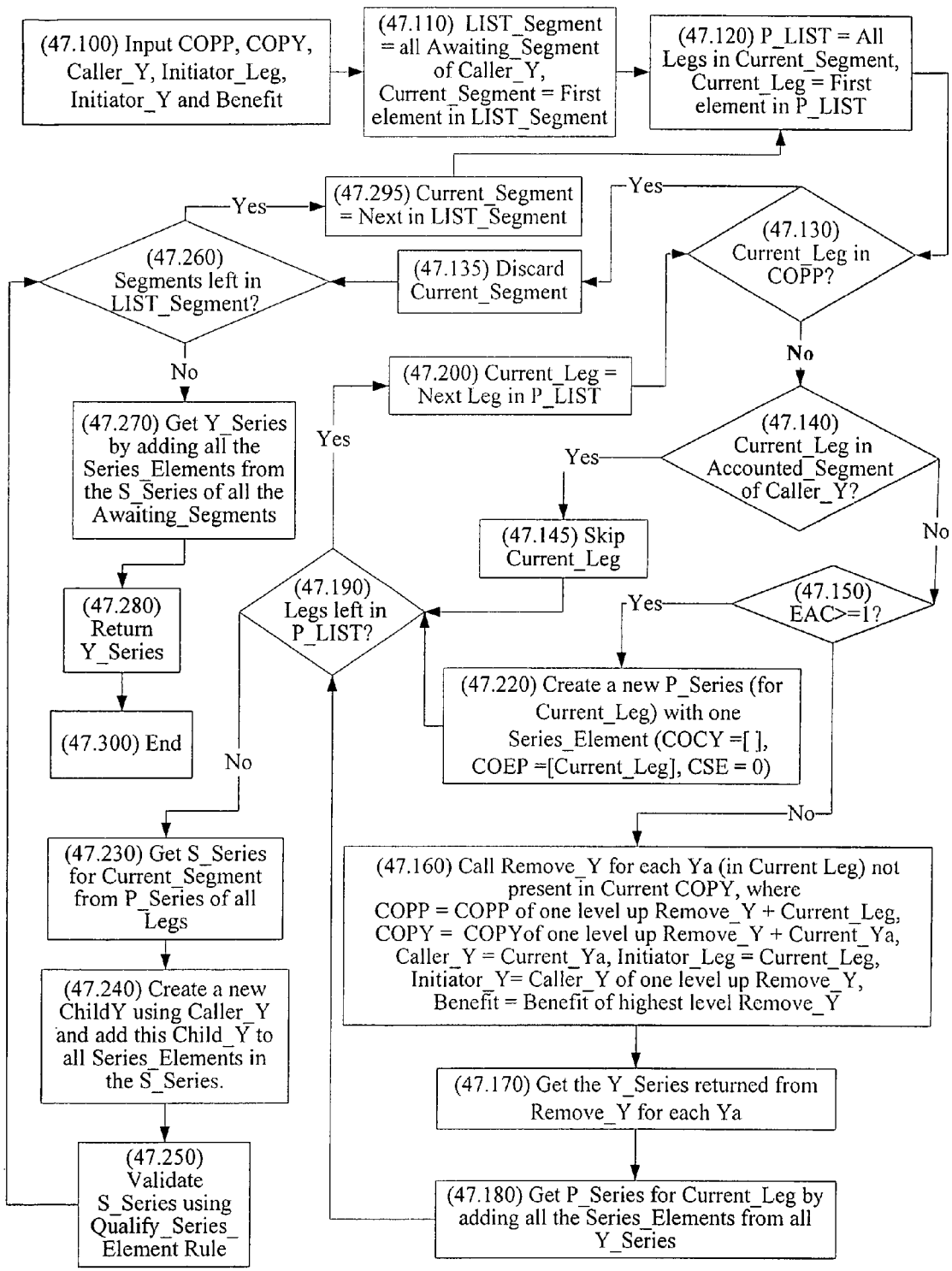
FIG. 47 is a flowchart that expands Act 150 of FIG. 46, provides an algorithmic illustration for the Remove_Y algorithm.

The following algorithm presents an example of an algorithm that may be used to create one unit of capacity (seat) of a Flight by shifting a Ya Accounted in a Flight to its Awaiting_Segment. FIG. 47 represents an algorithmic illustration for Remove_Y. The Remove_Y is a recursive algorithm, which returns a collection of Series_Element termed "Y_Series" collection for the Ya for which the algorithm has been called.

In Act 47.100, a set of parameters including COPY, COPP, Caller_Y, Initiator_Leg, Initiator_Y and Benefit are input to the system. Next, in Act 47.110, all the Awaiting_Segments of the Caller_Y are added to a list termed LIST_Segment. The first element in the LIST_Segment list is designated as Current_Segment. Next, in Act 47.120, all the Legs that belong to the Current_Segment are added to another list termed P_LIST. The first element in the P_LIST list is designated as Current_Leg.

Next, in Act 47.130, a test is performed to determine whether the Current_Leg is present in the COPP. If so, the Current_Segment is discarded in Act 47.135, and control goes to Act 47.260. If not, control goes to Act 47.140.

In Act 47.140, another test is performed to determine whether the Current_Leg is present in the Accounted_Segment of the Caller_Y. If so, the Current_Leg is skipped in Act 47.145, and control then goes to Act 47.190. If not, control goes to Act 47.150, where another test is performed to determine if the EAC of the Current_Leg is greater than or equal to 1. If so, control goes to Act 47.220. If not, control goes to Act 47.160.

In Act 47.220, a new P_Series collection is created with only one Series_Element, since the Current_Leg is an End_Leg. The Series_Element will comprise COEP with the Current_Leg as the only element, COCY with no elements and CSE with zero value. Next, control goes to Act 47.190.

In Act 47.160, the algorithm enters into a recursive loop where the Remove_Y algorithm is called for each of the Ya in the Current_Leg that is not present in the COPY. Each of the Ya becomes Current_Ya for the corresponding Remove_Y call. The necessary input parameters for each of the Remove_Y includes 'COPP' (includes the COPP of one level up Remove_Y and the Current_Leg), 'COPY' (includes the COPY of one level up Remove_Y and the Current_Ya), the Current_Ya as 'Caller_Y', the Current_Leg as 'Initiator_Leg', Caller_Y of one level up Remove_Y as 'Initiator_Y' and benefit of the highest level Remove_Y as 'Benefit'. Each of the Remove_Y call returns a Y_Series collection for every Ya for which Remove_Y was called.

Next, in Act 47.170, the algorithm receives the returned Y_Series collection from all the Remove_Y algorithm calls in Act 47.160. Control then goes to Act 47.180, where a P_Series collection for the Current_Leg is calculated by adding all the Series_Elements from all the returned Y_Series collection obtained in Act 47.170. Control then goes to Act 47.190.

In Act 47.190, a test is performed to determine whether more Legs are left in the P_LIST list. If so, control branches out to Act 47.200, where the next Leg in the P_LIST list is designated as the Current_Leg, and control then goes to Act 47.130 where the process is repeated for the new Current_Leg. If not, control goes to Act 47.230.

In Act 47.230, the S_Series collection is calculated for the Current_Segment by combining and merging all the P_Series collection of all the Legs (not taking the skipped Leg(s) into consideration, if any). Next, in Act 47.240, a new ChildY is created using the Caller_Y. The ChildY comprises COI (where the current Initiator_Leg is designated as Initiator_Leg and the current Initiator_Y is designated as Initiator_Y), Accounted_Segment of the Caller_Y designated as the Initial_Accounted_Segment, current Awaiting_Segment designated as the Final_Accounted_Segment, and the cost to shift current Caller_Y from the Initial_Accounted_Segment to the Final_Accounted_Segment designated as the CCY. The ChildY, thus created, is added to every Series_Element in the S_Series collection and the CCY of the same ChildY is added to the CSE (Cost of Series_Element) of every Series_Element. Control then goes to Act 47.250.

In Act 47.250, a Qualify_Series_Element rule is read from the airline's database and is applied to validate all the Series_Elements in the S_Series collection. The invalid Series_Elements are discarded from the S_Series collection. An airline may select any rule of its choosing. For example, a Qualify_Series_Element rule may only qualify those Series_Elements for which the CSE is less than or equal to the 'Benefit'. Next, control goes to Act 47.260.

In Act 47.260, a test is performed to determine whether more Segments are left in the LIST_Segment list. If so, control branches out to Act 47.295, where the next element in the LIST_Segment list is designated as the Current_Segment, and then control loops back to Act 47.120, where the process is repeated for the new Current_Segment. If not, control goes to Act 47.270, where the Y_Series collection is obtained by adding all the Series_Elements of all the S_Series collections for all the Awaiting_Segments of the Caller_Y. Next, the Y_Series collection is returned in Act 47.280, and the algorithm ends in Box 47.300.

Combinations of P_Series in order to formulate S_Series are calculated by cross multiplication of Series_Elements (of each P_Series). An airline may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, C1={$S_1[1], S_2[1], S_3[1], \ldots S_n[1]$}, where, $S_p[1]$ denotes the first Series_Element of $p^{th}$ Series; C2={$S_1[2], S_2[1], S_3[1], \ldots S_n[1]$}, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of Y_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various legs involved. A given unit of flight capacity (seat) at any given point must only be accounted for one customer, otherwise, it may lead to a shortage situation, where one seat is allocated to more than one customer leading to dissatisfaction for customers. An airline may choose any method of its choosing to perform merging of Series_Elements, and specifically to perform merging of two Series_Elements. The method of merging chosen may affect the total value realized. One example of such a method is given. In one approach, an airline may choose to discard all merged Series_Elements that have either one or more common ChildY or common End_Leg. A common ChildY in two Series_Elements suggest that in both Series_Elements shifting of one specific Ya is needed. If each Series_Element requires shifting of Ya to two different Segments, it may present a contradictory situation. Similarly, a common End_Leg in two or more Series_Elements (that are to be merged together) may require to shift more than one Ya customer to a specific flight, which may or may not be feasible depending on the AC (and EAC) of that flight. Thus, a common End_Leg may also represent one or more contradictory or invalid situations.

An airline may use any set of rules to validate or invalidate one or more constituents of any of the merged components. For example, a merged Series_Element, M, obtained from merging of two Series_Elements S1 and S2, may comprise the COEP (addition of COEP of S1 and S2), COCY (addition of COCY of S1 and S2) and CSE (addition of CSE of S1 and S2).

Remove_Y and Buy_N processes may generate value for the airline, an entity other than the airline, customers and/or any combination thereof. The value may include, but is not limited to cost savings for the airline, an entity other than said airline, any combination thereof. The value generated may also include, but is not limited to, soft value, value attributable to customer goodwill, satisfaction and loyalty. The value so generated may optimize revenue of at least one entity other than said airline.

Customer Notification Process

In the Customer Notification (CN) process, a decision for the Chosen Leg is notified to the customer. As mentioned earlier, the Chosen Flight may be defined by the airline, the customer, another entity or any combination thereof. However, the airline may want to keep the right to select (or define) the Chosen Flight in the FRO VOF. An airline may use any method of its choosing to define the Chosen Flight. An airline may use a software application built on the method defined above to optimally define the Chosen Flight to FRO customer.

Figure 48:
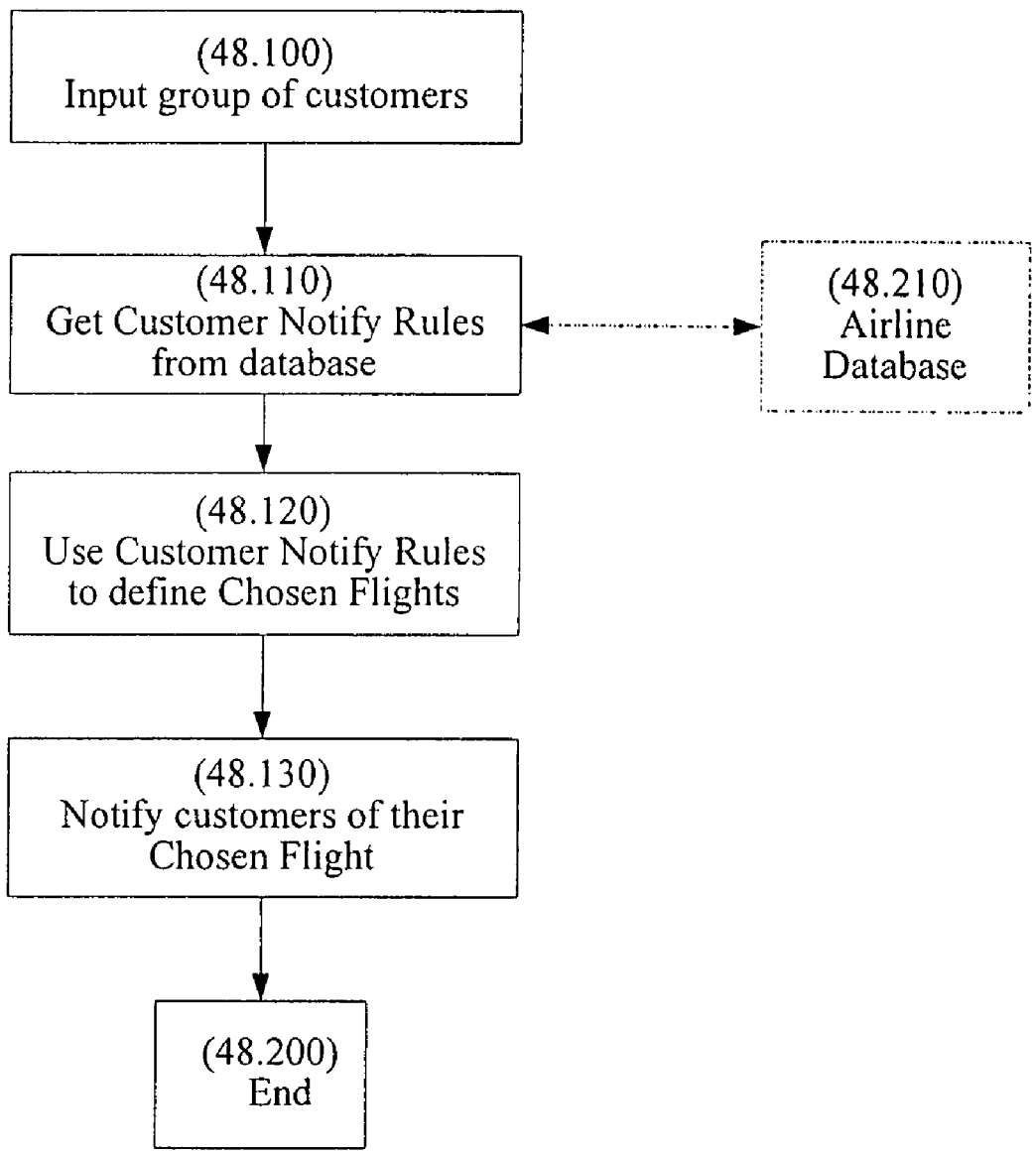
FIG. 48 is a flow chart illustrating an example of an algorithm of Customer Notification process in an airline industry.

FIG. 48 displays an example of an algorithm that may be used to execute the Customer Notification process. In Act 48.100, a group of (one or more) customers is taken as input. Next, in Act 48.110, a set of one or more Customer Notify Rules may be used to define the Chosen Flight. An airline may choose any Customer Notify Rule of its choosing. The Customer Notify Rules may depend upon expected value of the Flight, expected sales volume and so forth. For example, an airline may choose a Customer Notify Rule, which selects the Flight with the higher value as the Chosen Product. Alternatively, a rule may be chosen, which selects the Flight with the lower value as the Chosen Flight. While defining the Chosen Flight, an airline may also want to use the Remove_Y algorithm (as used in the Buy_N process given above) to determine the optimal Chosen Flight that satisfies a pre-determined goal. Thus, during the CN process, one or more Ya may be shifted in the process of selecting the optimal Chosen Flight. A Customer Notify Rule may also select the Flight with the higher sales volume as the Chosen Flight. A Customer Notify Rule may specify that if FRO VOF is used in conjunction with any other VOF (such as APO VOF and so on), then the Grouping Rules (defined later) may govern the selection of the Chosen Flight.

Next, in Act 48.120, the Customer Notify Rules, thus obtained from the airline's database, are used to define Chosen Flight(s). Next, in Act 48.130, the customers are notified about their Chosen Flight(s), and the algorithm then ends in Box 48.200.

Implementation of FRO VOF in Conjunction with Other VOFs

FRO VOF may be used in conjunction with one or more other VOFs, for example, the AFO (the Alternate Flight Option) VOF. A customer who receives an AFO is termed "A" type of customer. An airline may form a group of one or more AFO customers and one or more FRO customers, where the options (AFO and FRO) obtained by the group members are complimentary in nature. As an example, consider an A customer who bought an AFO to choose either of F1 and F2 as the Chosen Flight, and consider a Y customer who received a FRO and is flexible to take any of F1 and F2 as the Chosen Flight. Thus, if A decides to choose F1 as the Chosen Flight, the airline may assign F2 as the Chosen Flight for Y, and vice versa. The customers A and Y have taken complimentary options and may form a group. The airline may need to hold only one unit of inventory in F1 and F2 to satisfy the needs of both A and Y (assuming each A and Y only need one unit of seat). Such a combination of complimentary options or VOFs may improve efficiency and concurrently enhance value for all the parties involved (in the context of the current example, enhance value for A, Y and the airline).

The implementation of the grouping of A type and Y type of customers may be done in one or more ways. One way to implement such grouping is to first have one or more Y type of customers and based on such customer(s), the airline may offer complimentary AFOs to customers to make groups. In another implementation, the airline may first offer AFO and based on such AFO customer(s), airline offers complimentary FRO to the customers to make groups. In yet another implementation, the airline may offer AFO and FRO separately and then define a process to make complimentary groups of A and Y customers (such groups termed "AY_Groups").

An airline may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an APO to choose either of F1 and F3 as the Chosen Flight, a Y1 customer who received a FRO and is flexible to take any of F1 and F2 as the Chosen Flight and a Y2 customer who has also received a FRO and is flexible to take any of F2 and F3 as the Chosen Flight. A notation A-Y1-Y2 represents this example. Thus, if A decides to choose F1 as the Chosen Flight, the airline may assign F2 as the Chosen Flight for Y1 and F3 as the Chosen Flight for Y2. Alternatively, if A decides to choose F3 as the Chosen Flight, the airline may assign F1 and F2 as the Chosen Flights for Y1 and Y2, respectively.

It is assumed that a "unit" represents one unit of seat (or flight capacity) and each customer needs only one unit of a seat. Continuing with the above example, if the airline were to not consider the complimentary nature of options obtained by A, Y1 and Y2 customers, the airline may need to hold (or block) a total of 4 units of capacity (seats) to ensure complete satisfaction of needs of A, Y1 and Y2, i.e., 2 units for A (1 unit each of F1 and F3 as A could choose any flight), 1 unit (seat) for Y1 (of either F1 or F2) and 1 unit for Y2 (of either F2 or F3). This implies, to satisfy a total need of 3 units of flights, the airline may need to hold (or block) 4 units (seats) of flight capacity, creating a redundant capacity of 1 unit (seat) that the airline may not be able to use otherwise. By creating a complimentary group of A-Y1-Y2, the airline needs to only hold (or block) 3 units of capacity (1 unit each in F1, F2 and F3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

An airline may choose to implement grouping at various product levels such as Leg, Segment and Itinerary. An airline may also change terms and conditions of one or more option contracts of one or more FRO and/or AFO customers (for e.g., price, notify deadline and so on) to solicit customer participation in FRO/AFO to create more AY_Groups. The airline may also offer incentives to customers to choose complimentary FRO/AFO offerings to enable the airline to create more AY_Groups. The implementation methods mentioned above for grouping are for illustration purposes only and an airline may choose to implement grouping in one or more other ways or by combining above said methods or by combining one or more other ways along with one or more above said methods.

Figure 49:
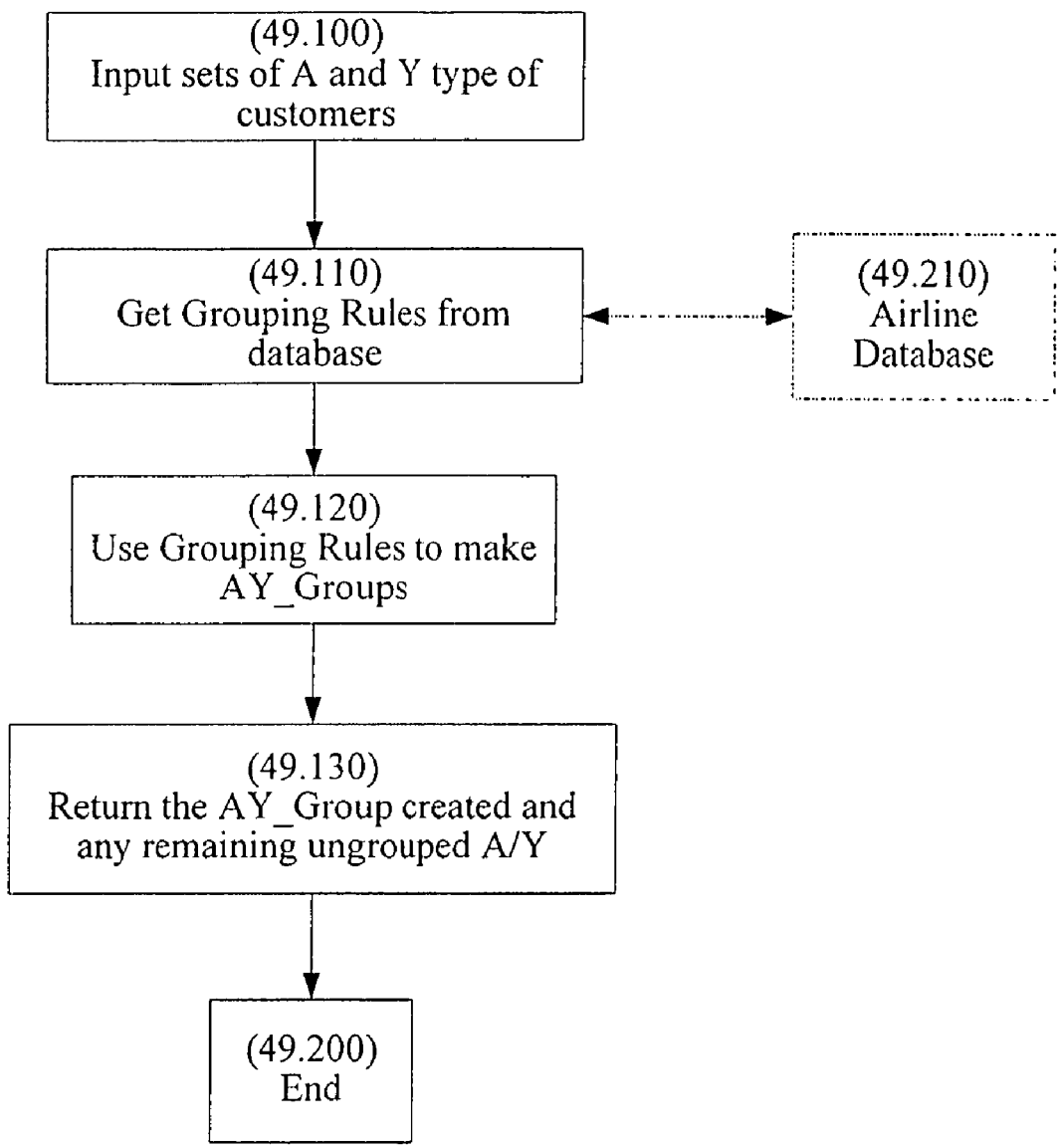
FIG. 49 is a flowchart illustrating an example of an algorithm to implement grouping of A and Y type of customers in an airline industry.

FIG. 49 displays a flow chart that illustrates one way of implementing grouping of A and Y type of customers. In Act 49.100, sets of A and Y customers are taken as input. Next, in Act 49.110, a set of one or more Grouping Rules is read from the airline's database (49.210). A grouping rule may depend upon the number of A and/or Y type of customers, desired capacity redundancy in the system, the permissible time factor to create AY_Groups, any other rule of airline's choosing, any combination thereof and so on. For example, an airline may choose a Grouping Rule whereby new groups are created by first ungrouping one or more of the AY_Groups (created earlier but unexercised, for example, groups for which the customer has not been notified, or if notified, the customer has not flown on the Flight and the terms of option contract allows for change in the Chosen Flight). A Grouping Rule may create groups of only those A and Y type of customers who have yet to be grouped and discarding all A/Y customers, which have already been grouped. An airline may implement any Grouping Rule to formulate AY_Groups. The choice to Grouping rules may enhance the overall value for the airline (for example, reduce the total capacity required to satisfy flight needs for all A and Y customers). Theoretically, the number of units of the seats required (or blocked) should be equal to the number of customers buying the seat (assuming each customer wants one unit of seat). Thus, by implementing the grouping and with the help of appropriate Grouping Rules, the airline may attempt to achieve such theoretical minima.

Next, in Act 49.120, the Grouping Rules, so obtained from the airline's database, are used to make AY_Groups. Next, in Act 49.130, the AY_Groups so created are returned along with ungrouped A/Y, if any, and the process then ends in Box 49.200.

The grouping may enhance customers' experience, and may comprise operating a system that delivers a FRO to at least a "first customer" to utilize up to n of m selected flights for said first customer, where n is less than or equal to m; operating a system that delivers an APO to at least a "second customer" to utilize up to k of p selected flights, where k is less than or equal to p; operating a system to define each of the k chosen flights, whereby after each of the k chosen flights is defined, said second customer can utilize said chosen flight; operating a system wherein an airline defines t chosen flight(s) for said first customer after each of said k chosen flights is defined, wherein after each of said t flights is defined, said first customer can utilize said defined flight, where t is less than or equal to n. Said t flights may be a subset of n flights, m flights or both. Said t flights or n flights or both may also include one or more flights not included in said m selected flights. Similarly, k flights may be a subset of p flights, or may include one or more flights other than said p products. The grouping may be performed for a multiplicity of at least one of said first or second customers and may combine together at least one of each of said first and second customers to formulate at least one group with at least one complementary set of options. The grouping may enable an airline, an entity other than the airline and/or any combination thereof to utilize at least one of said m or p flights at least after delivery of any of said first or second options. The airline and/or an entity other than the airline may implement FRO VOF where in the first and/or second customer in said grouping may be same. The notification conditions may be different, same or any combination thereof for the first and second option.

Said first and/or second option may or may not include any notification deadline condition. The airline, the second customer, an entity other than said airline and/or any combination thereof may define, at one or more times, at least one of said k Chosen Flights. The airline, the first customer, an entity other than said airline and/or any combination thereof may define, at one or more times, at least one of said p Chosen Flights. The first customer may select, at one or more times, at least one of said m Flights. The second customer may select, at one or more times, at least one of said p Flights. The airline and/or an entity other than the airline may receive from at least one of said first or second customer, at one or more times, an indication of one or more terms and conditions associated with said first or second options, respectively. Similarly, at least one of said airline and/or an entity other than said airline may deliver to at least one of said first or second customers, at one or more times, one or more terms and conditions associated with said first or second option, respectively. There may or may not be any payment transaction between the airline, an entity other than the airline, and at least one of said first and/or second customer.

The FRO VOF may be used in conjunction with one or more other VOFs, for example, the UFO (and/or UTO) VOF. A customer who received a UFO (and/or UTO) is termed "U" type of customer. An airline may form a group of one or more UFO (and/or UTO) customers and one or more FRO customers, where the options (UFO and/or UTO and FRO) obtained by the group members are complimentary in nature.

The implementation of the grouping of Y type and U type of customers may be done in one or more ways. One way to implement such grouping is to first offer and secure one or more Y type of customers and based on such customer(s), the airline may offer complimentary UFOs (and/or UTOs) to other customers to make groups. In another implementation, the airline may first offer and secure UFO (and/or UTO) and based on such FRO customer(s), airline offers complimentary FRO to other customers to make groups. In yet another implementation, the airline may offer UFO (and/or UTO) and FRO separately and then define a process to make complimentary groups of U and Y customers (such groups termed "UY_Groups").

An airline may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(F1, F3), U1[up(F2), base(F3)] and U2[up(F1), base(F2)]. The notation Y(F1, F3) implies a customer Y who has received a FRO and is flexible to have either F1 or F2 as the Chosen Flight. The notation U1[up(F2), base(F3)] implies a customer U1 who received a UFO and wishes to get an upgrade from F3 (i.e., the base flight) to F2 (i.e., the up flight), and U2[up(F1), base(F2)] implies a customer U2 who received a UFO and wishes to get an upgrade from F2 (i.e., the base flight) to F1 (i.e., the up flight). A notation Y-U1-U2 represents this example. Thus, there are three flights F1, F2, and F3 and they are occupied by Y, U2, and U1 respectively. The three customers have different value needs. The customer Y is flexible on either F1 or F3 if he/she receives a desired reward for trading-in his/her flexibility. The customer U1 has a base flight F3 and wishes to get F2 as the Up Flight. If an airline is able to upgrade U1 to F2 from F3, it may generate incremental value for both the customer and the airline. But in the existing framework (i.e., without using conjunction of more than one VOFs), the airline may not be able to achieve this without an available capacity on flight F2. Similarly, U2 has a base flight F2 and wishes to get F1 as the Up Flight. An airline may customize the desired values for the three customers by leveraging on Y's flexibility and upgrading U1 and U2. The airline may assign F3 as Chosen Flight to Y, upgrade U2 from F2 to F1, and upgrade U1 from F3 to F2. The airline may be able to generate customer surpluses in the process of U1 and U2 upgrades, which would not have been possible normally. Thus, an airline may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the airline).

It is assumed that a "unit" represents one flight (or flight capacity) and each customer needs only one flight. Continuing with the above example, if the airline were to not consider the complimentary nature of options obtained by Y, U1 and U2 customers, the airline may need to hold (or block) more than 3 units of capacity to ensure complete satisfaction of needs of Y, U1 and U2. This implies, to satisfy a total need of 3 flights, the airline may need to hold (or block) more than 3 flights, creating a redundant capacity of at least one flight that the airline may not be able to use otherwise. By creating a complimentary group of Y-U1-U2, the airline does not need to hold any capacity, thus freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

An airline may choose to implement grouping at various levels such as Leg, Segment and Itinerary. An airline may also change terms and conditions of one or more option contracts of one or more UFO (and/or UTO) and/or FRO customers (for e.g., price, notify deadline and so on) to solicit customer participation in UFO/FRO to create more UY_Groups. The airline may also offer incentives to customers to choose complimentary UFO/FRO offerings to enable the airline to create more UY_Groups. The implementation methods mentioned above for grouping are for illustration purposes only and an airline may choose to implement grouping in one or more other ways or by combining above said methods or by combining one or more other ways along with one or more above said methods.

Figure 50:
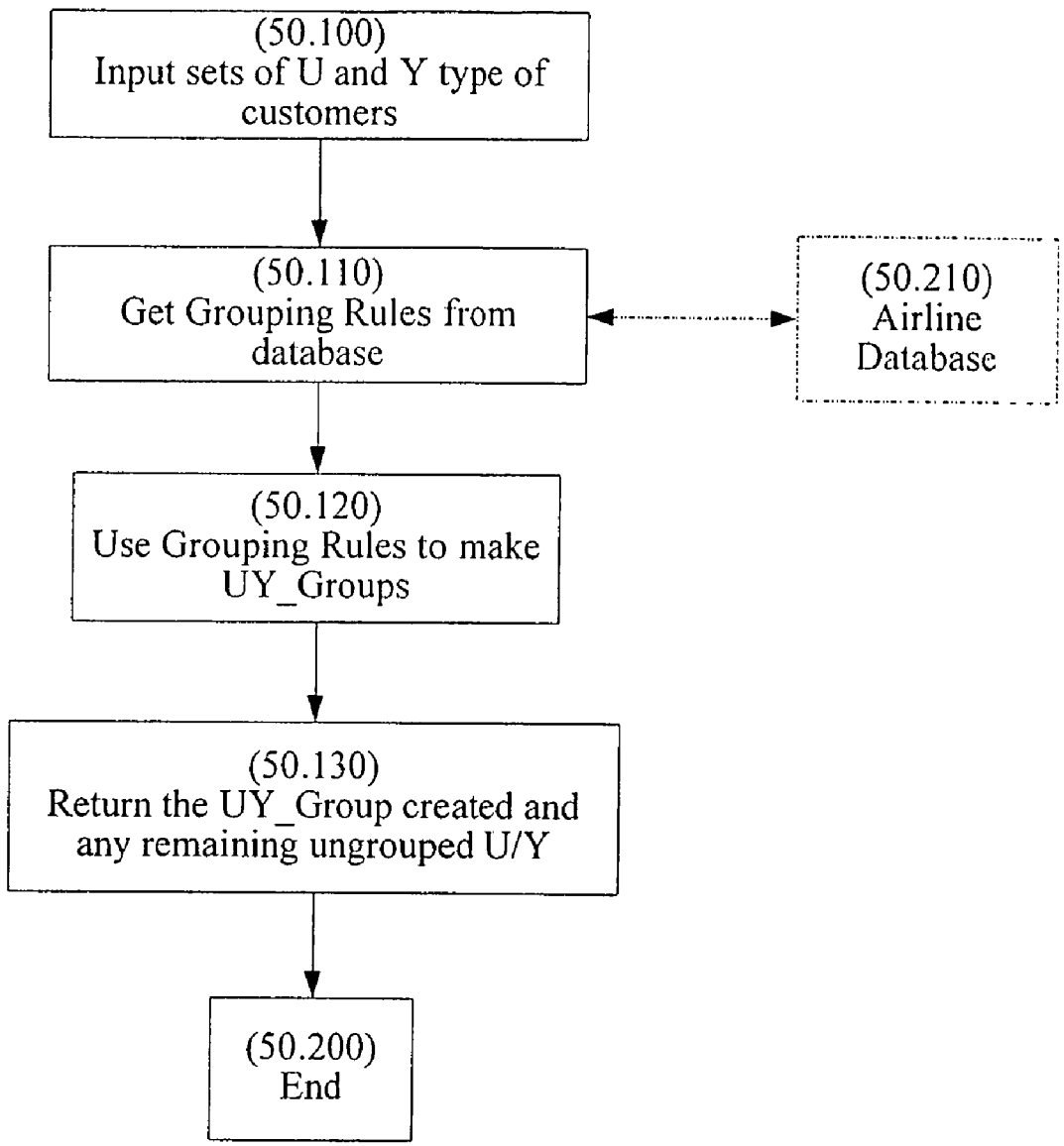
FIG. 50 is a flowchart illustrating an example of an algorithm to implement grouping of U and Y type of customers in an airline industry.

FIG. 50 displays a flow chart that illustrates one way of implementing grouping of U and Y type of customers. In Act 50.100, sets of U and Y customers are taken as input. Next, in Act 50.110, a set of one or more Grouping Rules is read from the airline's database (50.210). A grouping rule may depend upon the number of U and/or Y type of customers, desired capacity redundancy in the system, the permissible time factor to create UY_Groups, any other rule of airline choosing, any combination thereof and so on. For example, an airline may choose a Grouping Rule whereby new groups are created by first ungrouping one or more of the UY_Groups (created earlier but unexercised, for example, groups for which the customer has not been notified, or if notified, the customer has not utilized the flight and the terms of option contract allows a change in the Chosen Flight). In another example, a Grouping Rule may create groups of only those U and Y type of customers who are yet to be grouped and discarding all U/Y customers, which have already been grouped. An airline may implement any Grouping Rule to formulate UY_Groups. The choice to Grouping rules may enhance the overall value for the airline (for example, reduce the total capacity required to satisfy flight needs for all U and Y customers). Theoretically, the number of units of the flight required (or blocked) should be equal to the number of units the customers shall be eventually utilizing. Thus, by implementing the grouping and with the help of appropriate Grouping Rules, the airline may attempt to achieve such theoretical minima.

Next, in Act 50.120, the Grouping Rules, so obtained from the airline's database, are used to make UY_Groups. Next, in Act 50.130, the UY_Groups so created are returned along with ungrouped U/Y, if any, and the process then ends in Box 50.200.

The grouping may enhance customers' experience, and may comprise operating a system that delivers a UFO (and/or UTO) to at least a "first customer" to utilize up to n of m selected flights for said first customer, and n is less than or equal to m; operating a system that delivers a FRO to at least a "second customer" to utilize up to k of p selected flights, and k is less than or equal to p; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can utilize said defined flight, where t is less than or equal to n. Said t flights may be a subset of n flights, m flights or both. Said t flights or n flights or both may also include one or more flights not included in said m selected flights. Similarly, k flights may be a subset of p flights, or may include one or more flights other than said p flights. The grouping may be performed for a multiplicity of at least one of said first or second customers and may combine together at least one of each of said first and second customers to formulate at least one group with at least one complementary set of options. The grouping may enable an airline, an entity other than the airline and/or any combination thereof to utilize at least one of said m or p flights at least after delivery of any of said first or second options. The airline and/or an entity other than the airline may implement FRO VOF where in the first and/or second customer in said grouping may be same. The notification conditions may be different, same or any combination thereof for the first and second option.

Said first and/or second option may or may not include any notification deadline condition. The airline, the second customer, an entity other than said airline and/or any combination thereof may define, at one or more times, at least one of said k Chosen Flights. The airline, the first customer, an entity other than said airline and/or any combination thereof may define, at one or more times, at least one of said p Chosen Flights. The first customer may select, at one or more times, at least one of said m Flights. The second customer may select, at one or more times, at least one of said p Flights. The airline and/or an entity other than the airline may receive from at least one of said first or second customer, at one or more times, an indication of one or more terms and conditions associated with said first or second options, respectively. Similarly, at least one of said airline and/or an entity other than said airline may deliver to at least one of said first or second customers, at one or more times, one or more terms and conditions associated with said first or second option, respectively. There may or may not be any payment transaction between the airline, an entity other than the airline, and at least one of said first and/or second customer.

Business Model to Implement FRO

As discussed above, different business models may be used to implement a FRO VOF. The business models mentioned below may be used to implement FRO VOF in the airline industry. An airline may choose to implement a FRO VOF individually or in conjunction with one or more partners and/or other companies.

An airline may allocate some seat inventory to another entity. The term "allocation of seat(s)" or "allocation of seat inventory" "allocation of flight(s)" implies, without limitation, assigning one or more seats of one or more flights to an entity for any purpose or use by the entity either exclusively or non-exclusively. As explained in the sections above, for example, an entity may use the allocated seats to offer FRO to customers and/or to sell the seats as regular seats. The allocation of seat may be conditional. For example, one of the conditions may require a return of at least one allocated seat within a specified time period and/or other consideration(s).

The customer may select or purchase one or more flights from the airline and/or said entity and then interact with said entity to receive one or more FRO Flights in relation to said (already purchased) flights. Said entity may also receive seat allocation from more than one airline, and thus, offer flights from multiple airlines to a single customer during the Initial Transaction for FRO.

The OA may use those seats and operate a service to offer FRO to the customers. As explained above in FIG. 13A, a customer may select one or more flights from the OA, and then receive FRO on those selected flights from the OA. Another approach would be for a customer to select one or more flights from the airline and then receive FRO on those selected flights from the OA. In another example, a customer may select one or more flights from both the airline and the OA, and then receive the FRO option on those selected flights from the OA. It is also possible that the customer receives FRO from the airline or both from the airline and the OA on a given set of selected flights.

The OA and the airline may simultaneously offer FRO to the customers, i.e., a customer may either approach the airline or the OA to receive FRO on desired flights. In another model, the OA may operate as the sole provider of FRO to all the customers of an airline. In yet another model, the OA and the airline may choose to work together and jointly offer FRO to the customers. The OA or the airline may offer FRO to customers using either or both of the Sequential or the Concurrent Get FRO processes.

As explained in FIG. 13A above, an OA may be able to offer FRO on flights from one or multiple airlines. An OA may receive allocation of flight seats from two or more airlines. A customer may purchase one or more flights from one or more airlines and/or from the OA, and then receive FRO on those selected flights from the OA. Even if the OA may not be entitled to or does not receive seat allocation from an airline, it may still be able to formulate an agreement with one or more airlines to offer FRO on the flights of said airlines. Thus, a customer may be able to receive FRO on flights from multiple airlines, giving the customer more value to trade-in their flexibility and variety to choose from. For example, a customer may receive FRO on two flights from two different airlines, and the OA and/or any one or all of the airlines will then notify the customer about the Chosen Flight within the terms and conditions of the option contract. This may provide a lot of value to the customers for trading their travel flexibility, especially when the customer itineraries include destinations only served by a few airlines. An OA may be able to thus create a multi-airline FRO VOF Framework, which may tremendously enhance the value to the customers. All the participating airlines that allocate seats to and/or partner with the OA to offer FRO may also gain from the FRO network (benefits include reduced revenue spill, higher revenues from selling the FRO Flights at higher prices, and/or to sell FRO on those flights, enhanced overall customer satisfaction and/or other operational benefits). Either or both of the OA and the airline may process the tickets for the Chosen Flights associated with FRO received by the customer. A customer may receive tickets from the OA or the airline for the flights related to the FRO grant. Any entity (the OA and the airline) may process tickets for the flights offered only by that entity or by either of the two entities.

The OA and the airline may engage in a business agreement to implement the FRO program. The business agreement may divide the total benefit generated by the FRO program between the two parties using any mechanism or criteria as desired. The total FRO Revenue Benefit may be shared between the two parties. The airline may allocate seats to the OA. One or more airlines may allocate only part of or their entire seat inventory to the OA to offer those seats to the customers by way of regular and/or FRO seats. In return, the OA may offer some revenue or fee to the airline for all or a portion of the seats allocated. This fee may be given only for the seats that the OA is able to utilize or for all the allocated seats. The lending fee may be a lump sum amount, may depend upon the number of seats allocated or may depend on one or more factors as desired. The agreement may include a provision where the OA may return the allocated seats back to the airline at a certain time and date. There may be one or more conditions associated with the return of unused FRO seats and/or seats from the Released Flights, including, but not limited to, returning the same seat, returning a higher value seat and so on. The airline may allot OA at least one flight and said OA may deliver FRO on at least one of said allocated flights. The OA may or may not enter into an agreement with the airline to provide such option on its flights. The OA may sell back at least one allocated flight to said airline or to at least one entity other than the airline or both.

An OA may offer an airline flexible customer inventory (generated from FRO) at one or more terms and conditions. The airline may be able to use this flexibility to generate benefit from one or more ways, such as the Buy_N process, reducing operational costs and so forth. Some of these examples have been explained earlier.

An OA may formulate an agreement with one or more airlines on one or more VOFs, such as on both APO and FRO VOFs, to offer a combination of VOFs to customers.

The FRO VOF may include different conditions regarding the payment of prices related to the FRO. For example, a customer may receive FRO Price only from the airline even if he/she is receiving flights and/or options from the OA. Similarly, the customer may receive FRO Price only from the OA even if he or she selected the flights and/or received the options from the airlines. The condition may also be set for a customer to make one or more payments to the airline for the flights and receive one or more payments from the airline for the options received from that airline, and to make one or more payments to the OA for the flights and receive one or more payments from the OA for the options received from that OA. The condition may allow the customer to receive partial payments from the airline and the rest from the OA or vice versa, the basis of which distribution may depend upon various factors, including, but are not limited to, the factors of airline's choosing, the arrangement between the OA and the airline and so on. In another example, the customer may receive the FRO Price from the third party or may receive FRO Price from any of the combination of the entities mentioned above.

Information Technology System for FRO

A client-server architecture may be used to implement the FRO VOF. However, an airline may use a computer hardware and software infrastructure of its choosing to implement a FRO VOF.

The FRO VOF may be best implemented using one or more computer-implemented methods to operate a computer-implemented service to offer FRO to the customers, that includes, but not limited to, recording the information pertaining to the offered and/or used FRO in a database. It may also include operating a computer-implemented service (and/or system) or other service (and/or system) to define the Chosen Flights, and recording said Chosen Flights (or defined Flights) and all the Flights related to a FRO in a database.

For the stage one (i.e., to formulate the FRO VOF), an application server may be used along with a database (e.g., a relational database) that stores all the information relevant to the airline and the customer. The database may include all the relevant information sufficient to identify Flights the airline chooses to make eligible for FRO. One or more users (e.g., a business analyst or manager) may have full access to this server through Intranet or highly secured VPN environment to design an optimal value option framework. The database shall also store all the information pertaining to all the acts (in stage one) used by the airline while formulating the FRO VOF.

A similar or a different application server and/or a cluster of application servers (functioning concurrently) along with one or more web servers and a set of one or more database servers may be used for the Get FRO as explained in FIG. 13D above and CN (Customer Notification) processes in the stage two of the FRO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get FRO process and the Event Optimizer processes may be computer-implemented as explained and discussed above in FIGS. 13D and 13E. All the customer interactions and the related information such as customer needs, inputs, payment transactions etc. are stored in this database, including information pertaining to the interactions with those customers who may not receive FRO. The systems for stage two and stage one should be maintained in a synchronized environment so that each system has access to the most current information and can communicate with each other.

As discussed above, there may be other ways for implementing the FRO VOF which may depend upon including, but not limited to, the scale of the implementation, business requirements and number of entities involved. The entities may interact through a series of hardware products and services with the OA/airline server(s). The OA may or may not be different than the airline and the OA server may be the same as that of the airline server. The information technology and network system to implement FRO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, an airline may have one or more separate temporary database structure wherein the entries are updated and stored until the final update is made in one or more main databases. One the final update is done, the entries in these temporary databases may be removed.

The entire system may run at the premises of OA, airline and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of airline's choice, ease of accessibility, infrastructure facilities. The structure or the interaction architecture of the system may vary depending on factors including, but not limited to, the set up of the airline, changes in the technology and with the introduction of new and better technology enhancing the interaction process.

A customer may interact with either one or more of the Get FRO, Buy_N, the CN processes either directly or indirectly using a local or a remote terminal (e.g., a computer with a browser and an access to the Internet) that is able to access the web server(s) that host the Get FRO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the airline, an OA, a third party service provider or any combination of the above. In the model, where the OA receives Flight allocation from the airline and offers FRO to the customers directly, the web server, application server and database for both stage one and stage two shall be managed by the OA. The OA may also have partial (or complete) access to the airline database and systems through a highly secured environment (for example, a virtual private network). In the model, when an OA and an airline tie-up together to offer FRO, all the computer hardware and software infrastructure for both stage one and stage two may be hosted by and/or property of either or both (mutually) of the sides depending upon the business agreement between them.

Flexibility Reward Option (FRO) Value Option Framework in the Hotel Industry

As explained above, FRO VOF can be implemented in any industry. The implementation of FRO in hotel industry is discussed herein. The customer desire to trade-in accommodation flexibility (defined below) is used as the targeted value element. A detailed demonstration of the FRO VOF in the hotel industry is presented below.

The first stage in the FRO VOF involves steps (or acts) of: capturing customer dynamics, assessing hotel operations and economic factors, integrating customer dynamics with hotel economic factors, formulating the VOF and optimizing the VOF. The second stage involves carrying out a dynamic interaction with the customer and then executing an Event Optimizer process. The specific detailed steps with respect to the FRO VOF will now be discussed.

Figure 51:
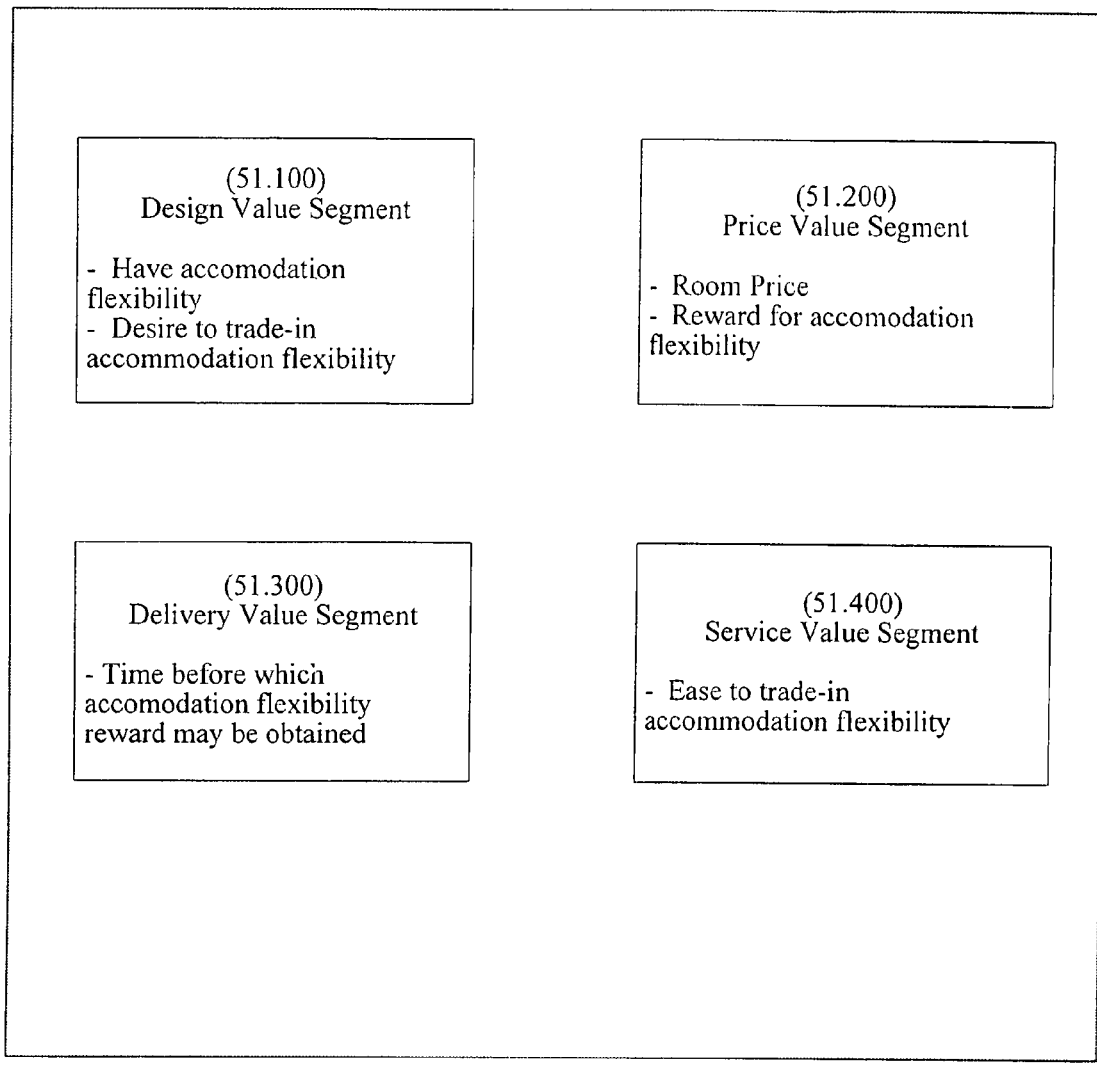
FIG. 51 is a diagrammatic illustration of an exemplary set of value segments and their value elements related to the FRO VOF in context of the hotel industry.

First Stage Formulation of FRO Value Option Framework (1) Capturing Customer Dynamics FIG. 51 shows an analysis of the value elements that are believed to matter to customers in relation to a FRO. In the design value segment, shown in Box 51.100, important value elements may include, but are not limited to, the customers' flexibility in reserving room and their desire to trade-in their accommodation flexibility. In the price value segment, shown in Box 51.200, important value elements may include, but are not limited to, Room Price and desired monetary/non-monetary reward to trade-in accommodation flexibility. In the delivery value segment, shown in Box 51.300, important value elements may include, but are not limited to, time before which a customer may be able to trade-in his or her accommodation flexibility to obtain the desired reward. In the service value segment, the important value elements may include, but are not limited to, the ease to trade-in accommodation flexibility, as shown in Box 51.400. It may be important to estimate the relative preferences and utilities of these value elements to different types of customers.

The customers' desire to trade-in their accommodation flexibility is subjective in terms of the length of the "accommodation flexibility trade-in period" and the "range of accommodation flexibility". The term "accommodation flexibility trade-in period" refers to the time period during which a customer is willing to trade-in his or her accommodation flexibility. The term "range of accommodation flexibility" refers to a range of Room features and/or components across which a customer is flexible. For example, the range of accommodation flexibility may be expressed in terms of the periods for check-in, check-out and stay, Room services/amenities needed during travel and so forth. The accommodation flexibility trade-in period, range of accommodation flexibility and reward (as desired by customers in lieu of accommodation flexibility) are subjective and may differ from customer to customer, or even for the same customer, may differ from one situation to another.

(2) Assessment of Hotel Economics

An assessment of the crucial economic factors of a hotel, as indicated in Box 52.100, may reveal the factors to include, but not be limited to, fixed and variable costs, non-uniform distribution of demand across different Rooms under the same category (or Rooms from various categories), the difficulty to accurately forecast demand, the inability or difficulty to shift customers from overloaded Rooms to low-demand Rooms, spill-demand from customers who are denied Rooms, costs and customer dissatisfaction and ill-will from over sale, the need to develop sustainable competitive advantages, customer attrition rate, the commoditization of the hotel industry, opportunity loss from capacity shortages and spoilage and so forth.

An assessment of the crucial economic factors of a hotel may be performed, to determine the factors that affect the profitability, growth and goals of the hotel. It might be beneficial if a hotel utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information).

(3) Integration of Customer Dynamics with Hotel Economic Factors

FIG. 52 also illustrates an example of how a mapping may be done, between the customer and hotel profiles, for the FRO VOF in hotel industry. On one side, there are customers who have accommodation flexibility and desire to trade-in their accommodation flexibility in lieu of rewards or benefits. However, customers are also concerned about any hassles, delays, frustration that one may go through if they participate in such an exchange. On the other side, a hotel faces an unbalanced demand that is difficult to forecast accurately. It would be certainly very helpful for a hotel to know the relative flexibilities of customers to receive different Rooms. For example, in hotel industry, a hotel may benefit from knowing the relative flexibility of a customer to utilize a Room within a given set of Rooms.

Hotels usually have a higher aggregate capacity than aggregate demand. However, the demand is non-uniform and often leads to oversale, revenue spill or spoilage or any combination thereof, in hotels. The issue of last minute cancellations and no-shows (CNS) further complicates the issue. To deal with the revenue spills and spoilages, and to concurrently hedge against the CNS, the hotels overbook Rooms. If a hotel Room remains empty for any duration, that condition probably represents the loss of potential revenue for that hotel. The hotel may have turned down potential customers due to the risk of high cost of overbooking in the concerned Room or other Rooms (of the same or different hotel). The overbooking factor in Rooms other than said Room represent potential revenue loss because there may be one or more customers on such other Room who could have been willing to be shifted to the Room with empty seats in lieu of reward, and thus, releasing capacity for new potential customers (who may be willing to pay a lot higher) in said other Room. However, today there is no framework that allows hotel to do so in an optimal fashion such that both hotel and the customer benefit at the same time. An opportunity, thus, exists to concurrently generate an incremental revenue benefit for the hotel, and to maximize the purchase utilities for the customers (includes those who want to trade-in flexibility and those who want to obtain specific Rooms even at higher prices).

The FRO VOF is created based on the value element "desire to trade-in accommodation flexibility". More specifically, as shown in the interaction between the Box 52.200 and Box 52.300, a mapping is performed between important customer value elements and the hotel economic factors. The value element "desire to trade-in accommodation flexibility" is extracted, as shown in Box 52.400 and a FRO value option framework is created.

(4) Formulating the "FRO" Value Option Framework

Figure 53:
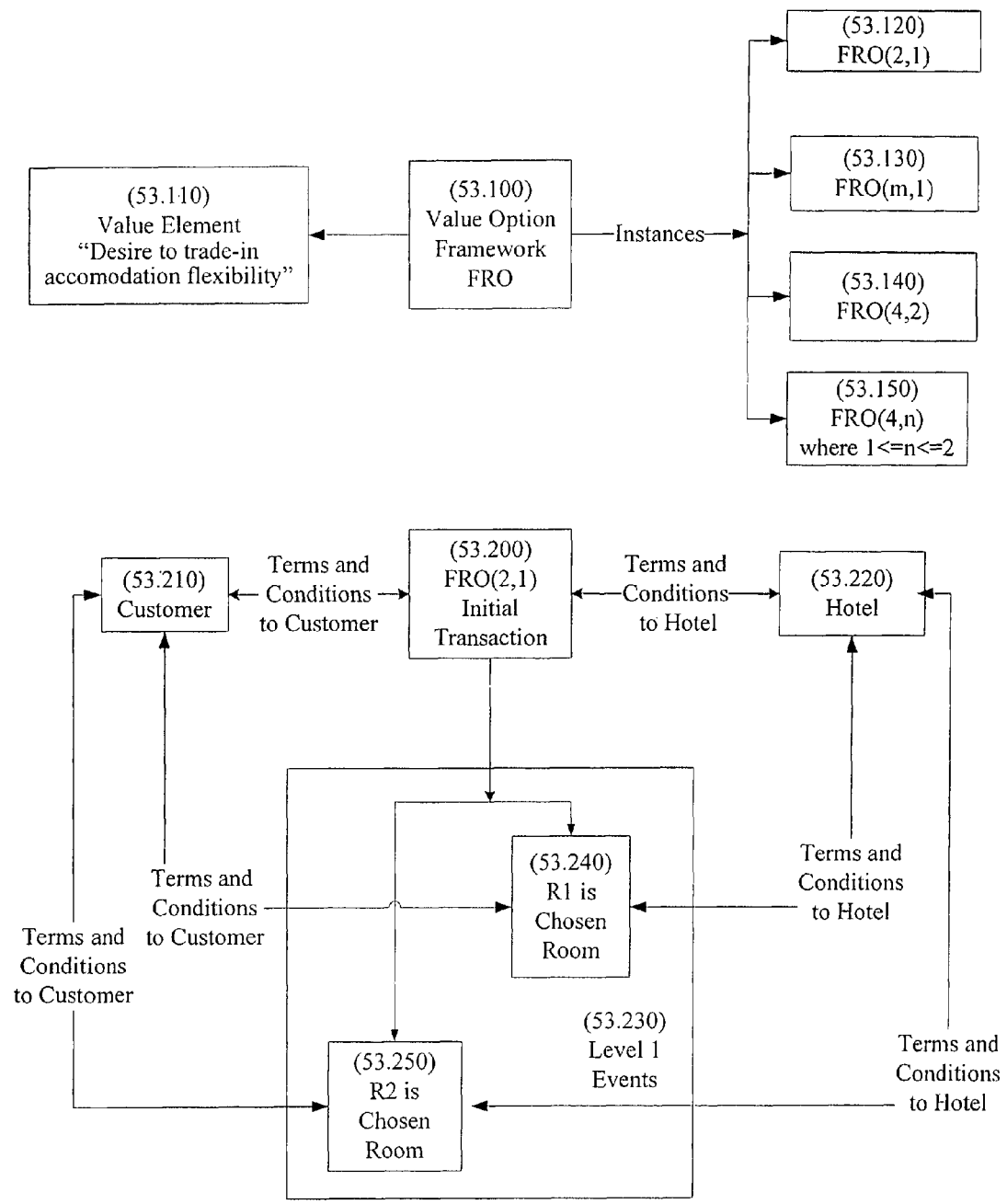
FIG. 53 is a partially-diagrammatic, partially-flow diagram representing the structure for creating a FRO Value Option Framework in context of the hotel industry.

Structure of FRO Value Option Framework in the Hotel Industry FIG. 53 displays the structure of a FRO value option framework (shown in Box 53.100) in hotel industry. The FRO value option framework is related to the value element "desire to trade-in accommodation flexibility", as shown in Box 53.110.

In the "Initial Transaction" for FRO, shown by Box 53.200, a customer (shown by Box 53.210) and a hotel (shown by Box 53.220) transact on the FRO value option. There may be one or more Events (shown by Box 53.230) that follow the Initial Transaction.

In a successful Initial Transaction for a FRO, the customer receives an option to utilize up to 'n' out of 'm' selected Rooms (said 'm' Rooms termed "FRO Rooms"). The 'n' Rooms that are finally selected are termed "Chosen Rooms". After each of the 'n' Chosen Rooms is defined (or selected or chosen or received), the customer has the right to utilize (or can utilize) said Chosen Room. Apart from the 'n' Chosen Rooms, the remaining 'm−n' rooms are termed "Released Rooms". The Released Rooms (especially if any, that were probably held or blocked for said customer) may be sold to other customers as normal Rooms or FRO Rooms or used for other purposes. The Released Rooms in relation to said option may be reused by the hotel before, after, at or any combination thereof, the time the Released Rooms and/or Chosen Rooms are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' Rooms may be defined in one or more transactions. The value of 'm' and/or 'n' may be defined (and/or re-defined), at one or more times, by the hotel, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Rooms may include one or more rooms other than said 'm' rooms.

The FRO Rooms may be selected by the hotel, the customer, another entity or any combination thereof. The FRO VOF may enable a hotel to obtain accommodation flexibility from FRO customers (i.e., those who select FRO) and use said accommodation flexibility to satisfy the Room needs of other customers (i.e., who have relatively fixed or strong preferences). Therefore, the hotel would usually have the right to select (or define) the Chosen Rooms. However, in different implementations of FRO VOF, the hotel, the customer, another entity or any combination thereof may select one or more of the Chosen Rooms related to a FRO. The FRO Rooms and the Chosen Rooms may be selected by the same entity, different entities or any combination thereof. For example, the customer may select the FRO Rooms and the hotel may select the Chosen Rooms out of the FRO Rooms. The hotel may incorporate the customer information and the data related to the FRO into the sales, production, inventory, other database or information system or any combination of the above.

The time when an Initial Transaction is completed (i.e., the customer receives the FRO option on said m Rooms) is referred to as the Initial Transaction Time (or ITT, in short). One or more of said m Rooms may be selected, at one or more times, before, after, during, or any combination thereof, the Initial Transaction and/or the time said option is delivered to the customer (or the customer receives said option) or any combination thereof. All the FRO Rooms may be selected concurrently (i.e., all together in one transaction) or sequentially (i.e., in multiple transactions).

The delivery of an option may include, but not limited to, electronic delivery of the option, physical delivery of the option, any other mode of delivery or any combination thereof. Once said option is delivered, one or more of m rooms may be available for use by the hotel, an entity other than the hotel and/or any combination thereof. The value of 'n' may be defined before, after or any time, the option being delivered to the customer. The delivery of option may occur in relation to the customer reserving at least one room. The delivery of option may also occur in relation to the customer reserving a room other than the room on which the option may be delivered. The customer may reserve a room other than the room on which the option is delivered to the customer.

In the sequential case, a customer may select one or more Rooms in one or more transactions before the Initial Transaction. Said selected Room(s) (let's say X number of them), thus, may be considered as part of said m FRO Rooms of the FRO (m, n) transaction, and the customer may select only the remaining (m−X) number of FRO Rooms during the Initial Transaction. All the transactions used to select (or receive) all the m FRO Rooms of a FRO (m, n) instance are related to each other, and hence, are considered as "related transactions" (as defined earlier).

In a FRO VOF, the sequential process may comprise a number of "related transactions" when all the FRO Rooms are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In the related transactions, 'n' may be equal to 'm' when there may be at least one payment transaction between the hotel and the customer related to the Rooms wherein such payment is made after the option has been granted. Said payment transaction may be one more transaction apart from the initial interaction and/or Initial Transaction in the event said customer utilizes all the 'm' Rooms. The customer may select Rooms prior to utilizing the penultimate Room. The hotel, an entity other than said hotel and/or any combination thereof may reserve the right to limit the customer to 'n' Rooms on, before, on or before, after, on or after or any combination thereof, a stated notification deadline date.

A hotel may choose to create one or more instances of the FRO VOF based on factors including, but not limited to, number of FRO Rooms, Chosen Rooms or Released Rooms, pre-determination of a number of Chosen Rooms or Released Rooms, flexibility trade-in period, other factors or any combination thereof. For example, a FRO based on a combination of the number of FRO Rooms (or m) and Chosen Rooms (or n) would be FRO (m,n). Some FRO instances are shown in Boxes 53.120, 53.130, 53.140 and 53.150. For example, when the number of Chosen Rooms is pre-determined, the FRO (4,2) instance may imply that the customer receives 4 FRO Rooms, on the condition that the hotel may select any 2 out of 4 Rooms as Chosen Rooms. When the number of Chosen Rooms is not pre-determined, the FRO (4, 2) instance may imply that the customer receives 4 FRO Rooms, on the condition that the hotel may select none, one or 2 Chosen Rooms out of FRO Rooms. There may also be a minimum limit on n. For example, the FRO (4, n) (where 1<=n<=2) instance limits the hotel to select either 1 or 2 Chosen Rooms out of the 4 FRO Rooms.

The FRO (2, 1) instance, two FRO Rooms and one Chosen Room, is used here as an example to demonstrate the details of the structure of a FRO VOF. Box 53.200 refers to the Initial Transaction between the customer and the hotel, in which they transact on a FRO (2, 1) value option. In a successful Initial Transaction for FRO (2, 1), the customer selects two FRO Rooms and the hotel may select any 'one' of those two Rooms as the Chosen Room.

The Initial Transaction may have terms and conditions applicable to the customer or the hotel or both. These terms and conditions may be set, preferably, to concurrently benefit both parties. The connections between Box 53.200 and 53.220, and Box 53.200 and 53.210 refer to the terms and conditions to the hotel and the customer, respectively.

The FRO VOF may or may not include any constraints on the FRO Rooms. For example, a hotel may restrict FRO applicability and availability on rooms that satisfy specific criteria. The two FRO Rooms may or may not include practically constrained Rooms. Practical constraints may include one or more constraints that will prevent a customer to utilize one or more given Room or prevent the customer from utilizing all the FRO Rooms. Such constraints may include, but are not limited to, time constraints, location constraints and so forth. In other words, it may or may not be practically possible for a customer to utilize both the selected Rooms due to at least one practical constraint.

A customer may select (or receive) FRO Rooms in several ways; through mutual agreement (e.g., during a direct interaction such as a Room booking), or the hotel may grant the FRO Rooms to the customer without soliciting their interest or permission. For example, to enhance customer satisfaction or for any other purpose, a hotel may grant FRO Rooms to customers based on the past customer behavior, interaction and so on.

The Initial Transaction may impose one or more conditions on the hotel. A hotel may be required to explicitly notify the customer prior to or no later than a given date and time (referred to as the Notify Deadline) regarding the Chosen Room. For simplicity, it is assumed that whenever the term Notify Deadline is used in the following sections, the condition requires notification prior to the Notify Deadline. If there is no such explicit notification condition, the Chosen Room may be decided as per the terms and conditions of the option contract. In either case, (explicit or implicit notification), the date and time when the selection of the Chosen Room is notified to the customer is referred to as the Customer Notification Time (or CNT, in short). In the current discussion, the explicit notification condition is assumed unless specifically mentioned otherwise.

A hotel may determine one or more Notify Deadlines for a Room at one or more times (e.g., before, during, after the Initial Transaction or any combination thereof) using factors including, but not limited to, customer needs, expected value of the Room, hotel profitability goals, any other factors or any combination of the above. Customer factors should also be considered in determining the Notify Deadlines, such as the flexibility trade-in periods desired by customers, or any other factor that may affect the behavior of a customer. The FRO VOF may or may not have a notification deadline condition.

A hotel may provide an option of booking 'm' Rooms with condition of canceling at least one of them. In such case, the hotel may have authority to decide booking of which Room is to be cancelled. The hotel may reward the customer for his/her accommodation flexibility. Consider an example. A customer may book two Rooms at $150 each for two different dates $2^{nd}$ May and $3^{rd}$ May. Three cases may follow this event—a) high demand for Room on $2^{nd}$ May, the hotel may cancel the booking of the Room for $2^{nd}$ May and the customer may be refunded $155 (Room Price+Flexibility Reward); b) high demand for Room on $3^{rd}$ May, the hotel may cancel the booking of the Room for $3^{rd}$ May and the customer may be refunded $155 (Room Price+Flexibility Reward); c) regular demand (i.e. no high demand) for the Rooms on both the dates, the hotel may cancel the booking of any of the Rooms as per its choosing or as per the terms of the option contract and the customer may be refunded $153 (Room Price+Flexibility Reward which may be lower in this case).

In the context of the FRO VOF in the hotel industry, the terms "price" or "reward" or "discount" normally refer to the price, which the hotel may offer to the customer in relation to the FRO. However, in one of the implementations of FRO VOF, the customer may also offer a price to the hotel in relation to the FRO. The terms "price" and "reward" are used interchangeably as and when the context requires.

The FRO VOF may impose additional terms and conditions on the customer. The hotel and/or an entity other than the hotel may receive from customer, at one or more times, an indication of one or more terms and conditions associated with said option in the FRO VOF. Similarly, at least one of said hotel and/or an entity other than said hotel may deliver to said customer, at one or more times, one or more terms and conditions associated with said option in the FRO VOF. A customer may receive one or more rewards (or prices) in relation to the FRO. There may or may not be any payment transaction related to the Initial Transaction and/or other event related to the FRO. There may be one or more prices related to the FRO. A price may include, but is not limited to, a set of one or more Room Prices, a set of one or more FRO Prices (or Rewards or Discounts) or any combination of the above. A hotel may choose to implement FRO Prices in many ways. For example, a customer may pay a Room Price to receive a group of Rooms, and then, may choose to get FRO on said Rooms and thus, receive FRO reward. A hotel may use the method of its choosing to decide on all the Room Prices.

The customer may receive one or more prices during the Initial Transaction (which is referred to as an Initial Price), at the CNT (which is referred to as an Exercise Price) and/or at any other time, which may or may not be pre-determined between the customer and the hotel. The price may be a function of number of FRO Rooms and/or Chosen Rooms, specific Rooms to be granted for FRO Rooms and/or Chosen Rooms, Notify Deadline, one or more Room Prices, any other factors of hotel's choosing or any combination of the above.

The price may comprise a monetary value or a soft/non-monetary value (e.g., benefits, coupons or exchange of another service) or other consideration. The FRO Price may be fixed or variable, with or without bounds. The hotel may set permissible range(s) or boundary limit(s) within which the FRO Price can vary, or it may offer the customer a set of prices to choose from. Since price conditions may depend upon various factors, which may or may not be variable, the same may be decided at anytime. The price conditions may be determined by the customer, the hotel, another entity, or any combination thereof at one or more times. One or more prices (FRO Initial or FRO Exercise or any other price) may be a negative value, which reflects that instead of the hotel rewarding the customer, the customer shall pay a price to the hotel to get the desired Room as the Chosen Room.

Different price strategies may be implemented in the FRO (2, 1) instance. For example, a single Initial Price could make it attractive and easy for the customer to participate in the FRO program. One or more of the FRO prices (rewards) may be embedded with the Room Price by using a special Room Price. A customer may be presumed to accept the FRO offer while displaying the Room Price (that has the FRO Price embedded in it). These presumptions may or may not include soliciting prior interest of the customer regarding the FRO offer. In case, the FRO price is merged with the Room Price, and where such price may or may not be separately identifiable, the customer may or may not receive a separate price for FRO.

The Notify Deadline may be pre-determined or may be determined later (i.e., after FRO grant) by the hotel, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the FRO VOF may not allow the hotel to notify the customer after the last Notify Deadline (i.e., the latest among the Notify Deadlines). As an operational measure, a rule may be set that if the hotel and/or an entity other than the hotel fails to notify the customer before the last Notify Deadline, the customer may select either of the FRO Rooms as the Chosen Room. Similarly, in one of the implementations of the FRO VOF, a rule may also be set that if the customer fails to notify the hotel and/or an entity other than the hotel before the last Notify Deadline, the hotel and/or an entity other than the hotel may select either of the FRO Rooms as the Chosen Room for the customer. Another approach may be (e.g., for customer/hotel) to designate one of the two Rooms as a Default Room (during or after receiving the FRO) that will be selected as the Chosen Room if the hotel fails to notify the customer of the Room selection before the last Notify Deadline. Any entity (e.g., the hotel or the customer) may (or may not) be allowed to change the Default Room once it is selected. The FRO Exercise Price (if any) in the default case may or may not be equal to the FRO Exercise Price for the Default Room for the last Notify Deadline. In the current discussion, a single Notify Deadline is assumed.

The FRO Exercise Price may be a function of Notify Deadline, FRO Rooms and/or Chosen Room, one or more Room Prices, any other factor of hotel's choosing or any combination thereof. In such situations, the hotel may pay a price to the customer based on the selection of the Chosen Room at a given time.

The FRO VOF may also include conditions imposed on the customer. A customer may be under a mandatory condition to accept the Chosen Room once it is selected (for e.g., by the hotel).

A hotel may determine customer preferences, either explicitly or implicitly, regarding utilization of up to n of m selected Rooms. The preferences may also include, but not limited to, customer preferences for various Rooms and services, needs, associated relative utilities, flexibilities, preferences regarding choice of Rooms, quality of Rooms, acceptable delays (relative) to receive different Rooms and so forth. A hotel may seek customer preferences on flexibility to utilize various Rooms, desire to trade-in their accommodation flexibility, any other parameters or any combination thereof. The hotel, one or more entities other than the hotel or any combination thereof may seek customer preferences.

A hotel may also offer FRO options to one or more customers on the basis of customer preferences, so obtained or collected. The hotel may offer said FRO options based on the dynamics of the hotel including, but not limited to, inventory, operational data, revenue management data, cost data, financial data, accounting data, any other internal data, any combination thereof and so on.

A hotel may seek such preferences from the customer's prior, during or after the customer has booked the Room or any combination thereof. These customer preferences may help the hotel to perform concurrent optimization of value for the hotel, the customers, one or more entities other than the hotel or any combination of two or more of the above. The customers may also include the customers whose preferences have not been determined or collected to perform concurrent optimization. The data pertaining to the hotel, customers, one or more entities other than the hotel, any combination thereof, may be integrated to concurrently optimize the value for at least any two of said entities. There may or may not be any payment transaction between the hotel, one or more other entities and/or the customers regarding seeking such customer preferences, delivering FRO options, customer participation in FRO and so on.

The hotel may operate one or more systems and/or services to monitor the hotel dynamics. Monitoring may include, but is not limited to, monitoring of capacity, days to check-in, flexible inventory that may be created in relation to said obtained preferences, analyzing various cost, revenue, operational or any other internal data and so on. The hotel may have one or more systems and/or services to analyze such data on a real-time or quasi real-time basis and draw conclusions on the basis of such analysis. Any of the systems and/or services may be operated by the hotel, one or more entities other than the hotel or any combination thereof.

A hotel may operate a system that defines customer preferences regarding at least utilizing up to n of m selected Rooms, where n is less than m, operate a system that enables use of said preferences to optimize value for at least one of customers, said hotel and an entity other than said hotel. Said system may be used to enhance room selling capacity (or helps to increase the overselling limits of Rooms). The hotel may use such preferences to offer FRO. A hotel may concurrently optimize value for at least two of customers, said hotel and at least one entity other than said hotel.

The hotel may utilize such preferences to meet its capacity shortages. These customer preferences may enable the hotel to increase the capacity limits for its Rooms. The hotel may start entertaining more requests from the customers and hence may increase the oversale limits for their Rooms. The hotel may be able to sell the Rooms at higher prices to the potential customers due to increase in capacity and oversale limits and thereby enhance its revenues. Such preferences may help the hotel to allay fears of customer ill-will and dissatisfaction in case of an oversale situation. The hotel may utilize these preferences to deal with the oversale situation more effectively, efficiently and in timely manner. Thus, it may eventually allow the hotel to capture demand that may otherwise, have been spilled or turned down and thereby enhancing its revenues without having any negative impact due to increase in capacity limits.

A hotel may offer FRO to all customers or any selected customers, such selection may be based on any criterion including, but not limited to, such as those who have expressed their relative preferences, those who have not expressed any preferences. By integrating the hotel dynamics and collected customer preferences, a hotel may offer appropriate incentives and terms and conditions for FRO to generate desired participation. A hotel may exercise its right (from FRO) to define the Chosen Rooms for one or more FRO customers depending on hotel's internal need to regenerate Room capacity for Rooms with low availability or shortages. A hotel may be in a better position to offer appropriate FRO offers at a later stage due to many factors including, but not limited to, the hotel having better knowledge of internal and external dynamics, a relatively better estimate on how many customers required to avoid oversale situation in the end and so on. A hotel may choose to handle any shortfalls in capacity using FRO or by any other method of its choosing.

Once the Initial Transaction is successful, there may be at least two possible related events, as shown by Box 53.230. The two events are (1) that R1 is the Chosen Room (as shown by Box 53.240) and (2) that R2 is the Chosen Room (as shown by Box 53.250). Each of these two events may be associated with various terms and conditions on the customer and/or the hotel. As explained above, the events may take place in two ways: either the hotel selects the Chosen Room to satisfy its business needs, or the Chosen Room is selected based on pre-determined rules. The hotel may have to pay an additional exercise price at the CNT depending on the terms and conditions of the option contract. Once the Chosen Room is selected, the hotel and/or the customer may not change the Chosen Room except within the bounds of the terms and conditions in the option contract. The hotel or the customer may (or may not) have the right to enforce the Chosen Room on the other party as per the terms and conditions of the option contract.

The hotel may offer incentives to the customers to motivate them to choose one or more rooms as Chosen Rooms among the FRO Rooms that may be more optimal for the hotel. A hotel may formulate one or more such offer (may referred to as Chosen Room Incentive Offers) and may send them to customers who have purchased FRO but not yet selected their Chosen Room via email, phone, mail or any other communication channel as per the terms and conditions of the option contract. Thus, such customers may be persuaded to select said optimal room in lieu of incentives if the terms and conditions of option contract provide so.

In one implementation of FRO, a hotel may want to hold capacity for the customer in only one of the FRO Rooms, in which the status of said Y customer is termed "Ya" (i.e., Accounted) and in the other FRO Room(s), the status is termed "Yw" (i.e., Awaiting) (both Ya and Yw have been defined above). A "Y" customer converts to an N customer after the CNT. Thus, at any given time, a hotel may have N, Ya and Yw type of customers for its Rooms.

The FRO VOF may help a hotel in one or more ways. For example, it may help to accommodate Room requests from potential customers. Any new potential customer who requests to obtain a Room is assumed to be an N customer. If the available quantity for the desired Room (desired by N customer) is insufficient to satisfy the request, then the hotel may use the quantity (if any, of desired Room) that has been assigned to Ya customers, and reassign the same to said N customer. Consequently, the hotel may then assign the Awaiting Rooms (i.e., the Rooms where said Ya customers have Awaiting status) to said Ya customers. By implementing such shifting or removing of Ya customers from their Accounted Rooms to Awaiting Rooms, a hotel may better serve incoming demand for Rooms. An event where such request comes to the hotel for a Room is termed "Buy_N". The act to remove (or shift) a Ya customer from his/her Accounted Room to his/her Awaiting Room is termed "Remove_Y". Detailed algorithms are presented below that may be used to manage a system comprising N, Ya and Yw type of customers.

The above terms and conditions of the FRO VOF may be set in a way to concurrently benefit the customer, the hotel, any other entity apart from said hotel involved and/or any combination thereof. The hotel gets to seek a way to create a flexible inventory of Rooms. The customer benefits from trading their flexibility for the desired rewards. The hotel benefits from enhanced customer satisfaction (loyalty and repeat business), incremental revenue from the high price paying customers, incurring lower costs on capacity shortages and selling (reusing) the Released Rooms, generating revenues from Released Rooms without actually reusing the Released Rooms and other operational benefits.

A FRO VOF may include a right for the customer to utilize each of the m FRO Rooms, and a right for the hotel to limit the Rooms (to fewer than m) the customer can utilize, if the hotel notifies the customer on a stated Notify Deadline. Said on a stated Notify Deadline may include, but not limited to, on and/or before the stated Notify Deadline, on and/or after the stated Notify Deadline, any combination thereof. The right may include the condition that the hotel may notify the customer before, at or after the stated Notify Deadline or any combination thereof. To provide some flexibility to the customers, the hotel may offer (or allow) the customers to express their preferences regarding the Chosen Room(s) before the stated Notify Deadline. The hotel may or may not exercise their right to limit the customer to utilize fewer than said m Rooms. The right may include a condition that the hotel may limit the customer after the customer expresses his/her preference for the Chosen Rooms. The hotel and/or an entity other than the hotel may have said limitation on at least one product. There may be a condition imposed on the customer to make at least one payment to the hotel when the customer expresses his or her preferences for the Chosen Rooms. The hotel and/or an entity other than the hotel may allow the customers to define said 'n' Rooms on or before a stated date. The hotel and/or an entity other than the hotel may reserve the right to take back any 'm' minus 'n' Rooms after the stated date. The customer, the hotel, an entity other than the hotel and/or any combination thereof may determine the notification date.

A hotel may choose to define all the Chosen Rooms at one or more times. All Notify Deadlines may or may not be associated with each of the related FRO Rooms. For example, a Notify Deadline may be after the time when the Room would have been utilized or the hotel may choose not to offer a Notify Deadline on a specific Room due to one or more reasons including, without limitation, high FRO Price, customer utility reasons and expected load factor. A hotel may select any of the selected FRO Rooms as the Chosen Rooms prior to a Notify Deadline. The hotel may also choose not to select any Chosen Rooms at one or more of the specified Notify Deadlines.

The costs, revenues, benefits, terms and conditions shown here are for illustration purposes only and actual values could be different depending upon specific values selected by the hotel for value options, customer behavior, hotel characteristics, Notify Deadline(s) and other relevant factors.

The FRO VOF structure may be implemented in several ways depending upon the terms and conditions associated with the FRO contract. The FRO VOF structure presented above for the FRO (2,1) instance can be extended to implement any other FRO instance.

The FRO concurrently optimizes value for at least two of the hotel, its customers, one or more other entities and/or any combination thereof. The customers receive rewards for trading their flexibility in utilizing a Room while the hotel gets the flexibility to optimally allocate Rooms (including sold Rooms) across various customers. The hotel gets to know the relative preferences and utilities of a customer for various Rooms as some customers take this option and others don't. The presumption here is that customers make a logical decision to take part in the FRO value option framework if they desire to trade-in their flexibilities. The hotel may benefit from higher customer loyalty, as customer may receive higher satisfaction from using the hotel services, and may optimize its profitability by reusing/reselling the Released Rooms at typically higher than average prices.

Example of FRO VOF Structure FRO (2,1)

FIG. 54 demonstrates an illustrative practical example of using the FRO (2,1) instance in the hotel industry. Consider a customer who interacts with a hotel to get FRO. Per Act 53.200, an Initial Transaction takes place between the hotel and the customer. FIG. 54 displays some of the details of the Initial Transaction. The customer selects/receives two FRO Rooms, R1 (shown in Box 54.100) and R2 (shown in Box 54.200), and the hotel can select either of the Rooms as the Chosen Room. The customer is under the condition to accept the Chosen Room as selected by the hotel.

The customer receives a reward of $10 as the Initial FRO Price from the hotel while the customer pays $450 as the Room Price to the hotel as part of the Initial Transaction. Hence, the customer pays a net amount of $440 to the hotel at Initial Transaction. The Initial Transaction takes place on the 10$^{th}$ day of November (i.e., the ITT, shown in the second row of the Box 54.300). There is an explicit notification condition wherein the hotel has to select and notify the customer regarding the Chosen Room before the Notify Deadline. An example of terms and conditions included with FRO are presented. A scenario is considered with different Notify Deadlines (shown in Box 54.400) and the Notify Deadline is expressed in terms of the number of days to check-in (DTC) of R1, the earlier of the two Rooms.

Box 54.400 displays a set of FRO Exercise Prices that are a function of both the Notify Deadline and the Chosen Room. There are four Notify Deadlines associated with the FRO. The FRO Exercise Price increases from $15 (for the First Notify Deadline of 5 DTC) to $40 (for the Last Notify Deadline of 1 DTC) if the Chosen Room is R1 and from $10 to $50 if the Chosen Room is R2. If the CNT is before 5 DTC, then the customer receives $15 as the FRO Exercise Price from the hotel if the Chosen Room is R1, and receives $10 as the FRO Exercise Price if the Chosen Room is R2, as shown in the second column of the second and third rows in the Box 54.400, respectively. If the CNT is after 5 DTC and before 3 DTC, then the customer receives a FRO Exercise Price of $20 or $25 if the Chosen Room is R1 or R2, respectively, as shown in the third column of the second and the third rows, respectively in the Box 54.400. Similarly, the customer receives a FRO Exercise Price of $30 for R1 or $35 for R2, if the CNT is after 3 DTC and before 2 DTC, and $40 for R1 or $50 for R2, if the CNT is after 2 DTC and before 1 DTC, as shown in the fourth and fifth columns of the second and the third rows in the Box 54.400, respectively.

5) Optimization of FRO VOF

As mentioned earlier (shown in FIG. 7), in the form of an optional last step in the first stage, a financial analysis may be performed using the existing hotel and customer data to determine the optimal terms and conditions of the FRO VOF. 'What-if' scenarios may be executed to determine an optimal pricing strategy. The hotel may want to divide customers using one or more criteria and design separate FRO VOF for each customer segment.

Second Stage Using the FRO Value Option Framework

After completing the first stage of the method, the hotel has created a FRO VOF and specific options within that framework. The hotel may have segmented customers and designed options accordingly. The hotel is fully prepared to use a structured format comprising one or more FRO value options to interact with its customers in real time to generate benefits for both the hotel and its customers. The second stage of the FRO VOF is now presented.

Figure 55:
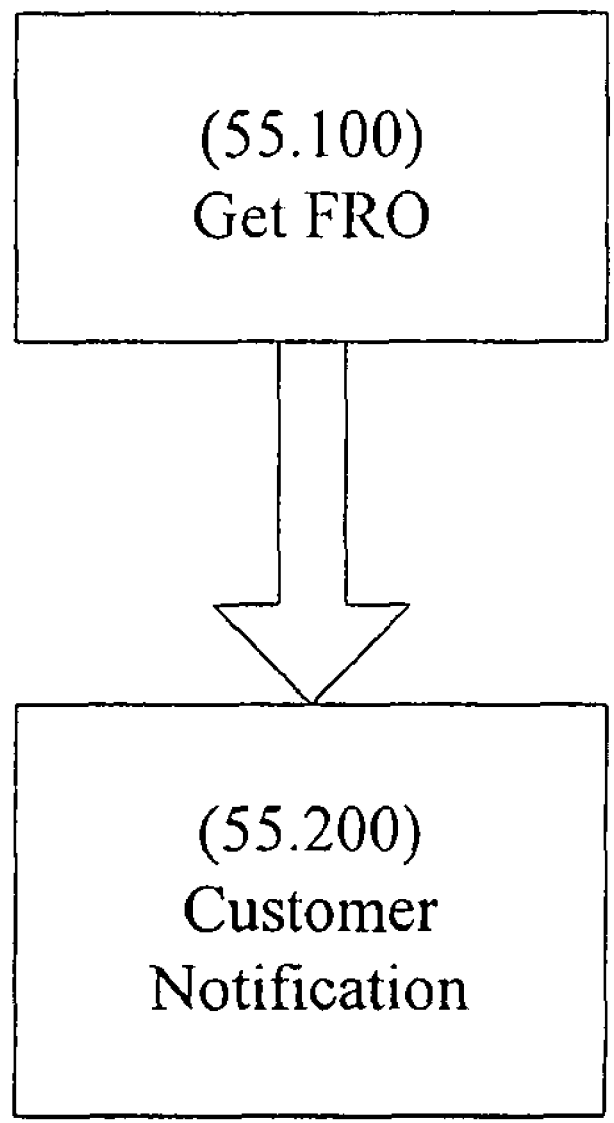
FIG. 55 is a diagrammatic illustration, in a high level flowchart, of a process for FRO VOF implementation in the hotel industry.

The implementation of the FRO VOF between the hotel and its customer takes place through two high level acts, as shown in FIG. 55. In Act 55.100, the 'Get FRO' process, an interactive event between the customer and the hotel's web server, runs to carry out the Initial Transaction of the FRO VOF. In this Act, a number of algorithms, may be executed (e.g., availability, FRO Price, Room Price and Notify Deadline) on the hotels server to optimally calculate the terms and conditions of the FRO VOF to concurrently benefit both the hotel and the customer. In Act 55.200, the Customer Notification process (explained later) is executed. In this process, the Chosen Room is notified to the customer. The process may also comprise one or more event optimizer algorithms that may help to optimally select the Chosen Room and/or to optimally use (or reuse) the Released Room.

Figure 62:
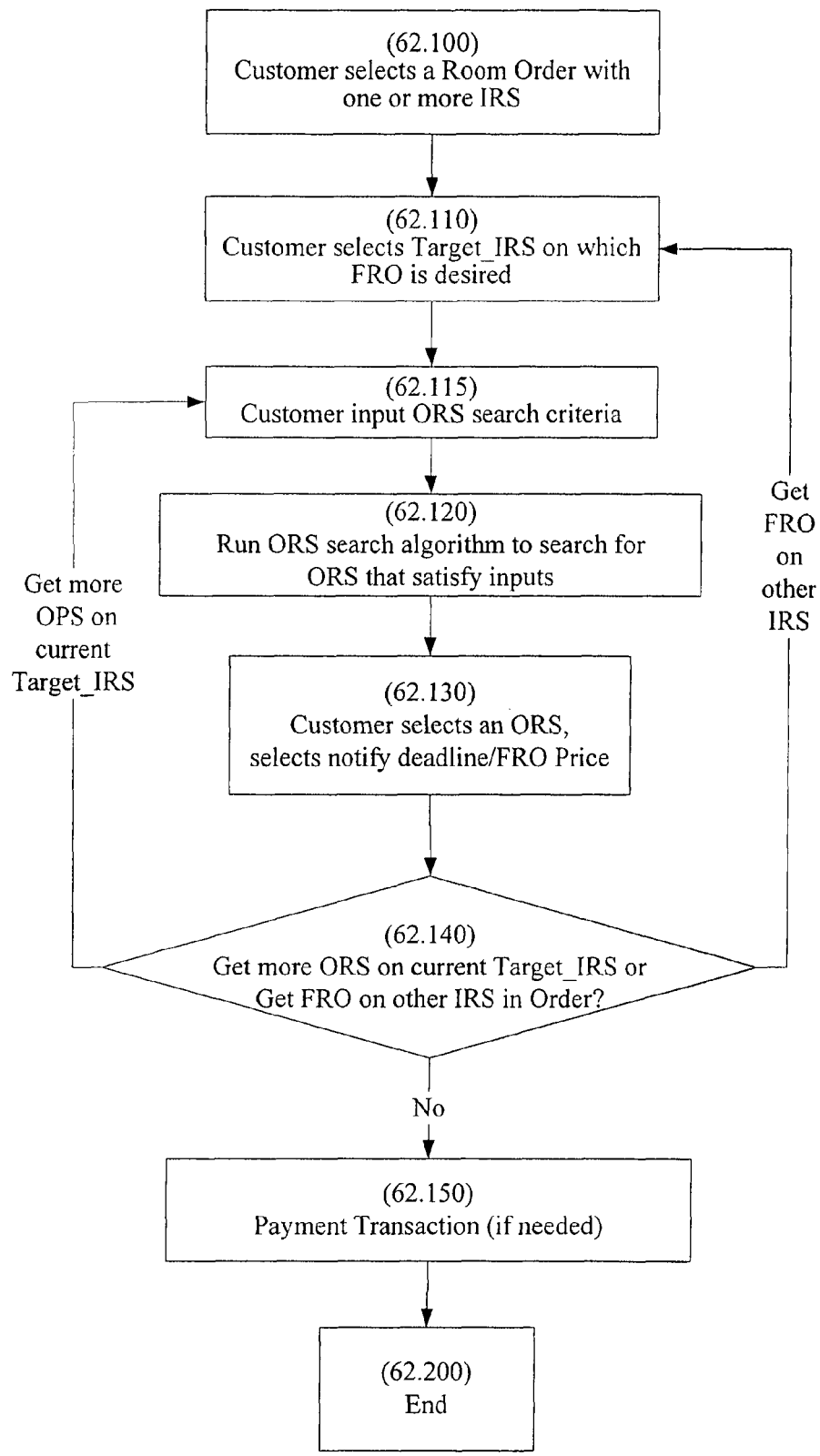
FIG. 62 is a flowchart that expands Act 100 of FIG. 55, illustrating a high level algorithm for the "Sequential Get FRO" process.
Figure 64:
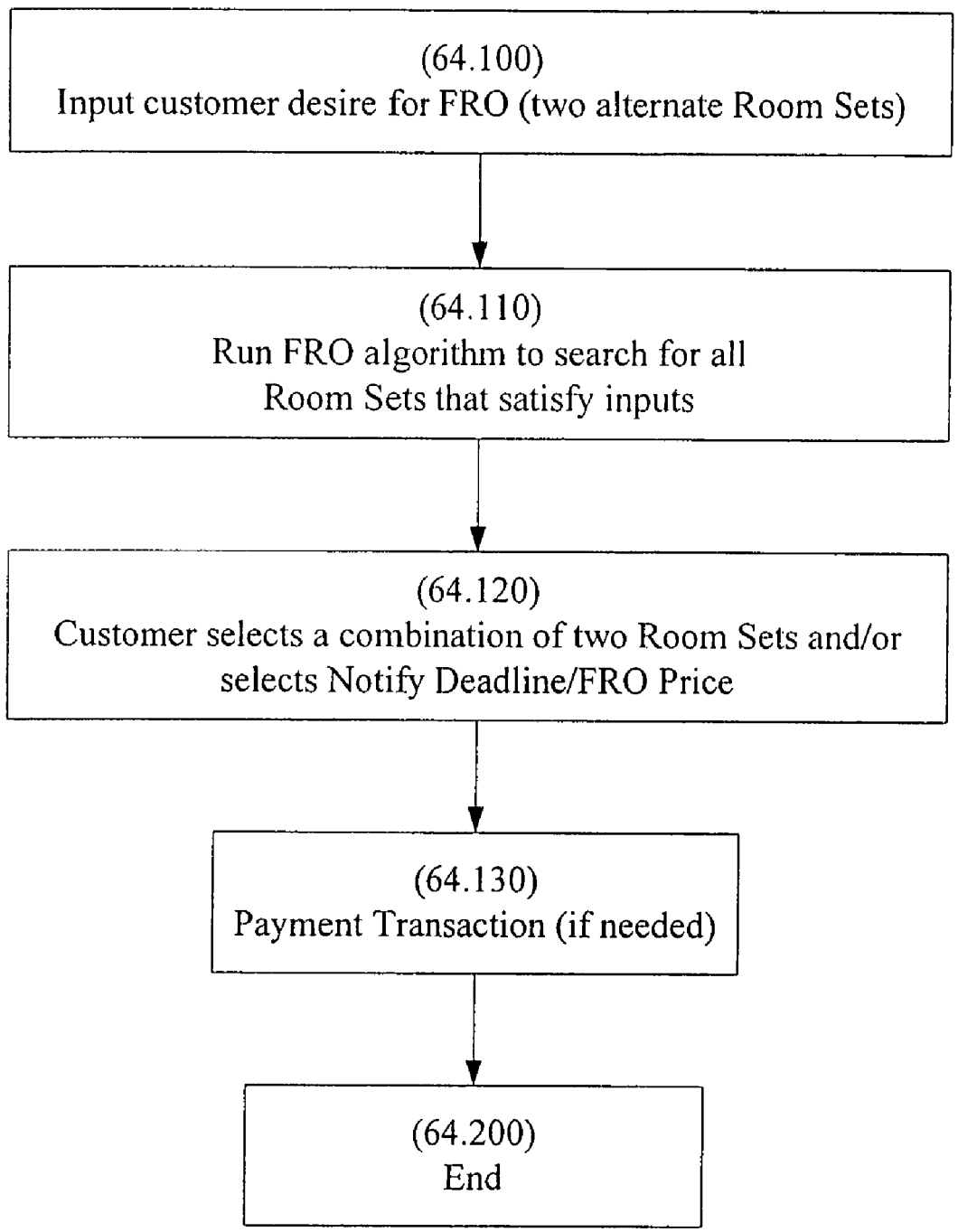
FIG. 64 is a flowchart of an algorithm for the "Concurrent Get FRO" process, an alternative process to FIG. 62.

As explained above, the Get FRO process may be implemented via the Sequential (shown in FIG. 62) or the Concurrent (shown in FIG. 64) process. There are many ways to do the Sequential process. As an example of the Sequential process, a customer may select (or purchase) a Room Product/Room Set/Room Order before the Initial Transaction begins. In such situations, said Room Product/Room Set/Room Order may be referred to as Initial Room Product/Initial Room Set/Initial Room Order or IRP/IRS/IRO, in short, respectively. The Initial Set is also referred to as Initial Room Set (or IRS, in short). A customer may get a FRO, i.e., get one or more FRO Room Product/Room Sets/Room Orders on an IRP/IRS/IRO, respectively. A FRO Room Product/Room Set/Room Order is also referred to as Option Room Product/Option Room Set/Option Room Order, or ORP/ORS/ORO, in short, respectively. An Option Set is also referred to as Option Room Set (or ORS, in short). The two events (one for the Initial Room and the other for the Initial Transaction) may be executed with a minimal (one just after another) or a significant time gap (e.g., few minutes, hours, days and so forth) in between them.

The FRO VOF may be implemented at different levels including, but not limited to, Room Product, Room Set and Room Order. Illustration of Room Product and Room Set levels is given through examples in the hotel industry as shown in FIGS. 56 and 57 respectively.

FIG. 56 displays a practical example of implementing a FRO (2, 1) at the Room Product level. The customer selects a FRO on Room Product (i.e., Initial Room Product or IRP, in short) on the Room Set and receives one Option Room Product (or ORP, in short) on IRP, as shown in Boxes 56.100 and 56.200). The hotel may select either of the IRP (Non-Smoking) or the ORP (Smoking) as the Chosen Room Product.

FIG. 57 displays a practical example of implementing a FRO (2, 1) at the Set level. A customer selects a Room Order comprising an IRS (located at T Square, Non-Smoking Room) as shown in Box 57.100. The customer gets FRO Room on the IRS, and receives one ORS (located B Square, Smoking Room) as shown in Box 57.200. The hotel may select either this IRS or the ORS, as the Chosen Room for this Car Order.

A hotel may choose to implement the FRO at any level(s). In a specific FRO interaction between a customer and the hotel, the implementation level should be the same for all the FRO Rooms, Chosen Rooms and Released Rooms. For example, if FRO is implemented at the Room Set level, then all the FRO Rooms and Chosen Rooms would refer to FRO Room Sets and Chosen Room Sets respectively.

1. 'Get FRO'—Dynamic Interaction to Capture Customer Demand

In the Get FRO process, a customer interacts with the hotel's server to receive a FRO. The interaction may take place (for example) via phone, in-person or on a website. The Sequential Get FRO Process is presented first along with its detailed algorithms, followed by a short summary of the Concurrent Get FRO Process.

Sequential Get FRO Process

There are several ways to implement the Sequential process. The following presents an example of the Sequential Get FRO Process when a FRO is implemented at the Room Set level. It is also assumed here that the customer first purchases an Initial Room Order with one or more IRS, and then opts to receive a FRO to select one or more ORS on any of the included IRS.

To demonstrate the process, an example of the FRO VOF in the hotel industry is used. As an instance of the Sequential Get FRO process in the hotel industry, a customer has purchased an Room Order and then gets a FRO through the interactive interface of the web pages as shown in FIGS. 58, 59, 60 and 61. FIG. 58 displays the summary of the purchased Room Order, which is made of Room Set comprising: Room Type as Guest Room, Check-in on Fri, December 8, Check-out on Mon, December 11. Clicking on the marketing banner representing "Get FRO", the customer is linked to the Web page shown in FIG. 59 and a Get FRO interaction begin.

The series of web pages in FIGS. 59, 60 and 61 may (for example) be displayed in a customer's browser by a hotel's web server, to facilitate the interaction between the customer and the hotel when the customer comes to participate in Get FRO (during or after the Initial Room Order is purchased). The Initial Room Order is displayed along with "Search FRO Rooms" section as shown in FIG. 59, where the customer may enter the search criteria for ORS and then click on the "Search FRO Rooms" button. After the click, the Get FRO algorithm running "behind the scenes" on a server of the hotel qualifies the availability, applicability and price (i.e., the discount for customer) conditions on all the available ORSs (Option Room Sets) and displays them in the screen as shown in FIG. 60. For each of the ORSs, FRO Initial (Instant) Discount (Price), a set of one or more Notify Deadlines and the corresponding FRO Exercise Discounts (Prices) are shown in the form of "Select" buttons (shown in the "FRO Notify Deadline/FRO Exercise Discount (Price)" section in FIG. 60). The customer may select any desired ORS (along with the Notify Deadline and FRO Exercise Discount (Price)) by clicking on a "Select" button associated with any of the Notify Deadlines displayed in the corresponding row. Once the customer clicks the "Select" button, he/she is hyperlinked to the web page as shown in FIG. 61, where the summary of the IRS and the selected ORS is shown.

Next, the customer may choose to get more ORS on the same IRS. To receive another ORS on the IRS, the customer may repeat the ORS search process for the IRS. Once all the desired ORSs have been selected, the customer clicks the "Continue" button (shown in FIG. 61). The customer receives the FRO Initial Discount (Price), and then a payment transaction is executed to complete the purchase.

The following presents an algorithmic illustration of the Sequential Get FRO process. Consider FIG. 62. In Act 62.100, the customer selects (and/or purchases) an Order (with one or more IRS). Next, in Act 62.110, the customer reaches an interactive interface of the hotel's web server to Get FRO page, where the customer selects the IRS (referred to as Target_IRS) on which a FRO is desired. Next, the customer inputs the ORS search criteria for the current Target_IRS in Act 62.115.

Next, on clicking the "Search FRO Rooms" button, control goes to Act 62.120, where the ORS search algorithm is executed to search for an ORS. The ORS search algorithm returns a list of valid ORSs, along with a list of Comb_NDs (defined elsewhere) and associated FRO Prices (or discounts). The details of the ORS search algorithm are presented later. Next, the search results are displayed for the customer, who then selects the desired ORS and one or more associated Comb_ND(s)/FRO Price(s), as shown in Act 62.130.

Next, in Act 62.140, a test is performed to determine whether the customer wants to get more ORSs on the current Target_IRS or on another IRS. If the customer wants to get an ORS on another IRS, control loops back to Act 62.110, where the customer selects another IRS as the Target_IRS, and then the process is repeated again for the new Target_IRS. If the customer wants to get more ORSs on the current Target_IRS, control loops back to Act 62.115, where the customer enters the ORS search criteria, and then the process is repeated for the new ORS search criteria. If the customer does not want to get any more ORSs, control goes to Act 62.150, where a payment transaction (if needed) may be executed. For example, a customer may need to pay a price for the Room after taking into consideration the Initial FRO Price (discount, if any) using a credit card, direct bank account debit or any other payment transaction mechanism. Next, the algorithm ends in Box 62.200. The computation may be performed using a processor that may calculate results in optimal time.

ORS Search

Figure 63:
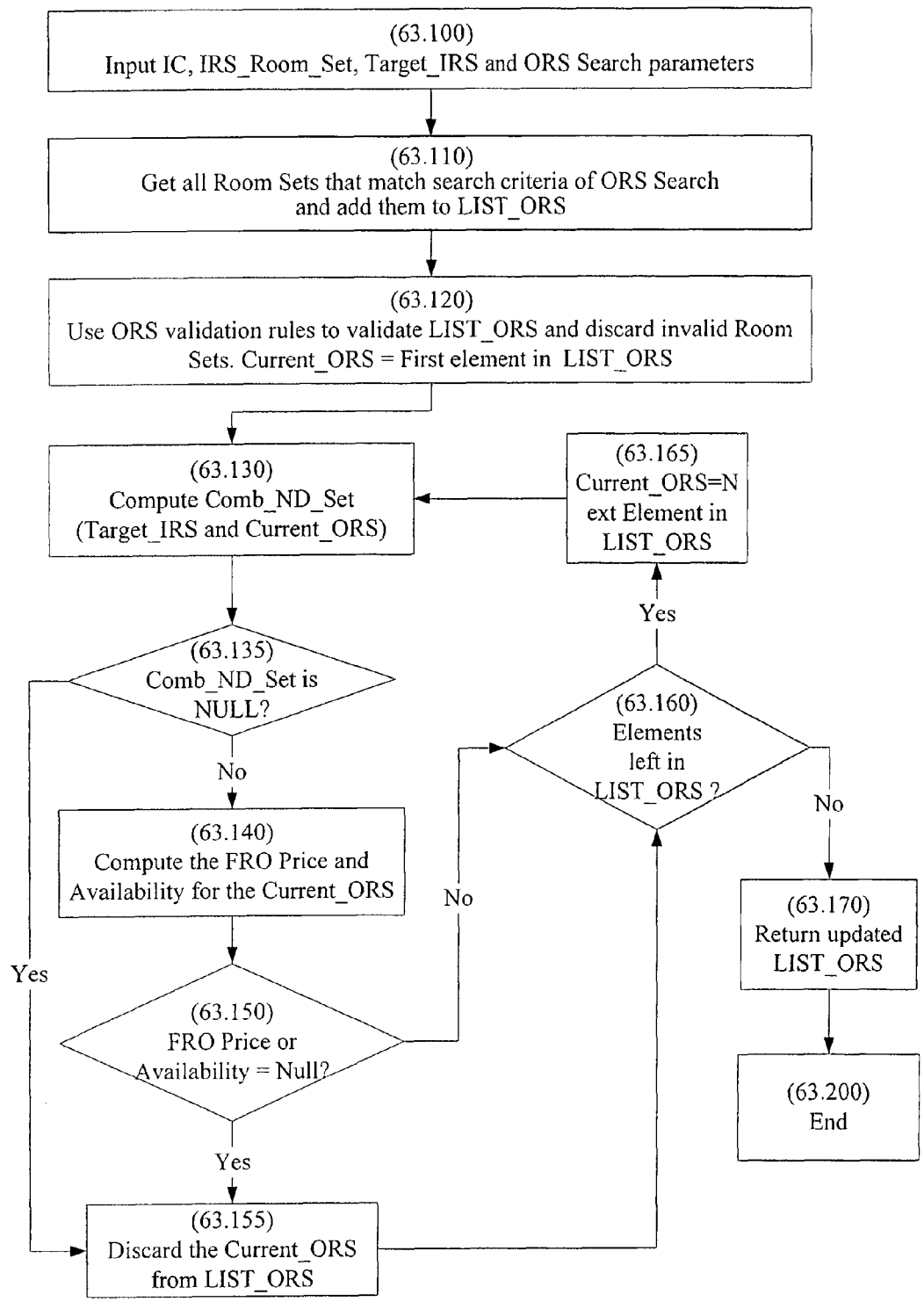
FIG. 63 is a flowchart that expands Act 120 of FIG. 62, illustrating an algorithm to search for FRO Room Sets.

The following algorithm (shown in FIG. 63) determines and validates an ORS for a given set of conditions including, but not limited to, availability, Notify Deadline and FRO Price. One of the ways of implementation of ORS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 63.100, the number of customers (IC), IRS_Set (containing all IRS in the Initial Order, and all the ORSs, (if any) already selected/received along with Comb_ND_Set(s) and Comb_OP_Set(s), for each IRS), Target_IRS and the ORS Search parameters are input to the system. The definitions and details of Comb_ND_Set and Comb_OP_Set are provided later. The ORS search parameters may include, but are not limited to, date, time and location, number of Room Products per Room Set, Notify Deadline, FRO Price (Initial and Exercise) and so forth. A customer may be allowed to input Notify Deadline and/or FRO Price on the basis of which valid ORSs (that satisfy the given criteria of Notify Deadline and/or FRO Price) may be searched for and displayed for the customer. In the hotel industry, for example, a customer may be asked to input the origin and destination related parameters, and then a set of Notify Deadlines and FRO Prices may be computed for the Rooms that match the given criteria. In another example, a customer may input both the origin and destination and Notify Deadline and/or FRO Price as inputs and then a search may be performed for valid ORSs. In yet another example, a customer may input to the system, one or more Rooms, and/or inputs to search for one or more additional Rooms (e.g., origin and destination, price etc.) to search for ORS that may be combined with one or more input Rooms (by the customer) to constitute the total set of Rooms for a FRO. In such situations, a hotel may also validate the Rooms input by the customer to determine if said Rooms are eligible to be the FRO Rooms.

Next, control goes to Act 63.110, where an ORS Search is performed for the given criteria. The search may be best performed using a processor that may calculate results in optimal time. The order in which search parameters are executed may be optimized to reduce the search time, however, it may or may not affect the final outcome. A hotel may select any order of its choosing.

In Act 63.110, Room Sets are determined that match the search criteria and the resulting Sets are added to a list termed LIST_ORS. Next, in Act 63.120, a list of ORS validation rules is obtained from the hotels FRO VOF database and the rules are used to validate all the Sets in the LIST_ORS list. Sets that do not satisfy the rules are discarded. Validation rules may include, but are not limited to, a Maximum Number of Room Products per Set Rule, a Maximum Room Price Rule and so forth. For example, a Maximum Number of Room Products per Set Rule discards the Sets that have more Room Products than specified. A hotel may implement any validation rule of its choosing to further qualify the Sets in the LIST_ORS list. As a last Act in Act 63.120, the first element in the updated LIST_ORS list is designated as the Current_ORS.

Next, control goes to Act 63.130, where a group of Comb_NDs is computed for the combination of the Target_IRS, all the existing ORS of the Target_IRS and the Current_ORS, and added to a set called Comb_ND_Set. Next, in Act 63.135, a test is performed to determine whether the Comb_ND_Set obtained in the previous Act is Null. If so, control goes to Act 63.155. If not, control goes to Act 63.140, where the FRO availability and FRO Price for the Comb_ND_Set are determined. Next, in Act 63.150, another test is performed to determine whether the FRO Availability or the FRO Price is Null. If so, control goes to Act 63.155. If not, control goes to Act 63.160.

In Act 63.155, the Current_ORS is discarded from the LIST_ORS list, and control goes to Act 63.160, where a test is performed to determine if more elements are left in the LIST_ORS list. If so, control goes to Act 63.165. If not, control goes to Act 63.170.

In Act 63.165, the next element in the LIST_ORS list is designated as the Current_ORS and control loops back to Act 63.130 to repeat the process for the new Current_ORS. In Act 63.170, the updated LIST_ORS list is returned as the search result, and the algorithm ends in Box 63.200.

Computation of Notify Deadlines

A hotel may set one or more Notify Deadlines of its choosing for its Room Products. Once the Notify Deadlines have been set for each Room Product, the next Act is to create a framework to compute the Notify Deadlines for a group of Room Products (such as a Room Set, a Room Order or any other group). The following sections present an example of a framework that may be used to obtain a set of Notify Deadlines applicable to a group of Room Products. A hotel may use any framework and algorithm of its choosing to obtain the same.

A set of Notify Deadlines associated with a Room Product, a Room Set and a combination of two or more Room Sets is called Room_Product_ND_Set, Room_Set_ND_Set and Comb_ND_Set, respectively. Each element in the Room_Product_ND_Set, Room_Set_ND_Set and Comb_ND_Set is termed Room_Product_ND, Room_Set_ND and Comb_ND, respectively. The Comb_ND_Set may be computed by combining the Room_Set_ND_Sets of all the given Room Sets. A Room Set_ND_Set may be computed by combining the Room_Product_ND_Sets of all the hotels under that Room Set. The Notify Deadlines may be computed based on various parameters and factors of the hotel choosing. One example to compute a Comb_ND_Set is as follows. First compute Room_Set_ND_Set for all Room Sets. A Room Set_ND_Set is computed by first selecting earliest of the Notify Deadlines of each Room Product within the concerned Room Set, and then picking the latest of those Deadlines, and noting that as the Target_Deadline. Next step is to pick all those Notify Deadlines that fall after the Target_Deadline. Notify Deadlines thus obtained may be validated using various validation rules based on hotel factors such as customer utility, Room parameters and so forth. Similarly, the Comb_ND_Set may thus be computed by repeating the above process for Room_Set_ND_Sets, thus obtained for each Room Set.

Available Capacity Check

The FRO capacity for an OCS may depend on one or more factors including, but not limited to, Notify Deadline, FRO Prices, expected hotel value and so forth. A hotel may use any method of its choosing to determine FRO capacity of a Room Product. For example, a hotel may choose to have a fixed FRO capacity for one or more of its Room Products.

An instance to compute FRO capacity is discussed below. Consider the case, when FRO Capacity is dependent on Notify Deadline. In such situation, the objective is to determine those Comb_NDs within the Comb_ND_Set on which FRO is available for the given ORS. The FRO Capacity and the Used FRO Capacity (the total number of Room Products on which FRO has been sold but not exercised) may be calculated for each Comb_ND within the Comb_ND_Set. Available Capacity (AC) would then be the difference of FRO Capacity and Used FRO Capacity for the given Room Product. If the AC is greater than or equal to the number of incoming customers desiring a FRO, then the FRO capacity is available at a given Comb_ND for the given ORS. The process may be repeated for all Notify Deadlines within Comb_ND_Sets. FRO may be made available on a given ORS for a given Comb_ND, if FRO is available on all the Room Products of ORS for the given Comb_ND.

Price Calculation

A hotel may set FRO Prices for a Room Product using any method of hotel choosing. Once the FRO Prices have been set for each Room Product, the next Act is to create a framework to compute FRO Price for a group of Room Products (such as a Room Set, an Room Order or any other group) by using FRO Prices for each Room Product in the group.

The parameter Room_Product_OP refer to FRO Price (and may or may not be corresponding to a Notify Deadline) associated with a Room Product. Similarly, Room_Set_OP and Comb_OP refer to FRO Price (may or may not be corresponding to a Notify Deadline) associated with a Room Set and a combination of two or more Room Sets, respectively. A set of Room_Product_OPs, Room_Set_OPs and Comb_OPs is termed Room_Product_OP_Set, Room_Set_OP_Set and Comb_OP_Set, respectively. The Comb_OP_Set is computed by combining the Room_Set_OP_Sets of the IRS and all the ORSs (existing and new). A Room_Set_OP_Set is computed by combining the Room_Product_OP_Sets of all the Room Products under that Room Set. One or more Room_Set_OP_Rules may be read from the hotels database and applied to calculate Room_Set_OP_Set for each input Room Set (IRS and all ORSs) using the Room_Product_OP_Sets of all the Room Products of said Room Set. A hotel may use any Room_Set_OP_Set Rule of its choosing. Room_Set_OP_Rules may be defined to calculate Room_Set_OP as the sum, average, highest, lowest or any other function of Room_Product_OPs of all the Room_Products at a given Comb_ND. Similarly, a Comb_OP_Set comprises one or more Comb_OPs, and is calculated using one of the pre-determined rules, termed Comb_OP_Rules, to combine the Room_Set_OPs of all the Room_Sets in the combination. A hotel may use a Comb_OP_Rule of its choosing. Comb_OP_Rules may be defined similar to the Room_Set_OP_Rules.

Concurrent Get FRO Process

As explained above, in the Concurrent Get FRO process, a customer receives all FRO Rooms concurrently in one transaction. An algorithmic illustration of an example of the Concurrent Get FRO process is displayed in FIG. 64. The FRO (2, 1) instance is assumed here as an example. Consider a customer who desires to trade-in his/her flexibility in lieu of a price (reward) offered by the hotel. In Act 64.100, the customer desires for FRO are input, including, but not limited to, a search criteria for two Room Sets according to customer's utility (may be similar to the search criteria defined above for the Sequential Get FRO process).

Next, in Act 64.110, the FRO algorithm is run to determine the combinations of two Room Sets that satisfy inputs. A list of such search results is displayed for the customer along with the associated terms and conditions including, but not limited to, Notify Deadlines, Initial FRO Price, FRO Exercise Price and Room Price for each such combination. The FRO algorithm for the Sequential Get FRO process (defined above) may also be used for the Concurrent Get FRO process.

Next, in Act 64.120, the customer selects a desired combination of two Room Sets and the associated conditions such as FRO Exercise Price/Notify Deadline. Next, in Act 64.130, a payment transaction is executed, if needed. For example, the customer may pay the Room Price after taking into consideration the Initial FRO Price using a credit card, direct bank account debit or any other payment transaction mechanism. Next, the algorithm ends in Box 64.200. The computation may be performed using a processor that may calculate results in optimal time.

2. Event Optimizer

After the completion of the Get FRO process, the next stage is the Event Optimizer. In this stage, the Customer Notification (or CN, in short) process as shown in Act 55.200 is executed. In this process, one or more decisions on the selection of Chosen Room(s) is notified to the customer. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

The FRO VOF helps to create a flexible customer inventory. In other words, by using the FRO VOF, a hotel may obtain rights to allocate any of the selected FRO Room to a FRO customer, and thus, said FRO customer acts like a flexible customer inventory that the hotel may manage at known cost and conditions. A hotel may design one or more uses of such flexible customer inventory, where each such use may include one or more events that follow the Initial Transaction. An example (the Buy_N process) was explained earlier. In the Buy_N process, a hotel may use the FRO VOF to accommodate requests from potential customers for Rooms. As an example, the Buy_N process may especially be used to satisfy requests for Rooms that have already been sold or have low (or no) availability. The details for the Buy_N process are presented below.

Another example to use the FRO VOF would be to use the FRO VOF in conjunction with one or more other VOFs, for example, the ARO (the Alternate Room Option) VOF (details are provided later). A hotel may form a group of one or more ARO customers and one or more FRO customers, where the options (ARO and FRO) obtained by the group members are complementary in nature. As an example, consider a customer (A) who bought an ARO to choose either of R1 and R2 as Chosen Room, and consider a customer (B) who received a FRO and is flexible to take any of R1 and R2 as Chosen Room. Thus, if A decides to choose R1 as the Chosen Room, the hotel may assign R2 as the Chosen Room for B, and vice versa. The customers A and B have taken complementary options and may form a group. The hotel may need to hold only one unit of inventory in R1 and R2 to satisfy the needs of both A and B (assuming each A and B only need one unit of Room). Such a combination of complementary options or VOFs may improve efficiency and concurrently enhance value for all the parties involved (in the given example, for A, B and the hotel). More details on combining VOFs are provided later.

The FRO VOF structure in the hotel industry may enable a hotel to optimize operational levels such as Occupancy Rate, hotel staff scheduling and so forth. There may be many other instances of optimization a hotel can achieve by using FRO, thus, generating additional revenue, greater customer satisfaction and loyalty or any combination of these.

A hotel may use the FRO VOF for any other purpose of its choosing. In all such uses, the hotel may use a system defined below that can help to optimally allocate Room capacity among customers. The following system presents an example of a system (along with its methods and algorithms) that may be used to shift FRO customers within their selected FRO Rooms. However, a hotel may use any other process of its choosing to shift FRO customers within their selected FRO Rooms. The Buy_N process is used as an example to demonstrate the system and its set of methods and algorithms.

The process of shifting Y customers (i.e., FRO customers) within their selected FRO Rooms is termed "Remove_Y" process. The Remove_Y process may allow the hotel to remove FRO customers from their Accounted Rooms and optimally shift them to one of their Awaiting Rooms to satisfy a pre-defined goal.

The hotel, an entity other than the hotel and/or any combination thereof may store the data in a data store which may include, but is not limited to, the value that may be realized if the customer is shifted, Awaiting Rooms to which the customer may be shifted and so forth. The hotel, an entity other than the hotel and/or any combination thereof may receive and process data to determine from among all or substantially all possible combinations of customers, a set of customers which may be shifted. The hotel, an entity other than the hotel and/or any combination thereof may shift one or more set of customers that may be determined by processing the data. The hotel may also shift one or more set of customers other than the combination of customers that may be determined by processing said data. Set of customers which may be shifted or the decision to initiate shifting may depend upon number of factors including, but not limited to, the need and urgency to shift the customers, factors of hotel's choosing, creation of number of units of Room availability, optimizing revenues which may for at least one of the customer, hotel and/or an entity other than said hotel, cost savings and so forth.

The hotel may, on detection of occurrence of one or more events, execute one or more event response algorithm which may determine one or more set of customers possessing options making them eligible to be shifted to one or more Rooms and may shift one or more of said set of customers to create Room availability. Said event may be an increase in the demand of one or more Rooms or increase in forecasted demand of one or more Rooms or any combination thereof or any other event. The shifting may be done at the instance of the hotel, an entity other than said hotel or any combination thereof. The set of customers, here, may include one or more customers. The shifting may involve shifting of one or more customers. The shifting of one or more customers, as explained below in Remove_Y, may involve one or more interactions between the hotel, an entity other than the hotel, the customers and/or any combination thereof. The shifting may involve shifting one or more first customers to one or more first Rooms after one or more second customers from one or more first Rooms are shifted to one or more second Rooms and so forth. Such a cascading process may continue until the last customer which may have to be shifted in the set is shifted and it may lead to shifting of more customers than the creation of number of units of Room availability. This process may involve two or more customers. This process has been explained in detail below in the Remove_Y process. The hotel and/or an entity other than the hotel may or may not notify the customer regarding said shifting within the specified Notification Deadline. The hotel and/or an entity other than the hotel may shift one or more customers to one or more Rooms belonging to said hotel, to one or more Rooms belonging to an entity other than said hotel and/or any combination thereof. Shifting may create a lot of value to the hotel and may lead to enhanced revenues and/or cost savings. However, it may also be possible that shifting may sometimes be a cost to the hotel and a hotel may still apply shifting (Remove_Y) for fulfillment of other goals and/or objectives of the hotel.

Buy_N Process

Figure 65:
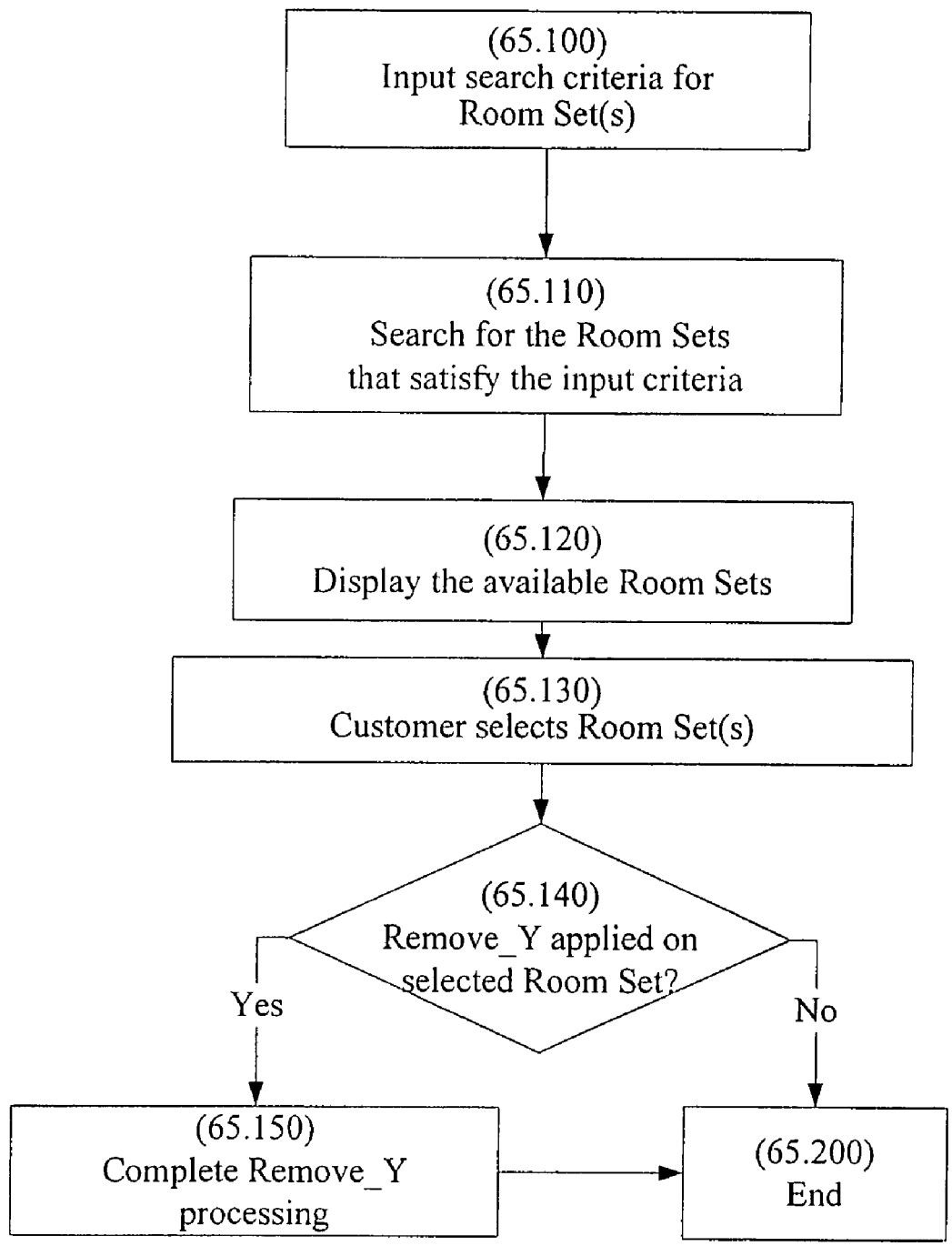
FIG. 65 is a flowchart illustrating the Buy_N process for a Room Set of a hotel that has implemented the FRO VOF.

FIG. 65 displays a flow chart of an example of a Buy_N algorithm, which is executed during a dynamic interaction between the customer and the hotel. As an example, an interaction may include a situation when a customer interacts with a hotel to obtain (or purchase) Room Products, or when a hotel presents offerings to a customer (with or without a solicitation by the customer). A few parameters have been assumed to add context and enhance understanding. It is assumed that a customer is interacting with a hotel to purchase Room Products, and that FRO VOF is implemented at the Room Set level. In Act 65.100, the search criteria are input. Various search parameters for a desired Room Set (as desired by the customer) are taken as the input to the system.

Next, in Act 65.110, a search process is executed to search for all Room Sets that satisfy inputs. The details of the search process are described later. Next, in Act 65.120, all the search results are displayed before the customer in an interface (such as in a web browser, a telephone operator stating the search results over the phone etc.). Control then goes to Act 65.130, where the customer selects a Room Set. The selection of the Room Set may be followed by a payment and/or purchase of the selected Room Set.

In Act 65.140, a test is performed to determine whether Remove_Y process has been applied on the selected Room Set. If so, control goes to Act 65.150, where the Remove_Y process is completed for the selected Room Set, and control then goes to Box 65.200. If not, control goes to Box 65.200, where the algorithm exits. The completion of the Remove_Y process may include one or more Acts that may be executed to incorporate the fact that said Room Set was selected by the customer. For example, one of such acts may be to record the selection of said Room Set to a database and/or to change the Accounted Status for one or more FRO customers (who were affected in the Remove_Y process).

Figure 66:
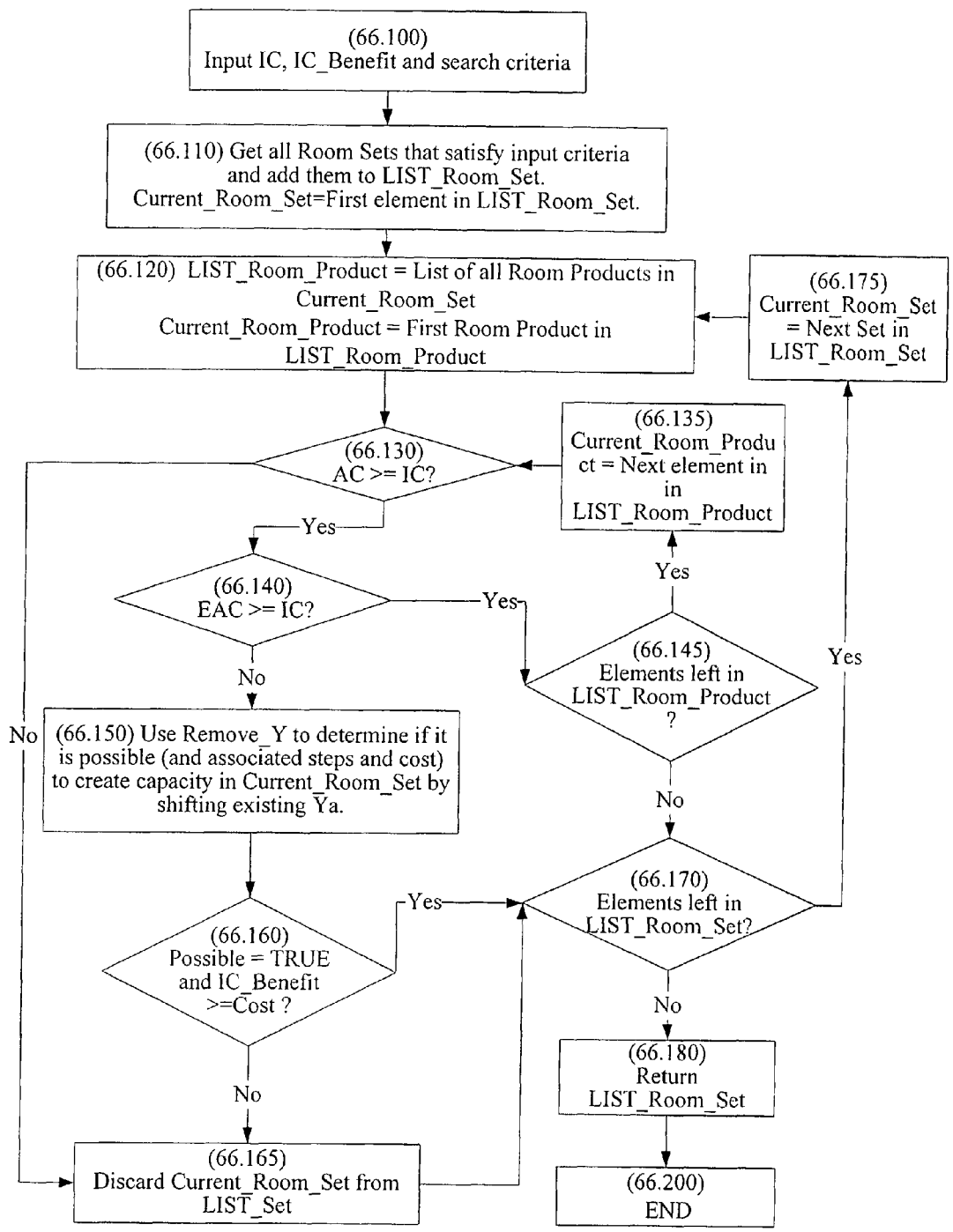
FIG. 66 is a flowchart that expands Act 110 of FIG. 65, illustrating an algorithm for the Buy_N search process.

FIG. 66 expands Act 110 of FIG. 65 and demonstrates an example of a search algorithm that may be used to determine Room Sets that satisfy the inputs. In Act 66.100, IC (number of incoming customers), IC_Benefit (i.e., the benefit that a hotel may receive if the incoming customers select and/or purchase one or more Room Sets) and the input search criteria are taken as the input parameters to the system. The term "Incoming Customers" refers to the customers who interact with the hotel in the current transaction (Buy_N). It is assumed that each customer desire one unit of capacity and thus, total units of capacity desired is equal to the total number of incoming customers. In some situations, IC_Benefit and/or IC may not be available as an input, and may be calculated during the search process. Next, in Act 66.110, all the Room Sets that satisfy the 'search criteria' are searched from the hotel database. The Room Sets, thus obtained, are added to a list termed LIST_Room_Set. The first element in the LIST_Room_Set list is designated as Current_Room_Set.

Next, in Act 66.120, all the Room Products in the Current_Room_Set are added to a list termed LIST_Room_Product. The first element in the LIST_Room_Product list is designated as Current_Room_Product. Next, in Act 66.130, a test is performed to determine whether the Available Capacity (AC) of the Current_Room_Product is greater than or equal to IC. If so, control goes to Act 66.140. If not, control goes to Act 66.165.

In Act 66.140, another test is performed to determine whether EAC (Effective Available capacity) of the Current_Room_Product is greater than or equal to IC. If so, control goes to Act 66.145. If not, control goes to Act 66.150, where the Remove_Y algorithm is executed to determine the possibility (and associated process steps and costs) to create capacity in the Current_Room_Set. Next, in Act 66.160, a test is performed to determine whether it is possible (by using Remove_Y) to create capacity in the Current_Room_Set and the IC_Benefit is greater than or equal to the cost to create that capacity as determined in the Act 66.150. If both conditions are true, control goes to Act 66.170. If either condition is false, control goes to Act 66.165. In Act 66.165, the Current_Room-Set is discarded from the LIST_Room_Set list, and control then goes to Act 66.170.

In Act 66.145, a test is performed to determine whether more elements are left in the LIST_Room_Product list. If so, control goes to Act 66.135, where the next element in the LIST_Room_Product list is designated as the Current_Room_Product and control loops back to Act 66.130, to repeat the process for the new Current_Room_Product. If not, control goes to Act 66.170.

In Act 66.170, another test is performed to determine whether more elements are left in the LIST_Room_Set list. If so, control goes to Act 66.175, where the next element in the LIST_Room_Set list is designated as the Current_Room_Set and control loops back to Act 66.120, where the process for the new Current_Room_Set is performed. If not, control goes to Act 66.180, where the LIST_Room_Set list (the most recently updated version after discarding the invalid Room Sets, if any) is returned. Next, the algorithm ends at Box 66.200.

Figure 67:
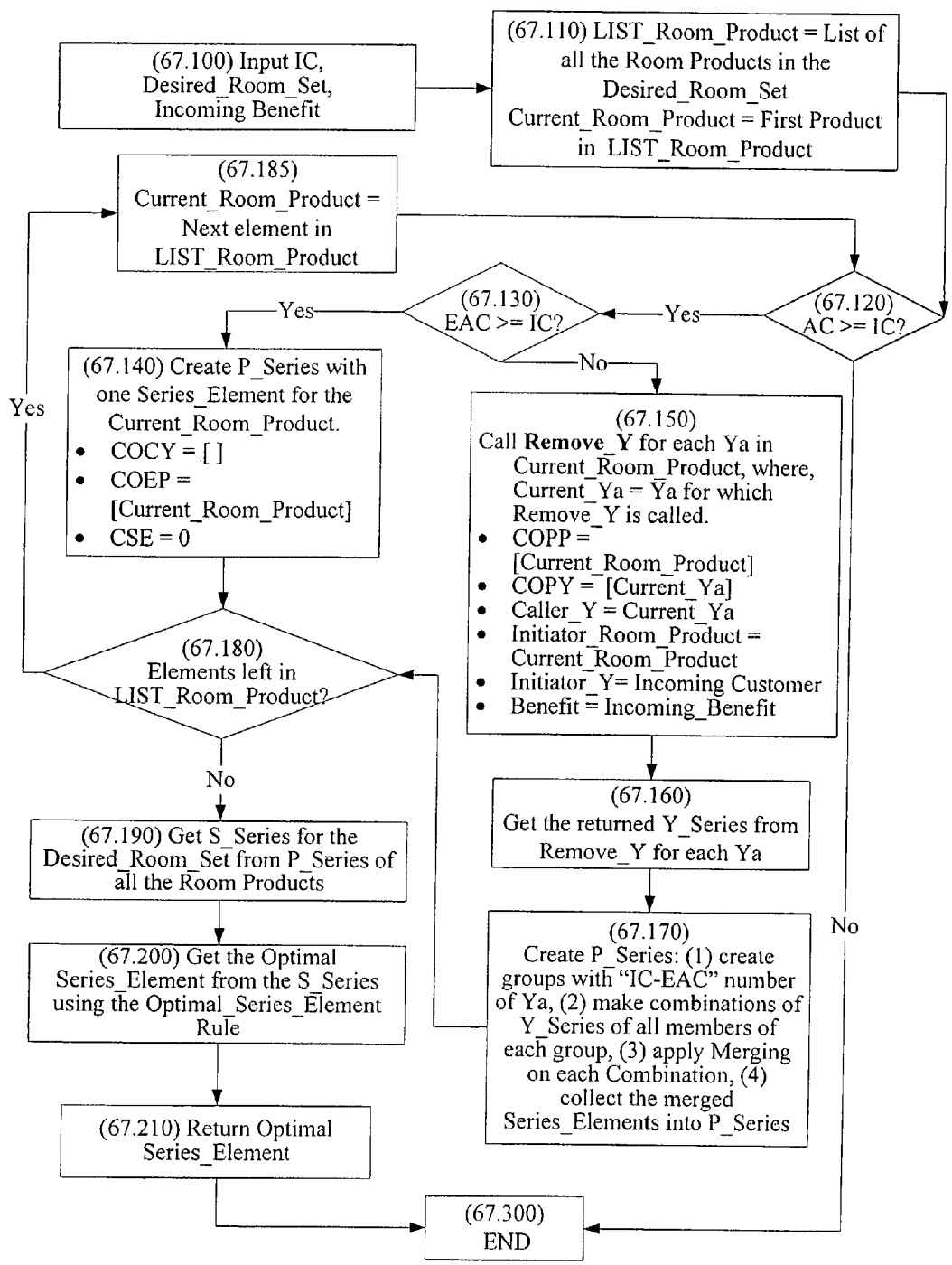
FIG. 67 is a flowchart that expands Act 150 of FIG. 66, illustrating an algorithm to create capacity using the Remove_Y algorithm.

FIG. 67 expands Act 150 of FIG. 66 and demonstrates an example of an algorithm to apply the Remove_Y algorithm to create one or more than one unit of capacity in one or more Room Product (s) within a Desired_Room_Set (the Room Set in which capacity needs to be created). In Act 67.100, various input parameters are taken in the system. Input parameters include IC, Desired_Room_Set and Incoming_Benefit (i.e., benefit hotel may realize if capacity is created in the Desired_Room_Set)

Next, control goes to Act 67.110, in which all the Room Product(s) in the Desired_Room_Set are listed in the LIST_Room_Product list. The first Room Product in the LIST_Room_Product list is designated as Current_Room_Product. Next, in Act 67.120, a test is performed to determine whether the Available Capacity (AC) of the Current_Room_Product is greater than or equal to IC. If so, control goes to Act 67.130. If not, control goes to Box 67.300, where the algorithm ends. In Act 67.130, another test is performed to determine whether EAC (Effective Available capacity) of the Current_Room_Product is greater than or equal to IC. If so, then control goes to Act 67.140. If not, control goes to Act 67.150.

In Act 67.140, a P_Series is created for the Current_Room_Product. Since the Current_Room_Product is an End_Room_Product, there will be only one Series_Element in the P_Series collection. The Series_Element will comprise COEP with the Current_Room_Product as the only element, COCY with no elements and CSE with zero value (since no Ya needs to be removed from Current_Room_Product, and hence, no cost to create capacity). Next, control goes to Act 67.180.

In Act 67.150, the Remove_Y algorithm is called for each Ya in the Current_Room_Product and the algorithm follows a recursive loop. Each of the Ya becomes Current_Ya for the corresponding Remove_Y call. The necessary input parameters for each of the Remove_Y includes the Current_Room_Product as 'COPP', Current_Ya as 'COPY', Current_Ya as 'Caller_Y', Current_Room_Product as 'Initiator_Room_Product', one of the incoming customers as 'Initiator_Y' and Incoming_Benefit as 'Benefit'. The Remove_Y call returns a Y_Series collection for each Ya in the Current_Room_Product. The details of the Remove_Y algorithm are discussed in the next section.

Next, control goes to Act 67.160, where all the Y_Series collections are obtained as returned from the Act 67.150. Next, in Act 67.170, a P_Series collection for the Current_Room_Product is calculated through the following operations: (1) create groups of Ya from all Ya of the Current_Room_Product for which Remove_Y was called, where the number of Ya in each group is equal to "IC-EAC" (EAC of the Current_Room_Product), (2) make combinations of the Y_Series collection of all members of each group (combine each Series_Element of each Y_Series of each member with that of each of the rest of the members of that group), (3) merge all members within each combination to formulate a merged Series_Element, (4) collect all such merged Series_Elements, thus obtained, into P_Series collection of the Current_Room_Product. Details on making combinations and merging are provided later.

Next, in Act 67.180, a test is performed to determine whether more elements are left in the LIST_Room_Product list. If so, control goes to Act 67.185, where the next element in the LIST_Room_Product list is designated as the Current_Room_Product and control loops back to Act 67.120 to repeat the process for the new Current_Room_Product. If not, control goes to Act 67.190.

In Act 67.190, a S_Series collection for the Desired_Room_Set is calculated from the P_Series collections of all the Room Products using the combination and merging process (details provided later). Next, in Act 67.200, an optimal Series_Element from the S_Series collection is determined using Optimal_Series_Element Rule (which is read from a database). Next, control goes to Act 67.210, where the optimal Series_Element is returned and the algorithm exits at Box 67.300.

'Remove_Y' Algorithm

Figure 68:
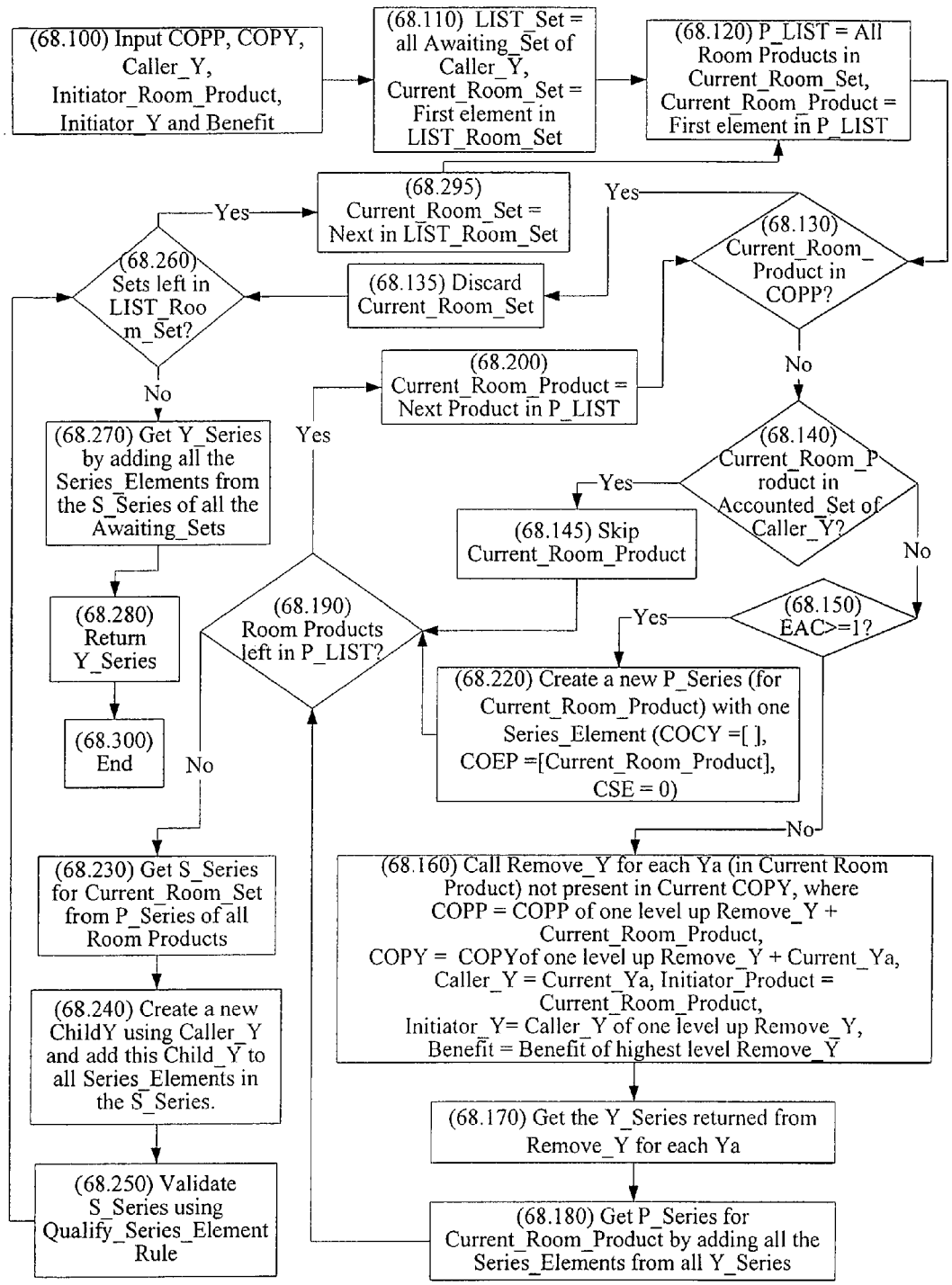
FIG. 68 is a flowchart that expands Act 150 of FIG. 67, provides an algorithmic illustration for the Remove_Y algorithm.

The following algorithm presents an example of an algorithm that may be used to create one unit of capacity of a Room Product by shifting a Ya Accounted in a Room Product to its Awaiting_Set. FIG. 68 represents an algorithmic illustration for Remove_Y. The Remove_Y is a recursive algorithm, which returns a collection of Series_Element termed "Y_Series" collection for the Ya for which the algorithm has been called.

In Act 68.100, a set of parameters including COPY, COPP, Caller_Y, Initiator_Room_Product, Initiator_Y and Benefit are input to the system. Next, in Act 68.110, all the Awaiting_Sets of the Caller_Y are added to a list termed LIST_Room_Set. The first element in the LIST_Room_Set list is designated as Current_Room_Set. Next, in Act 68.120, all the Room Products that belong to the Current_Room_Set are added to another list termed P_LIST. The first element in the P_LIST list is designated as Current_Room_Product.

Next, in Act 68.130, a test is performed to determine whether the Current_Room_Product is present in the COPP. If so, the Current_Room_Set is discarded in Act 68.135, and control goes to Act 68.260. If not, control goes to Act 68.140.

In Act 68.140, another test is performed to determine whether the Current_Room_Product is present in the Accounted_Set of the Caller_Y. If so, the Current_Room_Product is skipped in Act 68.145, and control then goes to Act 68.190. If not, control goes to Act 68.150, where another test is performed to determine if the EAC of the Current_Room_Product is greater than or equal to 1. If so, control goes to Act 68.220. If not, control goes to Act 68.160.

In Act 68.220, a new P_Series collection is created with only one Series_Element, since the Current_Room_Product is an End_Room_Product. The Series_Element will comprise COEP with the Current_Room_Product as the only element, COCY with no elements and CSE with zero value. Next, control goes to Act 68.190.

In Act 68.160, the algorithm enters into a recursive loop where the Remove_Y algorithm is called for each of the Ya in the Current_Room_Product that is not present in the COPY. Each of the Ya becomes Current_Ya for the corresponding Remove_Y call. The necessary input parameters for each of the Remove_Y includes 'COPP' (includes the COPP of one level up Remove_Y and the Current_Room_Product), 'COPY' (includes the COPY of one level up Remove_Y and the Current_Ya), the Current_Ya as 'Caller_Y', the Current_Room_Product as 'Initiator_Room_Product', Caller_Y of one level up Remove_Y as 'Initiator_Y' and benefit of the highest level Remove_Y as 'Benefit'. Each of the Remove_Y call returns a Y_Series collection for every Ya for which Remove_Y was called.

Next, in Act 68.170, the algorithm receives the returned Y_Series collection from all the Remove_Y algorithm calls in Act 68.160. Control then goes to Act 68.180, where a P_Series collection for the Current_Room_Product is calculated by adding all the Series_Elements from all the returned Y_Series collection obtained in Act 68.170. Control then goes to Act 68.190.

In Act 68.190, a test is performed to determine whether more Room Products are left in the P_LIST list. If so, control branches out to Act 68.200, where the next Room Products in the P_LIST list is designated as the Current_Room_Product, and control then goes to Act 68.130 where the process is repeated for the new Current_Room_Product. If not, control goes to Act 68.230.

In Act 68.230, the S_Series collection is calculated for the Current_Room_Set by combining and merging all the P_Series collection of all the Room Products (not taking the skipped Room Product(s) into consideration, if any). Next, in Act 68.240, a new ChildY is created using the Caller_Y. The ChildY comprises COI (where the current Initiator_Room_Product is designated as Initiator_Room_Product and the current Initiator_Y is designated as Initiator_Y), Accounted_Set of the Caller_Y designated as the Initial_Accounted_Set, current Awaiting_Set designated as the Final_Accounted_Set, and the cost to shift current Caller_Y from the Initial_Accounted_Set to the Final_Accounted_Set designated as the CCY. The ChildY, thus created, is added to every Series_Element in the S_Series collection and the CCY of the same ChildY is added to the CSE (Cost of Series_Element) of every Series_Element. Control then goes to Act 68.250.

In Act 68.250, a Qualify_Series_Element rule is read from the hotel's database and is applied to validate all the Series_Elements in the S_Series collection. The invalid Series_Elements are discarded from the S_Series collection. A hotel may select any rule of its choosing. For example, a Qualify_Series_Element rule may only qualify those Series_Elements for which the CSE is less than or equal to the 'Benefit'. Next, control goes to Act 68.260.

In Act 68.260, a test is performed to determine whether more Room Sets are left in the LIST_Room_Set list. If so, control branches out to Act 68.295, where the next element in the LIST_Room_Set list is designated as the Current_Room_Set, and then control loops back to Act 68.120, where the process is repeated for the new Current_Room_Set. If not, control goes to Act 68.270, where the Y_Series collection is obtained by adding all the Series_Elements of all the S_Series collections for all the Awaiting_Sets of the Caller_Y. Next, the Y_Series collection is returned in Act 68.280, and the algorithm ends in Box 68.300.

Combinations of P_Series in order to formulate S_Series are calculated by cross multiplication of Series_Elements (of each P_Series). A hotel may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, C1 $\{S_1[1], S_2[1], S_3[1], \ldots S_n[1]\}$, where, $S_p[1]$ denotes the first Series_Element of $p^{th}$ Series; C2=$\{S_1[2], S_2[1], S_3[1], \ldots S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1=$\{A1, B1\}$, C2=$\{A1, B2\}$, C3=$\{A1, B3\}$, C4=$\{A2, B1\}$, C5=$\{A2, B2\}$ and C6=$\{A2, B3\}$. The above method of making combinations may also be used when making combinations of Y_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various Room Products involved. A given unit of Room Product capacity at any given point must only be accounted for one customer, otherwise, it may lead to a shortage situation, where one Room Product is allocated to more than one customer leading to dissatisfaction for customers. A hotel may choose any method of its choosing to perform merging of Series_Elements, and specifically to perform merging of two Series_Elements. The method of merging chosen may affect the total value realized. One example of such a method is given. In one approach, a hotel may choose to discard all merged Series_Elements that have either one or more common ChildY or common End_Room_Product. A common ChildY in two Series_Elements suggest that in both Series_Elements shifting of one specific Ya is needed. If each Series_Element requires shifting of Ya to two different Room Sets, it may present a contradictory situation. Similarly, a common End_Room_Product in two or more Series_Elements (that are to be merged together) may require to shift more than one Ya customer to a specific Room Product, which may or may not be feasible depending on the AC (and EAC) of that Room Product. Thus, a common End_Room_Product may also represent one or more contradictory or invalid situations.

A hotel may use any set of rules to validate or invalidate one or more constituents of any of the merged components. For example, a merged Series_Element, M, obtained from merging of two Series_Elements S1 and S2, may comprise the COEP (addition of COEP of S1 and S2), COCY (addition of COCY of S1 and S2) and CSE (addition of CSE of S1 and S2).

Remove_Y and Buy_N processes may generate value for the hotel, an entity other than the hotel, customers and/or any combination thereof. The value may include, but is not limited to cost savings for the hotel, an entity other than said hotel, any combination thereof. The value generated may also include, but is not limited to, soft value, value attributable to customer goodwill, satisfaction and loyalty. The value so generated may optimize revenue of at least one entity other than said hotel.

Customer Notification Process

In the customer notification (CN) process, a decision for the Chosen Room is notified to the customer. As mentioned earlier, the Chosen Room may be defined by the hotel, the customer, another entity or any combination thereof. However, the hotel may want to keep the right to select (or define) the Chosen Room in the FRO VOF. A hotel may use any method of its choosing to define the Chosen Room. A hotel may use a software application built on the method defined above to optimally define the Chosen Room to FRO customer.

Figure 69:
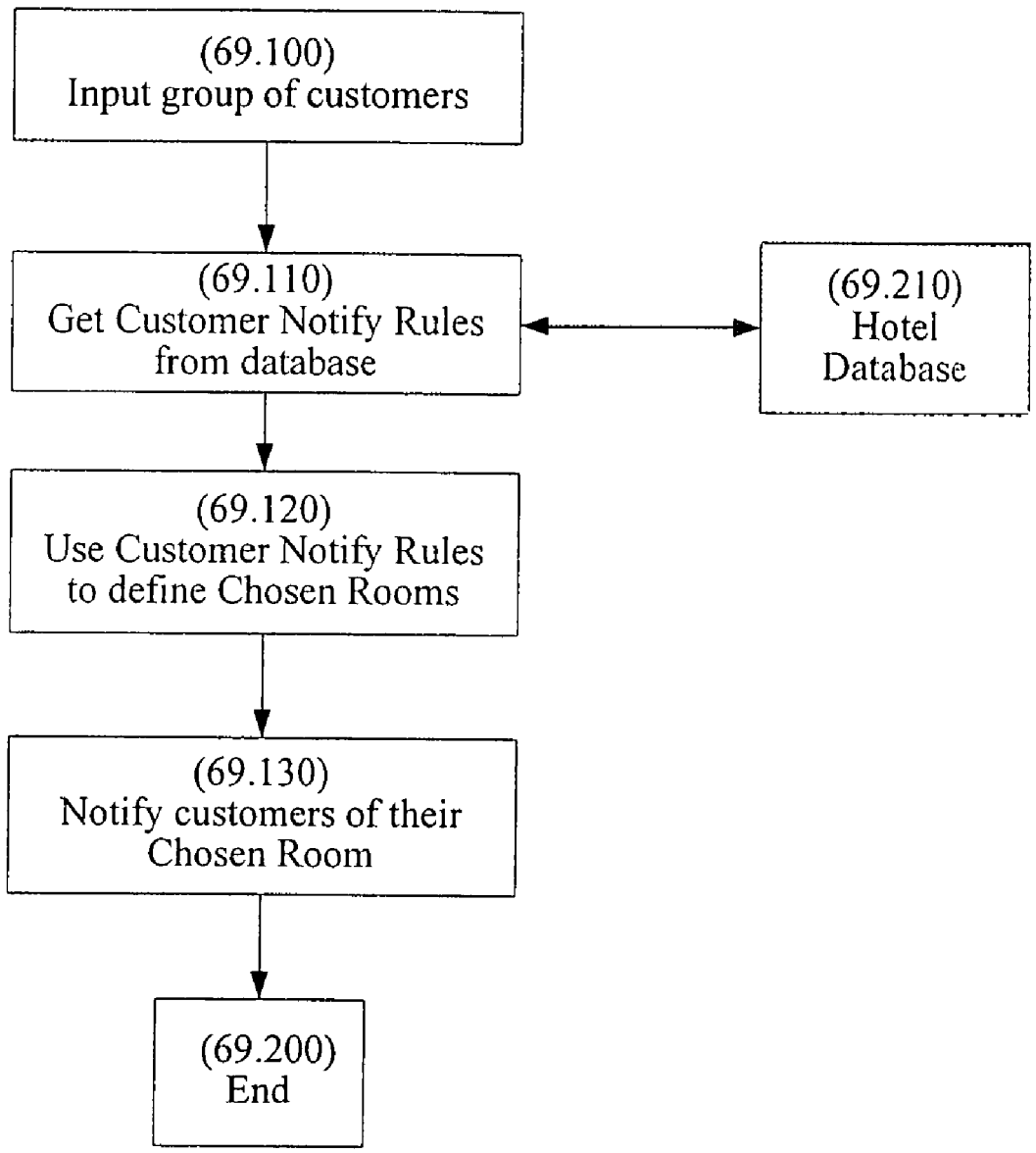
FIG. 69 is a flow chart illustrating an example of an algorithm of Customer Notification process in the hotel industry.

FIG. 69 displays an example of an algorithm that may be used to execute the Customer Notification process. In Act 69.100, a group of (one or more) customers is taken as input. Next, in Act 69.110, a set of one or more Customer Notify Rules may be used to define the Chosen Room. A hotel may choose any Customer Notify Rule of its choosing. The Customer Notify Rules may depend upon expected value of the Room Product, expected sales volume and so forth. For example, a hotel may choose a Customer Notify Rule, which selects the Room Product with the higher value as the Chosen Room. Alternatively, a rule may be chosen which selects the Room Product with the lower value as the Chosen Room. While defining the Chosen Room, a hotel may also want to use the Remove_Y algorithm (as used in the Buy_N process given above) to determine the optimal Chosen Room that satisfies a pre-determined goal. Thus, during the CN process, one or more Ya may be shifted in the process of selecting the optimal Chosen Room. A Customer Notify Rule may also select the Room Product with the higher sales volume as the Chosen Room. A Customer Notify Rule may specify that if FRO VOF is used in conjunction with any other VOF (such as APO VOF and so on), then the Grouping Rules (defined later) may govern the selection of the Chosen Room.

Next, in Act 69.120, the Customer Notify Rules, thus obtained from the hotels database, are used to define Chosen Rooms(s). Next, in Act 69.130, the customers are notified about their Chosen Room(s), and the algorithm then ends in Box 69.200.

Implementation of FRO VOF in Conjunction with Other VOFs

FRO VOF may be used in conjunction with one or more other VOFs, for example, the ARO (the Alternate Room Option) VOF. A customer who receives an ARO is termed "A" type of customer. A hotel may form a group of one or more ARO customers and one or more FRO customers, where the options (ARO and FRO) obtained by the group members are complimentary in nature. As an example, consider an A customer who bought an ARO to choose either of R1 and R2 as the Chosen Room, and consider a Y customer who received a FRO and is flexible to take any of R1 and R2 as the Chosen Room. Thus, if A decides to choose R1 as the Chosen Room, the hotel may assign R2 as the Chosen Room for Y, and vice versa. The customers A and Y have taken complimentary options and may form a group. The hotel may need to hold only one unit of inventory in R1 and R2 to satisfy the needs of both A and Y (assuming each A and Y only need one unit of Room Product). Such a combination of complimentary options or VOFs may improve efficiency and concurrently enhance value for all the parties involved (in the context of the current example, enhance value for A, Y and the hotel).

The implementation of the grouping of A type and Y type of customers may be done in one or more ways. One way to implement such grouping is to first have one or more Y type of customers and based on such customer(s), the hotel may offer complimentary AROs to customers to make groups. In another implementation, the hotel may first offer ARO and based on such ARO customer(s), hotel offers complimentary FRO to the customers to make groups. In yet another implementation, the hotel may offer ARO and FRO separately and then define a process to make complimentary groups of A and Y customers (such groups termed "AY_Groups").

A hotel may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an ARO to choose either of R1 and R3 as the Chosen Room, a Y1 customer who received a FRO and is flexible to take any of R1 and R2 as the Chosen Room and a Y2 customer who has also received a FRO and is flexible to take any of R2 and R3 as the Chosen Room. A notation A-Y1-Y2 represents this example. Thus, if A decides to choose R1 as the Chosen Room, the hotel may assign R2 as the Chosen Room for Y1 and R3 as the Chosen Room for Y2. Alternatively, if A decides to choose R3 as the Chosen Room, the hotel may assign R1 and R2 as the Chosen Rooms for Y1 and Y2, respectively.

It is assumed that a "unit" represents one unit of Room Product (or Room Product capacity) and each customer needs only one unit of a Room Product. Continuing with the above example, if the hotel were to not consider the complimentary nature of options obtained by A, Y1 and Y2 customers, the hotel may need to hold (or block) a total of 4 units of capacity to ensure complete satisfaction of needs of A, Y1 and Y2, i.e., 2 units for A (1 unit each of R1 and R3 as A could choose any Room Product), 1 unit for Y1 (of either R1 or R2) and 1 unit for Y2 (of either R2 or R3). This implies, to satisfy a total need of 3 units of Room Products, the hotel may need to hold (or block) 4 units of Room Product capacity, creating a redundant capacity of 1 unit that the hotel may not be able to use otherwise. By creating a complimentary group of A-Y1-Y2, the hotel needs to only hold (or block) 3 units of capacity (1 unit each in R1, R2 and R3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A hotel may choose to implement grouping at various Room levels such as Room Product, Room Set and Room Order. A hotel may also change terms and conditions of one or more option contracts of one or more FRO and/or ARO customers (for e.g., price, notify deadline and so on) to solicit customer participation in FRO/ARO to create more AY_Groups. The hotel may also offer incentives to customers to choose complimentary FRO/ARO offerings to enable the hotel to create more AY_Groups. The implementation methods mentioned above for grouping are for illustration purposes only and a hotel may choose to implement grouping in one or more other ways or by combining above said methods or by combining one or more other ways along with one or more above said methods.

Figure 70:
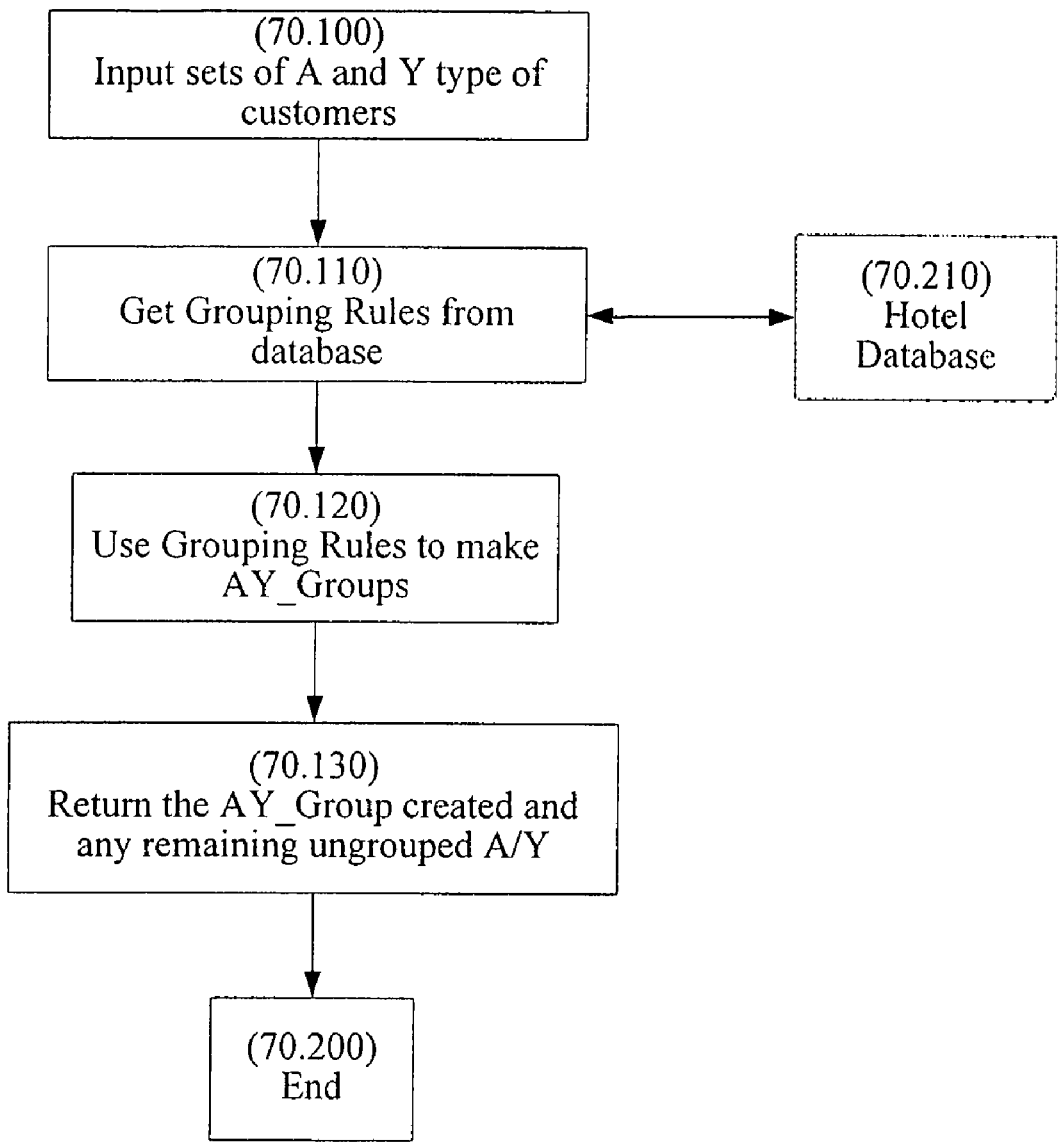
FIG. 70 is a flowchart illustrating an example of an algorithm to implement grouping of A and Y type of customers in the hotel industry.

FIG. 70 displays a flow chart that illustrates one way of implementing grouping of A and Y type of customers. In Act 70.100, sets of A and Y customers are taken as input. Next, in Act 70.110, a set of one or more Grouping Rules is read from the hotels database (70.210). A grouping rule may depend upon the number of A and/or Y type of customers, desired capacity redundancy in the system, the permissible time factor to create AY_Groups, any other rule of hotel choosing, any combination thereof and so on. For example, a hotel may choose a Grouping Rule whereby new groups are created by first ungrouping one or more of the AY_Groups (created earlier but unexercised, for example, groups for which the customer has not been notified, or if notified, the customer has not utilized the Room Product and the terms of option contract allows for a change in the Chosen Room). A Grouping Rule may create groups of only those A and Y type of customers who have yet to be grouped and discarding all A/Y customers, which have already been grouped. A hotel may implement any Grouping Rule to formulate AY_Groups. The choice to Grouping rules may enhance the overall value for the hotel (for example, reduce the total capacity required to satisfy accommodation needs for all A and Y customers). Theoretically, the number of units of the Room Products required (or blocked) should be equal to the number of customers reserving the Room Product (assuming each customer wants one unit of Room Product). Thus, by implementing the grouping and with the help of appropriate Grouping Rules, the hotel may attempt to achieve such theoretical minima.

Next, in Act 70.120, the Grouping Rules, so obtained from the hotels database, are used to make AY_Groups. Next, in Act 70.130, the AY_Groups so created are returned along with ungrouped A/Y, if any, and the process then ends in Box 70.200.

The grouping may enhance customers' experience, and may comprise operating a system that delivers a FRO to at least a "first customer" to utilize up to n of m selected Room Products for said first customer, and n is less than or equal to m; operating a system that delivers an ARO to at least a "second customer" to utilize up to k of p selected Room Products, and k is less than or equal to p; operating a system to define each of the k chosen Room Products, whereby after each of the k chosen Room Products is defined, said second customer can utilize said chosen Room Product; operating a system wherein a hotel defines t chosen Room Product(s) for said first customer after each of said k chosen Room Products is defined, wherein after each of said t Room Products is defined, said first customer can utilize said defined Room Product, where t is less than or equal to n. Said t Room Products may be a subset of n Room Products, m Room Products or both. Said t Room Products or n Room Products or both may also include one or more Room Products not included in said m selected Room products. Similarly, k Room Products may be a subset of p Room Products, or may include one or more Room Products other than said p Room Products. The grouping may be performed for a multiplicity of at least one of said first or second customers and may combine together at least one of each of said first and second customers to formulate at least one group with at least one complementary set of options. The grouping may enable a hotel, an entity other than the hotel and/or any combination thereof to utilize at least one of said m or p Room Products at least after delivery of any of said first or second options. The hotel and/or an entity other than the hotel may implement FRO VOF where in the first and/or second customer in said grouping may be same. The notification conditions may be different, same or any combination thereof for the first and second option.

Said first and/or second option may or may not include any notification deadline condition. The hotel, the second customer, an entity other than said hotel and/or any combination thereof may define, at one or more times, at least one of said k Chosen Rooms. The hotel, the first customer, an entity other than said hotel and/or any combination thereof may define, at one or more times, at least one of said p Chosen Rooms. The first customer may select, at one or more times, at least one of said m Rooms. The second customer may select, at one or more times, at least one of said p Rooms. The hotel and/or an entity other than the hotel may receive from at least one of said first or second customer, at one or more times, an indication of one or more terms and conditions associated with said first or second options, respectively. Similarly, at least one of said hotel and/or an entity other than said hotel may deliver to at least one of said first or second customers, at one or more times, one or more terms and conditions associated with said first or second option, respectively. There may or may not be any payment transaction between the hotel, an entity other than the hotel, and at least one of said first and/or second customer.

The FRO VOF may be used in conjunction with one or more other VOFs, for example, the URO VOF. A customer who received a URO is termed "U" type of customer. A hotel may form a group of one or more URO customers and one or more FRO customers, where the options (URO and FRO) obtained by the group members are complementary in nature.

The implementation of the grouping of Y type and U type of customers may be done in one or more ways. One way to implement such grouping is to first offer and secure one or more Y type of customers and based on such customer(s), the hotel may offer complimentary UROs to other customers to make groups. In another implementation, the hotel may first offer and secure URO and based on such FRO customer(s), hotel offers complimentary FRO to other customers to make groups. In yet another implementation, the hotel may offer URO and FRO separately and then define a process to make complimentary groups of U and Y customers (such groups termed "UY_Groups").

A hotel may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(R1, R3), U1[up(R2), base(R3)] and U2[up(R1), base(R2)]. The notation Y(R1, R3) implies a customer Y who has received a FRO and is flexible to have either R1 or R2 as the Chosen Room. The notation U1[up(R2), base(R3)] implies a customer U1 who received a URO and wishes to get an upgrade from R3 (i.e., the base room) to R2 (i.e., the up room), and U2[up(R1), base(R2)] implies a customer U2 who received a URO and wishes to get an upgrade from R2 (i.e., the base room) to R1 (i.e., the up room). A notation Y-U1-U2 represents this example. Thus, there are three rooms R1, R2, and R3 and they are occupied by Y, U2, and U1 respectively. The three customers have different value needs. The customer Y is flexible on either R1 or R3 if he/she receives a desired reward for trading-in his/her flexibility. The customer U1 has a base room R3 and wishes to get R2 as the Up Room. If a hotel is able to upgrade U1 from R3 to R2, it may generate incremental value for both the customer and the hotel. But in the existing framework (i.e., without using conjunction of more than one VOFs), the hotel may not be able to achieve this without an available capacity on room R2. Similarly, U2 has a base room R2 and wishes to get R1 as the Up Room. A hotel may customize the desired values for the three customers by leveraging on Y's flexibility and upgrading U1 and U2. The hotel may assign R3 as Chosen Room to Y, upgrade U2 from R2 to R1, and upgrade U1 from R3 to R2. The hotel may be able to generate customer surpluses in the process of U1 and U2 upgrades, which would not have been possible normally. Thus, a hotel may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the hotel).

It is assumed that a "unit" represents one room (or room capacity) and each customer needs only one room. Continuing with the above example, if the hotel were to not consider the complimentary nature of options obtained by Y, U1 and U2 customers, the hotel may need to hold (or block) more than 3 units of capacity to ensure complete satisfaction of needs of Y, U1 and U2. This implies, to satisfy a total need of 3 rooms, the hotel may need to hold (or block) more than 3 rooms, creating a redundant capacity of at least one room that the hotel may not be able to use otherwise. By creating a complimentary group of Y-U1-U2, the hotel does not need to hold any capacity, thus freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

A hotel may choose to implement grouping at various levels. A hotel may also change terms and conditions of one or more option contracts of one or more URO and/or FRO customers (for e.g., price, notify deadline and so on) to solicit customer participation in URO/FRO to create more UY_Groups. The hotel may also offer incentives to customers to choose complimentary URO/FRO offerings to enable the hotel to create more UY_Groups. The implementation methods mentioned above for grouping are for illustration purposes only and a hotel may choose to implement grouping in one or more other ways or by combining above said methods or by combining one or more other ways along with one or more above said methods.

Figure 71:
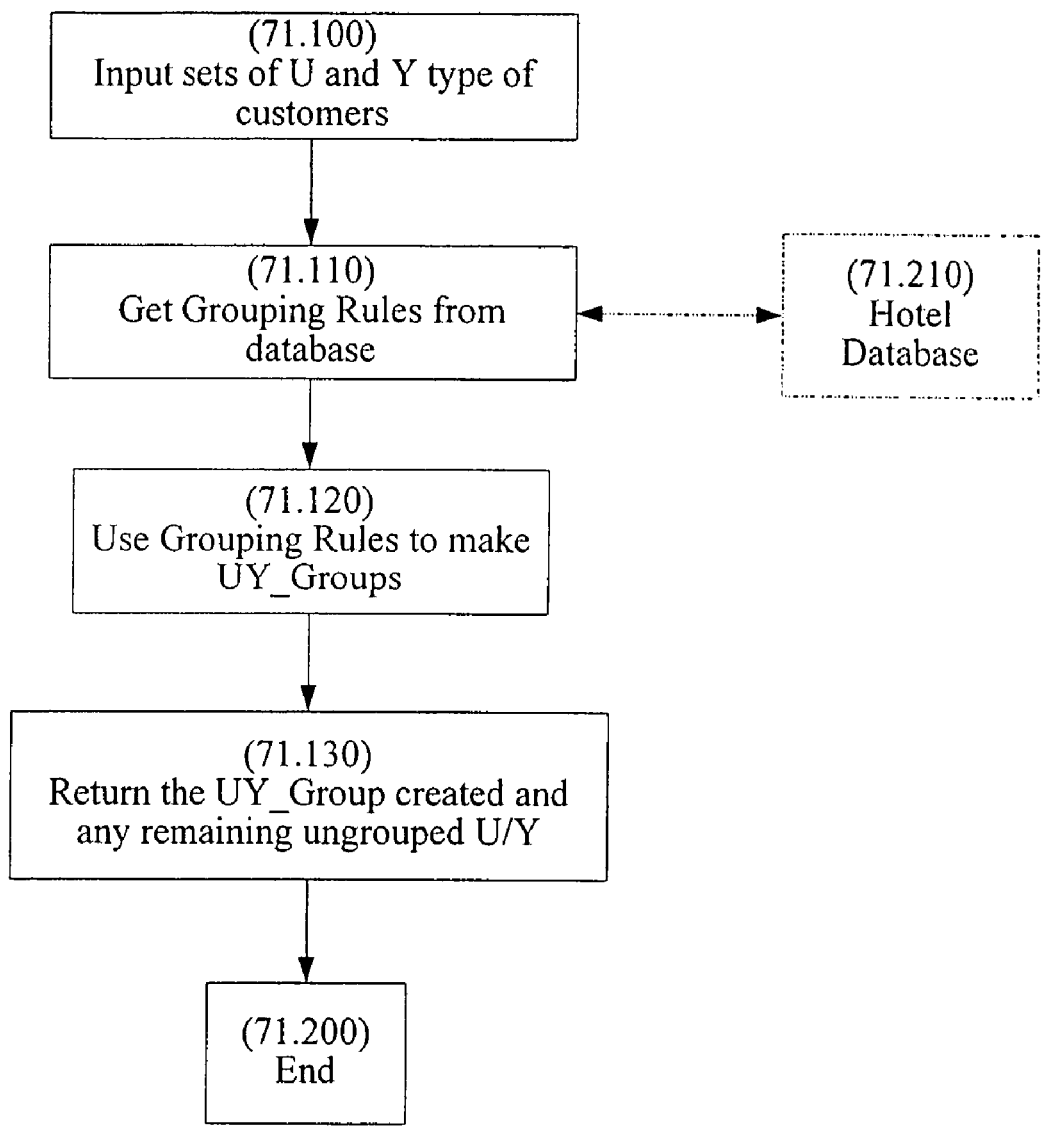
FIG. 71 is a flowchart illustrating an example of an algorithm to implement grouping of U and Y type of customers in the hotel industry.

FIG. 71 displays a flow chart that illustrates one way of implementing grouping of U and Y type of customers. In Act 71.100, sets of U and Y customers are taken as input. Next, in Act 71.110, a set of one or more Grouping Rules is read from the hotel's database (71.210). A grouping rule may depend upon the number of U and/or Y type of customers, desired capacity redundancy in the system, the permissible time factor to create UY_Groups, any other rule of hotel choosing, any combination thereof and so on. For example, a hotel may choose a Grouping Rule whereby new groups are created by first ungrouping one or more of the UY_Groups (created earlier but unexercised, for example, groups for which the customer has not been notified, or if notified, the customer has not utilized the room and the terms of option contract allows a change in the Chosen Room). In another example, a Grouping Rule may create groups of only those U and Y type of customers who are yet to be grouped and discarding all U/Y customers, which have already been grouped. A hotel may implement any Grouping Rule to formulate UY_Groups. The choice to Grouping rules may enhance the overall value for the hotel (for example, reduce the total capacity required to satisfy room needs for all U and Y customers). Theoretically, the number of units of the room required (or blocked) should be equal to the number of units the customers shall be eventually utilizing. Thus, by implementing the grouping and with the help of appropriate Grouping Rules, the hotel may attempt to achieve such theoretical minima.

Next, in Act 71.120, the Grouping Rules, so obtained from the hotel's database, are used to make UY_Groups. Next, in Act 71.130, the UY_Groups so created are returned along with ungrouped U/Y, if any, and the process then ends in Box 71.200.

The grouping may enhance customers' experience, and may comprise operating a system that delivers a URO to at least a "first customer" to utilize up to n of m selected rooms for said first customer, and n is less than or equal to m; operating a system that delivers a FRO to at least a "second customer" to utilize up to k of p selected rooms, and k is less than or equal to p; operating a system to define each of the k Chosen Rooms, whereby after each of the k Chosen Rooms is defined, said "second customer" can utilize said Chosen Room; operating a system wherein a hotel defines t Chosen Room(s) for said "first customer" after each of said k Chosen Rooms is defined, wherein after each of said t rooms is defined, said first customer can utilize said defined room, where t is less than or equal to n. Said t rooms may be a subset of n rooms, m rooms or both. Said t rooms or n rooms or both may also include one or more rooms not included in said m selected rooms. Similarly, k rooms may be a subset of p rooms, or may include one or more rooms other than said p rooms. The grouping may be performed for a multiplicity of at least one of said first or second customers and may combine together at least one of each of said first and second customers to formulate at least one group with at least one complementary set of options. The grouping may enable a hotel, an entity other than the hotel and/or any combination thereof to utilize at least one of said m or p rooms at least after delivery of any of said first or second options. The hotel and/or an entity other than the hotel may implement FRO VOF where in the first and/or second customer in said grouping may be same. The notification conditions may be different, same or any combination thereof for the first and second option.

Said first and/or second option may or may not include any notification deadline condition. The hotel, the second customer, an entity other than said hotel and/or any combination thereof may define, at one or more times, at least one of said k Chosen Rooms. The hotel, the first customer, an entity other than said hotel and/or any combination thereof may define, at one or more times, at least one of said p Chosen Rooms. The first customer may select, at one or more times, at least one of said m Rooms. The second customer may select, at one or more times, at least one of said p Rooms. The hotel and/or an entity other than the hotel may receive from at least one of said first or second customer, at one or more times, an indication of one or more terms and conditions associated with said first or second options, respectively. Similarly, at least one of said hotel and/or an entity other than said hotel may deliver to at least one of said first or second customers, at one or more times, one or more terms and conditions associated with said first or second option, respectively. There may or may not be any payment transaction between the hotel, an entity other than the hotel, and at least one of said first and/or second customer.

Business Model to Implement FRO in the Hotel Industry

As discussed above, different business models may be used to implement a FRO VOF. The business models mentioned below, without limitation, can be used to implement the FRO VOF in the hotel industry. A hotel may choose to implement a FRO VOF individually or in conjunction with one or more partners and/or other companies.

As explained in the sections above, for example, an entity may use the allocated Rooms to offer FRO to customers and/or to sell the Rooms as regular Rooms. The allocation of Rooms may be conditional. For example, one of the conditions may require a return of at least one allocated Room within a specified time period and/or other consideration(s).

The customer may select or purchase one or more Room from the hotel and/or said entity and then interact with said entity to receive one or more FRO Rooms in relation to said (already purchased) Rooms. Said entity may also receive Room allocation from more than one hotel, and thus, offer Rooms from multiple hotels to a single customer during the Initial Transaction for FRO.

The OA may use those Rooms and operate a service to offer FRO to the customers. As explained above in FIG. 13A, a customer may select one or more Rooms from the OA, and then receive FRO on those selected Rooms from the OA. Another approach would be for a customer to select one or more Rooms from the hotel and then receive FRO on those selected Rooms from the OA. In another example, a customer may select one or more Rooms from both the hotel and the OA, and then receive the FRO option on those selected Rooms from the OA. It is also possible that the customer receives FRO from the hotel or both from the hotel and the OA on a given set of selected Rooms.

The OA and the hotel may simultaneously offer FRO to the hotel customers, i.e., a customer may either approach the hotel or the OA to receive FRO on desired hotels. In another model, the OA may operate as the sole provider of FRO to all the customers of a hotel. In yet another model, the OA and the hotel may choose to work together and jointly offer FRO to the customers. The OA or the hotel may offer FRO to customers using either or both of the Sequential or the Concurrent Get FRO processes.

As explained in FIG. 13A above, an OA may be able to offer FRO on Rooms from one or multiple hotels. An OA may receive allocation of Rooms from two or more hotels. A customer may purchase one or more Rooms from one or more hotels and/or from the OA, and then receive FRO on those selected Rooms from the OA. Even if the OA may not be entitled to or does not receive Room allocation from a hotel, it may still be able to formulate an agreement with one or more hotels to offer FRO on the Rooms of said hotels. Thus, a customer may be able to receive FRO on Room Products from multiple hotels, giving the customer more value to trade-in their accommodation flexibility and variety to choose from. For example, a customer may receive FRO on two Room Products from two different hotels, and the OA and/or any one or all of the hotels will then notify the customer about the Chosen Room within the terms and conditions of the option contract. An OA may be able to thus create a multi-hotel FRO VOF Framework, which may tremendously enhance the value to the customers. All the participating hotels that allocate Rooms to and/or partner with the OA to offer FRO may also gain from the FRO network (benefits include reduced revenue spill, higher revenues from selling the FRO Rooms at higher prices, and/or to sell FRO on those Rooms, enhanced overall customer satisfaction and/or other operational benefits). Either or both of the OA and the hotel may process the reservation for the Chosen Rooms associated with FRO received by the customer. A customer may receive reservation from the OA or the hotel for the Rooms related to the FRO grant. An entity (the OA and the hotel) may process reservation for the Rooms offered only by that entity or by either of the two entities.

The OA and the hotel may engage in a business agreement to implement the FRO program. The business agreement may divide the total benefit generated by the FRO program between the two parties using any mechanism or criteria as desired. The total FRO Revenue Benefit may be shared between the two parties. The hotel may allocate Rooms to the OA. One or more hotels may allocate only a part of or their entire Room inventory to the OA to offer those Rooms to the customers by way of regular and/or FRO Rooms. The OA may offer those Rooms as FRO Rooms to customers. In return, the OA may offer some revenue or fee to the hotel for all or a portion of the Rooms allocated. This fee may be given only for the Rooms that the OA is able to utilize or for all the allocated Rooms. The lending fee may be a lump sum amount, may depend upon the number of Rooms allocated or may depend on one or more factors as desired. The agreement may include a provision where the OA may return the allocated Rooms back to the hotel at a certain time and date. There may be one or more conditions associated with the return of unused FRO Rooms and/or Rooms from the Released Rooms, including, but not limited to, returning the same Room, returning a higher value Room and so on. The hotel may allot OA at least one Room and said OA may deliver FRO on at least one of said allocated Rooms. The OA may or may not enter into an agreement with the hotel to provide such option on its Rooms. The OA may sell back at least one allocated Rooms to said hotel or to at least one entity other than the hotel or both.

An OA may offer a hotel, flexible customer inventory (generated from FRO) at one or more terms and conditions. The hotel may be able to use this flexibility to generate benefit from one or more ways, such as the Buy_N process, reducing operational costs and so forth. Some of these examples have been explained earlier.

An OA may formulate an agreement with one or more hotels on one or more VOFs, such as on both APO and FRO VOFs, to offer a combination of VOFs to customers.

The FRO VOF may include different conditions regarding the payment of prices related to the FRO. For example, a customer may receive FRO Price only from the hotel even if he/she is receiving Rooms and/or options from the OA. Similarly, the customer may receive FRO Price only from the OA even if he or she selected the Rooms and/or received the options from the hotel. The condition may also be set for a customer to make one or more payments to the hotel for the Rooms and receive one or more payments from the hotel for the options received from that hotel, and to make one or more payments to the OA for the Rooms and receive one or more payments from the OA for the options received from that OA. The condition may allow the customer to receive partial payments from the hotel and the rest from the OA or vice versa, the basis of which distribution may depend upon various factors, including, but are not limited to, the factors of hotels choosing, the arrangement between the OA and the hotel and so on. In another example, the customer may receive the FRO Price from the third party or may receive FRO Price from any of the combination of the entities mentioned above.

Information Technology System for FRO

A client-server architecture may be used to implement the FRO VOF. However, a hotel may use a computer hardware and software infrastructure of its choosing to implement a FRO VOF.

The FRO VOF may be best implemented using one or more computer-implemented methods to operate a computer-implemented service to offer FRO to the customers, that includes, but not limited to, recording the information pertaining to the offered and/or used FRO in a database. It may also include operating a computer-implemented service (and/or system) or other service (and/or system) to define the Chosen Rooms, and recording said Chosen Rooms (or defined Room Products) and all the Room Products related to a FRO in a database.

For the stage one (i.e., to formulate the FRO VOF), an application server may be used along with a database (e.g., a relational database) that stores all the information relevant to the hotel and the customer. The database may include all the relevant information sufficient to identify Rooms the hotel chooses to make eligible for FRO. One or more users (e.g., a business analyst or manager) may have full access to this server through Intranet or highly secured VPN environment to design an optimal value option framework. The database shall also store all the information pertaining to all the acts (in stage one) used by the hotel while formulating the FRO VOF.

A similar or a different application server and/or a cluster of application servers (functioning concurrently) along with one or more web servers and a set of one or more database servers may be used for the Get FRO as explained in FIG. 13D above and CN (Customer Notification) processes in the stage two of the FRO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get FRO process and the Event Optimizer processes may be computer-implemented as explained and discussed above in FIGS. 13D and 13E. All the customer interactions and the related information such as customer needs, inputs, payment transactions etc. are stored in this database, including information pertaining to the interactions with those customers who may not receive FRO. The systems for stage two and stage one should be maintained in a synchronized environment so that each system has access to the most current information and can communicate with each other.

As discussed above, there may be other ways for implementing the FRO VOF which may depend upon including, but not limited to, the scale of the implementation, business requirements and number of entities involved. The entities may interact through a series of hardware products and services with the OA/hotel server(s). The OA may or may not be different than the hotel and the OA server may be the same as that of the hotel server. The information technology and network system to implement FRO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, a hotel may have one or more separate temporary database structure wherein the entries are updated and stored until the final update is made in one or more main databases. One the final update is done, the entries in these temporary databases may be removed.

The entire system may run at the premises of OA, hotel and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of hotel's choice, ease of accessibility, infrastructure facilities. The structure or the interaction architecture of the system may vary depending on factors including, but not limited to, the set up of the hotel, changes in the technology and with the introduction of new and better technology enhancing the interaction process.

A customer may interact with either one or more of the Get FRO, Buy_N, the CN processes either directly or indirectly using a local or a remote terminal (e.g., a computer with a browser and an access to the Internet) that is able to access the web server(s) that host the Get FRO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the hotel, an OA, a third party service provider or any combination of the above. In the model, where the OA receives Room allocation from the hotel and offers FRO to the customers directly, the web server, application server and database for both stage one and stage two shall be managed by the OA. The OA may also have partial (or complete) access to the hotel database and systems through a highly secured environment (for example, a virtual private network). In the model, when an OA and a hotel tie-up together to offer FRO, all the computer hardware and software infrastructure for both stage one and stage two may be hosted by and/or property of either or both (mutually) of the sides depending upon the business agreement between them.

Each hotel using the system and method taught herein can make its own choices as to how extensively to deploy the method. For example, a hotel can implement as few or as many of the foregoing options as it desires; or it may perceive and implement one or more other options.

Flexibility Reward Option (FRO) Value Option Framework in Car Rental Industry

As explained above, FRO VOF can be implemented in any industry. The implementation of FRO VOF in car rental industry is discussed herein. Within the car rental industry, the customer desire to trade-in travel flexibility (defined below) is used as the targeted value element. A detailed demonstration of the FRO VOF is presented followed by a few examples of applying the FRO VOF within the car rental industry.

The first stage in the FRO VOF involves steps (or acts) of: capturing customer dynamics, assessing car rental company operations and economic factors, integrating customer dynamics with car rental company economic factors, formulating the VOF and optimizing the VOF. The second stage involves carrying out a dynamic interaction with the customer and then executing an Event Optimizer process. The specific detailed steps with respect to the FRO VOF in the car rental industry will now be discussed.

Figure 72:
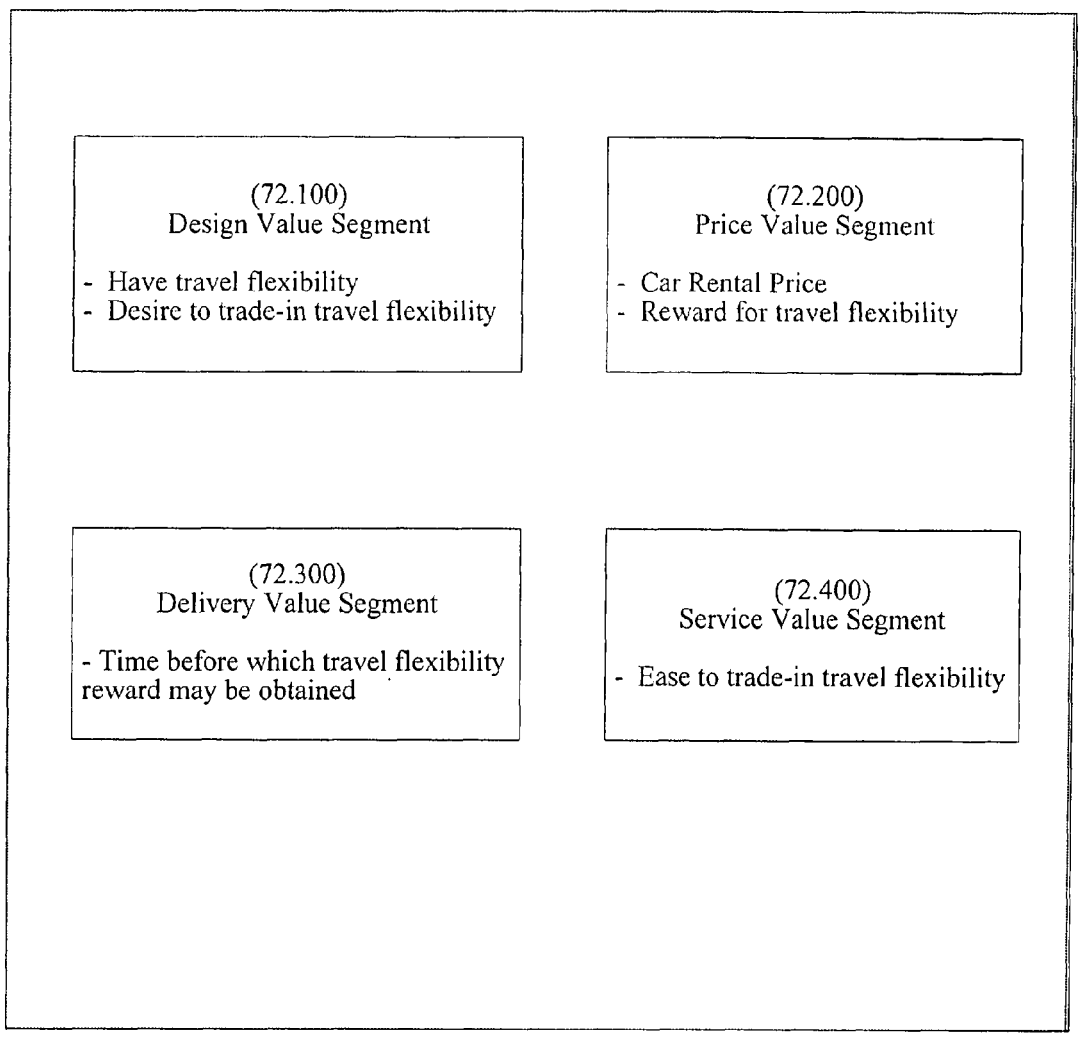
FIG. 72 is a diagrammatic illustration of an exemplary set of value segments and their value elements related to the FRO VOF in context of the car rental industry.

First Stage Formulation of FRO Value Option Framework (1) Capturing Customer Dynamics FIG. 72 shows an analysis of the value elements that are believed to matter to customers in relation to a FRO in context of car rental company. In the design value segment, shown in Box 72.100, important value elements may include, but are not limited to, the customers' flexibility in travel and their desire to trade-in their travel flexibility. In the price value segment, shown in Box 72.200, important value elements may include, but are not limited to, Car Rental Price and desired monetary/non-monetary reward to trade-in travel flexibility. In the delivery value segment, shown in Box 72.300, important value elements may include, but are not limited to, time before which a customer may be able to trade-in his or her travel flexibility to obtain the desired reward. In the service value segment, the important value elements may include, but are not limited to, the ease to trade-in travel flexibility, as shown in Box 72.400. It may be important to estimate the relative preferences and utilities of these value elements to different types of customers.

The customers' desire to trade-in their travel flexibility is subjective in terms of the length of the "travel flexibility trade-in period" and the "range of travel flexibility". The term "travel flexibility trade-in period" refers to the time period during which a customer is willing to trade-in his or her travel flexibility. The term "range of travel flexibility" refers to a range of travel features and/or components across which a customer is flexible. For example, the range of travel flexibility may be expressed in terms of the periods for pick-up, drop-off and travel period, range of pick up and/or drop off location, additional services/amenities needed during travel and so forth. The travel flexibility trade-in period, range of travel flexibility and reward (as desired by customers in lieu of travel flexibility) are subjective and may differ from customer to customer, or even for the same customer, may differ from one situation to another.

(2) Assessment of Car Rental Company Economics

An assessment of the crucial economic factors of a car rental company, as indicated in Box 73.100, may reveal the factors to include, but not be limited to, fixed and variable costs, non-uniform distribution of demand across different Cars under the same category (or Cars from various categories), the varying and unbalanced demand across different Cars, the difficulty to accurately forecast demand, the inability or difficulty to shift customers from overloaded Cars to low-demand Cars, costs and customer dissatisfaction and ill-will from over sale, opportunity loss from capacity shortages and spoilage, the need to develop sustainable competitive advantages, customer attrition rate, the commoditization of the car rental industry and so forth.

(3) Integration of Customer Dynamics with Car Rental Company Economic Factors

FIG. 73 also illustrates an example of how a mapping may be done, between the customer and car rental company profiles, for the FRO VOF in any industry. On one side, there are customers who have travel flexibility and desire to trade-in their travel flexibility in lieu of rewards or benefits. However, customers are also concerned about any hassles, delays, frustration that one may go through if they participate in such an exchange. On the other side, a car rental company faces an unbalanced demand that is difficult to forecast accurately. It would be certainly very helpful for a car rental company to know the relative flexibilities of customers to receive different Cars. For example, a car rental company may benefit from knowing the relative flexibility of a customer to travel in a Car within a given set of Cars.

Car rental companies usually have a higher aggregate capacity than aggregate demand. However, the demand is non-uniform and often leads to oversale, revenue spill or spoilage or any combination thereof, in Cars. The issue of last minute cancellations and no-shows (CNS) further complicates the issue. To deal with the revenue spills and spoilages, and to concurrently hedge against the CNS, the car rental companies overbook cars. Overbooking is a risky proposition due to associated costs, customer ill-will. If a Car is un-rented, that condition probably represents the loss of potential revenue for that car rental company. The car rental company may have turned down potential customers due to the risk of high cost of overbooking in the concerned car or other cars (of the same or different category and/or car rental company). The overbooking factor in cars other than said car represent potential revenue loss because there may be one or more customers on such other cars who could have been willing to be shifted to the un-rented car in lieu of reward, and this, releasing capacity for new potential customers (who may be willing to pay a lot higher) in said cars. However, today there is no framework that allows companies to do so in an optimal fashion such that both car rental company and the customer benefit at the same time. An opportunity, thus, exists to concurrently generate an incremental revenue benefit for the car rental company, and to maximize the purchase utilities for the customers (includes those who want to trade-in flexibility and those who want to obtain specific Cars even at higher prices).

The FRO VOF is created based on the value element "desire to trade-in flexibility". More specifically, as shown in the interaction between the Box 73.200 and Box 73.300, a mapping is performed between important customer value elements and the car rental company economic factors. The value element "desire to trade-in travel flexibility" is extracted, as shown in Box 73.400 and a FRO value option framework is created.

(4) Formulating the "FRO" Value Option Framework

Structure of FRO Value Option Framework in the Car Rental Industry

Figure 74:
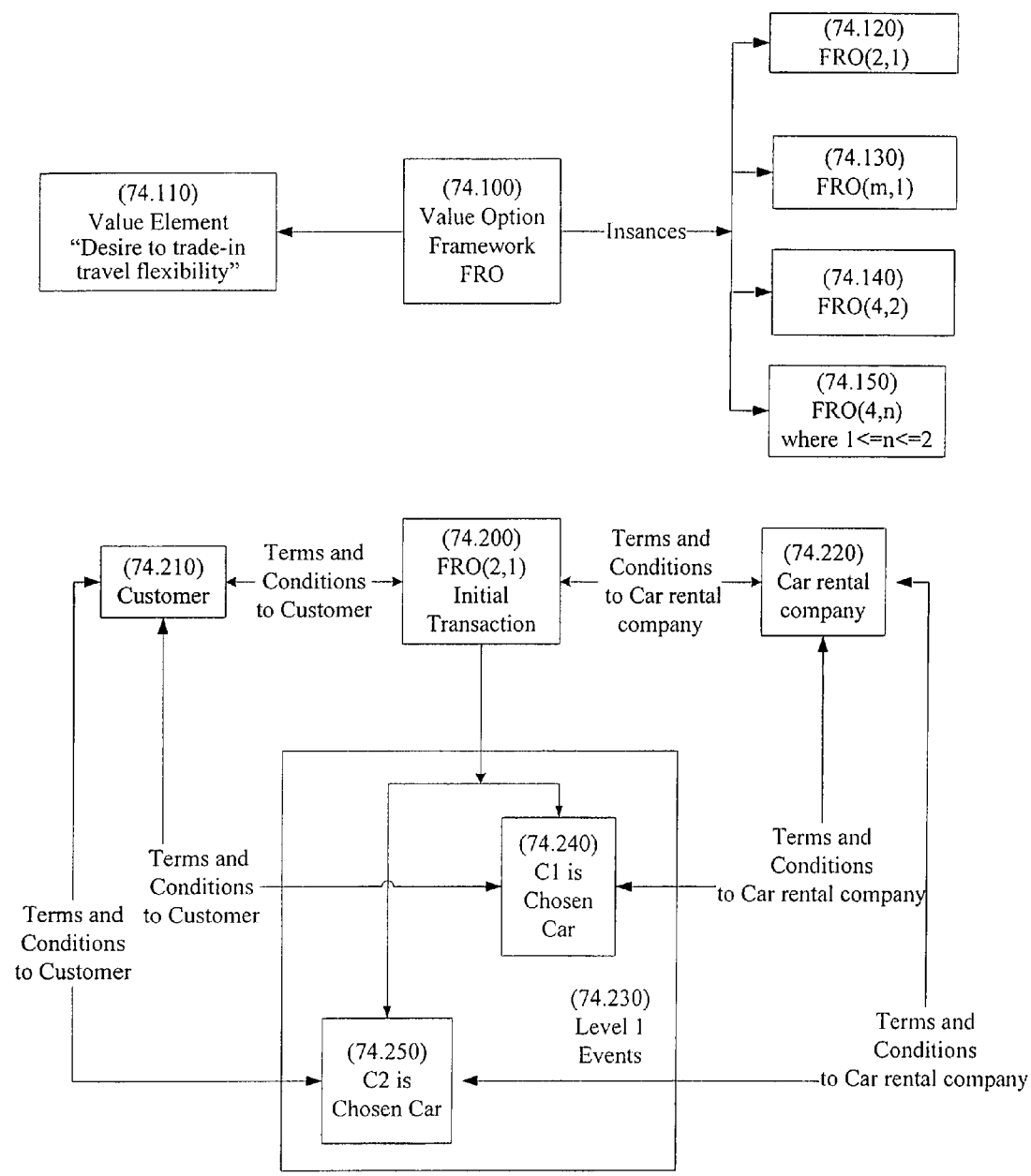
FIG. 74 is a partially-diagrammatic, partially-flow diagram representing the structure for creating a FRO Value Option Framework in context of the car rental industry.

FIG. 74 displays the structure of a FRO value option framework (shown in Box 74.100) in car rental industry. The FRO value option framework is related to the value element "desire to trade-in travel flexibility", as shown in Box 74.110.

In the "Initial Transaction" for FRO, shown by Box 74.200, a customer (shown by Box 74.210) and a car rental company (shown by Box 74.220) transact on the FRO value option. There may be one or more Events (shown by Box 74.230) that follow the Initial Transaction.

In a successful Initial Transaction for a FRO, the customer receives an option to utilize up to 'n' out of 'm' selected Cars (said 'm' Cars termed "FRO Cars"). The 'n' Cars that are finally selected are termed "Chosen Cars". After each of the 'n' Chosen Cars is defined (or selected or chosen or received), the customer has the right to utilize (or can utilize) said Chosen Car. Apart from the 'n' Chosen Cars, the remaining 'm−n' Cars are termed "Released Cars". The Released Cars (if any, that were probably held or blocked for said customer) may be sold to other customers as normal Cars or FRO Cars or used for other purposes. The Released Cars in relation to said option may be reused by the car rental company before, after, at or any combination thereof, the time the Released Cars and/or Chosen Cars are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' Cars may be defined in one or more transactions. The value of 'm' and/or 'n' may be defined (and/or re-defined), at one or more times, by the car rental company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Cars may include one or more Cars other than said 'm' Cars.

The FRO Cars may be selected by the car rental company, the customer, another entity or any combination thereof. The FRO VOF may enable a car rental company, to obtain travel flexibility from FRO customers (i.e., those who select FRO) and use said travel flexibility to satisfy the Car needs of other customers (i.e., who have relatively fixed or strong preferences). Therefore, the car rental company would usually have the right to select (or define) the Chosen Cars. However, in different implementations of FRO VOF, the car rental company, the customer, another entity or any combination thereof may select one or more of the Chosen Cars related to a FRO. The FRO Cars and the Chosen Cars may be selected by the same entity, different entities or any combination thereof. For example, the customer may select the FRO Cars and the car rental company may select the Chosen Cars out of the FRO Cars. The car rental company may incorporate the customer information and the data related to the FRO into the sales, inventory, other database or information system or any combination of the above.

The time when an Initial Transaction is completed (i.e., the customer receives the FRO option on said m Cars) is referred to as the Initial Transaction Time (or ITT, in short). One or more of said m Cars may be selected, at one or more times, before, after, during, or any combination thereof, the Initial Transaction and/or the time said option is delivered to the customer (or the customer receives said option) or any combination thereof. All the FRO Cars may be selected concurrently (i.e., all together in one transaction) or sequentially (i.e., in multiple transactions).

The delivery of an option may include, but not limited to, electronic delivery of the option, physical delivery of the option, any other mode of delivery or any combination thereof. Once said option is delivered, one or more of m Cars may be available for use by the car rental company, an entity other than the car rental company and/or any combination thereof. The value of 'n' may be defined before, after or any time, the option being delivered to the customer. The delivery of option may occur in relation to the customer renting at least one Car. The delivery of option may also occur in relation to the customer renting a Car other than the Car on which the option may be delivered. The customer may purchase a Car other than the Car on which the option is delivered to the customer.

In the sequential case, a customer may select one or more Cars in one or more transactions before the Initial Transaction. Said selected Car(s) (let's say X number of them), thus, may be considered as part of said m FRO Cars of the FRO (m, n) transaction, and the customer may select only the remaining (m−X) number of FRO Cars during the Initial Transaction. All the transactions used to select (or receive) all the m FRO Cars of a FRO (m, n) instance are related to each other, and hence, are considered as "related transactions" (as defined earlier).

In a FRO VOF, the sequential process may comprise a number of "related transactions" when all the FRO Cars are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In the related transactions, 'n' may be equal to 'm' when there may be at least one payment transaction between the car rental company and the customer related to the Cars wherein such payment is made after the option has been granted. Said payment transaction may be one more transaction apart from the initial interaction and/or Initial Transaction in the event said customer utilizes all the 'm' Cars. The customer may select Cars prior to utilizing the penultimate Car. The car rental company, an entity other than the car rental company and/or any combination thereof may reserve the right to limit the customer to 'n' Cars on, before, on or before, after, on or after or any combination thereof, a stated notification deadline date.

A car rental company may choose to create one or more instances of the FRO VOF based on factors including, but not limited to, number of FRO Cars, Chosen Cars or Released Cars, pre-determination of a number of Chosen Cars or Released Cars, flexibility trade-in period, other factors or any combination thereof. For example, a FRO based on a combination of the number of FRO Cars (or m) and Chosen Cars (or n) would be FRO (m, n). Some FRO instances are shown in Boxes 74.120, 74.130, 74.140 and 74.150. For example, when the number of Chosen Cars is pre-determined, the FRO (4,2) instance may imply that the customer receives 4 FRO Cars, on the condition that the car rental company may select any 2 out of 4 Cars as Chosen Cars. When the number of Chosen Cars is not pre-determined, the FRO (4,2) instance may imply that the customer receives 4 FRO Cars, on the condition that the car rental company may select none, one or 2 Chosen Cars out of FRO Cars. There may also be a minimum limit on n. For example, the FRO (4,n) (where $1<=n<=2$) instance limits the car rental company to select either 1 or 2 Chosen Cars out of the 4 FRO Cars.

The FRO (2,1) instance, two FRO Cars and one Chosen Car, is used here as an example to demonstrate the details of the structure of a FRO VOF. Box 74.200 refers to the Initial Transaction between the customer and the car rental company, in which they transact on a FRO (2,1) value option. In a successful Initial Transaction for FRO (2,1), the customer selects two FRO Cars and the car rental company may select any 'one' of those two Cars as the Chosen Car.

The Initial Transaction may have terms and conditions applicable to the customer or the car rental company or both. These terms and conditions may be set, preferably, to concurrently benefit both parties. The connections between Box 74.200 and 74.220, and Box 74.200 and 74.210 refer to the terms and conditions to the car rental company and the customer, respectively.

The FRO VOF may or may not include any constraints on the FRO Cars. For example, a car rental company may restrict FRO applicability and availability on Cars that satisfy specific criteria. The two FRO Cars may or may not include practically constrained Cars. Practical constraints may include one or more constraints that will prevent a customer to utilize one or more given Cars or prevent the customer from utilizing all the FRO Cars. Such constraints may include, but are not limited to, time constraints, location constraints and so forth. In other words, it may or may not be practically possible for a customer to utilize both the selected Cars due to at least one practical constraint.

A customer may select (or receive) FRO Cars in several ways; through mutual agreement (e.g., during a direct interaction such as a Car purchase), or the car rental company may grant the FRO Cars to the customer without soliciting their interest or permission. For example, to enhance customer satisfaction or for any other purpose, a car rental company may grant FRO Cars to customers based on the past customer behavior, interaction and so on.

The Initial Transaction may impose one or more conditions on the car rental company. A car rental company may be required to explicitly notify the customer prior to or no later than a given date and time (referred to as the Notify Deadline) regarding the Chosen Car. For simplicity, it is assumed that whenever the term Notify Deadline is used in the following sections, the condition requires notification prior to the Notify Deadline. If there is no such explicit notification condition, the Chosen Car may be decided as per the terms and conditions of the option contract. In either case, (explicit or implicit notification), the date and time when the selection of the Chosen Car is notified to the customer is referred to as the Customer Notification Time (or CNT, in short). In the current discussion, the explicit notification condition is assumed unless specifically mentioned otherwise.

A car rental company may determine one or more Notify Deadlines for a Car at one or more times (e.g., before, during, after the Initial Transaction or any combination thereof) using factors including, but not limited to, customer needs, expected value of the Car, car rental company profitability goals, any other factors or any combination of the above. Customer factors should also be considered in determining the Notify Deadlines, such as the flexibility trade-in periods desired by customers, or any other factor that may affect the behaviour of a customer. The FRO VOF may or may not have a notification deadline condition.

A car rental company may provide an option of booking 'm' Cars with condition of canceling at least one of them. In such case, the car rental company may have authority to decide booking of which Cars is to be cancelled. The car rental company may reward the customer for his/her travel flexibility. Consider an example. A customer may book two Cars at $50 each for two different dates $2^{nd}$ May and $5^{th}$ May. Three cases may follow this event—a) high demand for Car on $2^{nd}$ May, the car rental company may cancel the booking of the car for $2^{nd}$ May and the customer may be refunded $55 (car rental price+Flexibility Reward); b) high demand for Car on $5^{th}$ May, the car rental company may cancel the booking of the Car for $5^{th}$ May and the customer may be refunded $55 (car rental price+Flexibility Reward); c) regular demand (i.e. no high demand) for the Cars on both the dates, the car rental company may cancel the booking of any of the Cars as per its choosing or as per the terms of the option contract and the customer may be refunded $52 (car rental price+Flexibility Reward which may be lower).

In the context of the FRO VOF in the car rental company, the terms "price" or "reward" or "discount" normally refer to the price, which the car rental company may offer to the customer in relation to the FRO. However, in one of the implementations of FRO VOF, the customer may also offer a price to the car rental company in relation to the FRO. The terms "price" and "reward" are used interchangeably as and when the context requires.

The FRO VOF may impose additional terms and conditions on the customer. The car rental company and/or an entity other than the car rental company may receive from customer, at one or more times, an indication of one or more terms and conditions associated with said option in the FRO VOF. Similarly, at least one of said car rental company and/or an entity other than said car rental company may deliver to said customer, at one or more times, one or more terms and conditions associated with said option in the FRO VOF. A customer may receive one or more rewards (or prices) in relation to the FRO. There may or may not be any payment transaction related to the Initial Transaction and/or other event related to the FRO. There may be one or more prices related to the FRO. A price may include, but is not limited to, a set of one or more Car Rental Prices, a set of one or more FRO Prices (or Rewards or Discounts) or any combination of the above. A car rental company may choose to implement FRO Prices in many ways. For example, a customer may pay a Car Rental Price to receive a group of Cars, and then, may choose to get FRO on said Cars and thus, receive FRO reward. A car rental company may use the method of its choosing to decide on all the Car Rental Prices.

The customer may receive one or more prices during the Initial Transaction (which is referred to as an Initial Price), at the CNT (which is referred to as an Exercise Price) and/or at any other time, which may or may not be pre-determined between the customer and the car rental company. The price may be a function of number of FRO Cars and/or Chosen Cars, specific Cars to be granted for FRO Cars and/or Chosen Cars, Notify Deadline, one or more Car Rental Prices, any other factors of car rental company choosing or any combination of the above.

The price may comprise a monetary value or a soft/non-monetary value (e.g., benefits, coupons or exchange of another service) or other consideration. The FRO Price may be fixed or variable, with or without bounds. The car rental company may set permissible range(s) or boundary limit(s) within which the FRO Price can vary, or it may offer the customer a set of prices to choose from. Since price conditions may depend upon various factors, which may or may not be variable, the same may be decided at anytime. The price conditions may be determined by the customer, the car rental company, another entity, or any combination thereof at one or more times. One or more prices (FRO Initial or FRO Exercise or any other price) may be a negative value, which reflects that instead of the car rental company rewarding the customer, the customer shall pay a price to the car rental company to get the desired Car as the Chosen Car.

Different price strategies may be implemented in the FRO (2,1) instance. For example, a single Initial Price could make it attractive and easy for the customer to participate in the FRO program. One or more of the FRO prices (rewards) may be embedded with the Car Rental Price by using a special Car Rental Price. A customer may be presumed to accept the FRO offer while displaying the Car Rental Price (that has the FRO Price embedded in it). These presumptions may or may not include soliciting prior interest of the customer regarding the FRO offer. In case, the FRO price is merged with the Car Rental Price, and where such price may or may not be separately identifiable, the customer may or may not receive a separate price for FRO.

The Notify Deadline may be pre-determined or may be determined later (i.e., after FRO grant) by the car rental company, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the FRO VOF may not allow the car rental company to notify the customer after the last Notify Deadline (i.e., the latest among the Notify Deadlines). As an operational measure, a rule may be set that if the car rental company and/or an entity other than the car rental company fails to notify the customer before the last Notify Deadline, the customer may select either of the FRO Cars as the Chosen Car. Similarly, in one of the implementations of the FRO VOF, a rule may also be set that if the customer fails to notify the car rental company and/or an entity other than the car rental company before the last Notify Deadline, the car rental company and/or an entity other than the car rental company may select either of the FRO Cars as the Chosen Car for the customer. Another approach may be (e.g., for customer/car rental company) to designate one of the two Cars as a Default Car (during or after receiving the FRO) that will be selected as the Chosen Car if the car rental company fails to notify the customer of the Car selection before the last Notify Deadline. Any entity (e.g., the car rental company or the customer) may (or may not) be allowed to change the Default Car once it is selected. The FRO Exercise Price (if any) in the default case may or may not be equal to the FRO Exercise Price for the Default Car for the last Notify Deadline. In the current discussion, a single Notify Deadline is assumed.

The FRO Exercise Price may be a function of Notify Deadline, FRO Cars and/or Chosen Car, one or more Car Rental Prices, any other factors of car rental company's choosing or any combination thereof. In such situations, the car rental company may pay a price to the customer based on the selection of the Chosen Car at a given time.

The FRO VOF may also include conditions imposed on the customer. A customer may be under a mandatory condition to accept the Chosen Car once it is selected (for e.g., by the car rental company).

A car rental company may determine customer preferences, either explicitly or implicitly, regarding utilization of up to n of m selected Cars. The preferences may also include, but not limited to, customer preferences for various Cars and services, needs, associated relative utilities, flexibilities, preferences regarding choice of Cars, quality of Cars, acceptable delays (relative) to receive different Cars and so forth. A car rental company may seek customer preferences on flexibility to utilize various Cars, desire to trade-in their Car flexibility, any other parameters or any combination thereof. The car rental company, one or more entities other than the car rental company or any combination thereof may seek customer preferences.

A car rental company may also offer FRO options to one or more customers on the basis of customer preferences, so obtained or collected. The car rental company may offer said FRO options based on the dynamics of the car rental company including, but not limited to, inventory, operational data, revenue management data, cost data, financial data, accounting data, any other internal data, any combination thereof and so on.

A car rental company may seek such preferences from the customers prior, during or after the customer has purchased the Car or any combination thereof. These customer preferences may help the car rental company to perform concurrent optimization of value for the car rental company, the customers, one or more entities other than the car rental company or any combination of two or more of the above. The customers may also include the customers whose preferences have not been determined or collected to perform concurrent optimization. The data pertaining to the car rental company, customers, one or more entities other than the car rental company, any combination thereof, may be integrated to concurrently optimize the value for at least any two of said entities. There may or may not be any payment transaction between the car rental company, one or more other entities and/or the customers regarding seeking such customer preferences, delivering FRO options, customer participation in FRO and so on.

The car rental company may operate one or more systems and/or services to monitor the car rental company dynamics. Monitoring may include, but is not limited to, monitoring of capacity, days to utilization, return and/or potential return of Cars, flexible inventory that may be created in relation to said obtained preferences, analyzing various cost, revenue, operational or any other internal data and so on. The car rental company may have one or more systems and/or services to analyze such data on a real-time or quasi real-time basis and draw conclusions on the basis of such analysis. Any of the systems and/or services may be operated by the car rental company, one or more entities other than the car rental company or any combination thereof.

A car rental company may operate a system that defines customer preferences regarding at least utilizing up to n of m selected Cars, where n is less than m, operate a system that enables use of said preferences to optimize value for at least one of customers, said car rental company and an entity other than said car rental company. Said system may be used to enhance Car selling capacity (or helps to increase the overselling limits of Cars). The car rental company may use such preferences to offer FRO. A car rental company may concurrently optimize value for at least two of customers, said car rental company and at least one entity other than said car rental company.

The car rental company may utilize such preferences to meet its capacity shortages. These customer preferences may enable the car rental company to increase the capacity limits for its Cars. The car rental company may start entertaining more requests from the customers and hence may increase the oversale limits for their Cars. The car rental company may be able to sell the Cars at higher prices to the potential customers due to increase in capacity and oversale limits and thereby enhance its revenues. Such preferences may help the car rental company to allay fears of customer ill-will and dissatisfaction in case of an oversale situation. The car rental company may utilize these preferences to deal with the oversale situation more effectively, efficiently and in timely manner. Thus, it may eventually allow the car rental company to capture demand that may otherwise, have been spilled or turned down and thereby enhancing its revenues without having any negative impact due to increase in capacity limits.

A car rental company may offer FRO to all customers or any selected customers, such selection may be based on any criterion including, but not limited to, such as those who have expressed their relative preferences, those who have not expressed any preferences. By integrating the car rental company dynamics and collected customer preferences, a car rental company may offer appropriate incentives and terms and conditions for FRO to generate desired participation. A car rental company may exercise its right (from FRO) to define the Chosen Cars for one or more FRO customers depending on car rental company's internal need to regenerate Car capacity for Cars with low availability or shortages. A car rental company may be in a better position to offer appropriate FRO offers at a later stage due to many factors including, but not limited to, the car rental company having better knowledge of internal and external dynamics, a relatively better estimate on how many customers required to avoid oversale situation in the end and so on. A car rental company may choose to handle any shortfalls in capacity using FRO or by any other method of its choosing.

Once the Initial Transaction is successful, there may be at least two possible related events, as shown by Box 74.230. The two events are (1) that C1 is the Chosen Car (as shown by Box 74.240) and (2) that C2 is the Chosen Car (as shown by Box 74.250). Each of these two events may be associated with various terms and conditions on the customer and/or the car rental company. As explained above, the events may take place in two ways: either the car rental company selects the Chosen Car to satisfy its business needs, or the Chosen Car is selected based on pre-determined rules. The car rental company may have to pay an additional exercise price at the CNT depending on the terms and conditions of the option contract. Once the Chosen Car is selected, the car rental company and/or the customer may not change the Chosen Car except within the bounds of the terms and conditions in the option contract. The car rental company or the customer may (or may not) have the right to enforce the Chosen Car on the other party as per the terms and conditions of the option contract.

The car rental company may offer incentives to the customers to motivate them to choose one or more Cars as Chosen Cars among the FRO Cars that may be more optimal for the car rental company. A car rental company may formulate one or more such offer (may referred to as Chosen Car Incentive Offers) and may send them to customers who have purchased FRO but not yet selected their Chosen Car via email, phone, mail or any other communication channel as per the terms and conditions of the option contract. Thus, such customers may be persuaded to select said optimal Car in lieu of incentives if the terms and conditions of option contract provide so.

In one implementation of FRO, a car rental company may want to hold capacity for the customer in only one of the FRO Cars, in which the status of said Y customer is termed "Ya" (i.e., Accounted) and in the other FRO Car(s), the status is termed "Yw" (i.e., Awaiting) (both Ya and Yw have been defined above). A "Y" customer converts to an N customer after the CNT. Thus, at any given time, a car rental company may have N, Ya and Yw type of customers for its Cars.

The FRO VOF may help a car rental company in one or more ways. For example, it may help to accommodate Car requests from potential customers. Any new potential customer who requests to obtain a Car is assumed to be an N customer. If the available quantity for the desired Car (desired by N customer) is insufficient to satisfy the request, then the car rental company may use the quantity (if any, of desired Car) that has been assigned to Ya customers, and reassign the same to said N customer. Consequently, the car rental company may then assign the Awaiting Cars (i.e., the Cars where said Ya customers have Awaiting status) to said Ya customers. By implementing such shifting or removing of Ya customers from their Accounted Cars to Awaiting Cars, a car rental company may better serve incoming demand for Cars. An event where such request comes to the car rental company for a Car is termed "Buy_N". The act to remove (or shift) a Ya customer from its Accounted Car to its Awaiting Car is termed "Remove_Y". Detailed algorithms are presented below that may be used to manage a system comprising N, Ya and Yw type of customers.

The above terms and conditions of the FRO VOF may be set in a way to concurrently benefit the customer, the car rental company, any other entity apart from said car rental company involved and/or any combination thereof. The car rental company gets to seek a way to create a flexible inventory of Cars. The customer benefits from trading their flexibility for the desired rewards. The car rental company benefits from enhanced customer satisfaction (loyalty and repeat business), incremental revenue from the high price paying customers, incurring lower costs on capacity shortages and selling (reusing) the Released Cars, generating revenues from Released Cars without actually reusing the Released Cars and other operational benefits.

A FRO VOF may include a right for the customer to utilize each of the m FRO Cars, and a right for the car rental company to limit the Cars (to fewer than m) the customer can utilize, if the car rental company notifies the customer on a stated Notify Deadline. Said on a stated Notify Deadline may include, but not limited to, on and/or before the stated Notify Deadline, on and/or after the stated Notify Deadline, any combination thereof. The right may include the condition that the car rental company may notify the customer before, at or after the stated Notify Deadline or any combination thereof. To provide some flexibility to the customers, the car rental company may offer (or allow) the customer to express their preferences regarding the Chosen Car(s) before the stated Notify Deadline. The car rental company may or may not exercise their right to limit the customer to utilize fewer than said m Cars. The right may include a condition that the car rental company may limit the customer after the customer expresses his/her preference for the Chosen Cars. The car rental company and/or an entity other than the car rental company may have said limitation on at least one Car. There may be a condition imposed on the customer to make at least one payment to the car rental company when the customer expresses his or her preferences for the Chosen Cars. The car rental company and/or an entity other than the car rental company may allow the customers to define said 'n' Cars on or before a stated date. The car rental company and/or an entity other than the car rental company may reserve the right to take back any 'm' minus 'n' Cars after the stated date. The customer, the car rental company, an entity other than the car rental company and/or any combination thereof may determine the notification date.

A car rental company may choose to define all the Chosen Cars at one or more times. All Notify Deadlines may or may not be associated with each of the related FRO Cars. For example, a Notify Deadline may be after the time when the Car would have been utilized or the car rental company may choose not to offer a Notify Deadline on a specific Car due to one or more reasons including, without limitation, high FRO Price, customer utility reasons and expected load factor. A car rental company may select any of the selected FRO Cars as the Chosen Cars prior to a Notify Deadline. The car rental company may also choose not to select any Chosen Cars at one or more of the specified Notify Deadlines.

The costs, revenues, benefits, terms and conditions shown here are for illustration purposes only and actual values could be different depending upon specific values selected by the car rental company for value options, customer behavior, car rental company characteristics, Notify Deadline(s) and other relevant factors.

The FRO VOF structure may be implemented in several ways depending upon the terms and conditions associated with the FRO contract. The FRO VOF structure presented above for the FRO (2,1) instance can be extended to implement any other FRO instance.

The FRO concurrently optimizes value for both the car rental company and its customers. The customers receive rewards for trading their flexibility in utilizing a Car while the car rental company gets the flexibility to optimally allocate Cars (including sold Cars) across various customers. The car rental company gets to know the relative preferences and utilities of a customer for various Cars as some customers take this option and others don't. The presumption here is that customers make a logical decision to take part in the FRO value option framework if they desire to trade-in their flexibilities. The car rental company may benefit from higher customer loyalty, as customers may receive higher satisfaction from using the car rental company services, and may optimize its profitability by reusing/reselling the Released Cars at typically higher than average prices.

Example of FRO VOF Structure FRO (2,1)

FIG. 75 demonstrates an illustrative practical example of using the FRO (2,1) instance in the car rental industry. Consider a customer who interacts with a car rental company to get FRO. Per Act 74.200, an Initial Transaction takes place between the car rental company and the customer. FIG. 75 displays some of the details of the Initial Transaction. The customer selects/receives two FRO Cars, C1 (shown in Box 75.100) and C2 (shown in Box 75.200), and the car rental company can select either of the Cars as the Chosen Car. The customer is under the condition to accept the Chosen Car as selected by the car rental company.

The customer receives a reward of $5 as the Initial FRO Price from the car rental company while the customer pays $250 as the Car Rental Price to the car rental company as part of the Initial Transaction. Hence, the customer pays a net amount of $245 to the car rental company at Initial Transaction. The Initial Transaction takes place on the $17^{th}$ day of November (i.e., the ITT, shown in the second row of the Box 75.300). There is an explicit notification condition wherein the car rental company has to select and notify the customer regarding the Chosen Car before the Notify Deadline. An example of terms and conditions included with FRO are presented. A scenario is considered with different Notify Deadlines (shown in Box 75.400) and the Notify Deadline is expressed in terms of the number of days to pick up (DTP) of C1, the earlier of the two Cars.

Box 75.400 displays a set of FRO Exercise Prices that are a function of both the Notify Deadline and the Chosen Car.

There are four Notify Deadlines associated with the FRO. The FRO Exercise Price increases from $5 (for the First Notify Deadline of 30 DTP) to $20 (for the Last Notify Deadline of 1 DTP) if the Chosen Car is C1 and from $8 to $25 if the Chosen Car is C2. If the CNT is before 15 DTP, then the customer receives $5 as the FRO Exercise Price from the car rental company if the Chosen Car is C1, and receives $8 as the FRO Exercise Price if the Chosen Car is C2, as shown in the second column of the second and third rows in the Box 75.400, respectively. If the CNT is after 15 DTP and before 7 DTP, then the customer receives a FRO Exercise Price of $10 or $12 if the Chosen Car is C1 or C2, respectively, as shown in the third column of the second and the third rows, respectively in the Box 75.400. Similarly, the customer receives a FRO Exercise Price of $15 for C1 or $20 for C2, if the CNT is after 7 DTP and before 3 DTP, and $20 for C1 or $25 for C2, if the CNT is after 3 DTP and before 1 DTP, as shown in the fourth and fifth columns of the second and the third rows in the Box 75.400, respectively.

5) Optimization of FRO VOF

As mentioned earlier (shown in FIG. 7), in the form of an optional last step in the first stage, a financial analysis may be performed using the existing car rental company and customer data to determine the optimal terms and conditions of the FRO VOF. 'What-if' scenarios may be executed to determine an optimal pricing strategy. The car rental company may want to divide customers using one or more criteria and design separate FRO VOF for each customer segment.

Second Stage Using the FRO Value Option Framework

After completing the first stage of the method, the car rental company has created a FRO VOF and specific options within that framework. The car rental company may have segmented customers and designed options accordingly. The car rental company is fully prepared to use a structured format comprising one or more FRO value options to interact with its customers in real time to generate benefits for both the car rental company and its customers. The second stage of the FRO VOF is now presented.

Figure 76:
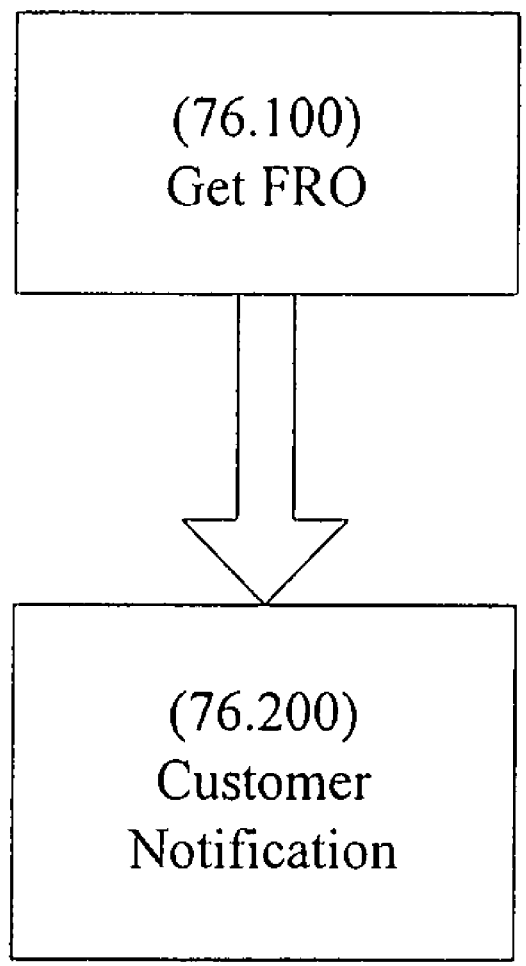
FIG. 76 is a diagrammatic illustration, in a high level flowchart, of a process for FRO VOF implementation in the car rental industry.

The implementation of the FRO VOF between the car rental company and its customer takes place through two high level acts, as shown in FIG. 76. In Act 76.100, the 'Get FRO' process, an interactive event between the customer and the car rental company's web server, runs to carry out the Initial Transaction of the FRO VOF. In this Act, a number of algorithms, may be executed (e.g., availability, FRO Price, Car Rental Price and Notify Deadline) on the car rental company's server to optimally calculate the terms and conditions of the FRO VOF to concurrently benefit both the car rental company and the customer. In Act 76.200, the Customer Notification process (explained later) is executed. In this process, the Chosen Car is notified to the customer. The process may also comprise one or more event optimizer algorithms that may help to optimally select the Chosen Car and/or to optimally use (or reuse) the Released Car.

Figure 79:
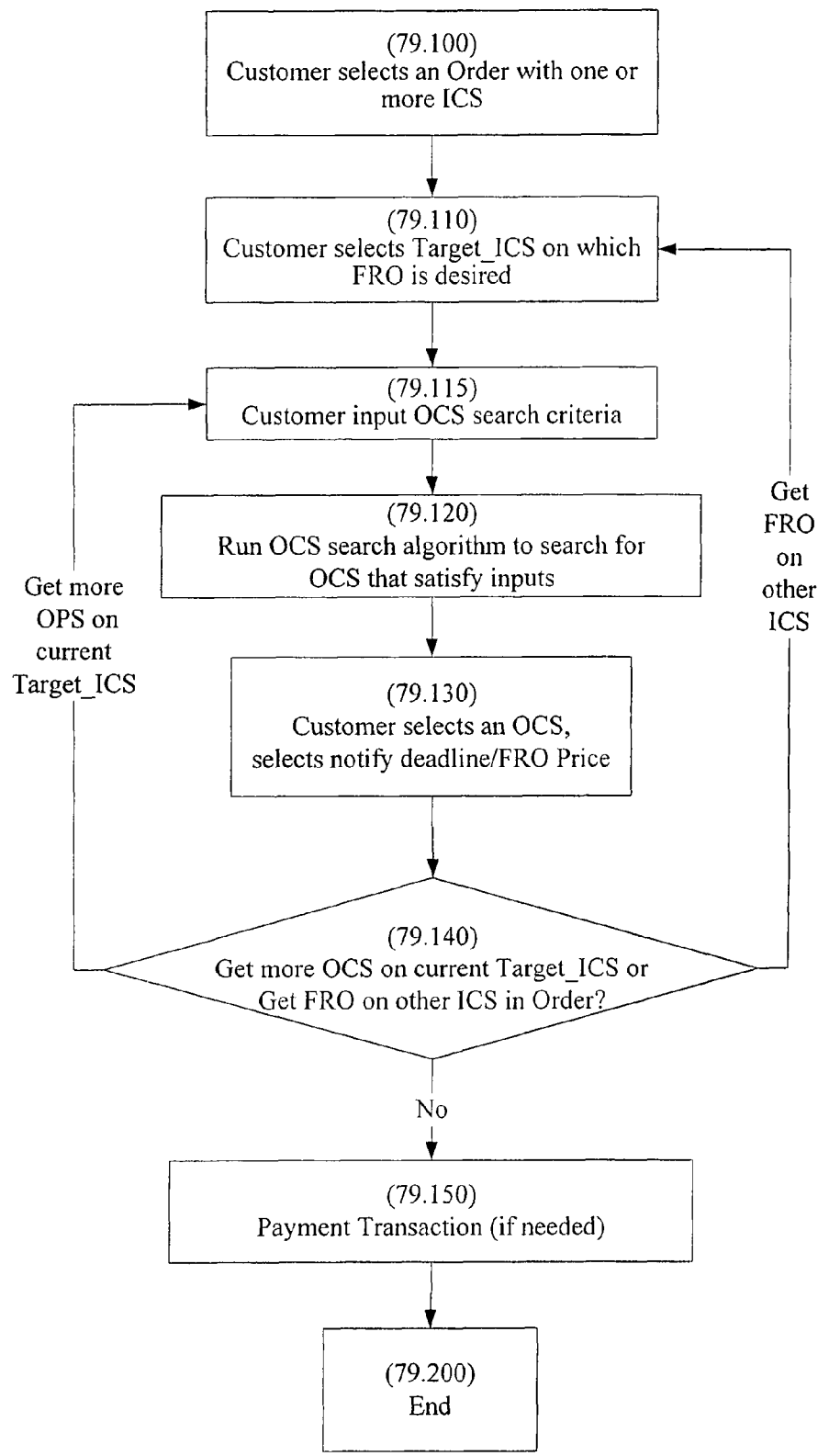
FIG. 79 is a flowchart that expands Act 100 of FIG. 76, illustrating a high level algorithm for the "Sequential Get FRO" process.
Figure 81:
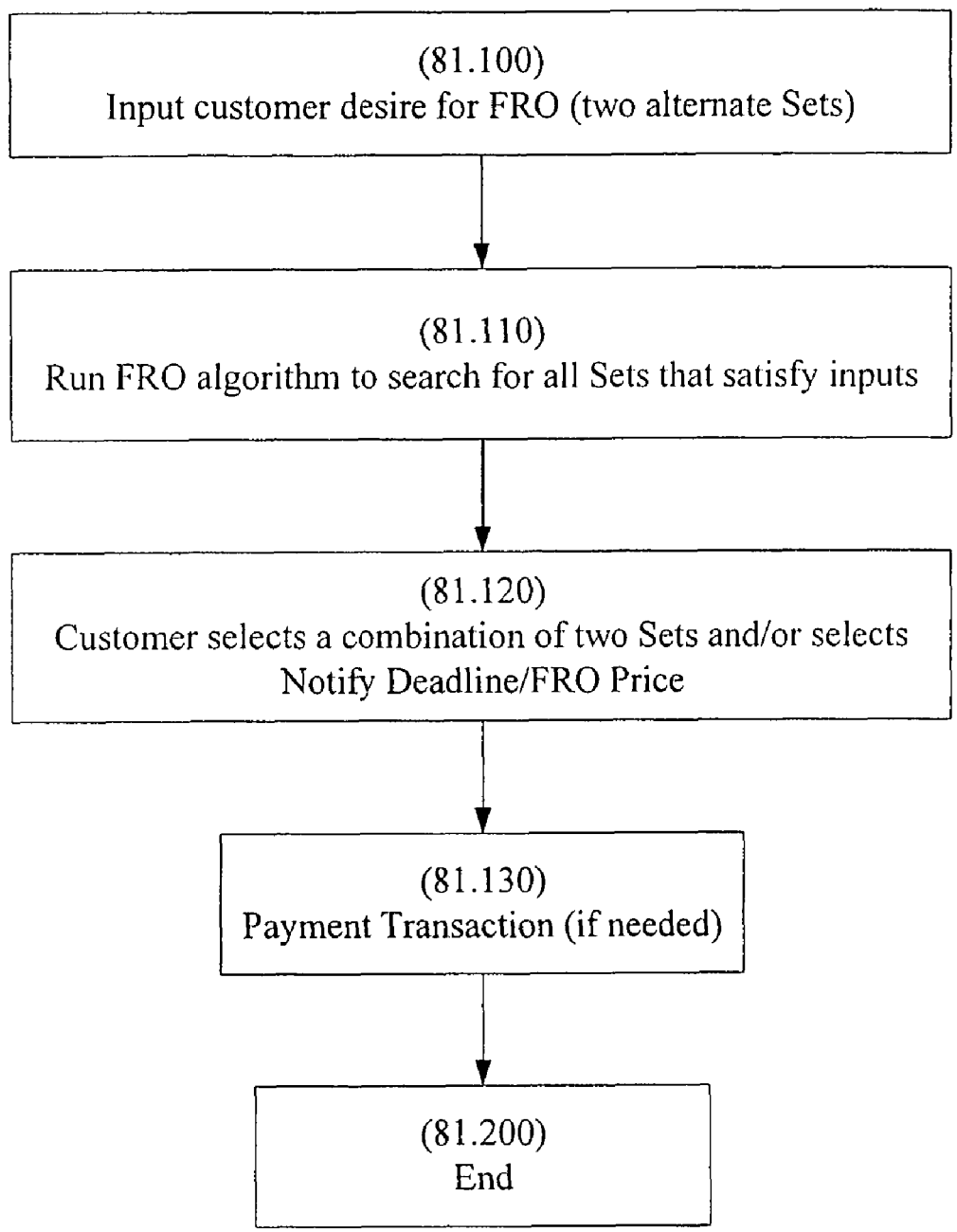
FIG. 81 is a flowchart of an algorithm for the "Concurrent Get FRO" process, an alternative process to FIG. 79.

As explained above, the Get FRO process may be implemented via the Sequential (shown in FIG. 79) or the Concurrent (shown in FIG. 81) process. There are many ways to do the Sequential process. As an example of the Sequential process, a customer may select (or purchase) a Car Product/Set/Order before the Initial Transaction begins. In such situations, said Car Product/Car Set/Car Order may be referred to as Initial Car Product/Initial Car Set/Initial Car Order or ICP/ICS/ICO, in short, respectively. The Initial Set is also referred to as Initial Car Set (or ICS, in short). A customer may get a FRO, i.e., get one or more FRO Car Products/Car Sets/Car Orders on an ICP/ICS/ICO, respectively. A FRO Car Product/Car Set/Car Order is also referred to as Option Car Product/Option Car Set/Option Car Order, or OCP/OCS/OCO, in short, respectively. An Option Set is also referred to as Option Car Set (or OCS, in short). The two events (one for the Initial Car Product and the other for the Initial Transaction) may be executed with a minimal (one just after another) or a significant time gap (e.g., few minutes, hours, days and so forth) in between them.

The FRO VOF may be implemented at different levels including, but not limited to, Car Product, Car Set and Car Order. Illustration of Car Product and Car Set levels is given through an example in the car rental industry as shown in FIGS. 77 and 78 respectively.

FIG. 77 displays a practical example of implementing a FRO (2, 1) at the Car Product level. A customer gets a FRO on Car Product (i.e., Initial Car Product or ICP, in short) on the Car Set and receives one Option Car Product (or OCP, in short) on ICP, as shown in Boxes 77.100 and 77.200. The car rental company may select either the ICP (luxury car—Alpha 123) or the OCP (luxury car—Xeta 987) as the Chosen Car Product (or CRP, in short) for the Car Product in the Car Set.

FIG. 78 displays a practical example of implementing a FRO (2, 1) at the Car Set level. A customer selects a Car Order comprising an ICS (JB 007, automatic transmission and CD player) as shown in Box 78.100. The customer then gets FRO on the ICS, and receives one OCS (BJ 111, manual transmission and cassette player) as shown in Box 78.200. The car rental company may select either this ICS or the OCS, as the Chosen Car Set for this Car Order.

A car rental company may choose to implement the FRO at any level(s). In a specific FRO interaction between a customer and the car rental company, the implementation level should be the same for all the FRO Cars, Chosen Cars and Released Cars. For example, if FRO is implemented at the Car Set level, then all the FRO Cars and Chosen Cars would refer to FRO Car Sets and Chosen Car Sets respectively.

1. 'Get FRO'—Dynamic Interaction to Capture Customer Demand

In the Get FRO process, a customer interacts with the car rental company's server to receive a FRO. The interaction may take place (for example) via phone, in-person or on a website. The Sequential Get FRO Process is presented first along with its detailed algorithms, followed by a short summary of the Concurrent Get FRO Process.

Sequential Get FRO Process

There are several ways to implement the Sequential process. The following presents an example of the Sequential Get FRO Process when a FRO is implemented at the Car Set level. It is also assumed here that the customer first purchases an Initial Car Order with one or more ICS, and then opts to receive a FRO to select one or more OCS on any of the included ICS.

The following presents an algorithmic illustration of the Sequential Get FRO process. Consider FIG. 79. In Act 79.100, the customer selects (and/or purchases) an Order (with one or more ICS). Next, in Act 79.110, the customer reaches an interactive interface of the car rental company's web server to Get FRO page, where the customer selects the ICS (referred to as Target_ICS) on which a FRO is desired. Next, the customer inputs the OCS search criteria for the current Target_ICS in Act 79.115.

Next, on clicking the "Search FRO Cars" button, control goes to Act 79.120, where the OCS search algorithm is executed to search for an OCS. The OCS search algorithm returns a list of valid OCSs, along with a list of Comb_NDs (defined elsewhere) and associated FRO Prices (or discounts). The details of the OCS search algorithm are presented later. Next, the search results are displayed for the customer, who then selects the desired OCS and one or more associated Comb_ND(s)/FRO Price(s), as shown in Act 79.130.

Next, in Act 79.140, a test is performed to determine whether the customer wants to get more OCSs on the current Target_ICS or on another ICS. If the customer wants to get an OCS on another ICS, control loops back to Act 79.110, where the customer selects another ICS as the Target_ICS, and then the process is repeated again for the new Target_ICS. If the customer wants to get more OCSs on the current Target_ICS, control loops back to Act 79.115, where the customer enters the OCS search criteria, and then the process is repeated for the new OCS search criteria. If the customer does not want to get any more OCSs, control goes to Act 79.150, where a payment transaction (if needed) may be executed. For example, a customer may need to pay a price for the Car Product after taking into consideration the Initial FRO Price (discount, if any) using a credit card, direct bank account debit or any other payment transaction mechanism. Next, the algorithm ends in Box 79.200. The computation may be performed using a processor that may calculate results in optimal time.

OCS Search

Figure 80:
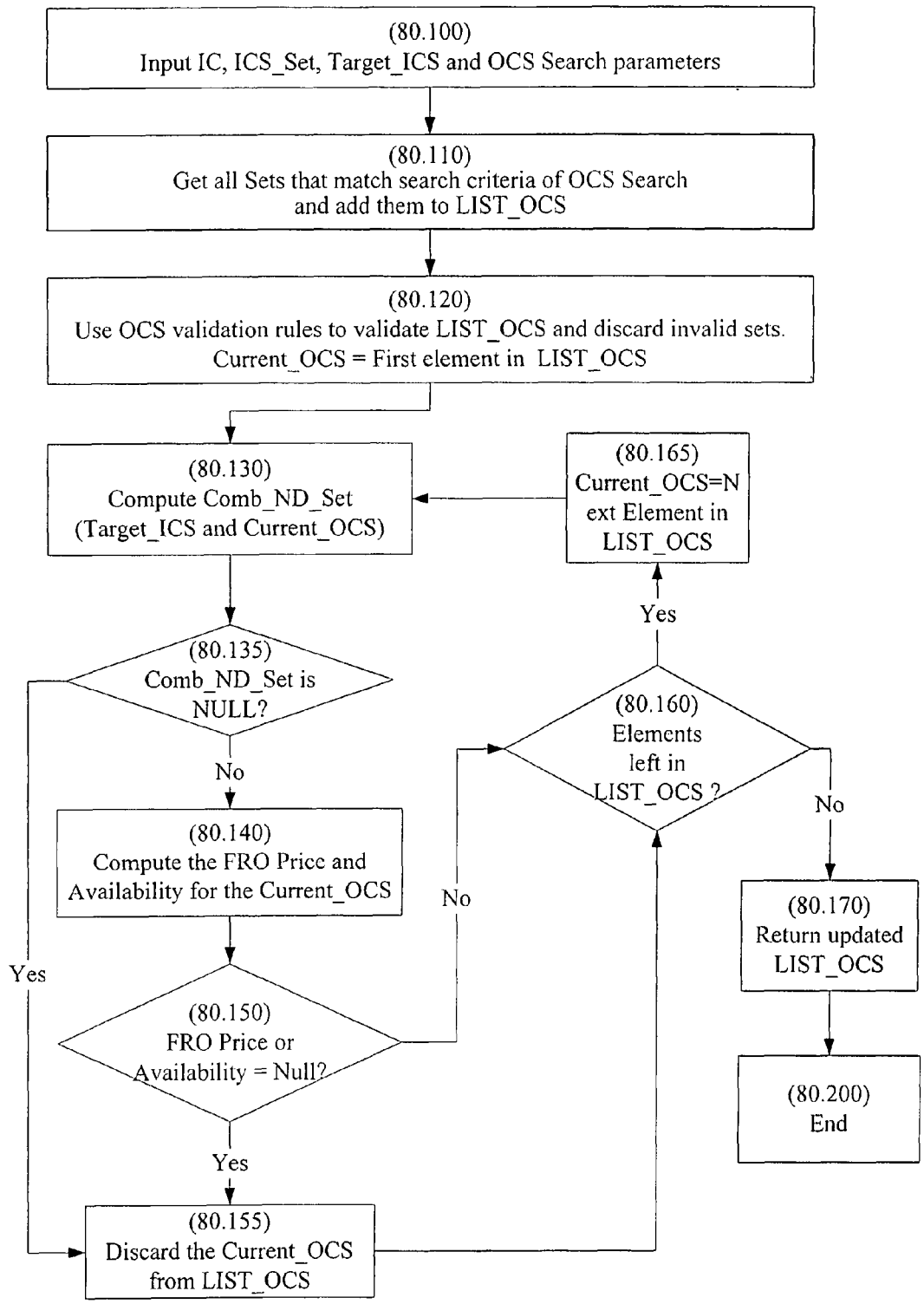
FIG. 80 is a flowchart that expands Act 120 of FIG. 79, illustrating an algorithm to search for FRO Car Sets.

The following algorithm (shown in FIG. 80) determines and validates an OCS for a given set of conditions including, but not limited to, availability, Notify Deadline and FRO Price. One of the ways of implementation of OCS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 80.100, the number of customers (IC), ICS_Set (containing all ICS in the Initial Order, and all the OCSs, (if any) already selected/received along with Comb_ND_Set(s) and Comb_OP_Set(s), for each ICS), Target_ICS and the OCS Search parameters are input to the system. The definitions and details of Comb_ND_Set and Comb_OP_Set are provided later. The OCS search parameters may include, but are not limited to, date, time and location, number of Car Products per Set, Notify Deadline, FRO Price (Initial and Exercise) and so forth. A customer may be allowed to input Notify Deadline and/or FRO Price on the basis of which valid OCSs (that satisfy the given criteria of Notify Deadline and/or FRO Price) may be searched for and displayed for the customer. In the car rental industry, for example, a customer may be asked to input the origin and destination related parameters, and then a set of Notify Deadlines and FRO Prices may be computed for the Car Products that match the given criteria. In another example, a customer may input both the origin and destination and Notify Deadline and/or FRO Price as inputs and then a search may be performed for valid OCSs. In yet another example, a customer may input to the system, one or more Car Products, and/or inputs to search for one or more additional Car Products (e.g., pick-up and drop-off, price etc.) to search for OCS that may be combined with one or more input Car Products (by the customer) to constitute the total set of Car Products for a FRO. In such situations, a car rental company may also validate the Car Products input by the customer to determine if said Car Products are eligible to be the FRO Cars.

Next, control goes to Act 80.110, where an OCS Search is performed for the given criteria. The search may be best performed using a processor that may calculate results in optimal time. The order in which search parameters are executed may be optimized to reduce the search time, however, it may or may not affect the final outcome. A car rental company may select any order of its choosing.

In Act 80.110, Car Sets are determined that match the search criteria and the resulting Car Sets are added to a list termed LIST_OCS. Next, in Act 80.120, a list of OCS validation rules is obtained from the car rental company's FRO VOF database and the rules are used to validate all the Car Sets in the LIST_OCS list. Car Sets that do not satisfy the rules are discarded. Validation rules may include, but are not limited to, a Maximum Number of Cars Products per Set Rule, a Maximum Car Products Price Rule and so forth. For example, a Maximum Number of Car Products per Set Rule discards the Car Sets that have more Car Products than specified. A car rental company may implement any validation rule of its choosing to further qualify the Car Sets in the LIST_OCS list. As a last Act in Act 80.120, the first element in the updated LIST_OCS list is designated as the Current_OCS.

Next, control goes to Act 80.130, where a group of Comb_NDs is computed for the combination of the Target_ICS, all the existing OCS of the Target_ICS and the Current_OCS, and added to a set called Comb_ND_Set. Next, in Act 80.135, a test is performed to determine whether the Comb_ND_Set obtained in the previous Act is Null. If so, control goes to Act 80.155. If not, control goes to Act 80.140, where the FRO availability and FRO Price for the Comb_ND_ Set are determined. Next, in Act 80.150, another test is performed to determine whether the FRO Availability or the FRO Price is Null. If so, control goes to Act 80.155. If not, control goes to Act 80.160.

In Act 80.155, the Current_OCS is discarded from the LIST_OCS list, and control goes to Act 80.160, where a test is performed to determine if more elements are left in the LIST_OCS list. If so, control goes to Act 80.165. If not, control goes to Act 80.170.

In Act 80.165, the next element in the LIST_OCS list is designated as the Current_OCS and control loops back to Act 80.130 to repeat the process for the new Current_OCS. In Act 80.170, the updated LIST_OCS list is returned as the search result, and the algorithm ends in Box 80.200.

Computation of Notify Deadlines

A car rental company may set one or more Notify Deadlines of its choosing for its Car Products. Once the Notify Deadlines have been set for each Car Product, the next Act is to create a framework to compute the Notify Deadlines for a group of Car Products (such as a Set, an Order or any other group). The following sections present an example of a framework that may be used to obtain a set of Notify Deadlines applicable to a group of Car Products. A car rental company may use any framework and algorithm of its choosing to obtain the same.

A set of Notify Deadlines associated with a Car Product, a Car Set and a combination of two or more Car Sets is called Car_Product_ND_Set, Car_Set_ND_Set and Comb_ND_Set, respectively. Each element in the Car_Product_ND_ Set, Car_Set_ND_Set and Comb_ND Set is termed Car_ Product_ND, Car_Set_ND and Comb_ND, respectively. The Comb_ND_Set may be computed by combining the Car_Set_ ND_Sets of all the given Car_Sets. A Car_Set_ND_Set may be computed by combining the Car_Product_ND_Sets of all the Car Products under that Car Set. The Notify Deadlines may be computed based on various parameters and factors of the car rental company choosing. One example to compute a Comb_ND_Set is as follows. First compute Car_Set_ND_ Set for all Car Sets. A Car_Set_ND_Set is computed by first selecting earliest of the Notify Deadlines of each Car Product within the concerned Car Set, and then picking the latest of those Deadlines, and noting that as the Target_Deadline. Next step is to pick all those Notify Deadlines that fall after the Target_Deadline. Notify Deadlines thus obtained may be validated using various validation rules based on car rental company factors such as customer utility, Car Product parameters and so forth. Similarly, the Comb_ND_Set may thus be computed by repeating the above process for Car_Set_ND_Sets, thus obtained for each Car Set.

Available Capacity Check

The FRO capacity for an OCS may depend on one or more factors including, but not limited to, Notify Deadline, FRO Prices, expected Car Product value and so forth. A car rental company may use any method of its choosing to determine FRO capacity of a Car. For example, a car rental company may choose to have a fixed FRO capacity for one or more of its Car Products.

An instance to compute FRO capacity is discussed below. Consider the case, when FRO Capacity is dependent on Notify Deadline. In such situation, the objective is to determine those Comb_NDs within the Comb_ND_Set on which FRO is available for the given OCS. The FRO Capacity and the Used FRO Capacity (the total number of Car Products on which FRO has been sold but not exercised) may be calculated for each Comb_ND within the Comb_ND_Set. Available Capacity (AC) would then be the difference of FRO Capacity and Used FRO Capacity for the given Car Product. If the AC is greater than or equal to the number of incoming customers desiring a FRO, then the FRO capacity is available at a given Comb_ND for the given OCS. The process may be repeated for all Notify Deadlines within Comb_ND_Sets. FRO may be made available on a given OCS for a given Comb_ND, if FRO is available on all the Car Products of OCS for the given Comb_ND.

Price Calculation

A car rental company may set FRO Prices for a Car Product using any method of car rental company's choosing. Once the FRO Prices have been set for each Car Product, the next Act is to create a framework to compute FRO Price for a group of Car Products (such as a Car Set, a Car Order or any other group) by using FRO Prices for each Car Product in the group.

The parameter Car_Product_OP refer to FRO Price (and may or may not be corresponding to a Notify Deadline) associated with a Car_Product. Similarly, Car_Set_OP and Comb_OP refer to FRO Price (may or may not be corresponding to a Notify Deadline) associated with a Car Set and a combination of two or more Car Sets, respectively. A set of Car_Product_OPs, Car_Set_OPs and Comb_OPs is termed Car_Product_OP_Set, Car_Set_OP_Set and Comb_OP_Set, respectively. The Comb_OP_Set is computed by combining the Car-Set_OP_Sets of the ICS and all the OCSs (existing and new). A Set_OP_Set is computed by combining the Car-Product_OP_Sets of all the Car Products under that Car Set. One or more Car_Set_OP_Rules may be read from the car rental company's database and applied to calculate Car_Set_OP_Set for each input Car_Set (ICS and all OCSs) using the Car_Product_OP_Sets of all the Car Products of said Car Set. A car rental company may use any Car_Set_OP_Set Rule of its choosing. Car_Set_OP_Rules may be defined to calculate Car_Set_OP as the sum, average, highest, lowest or any other function of Car_Product_OPs of all the Car Products at a given Comb_ND. Similarly, a Comb_OP_Set comprises one or more Comb_OPs, and is calculated using one of the predetermined rules, termed Comb_OP_Rules, to combine the Car_Set_OPs of all the Car Sets in the combination. A car rental company may use a Comb_OP_Rule of its choosing. Comb_OP_Rules may be defined similar to the Car_Set_OP_Rules.

Concurrent Get FRO Process

As explained above, in the Concurrent Get FRO process, a customer receives all FRO Cars concurrently in one transaction. An algorithmic illustration of an example of the Concurrent Get FRO process is displayed in FIG. 81. The FRO (2, 1) instance is assumed here as an example. Consider a customer who desires to trade-in his/her flexibility in lieu of a price (reward) offered by the car rental company. In Act 81.100, the customer desires for FRO are input, including, but not limited to, a search criteria for two Sets according to customer's utility (may be similar to the search criteria defined above for the Sequential Get FRO process).

Next, in Act 81.110, the FRO algorithm is run to determine the combinations of two Sets that satisfy inputs. A list of such search results is displayed for the customer along with the associated terms and conditions including, but not limited to, Notify Deadlines, Initial FRO Price, FRO Exercise Price and Car Product Price for each such combination. The FRO algorithm for the Sequential Get FRO process (defined above) may also be used for the Concurrent Get FRO process.

Next, in Act 81.120, the customer selects a desired combination of two Sets and the associated conditions such as FRO Exercise Price/Notify Deadline. Next, in Act 81.130, a payment transaction is executed, if needed. For example, the customer may pay the Car Rental Price after taking into consideration the Initial FRO Price using a credit card, direct bank account debit or any other payment transaction mechanism. Next, the algorithm ends in Box 81.200. The computation may be performed using a processor that may calculate results in optimal time.

2. Event Optimizer

After the completion of the Get FRO process, the next stage is the Event Optimizer. In this stage, the customer notification (or CN, in short) process as shown in Act 76.200 is executed. In this process, one or more decisions on the selection of Chosen Car(s) is notified to the customer. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

The FRO VOF helps to create a flexible customer inventory. In other words, by using the FRO VOF, a car rental company may obtain rights to allocate any of the selected FRO Car to a FRO customer, and thus, said FRO customer acts like a flexible customer inventory that the car rental company may manage at known cost and conditions. A car rental company may design one or more uses of such flexible customer inventory, where each such use may include one or more events that follow the Initial Transaction. An example (the Buy_N process) was explained earlier. In the Buy_N process, a car rental company may use the FRO VOF to accommodate requests from potential customers for Car Products. As an example, the Buy_N process may especially be used to satisfy requests for Car Products that have already been sold or have low (or no) availability. The details for the Buy_N process are presented below.

Another example to use the FRO VOF would be to use the FRO VOF in conjunction with one or more other VOFs, for example, the ACO (the Alternate Car Option) VOF (details are provided later). A car rental company may form a group of one or more ACO customers and one or more FRO customers, where the options (ACO and FRO) obtained by the group members are complementary in nature. As an example, consider a customer (A) who bought an ACO to choose either of C1 and C2 as Chosen Car, and consider a customer (B) who received a FRO and is flexible to take any of C1 and C2 as Chosen Car. Thus, if A decides to choose C1 as the Chosen Car, the car rental company may assign C2 as the Chosen Car for B, and vice versa. The customers A and B have taken complementary options and may form a group. The car rental company may need to hold only one unit of inventory in C1 and C2 to satisfy the needs of both A and B (assuming each A and B only need one unit of Car Product). Such a combination of complementary options or VOFs may improve efficiency and concurrently enhance value for all the parties involved (in the given example, for A, B and the car rental company). More details on combining VOFs are provided later.

The FRO VOF may also be used to reduce operational costs, constraints or other goals that are impacted by the allocation of Car Products among different customers. For example, if a car rental company experiences a car type with very low sales, it could offer that car type as FRO to customers and thus, be able to economically and efficiently shift customers from car type with very high sales volume to the car types with very low sales volume and thereby be able to sell said high sales volume car types at a much higher price, in case of excess demand. The FRO VOF structure in the car rental industry may enable a car rental company to optimize operational levels such as car occupancy (or occupancy factors) and so on. There may be many other instances of optimization a car rental company can achieve by using FRO, thus, generating additional revenue, greater customer satisfaction and loyalty or any combination of these.

A car rental company may use the FRO VOF for any other purpose of its choosing. In all such uses, the car rental company may use a system defined below that can help to optimally allocate Car Products among customers. The following system presents an example of a system (along with its methods and algorithms) that may be used to shift FRO customers within their selected FRO Cars. However, a car rental company may use any other process of its choosing to shift FRO customers within their selected FRO Cars. The Buy_N process is used as an example to demonstrate the system and its set of methods and algorithms.

The process of shifting Y customers (i.e., FRO customers) within their selected FRO Cars is termed "Remove_Y" process. The Remove_Y process may allow the car rental company to remove FRO customers from their Accounted Car Products and optimally shift them to one of their Awaiting Car Products to satisfy a pre-defined goal.

The car rental company, an entity other than the car rental company and/or any combination thereof may store the data in a data store which may include, but is not limited to, the value that may be realized if the customer is shifted, Awaiting Cars to which the customer may be shifted and so forth. The car rental company, an entity other than the car rental company and/or any combination thereof may receive and process data to determine from among all or substantially all possible combinations of customers, a set of customers which may be shifted. The car rental company, an entity other than the car rental company and/or any combination thereof may shift one or more set of customers that may be determined by processing the data. The car rental company may also shift one or more set of customers other than the combination of customers that may be determined by processing said data. Set of customers which may be shifted or the decision to initiate shifting may depend upon number of factors including, but not limited to, the need and urgency to shift the customers, factors of car rental company's choosing, creation of number of units of Car availability, optimizing revenues which may for at least one of the customer, car rental company and/or an entity other than said car rental company, cost savings and so forth.

The car rental company may, on detection of occurrence of one or more events, execute one or more event response algorithm which may determine one or more set of customers possessing options making them eligible to be shifted to one or more Cars and may shift one or more of said set of customers to create Car availability. Said event may be an increase in the demand of one or more Cars or increase in forecasted demand of one or more Cars or any combination thereof or any other event. The shifting may be done at the instance of the car rental company, an entity other than said car rental company or any combination thereof. The set of customers, here, may include one or more customers. The shifting may involve shifting of one or more customers. The shifting of one or more customers, as explained below in Remove_Y, may involve one or more interactions between the car rental company, an entity other than the car rental company, the customers and/or any combination thereof. The shifting may involve shifting one or more first customers to one or more first Cars after one or more second customers from one or more first Cars are shifted to one or more second Cars and so forth. Such a cascading process may continue until the last customer which may have to be shifted in the set is shifted and it may lead to shifting of more customers than the creation of number of units of Car availability. This process may involve two or more customers. This process has been explained in detail in below in the Remove_Y. The car rental company and/or an entity other than the car rental company may or may not notify the customer regarding said shifting within the specified Notification Deadline. The car rental company and/or an entity other than the car rental company may shift one or more customers to one or more Cars belonging to said car rental company, to one or more Cars belonging to an entity other than said car rental company and/or any combination thereof. Shifting may create a lot of value to the car rental company and may lead to enhanced revenues and/or cost savings. However, it may also be possible that shifting may sometimes be a cost to the car rental company and a car renal company may still apply shifting (Remove_Y) for fulfillment of other goals and/or objectives of the car rental company.

Buy_N Process

Figure 82:
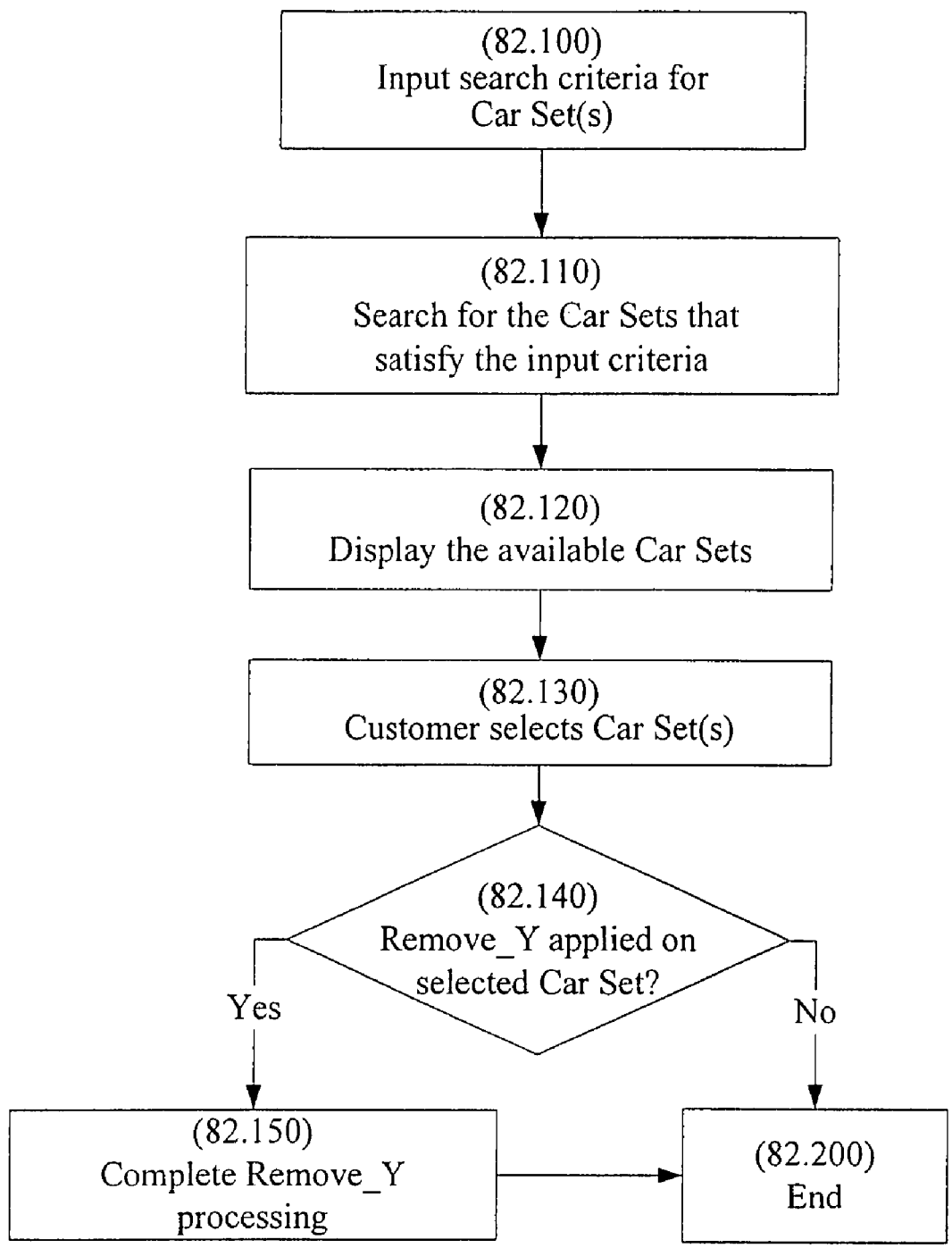
FIG. 82 is a flowchart illustrating the Buy_N process for a Car Set of a car rental company that has implemented the FRO VOF.

FIG. 82 displays a flow chart of an example of a Buy_N algorithm, which is executed during a dynamic interaction between the customer and the car rental company. As an example, an interaction may include a situation when a customer interacts with a car rental company to rent (or book) Car Products, or when a car rental company presents offerings to a customer (with or without a solicitation by the customer). A few parameters have been assumed to add context and enhance understanding. It is assumed that a customer is interacting with a car rental company to rent (or select or book) Car Products, and that the FRO VOF is implemented at the Set level. In Act 82.100, the search criteria are input. Various search parameters for a desired Car Set (as desired by the customer) are taken as the input to the system.

Next, in Act 82.110, a search process is executed to search for all Car Sets that satisfy inputs. The details of the search process are described later. Next, in Act 82.120, all the search results are displayed before the customer in an interface (such as in a web browser, a telephone operator stating the search results over the phone etc.). Control then goes to Act 82.130, where the customer selects a Car Set. The selection of the Car Set may be followed by a payment and/or purchase of the selected Set.

In Act 82.140, a test is performed to determine whether Remove_Y process has been applied on the selected Car Set. If so, control goes to Act 82.150, where the Remove_Y process is completed for the selected Car Set, and control then goes to Box 82.200. If not, control goes to Box 82.200, where the algorithm exits. The completion of the Remove_Y process may include one or more Acts that may be executed to incorporate the fact that said Car Set was selected by the customer. For example, one of such acts may be to record the selection of said Car Set to a database and/or to change the Accounted Status for one or more FRO customers (who were affected in the Remove_Y process).

Figure 83:
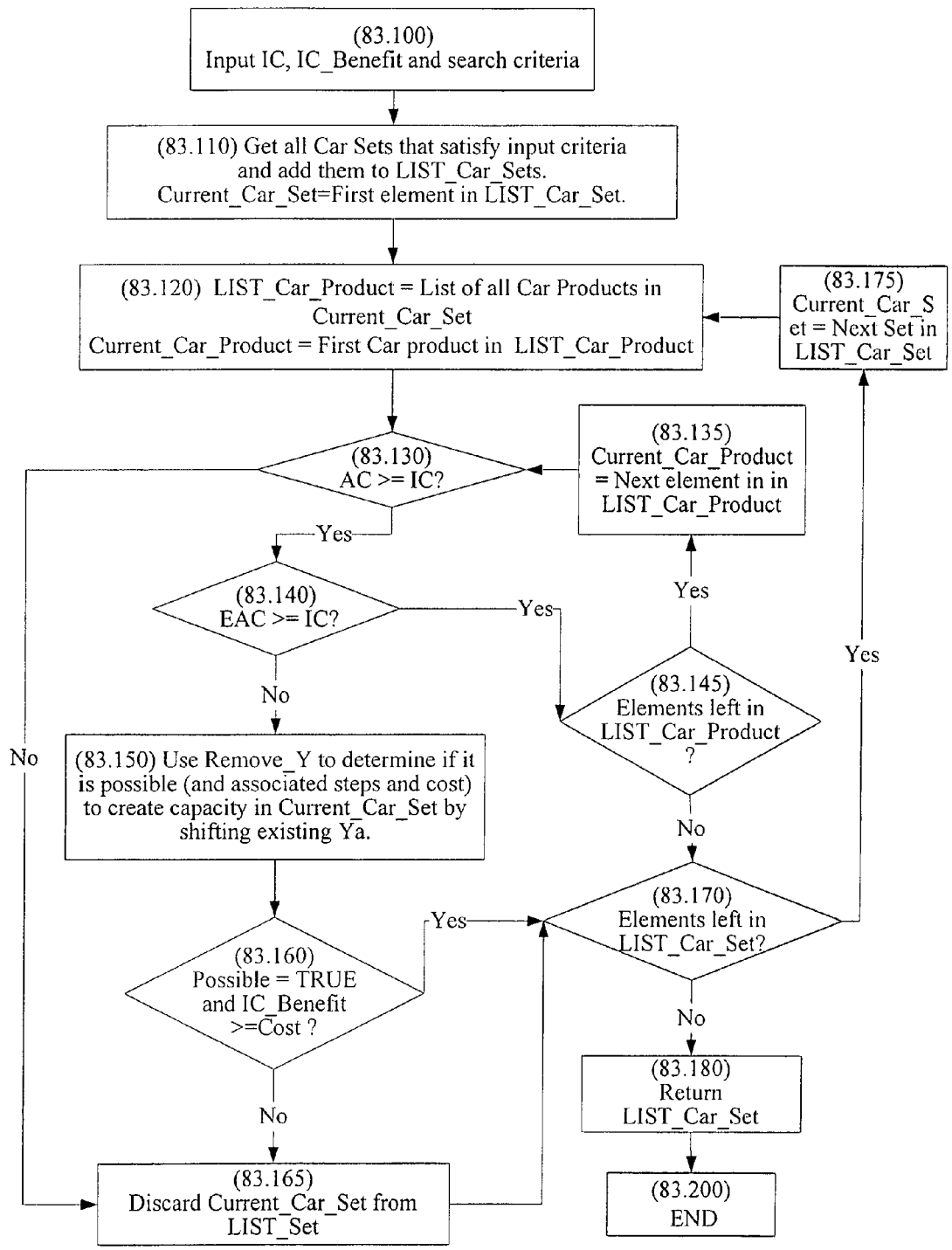
FIG. 83 is a flowchart that expands Act 110 of FIG. 82, illustrating an algorithm for the Buy_N search process.

FIG. 83 expands Act 110 of FIG. 82 and demonstrates an example of a search algorithm that may be used to determine Car Sets that satisfy the inputs. In Act 83.100, IC (number of incoming customers), IC_Benefit (i.e., the benefit that a car rental company may receive if the incoming customers select and/or purchase one or more Car Sets) and the input search criteria are taken as the input parameters to the system. The term "Incoming Customers" refers to the customers who interact with the car rental company in the current transaction (Buy_N). It is assumed that each customer desire one unit of capacity and thus, total units of capacity desired is equal to the total number of incoming customers. In some situations, IC_Benefit and/or IC may not be available as an input, and may be calculated during the search process. Next, in Act 83.110, all the Car Sets that satisfy the 'search criteria' are searched from the car rental company database. The Car Sets, thus obtained, are added to a list termed LIST_Car_Set. The first element in the LIST_Car_Set list is designated as Current_Car_Set.

Next, in Act 83.120, all the Car Products in the Current_Car_Set are added to a list termed LIST_Car_Product. The first element in the LIST_Car_Product list is designated as Current_Car_Product. Next, in Act 83.130, a test is performed to determine whether the Available Capacity (AC) of the Current_Car_Product is greater than or equal to IC. If so, control goes to Act 83.140. If not, control goes to Act 83.165.

In Act 83.140, another test is performed to determine whether EAC (Effective Available capacity) of the Current_Car_Product is greater than or equal to IC. If so, control goes to Act 83.145. If not, control goes to Act 83.150, where the Remove_Y algorithm is executed to determine the possibility (and associated process steps and costs) to create capacity in the Current_Car_Set.

Next, in Act 83.160, a test is performed to determine whether it is possible (by using Remove_Y) to create capacity in the Current_Car_Set and the IC_Benefit is greater than or equal to the cost to create that capacity as determined in the Act 83.150. If both conditions are true, control goes to Act 83.170. If either condition is false, control goes to Act 83.165. In Act 83.165, the Current_Car-Set is discarded from the LIST_Car_Set list, and control then goes to Act 83.170.

In Act 83.145, a test is performed to determine whether more elements are left in the LIST_Car_Product list. If so, control goes to Act 83.135, where the next element in the LIST_Car_Product list is designated as the Current_Car_Product and control loops back to Act 83.130, to repeat the process for the new Current_Car_Product. If not, control goes to Act 83.170.

In Act 83.170, another test is performed to determine whether more elements are left in the LIST_Car_Set list. If so, control goes to Act 83.175, where the next element in the LIST_Car_Set list is designated as the Current_Car_Set and control loops back to Act 83.120, where the process for the new Current_Car_Set is performed. If not, control goes to Act 83.180, where the LIST_Car_Set list (the most recently updated version after discarding the invalid Car Sets, if any) is returned. Next, the algorithm ends at Box 83.200.

Figure 84:
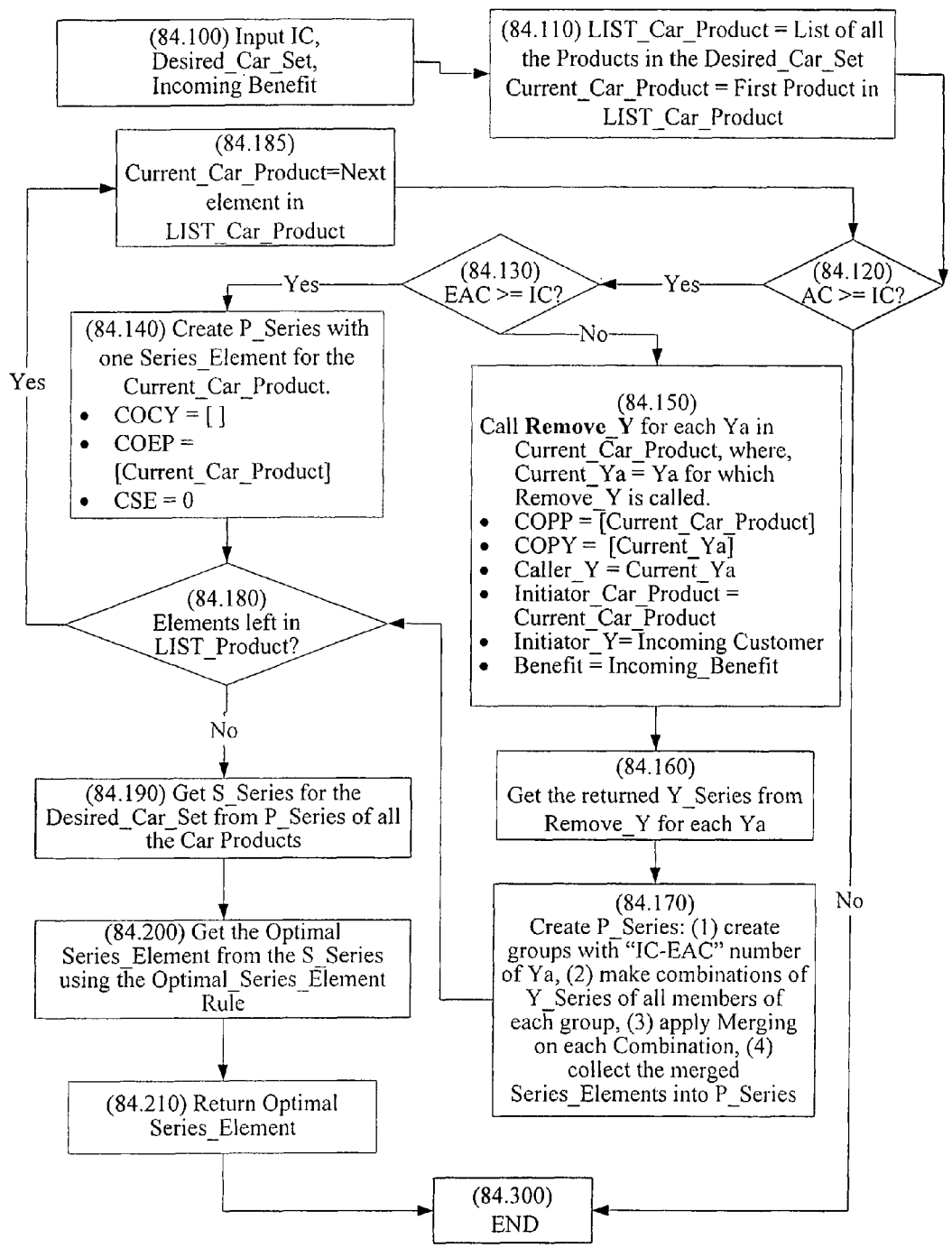
FIG. 84 is a flowchart that expands Act 150 of FIG. 83, illustrating an algorithm to create capacity using the Remove_Y algorithm.

FIG. 84 expands Act 150 of FIG. 83 and demonstrates an example of an algorithm to apply the Remove_Y algorithm to create one or more than one unit of capacity in one or more Car Product(s) within a Desired_Car-Set (the Car Set in which capacity needs to be created). In Act 84.100, various input parameters are taken in the system. Input parameters include IC, Desired_Car_Set and Incoming_Benefit (i.e., benefit a car rental company may realize if capacity is created in the Desired_Car-Set)

Next, control goes to Act 84.110, in which all the Car Product(s) in the Desired_Car_Set are listed in the LIST_Car_ Product list. The first Car Product in the LIST_Car_Product list is designated as Current_Car_Product. Next, in Act 84.120, a test is performed to determine whether the Available Capacity (AC) of the Current_Car_Product is greater than or equal to IC. If so, control goes to Act 84.130. If not, control goes to Box 84.300, where the algorithm ends. In Act 84.130, another test is performed to determine whether EAC (Effective Available capacity) of the Current_Car_Product is greater than or equal to IC. If so, then control goes to Act 84.140. If not, control goes to Act 84.150.

In Act 84.140, a P_Series is created for the Current_Car_Product. Since the Current_Car_Product is an End_Car_Product, there will be only one Series_Element in the P_Series collection. The Series_Element will comprise COEP with the Current_Car_Product as the only element, COCY with no elements and CSE with zero value (since no Ya needs to be removed from Current_Car_Product, and hence, no cost to create capacity). Next, control goes to Act 84.180.

In Act 84.150, the Remove_Y algorithm is called for each Ya in the Current_Car_Product and the algorithm follows a recursive loop. Each of the Ya becomes Current_Ya for the corresponding Remove_Y call. The necessary input parameters for each of the Remove_Y includes the Current_Car_Product as 'COPP', Current_Ya as 'COPY', Current_Ya as 'Caller_Y', Current_Car_Product as 'Initiator_Car_Product', one of the incoming customers as 'Initiator_Y' and Incoming_Benefit as 'Benefit'. The Remove_Y call returns a Y_Series collection for each Ya in the Current_Car_Product. The details of the Remove_Y algorithm are discussed in the next section.

Next, control goes to Act 84.160, where all the Y_Series collections are obtained as returned from the Act 84.150. Next, in Act 84.170, a P_Series collection for the Current_Car_Product is calculated through the following operations: (1) create groups of Ya from all Ya of the Current_Car_Product for which Remove_Y was called, where the number of Ya in each group is equal to "IC-EAC" (EAC of the Current_Car_ Product), (2) make combinations of the Y_Series collection of all members of each group (combine each Series_Element of each Y_Series of each member with that of each of the rest of the members of that group), (3) merge all members within each combination to formulate a merged Series_Element, (4) collect all such merged Series_Elements, thus obtained, into P_Series collection of the Current_Car_Product. Details on making combinations and merging are provided later.

Next, in Act 84.180, a test is performed to determine whether more elements are left in the LIST_Car_Product list. If so, control goes to Act 84.185, where the next element in the LIST_Car_Product list is designated as the Current_Car_Product and control loops back to Act 84.120 to repeat the process for the new Current_Car_Product. If not, control goes to Act 84.190.

In Act 84.190, a S_Series collection for the Desired_Car_Set is calculated from the P_Series collections of all the Car Products using the combination and merging process (details provided later). Next, in Act 84.200, an optimal Series_Element from the S_Series collection is determined using Optimal_Series_Element Rule (which is read from a database). Next, control goes to Act 84.210, where the optimal Series_Element is returned and the algorithm exits at Box 84.300.

'Remove_Y' Algorithm

Figure 85:
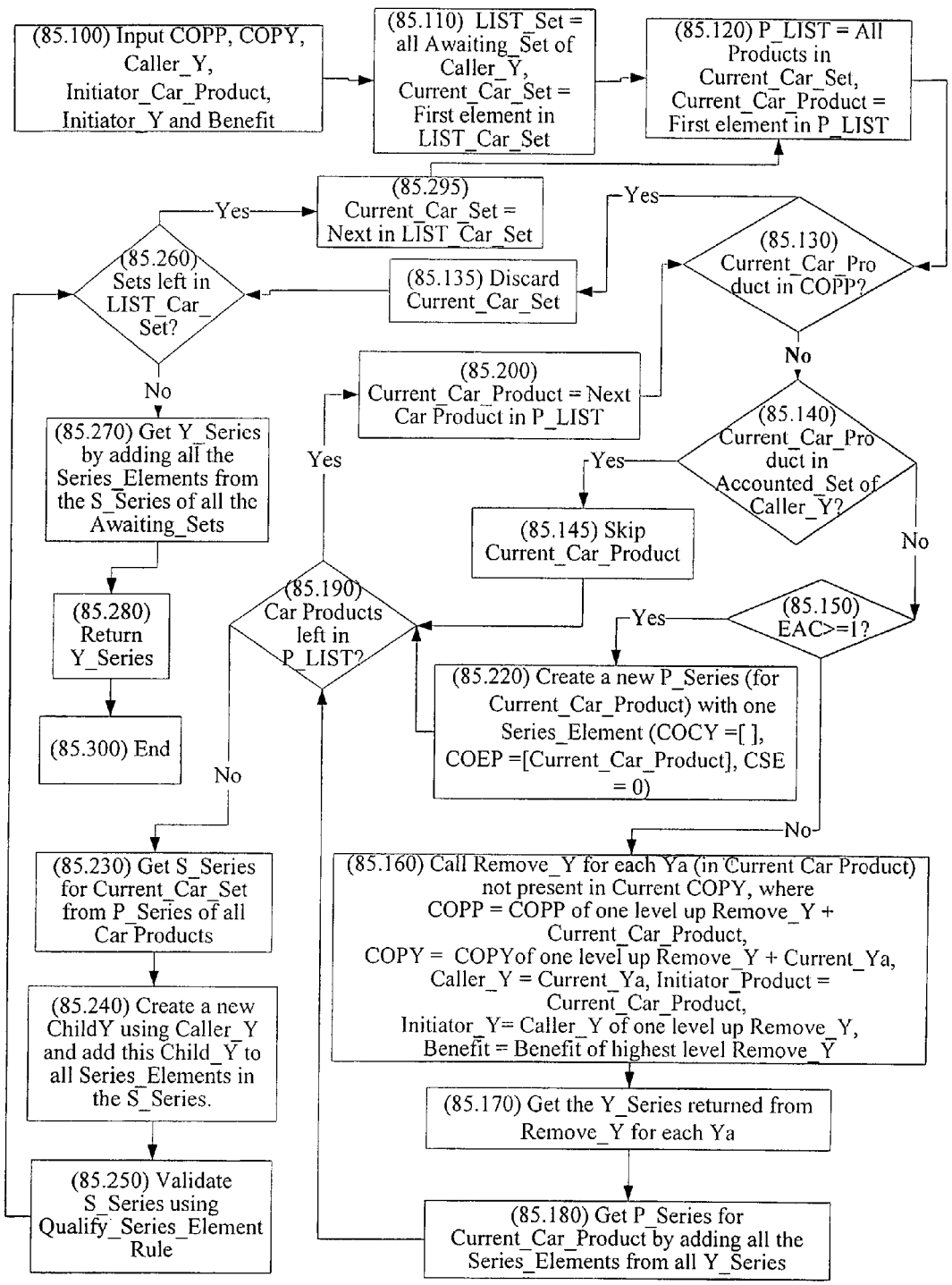
FIG. 85 is a flowchart that expands Act 150 of FIG. 84, provides an algorithmic illustration for the Remove_Y algorithm.

The following algorithm presents an example of an algorithm that may be used to create one unit of capacity of a Car Product by shifting a Ya Accounted in a Car Product to its Awaiting_Set. FIG. 85 represents an algorithmic illustration for Remove_Y. The Remove_Y is a recursive algorithm, which returns a collection of Series_Element termed "Y_Series" collection for the Ya for which the algorithm has been called.

In Act 85.100, a set of parameters including COPY, COPP, Caller_Y, Initiator_Car_Product, Initiator_Y and Benefit are input to the system. Next, in Act 85.110, all the Awaiting_Sets of the Caller_Y are added to a list termed LIST_Car_Set. The first element in the LIST_Car_Set list is designated as Current_Car_Set. Next, in Act 85.120, all the Car Products that belong to the Current_Car_Set are added to another list termed P_LIST. The first element in the P_LIST list is designated as Current_Car_Product.

Next, in Act 85.130, a test is performed to determine whether the Current_Car_Product is present in the COPP. If so, the Current_Car_Set is discarded in Act 85.135, and control goes to Act 85.260. If not, control goes to Act 85.140.

In Act 85.140, another test is performed to determine whether the Current_Car_Product is present in the Accounted_Set of the Caller_Y. If so, the Current_Car_Product is skipped in Act 85.145, and control then goes to Act 85.190. If not, control goes to Act 85.150, where another test is performed to determine if the EAC of the Current_Car_Product is greater than or equal to 1. If so, control goes to Act 85.220. If not, control goes to Act 85.160.

In Act 85.220, a new P_Series collection is created with only one Series_Element, since the Current_Car_Product is an End_Car_Product. The Series_Element will comprise COEP with the Current_Car_Product as the only element, COCY with no elements and CSE with zero value. Next, control goes to Act 85.190.

In Act 85.160, the algorithm enters into a recursive loop where the Remove_Y algorithm is called for each of the Ya in the Current_Car_Product that is not present in the COPY. Each of the Ya becomes Current_Ya for the corresponding Remove_Y call. The necessary input parameters for each of the Remove_Y includes 'COPP' (includes the COPP of one level up Remove_Y and the Current_Car_Product), 'COPY' (includes the COPY of one level up Remove_Y and the Current_Ya), the Current_Ya as 'Caller_Y', the Current_Car_Product as 'Initiator_Car_Product', Caller_Y of one level up Remove_Y as 'Initiator_Y' and benefit of the highest level Remove_Y as 'Benefit'. Each of the Remove_Y call returns a Y_Series collection for every Ya for which Remove_Y was called.

Next, in Act 85.170, the algorithm receives the returned Y_Series collection from all the Remove_Y algorithm calls in Act 85.160. Control then goes to Act 85.180, where a P_Series collection for the Current_Car_Product is calculated by adding all the Series_Elements from all the returned Y_Series collection obtained in Act 85.170. Control then goes to Act 85.190.

In Act 85.190, a test is performed to determine whether more Car Products are left in the P_LIST list. If so, control branches out to Act 85.200, where the next Car Products in the P_LIST list is designated as the Current_Car_Product, and control then goes to Act 85.130 where the process is repeated for the new Current_Car_Product. If not, control goes to Act 85.230.

In Act 85.230, the S_Series collection is calculated for the Current_Car_Set by combining and merging all the P_Series collection of all the Car Products (not taking the skipped Car Product(s) into consideration, if any). Next, in Act 85.240, a new ChildY is created using the Caller_Y. The ChildY comprises COI (where the current Initiator_Car_Product_is designated as Initiator_Car_Product and the current Initiator_Y is designated as Initiator_Y), Accounted_Set of the Caller_Y designated as the Initial_Accounted_Set, current Awaiting_Set designated as the Final_Accounted_Set, and the cost to shift current Caller_Y from the Initial_Accounted_Set to the Final_Accounted_Set designated as the CCY. The ChildY, thus created, is added to every Series_Element in the S_Series collection and the CCY of the same ChildY is added to the CSE (Cost of Series_Element) of every Series_Element. Control then goes to Act 85.250.

In Act 85.250, a Qualify_Series_Element rule is read from the car rental company's database and is applied to validate all the Series_Elements in the S_Series collection. The invalid Series_Elements are discarded from the S_Series collection. A car rental company may select any rule of its choosing. For example, a Qualify_Series_Element rule may only qualify those Series_Elements for which the CSE is less than or equal to the 'Benefit'. Next, control goes to Act 85.260.

In Act 85.260, a test is performed to determine whether more Car Sets are left in the LIST_Car_Set list. If so, control branches out to Act 85.295, where the next element in the LIST_Car_Set list is designated as the Current_Car_Set, and then control loops back to Act 85.120, where the process is repeated for the new Current_Car_Set. If not, control goes to Act 85.270, where the Y_Series collection is obtained by adding all the Series_Elements of all the S_Series collections for all the Awaiting_Sets of the Caller_Y. Next, the Y_Series collection is returned in Act 85.280, and the algorithm ends in Box 85.300.

Combinations of P_Series in order to formulate S_Series are calculated by cross multiplication of Series_Elements (of each P_Series). A car rental company may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, $C1=\{S_1[1], S_2[1], S_3[1], \ldots S_n[1]\}$, where, $S_p[1]$ denotes the first Series_Element of $p^{th}$ Series; $C2=\{S_1[2], S_2[1], S_3[1]. S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of Y_Series to formulate a P_Series.

Merging of a given number of Series Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various Car Products involved. A given unit of Car Product capacity at any given point must only be accounted for one customer, otherwise, it may lead to a shortage situation, where one Car Product is allocated to more than one customer leading to dissatisfaction for customers. A car rental company may choose any method of its choosing to perform merging of Series_Elements, and specifically to perform merging of two Series_Elements. The method of merging chosen may affect the total value realized. One example of such a method is given. In one approach, a car rental company may choose to discard all merged Series_Elements that have either one or more common ChildY or common End_Car_Product. A common ChildY in two Series_Elements suggest that in both Series_Elements shifting of one specific Ya is needed. If each Series_Element requires shifting of Ya to two different Car Sets, it may present a contradictory situation. Similarly, a common End_Car Product in two or more Series_Elements (that are to be merged together) may require to shift more than one Ya customer to a specific Car Product, which may or may not be feasible depending on the AC (and EAC) of that Car Product. Thus, a common End_Car_Product may also represent one or more contradictory or invalid situations.

A car rental company may use any set of rules to validate or invalidate one or more constituents of any of the merged components. For example, a merged Series_Element, M, obtained from merging of two Series_Elements S1 and S2, may comprise the COEP (addition of COEP of S1 and S2), COCY (addition of COCY of S1 and S2) and CSE (addition of CSE of S1 and S2).

Remove_Y and Buy_N processes may generate value for the car rental company, an entity other than the car rental company, customers and/or any combination thereof. The value may include, but is not limited to cost savings for the car rental company, an entity other than said car rental company, any combination thereof. The value generated may also include, but is not limited to, soft value, value attributable to customer goodwill, satisfaction and loyalty. The value so generated may optimize revenue of at least one entity other than said car rental company.

Customer Notification Process

In the customer notification (CN) process, a decision for the Chosen Car is notified to the customer. As mentioned earlier, the Chosen Car may be defined by the car rental company, the customer, another entity or any combination thereof. However, the car rental company may want to keep the right to select (or define) the Chosen Car in the FRO VOF. A car rental company may use any method of its choosing to define the Chosen Car. A car rental company may use a software application built on the method defined above to optimally define the Chosen Car to FRO customer.

Figure 86:
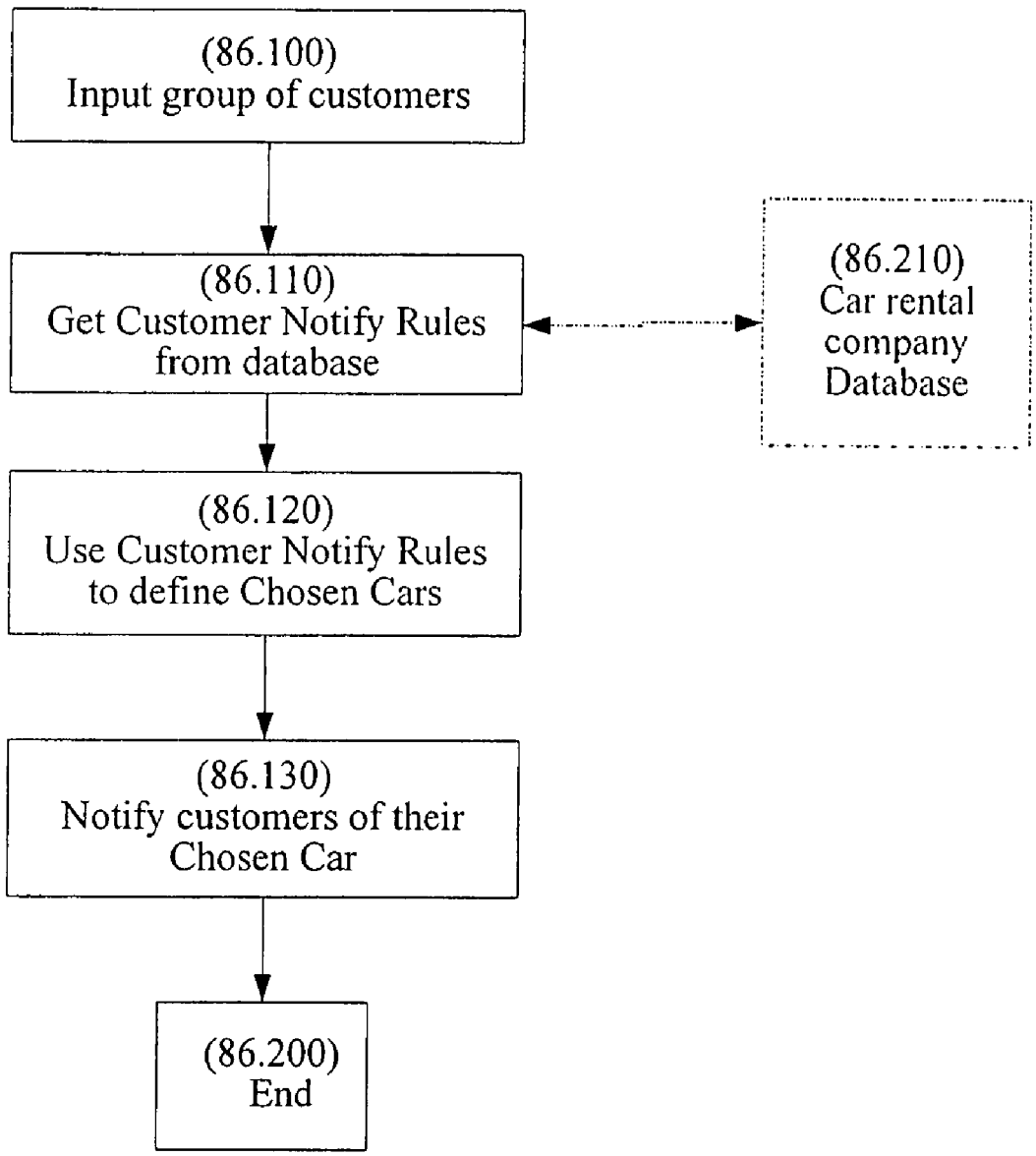
FIG. 86 is a flow chart illustrating an example of an algorithm of Customer Notification process in the car rental industry.

FIG. 86 displays an example of an algorithm that may be used to execute the Customer Notification process. In Act 86.100, a group of (one or more) customers is taken as input. Next, in Act 86.110, a set of one or more Customer Notify Rules may be used to define the Chosen Car. A car rental company may choose any Customer Notify Rule of its choosing. The Customer Notify Rules may depend upon expected value of the Car Product, expected sales volume and so forth. For example, a car rental company may choose a Customer Notify Rule which selects the Car Product with the higher value as the Chosen Car. Alternatively, a rule may be chosen which selects the Car Product with the lower value as the Chosen Car. While defining the Chosen Car, a car rental company may also want to use the Remove_Y algorithm (as used in the Buy_N process given above) to determine the optimal Chosen Car that satisfies a pre-determined goal. Thus, during the CN process, one or more Ya may be shifted in the process of selecting the optimal Chosen Car. A Customer Notify Rule may also select the Car Product with the higher sales volume as the Chosen Car. A Customer Notify Rule may specify that if FRO VOF is used in conjunction with any other VOF (such as APO VOF and so on), then the Grouping Rules (defined later) may govern the selection of the Chosen Car.

Next, in Act 86.120, the Customer Notify Rules, thus obtained from the car rental company's database, are used to define Chosen Car(s). Next, in Act 86.130, the customers are notified about their Chosen Car(s), and the algorithm then ends in Box 86.200.

Implementation of FRO VOF in Conjunction with Other VOFs

FRO VOF may be used in conjunction with one or more other VOFs, for example, the ACO (the Alternate Car Option) VOF. A customer who receives an ACO is termed "A" type of customer. A car rental company may form a group of one or more ACO customers and one or more FRO customers, where the options (ACO and FRO) obtained by the group members are complimentary in nature. As an example, consider an A customer who bought an ACO to choose either of C1 and C2 as the Chosen Car, and consider a Y customer who received a FRO and is flexible to take any of C1 and C2 as the Chosen Car. Thus, if A decides to choose C1 as the Chosen Car, the car rental company may assign C2 as the Chosen Car for Y, and vice versa. The customers A and Y have taken complimentary options and may form a group. The car rental company may need to hold only one unit of inventory in C1 and C2 to satisfy the needs of both A and Y (assuming each A and Y only need one unit of Car). Such a combination of complimentary options or VOFs may improve efficiency and concurrently enhance value for all the parties involved (in the context of the current example, enhance value for A, Y and the car rental company).

The implementation of the grouping of A type and Y type of customers may be done in one or more ways. One way to implement such grouping is to first have one or more Y type of customers and based on such customer(s), the car rental company may offer complimentary ACOs to customers to make groups. In another implementation, the car rental company may first offer ACO and based on such ACO customer(s), car rental company offers complimentary FRO to the customers to make groups. In yet another implementation, the car rental company may offer ACO and FRO separately and then define a process to make complimentary groups of A and Y customers (such groups termed "AY_Groups").

A car rental company may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an ACO to choose either of C1 and C3 as the Chosen Car, a Y1 customer who received a FRO and is flexible to take any of C1 and C2 as the Chosen Car and a Y2 customer who has also received a FRO and is flexible to take any of C2 and C3 as the Chosen Car. A notation A-Y1-Y2 represents this example. Thus, if A decides to choose C1 as the Chosen Car, the car rental company may assign C2 as the Chosen Car for Y1 and C3 as the Chosen Car for Y2. Alternatively, if A decides to choose C3 as the Chosen Car, the car rental company may assign C1 and C2 as the Chosen Cars for Y1 and Y2, respectively.

It is assumed that a "unit" represents one unit of Car (or Car capacity) and each customer needs only one unit of a Car. Continuing with the above example, if the car rental company were to not consider the complimentary nature of options obtained by A, Y1 and Y2 customers, the car rental company may need to hold (or block) a total of 4 units of capacity to ensure complete satisfaction of needs of A, Y1 and Y2, i.e., 2 units for A (1 unit each of C1 and C3 as A could choose any Car), 1 unit for Y1 (of either C1 or C2) and 1 unit for Y2 (of either C2 or C3). This implies, to satisfy a total need of 3 units of Car Products, the car rental company may need to hold (or block) 4 units of Car Product capacity, creating a redundant capacity of 1 unit that the car rental company may not be able to use otherwise. By creating a complimentary group of A-Y1-Y2, the car rental company needs to only hold (or block) 3 units of capacity (1 unit each in C1, C2 and C3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A car rental company may choose to implement grouping at various Car levels such as Car Product, Car Set and Car Order. A car rental company may also change terms and conditions of one or more option contracts of one or more FRO and/or ACO customers (for e.g., price, notify deadline and so on) to solicit customer participation in FRO/ACO to create more AY_Groups. The car rental company may also offer incentives to customers to choose complimentary FRO/ACO offerings to enable the car rental company to create more AY_Groups. The implementation methods mentioned above for grouping are for illustration purposes only and a car rental company may choose to implement grouping in one or more other ways or by combining above said methods or by combining one or more other ways along with one or more above said methods.

Figure 87:
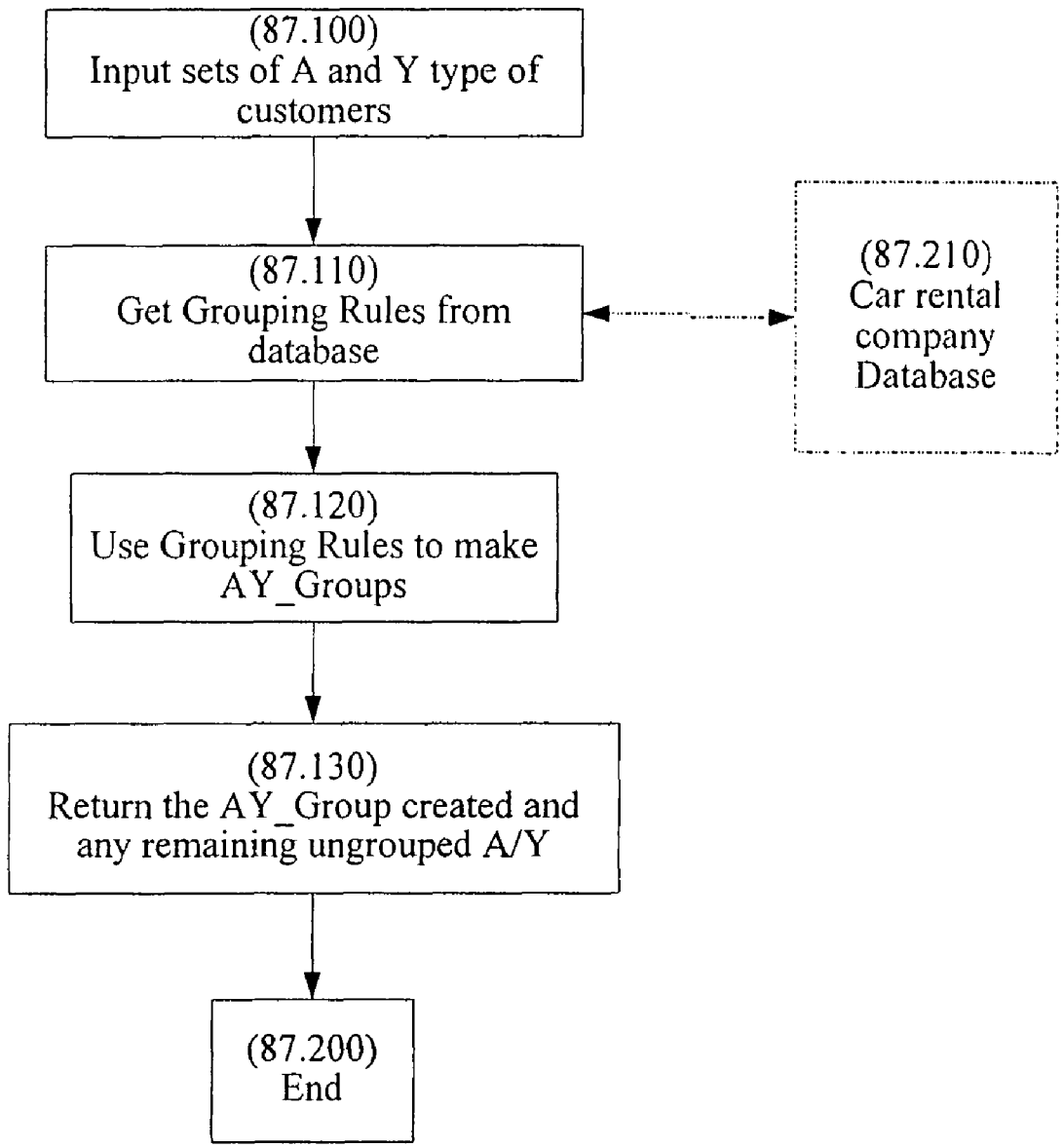
FIG. 87 is a flowchart illustrating an example of an algorithm to implement grouping of A and Y type of customers in the car rental industry.

FIG. 87 displays a flow chart that illustrates one way of implementing grouping of A and Y type of customers. In Act 87.100, sets of A and Y customers are taken as input. Next, in Act 87.110, a set of one or more Grouping Rules is read from the car rental company's database (87.210). A grouping rule may depend upon the number of A and/or Y type of customers, desired capacity redundancy in the system, the permissible time factor to create AY_Groups, any other rule of car rental company choosing, any combination thereof and so on. For example, a car rental company may choose a Grouping Rule whereby new groups are created by first ungrouping one or more of the AY_Groups (created earlier but unexercised, for example, groups for which the customer has not been notified, or if notified, the customer has not utilized the Car Product and the terms of option contract allows for a change in the Chosen Car). A Grouping Rule may create groups of only those A and Y type of customers who have yet to be grouped and discarding all A/Y customers which have already been grouped. A car rental company may implement any Grouping Rule to formulate AY_Groups. The choice to Grouping rules may enhance the overall value for the car rental company (for example, reduce the total capacity required to satisfy Car Product needs for all A and Y customers). Theoretically, the number of units of the Car Product required (or blocked) should be equal to the number of customers renting the Car Product (assuming each customer wants one unit of Car Product). Thus, by implementing the grouping and with the help of appropriate Grouping Rules, the car rental company may attempt to achieve such theoretical minima.

Next, in Act 87.120, the Grouping Rules, so obtained from the car rental company's database, are used to make AY_Groups. Next, in Act 87.130, the AY_Groups so created are returned along with ungrouped A/Y, if any, and the process then ends in Box 87.200.

The grouping may enhance customers' experience, and may comprise operating a system that delivers a FRO to at least a "first customer" to utilize up to n of m selected Car Products for said first customer, where n is less than or equal to m; operating a system that delivers an ACO to at least a "second customer" to utilize up to k of p selected Car Products, where k is less than or equal to p; operating a system to define each of the k chosen Car Products, whereby after each of the k chosen Cars is defined, said second customer can utilize said chosen Car Product; operating a system wherein a car rental company defines t chosen Car Product(s) for said first customer after each of said k chosen Car Products is defined, wherein after each of said t Car Products is defined, said first customer can utilize said defined Car Product, where t is a less than or equal to n. Said t Car Products may be a subset of n Car Products, m Car Products or both. Said t Car Products or n Car Products or both may also include one or more Car Products not included in said m selected Car products. Similarly, k Car Products may be a subset of p Car Products, or may include one or more Car Products other than said p Car Products. The grouping may be performed for a multiplicity of at least one of said first or second customers and may combine together at least one of each of said first and second customers to formulate at least one group with at least one complementary set of options. The grouping may enable a car rental company, an entity other than the car rental company and/or any combination thereof to utilize at least one of said m or p Car Products at least after delivery of any of said first or second options. The car rental company and/or an entity other than the car rental company may implement FRO VOF where in the first and/or second customer in said grouping may be same. The notification conditions may be different, same or any combination thereof for the first and second option.

Said first and/or second option may or may not include any notification deadline condition. The car rental company, the second customer, an entity other than said car rental company and/or any combination thereof may define, at one or more times, at least one of said k Chosen Cars. The car rental company, the first customer, an entity other than said car rental company and/or any combination thereof may define, at one or more times, at least one of said p Chosen Cars. The first customer may select, at one or more times, at least one of said m Cars. The second customer may select, at one or more times, at least one of said p Cars. The car rental company and/or an entity other than the car rental company may receive from at least one of said first or second customer, at one or more times, an indication of one or more terms and conditions associated with said first or second options, respectively. Similarly, at least one of said car rental company and/or an entity other than said car rental company may deliver to at least one of said first or second customers, at one or more times, one or more terms and conditions associated with said first or second option, respectively. There may or may not be any payment transaction between the car rental company, an entity other than the car rental company, and at least one of said first and/or second customer.

The FRO VOF may be used in conjunction with one or more other VOFs, for example, the UCO VOF. A customer who received a UCO is termed "U" type of customer. A car rental company may form a group of one or more UCO customers and one or more FRO customers, where the options (UCO and FRO) obtained by the group members are complimentary in nature.

The implementation of the grouping of Y type and U type of customers may be done in one or more ways. One way to implement such grouping is to first offer and secure one or more Y type of customers and based on such customer(s), the car rental company may offer complimentary UCOs to other customers to make groups. In another implementation, the car rental company may first offer and secure UCO and based on such FRO customer(s), car rental company offers complimentary FRO to other customers to make groups. In yet another implementation, the car rental company may offer UCO and FRO separately and then define a process to make complimentary groups of U and Y customers (such groups termed "UY_Groups").

A car rental company may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(C1, C3), U1[up(C2), base(C3)] and U2[up(C1), base(C2)]. The notation Y(C1, C3) implies a customer Y who has received a FRO and is flexible to have either C1 or C2 as the Chosen Car. The notation U1 [up(C2), base(C3)] implies a customer U1 who received a UCO and wishes to get an upgrade from C3 (i.e., the base car) to C2 (i.e., the up car), and U2[up(C1), base(C2)] implies a customer U2 who received a UCO and wishes to get an upgrade from C2 (i.e., the base car) to C1 (i.e., the up car). A notation Y-U1-U2 represents this example. Thus, there are three cars C1, C2, and C3 and they are occupied by Y, U2, and U1 respectively. The three customers have different value needs. The customer Y is flexible on either C1 or C3 if he/she receives a desired reward for trading-in his/her flexibility. Customer U1 has a base car C3 and wishes to get C2 as the Up Car. If a car rental company is able to upgrade U1 from C3 to C2, it may generate incremental value for both the customer and the car rental company. But in the existing framework (i.e., without using conjunction of more than one VOFs), the car rental company may not be able to achieve this without an available capacity on car C2. Similarly, U2 has a base car C2 and wishes to get C1 as the Up Car. A car rental company may customize the desired values for the three customers by leveraging on Y's flexibility and upgrading U1 and U2. The car rental company may assign C3 as Chosen Car to Y, upgrade U2 from C2 to C1, and upgrade U1 from C3 to C2. The car rental company may be able to generate customer surpluses in the process of U1 and U2 upgrades, which would not have been possible normally. Thus, a car rental company may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the car rental company).

It is assumed that a "unit" represents one car (or car capacity) and each customer needs only one car. Continuing with the above example, if the car rental company were to not consider the complimentary nature of options obtained by Y, U1 and U2 customers, the car rental company may need to hold (or block) more than 3 units of capacity to ensure complete satisfaction of needs of Y, U1 and U2. This implies, to satisfy a total need of 3 cars, the car rental company may need to hold (or block) more than 3 cars, creating a redundant capacity of at least one car that the car rental company may not be able to use otherwise. By creating a complimentary group of Y-U1-U2, the car rental company does not need to hold any capacity, thus freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

A car rental company may choose to implement grouping at various levels. A car rental company may also change terms and conditions of one or more option contracts of one or more UCO and/or FRO customers (for e.g., price, notify deadline and so on) to solicit customer participation in UCO/FRO to create more UY_Groups. The car rental company may also offer incentives to customers to choose complimentary UCO/FRO offerings to enable the car rental company to create more UY_Groups. The implementation methods mentioned above for grouping are for illustration purposes only and a car rental company may choose to implement grouping in one or more other ways or by combining above said methods or by combining one or more other ways along with one or more above said methods.

Figure 88:
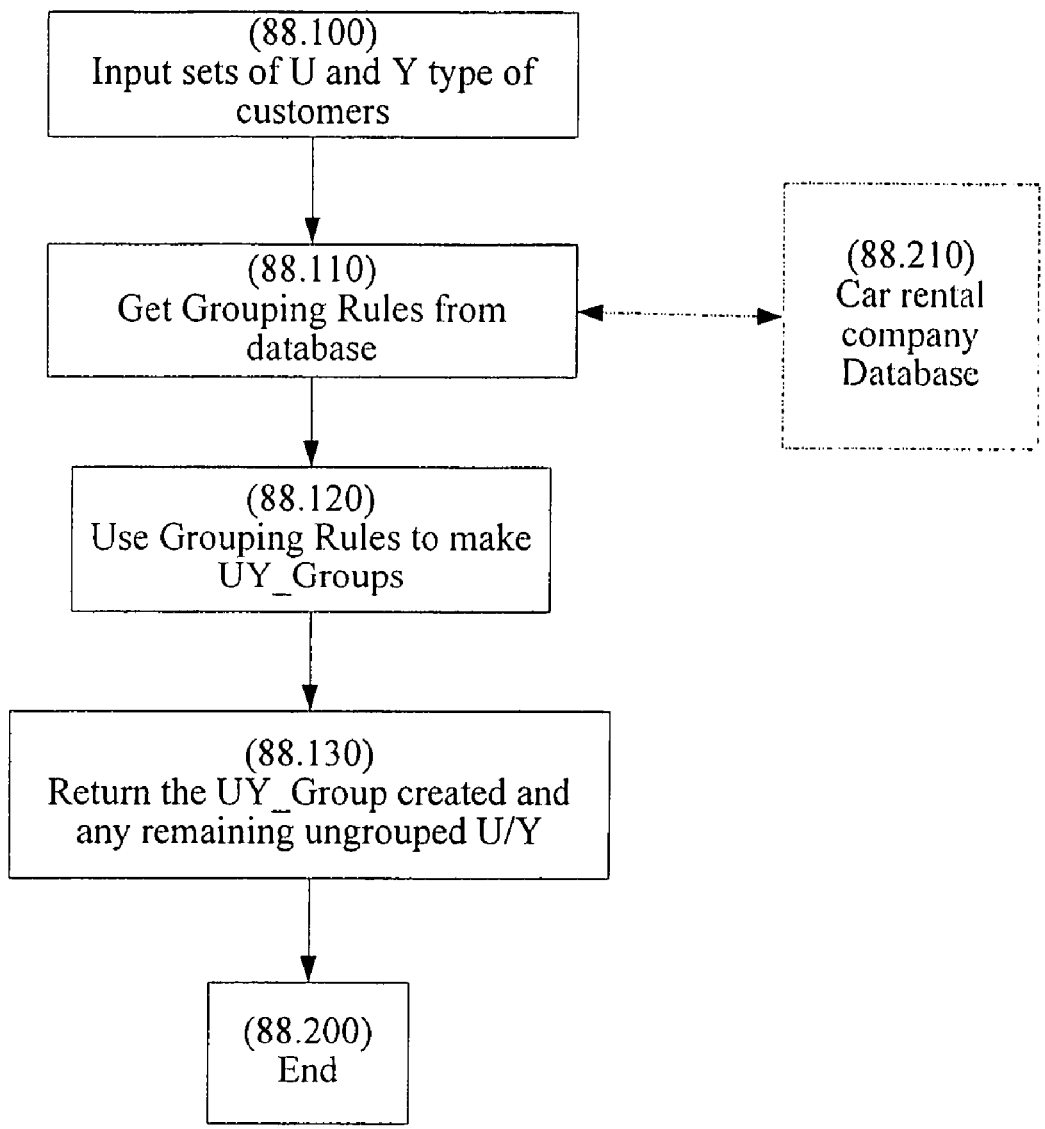
FIG. 88 is a flowchart illustrating an example of an algorithm to implement grouping of U and Y type of customers in the car rental industry.

FIG. 88 displays a flow chart that illustrates one way of implementing grouping of U and Y type of customers. In Act 88.100, sets of U and Y customers are taken as input. Next, in Act 88.110, a set of one or more Grouping Rules is read from the car rental company's database (88.210). A grouping rule may depend upon the number of U and/or Y type of customers, desired capacity redundancy in the system, the permissible time factor to create UY_Groups, any other rule of car rental company choosing, any combination thereof and so on. For example, a car rental company may choose a Grouping Rule whereby new groups are created by first ungrouping one or more of the UY_Groups (created earlier but unexercised, for example, groups for which the customer has not been notified, or if notified, the customer has not utilized the car and the terms of option contract allows a change in the Chosen Car). In another example, a Grouping Rule may create groups of only those U and Y type of customers who are yet to be grouped and discarding all U/Y customers, which have already been grouped. A car rental company may implement any Grouping Rule to formulate UY_Groups. The choice to Grouping rules may enhance the overall value for the car rental company (for example, reduce the total capacity required to satisfy car needs for all U and Y customers). Theoretically, the number of units of the car required (or blocked) should be equal to the number of units the customers shall be eventually utilizing. Thus, by implementing the grouping and with the help of appropriate Grouping Rules, the car rental company may attempt to achieve such theoretical minima.

Next, in Act 88.120, the Grouping Rules, so obtained from the car rental company's database, are used to make UY_Groups. Next, in Act 88.130, the UY_Groups so created are returned along with ungrouped U/Y, if any, and the process then ends in Box 88.200.

The grouping may enhance customers' experience, and may comprise operating a system that delivers a UCO to at least a "first customer" to utilize up to n of m selected cars for said first customer, and n is less than or equal to m; operating a system that delivers an FRO to at least a "second customer" to utilize up to k of p selected cars, and k is less than or equal to p; operating a system to define each of the k Chosen Cars, whereby after each of the k Chosen Cars is defined, said "second customer" can utilize said Chosen Car; operating a system wherein a car rental company defines t Chosen Car(s) for said "first customer" after each of said k Chosen Cars is defined, wherein after each of said t cars is defined, said first customer can utilize said defined car, where t is less than or equal to n. Said t cars may be a subset of n cars, m cars or both. Said t cars or n cars or both may also include one or more cars not included in said m selected cars. Similarly, k cars may be a subset of p cars, or may include one or more cars other than said p cars. The grouping may be performed for a multiplicity of at least one of said first or second customers and may combine together at least one of each of said first and second customers to formulate at least one group with at least one complementary set of options. The grouping may enable a car rental company, an entity other than the car rental company and/or any combination thereof to utilize at least one of said m or p cars at least after delivery of any of said first or second options. The car rental company and/or an entity other than the car rental company may implement FRO VOF where in the first and/or second customer in said grouping may be same. The notification conditions may be different, same or any combination thereof for the first and second option.

Said first and/or second option may or may not include any notification deadline condition. The car rental company, the second customer, an entity other than said car rental company and/or any combination thereof may define, at one or more times, at least one of said k Chosen Cars. The car rental company, the first customer, an entity other than said car rental company and/or any combination thereof may define, at one or more times, at least one of said p Chosen Cars. The first customer may select, at one or more times, at least one of said m Cars. The second customer may select, at one or more times, at least one of said p Cars. The car rental company and/or an entity other than the car rental company may receive from at least one of said first or second customer, at one or more times, an indication of one or more terms and conditions associated with said first or second options, respectively. Similarly, at least one of said car rental company and/or an entity other than said car rental company may deliver to at least one of said first or second customers, at one or more times, one or more terms and conditions associated with said first or second option, respectively. There may or may not be any payment transaction between the car rental company, an entity other than the car rental company, and at least one of said first and/or second customer.

Business Model to Implement FRO

As discussed above, different business models may be used to implement a FRO VOF. The business models mentioned below, without limitation, may be used to implement the FRO VOF in car rental industry. As an example, a car rental company may choose to implement a FRO VOF individually or in conjunction with one or more partners and/or other companies.

As mentioned in the above sections, for example, an entity may use the allocated Car Products to offer FRO to customers and/or to sell the Car Products as regular Car Products. The allocation of Car Product may be conditional. For example, one of the conditions may require a return of at least one allocated Car Product within a specified time period and/or other consideration(s).

The customer may select or book one or more Car Products from the car rental company and/or said entity and then interact with said entity to receive one or more FRO Car Products in relation to said (already purchased) Car Products. Said entity may also receive Car Product allocation from more than one car rental company, and thus, offer Car Products from multiple car rental companies to a single customer during the Initial Transaction for FRO.

The OA may use those Car Products and operate a service to offer FRO to the customers of the car rental company. As explained above in FIG. 13A, a customer may select one or more Car Products from the OA, and then receive FRO on those selected Car Products from the OA. Another approach would be for a customer to select one or more Car Products from the car rental company and then receive FRO on those selected Car Products from the OA. In another example, a customer may select one or more Car Products from both the car rental company and the OA, and then receive the FRO option on those selected Car Products from the OA. It is also possible that the customer receives FRO from the car rental company or both from the car rental company and the OA on a given set of selected Car Products.

The OA and the car rental company may simultaneously offer FRO to the customers, i.e., a customer may either approach the car rental company or the OA to receive FRO on desired Car Products. In another model, the OA may operate as the sole provider of FRO to all the customers of a car rental company. In yet another model, the OA and the car rental company may choose to work together and jointly offer FRO to the customers. The OA or the car rental company may offer FRO to customers using either or both of the Sequential or the Concurrent Get FRO processes.

As explained in FIG. 13A above, an OA may be able to offer FRO on Car Products from one or multiple car rental companies. An OA may receive allocation of cars from two or more car rental companies. A customer may book one or more Car Products from one or more car rental companies and/or from the OA, and then receive FRO on those selected Car Products from the OA. Even if the OA may not be entitled to or does not receive Car Product allocation from a car rental company, it may still be able to formulate an agreement with one or more car rental companies to offer FRO on the Car Products of said car rental companies. Thus, a customer may be able to receive FRO on Car Products from multiple car rental companies, giving the customer more value to trade-in their flexibility and variety to choose from. For example, a customer may receive FRO on two Car Products from two different car rental companies, and the OA and/or any one or all of the car rental companies will then notify the customer about the Chosen Car within the terms and conditions of the option contract. This may provide a lot of value to the customers for trading their travel flexibility, especially when the customer trips include destinations only served by a few car rental companies. An OA may be able to thus create a multi-car rental company FRO VOF Framework, which may tremendously enhance the value to the customers. All the participating car rental companies that allocate Car Products to and/or partner with the OA to offer FRO may also gain from the FRO network (benefits include reduced revenue spill, higher revenues from selling the FRO Cars at higher prices, and/or to sell FRO on those Car Products, enhanced overall customer satisfaction and/or other operational benefits). Either or both of the OA and the car rental company may process the tickets for the Chosen Cars associated with FRO received by the customer. A customer may receive bookings from the OA or the car rental company for the Car Products related to the FRO grant. Any entity (the OA and the car rental) may process bookings for the Car Products offered only by that entity or by either of the two entities.

The OA and the car rental company may engage in a business agreement to implement the FRO program. The business agreement may divide the total benefit generated by the FRO program between the two parties using any mechanism or criteria as desired. The total FRO Revenue Benefit may be shared between the two parties. The car rental company may allocate Car Products to the OA. One or more car rental companies may allocate only part of or their entire Car Product inventory to the OA to offer those Car Products to the customers by way of regular and/or FRO Cars. In return, the OA may offer some revenue or fee to the car rental company for all or a portion of the Car Products allocated. This fee may be given only for the Car Products that the OA is able to utilize or for all the allocated Car Products. The lending fee may be a lump sum amount, may depend upon the number of Car Products allocated or may depend on one or more factors as desired. The agreement may include a provision where the OA may return the allocated Car Products back to the car rental company at a certain time and date. There may be one or more conditions associated with the return of unused FRO Cars and/or Car Products from the Released Cars, including, but not limited to, returning the same Car Product, returning a higher value Car Product and so on. The car rental company may allot OA at least one Car Product and said OA may deliver FRO on at least one of said allocated Car Products. The OA may or may not enter into an agreement with the car rental company to provide such option on its Car Products. The OA may sell back at least one allocated Car Product to said car rental company or to at least one entity other than the car rental company or both.

An OA may offer a car rental company flexible customer inventory (generated FROm FRO) at one or more terms and conditions. The car rental company may be able to use this flexibility to generate benefit from one or more ways, such as the Buy_N process, reducing operational costs and so forth. Some of these examples have been explained earlier.

An OA may formulate an agreement with one or more car rental company's on one or more VOFs, such as on both APO and FRO VOFs, to offer a combination of VOFs to customers.

The FRO VOF may include different conditions regarding the payment of prices related to the FRO. For example, a customer may receive FRO Price only from the car rental company even if he/she is receiving Car Products and/or options from the OA. Similarly, the customer may receive FRO Price only from the OA even if he or she selected the Car Products and/or received the options from the car rental company's. The condition may also be set for a customer to make one or more payments to the car rental company for the Car Products and receive one or more payments from the car rental for the options received from that car rental company, and to make one or more payments to the OA for the Car Products and receive one or more payments from the OA for the options received from that OA. The condition may allow the customer to receive partial payments from the car rental company and the rest from the OA or vice versa, the basis of which distribution may depend upon various factors, including, but are not limited to, the factors of car rental companies choosing, the arrangement between the OA and the car rental company and so on. In another example, the customer may receive the FRO Price from the third party or may receive FRO Price from any of the combination of the entities mentioned above.

Information Technology System for FRO

A client-server architecture may be used to implement the FRO VOF. However, a car rental company may use a computer hardware and software infrastructure of its choosing to implement a FRO VOF.

The FRO VOF may be best implemented using one or more computer-implemented methods to operate a computer-implemented service to offer FRO to the customers, that include, but not limited to, recording the information pertaining to the offered and/or used FRO in a database. It may also include operating a computer-implemented service (and/or system) or other service (and/or system) to define the Chosen Cars, and recording said Chosen Cars (or defined Car Products) and all the Car Products related to a FRO in a database.

For the stage one (i.e., to formulate the FRO VOF), an application server may be used along with a database (e.g., a relational database) that stores all the information relevant to the car rental company and the customer. The database may include all the relevant information sufficient to identify Car Products the car rental company chooses to make eligible for FRO. One or more users (e.g., a business analyst or manager) may have full access to this server through Intranet or highly secured VPN environment to design an optimal value option framework. The database shall also store all the information pertaining to all the acts (in stage one) used by the car rental company while formulating the FRO VOF.

A similar or a different application server and/or a cluster of application servers (functioning concurrently) along with one or more web servers and a set of one or more database servers may be used for the Get FRO as explained in FIG. 13D above and CN (Customer Notification) processes in the stage two of the FRO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get FRO process and the Even Optimizer processes may be computer-implemented as explained and discussed above in FIGS. 13D and 13E. All the customer interactions and the related information such as customer needs, inputs, payment transactions etc. are stored in this database, including information pertaining to the interactions with those customers who may not receive FRO. The systems for stage two and stage one should be maintained in a synchronized environment so that each system has access to the most current information and can communicate with each other.

As discussed above, there may be other ways for implementing the FRO VOF which may depend upon including, but not limited to, the scale of the implementation, business requirements and number of entities involved. The entities may interact through a series of hardware products and services with the OA/car rental company server(s). The OA may or may not be different than the car rental company and the OA server may be the same as that of the car rental company server. The information technology and network system to implement FRO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the car rental company may have one or more separate temporary database structure wherein the entries are updated and stored until the final update is made in one or more main databases. One the final update is done, the entries in these temporary databases may be removed.

The entire system may run at the premises of OA, car rental company and/or any third entity or any combination thereof. It may also be possible to run a part of the system at one place and rest at one or more other places. The system may also be implemented even if one or more servers may be kept offshore locations and may be accessed remotely. The geographical locations of one or more hardware product and/or services may be different depending upon including, but not limited to, the factors of car rental company's choice, ease of accessibility, infrastructure facilities. The structure or the interaction architecture of the system may vary depending on factors including, but not limited to, the set up of the car rental company, changes in the technology and with the introduction of new and better technology enhancing the interaction process.

A customer may interact with either one or more of the Get FRO, Buy_N, the CN processes either directly or indirectly using a local or a remote terminal (e.g., a computer with a browser and an access to the Internet) that is able to access the web server(s) that host the Get FRO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the car rental company, an OA, a third party service provider or any combination of the above. In the model, where the OA receives Car Product allocation from the car rental company and offers FRO to the customers directly, the web server, application server and database for both stage one and stage two shall be managed by the OA. The OA may also have partial (or complete) access to the car rental company database and systems through a highly secured environment (for example, a virtual private network). In the model, when an OA and a car rental company tie-up together to offer FRO, all the computer hardware and software infrastructure for both stage one and stage two may be hosted by and/or property of either or both (mutually) of the sides depending upon the business agreement between them.

Each car rental company using the system and method taught herein can make its own choices as to how extensively to deploy the method. A car rental company can implement as few or as many of the foregoing options as it desires; or it may perceive and implement one or more other options.

Flexibility Reward Option (FRO) Value Option Framework in the Travel Industry

As explained above, FRO VOF can be implemented in any industry. The implementation of FRO in travel industry is discussed herein. Within the travel industry, the customer desire to trade-in travel flexibility (defined below) is used as the targeted value element. A detailed demonstration of the FRO VOF in the travel industry is now presented.

The first stage in the FRO VOF involves steps (or acts) of: capturing customer dynamics, assessing travel company operations and economic factors, integrating customer dynamics with travel company economic factors, formulating the VOF and optimizing the VOF. The second stage involves carrying out a dynamic interaction with the customer and then executing an Event Optimizer process. The specific detailed steps with respect to the FRO VOF will now be discussed.

Figure 89:
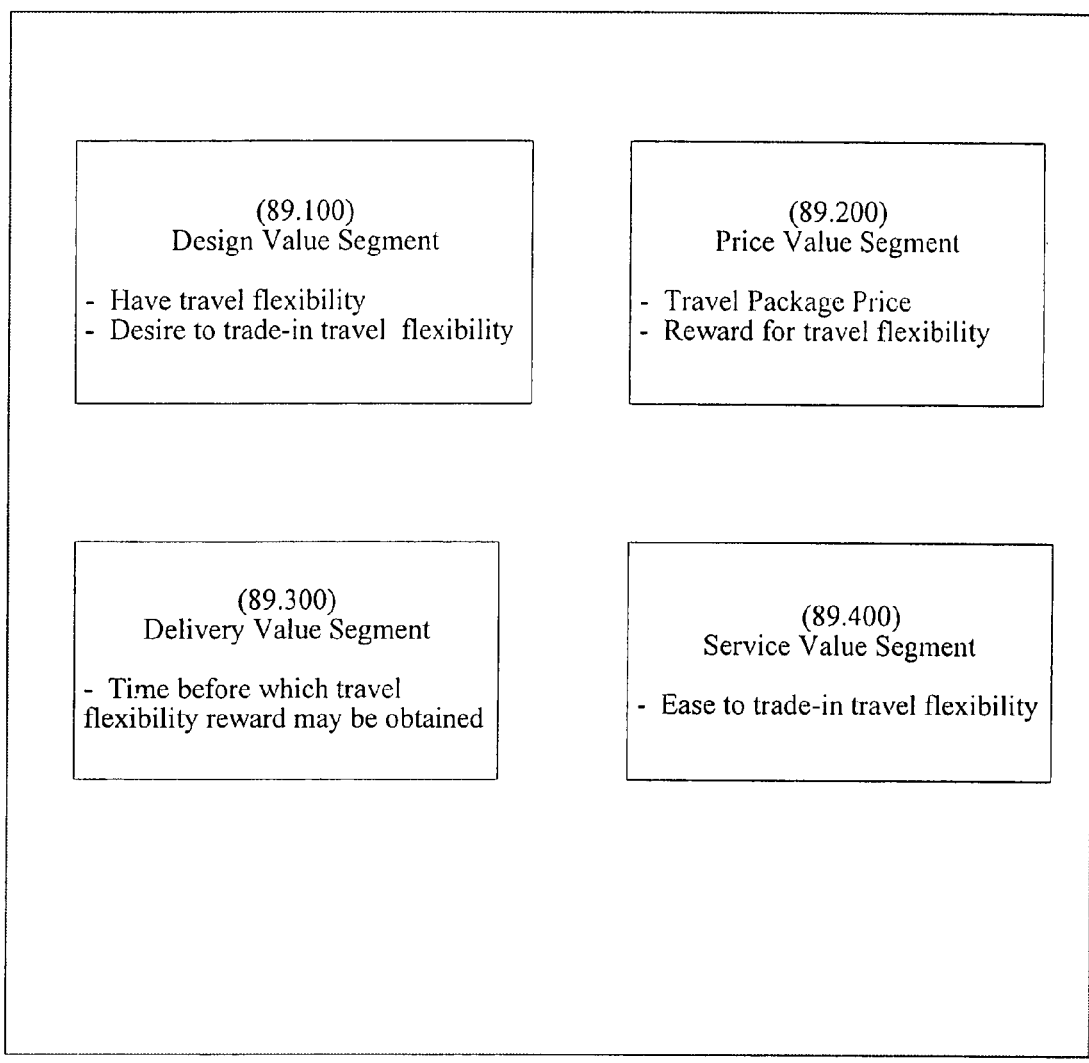
FIG. 89 is a diagrammatic illustration of an exemplary set of value segments and their value elements related to the FRO VOF in context of the travel industry.

First Stage Formulation of FRO Value Option Framework (1) Capturing Customer Dynamics FIG. 89 shows an analysis of the value elements that are believed to matter to customers in relation to a FRO. In the design value segment, shown in Box 89.100, important value elements may include, but are not limited to, the customers' flexibility in purchasing travel packages and their desire to trade-in their travel flexibility. In the price value segment, shown in Box 89.200, important value elements may include, but are not limited to, Travel Package Price and desired reward to trade-in travel flexibility. In the delivery value segment, shown in Box 89.300, important value elements may include, but are not limited to, time before which a customer may be able to trade-in his or her travel flexibility to obtain the desired reward. In the service value segment, the important value elements may include, but are not limited to, the ease to trade-in travel flexibility, as shown in Box 89.400. It may be important to estimate the relative preferences and utilities of these value elements to different types of customers.

The customers' desire to trade-in their travel flexibility is subjective in terms of the length of the "travel flexibility trade-in period" and the "range of travel flexibility". The term "travel flexibility trade-in period" refers to the time period during which a customer is willing to trade-in his or her travel flexibility. The term "range of travel flexibility" refers to a range of travel package features and/or components across which a customer is flexible. For example, the range of travel flexibility may be expressed in terms of the periods for start, end and stay, range of depart and/or arrival cities, travel package services/amenities needed during travel and so forth. The travel flexibility trade-in period, range of travel flexibility and reward (as desired by customers in lieu of travel flexibility) are subjective and may differ from customer to customer, or even for the same customer, may differ from one situation to another.

(2) Assessment of Travel Company Economics

An assessment of the crucial economic factors of a travel company, as indicated in Box 90.100, may reveal the factors to include, but not be limited to, fixed and variable costs, non-uniform distribution of demand across different Travel Packages under the same category (or travel packages from various categories), the difficulty to accurately forecast demand, the inability or difficulty to shift customers from overloaded travel packages to low-demand travel packages, costs and customer dissatisfaction and ill-will from over sale, the need to develop sustainable competitive advantages, customer attrition rate, commoditization of the travel industry, opportunity loss from capacity shortages and spoilage and so forth.

An assessment of the crucial economic factors of a travel company may be performed, to determine the factors that affect the profitability, growth and goals of the travel company. It might be beneficial if a travel company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information).

(3) Integration of Customer Dynamics with Travel Company Economic Factors

FIG. 90 also illustrates an example of how a mapping may be done, between the customer and travel company profiles, for the FRO VOF in travel industry. On one side, there are customers who have flexibility and desire to trade-in their flexibility in lieu of rewards or benefits. However, customers are also concerned about any hassles, delays, frustration that one may go through if they participate in such an exchange. On the other side, a travel company faces an unbalanced demand that is difficult to forecast accurately. It would certainly be very helpful for a travel company to know the relative flexibilities of customers to receive different travel packages. For example, a travel company may benefit from knowing the relative flexibility of a customer to utilize a travel package within a given set of travel packages.

Travel Companies usually have a higher aggregate capacity than aggregate demand. However, the demand is non-uniform and often leads to over-sale, revenue spill or spoilage or any combination thereof, in travel packages. The issue of last minute cancellations and no-shows (CNS) further complicates the issue. To deal with the revenue spills and spoilages, and to concurrently hedge against the CNS, the travel companies overbook travel packages. Overbooking is a risky proposition due to associated costs and/or customer ill will. If a travel package begins with one or more available capacity, that condition probably represents the loss of potential revenue for that travel company. The travel company may have turned down potential customers due to the risk of high cost of overbooking in the concerned travel package or other travel packages (of the same or different travel company). The overbooking factor in travel packages other than said travel package represent potential revenue loss because there may be one or more customers on such other travel packages who could have been willing to be shifted to the travel package with available capacity in lieu of reward, and thus, releasing capacity for new potential customers (who may be willing to pay a lot higher) in said other travel packages. However, today there is no framework that allows companies to do so in an optimal fashion such that both travel company and the customer benefit at the same time. An opportunity, thus, exists to concurrently generate an incremental revenue benefit for the travel company, and to maximize the purchase utilities for the customers (includes those who want to trade-in flexibility and those who want to obtain specific travel packages even at higher prices).

The FRO VOF is created based on the value element "desire to trade-in travel flexibility". More specifically, as shown in the interaction between the Box 90.200 and Box 90.300, a mapping is performed between important customer value elements and the travel company economic factors. The value element "desire to trade-in travel flexibility" is extracted, as shown in Box 90.400 and a FRO value option framework is created.

(4) Formulating the "FRO" Value Option Framework

Structure of FRO Value Option Framework in the Travel Industry

Figure 91:
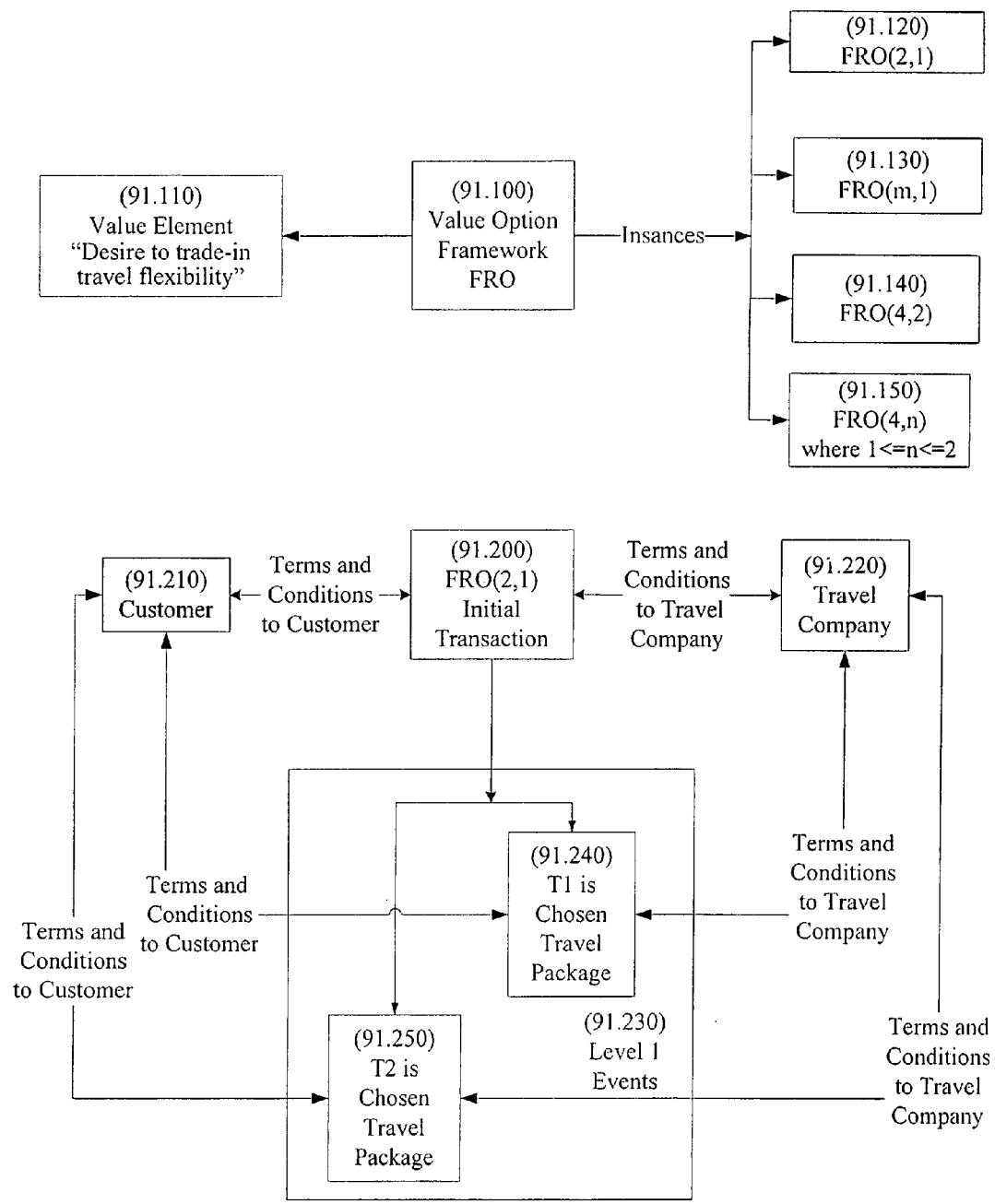
FIG. 91 is a partially-diagrammatic, partially-flow diagram representing the structure for creating a FRO Value Option Framework in context of the travel industry.

FIG. 91 displays the structure of a FRO value option framework (shown in Box 91.100) in travel industry. The FRO value option framework is related to the value element "desire to trade-in travel flexibility", as shown in Box 91.110.

In the "Initial Transaction" for FRO, shown by Box 91.200, a customer (shown by Box 91.210) and a travel company (shown by Box 91.220) transact on the FRO value option. There may be one or more Events (shown by Box 91.230) that follow the Initial Transaction.

In a successful Initial Transaction for a FRO, the customer receives an option to utilize up to 'n' out of 'm' selected travel packages (said 'm' travel packages termed "FRO Travel Packages"). The 'n' travel packages that are finally selected are termed "Chosen Travel Packages". After each of the 'n' Chosen Travel Packages is defined (or selected or chosen or received), the customer has the right to utilize (or can utilize) said Chosen Travel Package. Apart from the 'n' Chosen Travel Packages, the remaining 'm−n' travel packages are termed "Released Travel Packages". The Released Travel Packages (if any, that were probably held or blocked for said customer) may be sold to other customers as normal travel packages or FRO Travel Packages or used for other purposes. The Released Travel Packages in relation to said option may be reused by the travel company before, after, at or any combination thereof, the time the Released Travel Packages and/or Chosen Travel Packages are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' Travel Packages may be defined in one or more transactions. The value of 'm' and/or 'n' may be defined and/or re-defined, at one or more times, by the travel company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Travel Packages may include one or more Travel Packages other than said 'm' Travel Packages.

The FRO Travel Packages may be selected by the travel company, the customer, another entity or any combination thereof. The FRO VOF may enable a travel company to obtain travel flexibility from FRO customers (i.e., those who select FRO) and use said travel flexibility to satisfy the travel package needs of other customers (i.e., who have relatively fixed or strong preferences). Therefore, the travel company would usually have the right to select (or define) the Chosen Travel Packages. However, in different implementations of FRO VOF, the travel company, the customer, another entity or any combination thereof may select one or more of the Chosen Travel Packages related to a FRO. The FRO Travel Packages and the Chosen Travel Packages may be selected by the same entity, different entities or any combination thereof. For example, the customer may select the FRO Travel Packages and the travel company may select the Chosen Travel Packages out of the FRO Travel Packages. The travel company may incorporate the customer information and the data related to the FRO into the sales, production, inventory, other database or information system or any combination of the above.

The time when an Initial Transaction is completed (i.e., the customer receives the FRO option on said m Travel Packages) is referred to as the Initial Transaction Tine (or ITT, in short). One or more of said m Travel Packages may be selected, at one or more times, before, after, during, or any combination thereof, the Initial Transaction and/or the time said option is delivered to the customer (or the customer receives said option) or any combination thereof. All the FRO Travel Packages may be selected concurrently (i.e., all together in one transaction) or sequentially (i.e., in multiple transactions).

The delivery of an option may include, but not limited to, electronic delivery of the option, physical delivery of the option, any other mode of delivery or any combination thereof. Once said option is delivered, one or more of m Travel Packages may be available for use by the travel company, an entity other than the travel company and/or any combination thereof. The value of 'n' may be defined before, after or any time, the option being delivered to the customer.

The delivery of option may occur in relation to the customer purchasing at least one Travel Package. The delivery of option may also occur in relation to the customer purchasing a Travel Package other than the Travel Package on which the option may be delivered. The customer may purchase a Travel Package other than the Travel Package on which the option is delivered to the customer.

In the sequential case, a customer may select one or more Travel Packages in one or more transactions before the Initial Transaction. Said selected Travel Package(s) (let's say X number of them), thus, may be considered as part of said m FRO Travel Packages of the FRO (m, n) transaction, and the customer may select only the remaining (m–X) number of FRO Travel Packages during the Initial Transaction. All the transactions used to select (or receive) all the m FRO Travel Packages of a FRO (m, n) instance are related to each other, and hence, are considered as "related transactions" (as defined earlier).

In a FRO VOF, the sequential process may comprise a number of "related transactions" when all the FRO Travel Packages are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In the related transactions, 'n' may be equal to 'm' when there may be at least one payment transaction between the travel company and the customer related to the Travel Packages wherein such payment is made after the option has been granted. Said payment transaction may be one more transaction apart from the initial interaction and/or Initial Transaction in the event said customer utilizes all the 'm' Travel Packages. The customer may select Travel Packages prior to utilizing the penultimate Travel Package. The travel company, an entity other than the travel company and/or any combination thereof may reserve the right to limit the customer to 'n' Travel Packages on, before, on or before, after, on or after or any combination thereof, a stated notification deadline date.

A travel company may choose to create one or more instances of the FRO VOF based on factors including, but not limited to, number of FRO Travel Packages, Chosen Travel Packages or Released Travel Packages, pre-determination of a number of Chosen Travel Packages or Released Travel Packages, travel flexibility trade-in period, other factors or any combination thereof. For example, a FRO based on a combination of the number of FRO Travel Packages (or m) and Chosen Travel Packages (or n) would be FRO (m, n). Some FRO instances are shown in Boxes 91.120, 91.130, 91.140 and 91.150. For example, when the number of Chosen Travel Packages is pre-determined, the FRO (4, 2) instance may imply that the customer receives 4 FRO Travel Packages, on the condition that the travel company may select any 2 out of 4 Travel Packages as Chosen Travel Packages. When the number of Chosen Travel Packages is not pre-determined, the FRO (4, 2) instance may imply that the customer receives 4 FRO Travel Packages, on the condition that the travel company may select none, one or 2 Chosen Travel Packages out of FRO Travel Packages. There may also be a minimum limit on n. For example, the FRO (4,n) (where 1<=n<=2) instance limits the travel company to select either 1 or 2 Chosen Travel Packages out of the 4 FRO Travel Packages.

The FRO (2, 1) instance, two FRO Travel Packages and one Chosen Travel Package, is used here as an example to demonstrate the details of the structure of a FRO VOF. Box 91.200 refers to the Initial Transaction between the customer and the travel company, in which they transact on a FRO (2, 1) value option. In a successful Initial Transaction for FRO (2, 1), the customer selects two FRO Travel Packages and the travel company may select any 'one' of those two Travel Packages as the Chosen Travel Package.

A customer may get FRO for different start dates. For example, a customer gets FRO to begin either on $5^{th}$ or $7^{th}$ of the month. The travel company gets the right to notify the customer, before $4^{th}$ about the Chosen Travel Package, i.e. in this case, the Chosen Start Date.

A customer may get FRO for different travel package types. For example, he gets a FRO between an adventurous travel package and a family travel package. The travel company gets a right to notify him about the Chosen Travel Package before a stipulated Notify Deadline.

The Initial Transaction may have terms and conditions applicable to the customer, or the travel company or both. These terms and conditions may be set, preferably, to concurrently benefit both parties. The connections between Box 91.200 and 91.220, and Box 91.200 and 91.210 refer to the terms and conditions to the travel company and the customer, respectively.

The FRO VOF may or may not include any constraints on the FRO Travel Packages. For example, a travel company may restrict FRO applicability and availability on Travel Packages that satisfy specific criteria. The two FRO Travel Packages may or may not include practically constrained Travel Packages. Practical constraints may include one or more constraints that will prevent a customer to utilize one or more given Travel Packages or prevent the customer from utilizing all the FRO Travel Packages. Such constraints may include, but are not limited to, time constraints, location constraints and so forth. In other words, it may or may not be practically possible for a customer to utilize both the selected Travel Packages due to at least one practical constraint.

A customer may select (or receive) FRO Travel Packages in several ways; through mutual agreement (e.g., during a direct interaction such as a Travel Package purchase), or the travel company may grant the FRO Travel Packages to the customer without soliciting their interest or permission. For example, to enhance customer satisfaction or for any other purpose, a travel company may grant FRO Travel Packages to customers based on the past customer behavior, interaction and so on.

The Initial Transaction may impose one or more conditions on the travel company. A travel company may be required to explicitly notify the customer prior to or no later than a given date and time (referred to as the Notify Deadline) regarding the Chosen Travel Package. For simplicity, it is assumed that whenever the term Notify Deadline is used in the following sections, the condition requires notification prior to the Notify Deadline. If there is no such explicit notification condition, the Chosen Travel Package may be decided as per the terms and conditions of the option contract. In either case (explicit or implicit notification), the date and time when the selection of the Chosen Travel Package is notified to the customer is referred to as the Customer Notification Time (or CNT, in short). In the current discussion, the explicit notification condition is assumed unless specifically mentioned otherwise.

A travel company may determine one or more Notify Deadlines for a travel package at one or more times (e.g., before, during, after the Initial Transaction or any combination thereof) using factors including, but not limited to, customer needs, expected value of the travel package, travel company profitability goals, any other factors or any combination of the above. Customer factors should also be considered in determining the Notify Deadlines, such as the travel flexibility trade-in periods desired by customers, or any other factor that may affect the behaviour of a customer. The FRO VOF may or may not have a notification deadline condition.

A travel company may provide an option of booking 'm' Travel Packages with condition of canceling at least one of them. In such case, the travel company may have authority to decide booking of which Travel Packages is to be cancelled. The travel company may reward the customer for his/her travel flexibility. Consider an example. A customer may book two Travel Packages at $800 each for two different dates $2^{nd}$ May and $5^{th}$ May. Three cases may follow this event—a) high demand for Travel Package on $2^{nd}$ May, the travel company may cancel the booking of the Travel Package for $2^{nd}$ May and the customer may be refunded $810 (Travel Package Price+Flexibility Reward); b) high demand for Travel Package on $5^{th}$ May, the travel company may cancel the booking of the Travel Package for $5^{th}$ May and the customer may be refunded $810 (Travel Package Price+Flexibility Reward); c) regular demand (i.e. no high demand) for the Travel Packages on both the dates, the travel company may cancel the booking of any of the Travel Packages as per its choosing or as per the terms of the option contract and the customer may be refunded $805 (Travel Package Price+Flexibility Reward which may be lower in this case).

In the context of the FRO VOF in the travel industry, the terms "price" or "reward" or "discount" normally refer to the price which the travel company may offer to the customer in relation to the FRO. However, in one of the implementations of FRO VOF, the customer may also offer a price to the travel company in relation to the FRO. The terms "price" and "reward" are used interchangeably as and when the context requires.

The FRO VOF may impose additional terms and conditions on the customer. The travel company and/or an entity other than the travel company may receive from customer, at one or more times, an indication of one or more terms and conditions associated with said option in the FRO VOF. Similarly, at least one of said travel company and/or an entity other than said travel company may deliver to said customer, at one or more times, one or more terms and conditions associated with said option in the FRO VOF. A customer may receive one or more rewards (or prices) in relation to the FRO. There may or may not be any payment transaction related to the Initial Transaction and/or other event related to the FRO. There may be one or more prices related to the FRO. A price may include, but is not limited to, a set of one or more Travel Package Prices, a set of one or more FRO Prices (or Rewards or Discounts) or any combination of the above. A travel company may choose to implement FRO Prices in many ways. For example, a customer may pay a Travel Package Price to receive a group of travel packages, and then, may choose to get FRO on said travel packages and thus, receive FRO reward. A travel company may use the method of its choosing to decide on all the Travel Package Prices.

The customer may receive one or more prices during the Initial Transaction (which is referred to as an Initial Price), at the CNT (which is referred to as an Exercise Price) and/or at any other time, which may or may not be pre-determined. The price may be a function of number of FRO Travel Packages and/or Chosen Travel Packages, specific travel packages to be granted for FRO Travel Packages and/or Chosen Travel Packages, Notify Deadline, one or more Travel Package Prices, any other factors of travel company's choosing or any combination of the above.

The price may comprise a monetary value or a soft/non-monetary value (e.g., benefits, coupons or exchange of another service) or other consideration. The FRO Price may be fixed or variable, with or without bounds. The travel company may set permissible range(s) or boundary limit(s) within which the FRO Price can vary, or it may offer the customer a set of prices to choose from. Since price conditions may depend upon various factors, which may or may not be variable, the same may be decided at anytime. The price conditions may be determined by the customer, the travel company, another entity, or any combination thereof at one or more times. One or more prices (FRO Initial or FRO Exercise or any other price) may be a negative value, which reflects that instead of the travel company rewarding the customer, the customer shall pay a price to the travel company to get the desired Travel Package as the Chosen Travel Package.

Different price strategies may be implemented in the FRO (2,1) instance. For example, a single Initial Price could make it attractive and easy for the customer to participate in the FRO program. One or more of the FRO prices (rewards) may be embedded with the Travel Package Price by using a special Travel Package Price. A customer may be presumed to accept the FRO offer while displaying the Travel Package Price (that has the FRO Price embedded in it). These presumptions may or may not include soliciting prior interest of the customer regarding the FRO offer. In case the FRO price is merged with the Travel Package Price, and where such price may or may not be separately identifiable, the customer may or may not receive a separate price for FRO.

The Notify Deadline may be pre-determined or may be determined later (i.e., after FRO grant) by the travel company, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the FRO VOF may not allow the travel company to notify the customer after the last Notify Deadline (i.e., the latest among the Notify Deadlines). As an operational measure, a rule may be set that if the travel company and/or an entity other than the travel company fails to notify the customer before the last Notify Deadline, the customer may select either of the FRO Travel Packages as the Chosen Travel Package. Similarly, in one of the implementations of the FRO VOF, a rule may also be set that if the customer fails to notify the travel company and/or an entity other than the travel company before the last Notify Deadline, the travel company and/or an entity other than the travel company may select either of the FRO Travel Packages as the Chosen Travel Package for the customer. Another approach may be (e.g., for customer/travel company) to designate one of the two travel packages as a Default Travel Package (during or after receiving the FRO) that will be selected as the Chosen Travel Package if the travel company fails to notify the customer of the Travel Package selection before the last Notify Deadline. Any entity (e.g., the travel company or the customer) may (or may not) be allowed to change the Default Travel Package once it is selected. The FRO Exercise Price (if any) in the default case may or may not be equal to the FRO Exercise Price for the Default Travel Package for the last Notify Deadline. In the current discussion, a single Notify Deadline is assumed.

The FRO Exercise Price may be a function of Notify Deadline, FRO Travel Packages and/or Chosen Travel Package, one or more Travel Package Prices, any other factor of company's choosing or any combination thereof. In such situations, the travel company may pay a price to the customer based on the selection of the Chosen Travel Package at a given time.

The FRO VOF may also include conditions imposed on the customer. A customer may be under a mandatory condition to accept the Chosen Travel Package once it is selected (for e.g., by the travel company).

A travel company may determine customer preferences, either explicitly or implicitly, regarding utilization of up to n of m selected travel packages. The preferences may also include, but not limited to, customer preferences for various travel packages and services, needs, associated relative utilities, travel flexibilities, preferences regarding choice of travel packages, quality of travel packages, acceptable delays (relative) to receive different travel packages and so forth. A travel company may seek customer preferences on flexibility to utilize various travel packages, desire to trade-in their travel package flexibility, any other parameters or any combination thereof. The travel company, one or more entities other than the travel company or any combination thereof may seek customer preferences.

A travel company may also offer FRO options to one or more customers on the basis of customer preferences, so obtained or collected. The travel company may offer said FRO options based on the dynamics of the travel company including, but not limited to, inventory, operational data, revenue management data, cost data, financial data, accounting data, any other internal data, any combination thereof and so on.

A travel company may seek such preferences from the customers prior to, during or after the customer has purchased the travel packages or any combination thereof. These customer preferences may help the travel company to perform concurrent optimization of value for the travel company, the customers, and one or more entities other than the travel company or any combination of two or more of the above. The customers may also include the customers whose preferences have not been determined or collected to perform concurrent optimization. The data pertaining to the travel company, customers, one or more entities other than the travel company, any combination thereof, may be integrated to concurrently optimize the value for at least any two of said entities. There may or may not be any payment transaction between the travel company, one or more other entities and/or the customers regarding seeking such customer preferences, delivering FRO options, customer participation in FRO and so on.

The travel company may operate one or more systems and/or services to monitor the travel company dynamics. Monitoring may include, but is not limited to, monitoring of capacity, days to utilization, return and/or potential return of travel packages, flexible inventory that may be created in relation to said obtained preferences, analyzing various cost, revenue, operational or any other internal data and so on. The travel company may have one or more systems and/or services to analyze such data on a real-time or quasi real-time basis and draw conclusions on the basis of such analysis. Any of the systems and/or services may be operated by the travel company, one or more entities other than the travel company or any combination thereof.

A travel company may operate a system that defines customer preferences regarding at least utilizing up to n of m selected travel packages, where n is less than m, operate a system that enables use of said preferences to optimize value for at least one of customers, said travel company and an entity other than said travel company. Said system may be used to enhance travel package selling capacity (or helps to increase the overselling limits of travel packages). The travel company may use such preferences to offer FRO. A travel company may concurrently optimize value for at least two of customers, said travel company and at least one entity other than said travel company.

The travel company may utilize such preferences to meet its capacity shortages. These customer preferences may enable the travel company to increase the capacity limits for its travel packages. The travel company may start entertaining more requests from the customers and hence may increase the oversale limits for their travel packages. The travel company may be able to sell the travel packages at higher prices to the potential customers due to increase in capacity and oversale limits and thereby enhance its revenues. Such preferences may help the travel company to allay fears of customer ill will and dissatisfaction in case of an oversale situation. The travel company may utilize these preferences to deal with the oversale situation more effectively, efficiently and in timely manner. Thus, it may eventually allow the travel company to capture demand that may otherwise, have been spilled or turned down and thereby enhancing its revenues without having any negative impact due to increase in capacity limits.

A travel company may offer FRO to all customers or any selected customers, such selection may be based on any criterion including, but not limited to, such as those who have expressed their relative preferences, those who have not expressed any preferences. By integrating the travel company dynamics and collected customer preferences, a travel company may offer appropriate incentives and terms and conditions for FRO to generate desired participation. A travel company may exercise its right (from FRO) to define the Chosen Travel Packages for one or more FRO customers depending on travel company's internal need to regenerate travel package capacity for travel packages with low availability or shortages. A travel company may be in a better position to offer appropriate FRO offers at a later stage due to many factors including, but not limited to, the travel company having better knowledge of internal and external dynamics, a relatively better estimate on how many customers required to avoid oversale situation in the end and so on. A travel company may choose to handle any shortfalls in capacity using FRO or by any other method of its choosing.

Once the Initial Transaction is successful, there may be at least two possible related events, as shown by Box 91.230. The two events are (1) that T1 is the Chosen Travel Package (as shown by Box 91.240) and (2) that T2 is the Chosen Travel Package (as shown by Box 91.250). Each of these two events may be associated with various terms and conditions on the customer and/or the travel company. As explained above, the events may take place in two ways: either the travel company selects the Chosen Travel Package to satisfy its business needs, or the Chosen Travel Package is selected based on pre-determined rules. The travel company may have to pay an additional exercise price at the CNT depending on the terms and conditions of the option contract. Once the Chosen Travel Package is selected, the travel company and/or the customer may not change the Chosen Travel Package except within the bounds of the terms and conditions in the option contract. The travel company or the customer may (or may not) have the right to enforce the Chosen Travel Package on the other party as per the terms and conditions of the option contract.

The travel company may offer incentives to the customers to motivate them to choose one or more Travel Packages as Chosen Travel Packages among the FRO Travel Packages that may be more optimal for the travel company. A travel company may formulate one or more such offer (may referred to as Chosen Travel Packages Incentive Offers) and may send them to customers who have purchased FRO but not yet selected their Chosen Travel Package via email, phone, mail or any other communication channel as per the terms and conditions of the option contract. Thus, such customers may be persuaded to select said optimal Travel Package in lieu of incentives if the terms and conditions of option contract provide so.

In one implementation of FRO, a travel company may want to hold capacity for the customer in only one of the FRO Travel Packages, in which the status of said Y customer is termed "Ya" (i.e., Accounted) and in the other FRO Travel Package(s), the status is termed "Yw" (i.e., Awaiting) (both Ya and Yw have been defined above). A "Y" customer converts to an N customer after the CNT. Thus, at any given time, a travel company may have N, Ya and Yw type of customers for its travel packages.

The FRO VOF may help a travel company in one or more ways. For example, it may help to accommodate travel package requests from potential customers. Any new potential customer who requests to obtain a travel package is assumed to be an N customer. If the available quantity for the desired travel package (desired by N customer) is insufficient to satisfy the request, then the travel company may use the quantity (if any, of desired travel package) that has been assigned to Ya customers, and reassign the same to said N customer. Consequently, the travel company may then assign the Awaiting travel packages (i.e., the travel packages where said Ya customers have Awaiting status) to said Ya customers. By implementing such shifting or removing of Ya customers from their Accounted travel packages to Awaiting travel packages, a travel company may better serve incoming demand for travel packages. An event where such request comes to the travel company for a travel package is termed "Buy_N". The act to remove (or shift) a Ya customer from its Accounted travel package to its Awaiting travel package is termed "Remove_Y". Detailed algorithms are presented below that may be used to manage a system comprising N, Ya and Yw type of customers.

The above terms and conditions of the FRO VOF may be set in a way to concurrently benefit the customer, the travel company, any other entity apart from said company involved and/or any combination thereof. The travel company gets to seek a way to create a flexible inventory of Travel Packages. The customer benefits from trading their travel flexibility for the desired rewards. The travel company benefits from enhanced customer satisfaction (loyalty and repeat business), incremental revenue from the high price paying customers, incurring lower costs on capacity shortages and selling (reusing) the Released Travel Packages, generating revenues from Released Travel Packages without actually reusing the Released Travel Packages and other operational benefits.

A FRO VOF may include a right for the customer to utilize each of the m FRO Travel Packages, and a right for the travel company to limit the Travel Packages (to fewer than m) the customer can utilize, if the travel company notifies the customer on a stated Notify Deadline. Said on a stated Notify Deadline may include, but not limited to, on and/or before the stated Notify Deadline, on and/or after the stated Notify Deadline, any combination thereof. The right may include the condition that the travel company may notify the customer before, at or after the stated Notify Deadline or any combination thereof. To provide some flexibility to the customers, the travel company may offer (or allow) the customer to express their preferences regarding the Chosen Travel Package(s) before the stated Notify Deadline. The travel company may or may not exercise their right to limit the customer to utilize fewer than said m travel packages. The right may include a condition that the travel company may limit the customer after the customer expresses his/her preference for the Chosen Travel Packages. The travel company and/or an entity other than the travel company may have said limitation on at least one Travel Package. There may be a condition imposed on the customer to make at least one payment to the travel company when the customer expresses his or her preferences for the Chosen Travel Packages. The travel company and/or an entity other than the travel company may allow the customers to define said 'n' Travel Packages on or before a stated date. The travel company and/or an entity other than the travel company may reserve the right to take back any 'm' minus 'n' Travel Packages after the stated date. The customer, the travel company, an entity other than the travel company and/or any combination thereof may determine the notification date.

A travel company may choose to define all the Chosen Travel Packages at one or more times. All Notify Deadlines may or may not be associated with each of the related FRO Travel Packages. For example, a Notify Deadline may be after the time when the Travel Package would have been utilized or the travel company may choose not to offer a Notify Deadline on a specific Travel Package due to one or more reasons including, without limitation, high FRO Price, customer utility reasons and expected load factor. A travel company may select any of the selected FRO Travel Packages as the Chosen Travel Packages prior to a Notify Deadline. The travel company may also choose not to select any Chosen Travel Packages at one or more of the specified Notify Deadlines.

The costs, revenues, benefits, terms and conditions shown here are for illustration purposes only and actual values could be different depending upon specific values selected by the travel company for value options, customer behaviour, travel company characteristics, Notify Deadline(s) and other relevant factors.

The FRO VOF structure may be implemented in several ways depending upon the terms and conditions associated with the FRO contract. The FRO VOF structure presented above for the FRO (2, 1) instance can be extended to implement any other FRO instance.

The FRO concurrently optimizes value for both the travel company and its customers. The customers receive rewards for trading their flexibility in utilizing a travel package while the travel company gets the flexibility to optimally allocate travel packages (including sold travel packages) across various customers. The travel company gets to know the relative preferences and utilities of a customer for various travel packages as some customers take this option and others don't. The presumption here is that customers make a logical decision to take part in the FRO value option framework if they desire to trade-in their travel flexibilities. The travel company may benefit from higher customer loyalty, as customers may receive higher satisfaction from using the travel company services, and maybe optimize its profitability by reusing/reselling the Released Travel Packages at typically higher than average prices.

Example of FRO VOF Structure FRO (2, 1)

FIG. 92 demonstrates an illustrative practical example of using the FRO (2, 1) instance in the travel industry. Consider a customer who interacts with a travel company to get FRO. Per Act 91.200, an Initial Transaction takes place between the travel company and the customer. FIG. 92 displays some of the details of the Initial Transaction. The customer selects/receives two FRO Travel Packages, T1 (shown in Box 92.100) and T2 (shown in Box 92.200), and the travel company can select either of the travel packages as the Chosen Travel Package. The customer is under the condition to accept the Chosen Travel Package as selected by the travel company.

The customer receives a reward of $40 as the Initial FRO Price from the travel company while the customer pays $1000 as the Travel Package Price to the travel company as part of the Initial Transaction. Hence, the customer pays a net amount of $960 to the travel company at Initial Transaction. The Initial Transaction takes place on the 27$^{th}$ day of November (i.e., the ITT, shown in the second row of the Box 92.300). There is an explicit notification condition wherein the travel company has to select and notify the customer regarding the Chosen Travel Package before the Notify Deadline. An example of terms and conditions included with FRO are presented. A scenario is considered with different Notify Deadlines (shown in Box 92.400) and the Notify Deadline is expressed in terms of the number of days to start (DTS) of T1, the earlier of the two travel packages.

Box 92.400 displays a set of FRO Exercise Prices that are a function of both the Notify Deadline and the Chosen Travel Package. There are four Notify Deadlines associated with the FRO. The FRO Exercise Price increases from $25 (for the First Notify Deadline of 30 DTS) to $100 (for the Last Notify Deadline of 1 DTS) if the Chosen Travel Package is T1 and from $40 to $125 if the Chosen Travel Package is T2. If the CNT is before 30 DTS, then the customer receives $25 as the FRO Exercise Price from the travel company if the Chosen Travel Package is T1, and receives $40 as the FRO Exercise Price if the Chosen Travel Package is T2, as shown in the second column of the second and third rows in the Box 92.400, respectively. If the CNT is after 30 DTS and before 7 DTS, then the customer receives a FRO Exercise Price of $70 or $65 if the Chosen Travel Package is T1 or T2, respectively, as shown in the third column of the second and the third rows, respectively in the Box 92.400. Similarly, the customer receives a FRO Exercise Price of $90 for T1 or $100 for T2, if the CNT is after 7 DTS and before 3 DTS, and $100 for T1 or $125 for T2, if the CNT is after 3 DTS and before 1 DTS, as shown in the fourth and fifth columns of the second and the third rows in the Box 92.400, respectively.

5) Optimization of FRO VOF

As mentioned earlier (shown in FIG. 7), in the form of an optional last step in the first stage, a financial analysis may be performed using the existing travel company and customer data to determine the optimal terms and conditions of the FRO VOF. 'What-if' scenarios may be executed to determine an optimal pricing strategy. The travel company may want to divide customers using one or more criteria and design separate FRO VOF for each customer segment.

Second Stage Using the FRO Value Option Framework

After completing the first stage of the method, the travel company has created a FRO VOF and specific options within that framework. The travel company may have segmented customers and designed options accordingly. The travel company is fully prepared to use a structured format comprising one or more FRO value options to interact with its customers in real time to generate benefits for both the travel company and its customers. The second stage of the FRO VOF is now presented.

Figure 93:
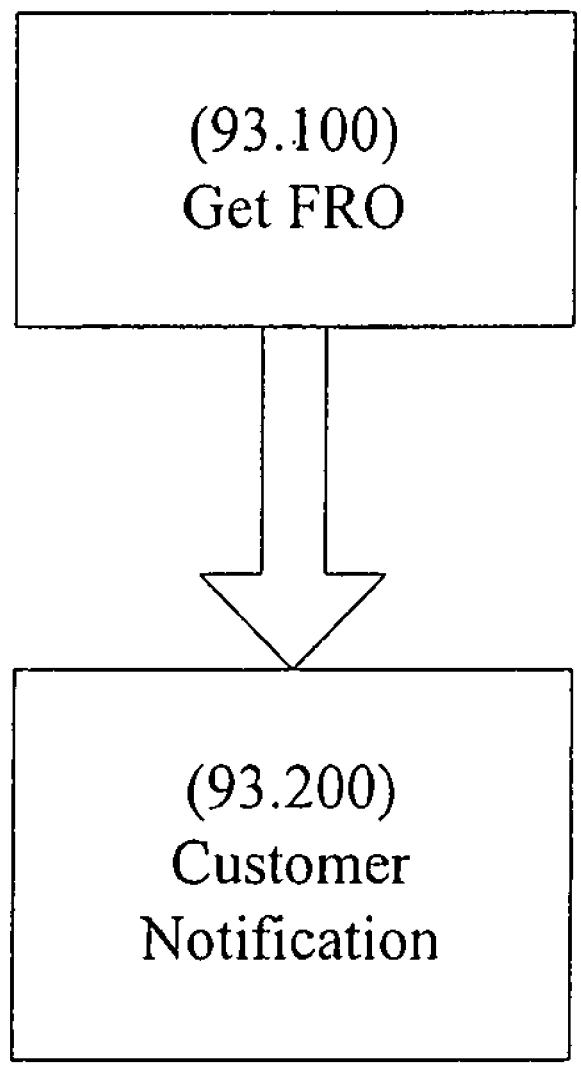
FIG. 93 is a diagrammatic illustration, in a high level flowchart, of a process for FRO VOF implementation in the travel industry.

The implementation of the FRO VOF between the travel company and its customer takes place through two high level acts, as shown in FIG. 93. In Act 93.100, the 'Get FRO' process, an interactive event between the customer and the travel company's web server, runs to carry out the Initial Transaction of the FRO VOF. In this Act, a number of algorithms, may be executed (e.g., availability, FRO Price, Travel Package Price and Notify Deadline) on the travel company's server to optimally calculate the terms and conditions of the FRO VOF to concurrently benefit both the travel company and the customer. In Act 93.200, the Customer Notification process (explained later) is executed. In this process, the Chosen Travel Package is notified to the customer. The process may also comprise one or more event optimizer algorithms that may help to optimally select the Chosen Travel Package and/or to optimally use (or reuse) the Released Travel Package.

Figure 96:
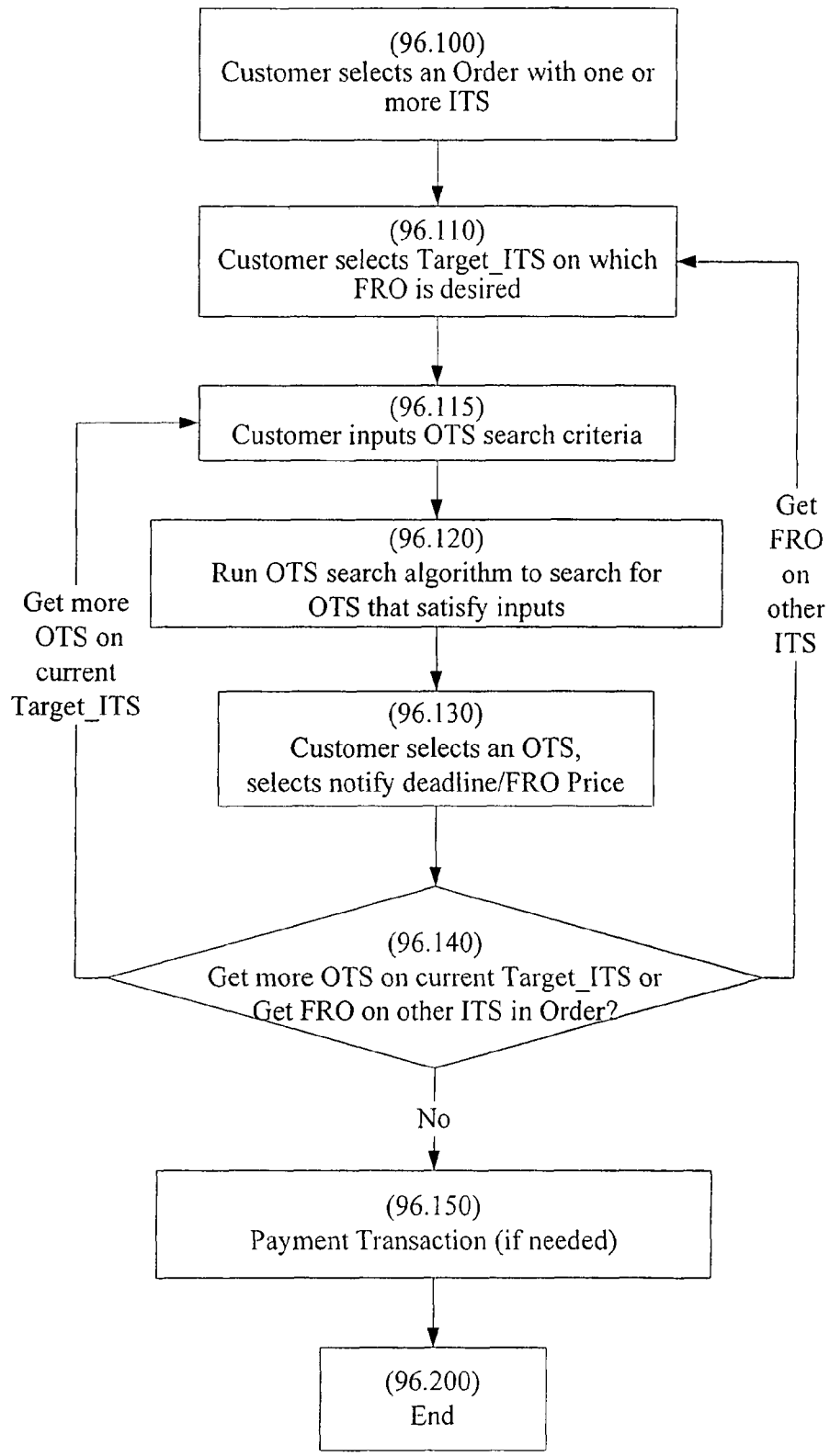
FIG. 96 is a flowchart that expands Act 100 of FIG. 93, illustrating a high level algorithm for the "Sequential Get FRO" process.
Figure 98:
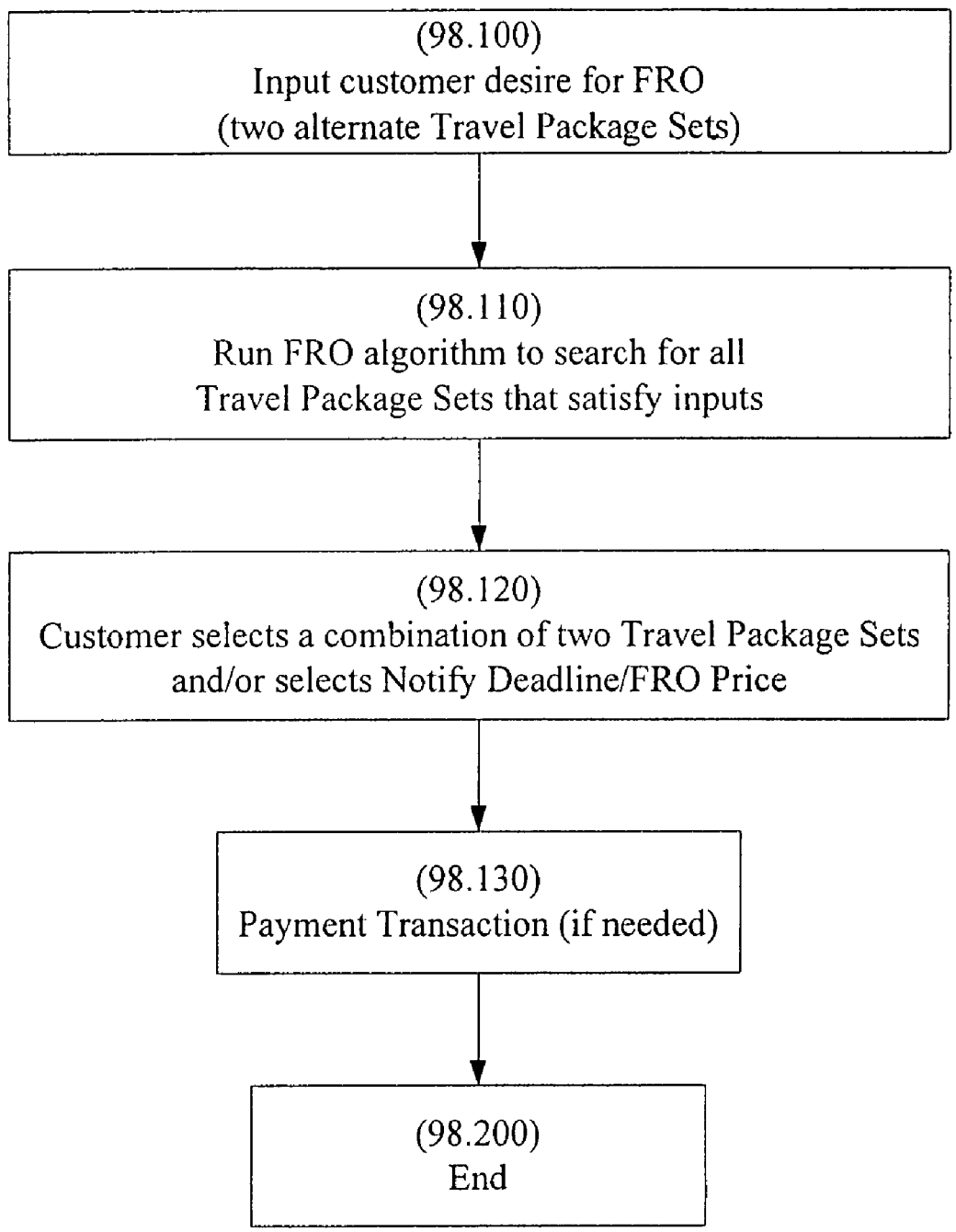
FIG. 98 is a flowchart of an algorithm for the "Concurrent Get FRO" process, an alternative process to FIG. 96.

As explained above, the Get FRO process may be implemented via the Sequential (shown in FIG. 96) or the Concurrent (shown in FIG. 98) process. There are many ways to do the Sequential process. As an example of the Sequential process, a customer may select (or purchase) a Travel Package Product/Travel Package Set/Travel Package Order before the Initial Transaction begins. In such situations, said Travel Package Product/Travel Package Set/Travel Package Order may be referred to as Initial Travel Package Product/Initial Travel Package Set/Initial Travel Package Order or ITP/ITS/ITO, in short, respectively. A customer may get a FRO, i.e., get one or more FRO Travel Package Products/Travel Package Sets/Travel Package Orders on an ITP/ITS/ITO, respectively. A FRO Travel Package Product/Travel Package Set/Travel Package Order is also referred to as Option Travel Package Product/Option Travel Package Set/Option Travel Package Order, or OTP/OTS/OTO, in short, respectively. The two events (one for the Initial Travel Package Product and the other for the Initial Transaction) may be executed with a minimal (one just after another) or a significant time gap (e.g., few minutes, hours, days and so forth) in between them.

The FRO VOF may be implemented at different levels including, but not limited to, Travel Package Product, Travel Package Set and Travel Package Order. Illustration of Travel Package Product and Travel Package Set levels is given through an example as shown in FIGS. 94 and 95 respectively.

FIG. 94 displays a practical example of implementing a FRO (2,1) at the Travel Package Product level. A customer obtains FRO on ITP (i.e., Initial Travel Package Product), and receives one Option Travel Package Product (or OTP, in short) on ITP, as shown in Box 94.200. The travel company may select either the ITP or the associated OTP as the Chosen Travel Package for this Travel Package Set.

FIG. 95 displays a practical example of implementing a FRO (2,1) at the Travel Package Set level. A customer selects a Travel Package Order with one ITS as shown in Boxes 95.100. The customer then takes FRO on the Travel Package Set, i.e., the ITS, as shown in Box 95.200 and the travel company may select either this ITS or the related OTS (Option Travel Package Set) as the Chosen Travel Package for this Travel Package Order.

A travel company may choose to implement the FRO at any level(s). In a specific FRO interaction between a customer and the travel company, the implementation level should be the same for all the FRO Travel Packages, Chosen Travel Packages and Released Travel Packages. For example, if FRO is implemented at the Itinerary level, then all the FRO Travel Packages and Chosen Travel Packages would refer to FRO Orders and Chosen Orders, respectively.

1. 'Get FRO'—Dynamic Interaction to Capture Customer Demand

In the Get FRO process, a customer interacts with the travel company's server to receive a FRO. The interaction may take place (for example) via phone, in-person or on a website. The Sequential Get FRO Process is presented first along with its detailed algorithms, followed by a short summary of the Concurrent Get FRO Process.

Sequential Get FRO Process

There are several ways to implement the Sequential process. The following presents an example of the Sequential Get FRO Process when a FRO is implemented at the Travel Package Set level. It is also assumed here that the customer first purchases an Initial Travel Package Order with one or more ITS, and then opts to receive a FRO on any of the included ITS.

The following presents an algorithmic illustration of the Sequential Get FRO process. Consider FIG. 96. In Act 96.100, the customer selects (and/or purchases) an Order (with one or more ITS). Next, in Act 96.110, the customer reaches an interactive interface of the travel company's web server to Get FRO page, where the customer selects the ITS (referred to as Target_ITS) on which a FRO is desired. Next, the customer inputs the OTS search criteria for the current Target_ITS in Act 96.115.

Next, on clicking the "Search FRO Travel Packages" button, control goes to Act 96.120, where the OTS search algorithm is executed to search for an OTS. The OTS search algorithm returns a list of valid OTSs, along with a list of Comb_NDs (defined elsewhere) and associated FRO Prices (or discounts). The details of the OTS search algorithm are presented later. Next, the search results are displayed for the customer, who then selects the desired OTS and one or more associated Comb_ND(s)/FRO Price(s), as shown in Act 96.130.

Next, in Act 96.140, a test is performed to determine whether the customer wants to get more OTSs on the current Target_ITS or on another ITS. If the customer wants to get an OTS on another ITS, control loops back to Act 96.110, where the customer selects another ITS as the Target_ITS, and then the process is repeated again for the new Target_ITS. If the customer wants to get more OTSs on the current Target_ITS, control loops back to Act 96.115, where the customer enters the OTS search criteria, and then the process is repeated for the new OTS search criteria. If the customer does not want to get any more OTSs, control goes to Act 96.150, where a payment transaction (if needed) may be executed. For example, a customer may need to pay a price for the Travel Package Product after taking into consideration the Initial FRO Price (discount, if any) using a credit card, direct bank account debit or any other payment transaction mechanism. Next, the algorithm ends in Box 96.200. The computation may be performed using a processor that may calculate results in optimal time.

OTS Search

Figure 97:
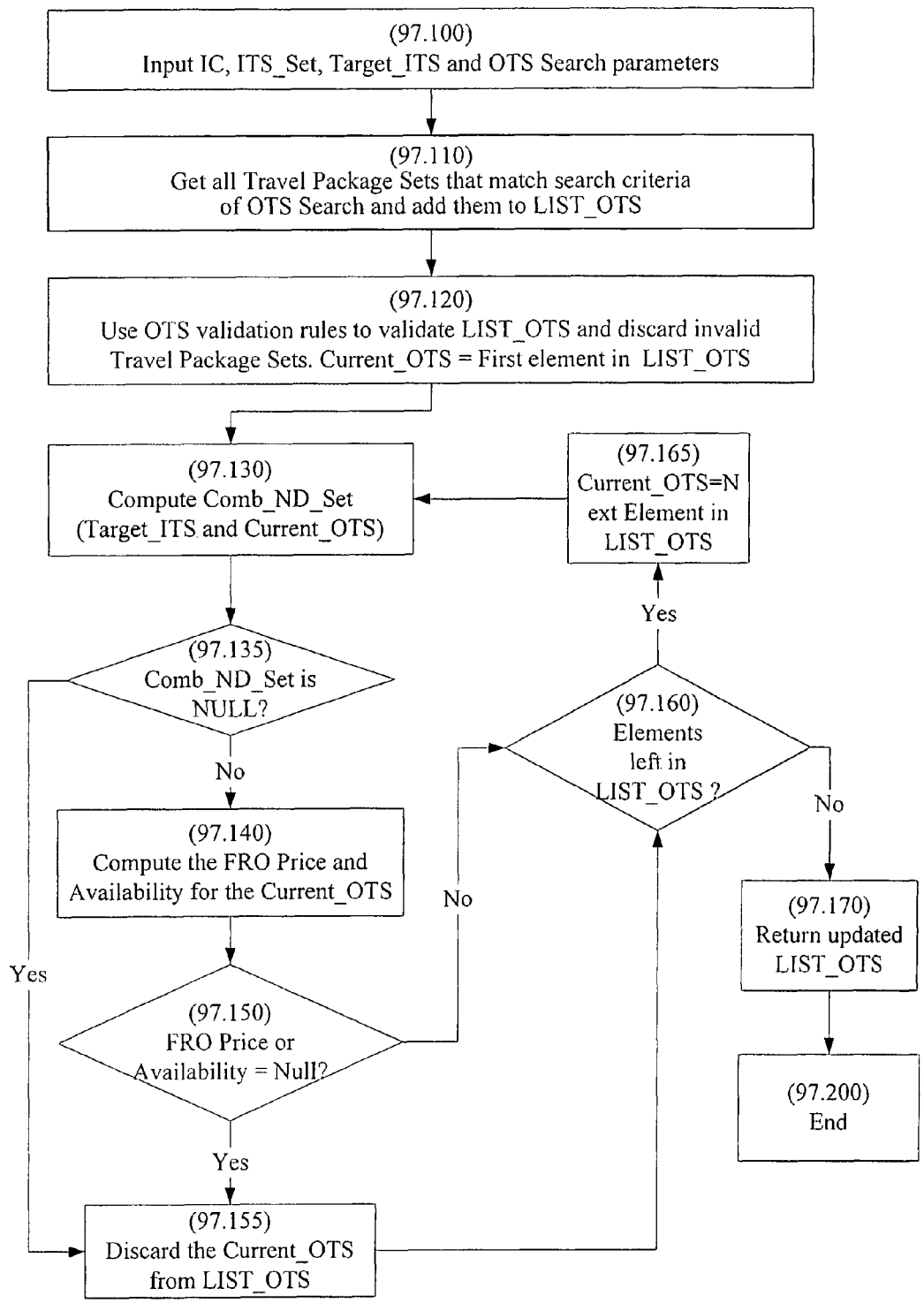
FIG. 97 is a flowchart that expands Act 120 of FIG. 96, illustrating an algorithm to search for FRO Travel Package Sets.

The following algorithm (shown in FIG. 97) determines and validates an OTS for a given set of conditions including, but not limited to, availability, Notify Deadline and FRO Price. One of the ways of implementation of OTS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 97.100, the number of customers (IC), ITS_Set (containing all ITS in the Initial Travel Package Order, and all the OTSs, (if any) already selected/received along with Comb_ND_Set(s) and Comb_OP_Set(s), for each ITS), Target_ITS and the OTS Search parameters are input to the system. The definitions and details of Comb_ND_Set and Comb_OP_Set are provided later. The OTS search parameters may include, but are not limited to, date, time and location, number of Travel Package Products per Travel Package Set, Notify Deadline, FRO Price (Initial and Exercise) and so forth. A customer may be allowed to input Notify Deadline and/or FRO Price on the basis of which valid OTSs (that satisfy the given criteria of Notify Deadline and/or FRO Price) may be searched for and displayed for the customer. In the travel industry, for example, a customer may be asked to input the origin and destination related parameters, and then a set of Notify Deadlines and FRO Prices may be computed for the travel packages that match the given criteria. In another example, a customer may input both the origin and destination and Notify Deadline and/or FRO Price as inputs and then a search may be performed for valid OTSs. In yet another example, a customer may input to the system, one or more travel packages, and/or inputs to search for one or more additional travel packages (e.g., origin and destination, price etc.) to search for OTS that may be combined with one or more input travel packages (by the customer) to constitute the total set of travel packages for a FRO. In such situations, a travel company may also validate the travel packages input by the customer to determine if said travel packages are eligible to be the FRO Travel Packages.

Next, control goes to Act 97.110, where an OTS Search is performed for the given criteria. The search may be best performed using a processor that may calculate results in optimal time. The order in which search parameters are executed may be optimized to reduce the search time, however, it may or may not affect the final outcome. A travel company may select any order of its choosing.

In Act 97.110, Travel Package Sets are determined that match the search criteria and the resulting Travel Package Sets are added to a list termed LIST_OTS. Next, in Act 97.120, a list of OTS validation rules is obtained from the travel company's FRO VOF database and the rules are used to validate all the Travel Package Sets in the LIST_OTS list. Travel Package Sets that do not satisfy the rules are discarded. Validation rules may include, but are not limited to, a Maximum Number of Travel Package Products per Travel Package Set Rule, a Maximum Travel Package Price Rule and so forth. For example, a Maximum Number of Travel Package Products per Travel Package Set Rule discards the Travel Package Sets that have more Travel Package Products than specified. A travel company may implement any validation rule of its choosing to further qualify the Travel Package Sets in the LIST_OTS list. As a last Act in Act 97.120, the first element in the updated LIST_OTS list is designated as the Current_OTS.

Next, control goes to Act 97.130, where a group of Comb_NDs is computed for the combination of the Target_ITS, all the existing OTS of the Target_ITS and the Current_OTS, and added to a set called Comb_ND_Set. Next, in Act 97.135, a test is performed to determine whether the Comb_ND_Set obtained in the previous Act is Null. If so, control goes to Act 97.155. If not, control goes to Act 97.140, where the FRO availability and FRO Price for the Comb_ND_ Set are determined. Next, in Act 97.150, another test is performed to determine whether the FRO Availability or the FRO Price is Null. If so, control goes to Act 97.155. If not, control goes to Act 97.160.

In Act 97.155, the Current_OTS is discarded from the LIST_OTS list, and control goes to Act 97.160, where a test is performed to determine if more elements are left in the LIST_OTS list. If so, control goes to Act 97.165. If not, control goes to Act 97.170.

In Act 97.165, the next element in the LIST_OTS list is designated as the Current_OTS and control loops back to Act 97.130 to repeat the process for the new Current_OTS. In Act 97.170, the updated LIST_OTS list is returned as the search result, and the algorithm ends in Box 97.200.

Computation of Notify Deadlines

A travel company may set one or more Notify Deadlines of its choosing for its Travel Package Products. Once the Notify Deadlines have been set for each Travel Package Product, the next Act is to create a framework to compute the Notify Deadlines for a group of Travel Package Products (such as a Travel Package Set, a Travel Package Order or any other group). The following sections present an example of a framework that may be used to obtain a set of Notify Deadlines applicable to a group of Travel Package Products. A travel company may use any framework and algorithm of its choosing to obtain the same.

A set of Notify Deadlines associated with a Travel Package Product, a Travel Package Set and a combination of two or more Travel Package Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Travel Package Sets. A Set_ND Set may be computed by combining the Product_ND_Sets of all the Travel Package Products under that Travel Package Set. The Notify Deadlines may be computed based on various parameters and factors of the travel company choosing. One example to compute a Comb_ND_Set is as follows. First compute Set_ND_Set for all Travel Package Sets. A Set_ND_Set is computed by first selecting earliest of the Notify Deadlines of each Travel Package Product within the concerned Travel Package Set, and then picking the latest of those Deadlines, and noting that as the Target_Deadline. Next step is to pick all those Notify Deadlines that fall after the Target_Deadline. Notify Deadlines thus obtained may be validated using various validation rules based on travel company factors such as customer utility, Travel Package Product parameters and so forth. Similarly, the Comb_ND_Set may thus be computed by repeating the above process for Set_ND_Sets, thus obtained for each Travel Package Set.

Available Capacity Check

The FRO capacity for an OTS may depend on one or more factors including, but not limited to, Notify Deadline, FRO Prices, expected Travel Package Product value and so forth. A travel company may use any method of its choosing to determine FRO capacity of a Travel Package Product. For example, a travel company may choose to have a fixed FRO capacity for one or more of its Travel Package Products.

An instance to compute FRO capacity is discussed below. Consider the case, when FRO Capacity is dependent on Notify Deadline. In such situation, the objective is to determine those Comb_NDs within the Comb_ND_Set on which FRO is available for the given OTS. The FRO Capacity and the Used FRO Capacity (the total number of Travel Package Products on which FRO has been sold but not exercised) may be calculated for each Comb_ND within the Comb_ND_Set. Available Capacity (AC) would then be the difference of FRO Capacity and Used FRO Capacity for the given Travel Package Product. If the AC is greater than or equal to the number of incoming customers desiring a FRO, then the FRO capacity is available at a given Comb_ND for the given OTS. The process may be repeated for all Notify Deadlines within Comb_ND_Sets. FRO may be made available on a given OTS for a given Comb_ND, if FRO is available on all the Travel Package Products of OTS for the given Comb_ND.

Price Calculation

A travel company may set FRO Prices for a Travel Package Product using any method of travel company's choosing. Once the FRO Prices have been set for each Travel Package Product, the next Act is to create a framework to compute FRO Price for a group of Travel Package Products (such as a Travel Package Set, a Travel Package Order or any other group) by using FRO Prices for each Travel Package Product in the group.

The parameter Product_OP refer to FRO Price (and may or may not be corresponding to a Notify Deadline) associated with a Travel Package Product. Similarly, Set_OP and Comb_OP refer to FRO Price (may or may not be corresponding to a Notify Deadline) associated with a Travel Package Set and a combination of two or more Travel Package Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the ITS and all the OTSs (existing and new). A Set_OP_Set is computed by combining the Product_OP_Sets of all the Travel Package Products under that Travel Package Set. One or more Set_OP_Rules may be read from the travel company's database and applied to calculate Set_OP_Set for each input Travel Package Set (ITS and all OTSs) using the Product_OP_Sets of all the Travel Package Products of said Travel Package Set. A travel company may use any Set_OP_Set Rule of its choosing. Set_OP_Rules may be defined to calculate Set_OP as the sum, average, highest, lowest or any other function of Product_OPs of all the Travel Package Products at a given Comb_ND. Similarly, a Comb_OP_Set comprises one or more Comb_OPs, and is calculated using one of the pre-determined rules, termed Comb_OP_Rules, to combine the Set_OPs of all the Travel Package Sets in the combination. A travel company may use a Comb_OP_Rule of its choosing. Comb_OP_Rules may be defined similar to the Set_OP_Rules.

Concurrent Get FRO Process

As explained above, in the Concurrent Get FRO process, a customer receives all FRO Travel Package concurrently in one transaction. An algorithmic illustration of an example of the Concurrent Get FRO process is displayed in FIG. 98. The FRO (2, 1) instance is assumed here as an example. Consider a customer who desires to trade-in his/her travel flexibility in lieu of a price (reward) offered by the travel company. In Act 98.100, the customer desires for FRO are input, including, but not limited to, a search criteria for two Travel Package Sets according to customer's utility (may be similar to the search criteria defined above for the Sequential Get FRO process).

Next, in Act 98.110, the FRO algorithm is run to determine the combinations of two Travel Package Sets that satisfy inputs. A list of such search results is displayed for the customer along with the associated terms and conditions including, but not limited to, Notify Deadlines, Initial FRO Price, FRO Exercise Price and Travel Package Price for each such combination. The FRO algorithm for the Sequential Get FRO process (defined above) may also be used for the Concurrent Get FRO process.

Next, in Act 98.120, the customer selects a desired combination of two Travel Package Sets and the associated conditions such as FRO Exercise Price/Notify Deadline. Next, in Act 98.130, a payment transaction is executed, if needed. For example, the customer may pay the Travel Package Price after taking into consideration the Initial FRO Price using a credit card, direct bank account debit or any other payment transaction mechanism. Next, the algorithm ends in Box 98.200. The computation may be performed using a processor that may calculate results in optimal time.

2. Event Optimizer

After the completion of the Get FRO process, the next stage is the Event Optimizer. In this stage, the Customer Notification (or CN, in short) process as shown in Act 93.200 is executed. In this process, one or more decisions on the selection of Chosen Travel Package(s) is notified to the customer. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

The FRO VOF helps to create a flexible customer inventory. In other words, by using the FRO VOF, a travel company may obtain rights to allocate any of the selected FRO Travel Packages to a FRO customer, and thus, said FRO customer acts like a flexible customer inventory that the travel company may manage at known cost and conditions. A travel company may design one or more uses of such flexible customer inventory, where each such use may include one or more events that follow the Initial Transaction. An example (the Buy_N process) was explained earlier. In the Buy_N process, a travel company may use the FRO VOF to accommodate requests from potential customers for Travel Package Products. As an example, the Buy_N process may especially be used to satisfy requests for Travel Package Products that have already been sold or have low (or no) availability. The details for the Buy_N process are presented below.

Another example to use the FRO VOF would be to use the FRO VOF in conjunction with one or more other VOFs, for example, the ATO (the Alternate Travel Package Option) VOF (details are provided later). A travel company may form a group of one or more ATO customers and one or more FRO customers, where the options (ATO and FRO) obtained by the group members are complementary in nature. As an example, consider a customer (A) who bought an ATO to choose either of T1 and T2 as Chosen Travel Package, and consider a customer (B) who received a FRO and is flexible to take any of T1 and T2 as Chosen Travel Package. Thus, if A decides to choose T1 as the Chosen Travel Package, the travel company may assign T2 as the Chosen Travel Package for B, and vice versa. The customers A and B have taken complementary options and may form a group. The travel company may need to hold only one unit of inventory in T1 and T2 to satisfy the needs of both A and B (assuming each A and B only need one unit of Travel Package Product). Such a combination of complementary options or VOFs may improve efficiency and concurrently enhance value for all the parties involved (in the given example, for A, B and the travel company). More details on combining VOFs are provided later.

The FRO VOF may also be used to reduce operational costs, constraints or other goals that are impacted by the allocation of Travel Package Products among different customers. For example, the FRO VOF may be used to shave off implementation costs by reducing capacity for one or more Travel Package Products that are low in demand. For example, if a travel company experiences a Travel Package Product with very low sales, it could offer FRO to customers on that Travel Package Product and thus, be able to economically and efficiently shift them to different Travel Package Products and thereby be able to cancel said Travel Package Product to save its execution costs (such as crew costs, staffing costs like agents, guide costs and so forth). If a travel company wants to do the same on a low demand Travel Package Product today (after reserving it for a few customers on it) without using FRO, it may be more difficult, tedious and costly affair to contact all the customers who reserved that Travel Package Product and/or to convince them to shift to other Travel Package Products.

The FRO VOF structure in the travel industry may enable a travel company to optimize operational levels such as Travel Package Product loads (or load factors), Travel Package Product scheduling, staff and crew scheduling and so forth. The FRO VOF may also enable a travel company to identify the optimal Travel Package Product facilities/services and Travel Package Product schedules on specific routes. There may be many other instances of optimization a travel company can achieve by using FRO, thus, generating additional revenue, greater customer satisfaction and loyalty or any combination of these.

A travel company may use the FRO VOF for any other purpose of its choosing. In all such uses, the travel company may use a system defined below that can help to optimally allocate Travel Package Product capacity among customers. The following system presents an example of a system (along with its methods and algorithms) that may be used to shift FRO customers within their selected FRO Travel Packages. However, a travel company may use any other process of its choosing to shift FRO customers within their selected FRO Travel Packages. The Buy_N process is used as an example to demonstrate the system and its set of methods and algorithms.

The process of shifting Y customers (i.e., FRO customers) within their selected FRO Travel Packages is termed "Remove_Y" process. The Remove_Y process may allow the travel company to remove FRO customers from their Accounted Travel Packages and optimally shift them to one of their Awaiting Travel Packages to satisfy a pre-defined goal.

The travel company, an entity other than the travel company and/or any combination thereof may store the data in a data store which may include, but is not limited to, the value that may be realized if the customer is shifted, Awaiting Travel Packages to which the customer may be shifted and so forth. The travel company, an entity other than the travel company and/or any combination thereof may receive and process data to determine from among all or substantially all possible combinations of customers, a set of customers which may be shifted. The travel company, an entity other than the travel company and/or any combination thereof may shift one or more set of customers that may be determined by processing the data. The travel company may also shift one or more set of customers other than the combination of customers that may be determined by processing said data. Set of customers which may be shifted or the decision to initiate shifting may depend upon number of factors including, but not limited to, the need and urgency to shift the customers, factors of travel company's choosing, creation of number of Travel Package availability, optimizing revenues which may for at least one of the customer, travel company and/or an entity other than said travel company, cost savings and so forth.

The travel company may, on detection of occurrence of one or more events, execute one or more event response algorithm which may determine one or more set of customers possessing options making them eligible to be shifted to one or more Travel Packages and may shift one or more of said set of customers to create Travel Package availability. Said event may be an increase in the demand of one or more Travel Packages or increase in forecasted demand of one or more Travel Packages or any combination thereof or any other event. The shifting may be done at the instance of the travel company, an entity other than said travel company or any combination thereof. The set of customers, here, may include one or more customers. The shifting may involve shifting of one or more customers. The shifting of one or more customers, as explained below in Remove_Y, may involve one or more interactions between the travel company, an entity other than the travel company, the customers and/or any combination thereof. The shifting may involve shifting one or more first customers to one or more first Travel Packages after one or more second customers from one or more first Travel Packages are shifted to one or more second Travel Packages and so forth. Such a cascading process may continue until the last customer which may have to be shifted in the set is shifted and it may lead to shifting of more customers than the creation of number of Travel Package availability. This process may involve two or more customers. This process has been explained in detail in below in the Remove_Y. The travel company and/or an entity other than the travel company may or may not notify the customer regarding said shifting within the specified Notification Deadline. The travel company and/or an entity other than the travel company may shift one or more customers to one or more Travel Packages belonging to said travel company, to one or more Travel Packages belonging to an entity other than said travel company and/or any combination thereof. Shifting may create a lot of value to the travel company and may lead to enhanced revenues and/or cost savings. However, it may also be possible that shifting may sometimes be a cost to the travel company and a travel company may still apply shifting (Remove_Y) for fulfillment of other goals and/or objectives of the travel company.

Buy_N Process

Figure 99:
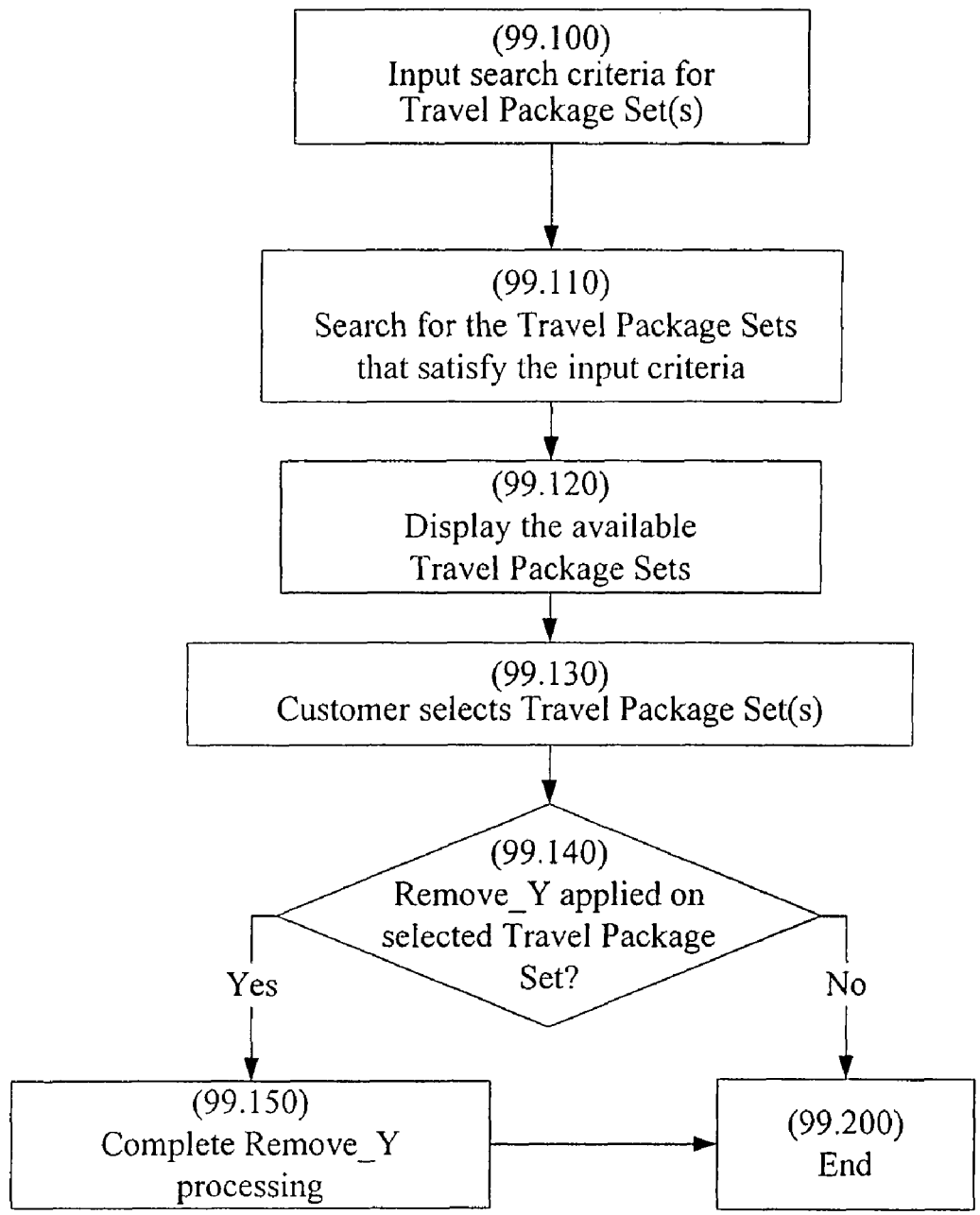
FIG. 99 is a flowchart illustrating the Buy_N process for a Travel package Set of a travel company that has implemented the FRO VOF.

FIG. 99 displays a flow chart of an example of a Buy_N algorithm, which is executed during a dynamic interaction between the customer and the travel company. As an example, an interaction may include a situation when a customer interacts with a travel company to obtain (or purchase) Travel Package Products, or when a travel company presents offerings to a customer (with or without a solicitation by the customer). A few parameters have been assumed to add context and enhance understanding. It is assumed that a customer is interacting with a travel company to purchase Travel Package Products, and that FRO VOF is implemented at the Travel Package Set level. In Act 99.100, the search criteria are input. Various search parameters for a desired Travel Package Set (as desired by the customer) are taken as the input to the system.

Next, in Act 99.110, a search process is executed to search for all Travel Package Sets that satisfy inputs. The details of the search process are described later. Next, in Act 99.120, all the search results are displayed before the customer in an interface (such as in a web browser, a telephone operator stating the search results over the phone etc.). Control then goes to Act 99.130, where the customer selects a Travel Package Set. The selection of the Travel Package Set may be followed by a payment and/or purchase of the selected Travel Package Set.

In Act 99.140, a test is performed to determine whether Remove_Y process has been applied on the selected Travel Package Set. If so, control goes to Act 99.150, where the Remove_Y process is completed for the selected Travel Package Set, and control then goes to Box 99.200. If not, control goes to Box 99.200, where the algorithm exits. The completion of the Remove_Y process may include one or more Acts that may be executed to incorporate the fact that said Travel Package Set was selected by the customer. For example, one of such acts may be to record the selection of said Travel Package Set to a database and/or to change the Accounted Status for one or more FRO customers (who were affected in the Remove_Y process).

Figure 100:
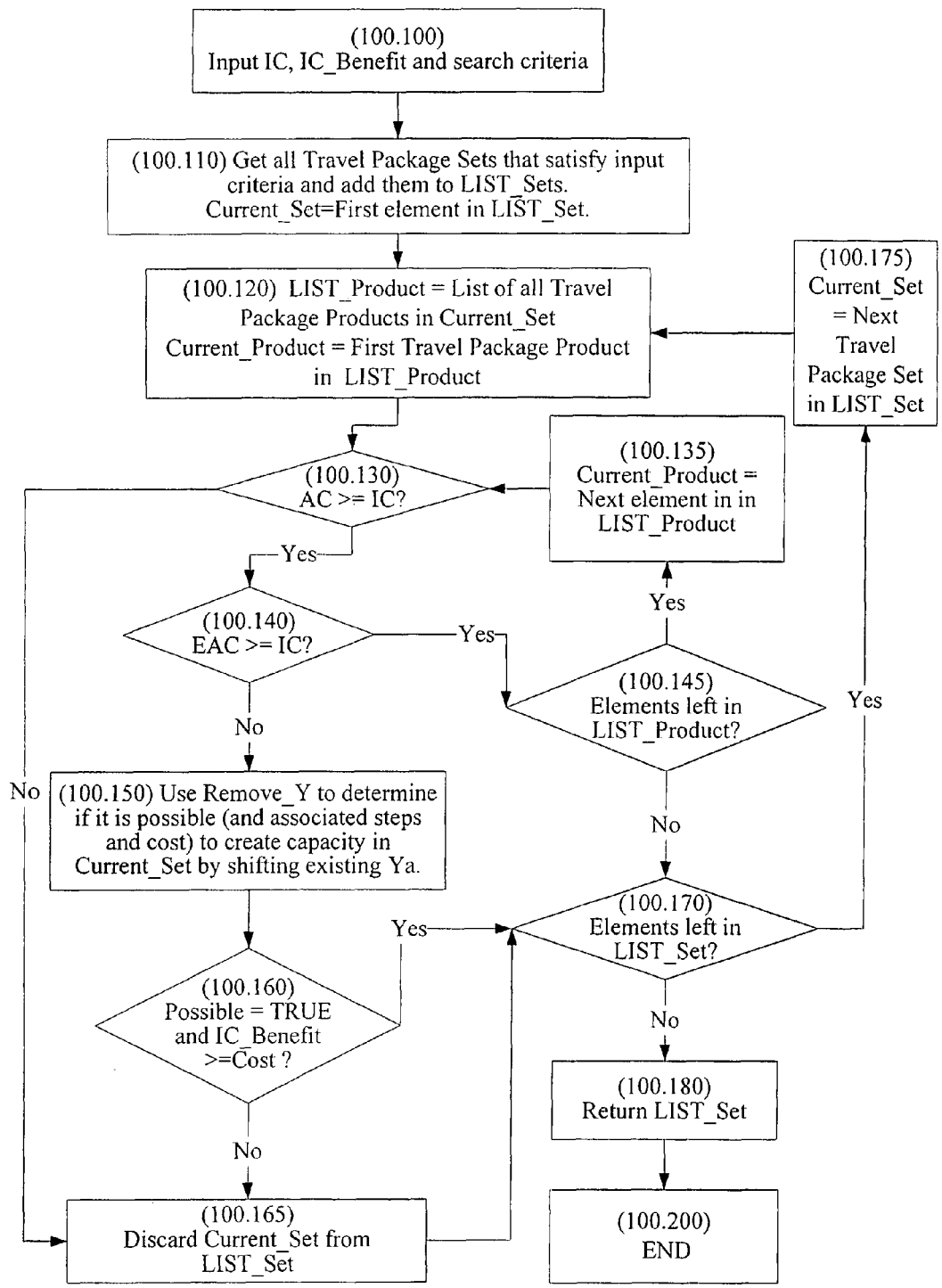
FIG. 100 is a flowchart that expands Act 110 of FIG. 99, illustrating an algorithm for the Buy_N search process.

FIG. 100 expands Act 110 of FIG. 99 and demonstrates an example of a search algorithm that may be used to determine Travel Package Sets that satisfy the inputs. In Act 100.100, IC (number of incoming customers), IC_Benefit (i.e., the benefit that a travel company may receive if the incoming customers select and/or purchase one or more Travel Package Sets) and the input search criteria are taken as the input parameters to the system. The term "Incoming Customers" refers to the customers who interact with the travel company in the current transaction (Buy_N). It is assumed that each customer desire one unit of capacity and thus, total units of capacity desired is equal to the total number of incoming customers. In some situations, IC_Benefit and/or IC may not be available as an input, and may be calculated during the search process. Next, in Act 100.110, all the Travel Package Sets that satisfy the 'search criteria' are searched from the travel company database. The Travel Package Sets, thus obtained, are added to a list termed LIST_Set. The first element in the LIST_Set list is designated as Current_Set.

Next, in Act 100.120, all the Travel Package Products in the Current_Set are added to a list termed LIST_Product. The first element in the LIST_Product list is designated as Current_Product. Next, in Act 100.130, a test is performed to determine whether the Available Capacity (AC) of the Current_Product is greater than or equal to IC. If so, control goes to Act 100.140. If not, control goes to Act 100.165.

In Act 100.140, another test is performed to determine whether EAC (Effective Available capacity) of the Current_Product is greater than or equal to IC. If so, control goes to Act 100.145. If not, control goes to Act 100.150, where the Remove_Y algorithm is executed to determine the possibility (and associated process steps and costs) to create capacity in the Current_Set.

Next, in Act 100.160, a test is performed to determine whether it is possible (by using Remove_Y) to create capacity in the Current_Set and the IC_Benefit is greater than or equal to the cost to create that capacity as determined in the Act 100.150. If both conditions are true, control goes to Act 100.170. If either condition is false, control goes to Act 100.165. In Act 100.165, the Current_Set is discarded from the LIST_Set list, and control then goes to Act 100.170.

In Act 100.145, a test is performed to determine whether more elements are left in the LIST_Product list. If so, control goes to Act 100.135, where the next element in the LIST_Product list is designated as the Current_Product and control loops back to Act 100.130, to repeat the process for the new Current_Product. If not, control goes to Act 100.170.

In Act 100.170, another test is performed to determine whether more elements are left in the LIST_Set list. If so, control goes to Act 100.175, where the next element in the LIST_Set list is designated as the Current_Set and control loops back to Act 100.120, where the process for the new Current_Set is performed. If not, control goes to Act 100.180, where the LIST_Set list (the most recently updated version after discarding the invalid Sets, if any) is returned. Next, the algorithm ends at Box 100.200.

Figure 101:
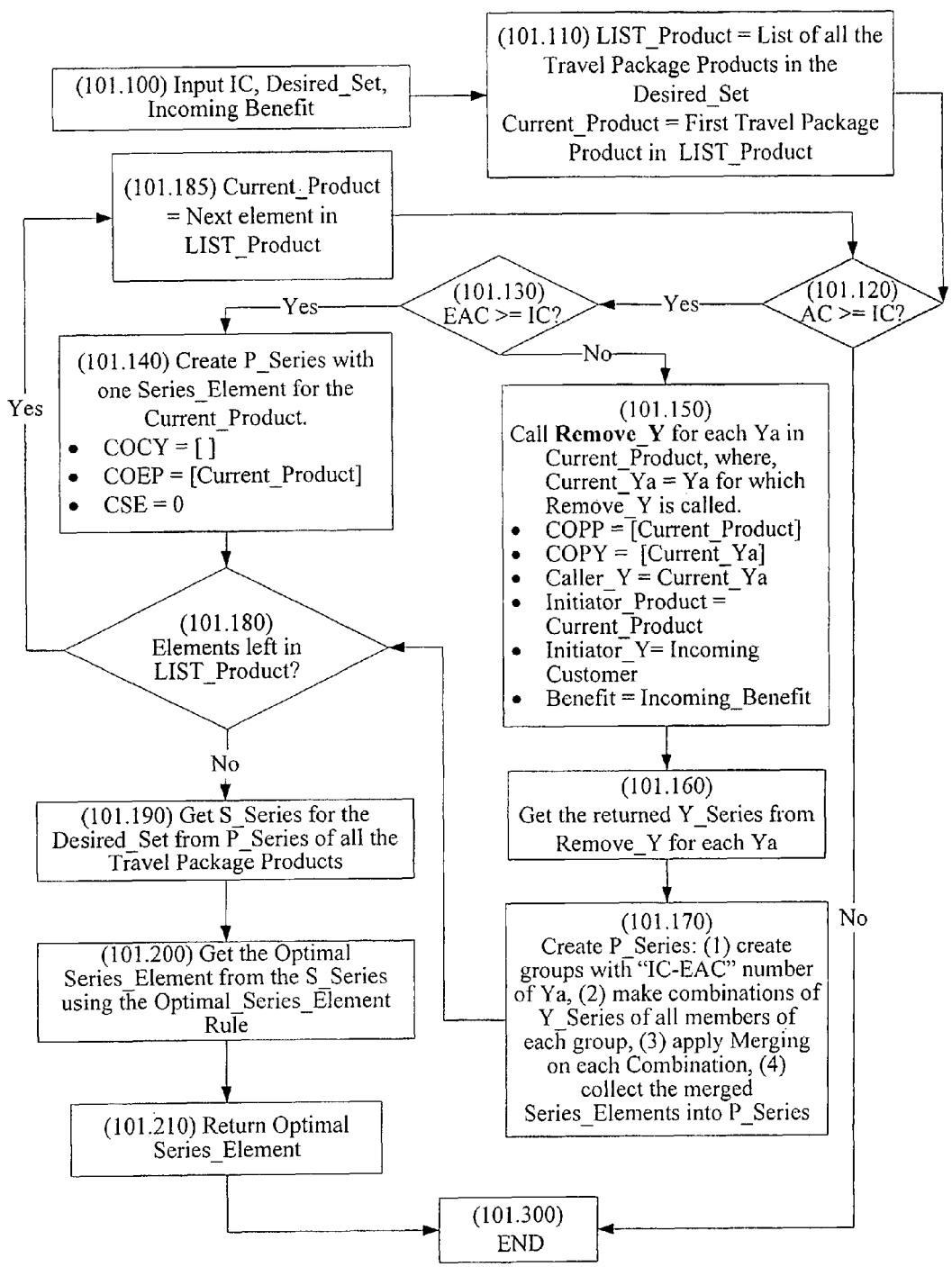
FIG. 101 is a flowchart that expands Act 150 of FIG. 100, illustrating an algorithm to create capacity using the Remove_Y algorithm.

FIG. 101 expands Act 150 of FIG. 100 and demonstrates an example of an algorithm to apply the Remove_Y algorithm to create one or more than one unit of capacity in one or more Product(s) within a Desired_Set (the Travel Package Set in which capacity needs to be created). In Act 101.100, various input parameters are taken in the system. Input parameters include IC, Desired_Set and Incoming_Benefit (i.e., benefit a travel company may realize if capacity is created in the Desired_Set)

Next, control goes to Act 101.110, in which all the Travel Package Products in the Desired_Set are listed in the LIST_Product list. The first Product in the LIST_Product list is designated as Current_Product. Next, in Act 101.120, a test is performed to determine whether the Available Capacity (AC) of the Current_Product is greater than or equal to IC. If so, control goes to Act 101.130. If not, control goes to Box 101.300, where the algorithm ends. In Act 101.130, another test is performed to determine whether EAC (Effective Available capacity) of the Current_Product is greater than or equal to IC. If so, then control goes to Act 101.140. If not, control goes to Act 101.150.

In Act 101.140, a P_Series is created for the Current_Product. Since the Current_Product is an End_Product, there will be only one Series_Element in the P_Series collection. The Series_Element will comprise COEP with the Current_Product as the only element, COCY with no elements and CSE with zero value (since no Ya needs to be removed from Current_Product, and hence, no cost to create capacity). Next, control goes to Act 101.180.

In Act 101.150, the Remove_Y algorithm is called for each Ya in the Current_Product and the algorithm follows a recursive loop. Each of the Ya becomes Current_Ya for the corresponding Remove_Y call. The necessary input parameters for each of the Remove_Y includes the Current_Product as 'COPP', Current_Ya as 'COPY', Current_Ya as 'Caller_Y', Current_Product as 'Initiator_Product', one of the incoming customers as 'Initiator_Y' and Incoming_Benefit as 'Benefit'. The Remove_Y call returns a Y_Series collection for each Ya in the Current_Product. The details of the Remove_Y algorithm are discussed in the next section.

Next, control goes to Act 101.160, where all the Y_Series collections are obtained as returned from the Act 101.150. Next, in Act 101.170, a P_Series collection for the Current_Product is calculated through the following operations: (1) create groups of Ya from all Ya of the Current_Product for which Remove_Y was called, where the number of Ya in each group is equal to "IC-EAC" (EAC of the Current_Product), (2) make combinations of the Y_Series collection of all members of each group (combine each Series_Element of each Y_Series of each member with that of each of the rest of the members of that group), (3) merge all members within each combination to formulate a merged Series_Element, (4) collect all such merged Series_Elements, thus obtained, into P_Series collection of the Current_Product. Details on making combinations and merging are provided later.

Next, in Act 101.180, a test is performed to determine whether more elements are left in the LIST_Product list. If so, control goes to Act 101.185, where the next element in the LIST_Product list is designated as the Current_Product and control loops back to Act 101.120 to repeat the process for the new Current_Product. If not, control goes to Act 101.190.

In Act 101.190, a S_Series collection for the Desired_Set is calculated from the P_Series collections of all the Travel Package Products using the combination and merging process (details provided later). Next, in Act 101.200, an optimal Series_Element from the S_Series collection is determined using Optimal_Series_Element Rule (which is read from a database). Next, control goes to Act 101.210, where the optimal Series_Element is returned and the algorithm exits at Box 101.300.

'Remove_Y' Algorithm

Figure 102:
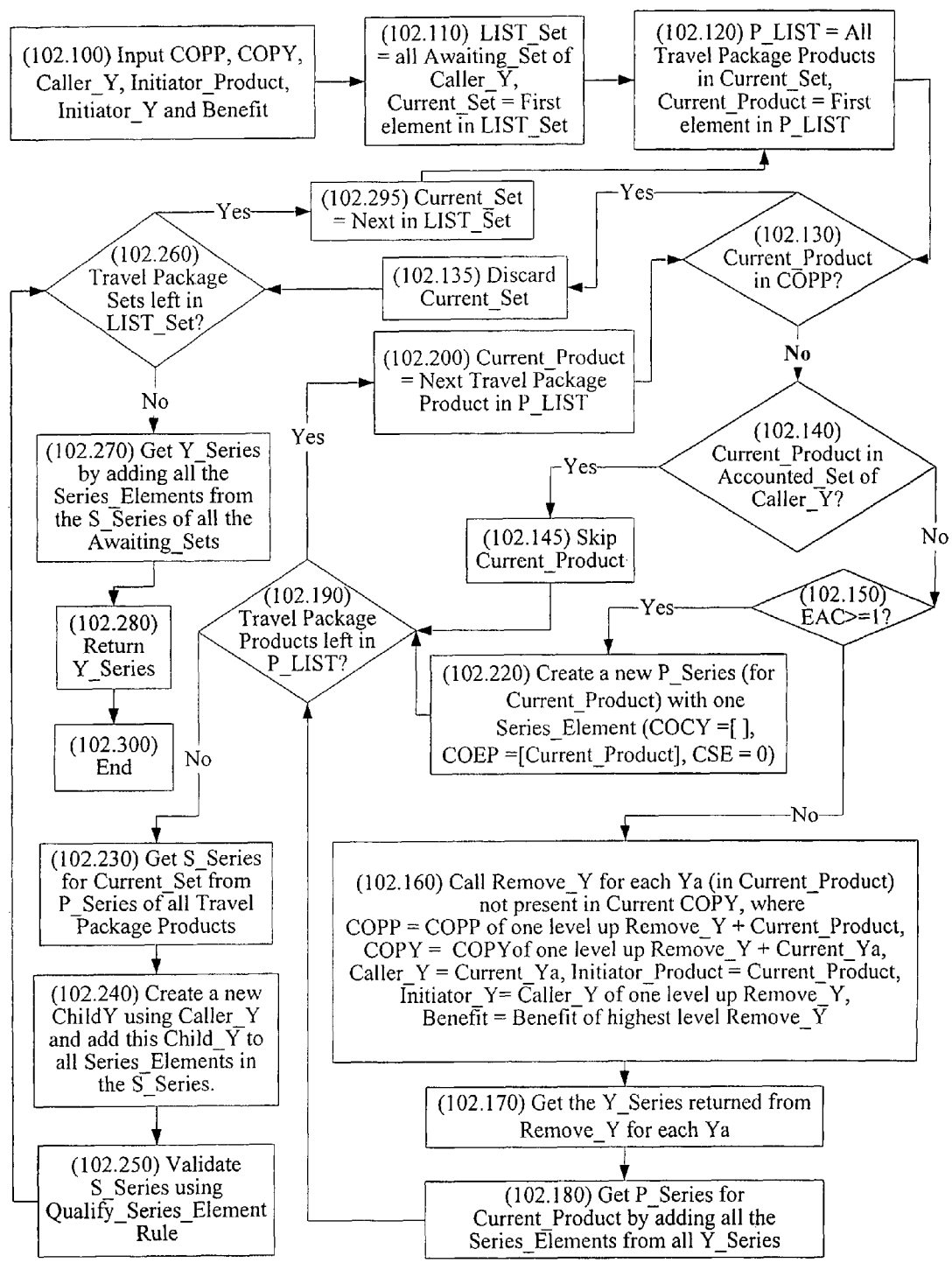
FIG. 102 is a flowchart that expands Act 150 of FIG. 101, provides an algorithmic illustration for the Remove_Y algorithm.

The following algorithm presents an example of an algorithm that may be used to create one unit of capacity of a Travel Package Product by shifting a Ya Accounted in a Travel Package Product to its Awaiting_Set. FIG. 102 represents an algorithmic illustration for Remove_Y. The Remove_Y is a recursive algorithm, which returns a collection of Series_Element termed "Y_Series" collection for the Ya for which the algorithm has been called.

In Act 102.100, a set of parameters including COPY, COPP, Caller_Y, Initiator_Product, Initiator_Y and Benefit are input to the system. Next, in Act 102.110, all the Awaiting Sets of the Caller_Y are added to a list termed LIST_Set. The first element in the LIST_Set list is designated as Current_Set. Next, in Act 102.120, all the Travel Package Products that belong to the Current_Set are added to another list termed P_LIST. The first element in the P_LIST list is designated as Current_Product.

Next, in Act 102.130, a test is performed to determine whether the Current_Product is present in the COPP. If so, the Current_Set is discarded in Act 102.135, and control goes to Act 102.260. If not, control goes to Act 102.140.

In Act 102.140, another test is performed to determine whether the Current_Product is present in the Accounted_Set of the Caller_Y. If so, the Current_Product is skipped in Act 102.145, and control then goes to Act 102.190. If not, control goes to Act 102.150, where another test is performed to determine if the EAC of the Current_Product is greater than or equal to 1. If so, control goes to Act 102.220. If not, control goes to Act 102.160.

In Act 102.220, a new P_Series collection is created with only one Series_Element, since the Current_Product is an End_Product. The Series_Element will comprise COEP with the Current_Product as the only element, COCY with no elements and CSE with zero value. Next, control goes to Act 102.190.

In Act 102.160, the algorithm enters into a recursive loop where the Remove_Y algorithm is called for each of the Ya in the Current_Product that is not present in the COPY. Each of the Ya becomes Current_Ya for the corresponding Remove_Y call. The necessary input parameters for each of the Remove_Y includes 'COPP' (includes the COPP of one level up Remove_Y and the Current_Product), 'COPY' (includes the COPY of one level up Remove_Y and the Current_Ya), the Current_Ya as 'Caller_Y', the Current_Product as 'Initiator_Product', Caller_Y of one level up Remove_Y as 'Initiator_Y' and benefit of the highest level Remove_Y as 'Benefit'. Each of the Remove_Y call returns a Y_Series collection for every Ya for which Remove_Y was called.

Next, in Act 102.170, the algorithm receives the returned Y_Series collection from all the Remove_Y algorithm calls in Act 102.160. Control then goes to Act 102.180, where a P_Series collection for the Current_Product is calculated by adding all the Series_Elements from all the returned Y_Series collection obtained in Act 102.170. Control then goes to Act 102.190.

In Act 102.190, a test is performed to determine whether more Travel Package Products are left in the P_LIST list. If so, control branches out to Act 102.200, where the next Travel Package Product in the P_LIST list is designated as the Current_Product, and control then goes to Act 102.130 where the process is repeated for the new Current_Product. If not, control goes to Act 102.230.

In Act 102.230, the S_Series collection is calculated for the Current_Set by combining and merging all the P_Series collection of all the Travel Package Products (not taking the skipped Travel Package Product(s) into consideration, if any). Next, in Act 102.240, a new ChildY is created using the Caller_Y. The ChildY comprises COI (where the current Initiator_Product is designated as Initiator_Product and the current Initiator_Y is designated as Initiator_Y), Accounted_Set of the Caller_Y designated as the Initial_Accounted_Set, current Awaiting_Set designated as the Final_Accounted_Set, and the cost to shift current Caller_Y from the Initial_Accounted_Set to the Final_Accounted_Set designated as the CCY. The ChildY, thus created, is added to every Series_Element in the S_Series collection and the CCY of the same ChildY is added to the CSE (Cost of Series_Element) of every Series_Element. Control then goes to Act 102.250.

In Act 102.250, a Qualify_Series_Element rule is read from the travel company's database and is applied to validate all the Series_Elements in the S_Series collection. The invalid Series_Elements are discarded from the S_Series collection. A travel company may select any rule of its choosing. For example, a Qualify_Series_Element rule may only qualify those Series_Elements for which the CSE is less than or equal to the 'Benefit'. Next, control goes to Act 102.260.

In Act 102.260, a test is performed to determine whether more Travel Package Sets are left in the LIST_Set list. If so, control branches out to Act 102.295, where the next element in the LIST_Set list is designated as the Current_Set, and then control loops back to Act 102.120, where the process is repeated for the new Current_Set. If not, control goes to Act 102.270, where the Y_Series collection is obtained by adding all the Series_Elements of all the S_Series collections for all the Awaiting_Sets of the Caller_Y. Next, the Y_Series collection is returned in Act 102.280, and the algorithm ends in Box 102.300.

Combinations of P_Series in order to formulate S_Series are calculated by cross multiplication of Series_Elements (of each P_Series). A travel company may choose to implement any method of its choosing to make combinations. One method is as follows. Consider n number of Series; say $S_1$, $S_2$, $S_3$ ... $S_n$, with k1, k2, k3 ... kn number of Series_Element respectively. Each Combination is a collection of the Series_Elements. For instance, $C1=\{S_1[1], S_2[1], S_3[1], \ldots S_n[1]\}$, where, $S_p[1]$ denotes the first Series_Element of $p^{th}$ Series; $C2=\{S_1[2], S_2[1], S_3[1], \ldots S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of Y_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various products involved. A given unit of product capacity at any given point must only be accounted for one customer, otherwise, it may lead to a shortage situation, where one Travel Package Product is allocated to more than one customer leading to dissatisfaction for customers. A travel company may choose any method of its choosing to perform merging of Series_Elements, and specifically to perform merging of two Series_Elements. The method of merging chosen may affect the total value realized. One example of such a method is given. In one approach, a travel company may choose to discard all merged Series_Elements that have either one or more common ChildY or common End_Product. A common ChildY in two Series_Elements suggest that in both Series_Elements shifting of one specific Ya is needed. If each Series_Element requires shifting of Ya to two different Travel Package Sets, it may present a contradictory situation. Similarly, a common End_Product in two or more Series_Elements (that are to be merged together) may require shifting more than one Ya customer to a specific Travel Package Product, which may or may not be feasible depending on the AC (and EAC) of that Travel Package Product. Thus, a common End_Product may also represent one or more contradictory or invalid situations.

A travel company may use any set of rules to validate or invalidate one or more constituents of any of the merged components. For example, a merged Series_Element, M, obtained from merging of two Series_Elements S1 and S2, may comprise the COEP (addition of COEP of S1 and S2), COCY (addition of COCY of S1 and S2) and CSE (addition of CSE of S1 and S2).

Remove_Y and Buy_N processes may generate value for the travel company, an entity other than the travel company, customers and/or any combination thereof. The value may include, but is not limited to cost savings for the travel company, an entity other than said travel company, any combination thereof. The value generated may also include, but is not limited to, soft value, value attributable to customer goodwill, satisfaction and loyalty. The value so generated may optimize revenue of at least one entity other than said travel company.

Customer Notification Process

In the customer notification (CN) process, a decision for the Chosen Travel Package is notified to the customer. As mentioned earlier, the Chosen Travel Package may be defined by the travel company, the customer, another entity or any combination thereof. However, the travel company may want to keep the right to select (or define) the Chosen Travel Package in the FRO VOF. A travel company may use any method of its choosing to define the Chosen Travel Package. A travel company may use a software application built on the method defined above to optimally define the Chosen Travel Package to FRO customer.

Figure 103:
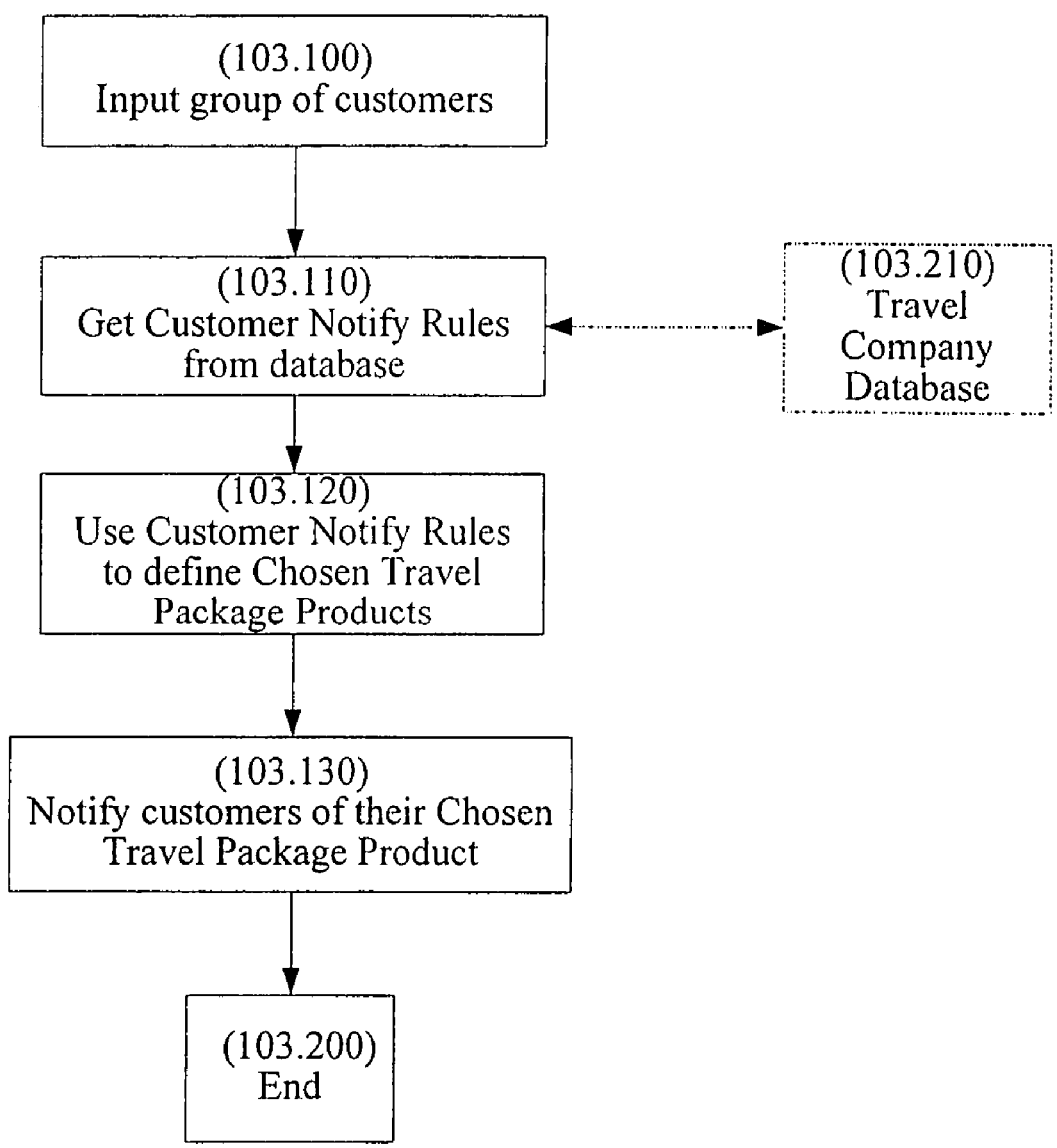
FIG. 103 is a flow chart illustrating an example of an algorithm of Customer Notification process in the travel industry.

FIG. 103 displays an example of an algorithm that may be used to execute the Customer Notification process. In Act 103.100, a group of (one or more) customers is taken as input. Next, in Act 103.110, a set of one or more Customer Notify Rules may be used to define the Chosen Travel Package. A travel company may choose any Customer Notify Rule of its choosing. The Customer Notify Rules may depend upon expected value of the Travel Package Product, expected sales volume and so forth. For example, a travel company may choose a Customer Notify Rule, which selects the Travel Package Product with the higher value as the Chosen Travel Package. Alternatively, a rule may be chosen which selects the Travel Package Product with the lower value as the Chosen Travel Package. While defining the Chosen Travel Package, a travel company may also want to use the Remove_Y algorithm (as used in the Buy_N process given above) to determine the optimal Chosen Travel Package that satisfies a pre-determined goal. Thus, during the CN process, one or more Ya may be shifted in the process of selecting the optimal Chosen Travel Package. A Customer Notify Rule may also select the Travel Package Product with the higher sales volume as the Chosen Travel Package. A Customer Notify Rule may specify that if FRO VOF is used in conjunction with any other VOF (such as APO VOF and so on), then the Grouping Rules (defined later) may govern the selection of the Chosen Travel Package.

Next, in Act 103.120, the Customer Notify Rules, thus obtained from the travel company's database, are used to define Chosen Travel Package(s). Next, in Act 103.130, the customers are notified about their Chosen Travel Package(s), and the algorithm then ends in Box 103.200.

Implementation of FRO VOF in Conjunction with Other VOFs

FRO VOF may be used in conjunction with one or more other VOFs, for example, the ATO (the Alternate Travel Package Option) VOF. A customer who receives an ATO is termed "A" type of customer. A travel company may form a group of one or more ATO customers and one or more FRO customers, where the options (ATO and FRO) obtained by the group members are complimentary in nature. As an example, consider an A customer who bought an ATO to choose either of T1 and T2 as the Chosen Travel Package, and consider a Y customer who received a FRO and is flexible to take any of T1 and T2 as the Chosen Travel Package. Thus, if A decides to choose T1 as the Chosen Travel Package, the travel company may assign T2 as the Chosen Travel Package for Y, and vice versa. The customers A and Y have taken complimentary options and may form a group. The travel company may need to hold only one unit of inventory in T1 and T2 to satisfy the needs of both A and Y (assuming each A and Y only need one unit of Travel Package Product). Such a combination of complimentary options or VOFs may improve efficiency and concurrently enhance value for all the parties involved (in the context of the current example, enhance value for A, Y and the travel company).

The implementation of the grouping of A type and Y type of customers may be done in one or more ways. One way to implement such grouping is to first have one or more Y type of customers and based on such customer(s), the travel company may offer complimentary ATOs to customers to make groups. In another implementation, the travel company may first offer ATO and based on such ATO customer(s), travel company offers complimentary FRO to the customers to make groups. In yet another implementation, the travel company may offer ATO and FRO separately and then define a process to make complimentary groups of A and Y customers (such groups termed "AY_Groups").

A travel company may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an ATO to choose either of T1 and T3 as the Chosen Travel Package, a Y1 customer who received a FRO and is flexible to take any of T1 and T2 as the Chosen Travel Package and a Y2 customer who has also received a FRO and is flexible to take any of T2 and T3 as the Chosen Travel Package. A notation A-Y1-Y2 represents this example. Thus, if A decides to choose T1 as the Chosen Travel Package, the travel company may assign T2 as the Chosen Travel Package for Y1 and T3 as the Chosen Travel Package for Y2. Alternatively, if A decides to choose T3 as the Chosen Travel Package, the travel company may assign T1 and T2 as the Chosen Travel Packages for Y1 and Y2, respectively.

It is assumed that a "unit" represents one unit of Travel Package Product (or Travel Package Product capacity) and each customer needs only one unit of a Travel Package Product. Continuing with the above example, if the travel company were to not consider the complimentary nature of options obtained by A, Y1 and Y2 customers, the travel company may need to hold (or block) a total of 4 units of capacity to ensure complete satisfaction of needs of A, Y1 and Y2, i.e., 2 units for A (1 unit each of T1 and T3 as A could choose any Travel Package Product), 1 unit for Y1 (of either T1 or T2) and 1 unit for Y2 (of either T2 or T3). This implies, to satisfy a total need of 3 units of Travel Package Products, the travel company may need to hold (or block) 4 units of Travel Package Product capacity, creating a redundant capacity of 1 unit that the travel company may not be able to use otherwise. By creating a complimentary group of A-Y1-Y2, the travel company needs to only hold (or block) 3 units of capacity (1 unit each in T1, T2 and T3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A travel company may choose to implement grouping at various Travel Package levels such as Travel Package Product, Travel Package Set and Travel Package Order. A travel company may also change terms and conditions of one or more option contracts of one or more FRO and/or ATO customers (for e.g., price, notify deadline and so on) to solicit customer participation in FRO/ATO to create more AY_Groups. The travel company may also offer incentives to customers to choose complimentary FRO/ATO offerings to enable the travel company to create more AY_Groups. The implementation methods mentioned above for grouping are for illustration purposes only and a travel company may choose to implement grouping in one or more other ways or by combining above said methods or by combining one or more other ways along with one or more above said methods.

Figure 104:
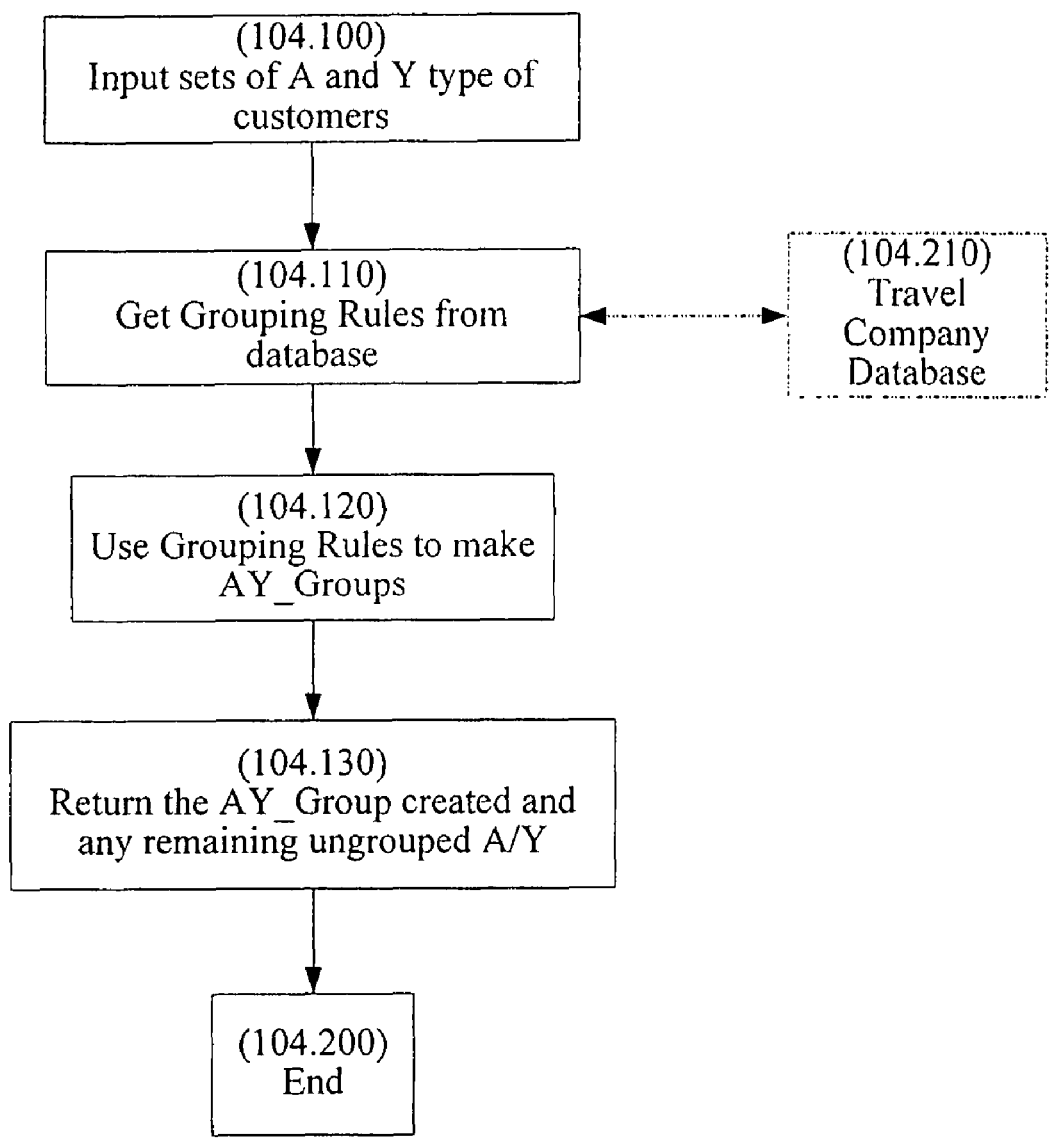
FIG. 104 is a flowchart illustrating an example of an algorithm to implement grouping of A and Y type of customers in the travel industry.

FIG. 104 displays a flow chart that illustrates one way of implementing grouping of A and Y type of customers. In Act 104.100, sets of A and Y customers are taken as input. Next, in Act 104.110, a set of one or more Grouping Rules is read from the travel company's database (104.210). A grouping rule may depend upon the number of A and/or Y type of customers, desired capacity redundancy in the system, the permissible time factor to create AY_Groups, any other rule of travel company choosing, any combination thereof and so on. For example, a travel company may choose a Grouping Rule whereby new groups are created by first ungrouping one or more of the AY_Groups (created earlier but unexercised, for example, groups for which the customer has not been notified, or if notified, the customer has not utilized the Travel Package Product and the terms of option contract allows for a change in the Chosen Travel Package). A Grouping Rule may create groups of only those A and Y type of customers who have yet to be grouped and discarding all A/Y customers that have already been grouped. A travel company may implement any Grouping Rule to formulate AY_Groups. The choice to Grouping rules may enhance the overall value for the travel company (for example, reduce the total capacity required to satisfy product needs for all A and Y customers). Theoretically, the number of units of the Travel Package Product required (or blocked) should be equal to the number of customers buying the Travel Package Product (assuming each customer wants one unit of Travel Package Product). Thus, by implementing the grouping and with the help of appropriate Grouping Rules, the travel company may attempt to achieve such theoretical minima.

Next, in Act 104.120, the Grouping Rules, so obtained from the travel company's database, are used to make AY_Groups. Next, in Act 104.130, the AY_Groups so created are returned along with ungrouped A/Y, if any, and the process then ends in Box 104.200.

The grouping may enhance customers' experience, and may comprise operating a system that delivers a FRO to at least a "first customer" to utilize up to n of m selected Travel Package Products for said first customer, where n is less than or equal to m; operating a system that delivers an ATO to at least a "second customer" to utilize up to k of p selected Travel Package Products, where is less than or equal to p; operating a system to define each of the k Chosen Travel Package Products, whereby after each of the k Chosen Travel Package Products is defined, said second customer can utilize said Chosen Travel Package Product; operating a system wherein a travel company defines t Chosen Travel Package Product(s) for said first customer after each of said k Chosen Travel Package Products is defined, wherein after each of said t Travel Package Products is defined, said first customer can utilize said defined Travel Package Product, where t is less than or equal to n. Said t Travel Package Products may be a subset of n Travel Package Products, m Travel Package Products or both. Said t Travel Package Products or n Travel Package Products or both may also include one or more Travel Package Products not included in said m selected Travel Package Products. Similarly, k products may be a subset of p Travel Package Products, or may include one or more Travel Package Products other than said p Travel Package Products. The grouping may be performed for a multiplicity of at least one of said first or second customers and may combine together at least one of each of said first and second customers to formulate at least one group with at least one complimentary set of options. The grouping may enable a travel company, an entity other than the travel company and/or any combination thereof to utilize at least one of said m or p Travel Package Products at least after delivery of any of said first or second options. The travel company and/or an entity other than the travel company may implement FRO VOF where in the first and/or second customer in said grouping may be same. The notification conditions may be different, same or any combination thereof for the first and second option.

Said first and/or second option may or may not include any notification deadline condition. The travel company, the second customer, an entity other than said travel company and/or any combination thereof may define, at one or more times, at least one of said k Chosen Travel Packages. The travel company, the first customer, an entity other than said travel company and/or any combination thereof may define, at one or more times, at least one of said p Chosen Travel Packages. The first customer may select, at one or more times, at least one of said m Travel Packages. The second customer may select, at one or more times, at least one of said p Travel Packages. The travel company and/or an entity other than the travel company may receive from at least one of said first or second customer, at one or more times, an indication of one or more terms and conditions associated with said first or second options, respectively. Similarly, at least one of said travel company and/or an entity other than said travel company may deliver to at least one of said first or second customers, at one or more times, one or more terms and conditions associated with said first or second option, respectively. There may or may not be any payment transaction between the travel company, an entity other than the travel company, and at least one of said first and/or second customer.

The FRO VOF may be used in conjunction with one or more other VOFs, for example, the UTPO VOF. A customer who received a UTPO is termed "U" type of customer. A travel company may form a group of one or more UTPO customers and one or more FRO customers, where the options (UTPO and FRO) obtained by the group members are complimentary in nature.

The implementation of the grouping of Y type and U type of customers may be done in one or more ways. One way to implement such grouping is to first offer and secure one or more Y type of customers and based on such customer(s), the travel company may offer complimentary UTPOs to other customers to make groups. In another implementation, the travel company may first offer and secure UTPO and based on such FRO customer(s), the travel company offers complimentary FRO to other customers to make groups. In yet another implementation, the travel company may offer UTPO and FRO separately and then define a process to make complimentary groups of U and Y customers (such groups termed "UY_Groups").

A travel company may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(T1, T3), U1[up(T2), base(T3)] and U2[up(T1), base(T2)]. The notation Y(T1, T3) implies a customer Y who has received a FRO and is flexible to have either T1 or T2 as the Chosen Travel Package. The notation U1[up(T2), base(T3)] implies a customer U1 who received a UTPO and wishes to get an upgrade from T3 (i.e., the base travel package) to T2 (i.e., the up travel package), and U2[up(T1), base(T2)] implies a customer U2 who received a UTPO and wishes to get an upgrade from T2 (i.e., the base travel package) to T1 (i.e., the up travel package). A notation Y-U1-U2 represents this example. Thus, there are three travel packages T1, T2, and T3 and they are occupied by Y, U2, and U1 respectively. The three customers have different value needs. The customer Y is flexible on either T1 or T3 if he/she receives a desired reward for trading-in his/her flexibility. The customer U1 has a base travel package T3 and wishes to get T2 as the Up Travel Package. If a travel company is able to upgrade U1 from T3 to T2, it may generate incremental value for both the customer and the travel company. But in the existing framework (i.e., without using conjunction of more than one VOFs), the travel company may not be able to achieve this without an available capacity on travel package T2. Similarly, U2 has a base travel package T2 and wishes to get T1 as the Up Travel Package. A travel company may customize the desired values for the three customers by leveraging on Y's flexibility and upgrading U1 and U2. The travel company may assign T3 as Chosen Travel Package to Y, upgrade U2 from T2 to T1, and upgrade U1 from T3 to T2. The travel company may be able to generate customer surpluses in the process of U1 and U2 upgrades, which would not have been possible normally. Thus, a travel company may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the travel company).

It is assumed that a "unit" represents one travel package (or travel package capacity) and each customer needs only one travel package. Continuing with the above example, if the travel company were to not consider the complimentary nature of options obtained by Y, U1 and U2 customers, the travel company may need to hold (or block) more than 3 units of capacity to ensure complete satisfaction of needs of Y, U1 and U2. This implies, to satisfy a total need of 3 travel packages, the travel company may need to hold (or block) more than 3 travel packages, creating a redundant capacity of at least one travel package that the travel company may not be able to use otherwise. By creating a complimentary group of Y-U1-U2, the travel company does not need to hold any capacity, thus freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

A travel company may choose to implement grouping at various levels. A travel company may also change terms and conditions of one or more option contracts of one or more UTPO and/or FRO customers (for e.g., price, notify deadline and so on) to solicit customer participation in UTPO/FRO to create more UY_Groups. The travel company may also offer incentives to customers to choose complimentary UTPO/FRO offerings to enable the travel company to create more UY_Groups. The implementation methods mentioned above for grouping are for illustration purposes only and a travel company may choose to implement grouping in one or more other ways or by combining above said methods or by combining one or more other ways along with one or more above said methods.

Figure 105:
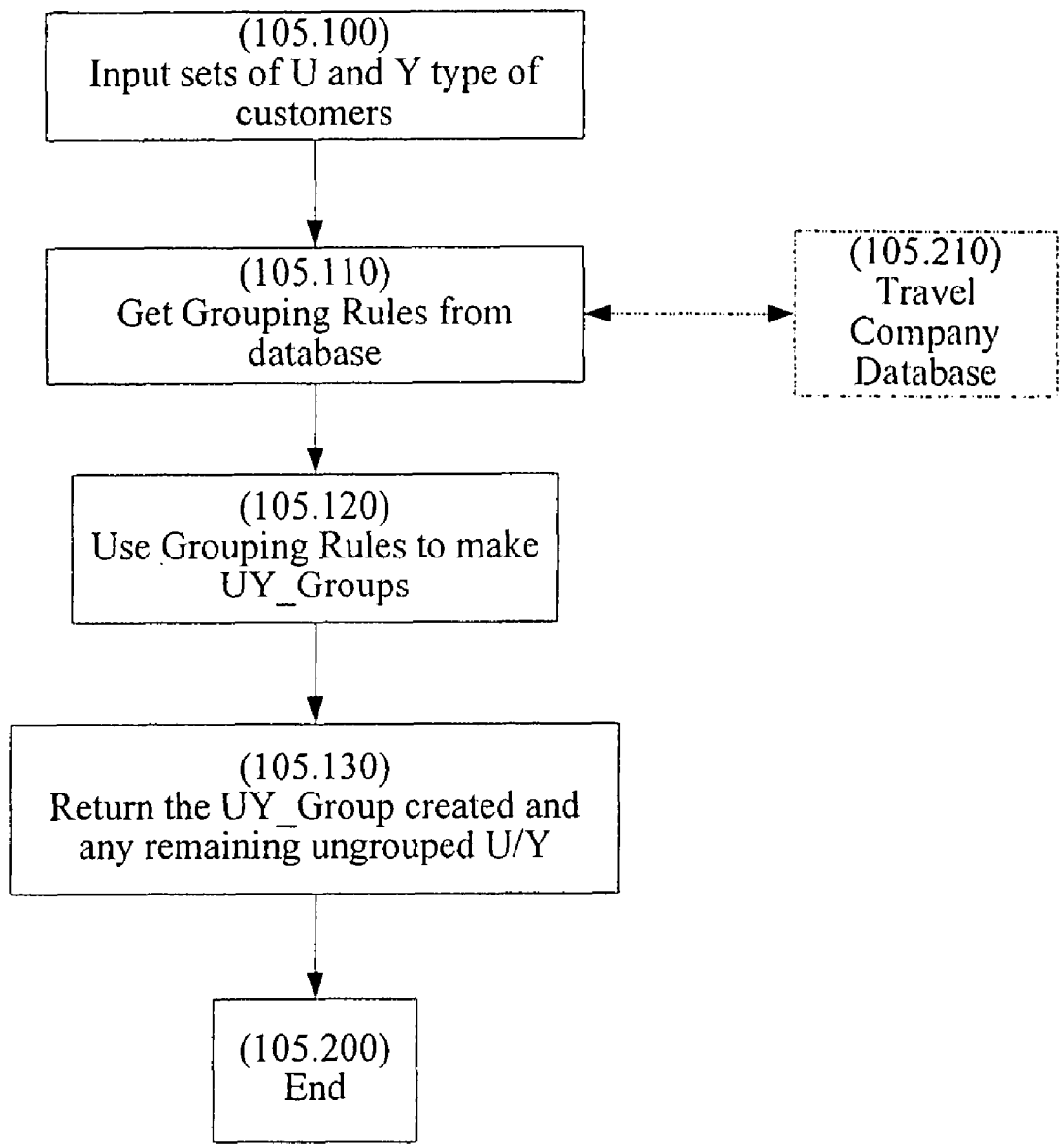
FIG. 105 is a flowchart illustrating an example of an algorithm to implement grouping of U and Y type of customers in the travel industry.

FIG. 105 displays a flow chart that illustrates one way of implementing grouping of U and Y type of customers. In Act 105.100, sets of U and Y customers are taken as input. Next, in Act 105.110, a set of one or more Grouping Rules is read from the travel company's database (105.210). A grouping rule may depend upon the number of U and/or Y type of customers, desired capacity redundancy in the system, the permissible time factor to create UY_Groups, any other rule of travel company choosing, any combination thereof and so on. For example, a travel company may choose a Grouping Rule whereby new groups are created by first ungrouping one or more of the UY_Groups (created earlier but unexercised, for example, groups for which the customer has not been notified, or if notified, the customer has not utilized the travel package and the terms of option contract allows a change in the Chosen Travel Package). In another example, a Grouping Rule may create groups of only those U and Y type of customers who are yet to be grouped and discarding all U/Y customers, which have already been grouped. A travel company may implement any Grouping Rule to formulate UY_Groups. The choice to Grouping rules may enhance the overall value for the travel company (for example, reduce the total capacity required to satisfy travel package needs for all U and Y customers). Theoretically, the number of units of the travel package required (or blocked) should be equal to the number of units the customers shall be eventually utilizing. Thus, by implementing the grouping and with the help of appropriate Grouping Rules, the travel company may attempt to achieve such theoretical minima.

Next, in Act 105.120, the Grouping Rules, so obtained from the travel company's database, are used to make UY_Groups. Next, in Act 105.130, the UY_Groups so created are returned along with ungrouped U/Y, if any, and the process then ends in Box 105.200.

The grouping may enhance customers' experience, and may comprise operating a system that delivers a UTPO to at least a "first customer" to utilize up to n of m selected travel packages for said first customer, and n is less than or equal to m; operating a system that delivers an FRO to at least a "second customer" to utilize up to k of p selected travel packages, and k is less than or equal to p; operating a system to define each of the k Chosen Travel Packages, whereby after each of the k Chosen Travel Packages is defined, said "second customer" can utilize said Chosen Travel Package; operating a system wherein a travel company defines t Chosen Travel Package(s) for said "first customer" after each of said k Chosen Travel Packages is defined, wherein after each of said t travel packages is defined, said first customer can utilize said defined travel package, where t is less than or equal to n. Said t travel packages may be a subset of n travel packages, m travel packages or both. Said t travel packages or n travel packages or both may also include one or more travel packages not included in said m selected travel packages. Similarly, k travel packages may be a subset of p travel packages, or may include one or more travel packages other than said p travel packages. The grouping may be performed for a multiplicity of at least one of said first or second customers and may combine together at least one of each of said first and second customers to formulate at least one group with at least one complementary set of options. The grouping may enable a travel company, an entity other than the travel company and/or any combination thereof to utilize at least one of said m or p travel packages at least after delivery of any of said first or second options. The travel company and/or an entity other than the travel company may implement FRO VOF where in the first and/or second customer in said grouping may be same. The notification conditions may be different, same or any combination thereof for the first and second option.

Said first and/or second option may or may not include any notification deadline condition. The travel company, the second customer, an entity other than said travel company and/or any combination thereof may define, at one or more times, at least one of said k Chosen Travel Packages. The travel company, the first customer, an entity other than said travel company and/or any combination thereof may define, at one or more times, at least one of said p Chosen Travel Packages. The first customer may select, at one or more times, at least one of said m Travel Packages. The second customer may select, at one or more times, at least one of said p Travel Packages. The travel company and/or an entity other than the travel company may receive from at least one of said first or second customer, at one or more times, an indication of one or more terms and conditions associated with said first or second options, respectively. Similarly, at least one of said travel company and/or an entity other than said travel company may deliver to at least one of said first or second customers, at one or more times, one or more terms and conditions associated with said first or second option, respectively. There may or may not be any payment transaction between the travel company, an entity other than the travel company, and at least one of said first and/or second customer.

Business Model to Implement FRO

As discussed above, different business models may be used to implement a FRO VOF. The business models mentioned below, without limitation, may be used to implement the FRO VOF in the travel industry. A travel company may choose to implement a FRO VOF individually or in conjunction with one or more partners and/or other companies.

As explained in the sections above, for example, an entity may use the allocated travel packages to offer FRO to customers and/or to sell the travel packages as regular travel packages. The allocation of travel package may be conditional. For example, one of the conditions may require a return of at least one allocated travel package within a specified time period and/or other consideration(s).

The customer may select or purchase one or more travel packages from the travel company and/or said entity and then interact with said entity to receive one or more FRO Travel Packages in relation to said (already purchased) travel packages. Said entity may also receive travel package allocation from more than one travel company, and thus, offer travel packages from multiple travel companies to a single customer during the Initial Transaction for FRO.

The OA may use those travel packages and operate a service to offer FRO to the travel company customers. As explained above in FIG. 13A, a customer may select one or more travel packages from the OA, and then receive FRO on those selected travel packages from the OA. Another approach would be for a customer to select one or more travel packages from the travel company and then receive FRO on those selected travel packages from the OA. In another example, a customer may select one or more travel packages from both the travel company and the OA, and then receive the FRO option on those selected travel packages from the OA. It is also possible that the customer receives FRO from the travel company or both from the travel company and the OA on a given set of selected travel packages.

The OA and the travel company may simultaneously offer FRO to the travel company customers, i.e., a customer may either approach the travel company or the OA to receive FRO on desired travel packages. In another model, the OA may operate as the sole provider of FRO to all the customers of a travel company. In yet another model, the OA and the travel company may choose to work together and jointly offer FRO to the travel company customers. The OA or the travel company may offer FRO to customers using either or both of the Sequential or the Concurrent Get FRO processes.

As explained in FIG. 13A above, an OA may be able to offer FRO on travel packages from one or multiple travel companies. An OA may receive allocation of travel package from two or more travel companies. A customer may purchase one or more travel packages from one or more travel companies and/or from the OA, and then receive FRO on those selected travel packages from the OA. Even if the OA may not be entitled to or does not receive travel package allocation from a travel company, it may still be able to formulate an agreement with one or more travel companies to offer FRO on the travel packages of said travel companies. Thus, a customer may be able to receive FRO on travel packages from multiple travel companies, giving the customer more value to trade-in their travel flexibility and variety to choose from. For example, a customer may receive FRO on two travel packages from two different travel companies, and the OA and/or any one or all of the travel companies will then notify the customer about the Chosen Travel Package within the terms and conditions of the option contract. This may provide a lot of value to the customers for trading their travel flexibility, especially when the customer itineraries include destinations only served by a few travel companies. An OA may be able to thus create a multi-travel company FRO VOF Framework, which may tremendously enhance the value to the customers. All the participating travel companies that allocate travel packages to and/or partner with the OA to offer FRO may also gain from the FRO network (benefits include reduced revenue spill, higher revenues from selling the FRO Travel Packages at higher prices, and/or to sell FRO on those travel packages, enhanced overall customer satisfaction and/or other operational benefits). Either or both of the OA and the travel company may process the reservation for the Chosen Travel Packages associated with FRO received by the customer. A customer may receive Travel Packages from the OA or the travel company for the travel packages related to the FRO grant. An entity (the OA and the travel company) may process reservation for the travel packages offered only by that entity or by either of the two entities.

The OA and the travel company may engage in a business agreement to implement the FRO program. The business agreement may divide the total benefit generated by the FRO program between the two parties using any mechanism or criteria as desired. The total FRO Revenue Benefit may be shared between the two parties. The travel company may allocate travel packages to the OA. One or more travel companies may allocate part of or their entire travel package inventory to the OA to offer those travel packages to the customers by way of regular and/or FRO travel packages. In return, the OA may offer some revenue or fee to the travel company for all or a portion of the travel packages allocated. This fee may be given only for the travel packages that the OA is able to utilize or for all the allocated travel packages. The lending fee may be a lump sum amount, may depend upon the number of travel packages allocated or may depend on one or more factors as desired. The agreement may include a provision where the OA may return the allocated travel packages back to the travel company at a certain time and date. There may be one or more conditions associated with the return of unused FRO travel packages and/or travel packages from the Released Travel Packages, including, but not limited to, returning the same travel package, returning a higher value travel package and so on. The travel company may allot OA at least one Travel Package and said OA may deliver FRO on at least one of said allocated Travel Package. The OA may or may not enter into an agreement with the travel company to provide such option on its Travel Package. The OA may sell back at least one allocated Travel Package to said travel company or to at least one entity other than the travel company or both.

An OA may offer a travel company flexible customer inventory (generated from FRO) at one or more terms and conditions. The travel company may be able to use this flexibility to generate benefit from one or more ways, such as the Buy_N process, reducing operational costs and so forth. Some of these examples have been explained earlier.

An OA may formulate an agreement with one or more travel companies on one or more VOFs, such as on both ATO and FRO VOFs, to offer a combination of VOFs to customers.

The FRO VOF may include different conditions regarding the payment of prices related to the FRO. For example, a customer may receive FRO Price only from the travel company even if he/she is receiving travel packages and/or options from the OA. Similarly, the customer may receive FRO Price only from the OA even if he or she selected the travel packages and/or received the options from the travel companies. The condition may also be set for a customer to make one or more payments to the travel company for the travel packages and receive one or more payments from the travel company for the options received from that travel company, and to make one or more payments to the OA for the travel packages and receive one or more payments from the OA for the options received from that OA. The condition may allow the customer to receive partial payments from the travel company and the rest from the OA or vice versa, the basis of which distribution may depend upon various factors, including, but are not limited to, the factors of travel company's choosing, the arrangement between the OA and the travel company and so on. In another example, the customer may receive the FRO Price from the third party or may receive FRO Price from any of the combination of the entities mentioned above.

Information Technology System for FRO

A client-server architecture may be used to implement the FRO VOF. However, a travel company may use a computer hardware and software infrastructure of its choosing to implement a FRO VOF.

The FRO VOF may be best implemented using one or more computer-implemented methods to operate a computer-implemented service to offer FRO to the customers, that includes, but not limited to, recording the information pertaining to the offered and/or used FRO in a database. It may also include operating a computer-implemented service (and/or system) or other service (and/or system) to define the Chosen Travel Packages, and recording said Chosen Travel Packages (or defined Travel Packages) and all the Travel Packages related to a FRO in a database.

For the stage one (i.e., to formulate the FRO VOF), an application server may be used along with a database (e.g., a relational database) that stores all the information relevant to the travel company and the customer. The database may include all the relevant information sufficient to identify Travel Packages the travel company chooses to make eligible for FRO. One or more users (e.g., a business analyst or manager) may have full access to this server through Intranet or highly secured VPN environment to design an optimal value option framework. The database shall also store all the information pertaining to all the acts (in stage one) used by the travel company while formulating the FRO VOF.

A similar or a different application server and/or a cluster of application servers (functioning concurrently) along with one or more web servers and a set of one or more database servers may be used for the Get FRO as explained in FIG. 13D above and CN (Customer Notification) processes in the stage two of the FRO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get FRO process and the Even Optimizer processes may be computer-implemented as explained and discussed above in FIGS. 13D and 13E. All the customer interactions and the related information such as customer needs, inputs, payment transactions etc. are stored in this database, including information pertaining to the interactions with those customers who may not receive FRO. The systems for stage two and stage one should be maintained in a synchronized environment so that each system has access to the most current information and can communicate with each other.

As discussed above, there may be other ways for implementing the FRO VOF which may depend upon including, but not limited to, the scale of the implementation, business requirements and number of entities involved. The entities may interact through a series of hardware products and services with the OA/travel company server(s). The OA may or may not be different than the travel company and the OA server may be the same as that of the travel company server. The information technology and network system to implement FRO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, a travel company may have one or more separate temporary database structure wherein the entries are updated and stored until the final update is made in one or more main databases. One the final update is done, the entries in these temporary databases may be removed.

The entire system may run at the premises of OA, travel company and/or any third entity or any combination thereof. It may also be possible to run a part of the system at one place and rest at one or more other places. The system may also be implemented even if one or more servers may be kept offshore locations and may be accessed remotely. The geographical locations of one or more hardware product and/or services may be different depending upon including, but not limited to, the factors of travel company's choice, ease of accessibility, infrastructure facilities. The structure or the interaction architecture of the system may vary depending on factors including, but not limited to, the set up of the travel company, changes in the technology and with the introduction of new and better technology enhancing the interaction process.

A customer may interact with either one or more of the Get FRO, Buy_N, the CN processes either directly or indirectly using a local or a remote terminal (e.g., a computer with a browser and an access to the Internet) that is able to access the web server(s) that host the Get FRO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the travel company, an OA, a third party service provider or any combination of the above. In the model, where the OA receives Travel Package allocation from the travel company and offers FRO to the customers directly, the web server, application server and database for both stage one and stage two shall be managed by the OA. The OA may also have partial (or complete) access to the travel company database and systems through a highly secured environment (for example, a virtual private network). In the model, when an OA and a travel company tie-up together to offer FRO, all the computer hardware and software infrastructure for both stage one and stage two may be hosted by and/or property of either or both (mutually) of the sides depending upon the business agreement between them.

Each travel company using the system and method taught herein can make its own choices as to how extensively to deploy the method. For example, a travel company can implement as few or as many of the foregoing options as it desires; or it may perceive and implement one or more other options. Brief Description of FRO VOF in the Cruise Industry In a successful Initial Transaction for a FRO VOF between the cruise company and the customer, the customer receives an option to utilize up to 'n' out of 'm' selected Cruise Packages (said 'm' Cruise Packages termed "FRO Cruise Packages"). The 'n' Cruise Packages that are finally selected are termed "Chosen Cruise Packages". After each of the 'n' Chosen Cruise Packages is defined (or selected or chosen or received), the customer has the right to utilize (or can utilize) said Chosen Cruise Packages. Apart from the 'n' Chosen Cruise Packages, the remaining 'm–n' Cruise Packages are termed "Released Cruise Packages". The Released Cruise Packages (if any, that were probably held or blocked for said customer) may be sold to other customers as normal Cruise Packages or FRO Cruise Packages or used for other purposes. The Released Cruise Packages in relation to said option may be reused by the cruise company before, after, at or any combination thereof, the time the Released Cruise Packages and/or Chosen Cruise Packages are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m–1); however, in some situations, n may be equal to m. The value of 'n' may or may not be known (or defined and/or re-defined) at the time of the Initial Transaction. The value of 'n' Cruise Packages may be defined in one or more transactions. The value of 'm' and/or 'n' may be defined and/or re-defined, at one or more times, by the cruise company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Cruise Packages may include one or more Cruise Packages other than said 'm' Cruise Packages.

The FRO Cruise Packages may be selected by the cruise company, the customer, another entity or any combination thereof. The FRO VOF may enable a cruise company to obtain travel flexibility from FRO customers (i.e., those who select FRO) and use said travel flexibility to satisfy the travel and entertainment needs of other customers (i.e., who have relatively fixed or strong preferences). Therefore, the cruise company would usually have the right to select (or define) the Chosen Cruise Packages. However, in different implementations of FRO VOF, the cruise company, the customer, another entity or any combination thereof may select one or more of the Chosen Cruise Packages related to a FRO. The FRO Cruise Packages and the Chosen Cruise Packages may be selected by the same entity, different entities or any combination thereof. For example, the customer may select the FRO Cruise Packages and the cruise company may select the Chosen Cruise Packages out of the FRO Cruise Packages. The cruise company may incorporate the customer information and the data related to the FRO into the sales, production, inventory, other database or information system or any combination of the above.

Various algorithms, processes discussed earlier including, but not limited to, Buy_N, Customer Notification, Remove_Y, Sequential Get FRO, Concurrent Get FRO may be implemented in the cruise industry.

A cruise company may have a higher aggregate capacity than aggregate demand. However, the demand may be non-uniform and may lead to over-sale, revenue spill or spoilage or any combination thereof, in Cruise Packages. The issue of last minute cancellations and no-shows (CNS) may further complicate the issue. To deal with the revenue spills and spoilages, and to concurrently hedge against the CNS, the cruise companies may overbook Cruise Packages. Overbooking is a risky proposition due to associated costs, customer ill will and/or regulatory or government rules. If a cruise departs with one or more empty seats, that condition probably represents the loss of potential revenue for that cruise company. The cruise company may have turned down potential customers due to the risk of high cost of overbooking in the concerned Cruise Package or other Cruise Packages (of the same or different Cruise Package). The overbooking factor in Cruise Packages other than said Cruise Packages represent potential revenue loss because there may be one or more customers on such other Cruise Packages who could have been willing to be shifted to the Cruise Package with empty slots in lieu of reward, and thus, releasing capacity for new potential customers (who may be willing to pay a lot higher) in said other Cruise Packages. However, today there is no framework that allows cruise companies to do so in an optimal fashion such that both cruise company and the customer benefit at the same time. An opportunity, thus, exists to concurrently generate an incremental revenue benefit for the cruise company, and to maximize the purchase utilities for the customers (includes those who want to trade-in flexibility and those who want to obtain specific Cruise Packages even at higher prices).

For example, Michael wants to go from Canberra to Sydney but is flexible to travel either on $2^{nd}$ May or $5^{th}$ May. The cruise company may offer him FRO, where he will be informed on $28^{th}$ April that on which date he may have to depart. The cruise company may choose to reward Michael for his travel flexibility.

Brief description of FRO VOF in the Entertainment Industry

In a successful Initial Transaction for a FRO VOF between the entertainment company and the customer, the customer receives an option to utilize up to 'n' out of 'm' selected Entertainment Packages (said 'm' Entertainment Packages termed "FRO Entertainment Packages"). The 'n' Entertainment Packages that are finally selected are termed "Chosen Entertainment Packages". After each of the 'n' Chosen Entertainment Packages is defined (or selected or chosen or received), the customer has the right to utilize (or can utilize) said Chosen Entertainment Packages. Apart from the 'n' Chosen Entertainment Packages, the remaining 'm-n' Entertainment Packages are termed "Released Entertainment Packages". The Released Entertainment Packages (if any, that were probably held or blocked for said customer) may be sold to other customers as normal Entertainment Packages or FRO Entertainment Packages or used for other purposes. The Released Entertainment Packages in relation to said option may be reused by the entertainment company before, after, at or any combination thereof, the time the Released Entertainment Packages and/or Chosen Entertainment Packages are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' Entertainment Packages may be defined in one or more transactions. The value of 'm' and/or 'n' may be defined and/or re-defined, at one or more times, by the entertainment company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Entertainment Packages may include one or more Entertainment Packages other than said 'm' Entertainment Packages.

The FRO Entertainment Packages may be selected by the entertainment company, the customer, another entity or any combination thereof. The FRO VOF may enable an entertainment company to obtain flexibility from FRO customers (i.e., those who select FRO) and use said flexibility to satisfy the entertainment needs of other customers (i.e., who have relatively fixed or strong preferences). Therefore, the entertainment company would usually have the right to select (or define) the Chosen Entertainment Packages. However, in different implementations of FRO VOF, the entertainment company, the customer, another entity or any combination thereof may select one or more of the Chosen Entertainment Packages related to a FRO. The FRO Entertainment Packages and the Chosen Entertainment Packages may be selected by the same entity, different entities or any combination thereof. For example, the customer may select the FRO Entertainment Packages and the entertainment company may select the Chosen Entertainment Packages out of the FRO Entertainment Packages. The entertainment company may incorporate the customer information and the data related to the FRO into the sales, production, inventory, other database or information system or any combination of the above.

The entertainment industry comprises of several industries including, without limitation, performing arts entertainment (including, without limitation, music theatre, vaudeville, comedy, film, music, dance, drama, opera, magic, concerts), exhibition entertainment (including, but not limited to, museum, wax museums, amusement park, trade and other shows, fairs, themed retails, busking), mass media entertainment (including, but not limited to, film, film studios, movie theatres, cinemas, television broadcasting, radio broadcasting, recording companies, discotheques, news media), electronic entertainment (including, but not limited to, computer games, video games, sms, internet), sporting entertainment events (including, but not limited to, tickets for baseball games, boxing matches, hockey matches, football games), advertisement slots in any of the above mentioned industries and/or companies and so forth. The FRO VOF may be implemented in one or all of the industries mentioned above. Companies and/or customers in each of the industries mentioned above, and others not specifically mentioned above, may generate benefit from the FRO VOF.

Various algorithms, processes discussed earlier including, but not limited to, Buy_N, Customer Notification, Remove_Y, Sequential Get FRO, Concurrent Get FRO may be implemented in the entertainment industry.

As an example in the entertainment industry, entertainment companies usually have a higher aggregate capacity than aggregate demand. However, the demand is non-uniform and often leads to over-sale, revenue spill or spoilage or any combination thereof, in Entertainment Packages. The issue of last minute cancellations and no-shows (CNS) further complicates the issue. To deal with the revenue spills and spoilages, and to concurrently hedge against the CNS, the entertainment companies overbook Entertainment Packages. Overbooking is a risky proposition due to associated costs, customer ill will and/or regulatory or government rules. If the capacity is not optimally utilized, that condition probably represents the loss of potential revenue for that entertainment company. The entertainment company may have turned down potential customers due to the risk of high cost of overbooking in the concerned Entertainment Package or other Entertainment Packages (of the same or different Entertainment Package). The overbooking factor in Entertainment Packages other than said Entertainment Packages represent potential revenue loss because there may be one or more customers on such other Entertainment Packages who could have been willing to be shifted to the Entertainment Package with empty slots in lieu of reward, and thus, releasing capacity for new potential customers (who may be willing to pay a lot higher) in said other Entertainment Packages. However, today there is no framework that allows entertainment companies to do so in an optimal fashion such that both entertainment company and the customer benefit at the same time. An opportunity, thus, exists to concurrently generate an incremental revenue benefit for the entertainment company, and to maximize the purchase utilities for the customers (includes those who want to trade-in flexibility and those who want to obtain specific Entertainment Packages even at higher prices).

For example, John plans to watch a movie and is flexible to watch either a 6:30 PM or a 9:30 PM show. The theatre company may offer him a FRO where he may be informed by 5:30 PM about his confirmed show timings. The entertainment company (i.e., the theatre company) may choose to reward John for his flexibility.

Brief description of FRO VOF in the Event Management Industry

In a successful Initial Transaction for a FRO VOF between the event management company and the customer, the customer receives an option to utilize up to 'n' out of 'm' selected Packages (said 'm' Packages termed "FRO Packages"). The 'n' Packages that are finally selected are termed "Chosen Packages". After each of the 'n' Chosen Packages is defined (or selected or chosen or received), the customer has the right to utilize (or can utilize) said Chosen Packages. Apart from the 'n' Chosen Packages, the remaining 'm–n' Packages are termed "Released Packages". The Released Packages (if any, that were probably held or blocked for said customer) may be sold to other customers as normal Packages or FRO Packages or used for other purposes. The Released Packages in relation to said option may be reused by the event management company before, after, at or any combination thereof, the time the Released Packages and/or Chosen Packages are defined (or received or selected).

Numerically, the value of 'm' is greater than or equal to 1 and the value of 'n' may vary from '0' to 'm' depending upon the specific implementation of the FRO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, h may be equal to m. The value of 'n' may or may not be known (or defined and/or re-defined) at the time of the Initial Transaction. The value of 'n' Packages may be defined in one or more transactions. The value of 'm' and/or 'n' may be defined and/or re-defined, at one or more times, by the event management company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Packages may include one or more Packages other than said 'm' Packages.

The FRO Packages may be selected by the event management company, the customer, another entity or any combination thereof. The FRO VOF may enable an event management company to obtain flexibility from FRO customers (i.e., those who select FRO) and use said flexibility to satisfy the needs of other customers (i.e., who have relatively fixed or strong preferences). Therefore, the event management company would usually have the right to select (or define) the Chosen Packages. However, in different implementations of FRO VOF, the event management company, the customer, another entity or any combination thereof may select one or more of the Chosen Packages related to a FRO. The FRO Packages and the Chosen Packages may be selected by the same entity, different entities or any combination thereof. For example, the customer may select the FRO Packages and the event management company may select the Chosen Packages out of the FRO Packages. The event management company may incorporate the customer information and the data related to the FRO into the sales, production, inventory, other database or information system or any combination of the above.

Event management comprises of several industries including, without limitation, social and cultural events, festivals, sporting events (for example, including, but not limited to, baseball, hockey, football, cricket, basketball), corporate events (including, but not limited to, product launches, press conferences, corporate meetings, conferences), marketing programs (including, but not limited to, road shows, grand opening events), special events (including, but not limited to, concerts, award ceremonies, film premieres, launch/release parties, fashion shows, private (personal) events such as weddings and bar parties, so forth). The FRO VOF may be implemented in one or all of the industries mentioned above. Companies and/or customers in each of the industries mentioned above, and others not specifically mentioned above, may generate benefit from the FRO VOF.

Various algorithms, processes discussed earlier including, but not limited to, Buy_N, Customer Notification, Remove_Y, Sequential Get FRO, Concurrent Get FRO may be implemented in the event management industry.

As an example in the event management industry, event management companies usually have a higher aggregate capacity than aggregate demand. However, the demand is non-uniform and often leads to over-sale, revenue spill or spoilage or any combination thereof, in Packages. The issue of last minute cancellations and no-shows (CNS) further complicates the issue. To deal with the revenue spills and spoilages, and to concurrently hedge against the CNS, the event management companies overbook Packages. Overbooking is a risky proposition due to associated costs, customer ill will and/or regulatory or government rules. If the capacity is not optimally utilized, that condition probably represents the loss of potential revenue for that event management company. The event management company may have turned down potential customers due to the risk of high cost of overbooking in the concerned Package or other Packages (of the same or different Package). The overbooking factor in Packages other than said Packages represent potential revenue loss because there may be one or more customers on such other Packages who could have been willing to be shifted to the Package with empty slots in lieu of reward, and thus, releasing capacity for new potential customers (who may be willing to pay a lot higher) in said other Packages. However, today there is no framework that allows event management companies to do so in an optimal fashion such that both event management company and the customer benefit at the same time. An opportunity, thus, exists to concurrently generate an incremental revenue benefit for the event management company, and to maximize the purchase utilities for the customers (includes those who want to trade-in flexibility and those who want to obtain specific Packages even at higher prices).

For example, David wants to organize a Christmas Party for his employees on $24^{th}$ December in a hotel which has two different banquet halls in which the party may be organized. The event management company may offer him a FRO, where he will be informed by $22^{nd}$ December about the venue (i.e., the chosen hall) of his Christmas party. The event management company may choose to reward David for his flexibility.

While the invention has been described with respect to a limited number of embodiments, those skilled in the art, having benefit of this disclosure, will appreciate that other embodiments can be devised within the spirit and scope of the invention as disclosed herein.

What is claimed is:

1. A computer-implemented system to provide options on products, comprising:
    a. a data processor being adapted to receive at least one input and in response, to deliver to a customer an option to select and utilize each of m products selected at the time the option is received and including at least one practically constrained product, wherein
        i. m is greater than or equal to 2,
        ii. said m products are selected in the course of related transaction(s), and
        iii. it will not be possible for the customer to fully utilize all said m products due to said at least one practical constraint; and
    b. a data processor being adapted to record the information pertaining to said option in a computer readable data store.

2. The system of claim 1 wherein at least two of said data processors are a same processor.

3. A computer-implemented method to provide options on products, comprising:
    a. via a data processor configured by stored program instructions, providing to a customer an option to select and utilize each of m selected products selected at the time the option is received and including at least one practically constrained product, wherein
        i. m is greater than or equal to 2,
        ii. said products are selected in the course of related transaction(s), and
        iii. it will not be possible for the customer to fully utilize all said m products due to said at least one practical constraint; and
    b. recording the information pertaining to said option in a computer readable data store.

4. The method of claim 3 wherein said customer is not able to fully utilize at least one product due to at least one practical constraint.

5. The method of claim 3 wherein at least two of said data processors are a same processor.

6. The method of claim 3 wherein said at least one practical constraint includes at least one time constraint.

7. The method of claim 3 wherein said at least one practical constraint includes at least one location constraint.

8. The method of claim 3 wherein said related transaction is at least one transaction.

9. The method of claim 3 wherein said related transaction includes a monetary value transaction.

10. The method of claim 3 wherein said customer is able to only partially utilize at least one product due to at least one practical constraint.

11. The method of claim 3 wherein impossibility of fully utilizing the m products due to at least one practical constraint increases value for at least one of the customer and the provider of said option.

12. The method of claim 3 wherein inability to fully utilize the m products due to at least one practical constraint increases value for at least one of the customer, the provider of said option and an entity other than the provider of said option.

13. The method of claim 12 wherein said value includes cost saving for the provider of said option.

14. The method of claim 3 wherein said selected products include at least one product belonging to the provider of said option.

15. The method of claim 3 wherein said selected products include at least one product belonging to an entity other than the provider of said option.

16. The method of claim 3 wherein said selected products include a higher ranked product and a lower ranked product, where both cannot be utilized simultaneously.

17. The method of claim 16 wherein the provider of said option is an entity in the travel industry.

18. The method of claim 17 wherein the provider of said option is an airline.

19. The method of claim 3 wherein said selected products include at least one higher ranked product.

20. The method of claim 19 further including receiving input from the customer with respect to selection of a higher ranked product, and wherein in response to the customer's input selecting said higher ranked product a right is conferred upon the company to enforce a payment obligation on the customer if said higher ranked product becomes available for utilization.

21. The method of claim 20 wherein the payment obligation is priced dynamically.

22. The method of claim 21, wherein the amount for the payment obligation is determined by bidding from customers.

23. The method of claim 19 further including receiving input from the customer with respect to selection of a higher ranked product, and requiring the customer to indicate, as part of said input, the price the customer is willing to pay for the utilization of said higher ranked product.

24. The method of claim 23 further including providing to the customer an opportunity to modify the price before a specified notification date.

* * * * *